US011567644B2

(12) United States Patent
Walkin et al.

(10) Patent No.: US 11,567,644 B2
(45) Date of Patent: Jan. 31, 2023

(54) CURSOR INTEGRATION WITH A TOUCH SCREEN USER INTERFACE

(71) Applicant: Apple Inc., Cupertino, CA (US)

(72) Inventors: Brandon M. Walkin, San Francisco, CA (US); Dylan Ross Edwards, San Jose, CA (US); Marcos Alonso Ruiz, San Francisco, CA (US); Stephen O. Lemay, Palo Alto, CA (US); Patrick L. Coffman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/167,007

(22) Filed: Feb. 3, 2021

(65) Prior Publication Data

US 2021/0240332 A1 Aug. 5, 2021

Related U.S. Application Data

(60) Provisional application No. 62/969,328, filed on Feb. 3, 2020.

(51) Int. Cl.

| | |
|---|---|
| ***G06F 3/04842*** | (2022.01) |
| ***G06F 3/04812*** | (2022.01) |
| ***G06F 3/0485*** | (2022.01) |
| ***G06F 3/0488*** | (2022.01) |
| ***G06F 3/0489*** | (2022.01) |

(52) U.S. Cl.

CPC ........ *G06F 3/04842* (2013.01); *G06F 3/0485* (2013.01); *G06F 3/0488* (2013.01); *G06F 3/0489* (2013.01); *G06F 3/04812* (2013.01)

(58) Field of Classification Search

CPC .. G06F 3/04842; G06F 3/0489; G06F 3/0485; G06F 3/0488; G06F 3/04812; G06F 3/048

See application file for complete search history.

(56) References Cited

U.S. PATENT DOCUMENTS

| | | | |
|---|---|---|---|
| 5,305,435 | A | 4/1994 | Bronson |
| 5,473,745 | A | 12/1995 | Berry et al. |
| 5,483,261 | A | 1/1996 | Yasutake |

(Continued)

FOREIGN PATENT DOCUMENTS

| | | | |
|---|---|---|---|
| EP | 3273339 | A1 | 1/2018 |
| JP | 2000-163031 | A | 6/2000 |

(Continued)

OTHER PUBLICATIONS

Advisory Action received for U.S. Appl. No. 13/112,459, dated Dec. 4, 2013, 3 pages.

(Continued)

*Primary Examiner* — Jeanette J Parker

(74) *Attorney, Agent, or Firm* — Kubota & Basol LLP

(57) ABSTRACT

In some embodiments, a cursor interacts with user interface objects on an electronic device. In some embodiments, an electronic device selectively displays a cursor in a user interface. In some embodiments, an electronic device displays a cursor while manipulating objects in the user interface. In some embodiments, an electronic device dismisses or switches applications using a cursor. In some embodiments, an electronic device displays user interface elements in response to requests to move a cursor beyond an edge of the display.

48 Claims, 293 Drawing Sheets

(56) References Cited

U.S. PATENT DOCUMENTS 5,488,204 A 1/1996 Mead et al.
5,644,737 A 7/1997 Tuniman et al.
5,657,050 A 8/1997 McCambridge et al.
5,745,096 A 4/1998 Ludolph et al.
5,745,109 A 4/1998 Nakano et al.
5,745,111 A 4/1998 Cline et al.
5,745,112 A 4/1998 Hirose
5,757,371 A 5/1998 Oran et al.
5,767,919 A * 6/1998 Lee .................... H04N 5/44513 725/37
5,825,352 A 10/1998 Bisset et al.
5,835,079 A 11/1998 Shieh
5,835,919 A 11/1998 Stern et al.
5,874,958 A 2/1999 Ludolph
5,880,411 A 3/1999 Gillespie et al.
5,899,996 A 5/1999 Dysart et al.
5,914,716 A 6/1999 Rubin et al.
6,108,003 A 8/2000 Hall et al.
6,133,898 A 10/2000 Ludolph et al.
6,188,391 B1 2/2001 Seely et al.
6,243,724 B1 6/2001 Mander et al.
6,310,610 B1 10/2001 Beaton et al.
6,323,846 B1 11/2001 Westerman et al.
6,337,698 B1 1/2002 Keely et al.
6,392,675 B1 5/2002 Becker et al.
6,396,519 B1 5/2002 Hall et al.
6,448,986 B1 9/2002 Smith
6,559,873 B1 5/2003 Dawkins et al.
6,570,557 B1 5/2003 Westerman et al.
6,628,315 B1 9/2003 Smith et al.
6,664,983 B2 12/2003 Ludolph
6,677,932 B1 1/2004 Westerman
6,690,387 B2 2/2004 Zimmerman et al.
6,867,790 B1 3/2005 Brooks
7,015,894 B2 3/2006 Morohoshi
7,088,344 B2 8/2006 Maezawa et al.
7,184,064 B2 2/2007 Zimmerman et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,770,120 B2 8/2010 Baudisch
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
9,348,458 B2 5/2016 Hotelling et al.
9,501,217 B2 11/2016 Louch
9,933,937 B2 4/2018 Lemay et al.
2001/0028365 A1 10/2001 Ludolph
2001/0035882 A1 11/2001 Stoakley et al.
2002/0015024 A1 2/2002 Westerman et al.
2002/0015064 A1 2/2002 Robotham et al.
2002/0063740 A1 5/2002 Forlenza et al.
2002/0130838 A1 9/2002 Feierbach
2002/0188619 A1 12/2002 Low
2003/0146927 A1 8/2003 Crow et al.
2004/0036679 A1* 2/2004 Emerson ............. G06F 3/04895 345/168
2004/0150664 A1 8/2004 Baudisch
2005/0039147 A1 2/2005 Jones et al.
2005/0166162 A1 7/2005 Kaneko
2005/0190059 A1 9/2005 Wehrenberg
2005/0216866 A1* 9/2005 Rosen ................ G06Q 30/0263 715/856
2006/0010394 A1 1/2006 Chaudhri et al.
2006/0017692 A1 1/2006 Wehrenberg et al.
2006/0026521 A1 2/2006 Hotelling et al.
2006/0033724 A1 2/2006 Chaudhri et al.
2006/0112347 A1 5/2006 Baudisch
2006/0123353 A1 6/2006 Matthews et al.
2006/0197753 A1 9/2006 Hotelling
2006/0242602 A1 10/2006 Schechter et al.
2007/0200713 A1 8/2007 Weber et al.
2007/0240074 A1 10/2007 Banks
2007/0250511 A1 10/2007 Endler et al.
2007/0288860 A1 12/2007 Ording et al.
2008/0072177 A1 3/2008 Santos et al.
2008/0187248 A1 8/2008 Ikeda et al.
2008/0229232 A1 9/2008 Schulz et al.
2008/0307335 A1 12/2008 Chaudhri et al.
2008/0307350 A1 12/2008 Sabatelli et al.
2008/0307351 A1 12/2008 Louch et al.
2009/0282359 A1 11/2009 Saul et al.
2009/0313567 A1 12/2009 Kwon et al.
2009/0327955 A1 12/2009 Mouilleseaux et al.
2010/0083190 A1 4/2010 Roberts et al.
2010/0199208 A1 8/2010 Tokunaga et al.
2010/0306692 A1 12/2010 Baier et al.
2011/0055741 A1 3/2011 Jeon et al.
2011/0055753 A1 3/2011 Horodezky et al.
2011/0087981 A1 4/2011 Jeong et al.
2011/0138295 A1 6/2011 Momchilov et al.
2011/0138324 A1* 6/2011 Sweeney ............. G06F 3/04842 715/800
2011/0209088 A1 8/2011 Hinckley et al.
2011/0246918 A1 10/2011 Henderson
2011/0279354 A1 11/2011 Tang et al.
2011/0296351 A1 12/2011 Ewing et al.
2011/0314389 A1 12/2011 Meredith et al.
2012/0185789 A1 7/2012 Louch
2012/0185805 A1 7/2012 Louch et al.
2012/0306778 A1* 12/2012 Weeldreyer ......... G06F 3/04886 345/173
2013/0055083 A1* 2/2013 Fino ...................... G06F 3/0481 715/716
2013/0125067 A1* 5/2013 Moon ................. G06F 3/04812 715/862
2014/0040834 A1* 2/2014 Thompson .......... G06F 3/04883 715/856
2014/0072277 A1* 3/2014 Takao ................ H04N 21/4826 386/239
2015/0067596 A1* 3/2015 Brown .................. G06F 3/0488 715/808
2015/0100688 A1* 4/2015 Richardson .............. G06N 5/04 709/224
2015/0135109 A1* 5/2015 Zambetti ............... G06F 3/0482 715/767
2016/0110056 A1 4/2016 Hong et al.
2016/0124756 A1* 5/2016 Sadler ................... G06F 3/0482 715/708
2017/0070458 A1* 3/2017 Kunieda ................ G06Q 50/01
2017/0123621 A1 5/2017 Louch
2018/0032229 A1 2/2018 Louch et al.
2018/0335937 A1* 11/2018 Hauenstein ........... G06F 3/0485
2019/0187889 A1* 6/2019 Moon ................. G06F 3/04883
2021/0181939 A1* 6/2021 Lee ....................... G06F 3/0482

FOREIGN PATENT DOCUMENTS

JP 2002-342033 A 11/2002
WO 2013/169849 A2 11/2013
WO 2014/105276 A1 7/2014

OTHER PUBLICATIONS

Final Office Action received for U.S. Appl. No. 13/112,459, dated Aug. 19, 2014, 15 pages.
Final Office Action received for U.S. Appl. No. 13/112,459, dated Jan. 13, 2016, 15 pages.
Final Office Action received for U.S. Appl. No. 13/112,459, dated Jul. 18, 2013, 16 pages.
Final Office Action received for U.S. Appl. No. 13/165,860, dated Jan. 17, 2017, 19 pages.
Final Office Action received for U.S. Appl. No. 13/165,860, dated May 21, 2015, 17 pages.
Final Office Action received for U.S. Appl. No. 13/165,860, dated Oct. 15, 2013, 12 pages.

(56) References Cited

OTHER PUBLICATIONS

Final Office Action received for U.S. Appl. No. 15/357,624, dated May 1, 2019, 42 pages.
Final Office Action received for U.S. Appl. No. 15/357,624, dated May 3, 2018, 42 pages.
Final Office Action received for U.S. Appl. No. 15/650,637, dated Apr. 16, 2021, 16 pages.
Final Office Action received for U.S. Appl. No. 15/650,637, dated Mar. 5, 2020, 16 pages.
Non-Final Office Action received for U.S. Appl. No. 13/112,459, dated Dec. 21, 2012, 15 pages.
Non-Final Office Action received for U.S. Appl. No. 13/112,459, dated Feb. 14, 2014, 14 pages.
Non-Final Office Action received for U.S. Appl. No. 13/112,459, dated Jun. 4, 2015, 15 pages.
Non-Final Office Action received for U.S. Appl. No. 13/165,860, dated Apr. 8, 2016, 18 pages.
Non-Final Office Action received for U.S. Appl. No. 13/165,860, dated Mar. 15, 2013, 12 pages.
Non-Final Office Action received for U.S. Appl. No. 13/165,860, dated Sep. 2, 2014, 14 pages.
Non-Final Office Action received for U.S. Appl. No. 15/357,624, dated Jun. 29, 2017, 35 pages.
Non-Final Office Action received for U.S. Appl. No. 15/357,624, dated Sep. 7, 2018, 37 pages.
Non-Final Office Action received for U.S. Appl. No. 15/650,637, dated Aug. 29, 2019, 16 pages.
Non-Final Office Action received for U.S. Appl. No. 15/650,637, dated Aug. 31, 2020, 13 pages.
Non-Final Office Action received for U.S. Appl. No. 15/650,637, dated Jan. 6, 2022, 16 pages.
Notice of Allowance received for U.S. Appl. No. 13/112,459, dated Jul. 15, 2016, 8 pages.
Carr et al., "Using Interaction Object Graphs to Specify Graphical Widgets", Institute for Systems Research, University of Maryland, College Park, MD, Sep. 1994, 32 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Switchtoamac, "Remove Items from the Dock", Available online at: <https://switchtoamac.com/guides/mac-os-x/dock/remove-items-from-the-dock.html>, created on Dec. 24, 2006, Feb. 27, 2009, 3 pages.
Thinkmacs, "Mac OS X Tutorial: Adding Icons to the Dock", Available online at: <https://www.youtube.com/watch?v=-PTItCAgzEM>, Sep. 20, 2010, pp. 1-2.
Verizoneric, "Add & Remove Apps & Widgets on Android Smart-phones", Available online at: <https://www.youtube.com/watch?v=3I70yTFE3xw>, Sep. 24, 2010, pp. 1-23.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

Figure 7H:
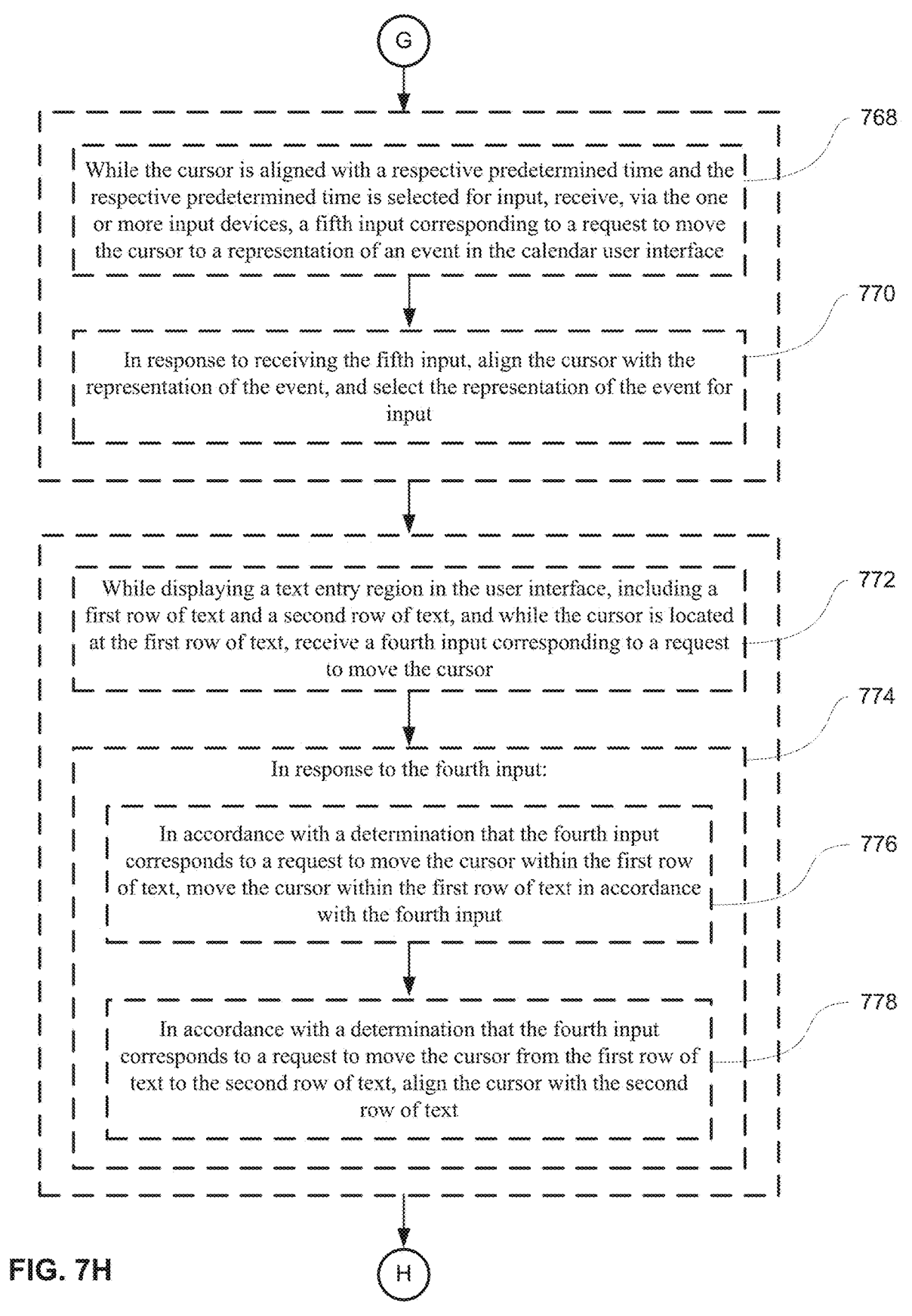

G

768 While the cursor is aligned with a respective predetermined time and the respective predetermined time is selected for input, receive, via the one or more input devices, a fifth input corresponding to a request to move the cursor to a representation of an event in the calendar user interface 770 In response to receiving the fifth input, align the cursor with the representation of the event, and select the representation of the event for input 772 While displaying a text entry region in the user interface, including a first row of text and a second row of text, and while the cursor is located at the first row of text, receive a fourth input corresponding to a request to move the cursor 774 In response to the fourth input:

776 In accordance with a determination that the fourth input corresponds to a request to move the cursor within the first row of text, move the cursor within the first row of text in accordance with the fourth input 778 In accordance with a determination that the fourth input corresponds to a request to move the cursor from the first row of text to the second row of text, align the cursor with the second row of text

Figure 12F:
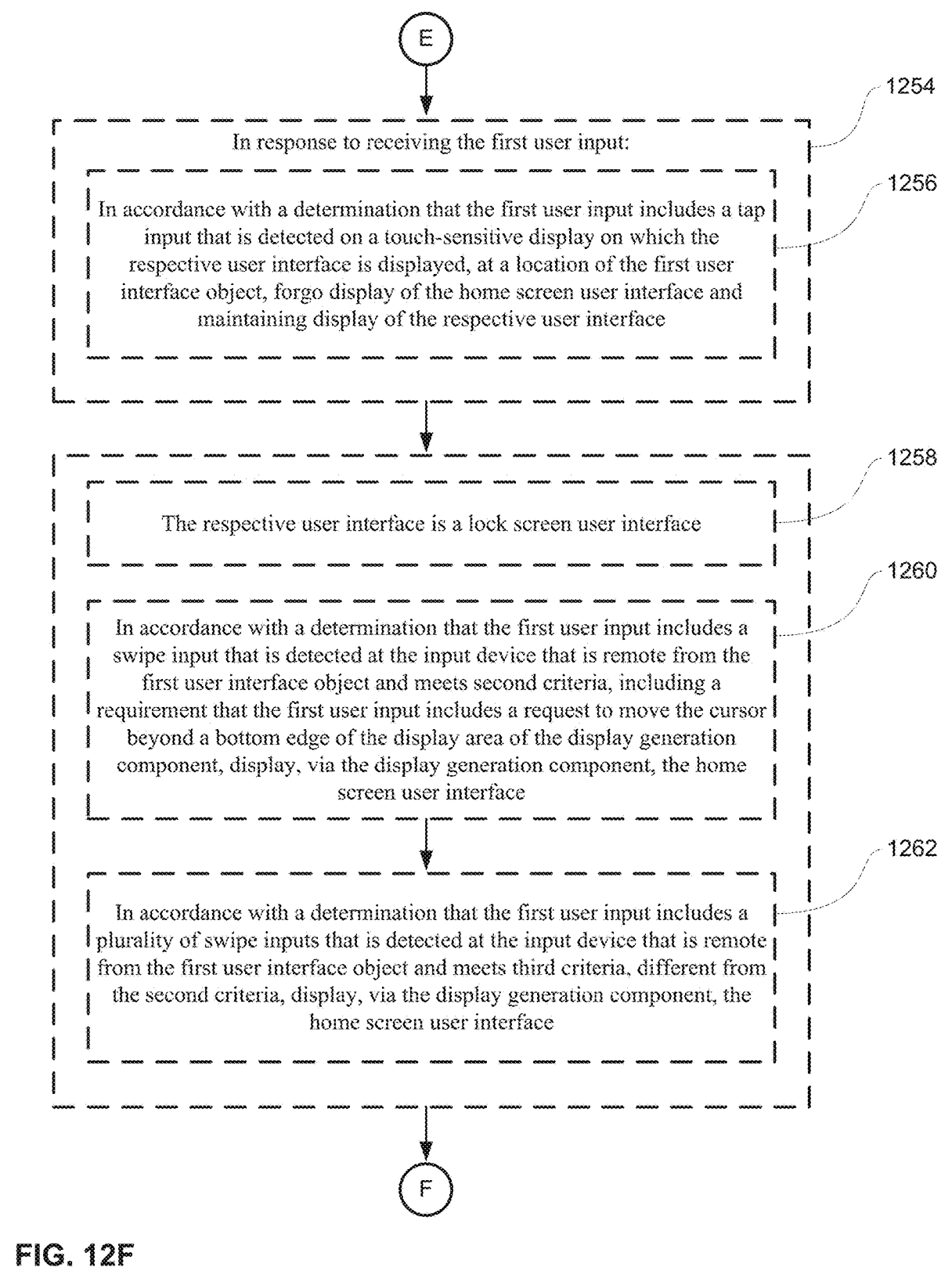

1254 In response to receiving the first user input:

1256 In accordance with a determination that the first user input includes a tap input that is detected on a touch-sensitive display on which the respective user interface is displayed, at a location of the first user interface object, forgo display of the home screen user interface and maintaining display of the respective user interface 1258 The respective user interface is a lock screen user interface 1260 In accordance with a determination that the first user input includes a swipe input that is detected at the input device that is remote from the first user interface object and meets second criteria, including a requirement that the first user input includes a request to move the cursor beyond a bottom edge of the display area of the display generation component, display, via the display generation component, the home screen user interface 1262 In accordance with a determination that the first user input includes a plurality of swipe inputs that is detected at the input device that is remote from the first user interface object and meets third criteria, different from the second criteria, display, via the display generation component, the home screen user interface

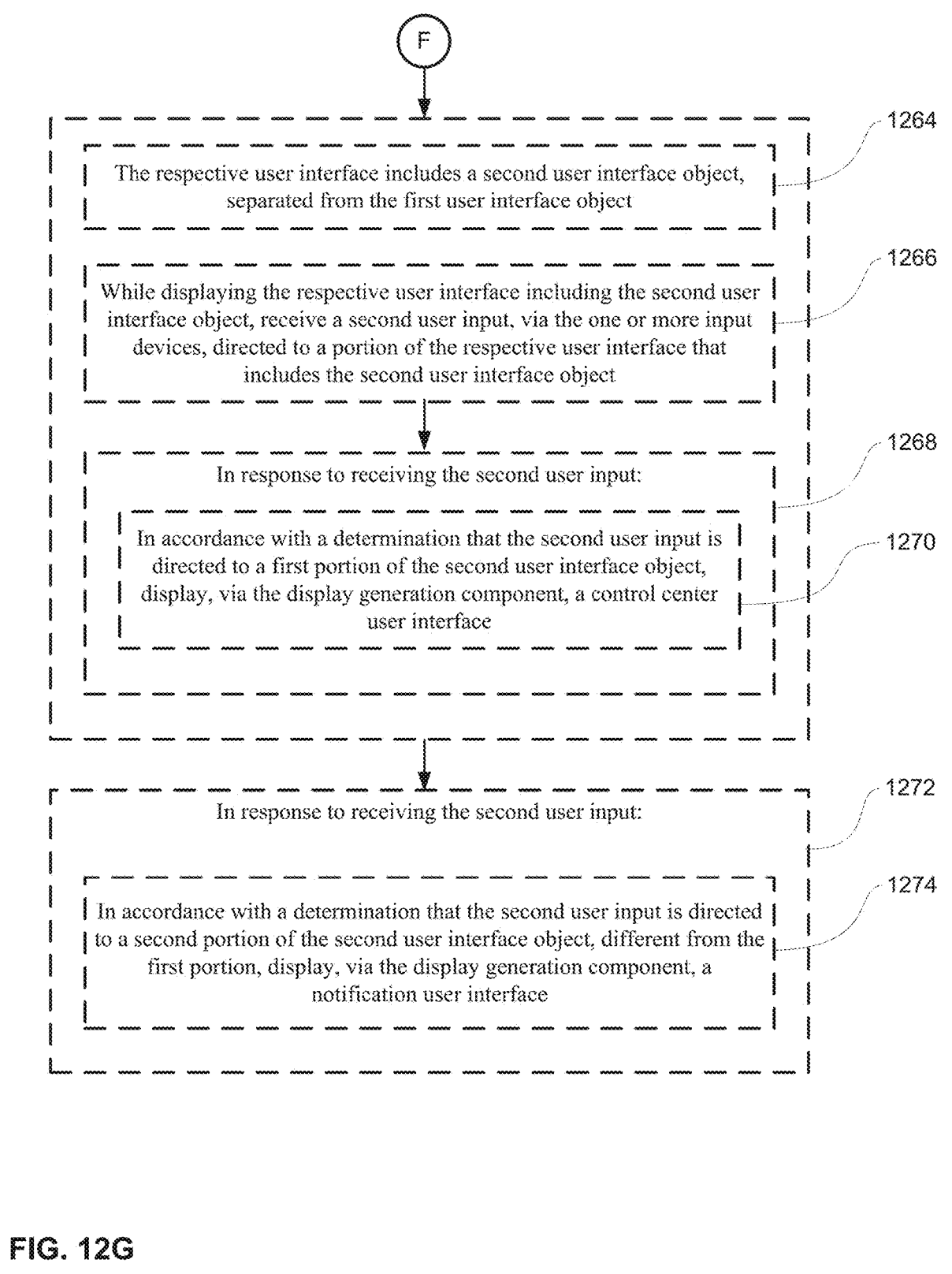

1264 The respective user interface includes a second user interface object, separated from the first user interface object 1266 While displaying the respective user interface including the second user interface object, receive a second user input, via the one or more input devices, directed to a portion of the respective user interface that includes the second user interface object 1268 In response to receiving the second user input:

1270 In accordance with a determination that the second user input is directed to a first portion of the second user interface object, display, via the display generation component, a control center user interface 1272 In response to receiving the second user input:

1274 In accordance with a determination that the second user input is directed to a second portion of the second user interface object, different from the first portion, display, via the display generation component, a notification user interface

FIG. 12G

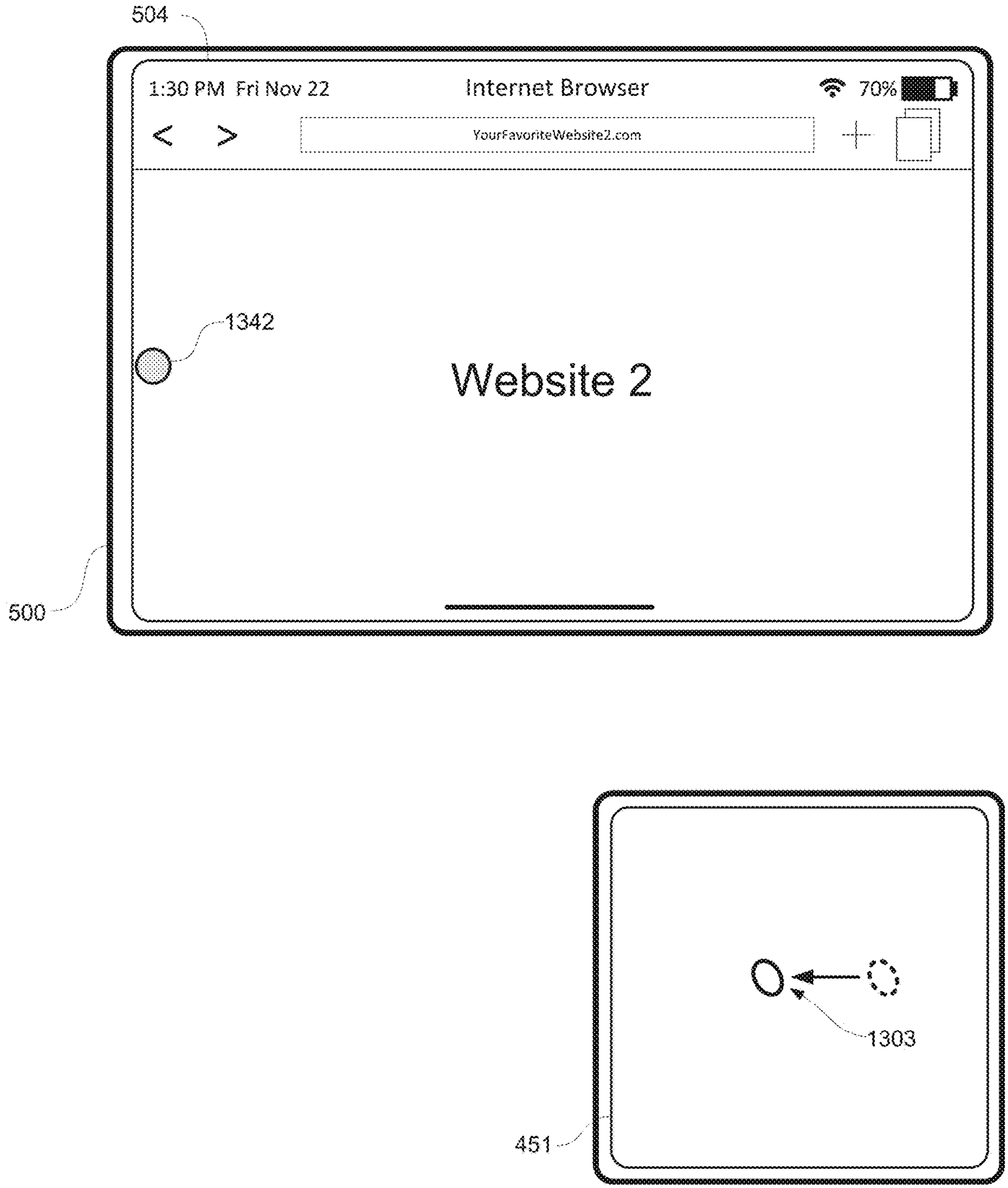
FIG. 13AAA

Figure 14D:
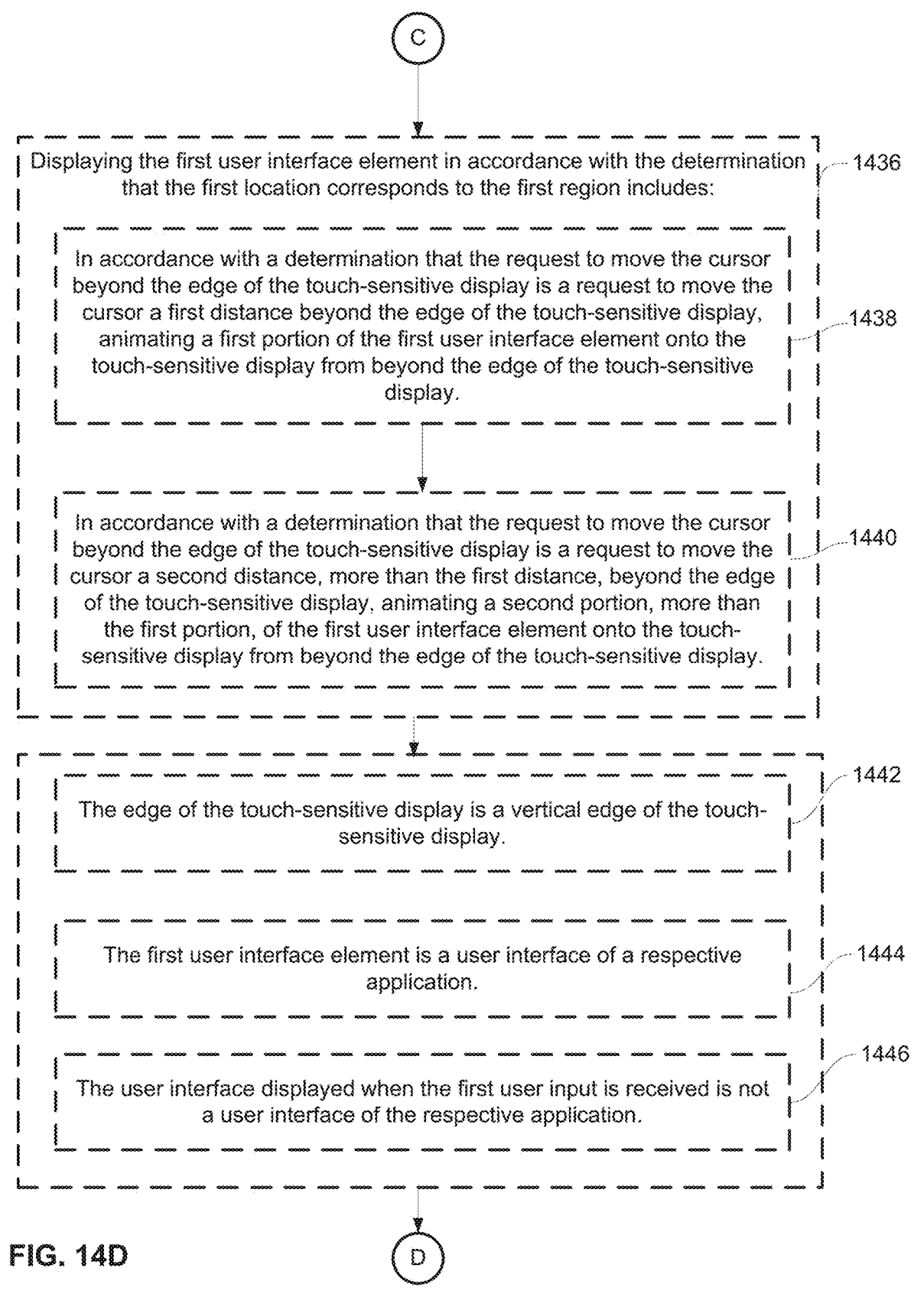

C

Displaying the first user interface element in accordance with the determination that the first location corresponds to the first region includes: 1436

In accordance with a determination that the request to move the cursor beyond the edge of the touch-sensitive display is a request to move the cursor a first distance beyond the edge of the touch-sensitive display, animating a first portion of the first user interface element onto the touch-sensitive display from beyond the edge of the touch-sensitive display. 1438

In accordance with a determination that the request to move the cursor beyond the edge of the touch-sensitive display is a request to move the cursor a second distance, more than the first distance, beyond the edge of the touch-sensitive display, animating a second portion, more than the first portion, of the first user interface element onto the touch-sensitive display from beyond the edge of the touch-sensitive display. 1440

The edge of the touch-sensitive display is a vertical edge of the touch-sensitive display. 1442

The first user interface element is a user interface of a respective application. 1444

The user interface displayed when the first user input is received is not a user interface of the respective application. 1446

Figure 14F:
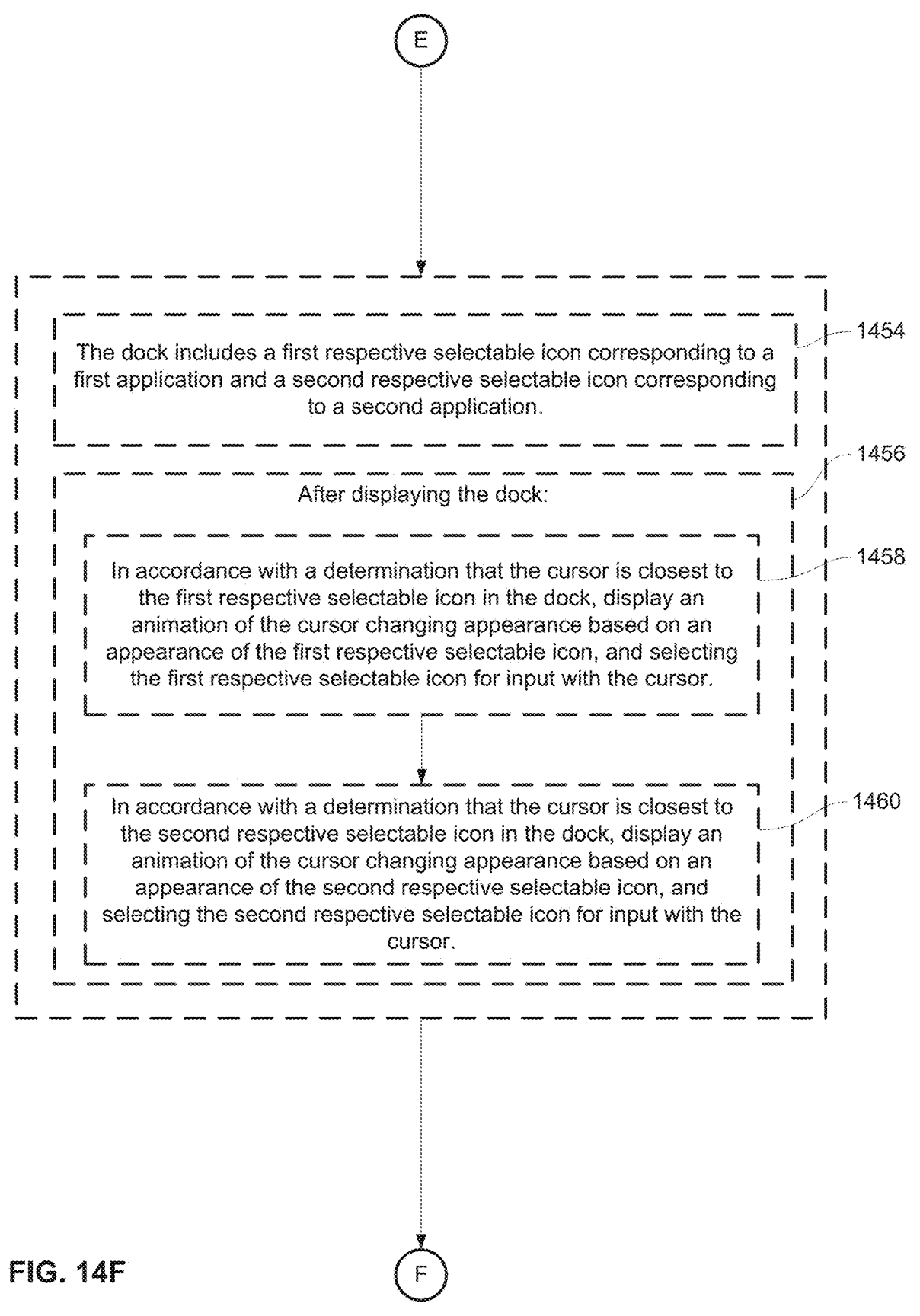

1454: The dock includes a first respective selectable icon corresponding to a first application and a second respective selectable icon corresponding to a second application.

1456: After displaying the dock:

1458: In accordance with a determination that the cursor is closest to the first respective selectable icon in the dock, display an animation of the cursor changing appearance based on an appearance of the first respective selectable icon, and selecting the first respective selectable icon for input with the cursor.

1460: In accordance with a determination that the cursor is closest to the second respective selectable icon in the dock, display an animation of the cursor changing appearance based on an appearance of the second respective selectable icon, and selecting the second respective selectable icon for input with the cursor.

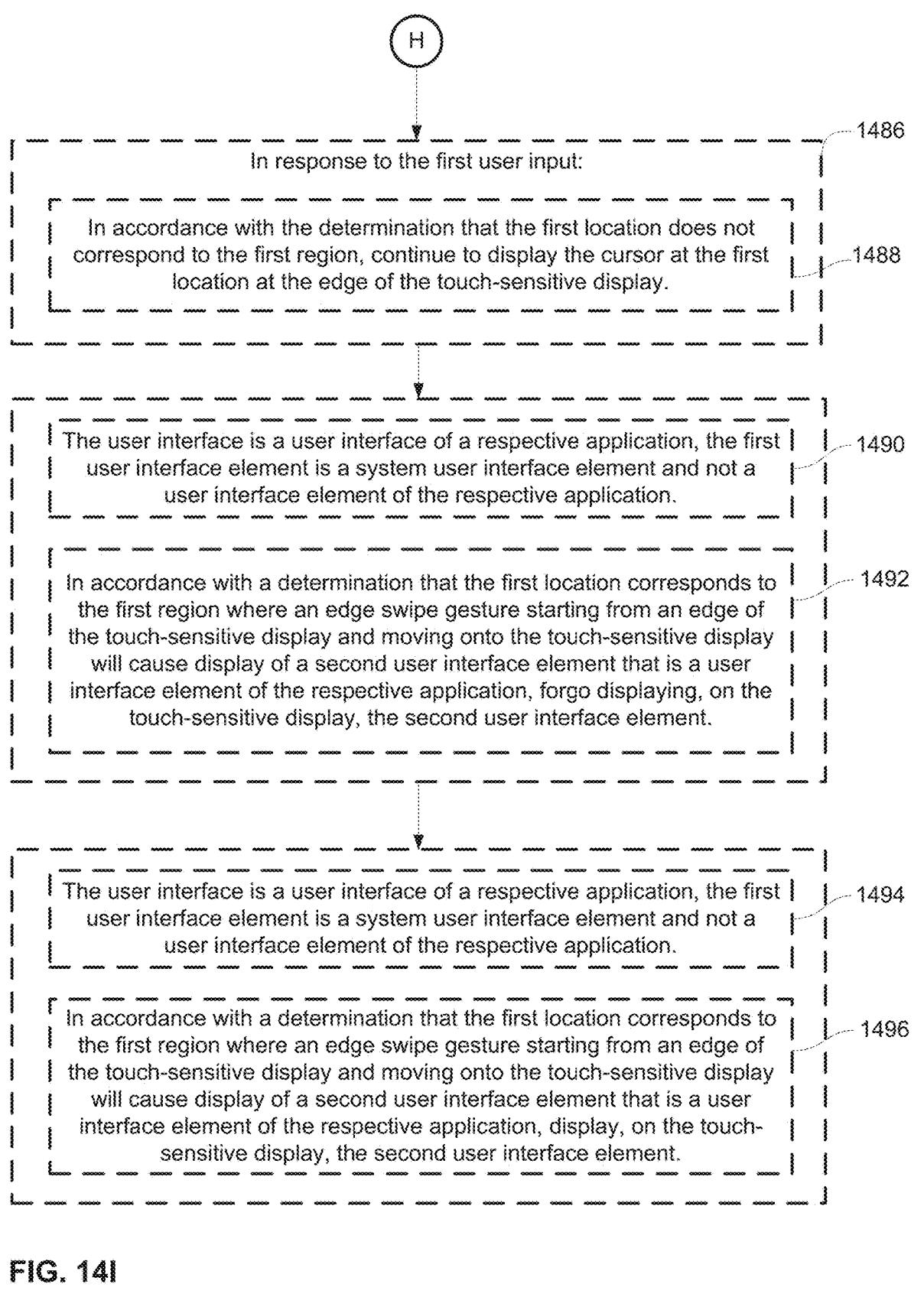

1486: In response to the first user input:

1488: In accordance with the determination that the first location does not correspond to the first region, continue to display the cursor at the first location at the edge of the touch-sensitive display.

1490: The user interface is a user interface of a respective application, the first user interface element is a system user interface element and not a user interface element of the respective application.

1492: In accordance with a determination that the first location corresponds to the first region where an edge swipe gesture starting from an edge of the touch-sensitive display and moving onto the touch-sensitive display will cause display of a second user interface element that is a user interface element of the respective application, forgo displaying, on the touch-sensitive display, the second user interface element.

1494: The user interface is a user interface of a respective application, the first user interface element is a system user interface element and not a user interface element of the respective application.

1496: In accordance with a determination that the first location corresponds to the first region where an edge swipe gesture starting from an edge of the touch-sensitive display and moving onto the touch-sensitive display will cause display of a second user interface element that is a user interface element of the respective application, display, on the touch-sensitive display, the second user interface element.

FIG. 14I

CURSOR INTEGRATION WITH A TOUCH SCREEN USER INTERFACE

CROSS-REFERENCE TO RELATED APPLICATION

This application claims the benefit of U.S. Provisional Application No. 62/969,328, filed Feb. 3, 2020, which is hereby incorporated by reference in its entirety for all purposes.

FIELD OF THE DISCLOSURE

This relates generally to electronic devices that display cursors in a touch screen user interface.

BACKGROUND

User interaction with electronic devices has increased significantly in recent years. These devices can be devices such as computers, tablet computers, televisions, multimedia devices, mobile devices, and the like.

In some circumstances, users wish to interact with objects in a user interface on an electronic device. In some circumstances, users wish to use a cursor or other pointing indicator to direct the user inputs, even for devices with touch screens, thus enhancing the user's interaction with the device. Enhancing these interactions improves the user's experience with the device and decreases user interaction time, which is particularly important where input devices are battery-operated.

SUMMARY

Some embodiments described in this disclosure are directed to a cursor interacting with user interface objects on an electronic device. Some embodiments described in this disclosure are directed to selectively displaying a cursor in a user interface. Some embodiments of the disclosure are directed to displaying a cursor while manipulating objects in the user interface. Some embodiments of the disclosure are directed to dismissing or switching applications using a cursor. Some embodiments of the disclosure are directed to ways an electronic device displays user interface elements in response to requests to move a cursor beyond an edge of the display.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7M are flow diagrams illustrating a method in which a cursor interacts with user interface objects in accordance with some embodiments.

FIGS. 12A-12G are flow diagrams illustrating a method of dismissing or switching applications using a cursor in accordance with some embodiments.

FIGS. 14A-14I are flow diagrams illustrating a method of displaying user interface elements in response to user inputs corresponding to requests to move the cursor beyond the edge of a touch screen according to some embodiments of the disclosure.

DETAILED DESCRIPTION

Figure 1A:
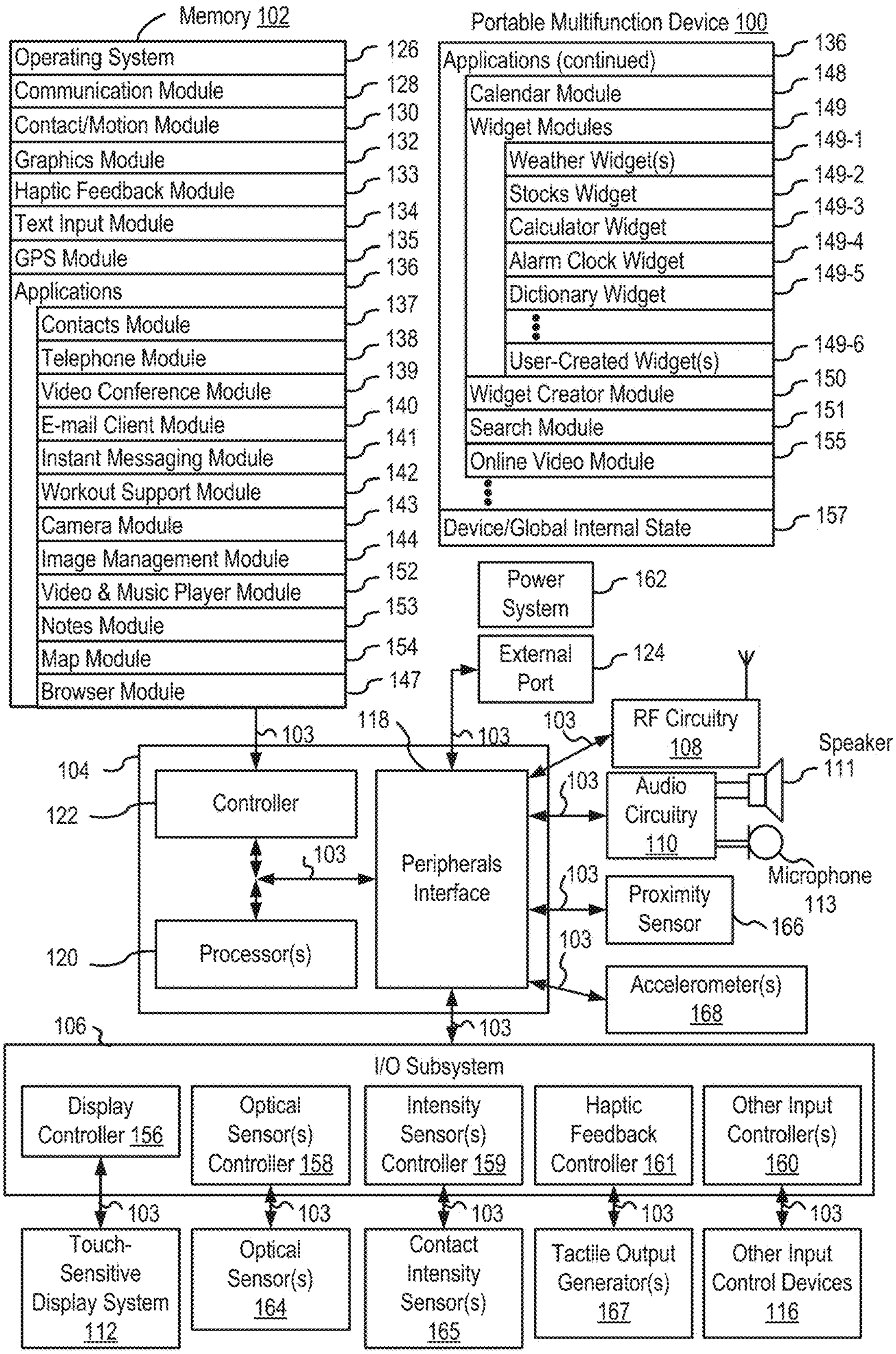
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient touch screen and cursor input interaction techniques. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
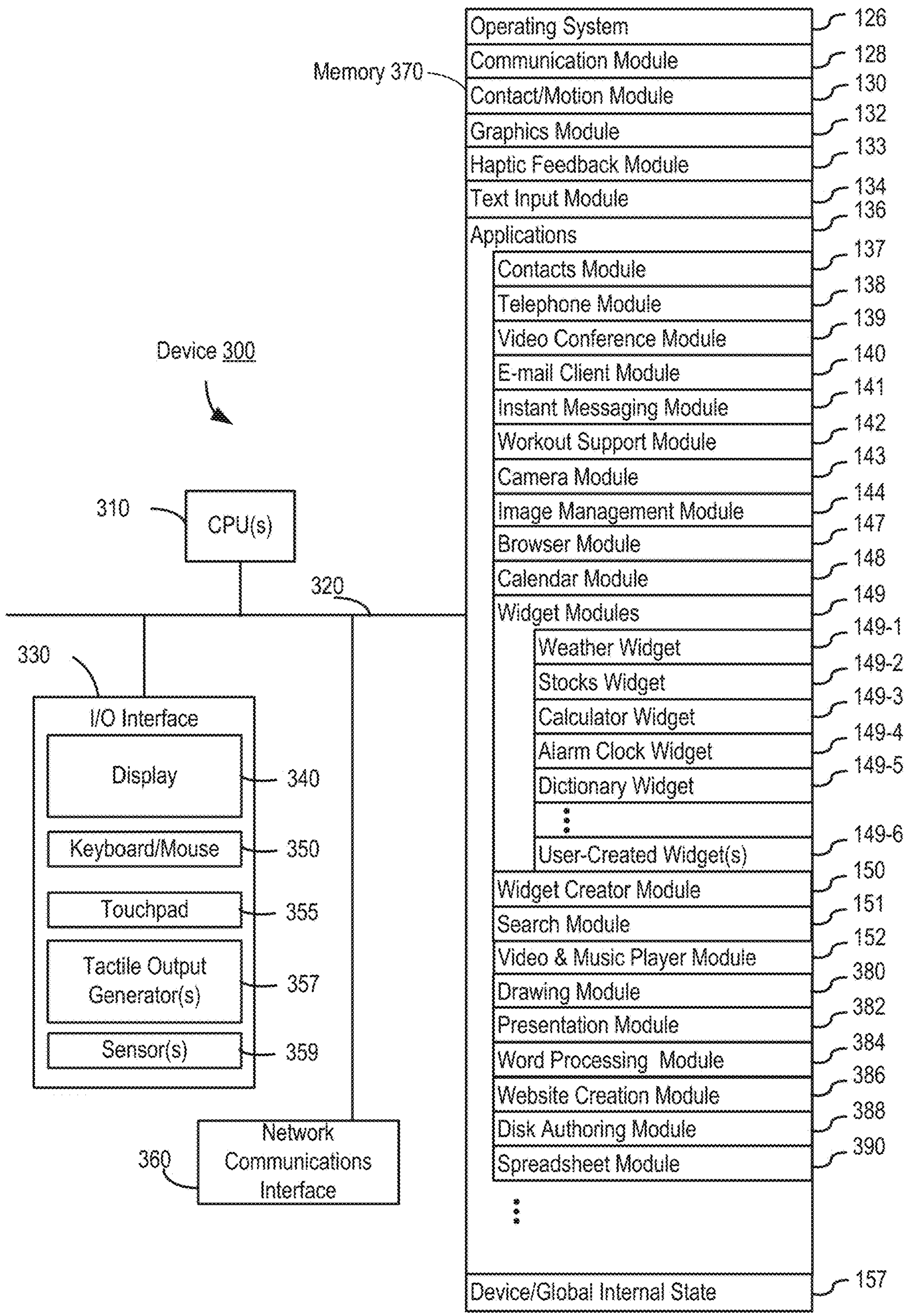
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
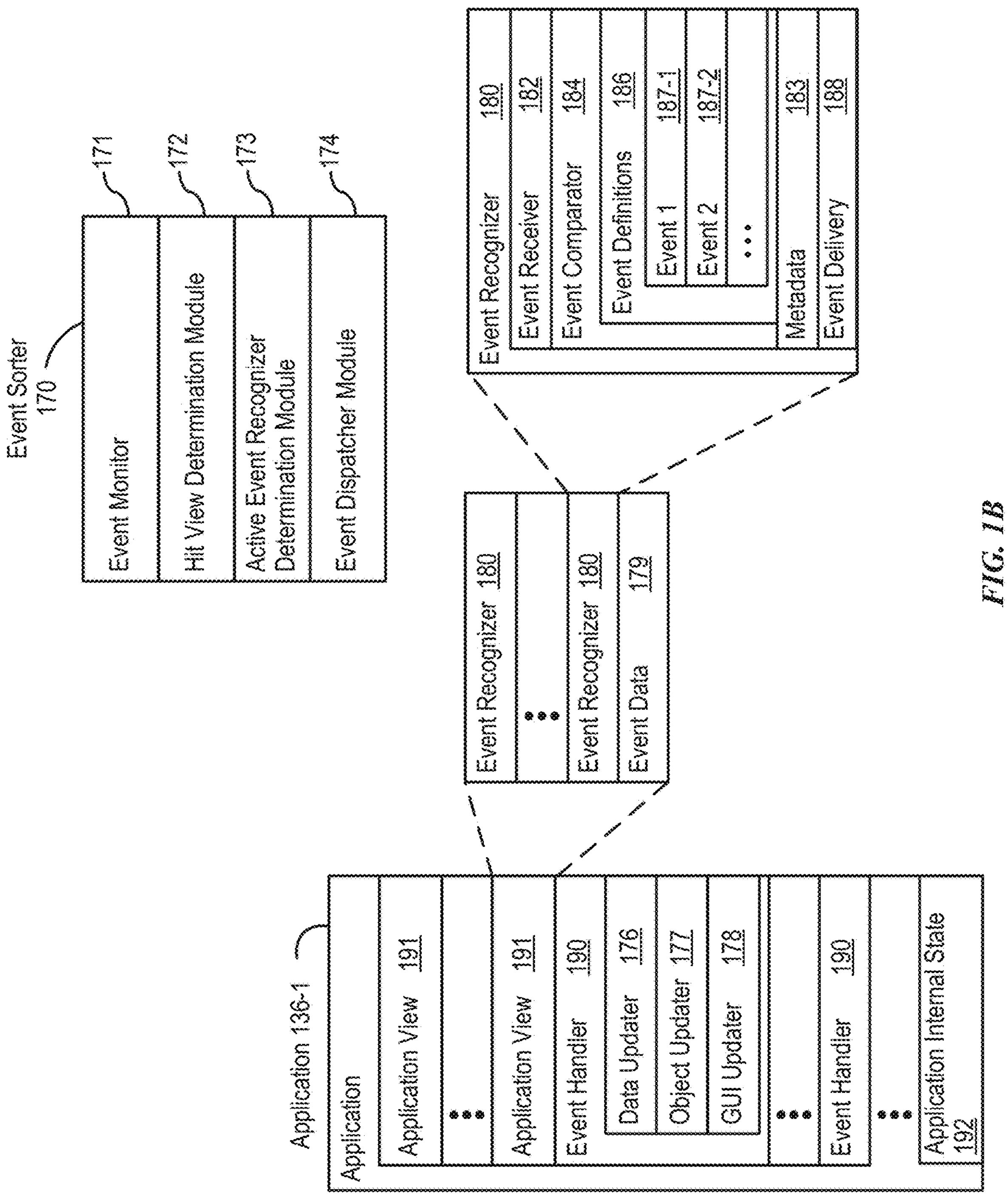
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
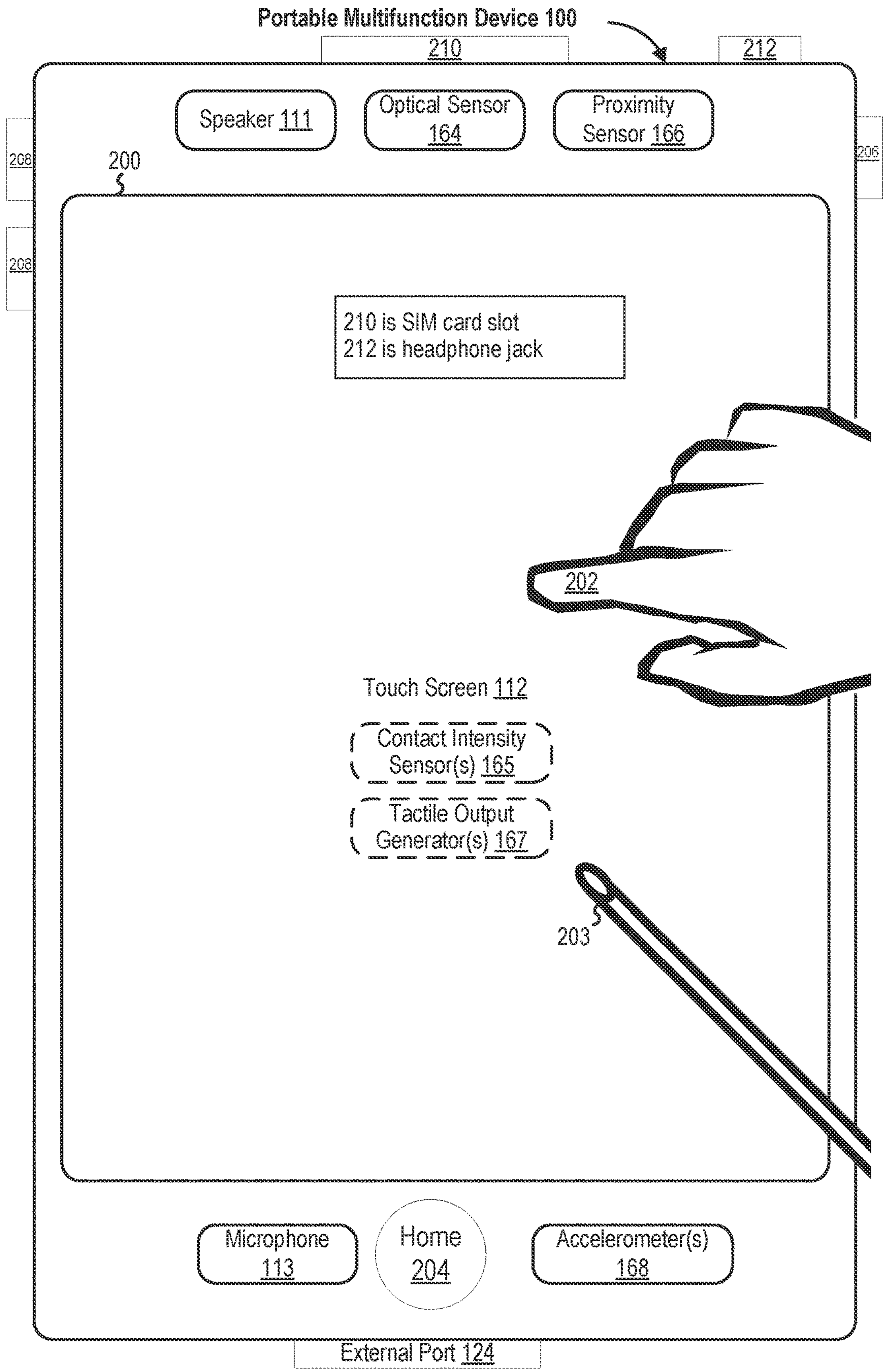
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
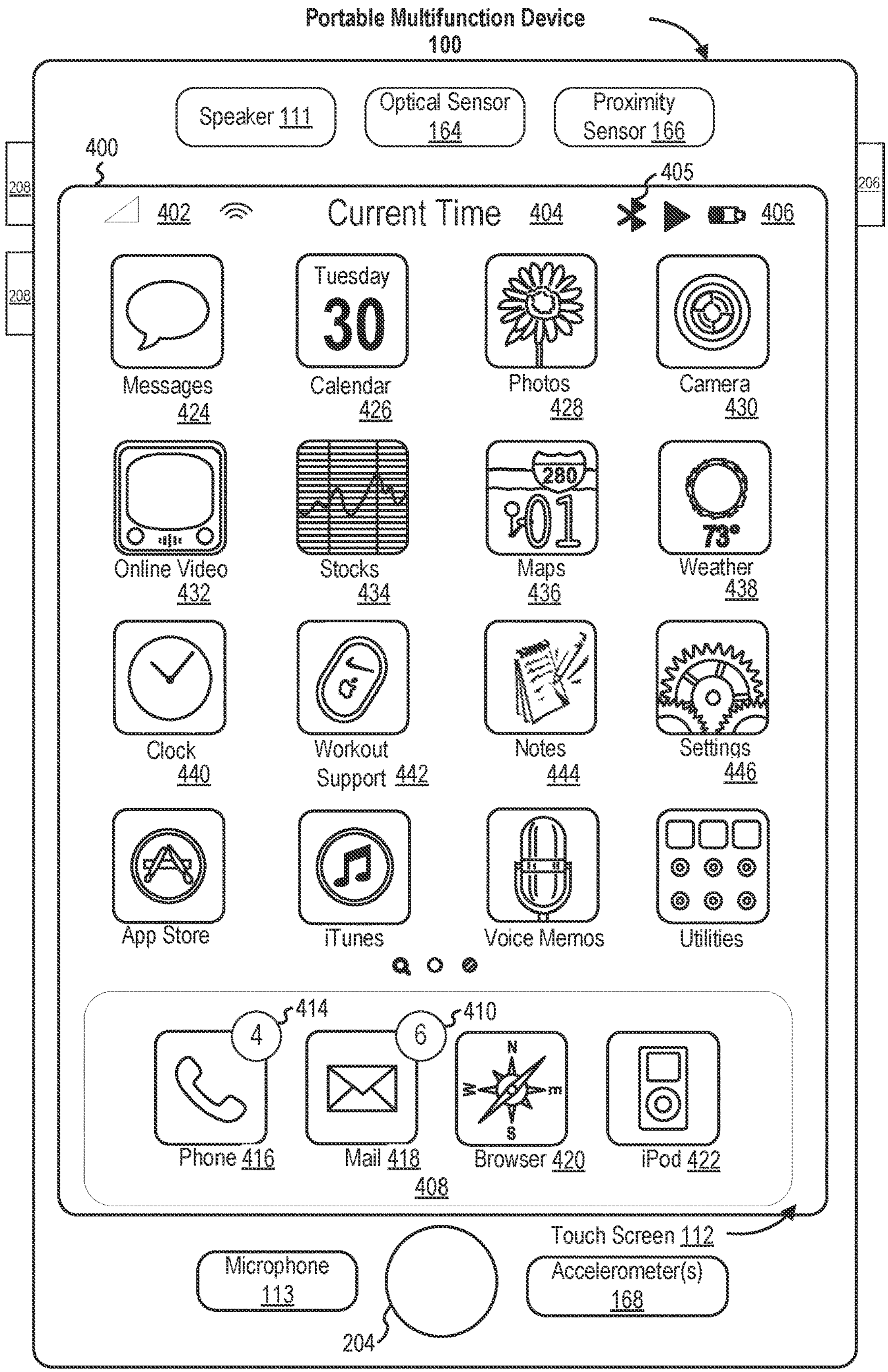
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
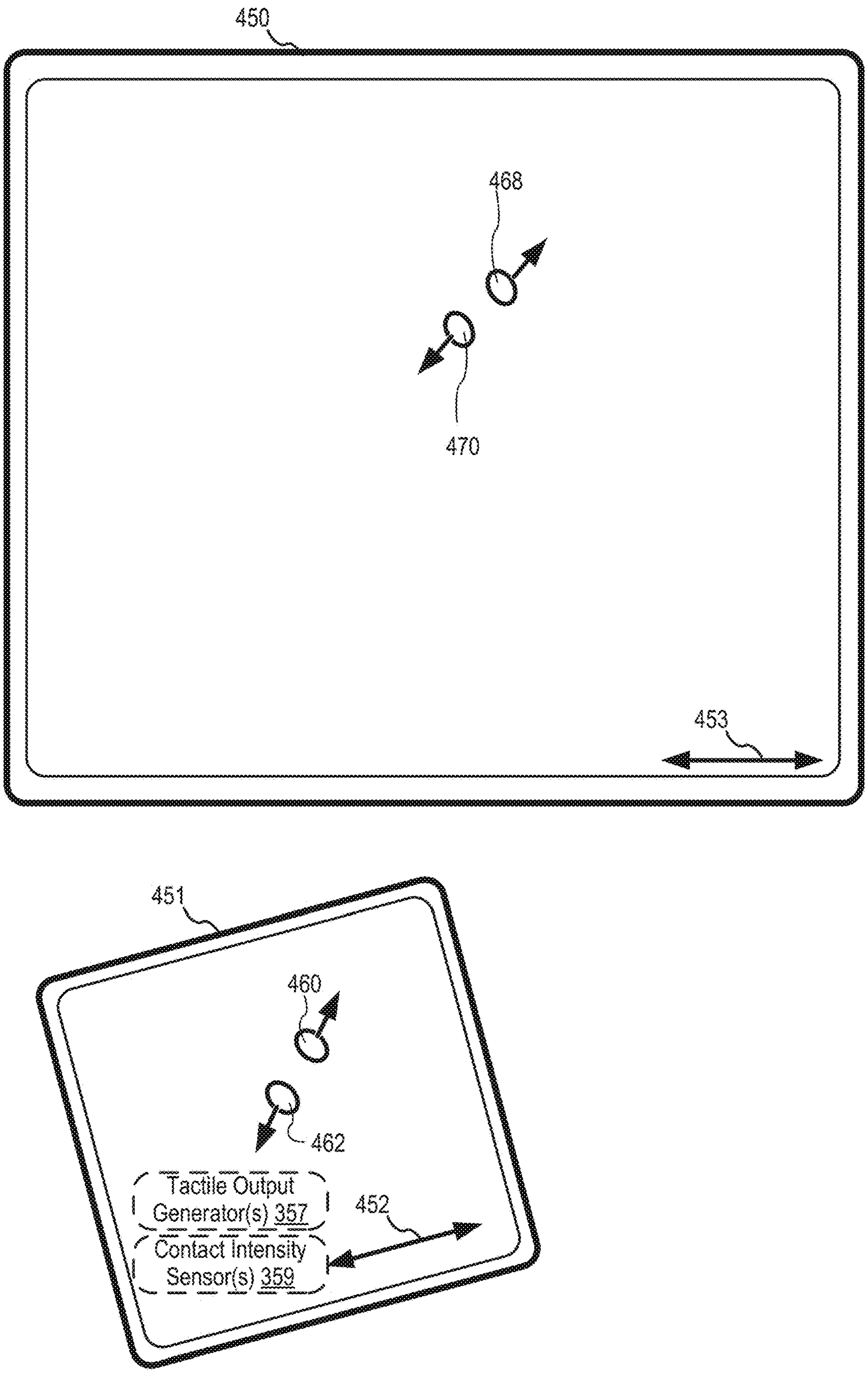
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
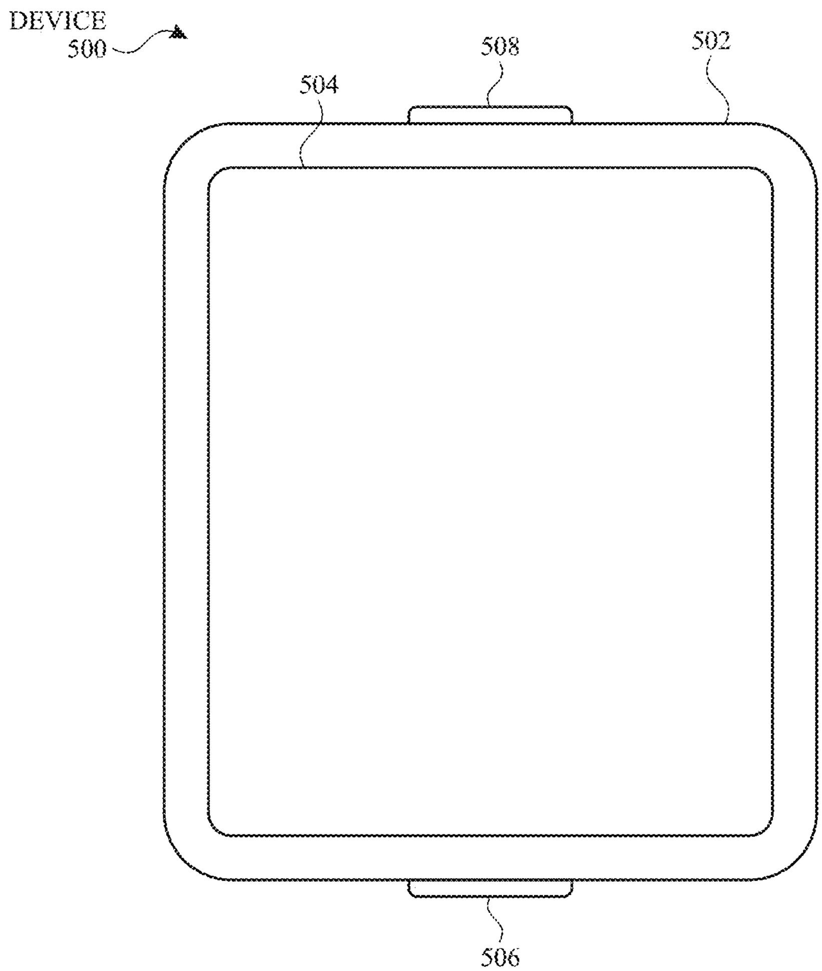
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
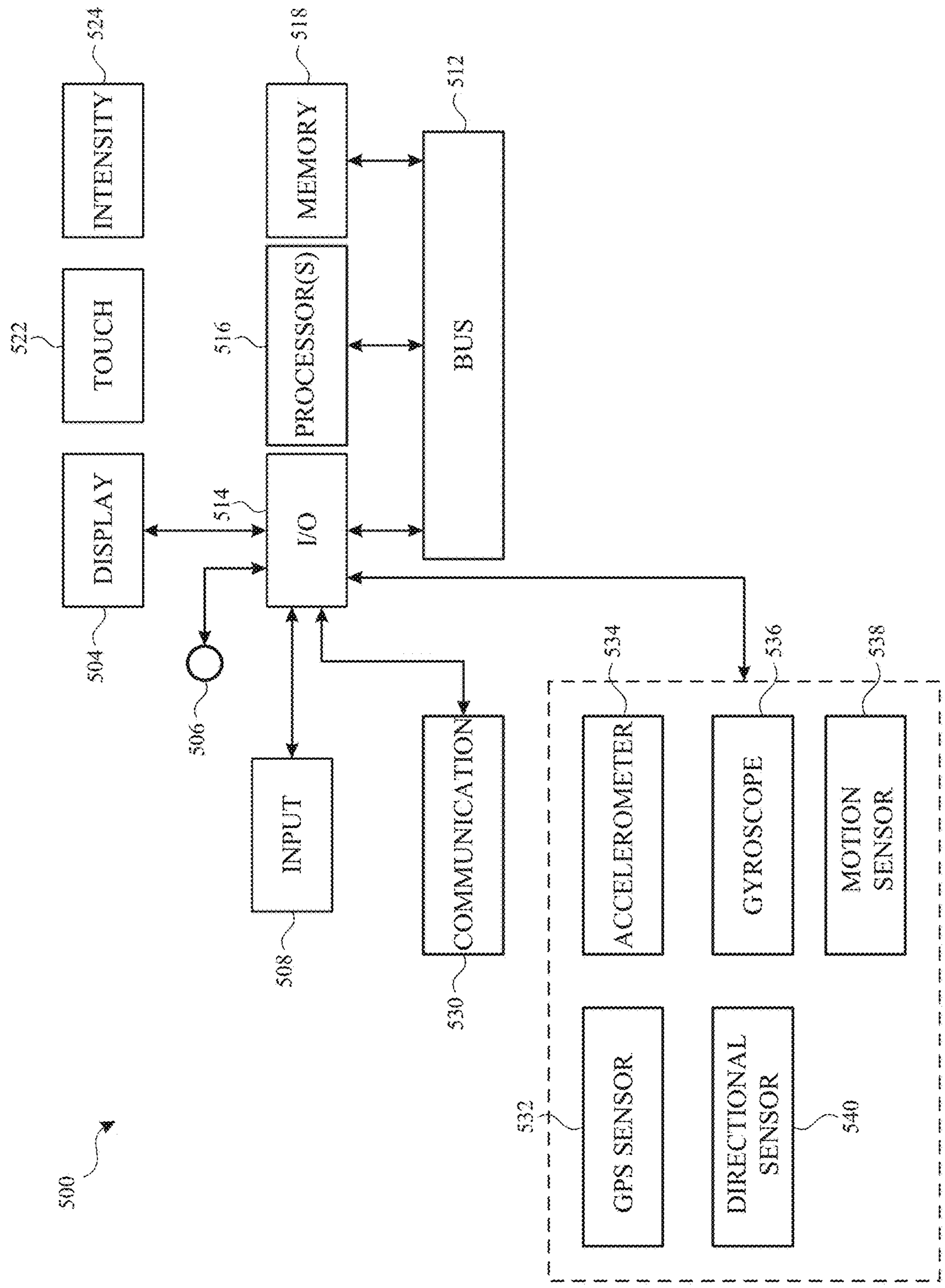
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1200 and 1400 (FIGS. 7, 8, 10, 12, and 14). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
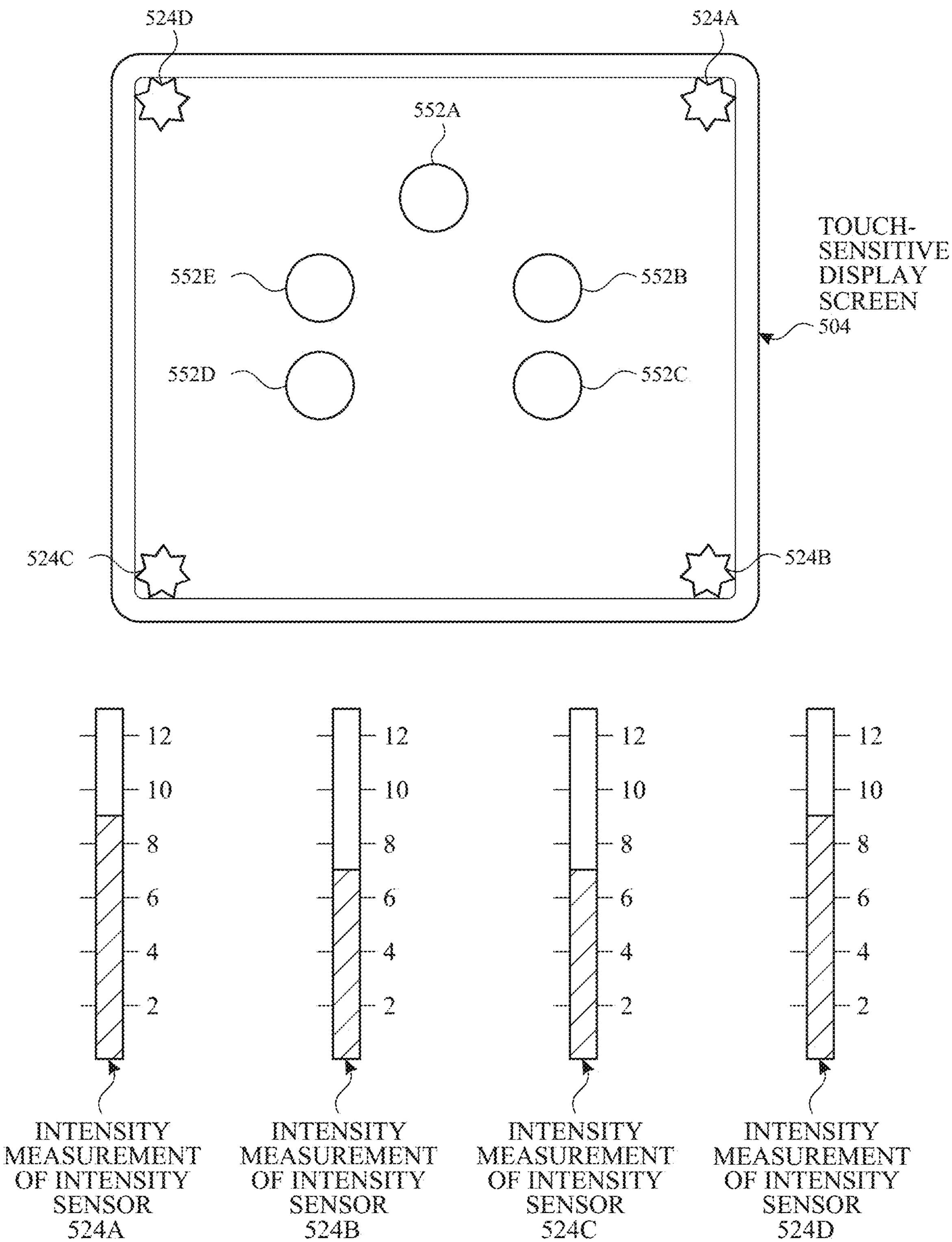
FIGS. 5C-5D illustrate exemplary components of a personal electronic device having a touch-sensitive display and intensity sensors in accordance with some embodiments.
Figure 5D:
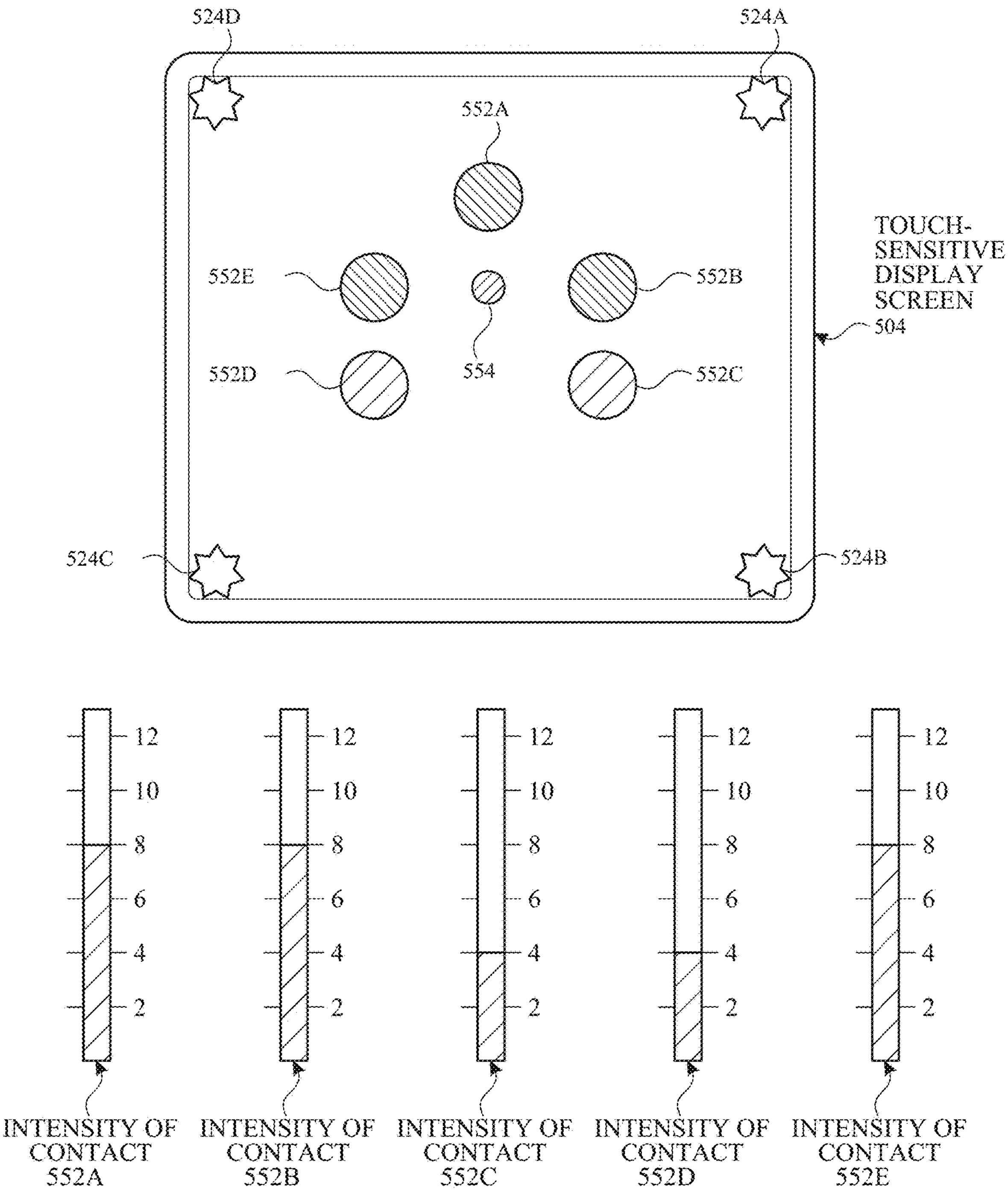

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
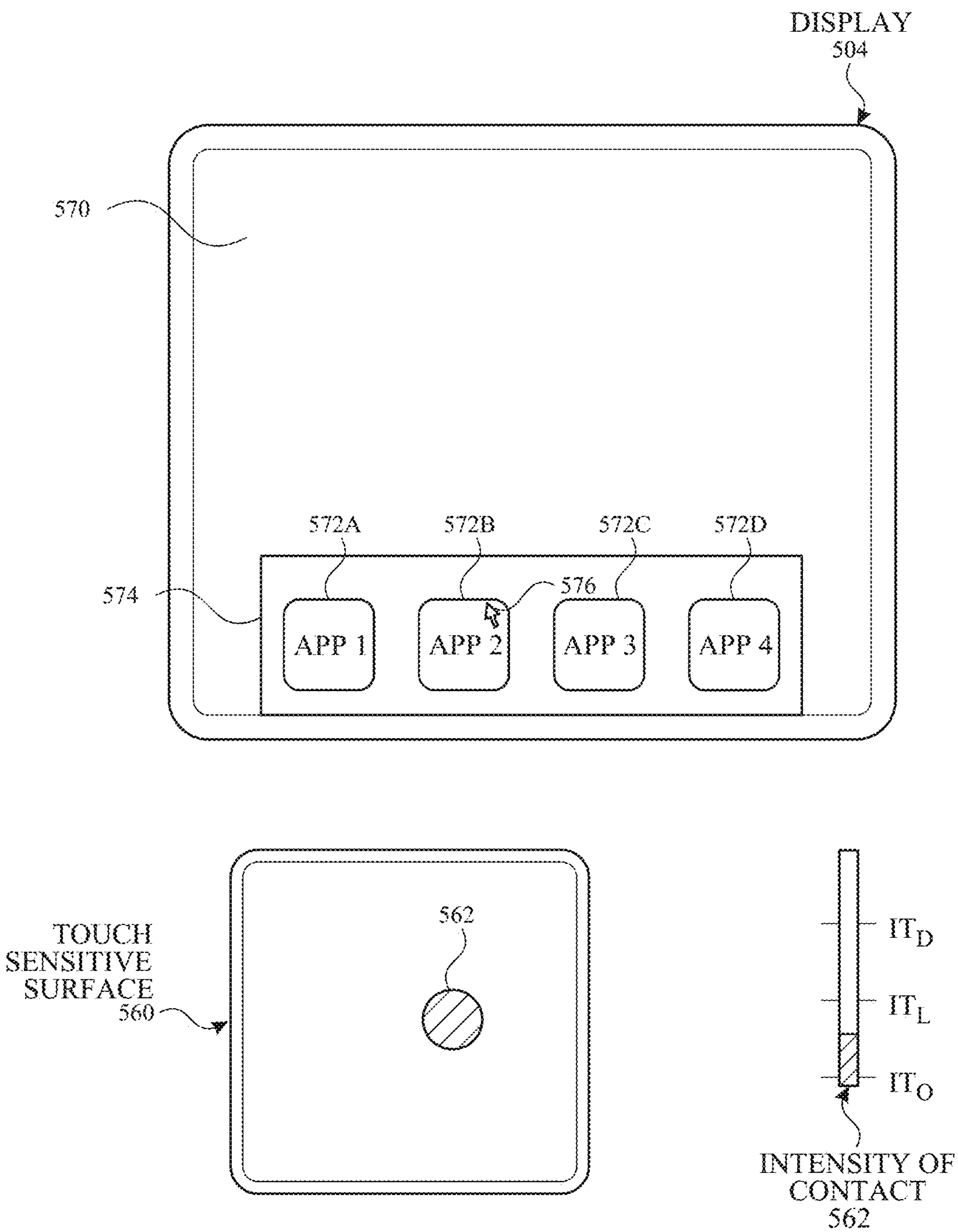
FIGS. 5E-5H illustrate exemplary components and user interfaces of a personal electronic device in accordance with some embodiments.
Figure 5F:
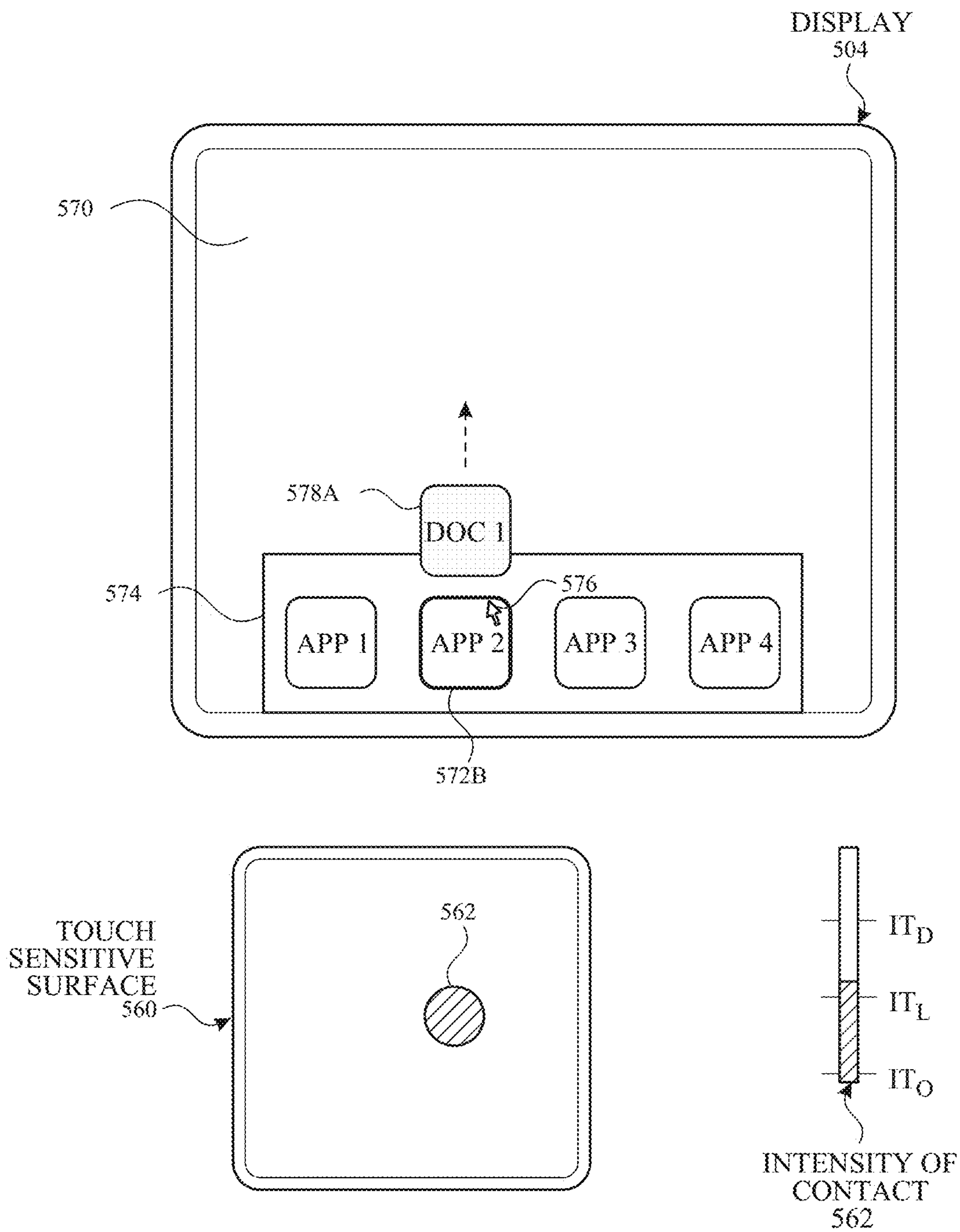
Figure 5G:
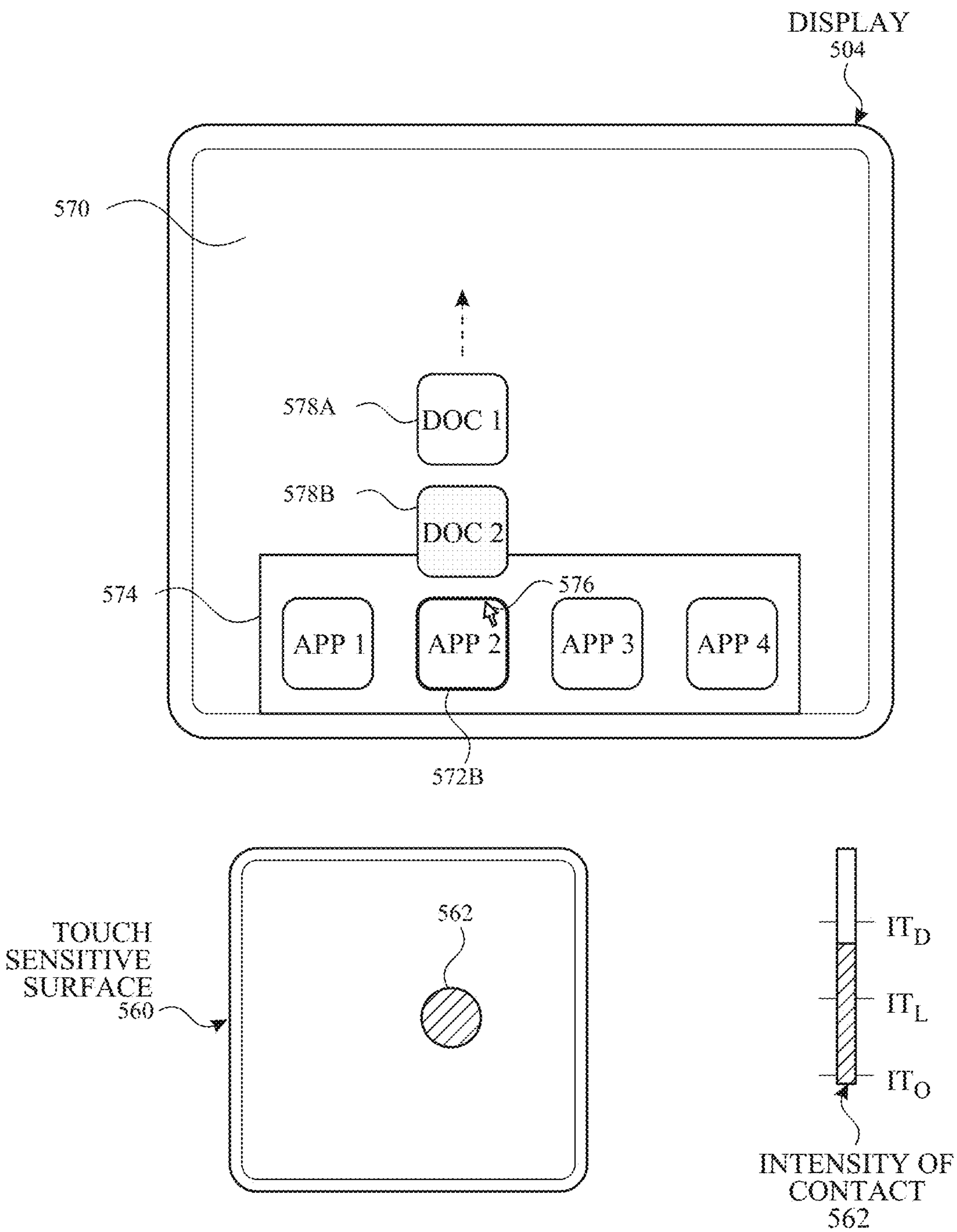
Figure 5H:
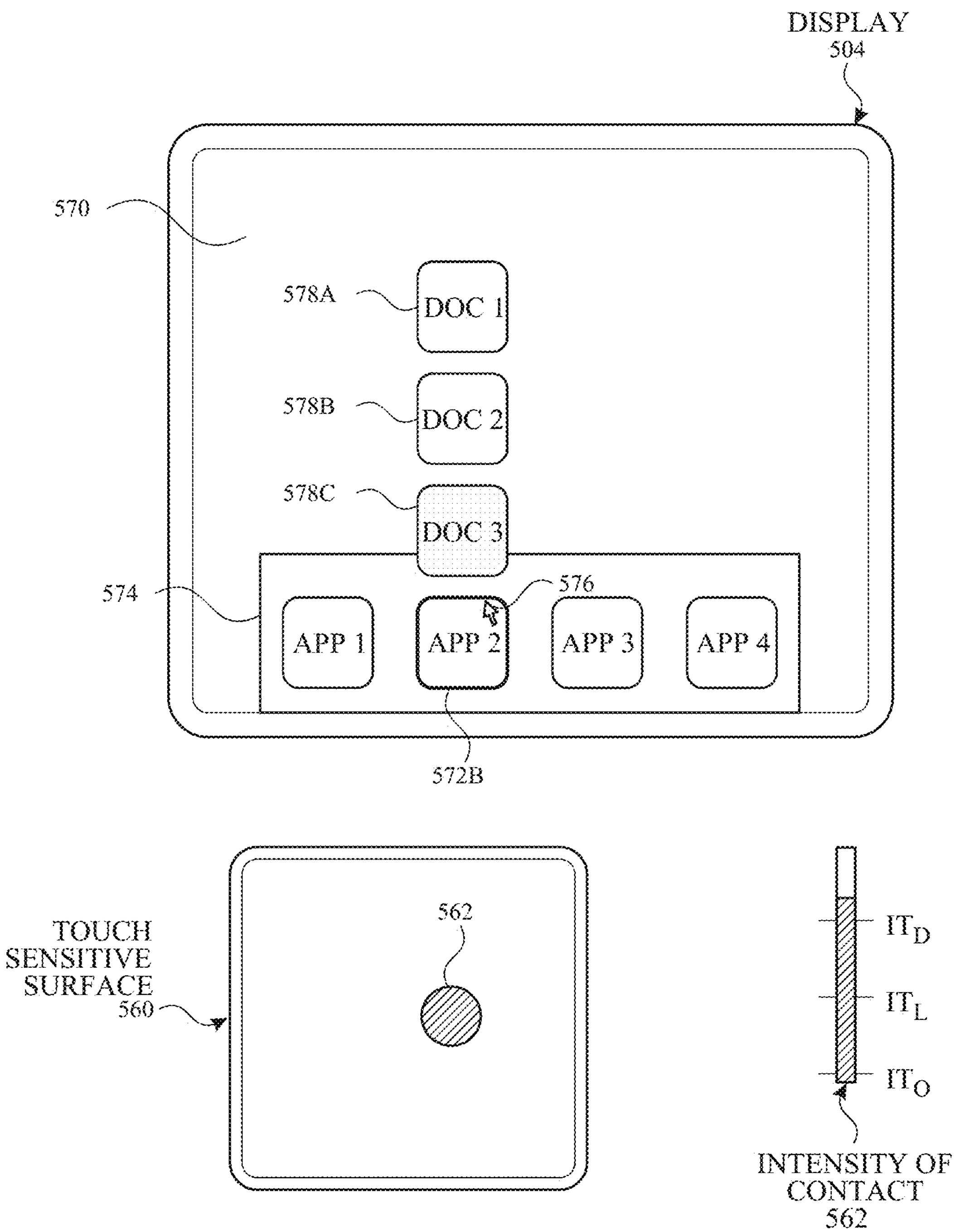

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5I. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
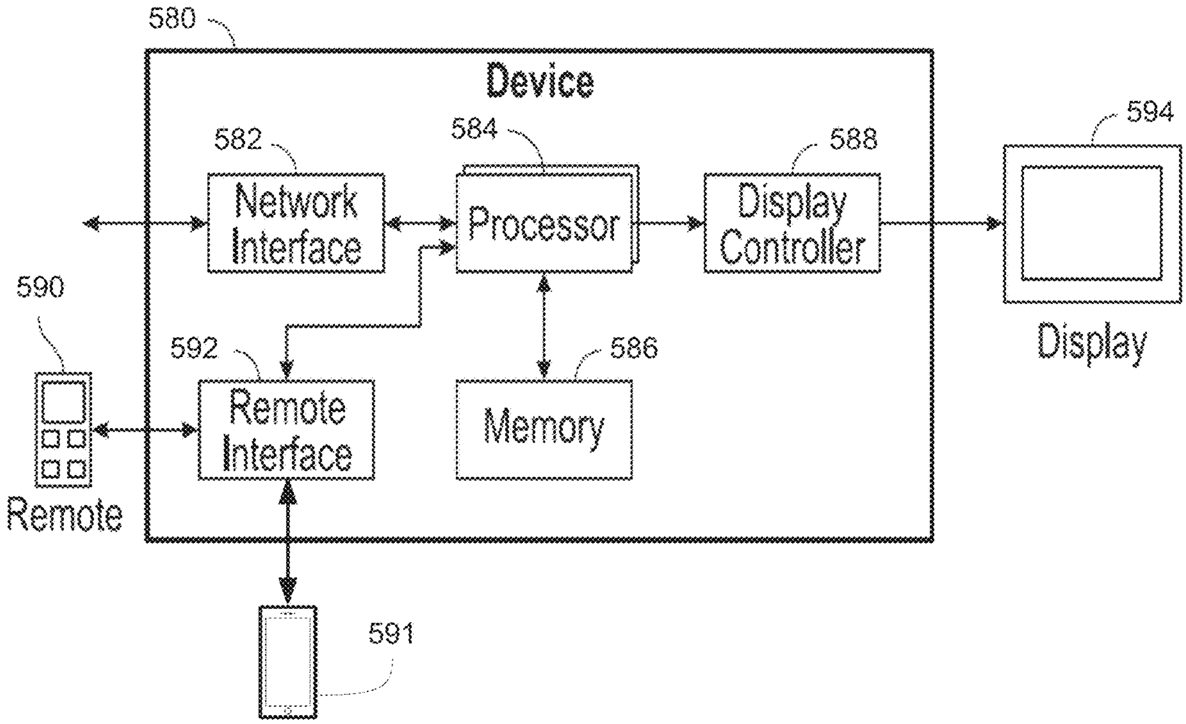
FIG. 5I illustrates a block diagram of an exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 800, 1000, 1200 and 1400).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

Figure 5J:
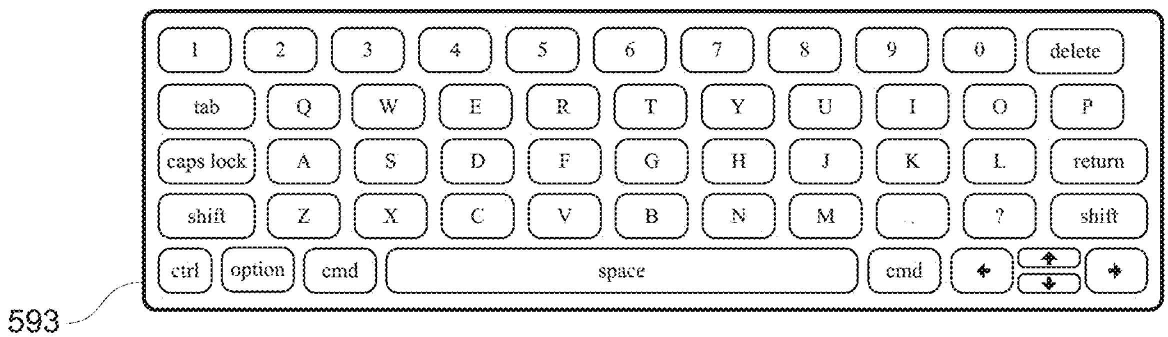
FIG. 5J illustrates a keyboard device according to some embodiments of the disclosure.

FIG. 5J illustrates a keyboard device 593 according to some embodiments of the disclosure. In some embodiments, keyboard device 593 is an input device that is capable of wired or wireless communication with an electronic device (e.g., such as device 500). In some embodiments, keyboard device 593 is an external keyboard device (e.g., discrete from the device with which it communicates). In some embodiments, keyboard device 593 is an integrated keyboard device (e.g., integrated with the device with which it communicates). In some embodiments, keyboard device 593 attaches to the device with which it communicates. As shown in FIG. 5J, keyboard device 593 include one or more keys corresponding to letters, numbers, and/or other commands (e.g., navigation keys, enter keys, backspace keys, function keys, etc.). In some embodiments, activating a respective key causes the insertion of the respective character or causes the execution of a respective function.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Cursor Interactions with User Interface Objects

Users interact with electronic devices in many different manners, including selecting objects in a user interface displayed by the electronic device. In some embodiments, an electronic device provides a cursor in the user interface, which is controllable by the user, and allows a user to select objects of interest. The embodiments described below provide ways in which a cursor responds to user inputs and interacts with objects in the user interface, including user interfaces that also respond to direct touch inputs, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6DW illustrate exemplary ways in which a cursor interacts with user interface objects in a user interface on an electronic device. The embodiments in these figures are used to illustrate the processes described below, including the processes described with reference to FIGS. 7A-7M and/or FIGS. 8A-8O.

Figure 6A:
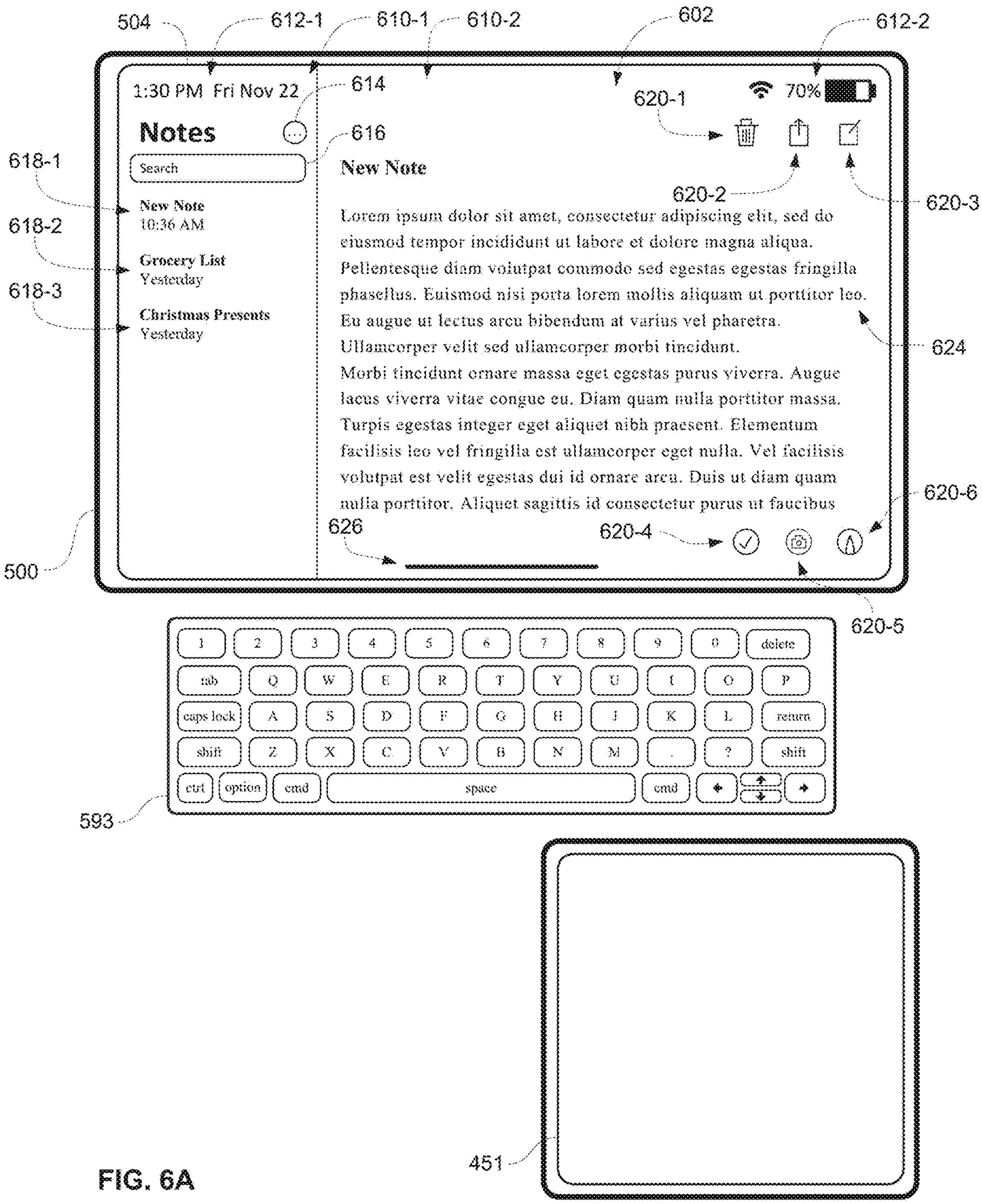
FIGS. 6A-6DW illustrate exemplary ways in which a cursor interacts with user interface objects on an electronic device in accordance with some embodiments.

FIG. 6A illustrates an exemplary device 500 that is capable of displaying a user interface. In some embodiments, the user interface is displayed via a display generation component. In some embodiments, the display generation component is a hardware component (e.g., including electrical components) capable of receiving display data and displaying a user interface. In some embodiments, examples of a display generation component include a touch screen display, a monitor, a television, a projector, an integrated, discrete, or external display device, or any other suitable display device.

As shown in FIG. 6A, the electronic device 500 presents user interface 602 on touch screen 504. In some embodiments, user interface 602 is any user interface with one or more interactable user interface objects. An interactable user interface object is optionally any object or element that a user is able to select, move, click, drag, highlight, insert text into, or otherwise interact with in any way. In FIG. 6A, user interface 602 is of a note taking application. In some embodiments, the note taking application includes a first section 610-1 corresponding to a note browsing and selection sidebar and a second section 610-2 corresponding to a content viewing and entry interface. In some embodiments, first section 610-1 includes a contextual menu button 614, a search field 616, and one or more saved notes 618-1 to 618-3. In some embodiments, second section 610-2 includes content viewing and entry region 624, and one or more buttons 620-1 to 620-6 for performing one or more functions associated with the note taking application, such as deleting the note, sharing the note, inserting photos, changing writing modes, etc. In some embodiments, user interface 602 includes status indicator 612-1 and 612-2. Status indicator 612-1 optionally is located at the top-left of the user interface and displays the current time and date. Status indicator 612-2 optionally is located at the top-right of the user interface and displays the network connectivity status of the device and/or the battery status of the device. It is understood that status indicators 612-1 and 612-2 can include fewer indicators than those shown or more indicators than those shown. In some embodiments, user interface 602 includes home affordance 626 for dismissing the currently displayed application and displaying either a home screen user interface or an application switching user interface as will be described in more detail below with respect to method 1200.

In FIG. 6A, electronic device 500 is in communication with external keyboard 593 and external touch-sensitive surface 451. In some embodiments, electronic device 500 is in wired or wireless communication with external keyboard 593 and external touch-sensitive surface 451. In some embodiments, electronic device 500 is in communication with more or fewer input devices, either integrated with electronic device 500 or external to the device.

Figure 6B:
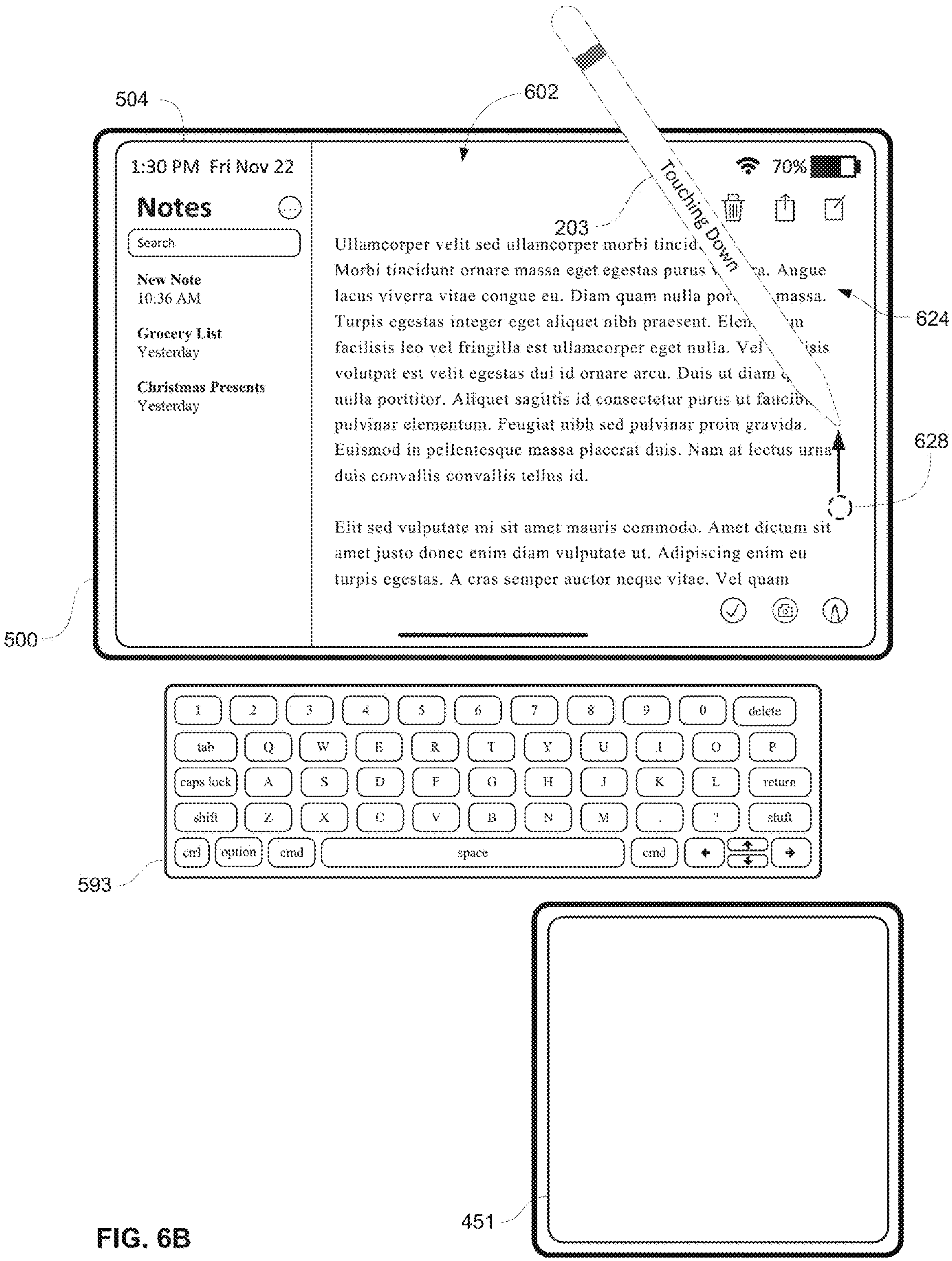

In FIG. 6B, a swipe gesture is received on the touch screen 504 from stylus 203, swiping upward from initial contact location 628. As shown in FIG. 6B, in response to the upward swipe gesture, the contents of user interface 602 are scrolled upwards based on the upward swipe input. For example, content preview and entry region 624 is scrolled upwards to reveal further rows of content (and optionally cause other rows of content to be scrolled off the user interface). In some embodiments, a similar upward swipe gesture from a finger or other pointer device received on touch screen 504 causes the user interface to be scrolled.

Figure 6C:
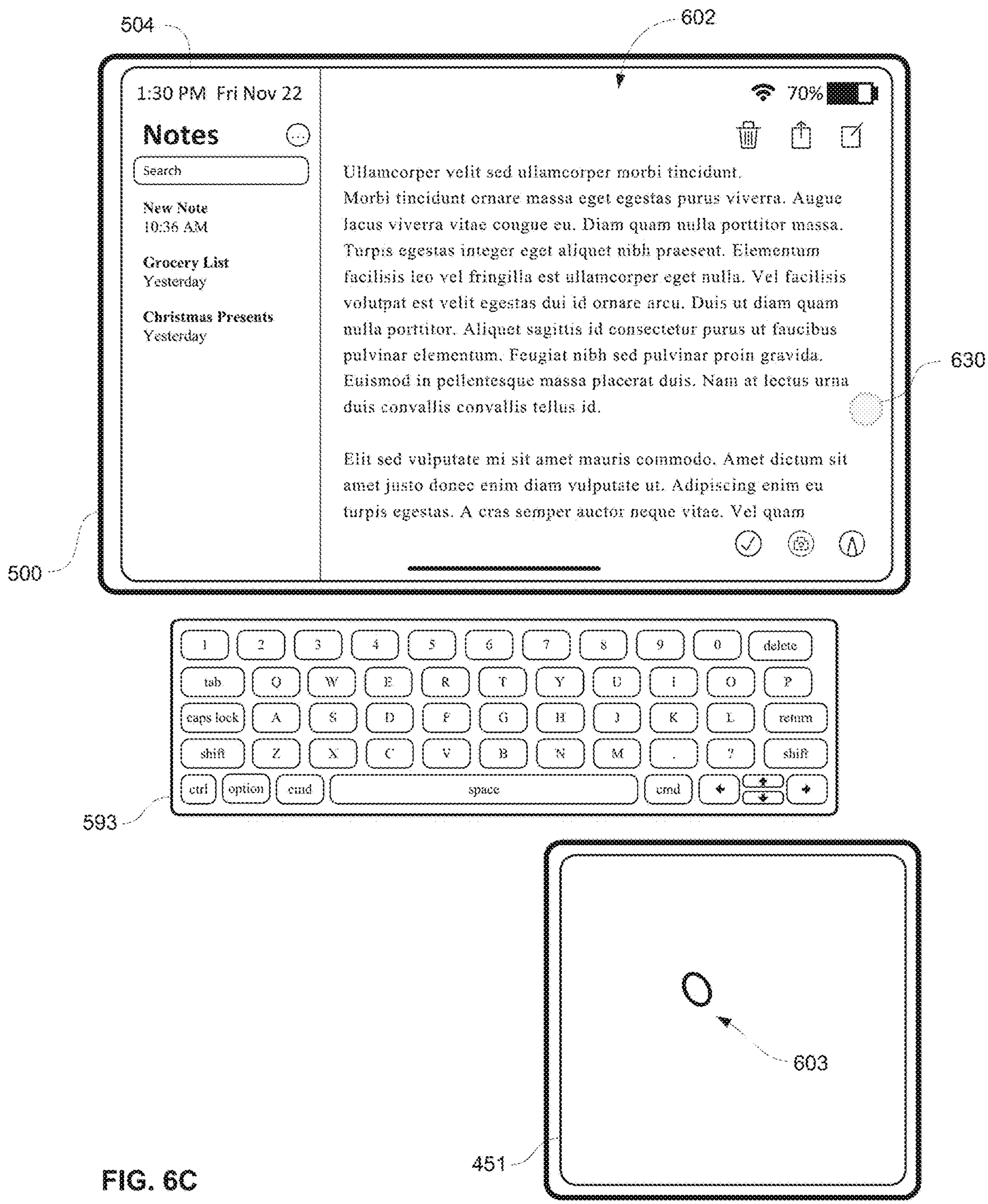

In FIG. 6C, a contact 603 is received on a touch-sensitive surface 451. As described above, touch-sensitive surface 451 is optionally a touch-sensitive surface of an external touchpad device, a remote control device with a touch-sensitive surface, a mobile device with a touch-sensitive surface, or any other device with a touch-sensitive surface. It is understood that although the disclosure herein describes user inputs on a touch-sensitive surface and the device's response to such inputs, the device is optionally able to respond similarly to inputs from an external pointing device such as a mouse.

In some embodiments, in response to detecting contact 603 on touch-sensitive surface 451, electronic device 500 begins display of cursor 630, as shown in FIG. 6C. As shown in FIG. 6C, the device optionally displays the cursor fading into view. For example, in FIG. 6D, cursor 630 is fading in and more visible (e.g., less translucent) than cursor 630 in FIG. 6D. In FIG. 6E, cursor 630 is fully displayed (e.g., done fading in, displayed at its final translucency). In some embodiments, cursor 630 has a default size, shape, translucency, and/or color, any of which changes, as will be described in more detail below. In some embodiments, the default shape of cursor 630 is a circle and the default color is grey. In some embodiments, cursor 630 is partially transparent (e.g., translucent) such that the content over which the cursor is overlaid is partially visible.

Figure 6D:
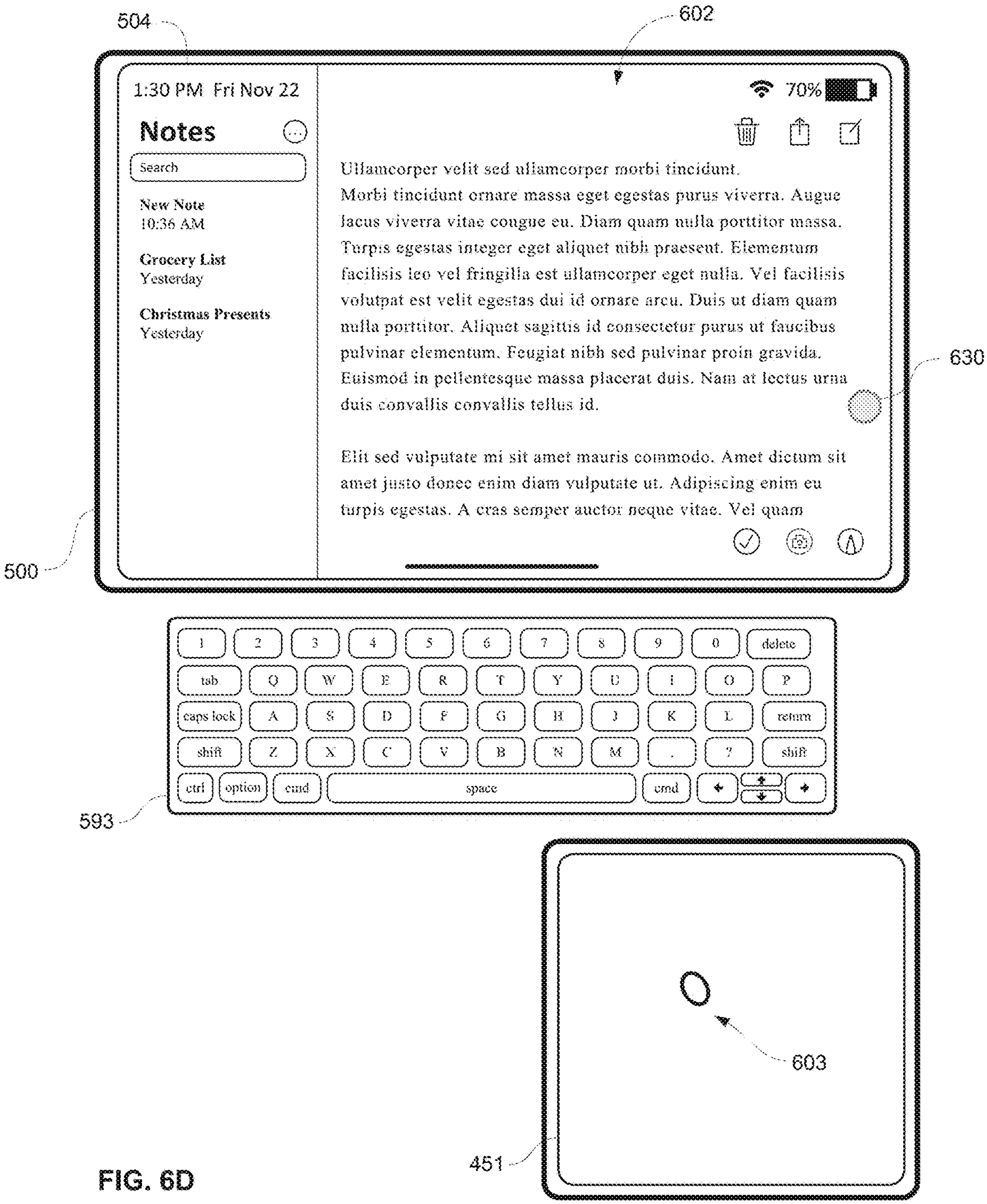
Figure 6E:
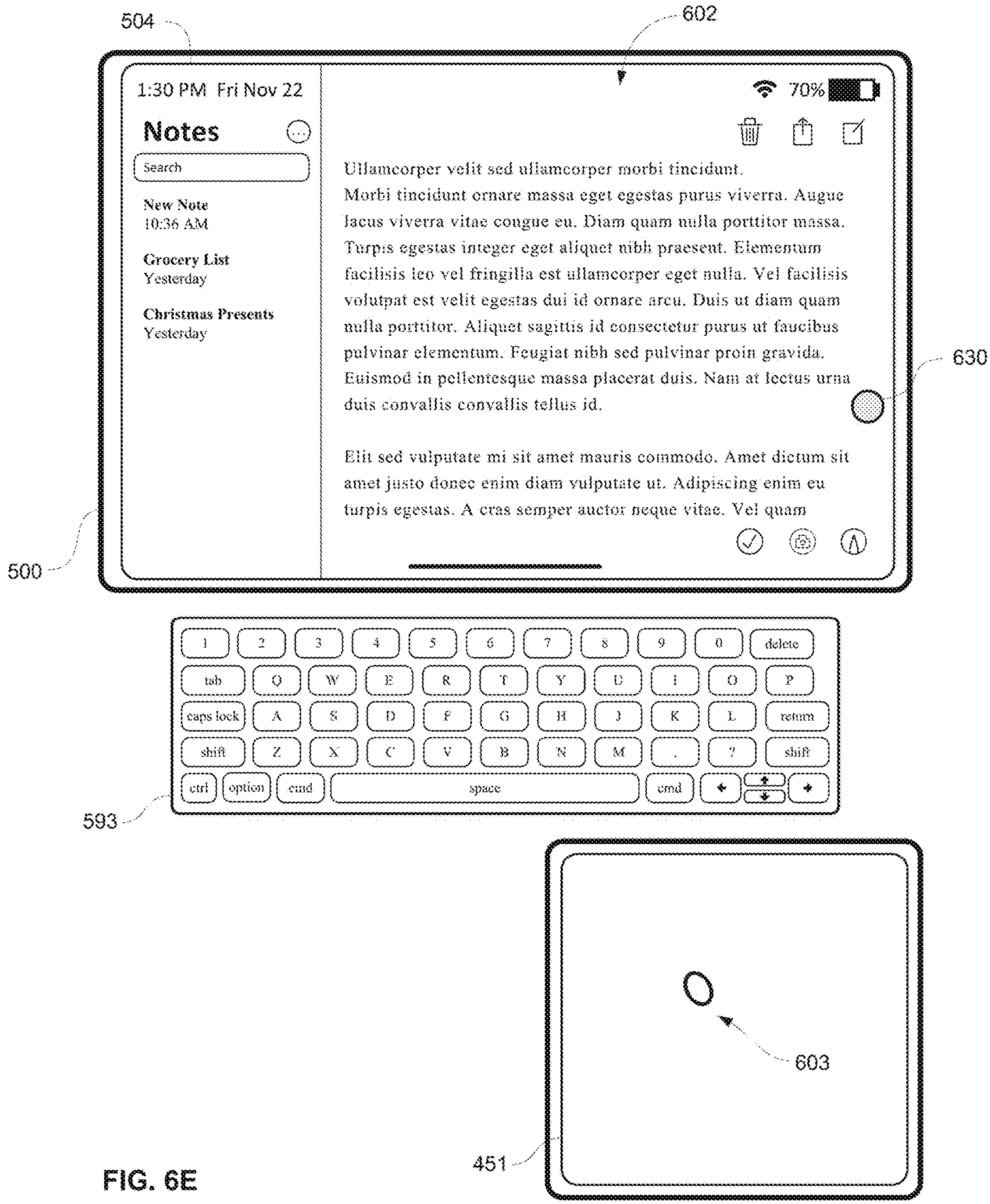
Figure 6F:
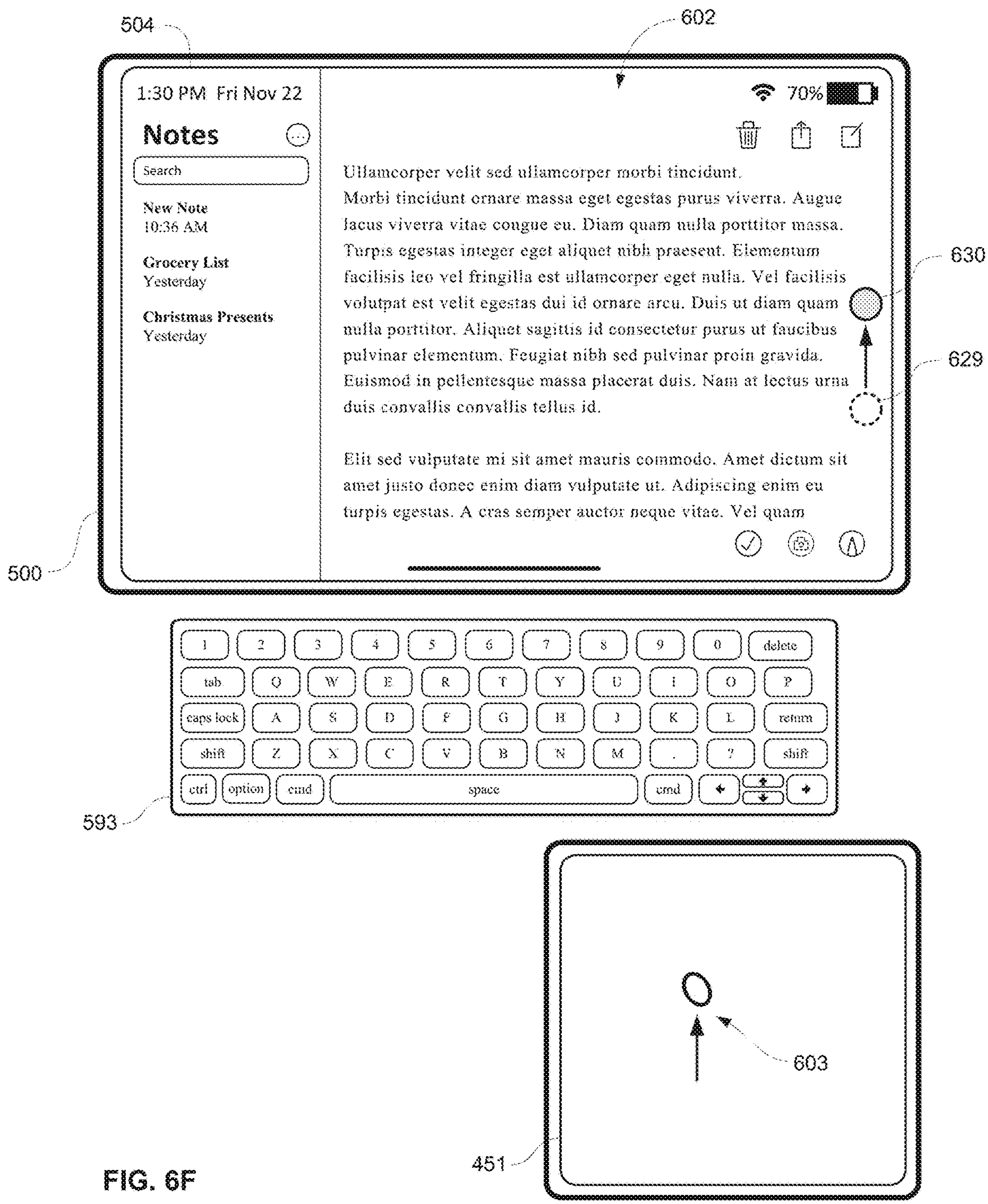

In FIG. 6F, an upward swipe of contact 603 is detected on touch-sensitive surface 451. In response to the upward swipe of contact 603, cursor 630 is moved up in the user interface in accordance with the length/direction of movement of contact 603, as shown in FIG. 6F (e.g., from initial position 629). Thus, in some embodiments, an upward swipe of a contact on the touch-sensitive display 504 causes the user interface to be scrolled, whereas an upward swipe of a contact on an external touch-sensitive surface 451 causes the cursor to move in the user interface (and optionally be displayed), without scrolling the user interface.

Figure 6G:
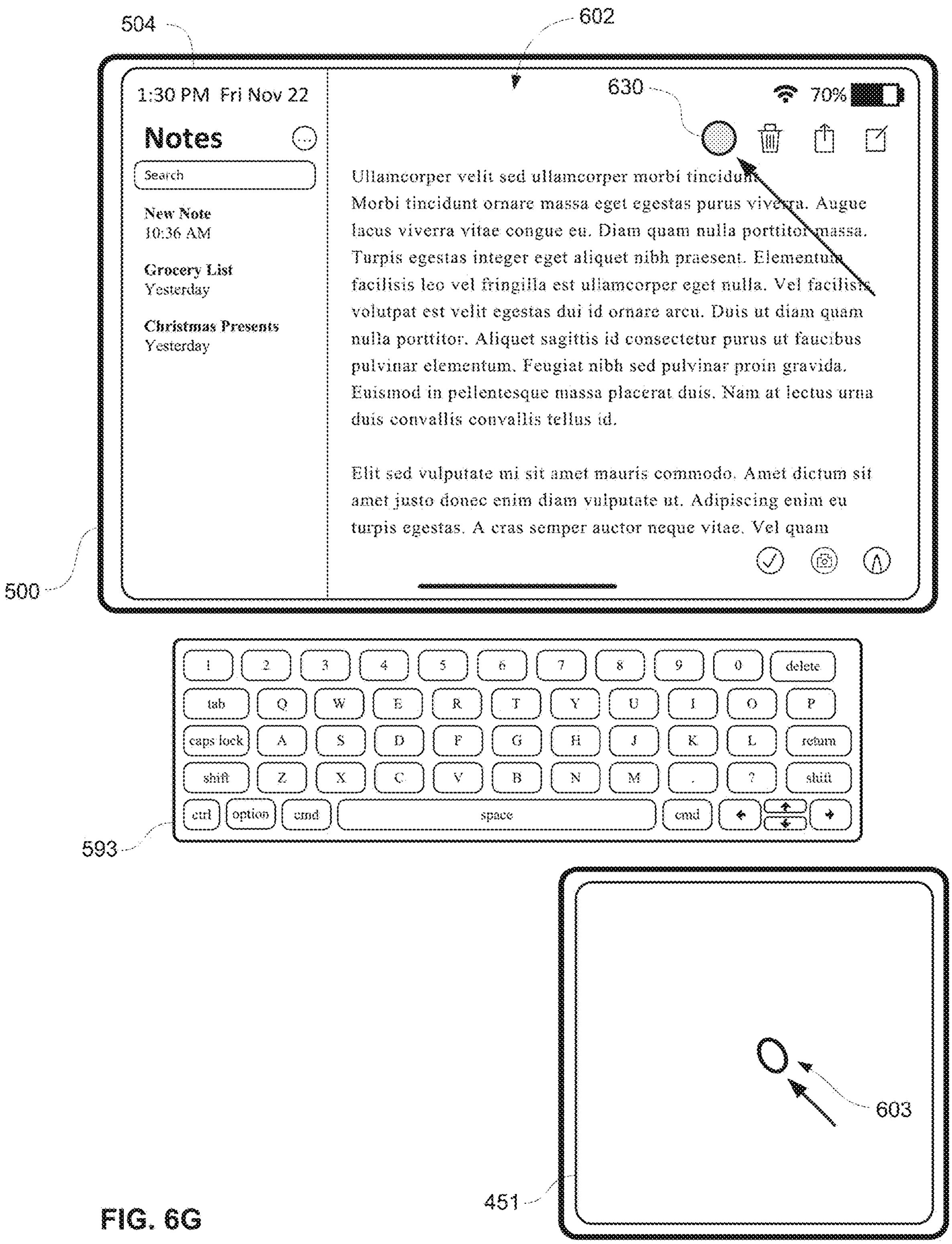
Figure 6H:
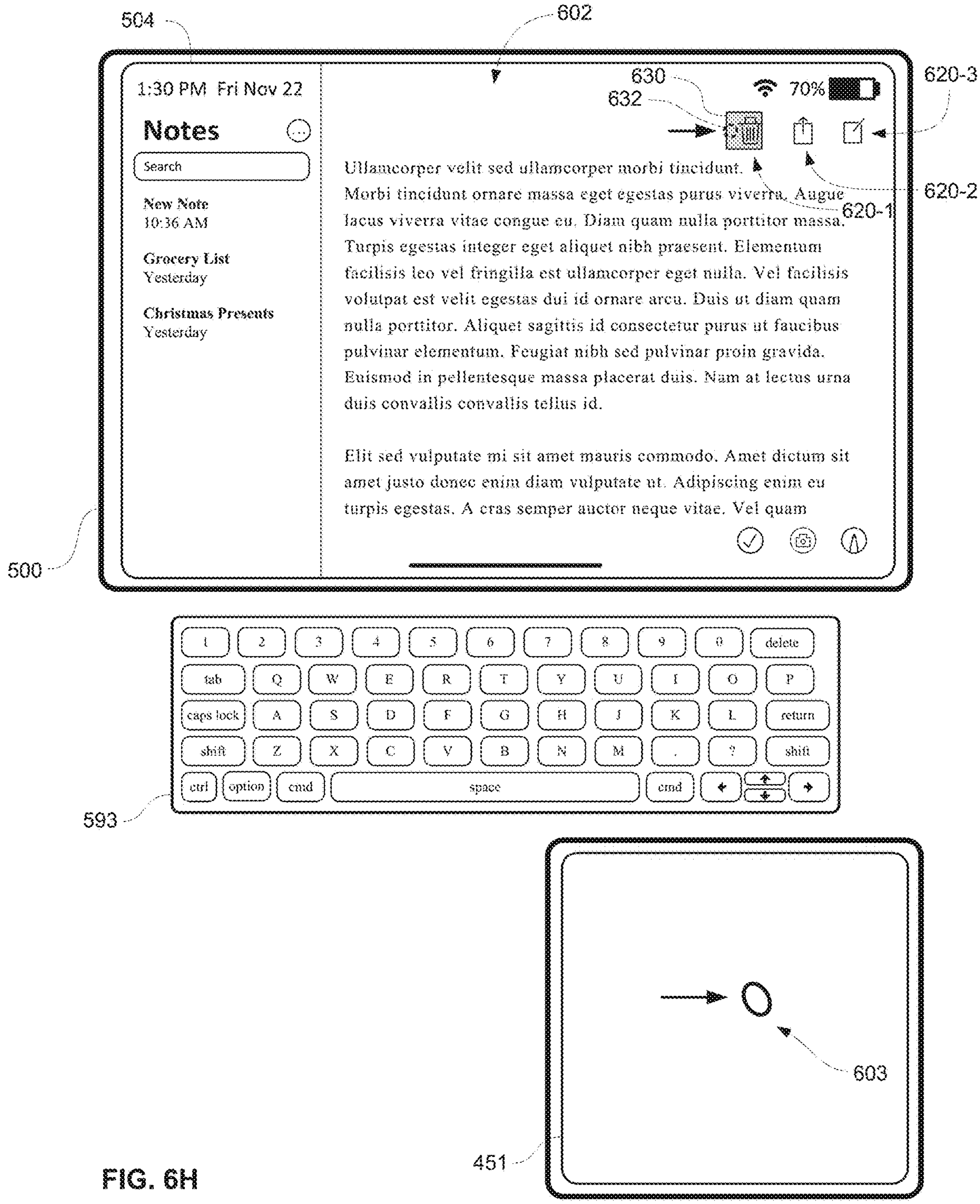

In FIG. 6G, an upward-leftward swipe of contact 603 is detected on touch-sensitive surface 451 and cursor 630 moves in an upward-leftward direction, as shown. In FIG. 6H, a rightward swipe of contact 603 is detected on touch-sensitive surface 451. In response to the rightward swipe, cursor 630 moves rightwards towards button 620-1. In some embodiments, if cursor 630 comes within a certain distance of a selectable user interface object (e.g., such as button 620-1), then the size and shape of cursor 630 changes based on the user interface object. In some embodiments, the shape of the cursor 630 depends on the type of user interface object that is being selected for input, the shape of the user interface object that is being selected for input, or any other characteristic of the user interface object that is being selected for input. In some embodiments, the size of the cursor is based on the size of the user interface object that is being selected for input. For example, the size of the cursor becomes slightly larger than the user interface object that is being selected for input such that the cursor appears to be highlighting the user interface object that is being selected for input (e.g., a halo around the user interface object). In FIG. 6H, because button 620-1 is a button having a rectangular or square shape, the shape of cursor 630 becomes rectangular or a square. In some embodiments, the color of cursor 630 changes or stays the same. In some embodiments, cursor 630 maintains its transparency. In some embodiments, cursor 630 becomes opaque.

As shown in FIG. 6H, cursor 630 need not reach the center of button 620-1 for button 620-1 to be selected for input. In some embodiments, when button 620-1 is selected for input, cursor 630 optionally centers itself on button 620-1. In some embodiments, when button 620-1 is selected for input, cursor 630 is still offset from the center of button 620-1, as shown in FIG. 6H. In some embodiments, electronic device 500 maintains the position 632 of cursor 630. For example, device 500 maintains an account of the location of the cursor based on the user input, even though display of cursor 630 appears different from or offset from position 632 (e.g., position 632 is positioned in the left portion of cursor 630). In some embodiments, position 632 is not displayed in the user interface and is shown merely for illustrative purposes in the figures here. For example, in FIG. 6H, cursor 630 appears to “lean” or become drawn towards button 620-1. Thus, in some embodiments, the cursor 630 extends and/or shifts toward the user interface object that is being selected for input. In some embodiments, button 620-1 itself does not move toward cursor 630. In some embodiments, button 620-1 is also drawn by cursor 630 and appears to lean towards cursor 630. In some embodiments, when the appearance of cursor 630 is changed to be based on button 620-1 and button 620-1 is selected for input, cursor 630 is displayed below button 620-1 (e.g., button 620-1 and/or the graphical contents of button 620-1 overlay cursor 630).

In some embodiments, when the cursor reaches the threshold distance from the selectable user interface object (e.g., 0.5 mm, 1 mm, 2 mm, 5 mm, etc.), the selectable user interface object is considered to be selected for input and/or considered to have received a focus. In some embodiments, to be selected for input means that certain user inputs are directed to the object that is selected for focus (e.g., inputs that are to be directed at an object but do not include position information and/or do not inherently include information about what object the input is directed to). For example, a selection input (such as a click input from the touch-sensitive surface 451 or a contact having an intensity greater than an intensity threshold on touch-sensitive surface 451) will cause the user interface object that is selected for input to be actuated. In another example, a “delete” key input on keyboard device 593 optionally initiates a process for deleting the user interface object that is selected for input.

Figure 6I:
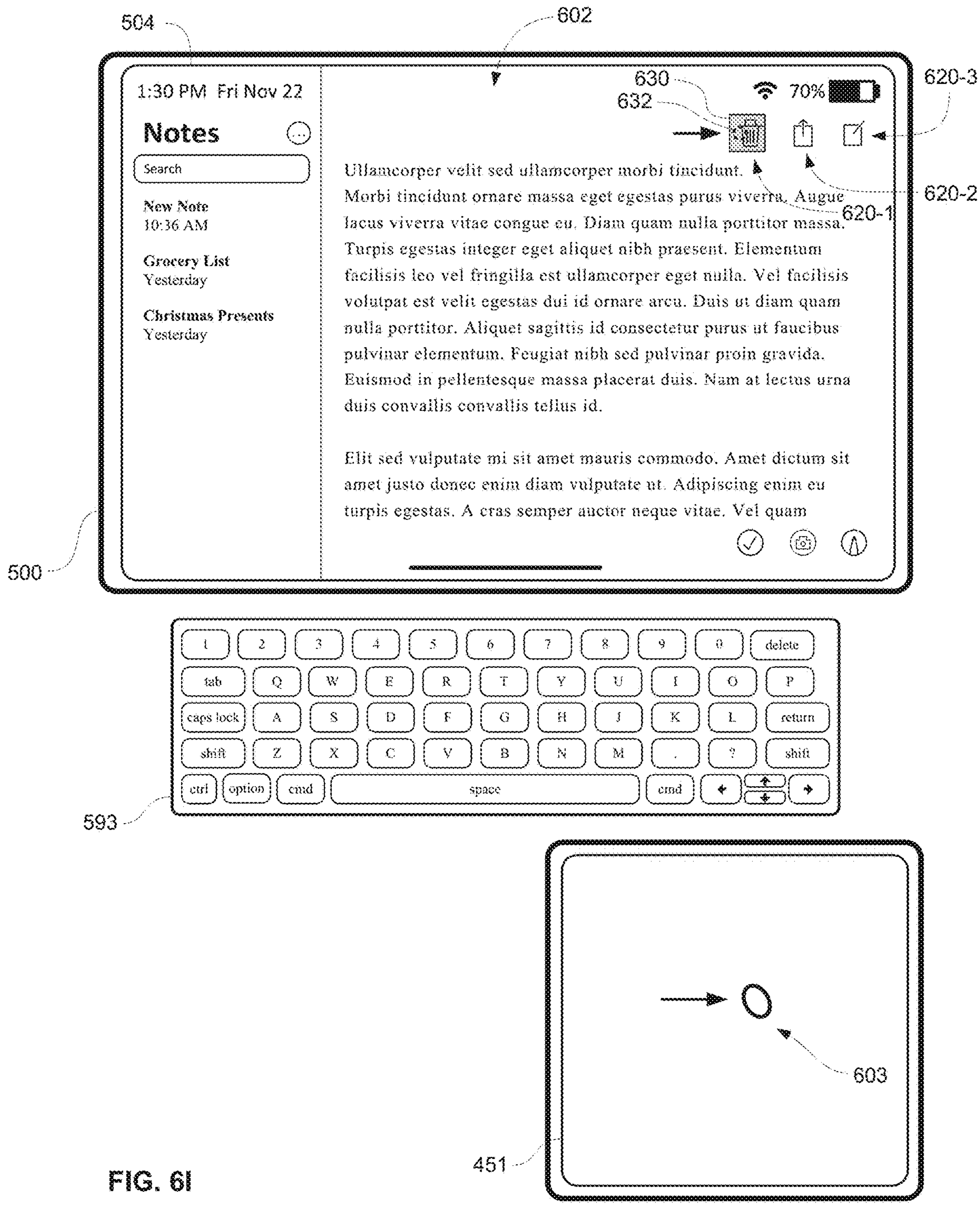

In FIG. 6I, contact 603 continues its rightward movement (e.g., from FIG. 6H, without termination (e.g., liftoff) of contact 603 from the touch-sensitive surface 451) on touch-sensitive surface 451. In response to the continued rightward swipe, cursor 630 moves further rightward toward button 620-1. In some embodiments, button 620-1 is already selected for input and continues to remain selected for input. In some embodiments, position 632 of cursor 630 moves rightwards in accordance with the rightward swipe. Thus, in some embodiments, while button 620-1 is selected for input, a user is able to perform movement inputs to cause cursor 630-1 to move around button 620-1 while maintaining button 620-1 as being selected for input.

Figure 6J:
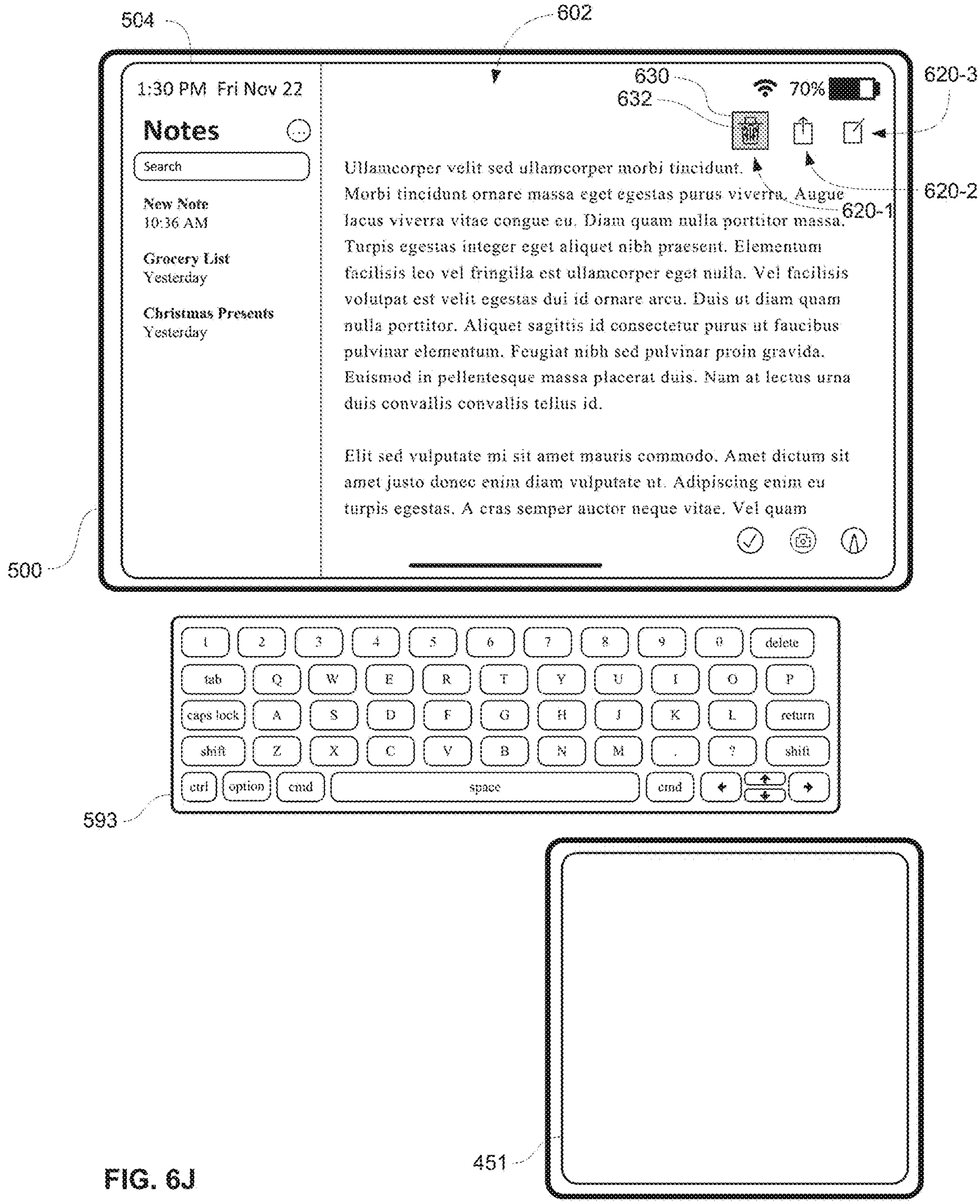

In FIG. 6J, electronic device 500 detects the termination of contact 603 from touch-sensitive surface 451 (e.g., release of contact 603, lift-off of contact 603, etc.). In some embodiments, in response to termination of contact 603, cursor 630 moves to become centered on button 620-1. In some embodiments, position 632 of cursor 630 also moves to become centered on button 620-1. Thus, in some embodiments, while a user interface object is selected for input, if the cursor is not centered on the user interface object, then the cursor position is reset to be centered on the user interface object upon lift-off of contact 603 from touch-sensitive surface 451.

Figure 6K:
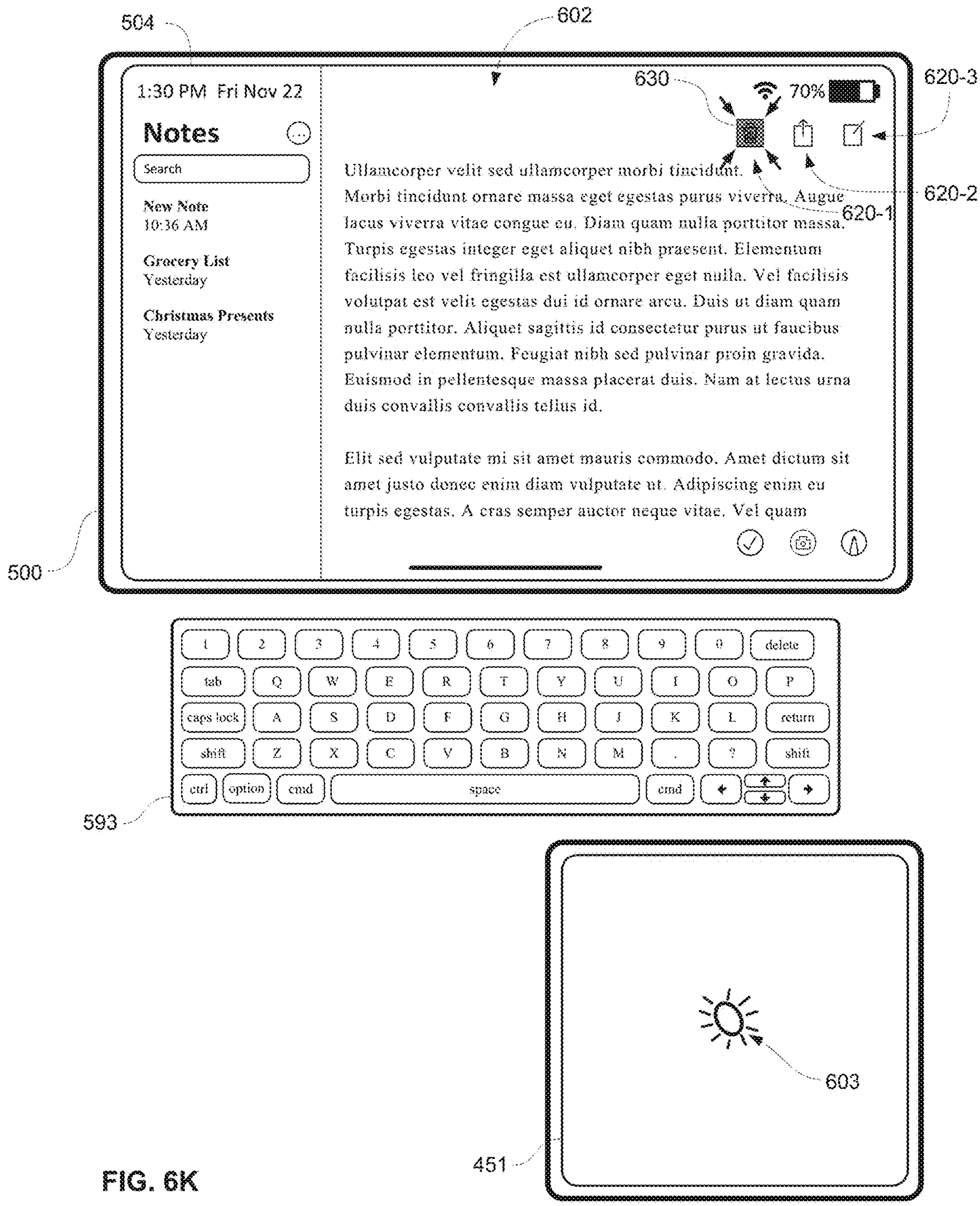

In FIG. 6K, user input 603 corresponding to a selection input is received on touch-sensitive surface 451. In some embodiments, the selection input is a click input (e.g., actuation of a mechanical switch in the touch-sensitive surface, or a detection of an increase in intensity above a threshold detected via one or more pressure or force sensors on and/or in and/or integrated with the touch-sensitive surface 451). In some embodiments, the selection input is a quick tap input on the touch-sensitive surface 451. In some embodiments, in response to detecting the selection input and while the selection input is being received (e.g., while and for the duration of when the click is held), cursor 630 becomes smaller and/or darker, as shown in FIG. 6K. In some embodiments, the content of button 620-1 (e.g., the icon) also becomes smaller and/or darker proportionally, as shown in FIG. 6K.

Figure 6L:
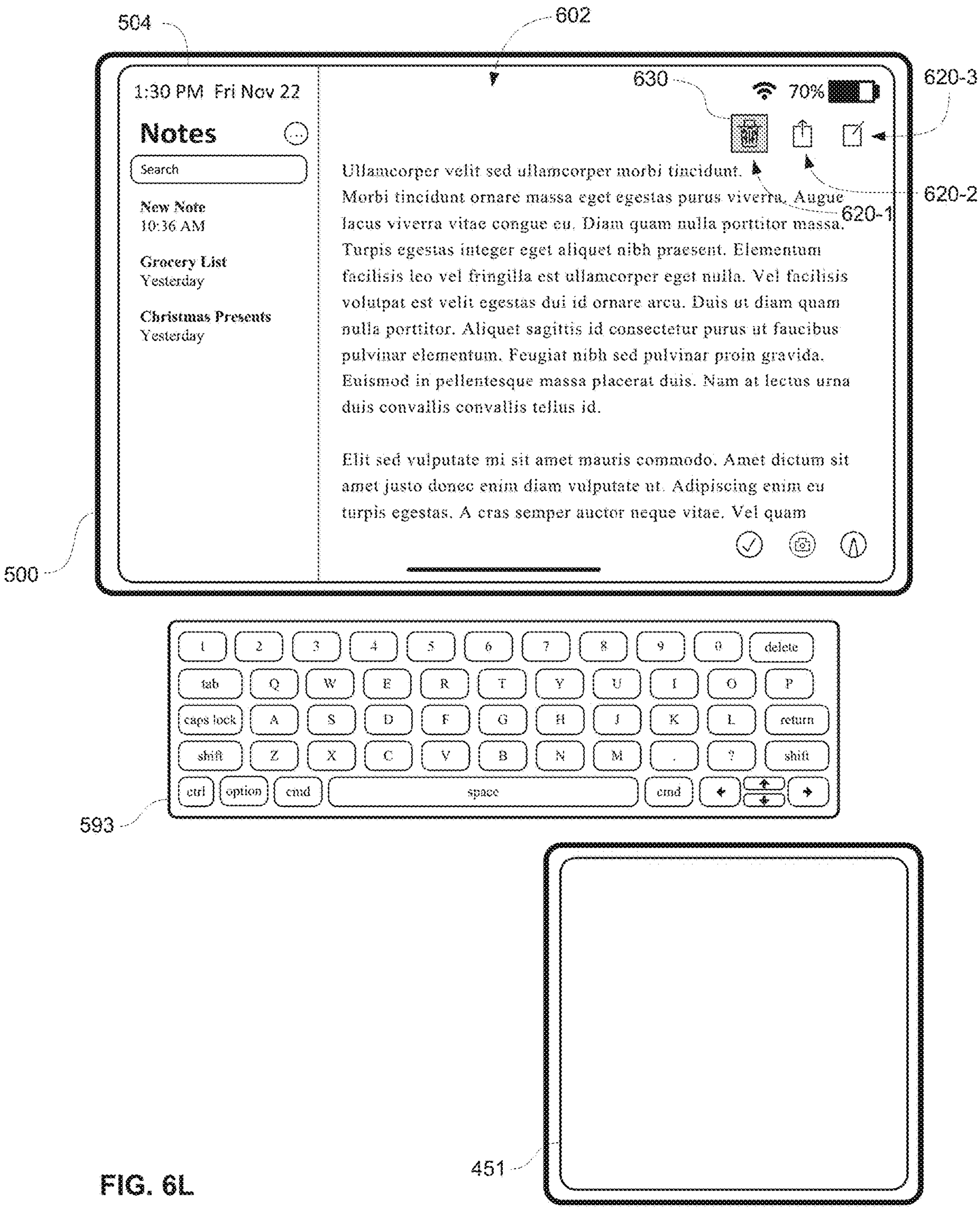

In FIG. 6L, a termination of user input 603 is detected (e.g., the release of the click input, or the end of the tap input). In some embodiments, in response to detecting the termination of the selection input, the appearance of cursor 630 and/or button 620-1 returns to its non-selected state, as shown in FIG. 6L. In some embodiments, electronic device 500 performs a function corresponding to button 620-1 (e.g., button 620-1 is activated) similar to if the user performed a tap input on button 620-1 via touch-sensitive display 504.

Figure 6M:
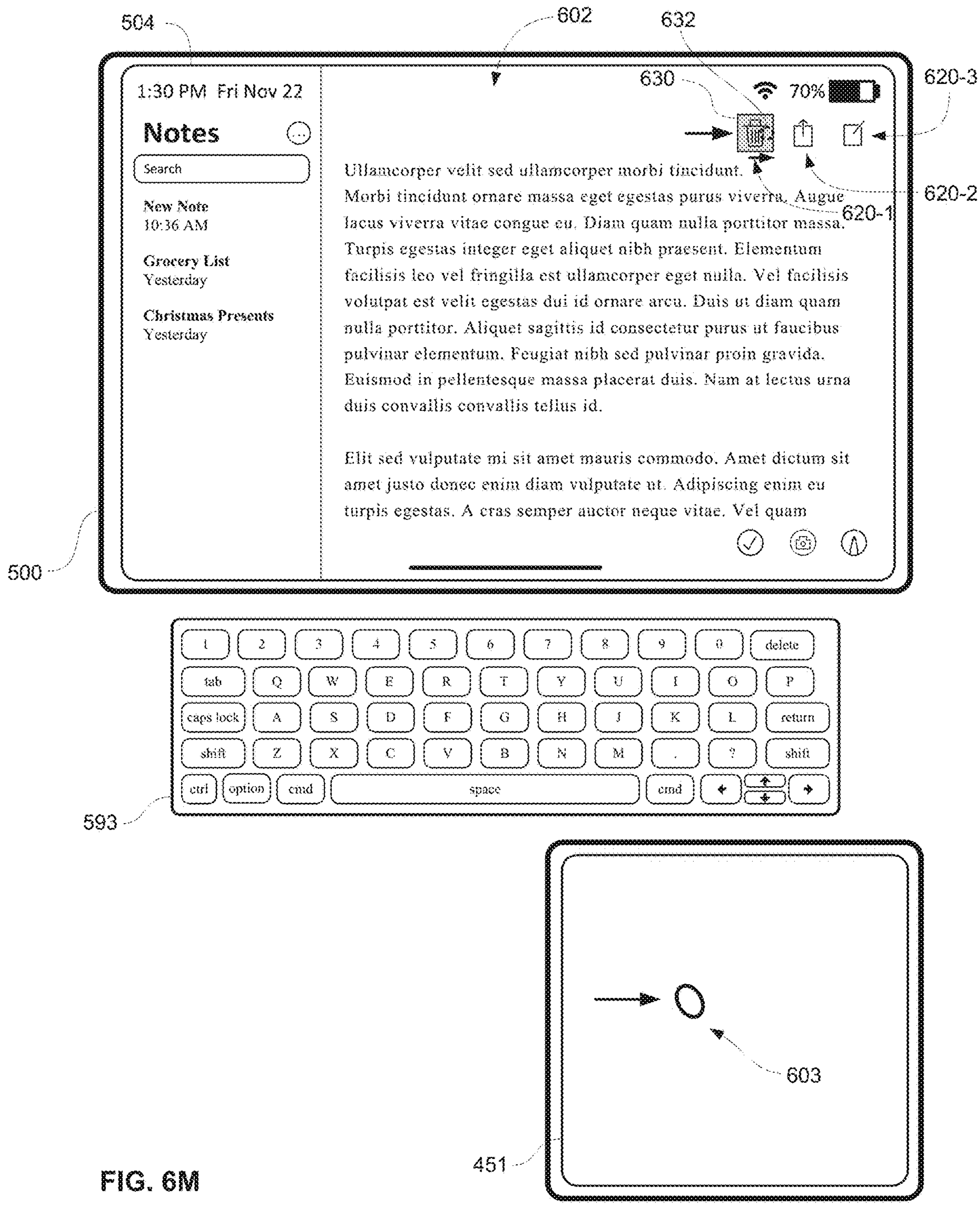

In FIG. 6M, a rightward swipe of contact 603 is detected on touch-sensitive surface 451. In response to the rightward swipe, cursor 630 moves rightwards away from the center of button 620-1 (e.g., as shown by position 632), as shown in FIG. 6M. In some embodiments, because contact 603 is moving cursor 630 away from the center position of button 620-1, button 620-1 (e.g., the content of button 620-1) also moves rightwards with cursor 630. Thus, in some embodiments, cursor 630 and button 620-1 appear to move rightwards together.

Figure 6N:
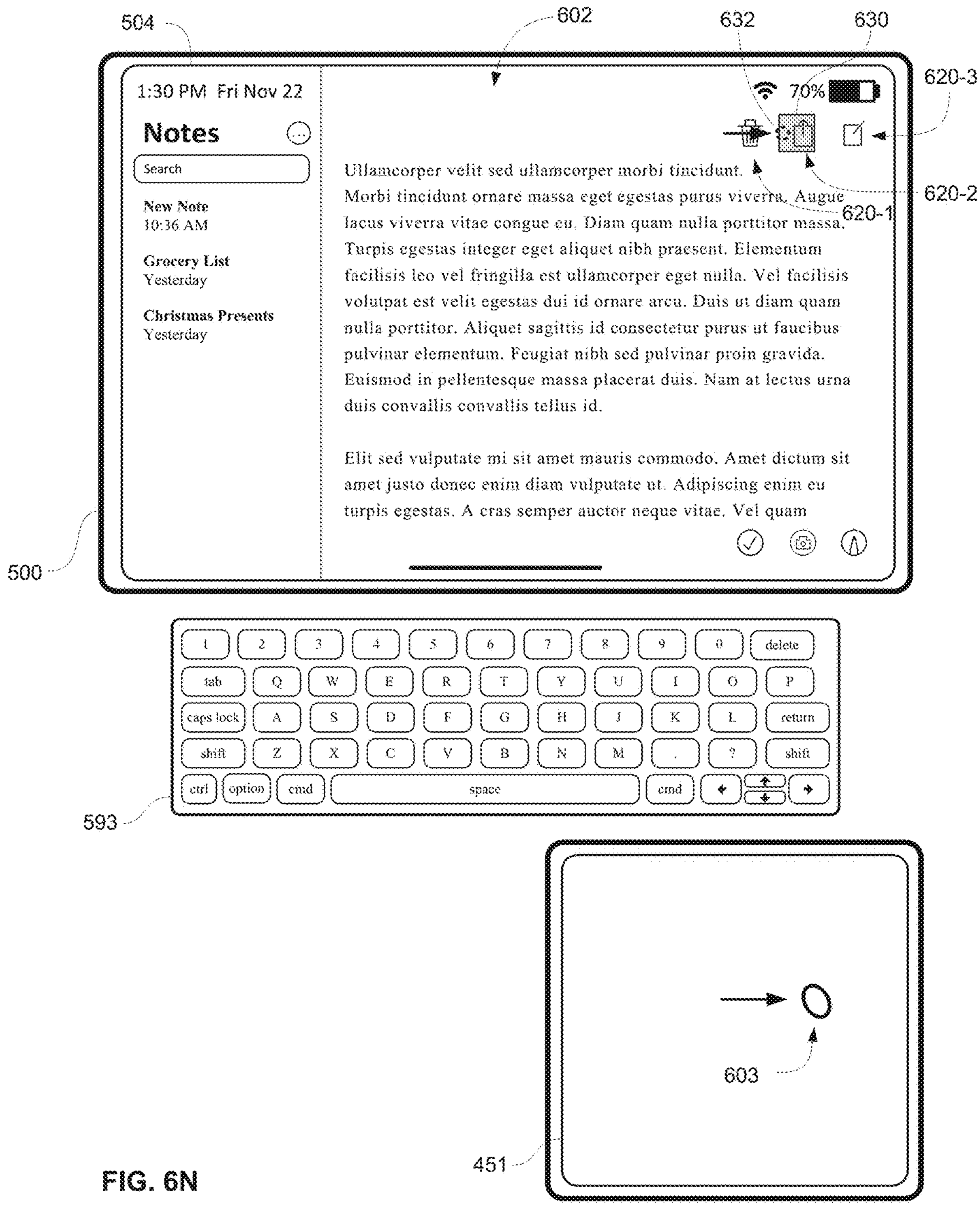

In FIG. 6N, contact 603 continues its rightward swipe (e.g., from FIG. 6M, without termination of contact 603 from the touch-sensitive surface) on touch-sensitive surface 451. In response to the continued rightward swipe, cursor 630 moves further rightward away from button 620-1 and toward button 620-2, as shown. In some embodiments, because button 620-2 is within a threshold distance (e.g., 0.5 mm, 1 mm, 2 mm, 5 mm, etc.) of button 620-1, cursor 630 moves directly from selecting button 620-1 for input to selecting button 620-2 for input (e.g., without returning to the default size/shape of cursor 630 in between buttons

620-1 and 620-2). In some embodiments, the size and shape of cursor 630 is updated to be based on button 620-2. As shown in FIG. 6N, the size and shape of cursor 630 is not changed because button 620-2 has a similar (e.g., same) size and is a similar (e.g., same) type of user interface object as button 620-1. In some embodiments, the distance between button 620-1 and button 620-2 that allows cursor 630 to move directly from selecting button 620-1 for input to selecting button 620-2 for input is the same as the threshold distance described above with respect to FIG. 6H that caused button 620-1 to be selected for input. In FIG. 6N, after cursor 630 moves to button 620-2, button 620-1 returns to its original position (e.g., moves back leftwards), and is no longer selected for input.

Figure 6O:
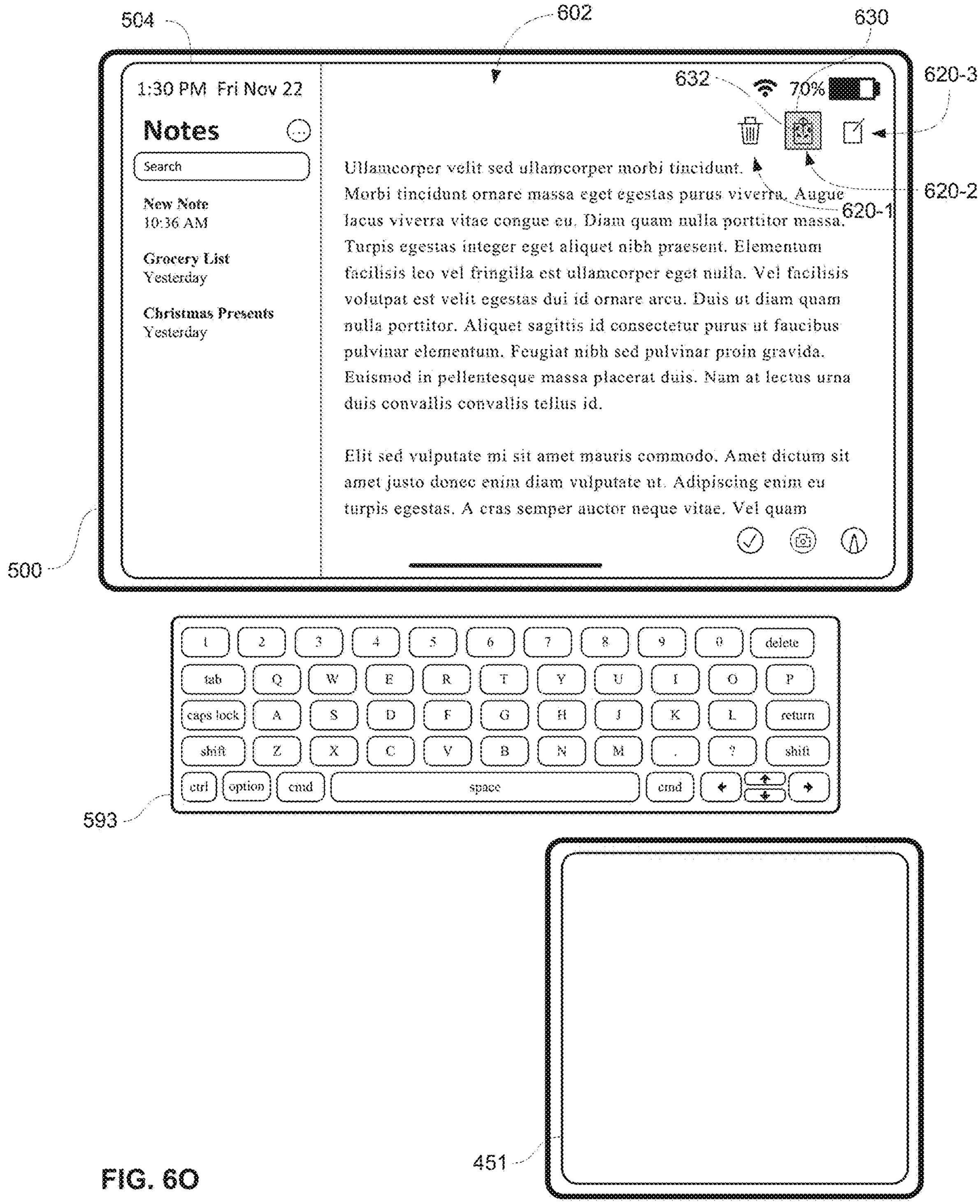

In FIG. 6O, electronic device 500 detects the termination of contact 603 from touch-sensitive surface 451 (e.g., release of contact 603, lift-off of contact 603, etc.) while button 620-2 was selected for input. In some embodiments, in response to termination of contact 603, cursor 630 moves to be centered on button 620-2. In some embodiments, position 632 of cursor 630 also moves to be centered on button 620-2. Thus, in some embodiments, while button 620-2 is selected for input, the cursor position is set/reset to be centered on button 620-2 upon termination of a user input (e.g., "snapped" to button 620-2).

Figure 6P:
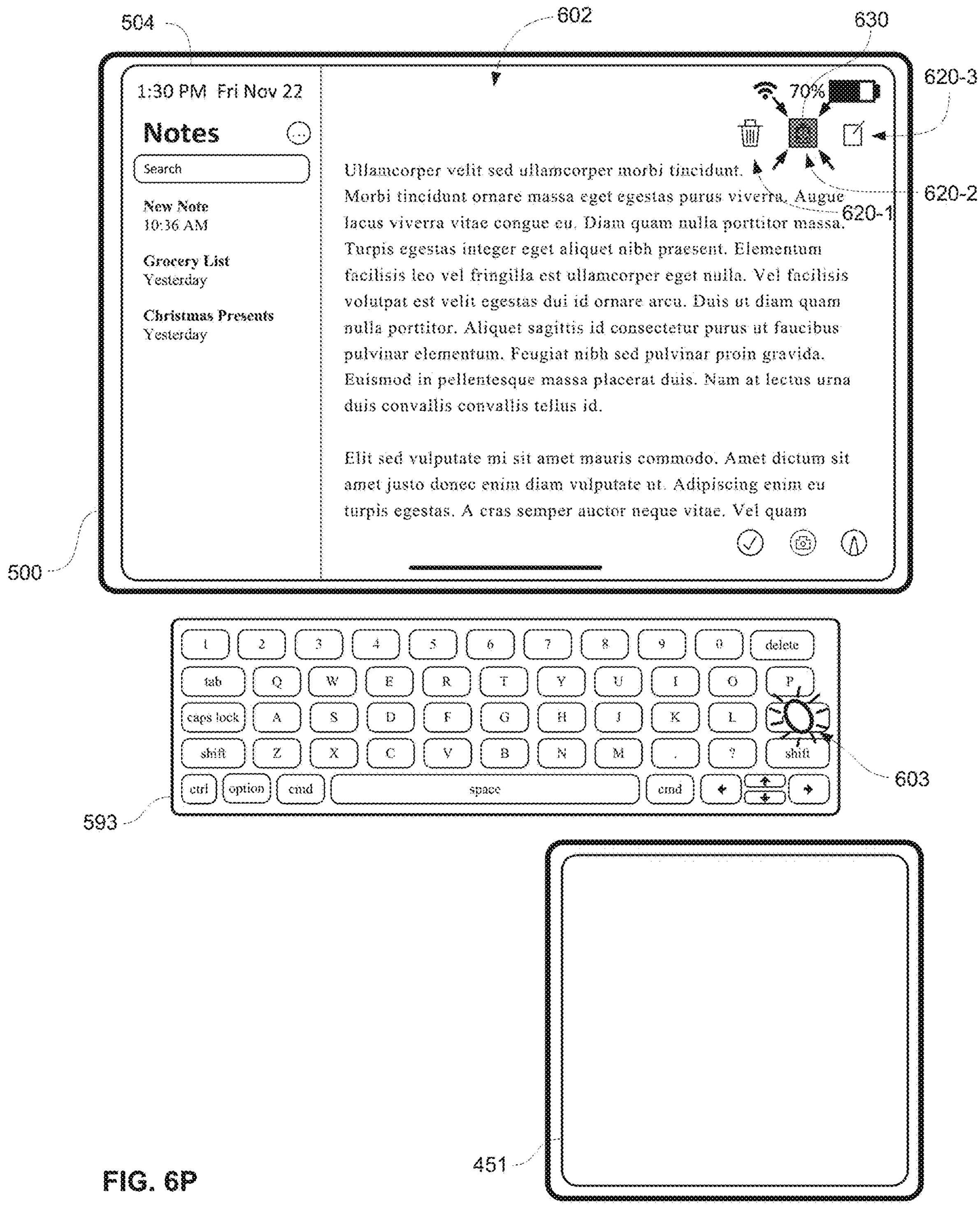
Figure 6Q:
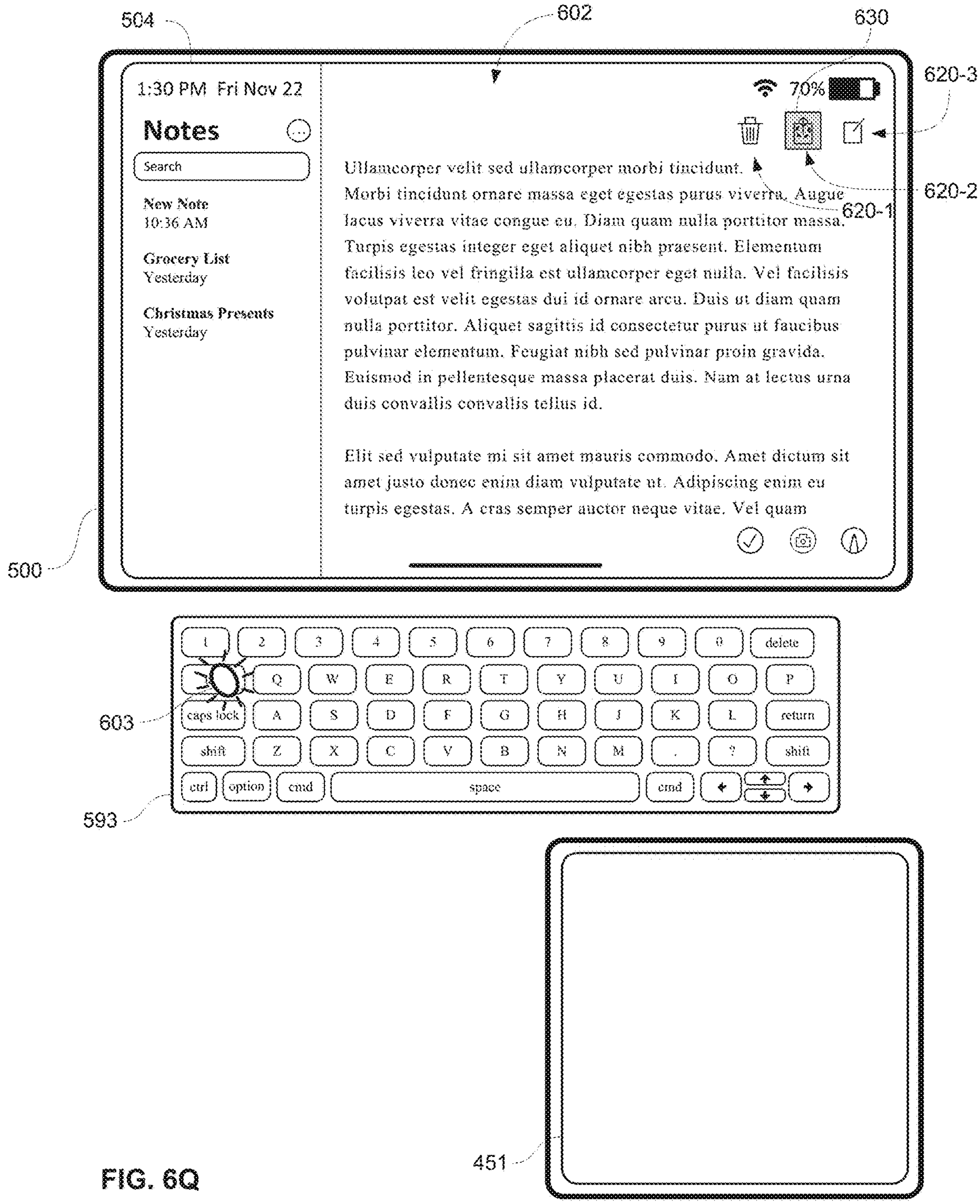

In FIG. 6P, a selection 603 of the "enter" key is received on external keyboard 593 while button 620-2 is selected for input. In some embodiments, because button 620-2 is selected for input, the "enter" key input is directed at button 620-2 and is interpreted as a request to actuate or select button 620-2 (e.g., such as if the user had selected button 620-2 via the touch-sensitive display 504). Thus, in response to selection 603, cursor 630 becomes smaller and/or darker and/or the content of button 620-2 (e.g., the icon) also becomes smaller and/or darker proportionally, similar to as in FIG. 6K with respect to button 620-1. In FIG. 6Q, selection 603 of the "enter" key is terminated and cursor 630 and button 620-2 is returned to its un-selected size and/or color. In some embodiments, device 500 performs a function associated with button 620-2 (e.g., associated with actuation of button 620-2, such as if the user had tapped on button 620-2 via the touch-sensitive display 504).

Figure 6R:
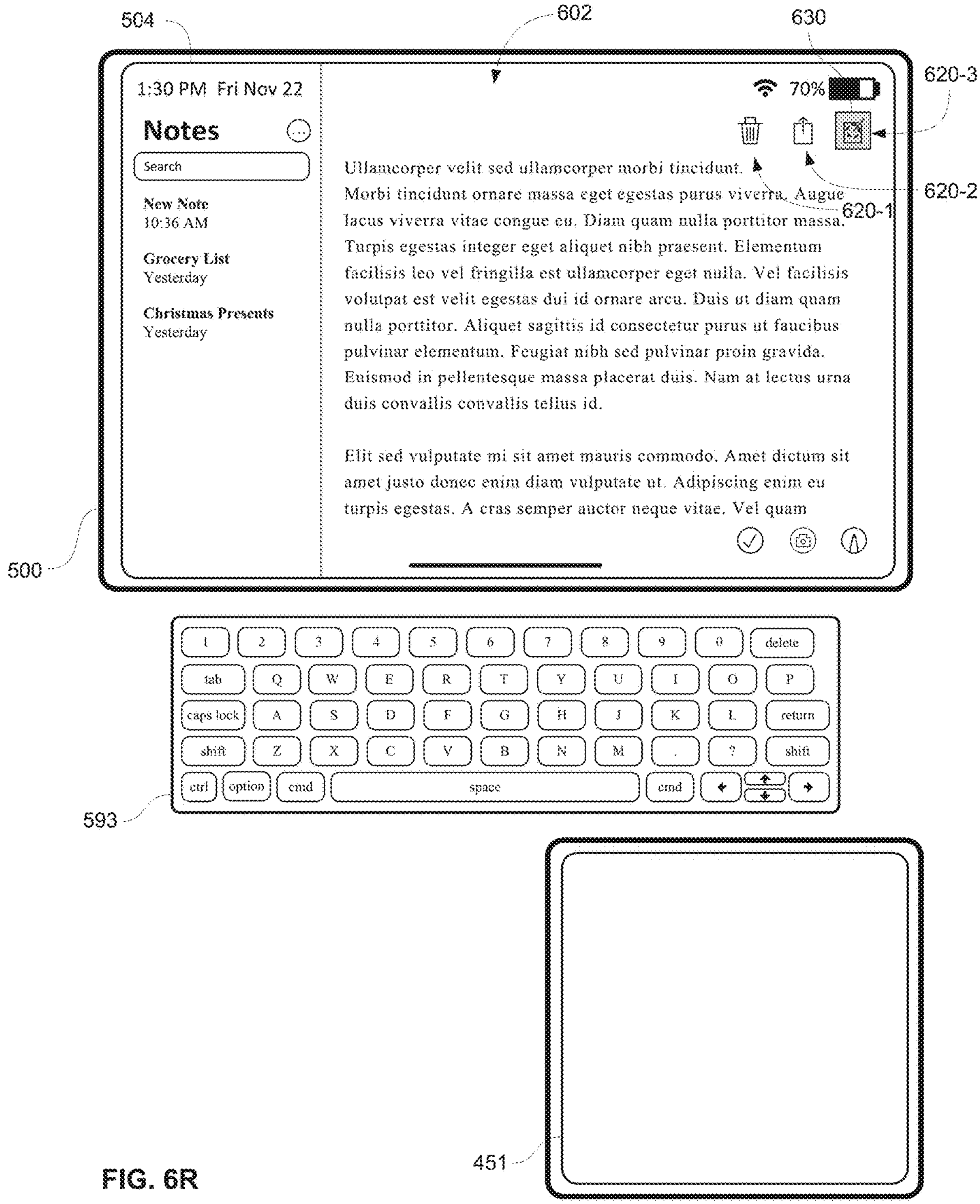

In FIG. 6Q, a selection 603 of the "tab" key is received on external keyboard 593 while button 620-2 is selected for input. In some embodiments, a "tab" key input corresponds to a request to select the next object in the user interface for input. In some embodiments, in response to selection 603, electronic device 500 moves cursor 630 to the position of button 620-3 and causes button 620-3 to be selected for input, as shown in FIG. 6R (e.g., button 620-2 is no longer selected for input). In some embodiments, cursor 630 moves from button 620-2 directly to button 620-3 without displaying cursor 630 moving between button 620-2 to button 620-3 (e.g., similar to the manner described with respect to FIG. 6M-6N).

Figure 6S:
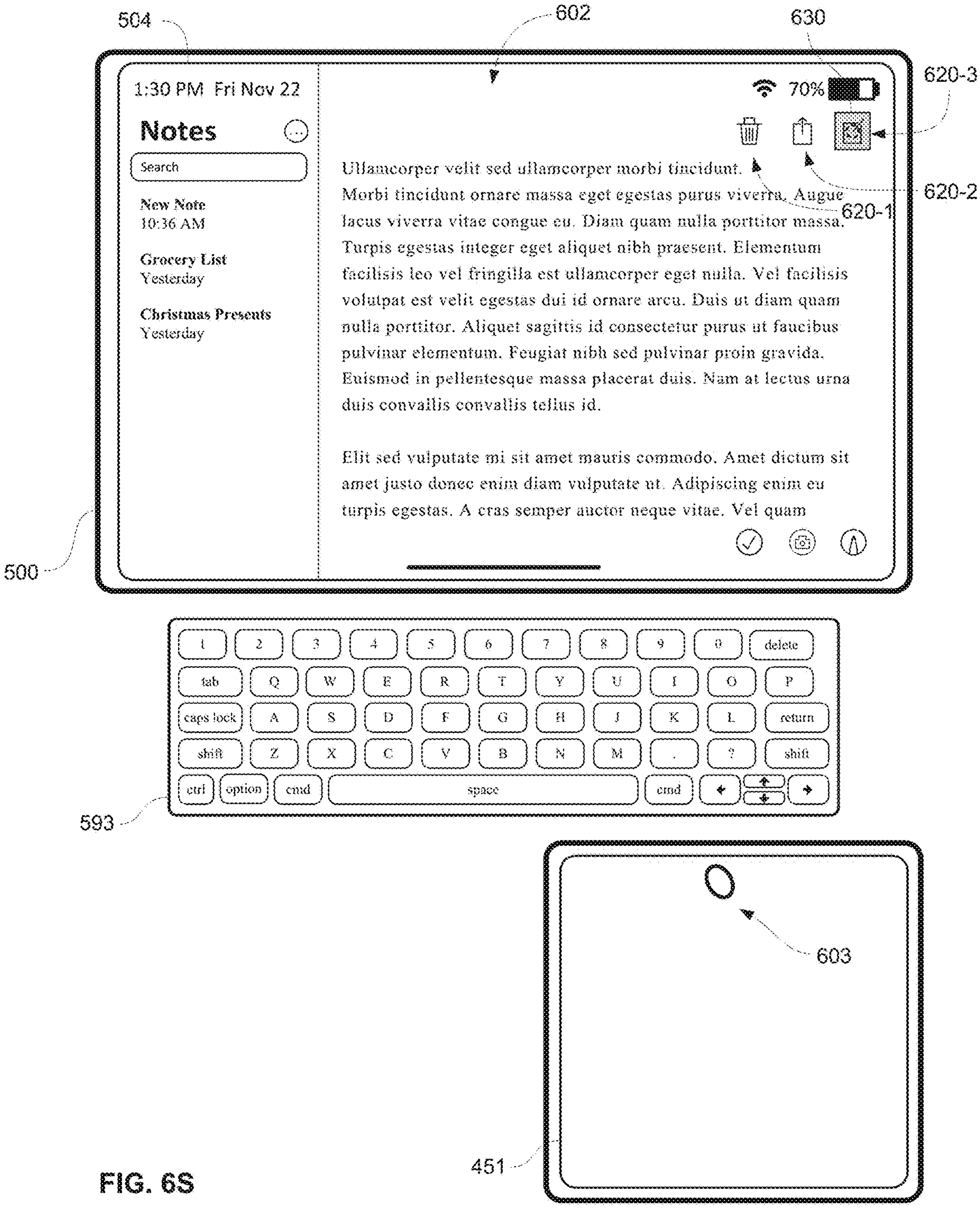

In FIG. 6S, a contact 603 is received on touch-sensitive surface 451. In some embodiments, in response to detecting contact 603 on touch-sensitive surface 451, electronic device 500 maintains display of cursor 630 in the user interface, as shown in FIG. 6S. In some embodiments, while contact 603 is maintained on the touch-sensitive surface 451, display of cursor 630 is maintained in the user interface.

Figure 6T:
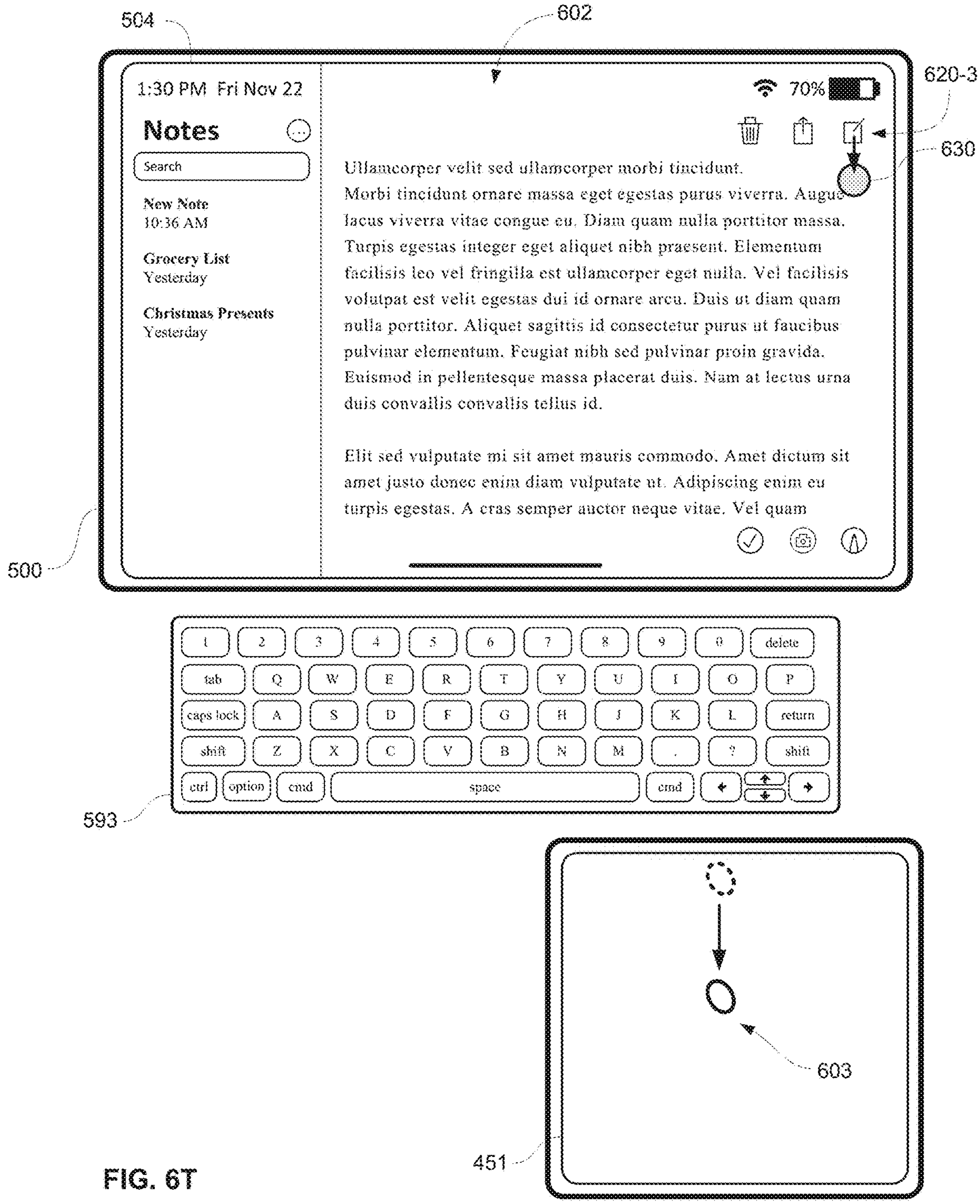

In FIG. 6T, a downward swipe of contact 603 is detected on touch-sensitive surface 451 (while maintaining contact from FIG. 6S). In response to the downward swipe, cursor 630 moves downwards away from the center of button 620-3, as shown in FIG. 6T. In some embodiments, the downward swipe of contact 603 moves cursor beyond the threshold distance within which button 620-3 is selected for input (e.g., 0.5 mm, 1 mm, 2 mm, 5 mm, etc.). Thus, as shown in FIG. 6T, cursor 630 returns to its default size and shape and is no longer based on button 620-3 (e.g., cursor 630 "snaps" out of button 620-3) and button 620-3 is no longer selected for input.

Figure 6U:
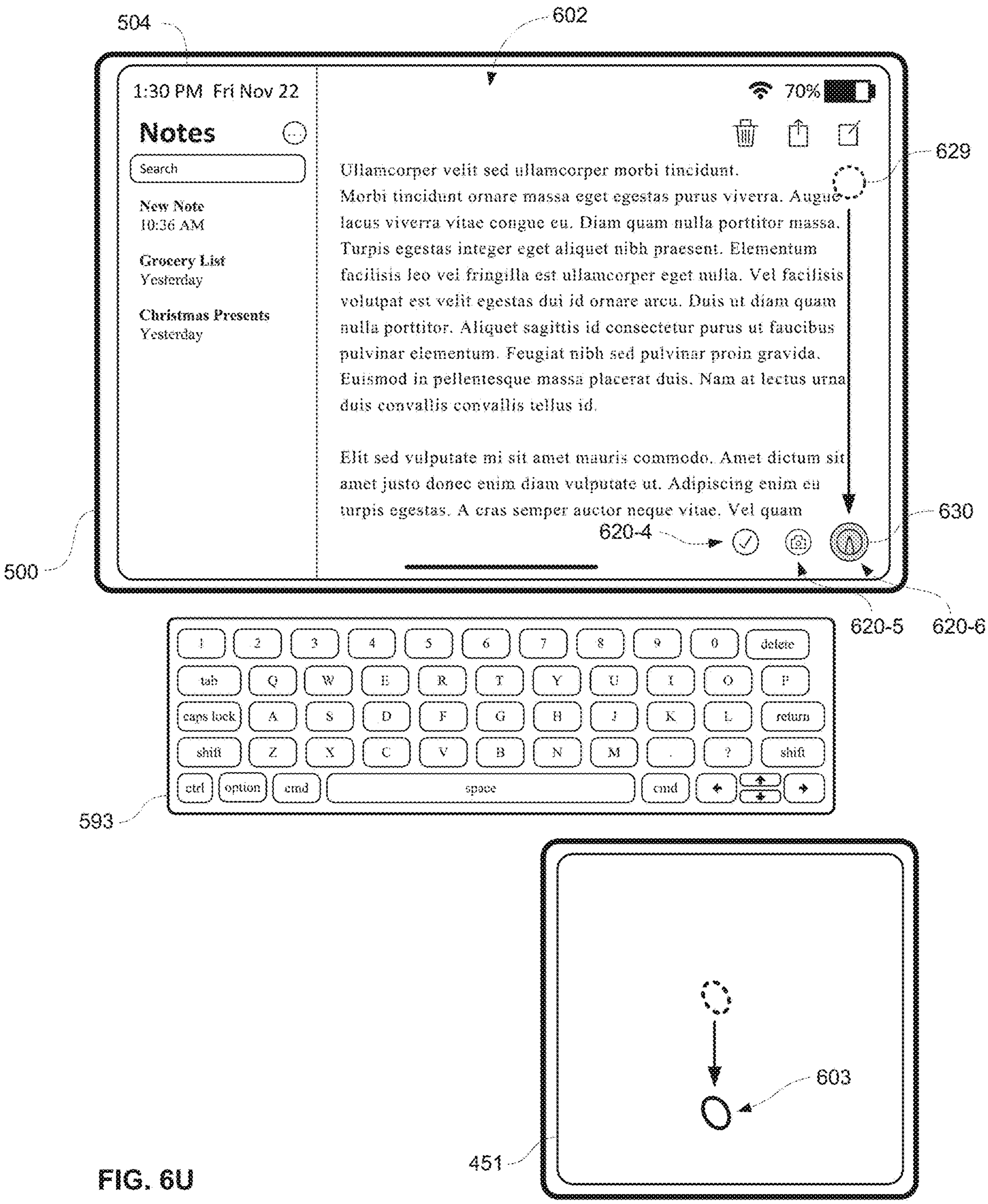

In FIG. 6U, contact 603 continues its downward swipe (e.g., from FIG. 6T, without termination of contact 603 from the touch-sensitive surface) on touch-sensitive surface 451. In response to the continued downward swipe, cursor 630 moves further downward to the position of button 620-6, as shown. In some embodiments, button 620-6 is selected for input. In some embodiments, because button 620-6 is circular in shape (e.g., has a circular border), the shape of cursor 630 is circular. In some embodiments, cursor 630 is rectangular even though button 620-6 is circular in shape, similar to the cursor in FIG. 6S, because cursor 630 is displayed with a rectangular/square shape whenever it selects a button for input, irrespective of the shape of that button. Thus, in some embodiments, if a first user interface object and a second user interface object are farther than the threshold distance away from each other, then when cursor 630 moves away from the location of the first user interface object such that the first user interface object is no longer selected for input, but the second user interface object is not yet selected for input, cursor 630 optionally returns to its default shape and size before changing to a size and shape based on the second user interface object (e.g., when the cursor reaches the threshold distance away from the second user interface object).

Figure 6V:
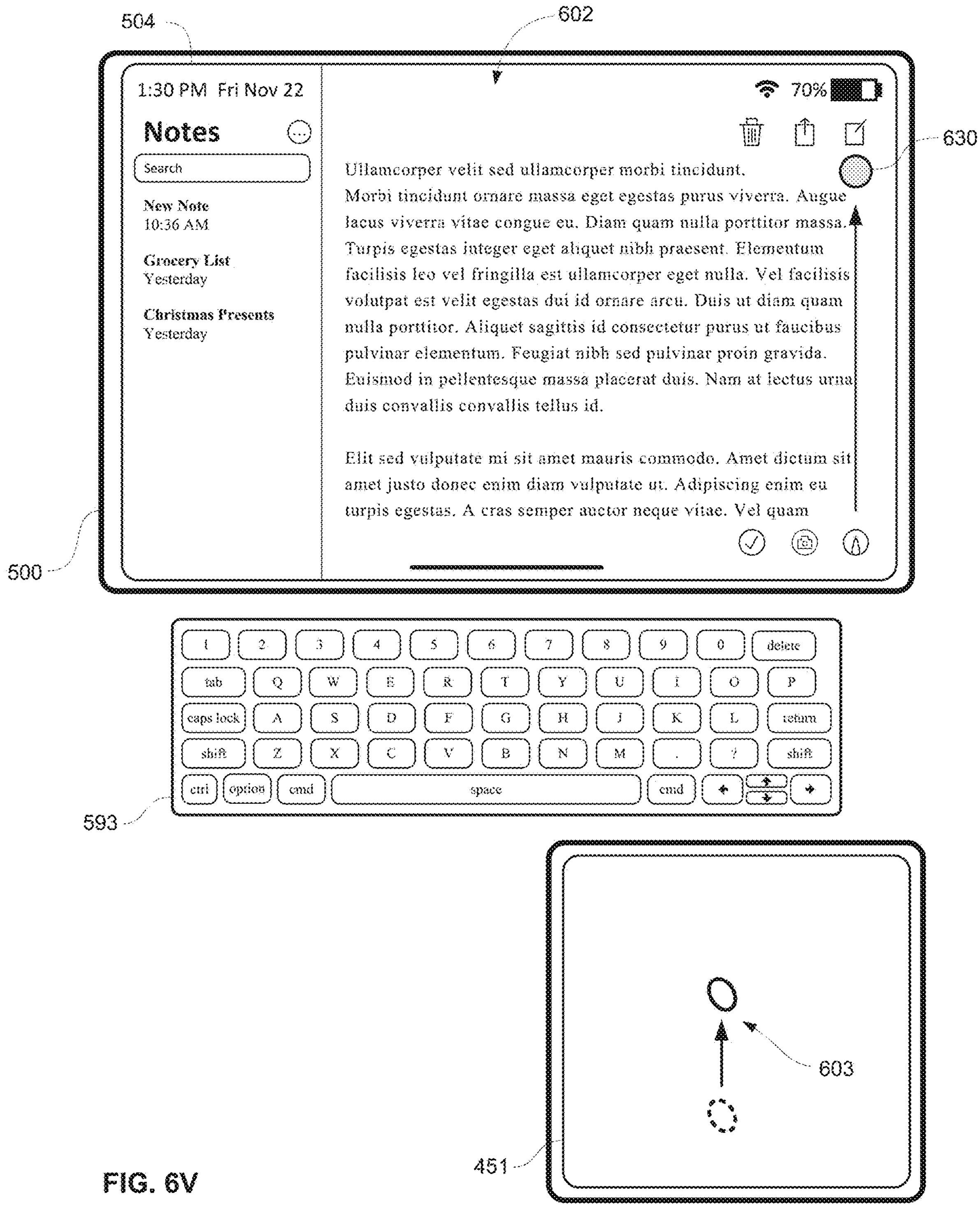
Figure 6W:
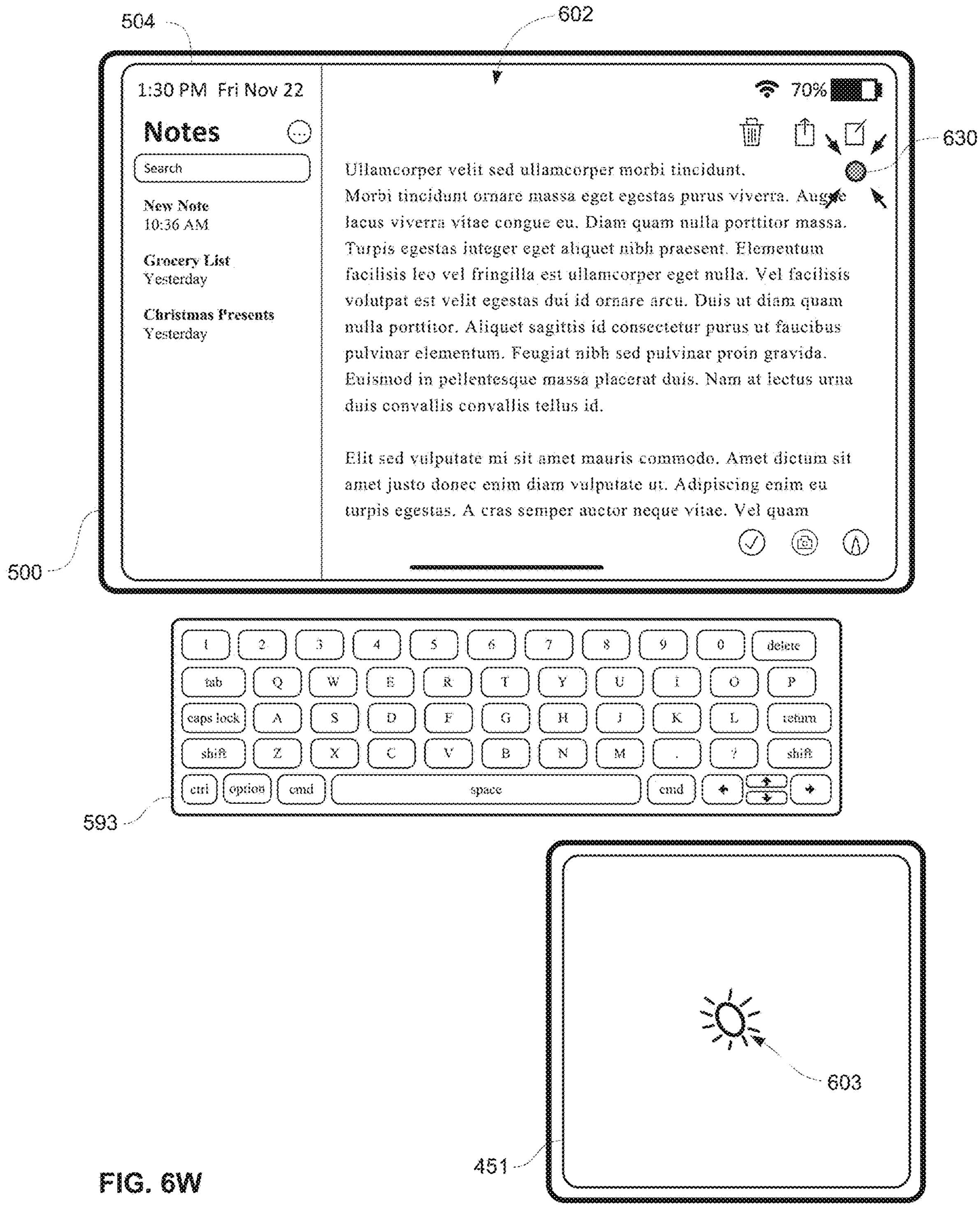

In FIG. 6V, a user input 603 is received on touch-sensitive surface 451 moving cursor 630 upwards in the user interface. In FIG. 6W, user input 603 corresponding to a selection input is received on touch-sensitive surface 451. In some embodiments, in response to detecting the selection input and while the selection input is being received (e.g., while and for the duration of when the click is held), cursor 630 becomes smaller and/or darker, as shown in FIG. 6W, even though no user interface object is selected for input.

Figure 6X:
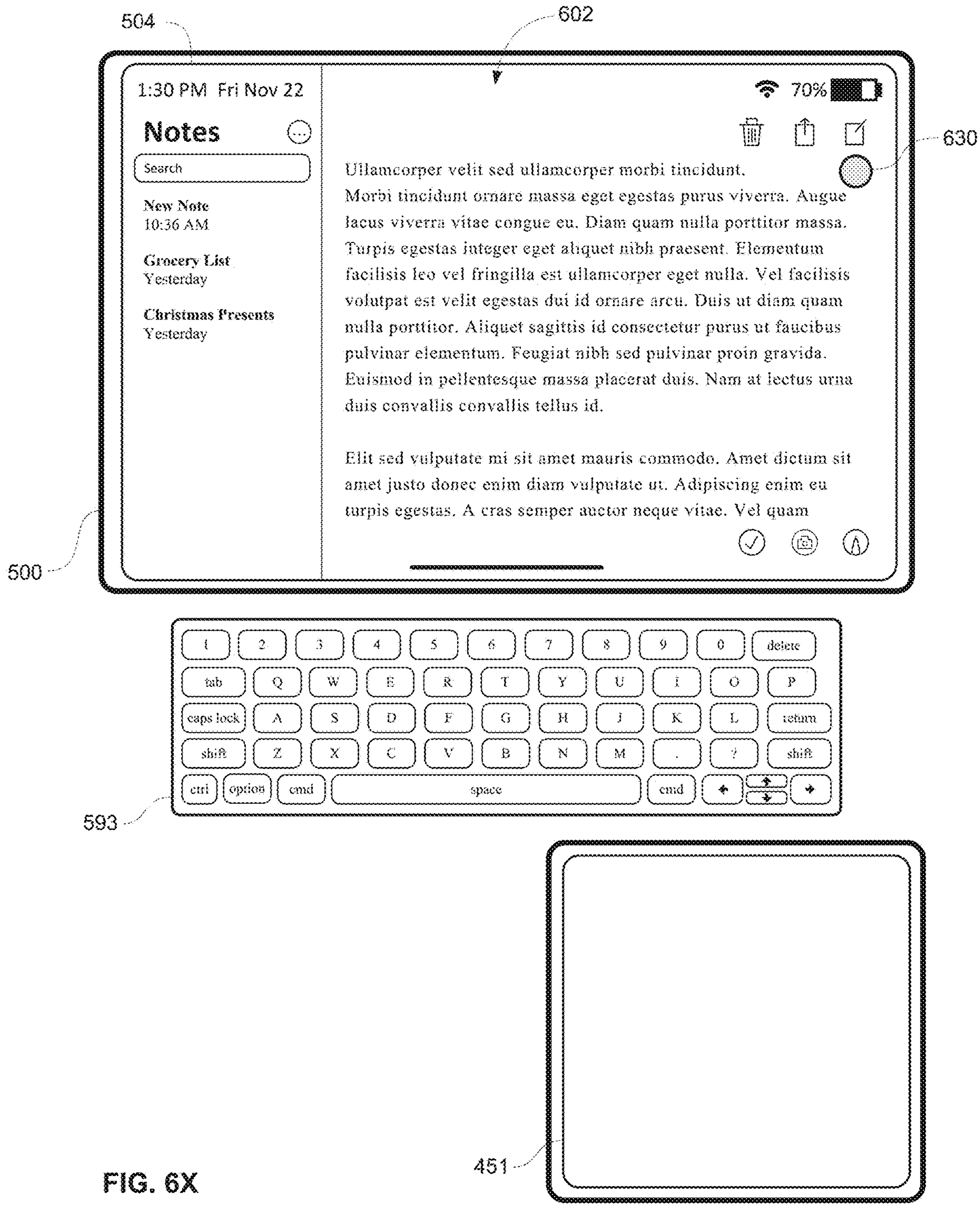

In FIG. 6X, a termination of user input 603 is detected (e.g., the release of the click input, or the end of the tap input). In some embodiments, in response to detecting the termination of the selection input, the appearance of cursor 630 returns to its non-selected state, as shown in FIG. 6X. In some embodiments, no function is performed in response to the selection input because no object is selected for input.

Figure 6Y:
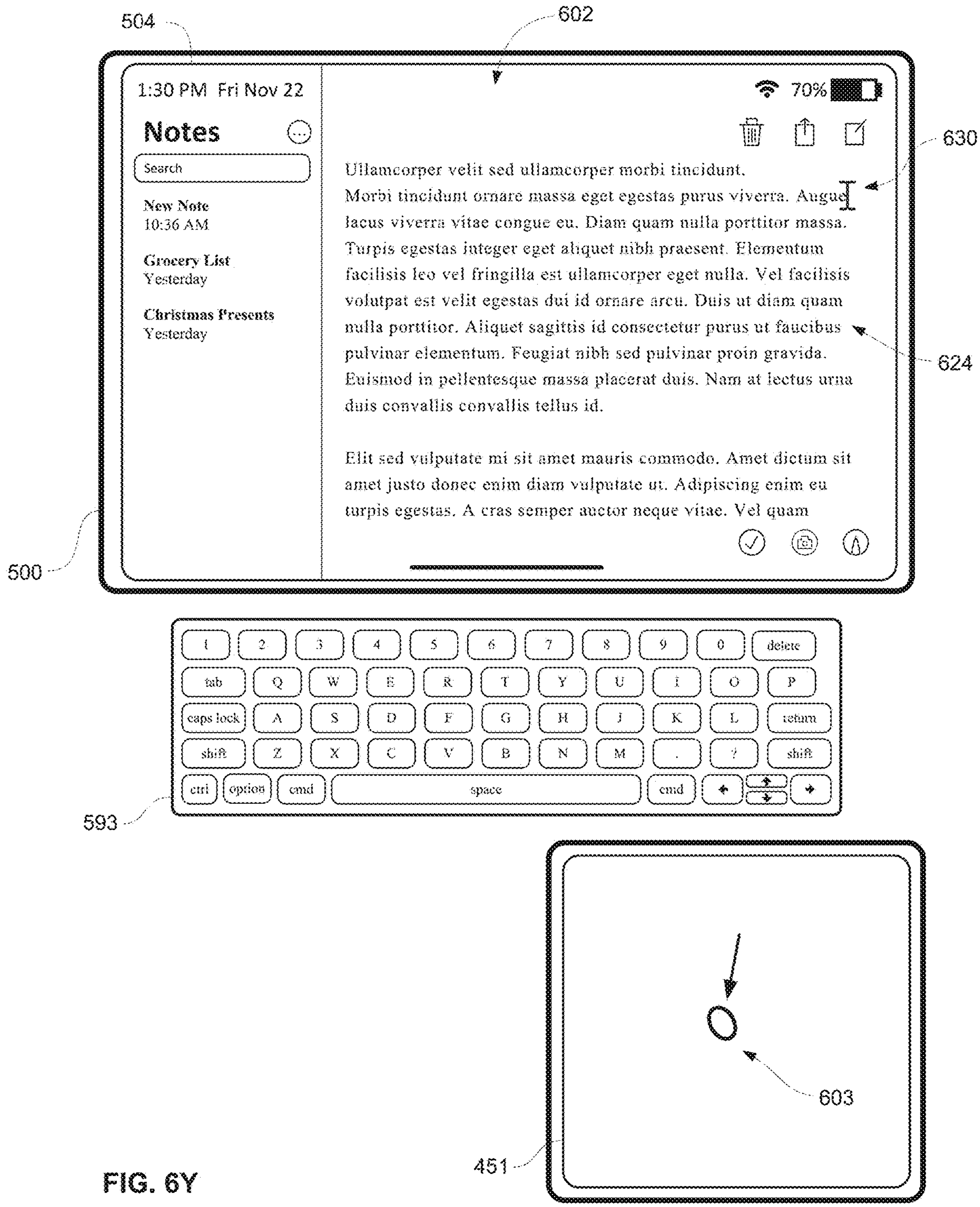

In FIG. 6Y, a user input 603 is received moving cursor 630 to the text in the content viewing and entry region 624 (e.g., a text entry region). In some embodiments, in response to cursor 630 moving to the location of a text entry region, the shape of cursor 630 changes to an I-beam cursor (e.g., an "I" shape). In some embodiments, the content viewing and entry region 624 is selected for input. In some embodiments, the content viewing and entry region 624 is not selected for input until the user performs a selection input while cursor 630 is within the content viewing and entry region 624, as will be described in more detail below.

Figure 6Z:
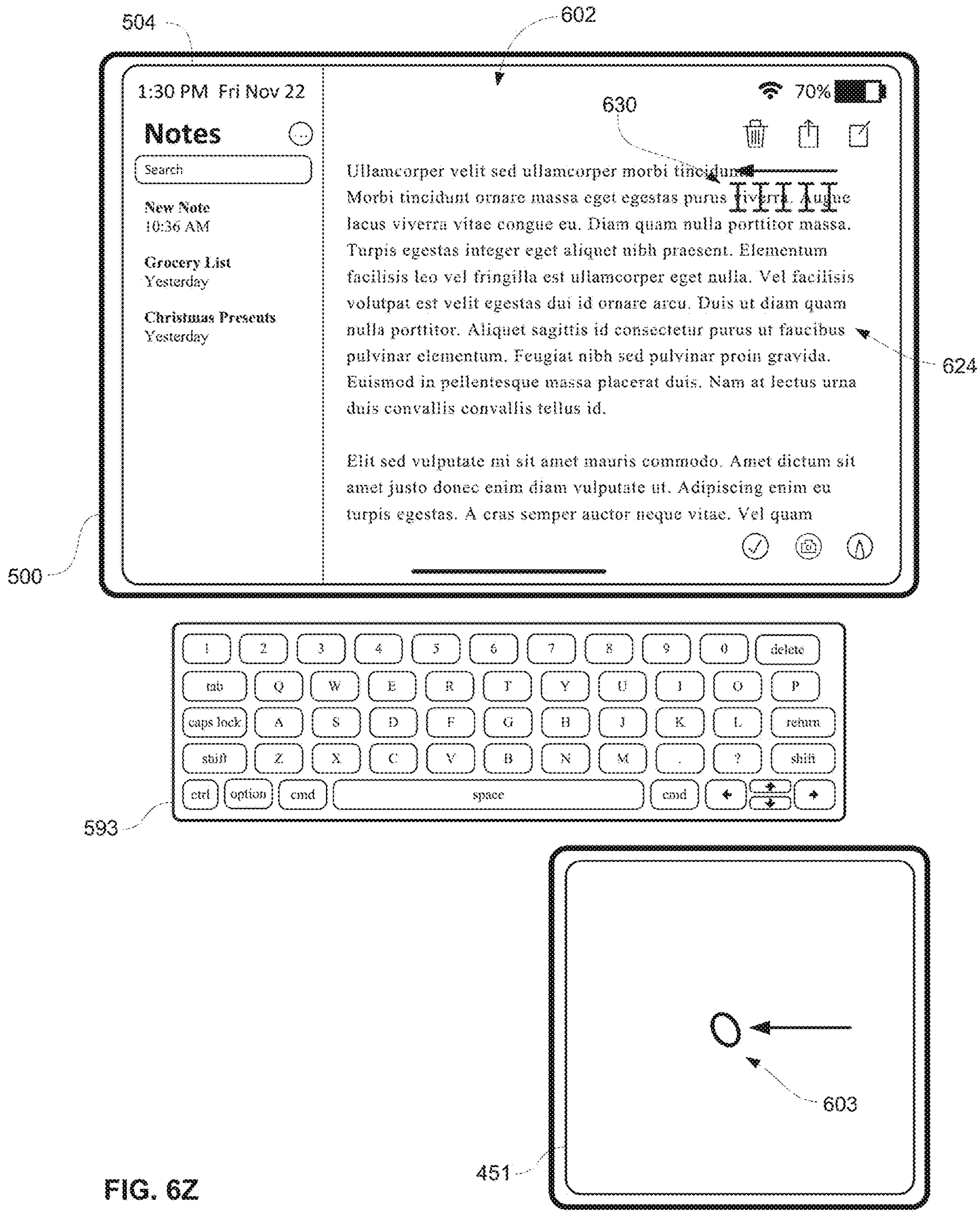
Figure 6A:
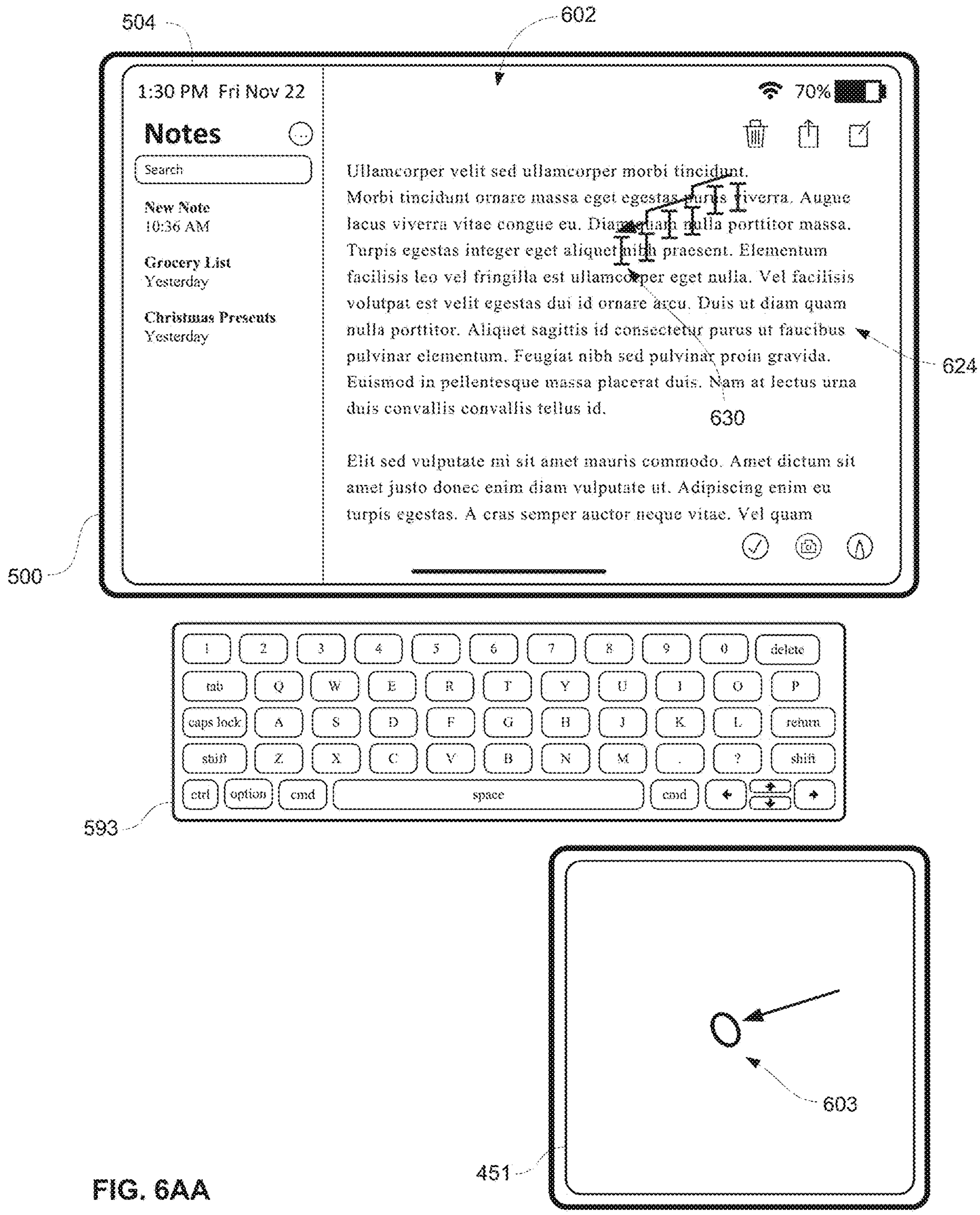
Figure 6A:
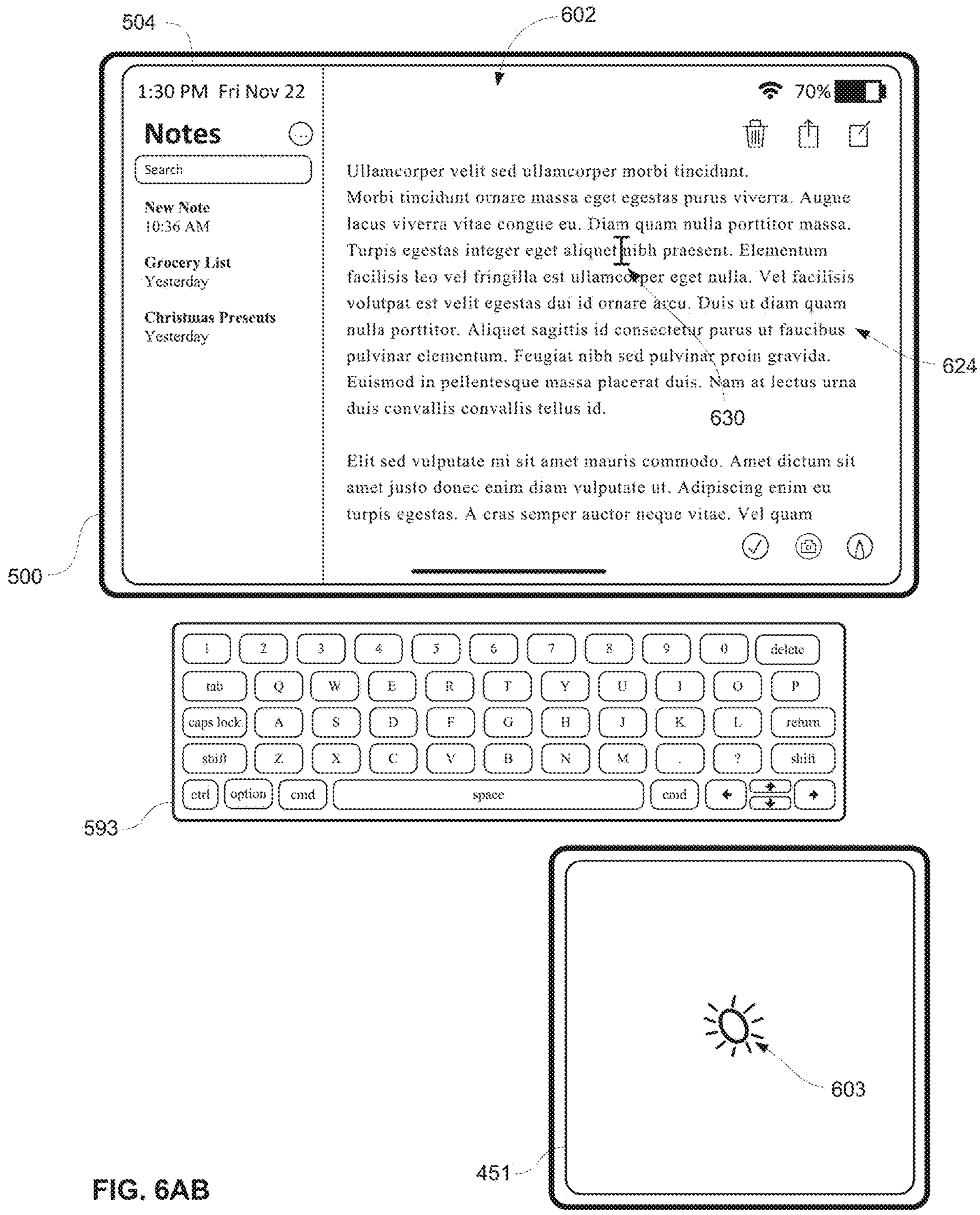
Figure 6A:
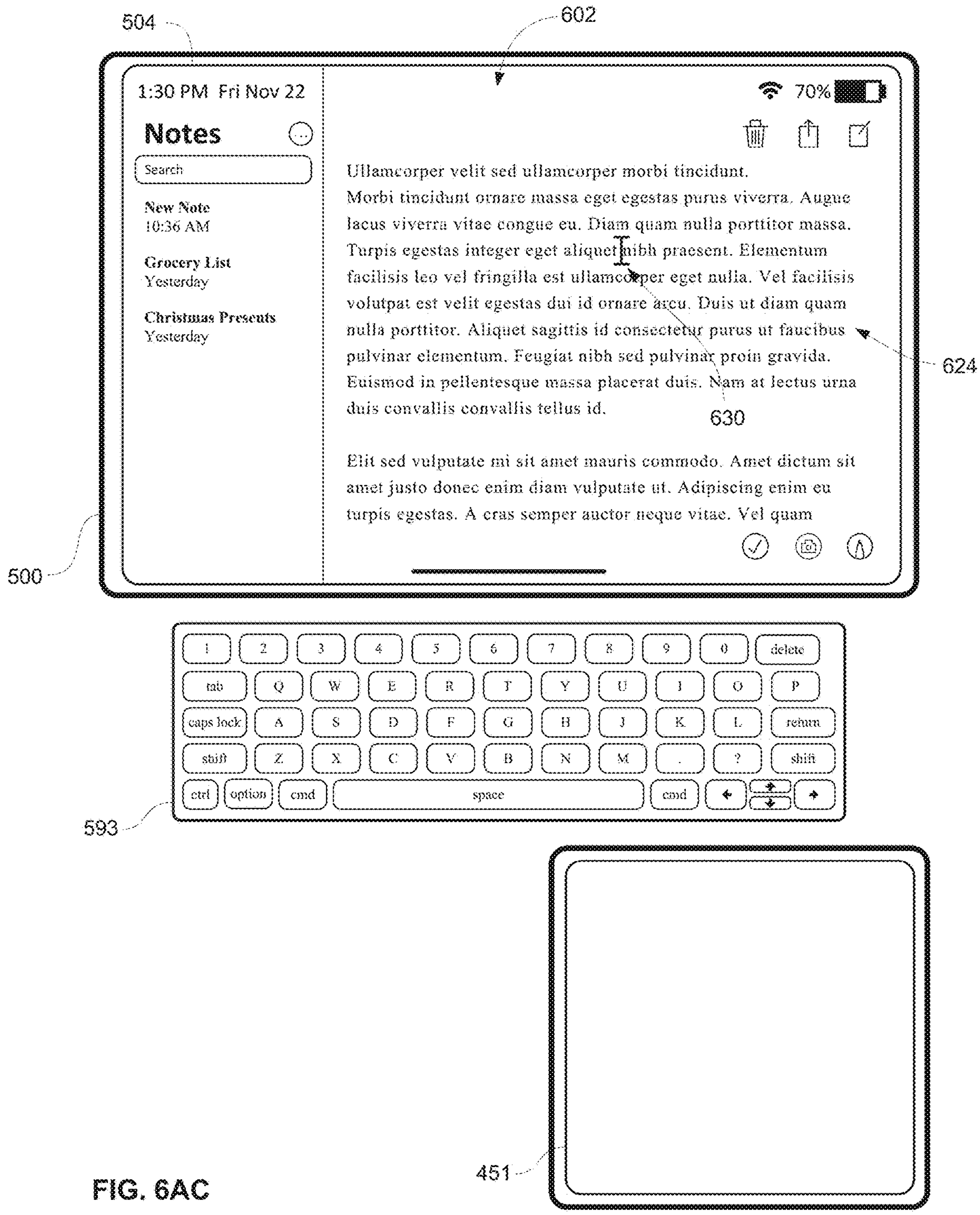
Figure 6A:
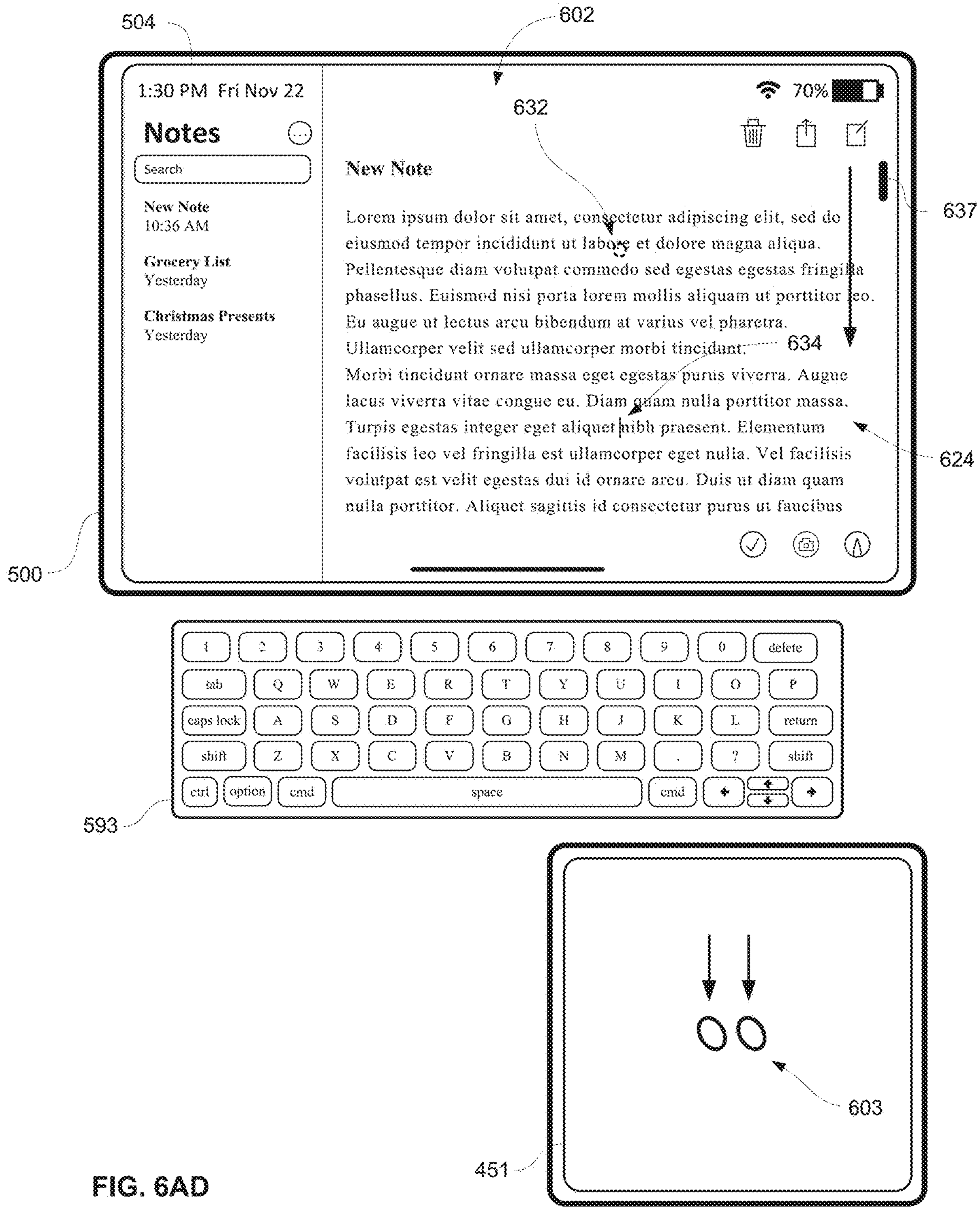
Figure 6A:
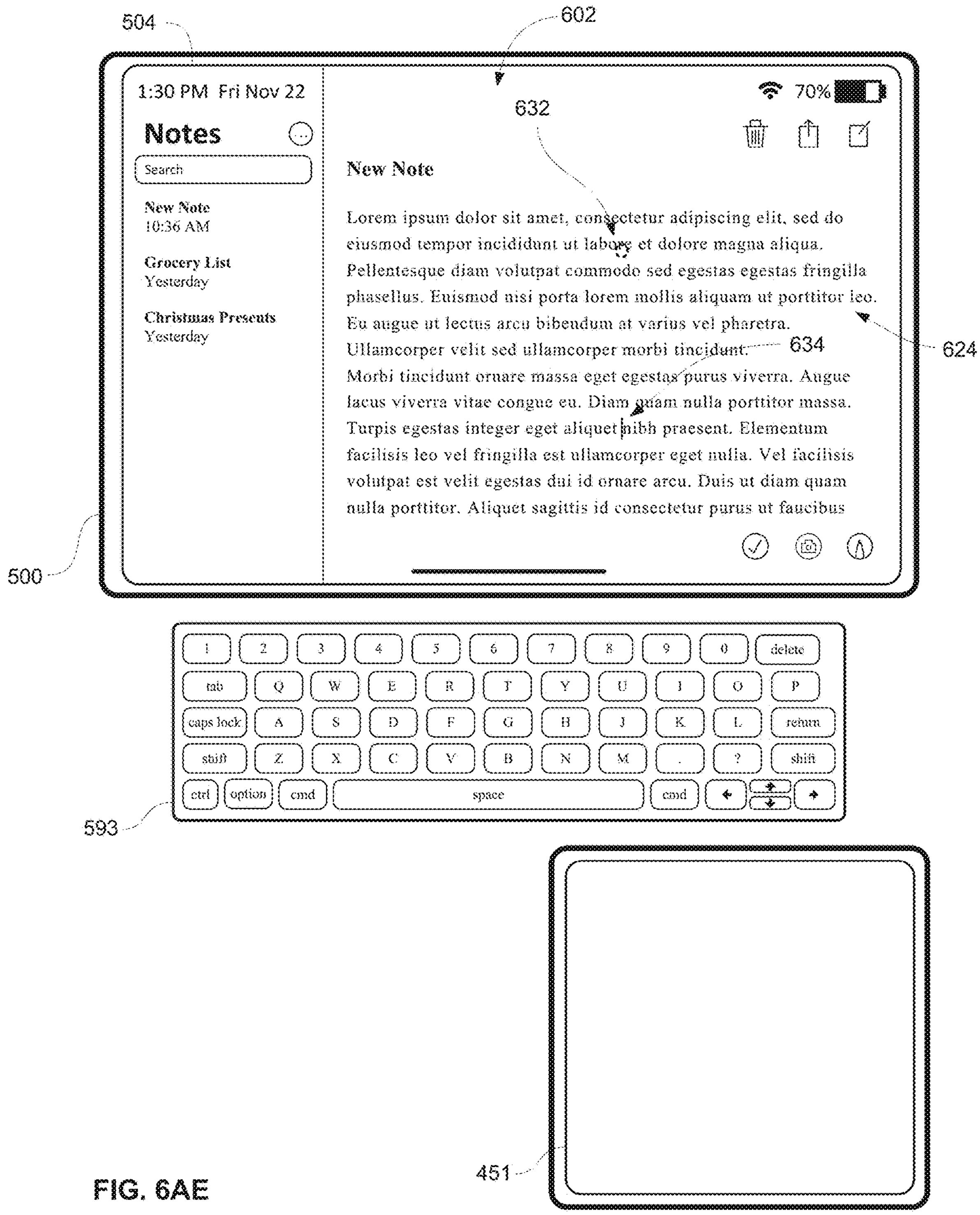
Figure 6A:
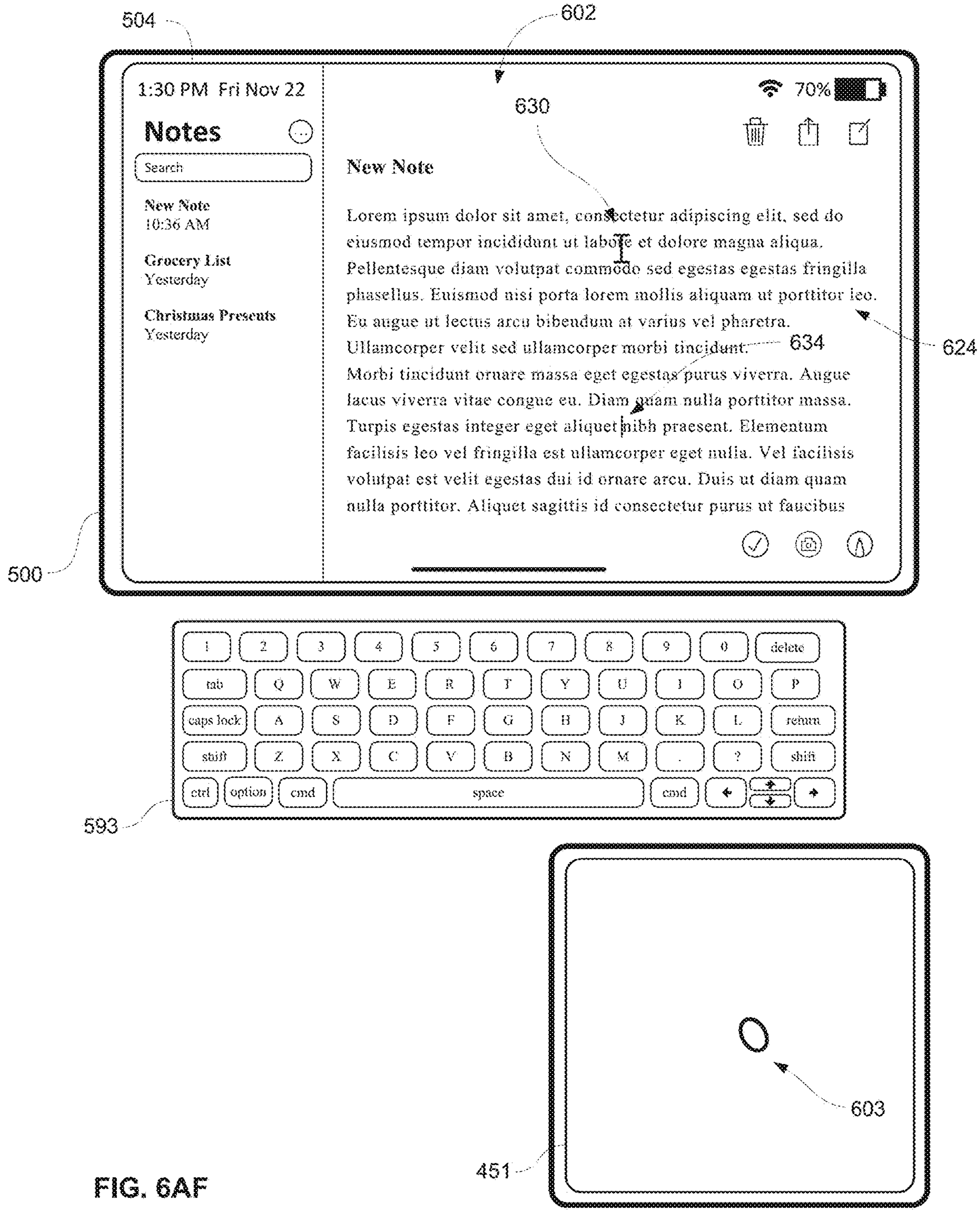
Figure 6A:
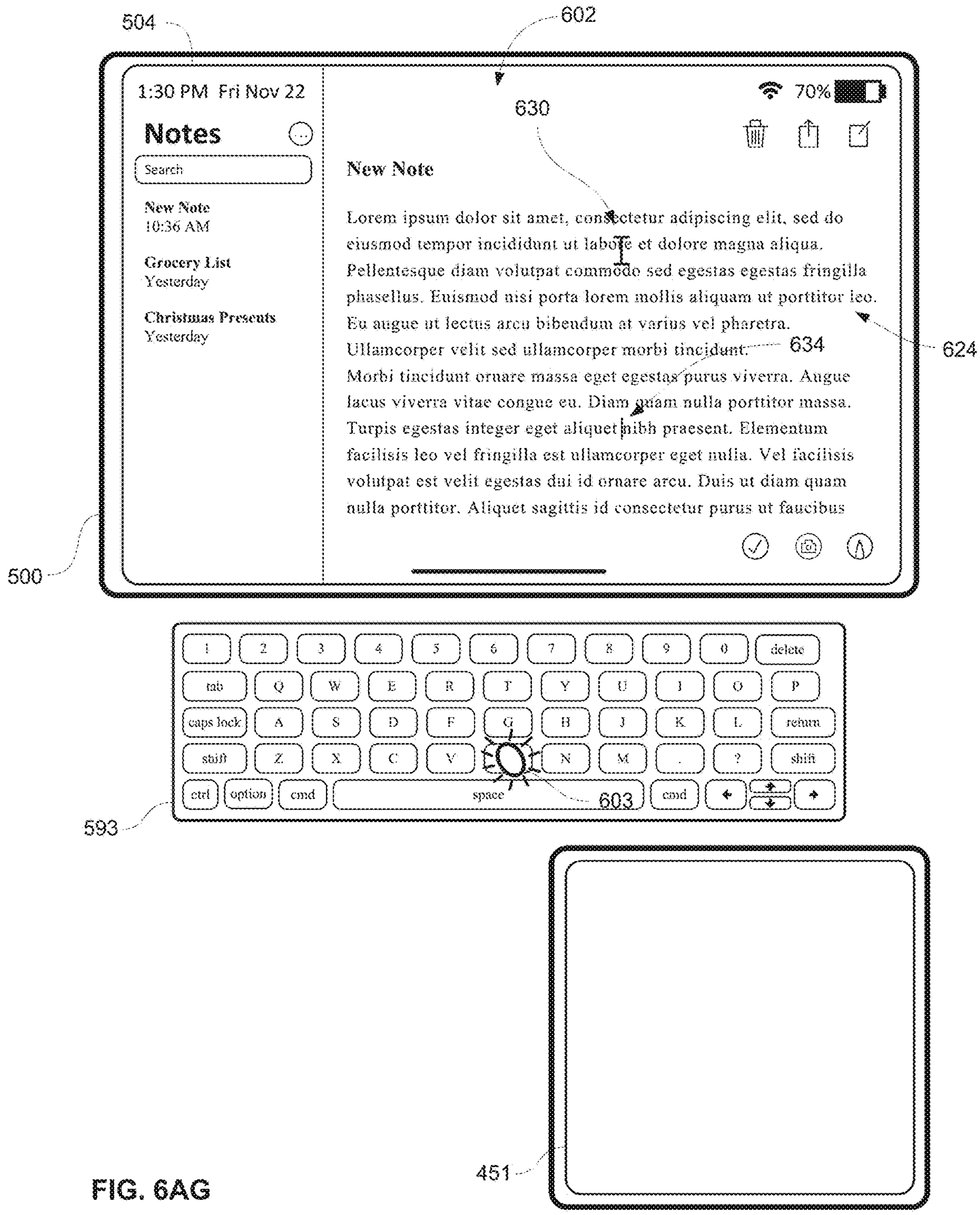
Figure 6A:
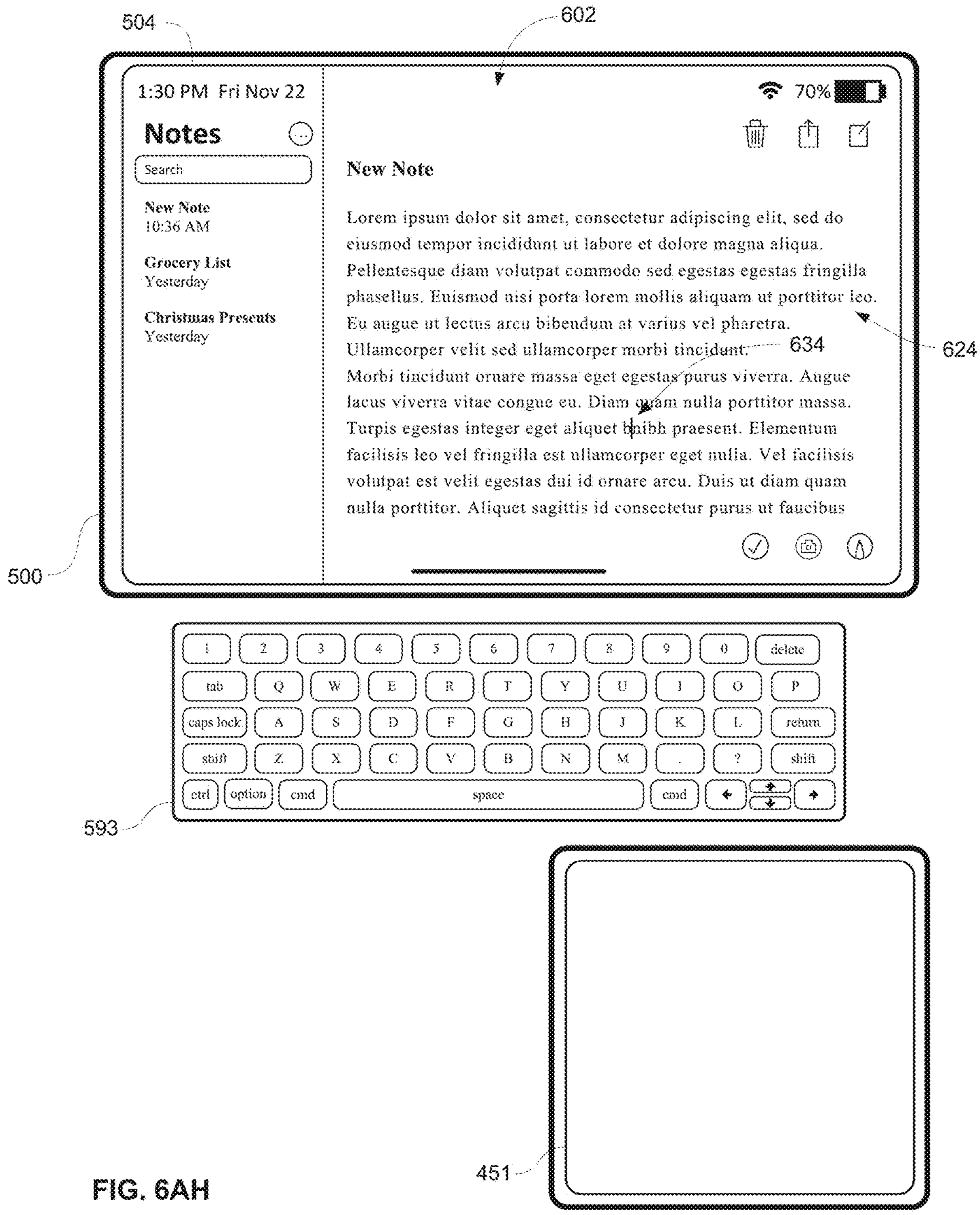
Figure 6A:
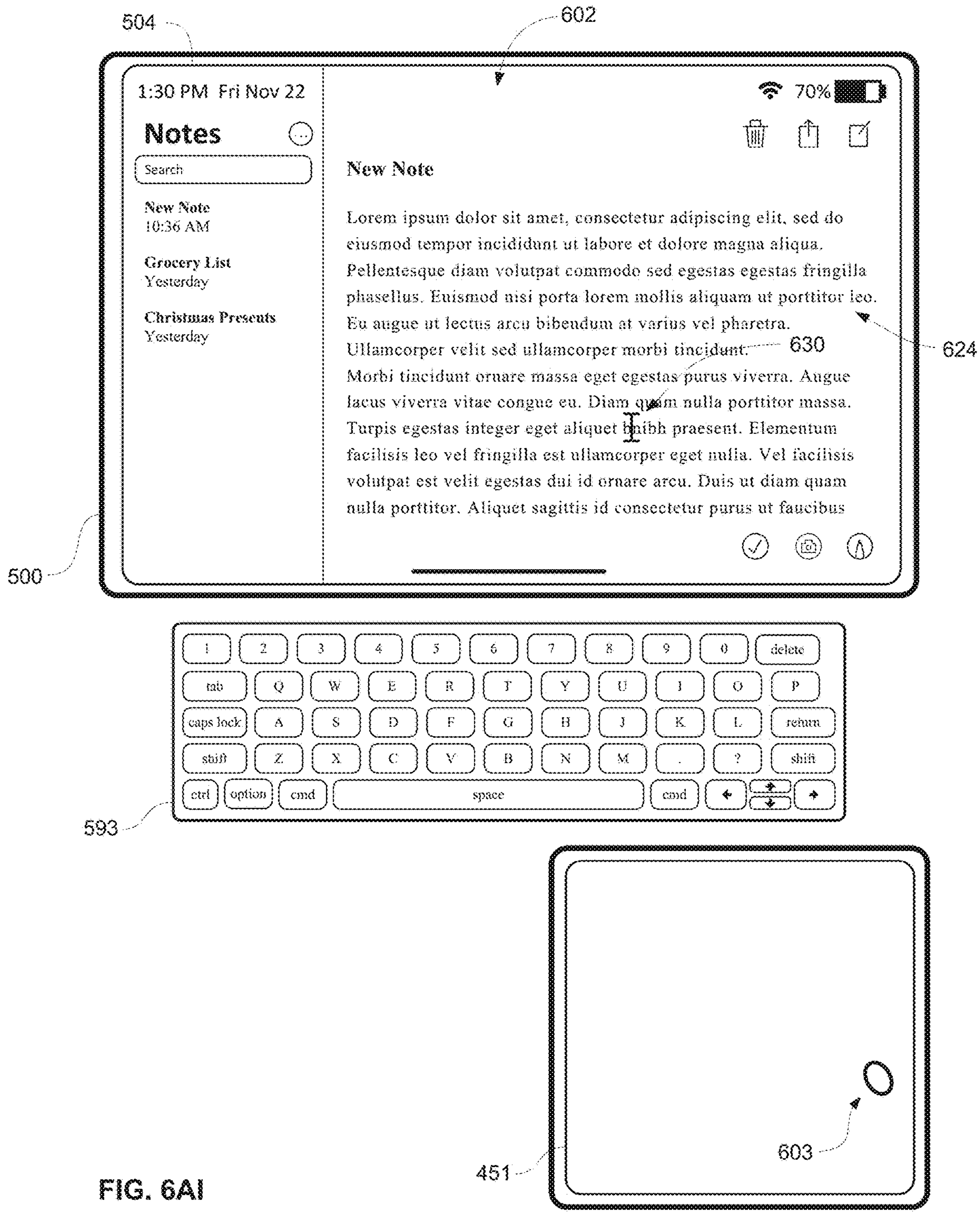
Figure 6A:
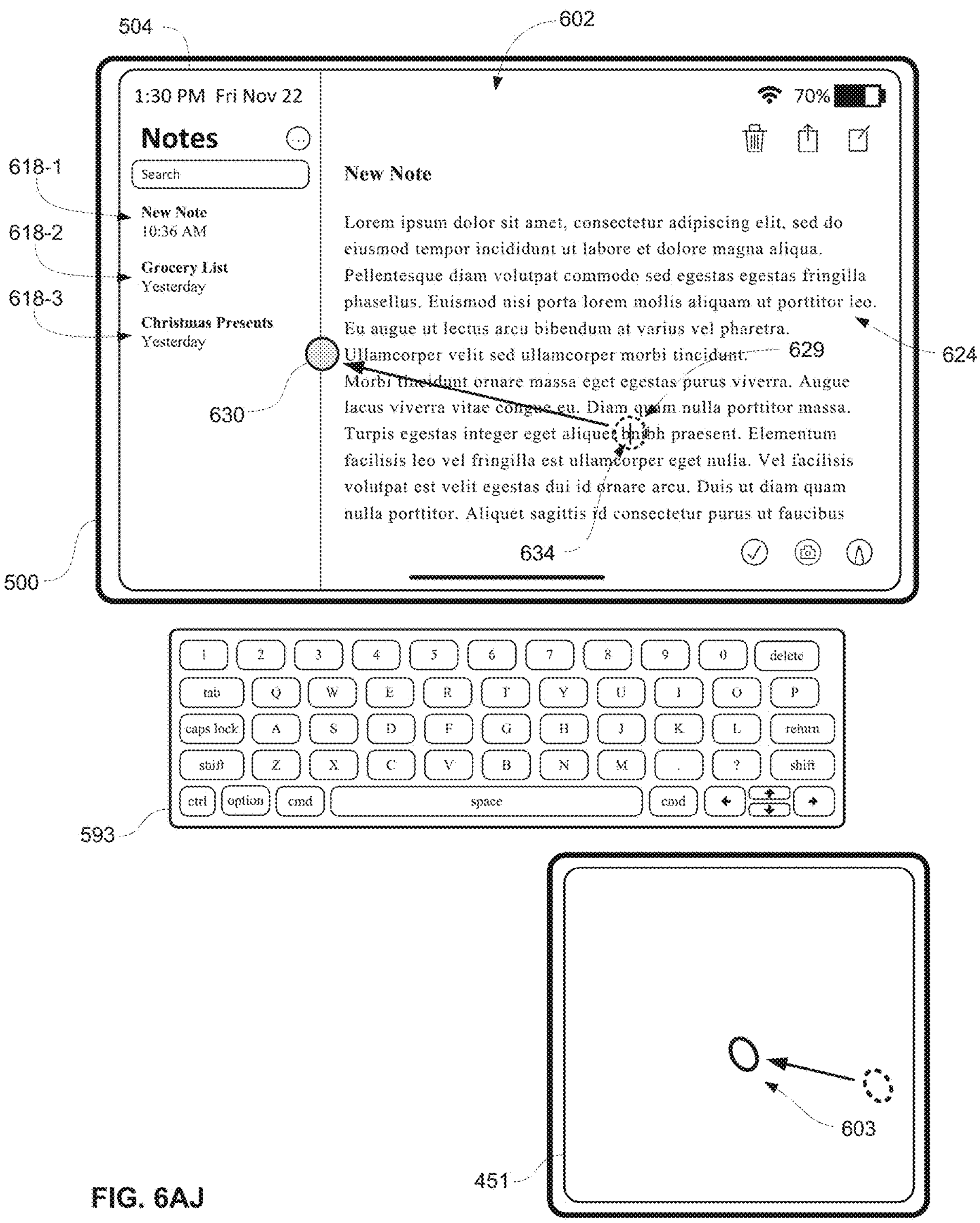
Figure 6A:
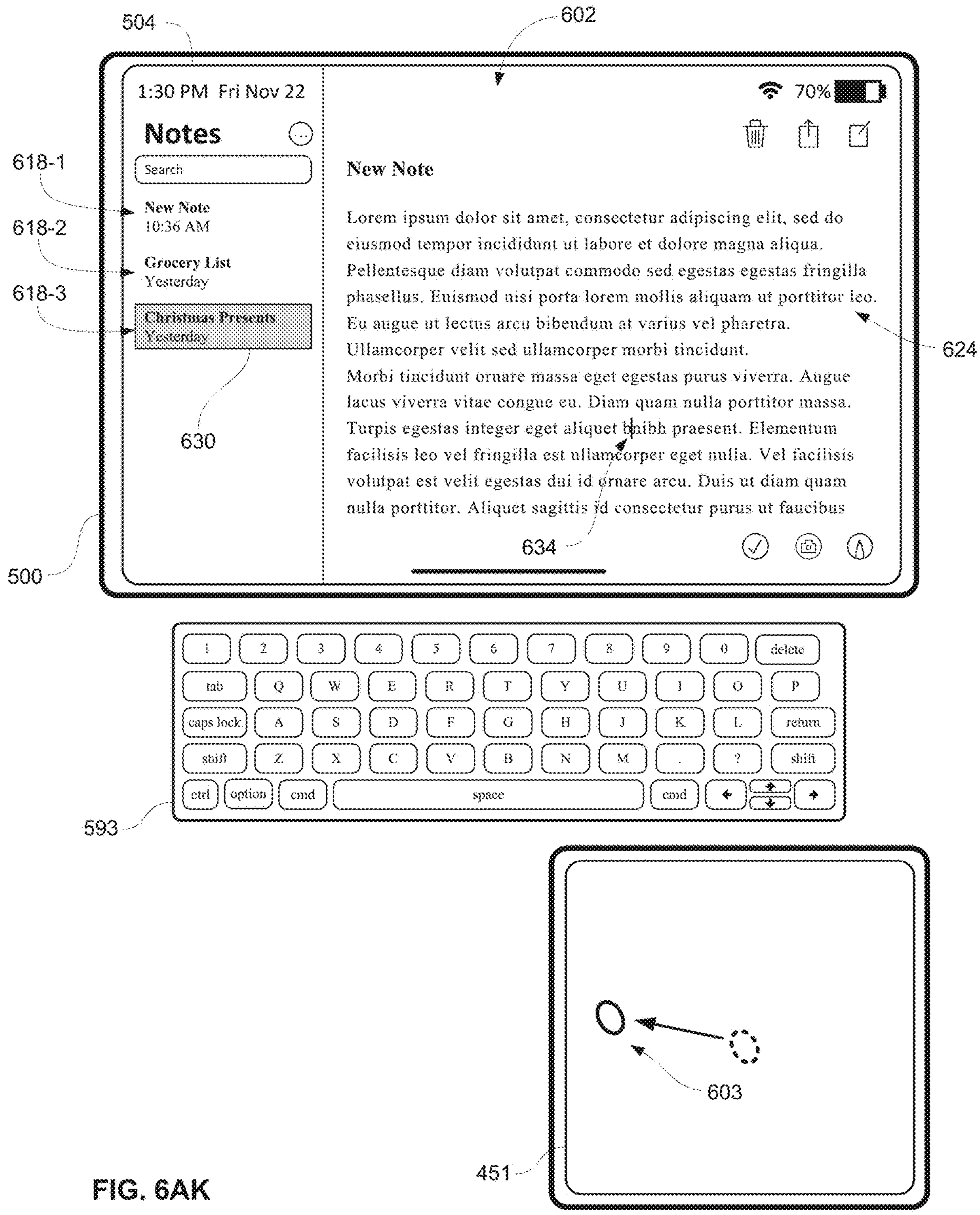
Figure 6A:
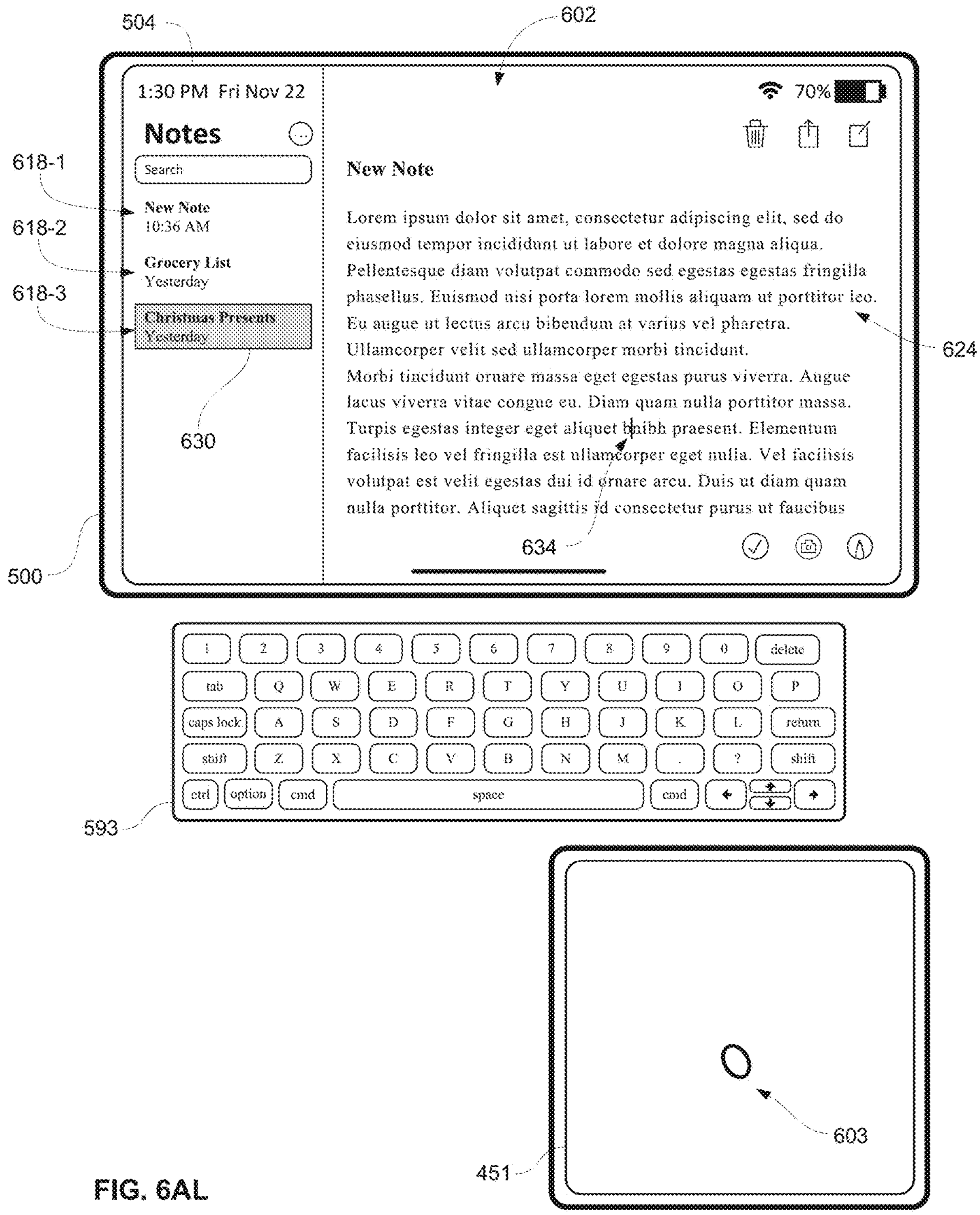
Figure 6A:
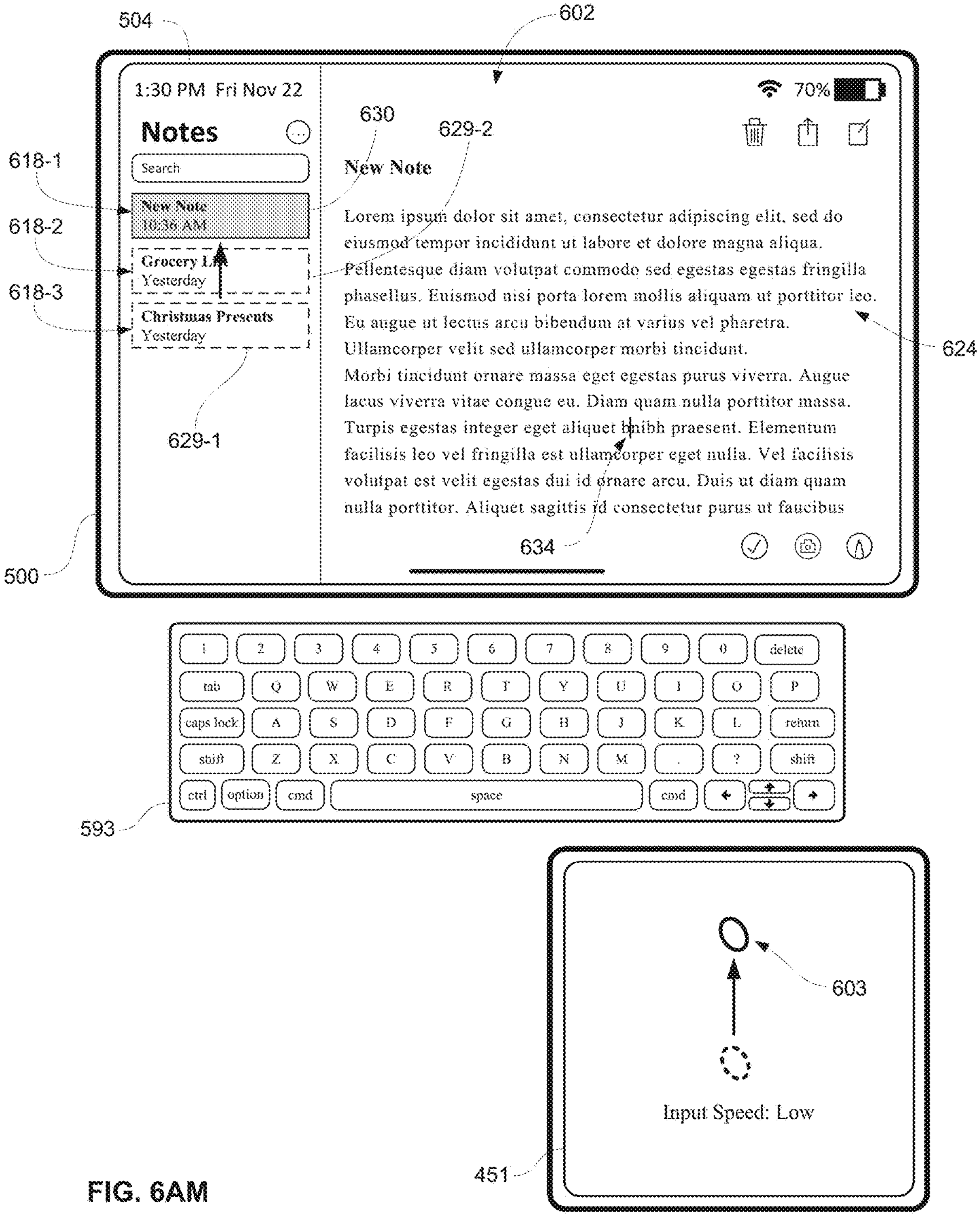
Figure 6A:
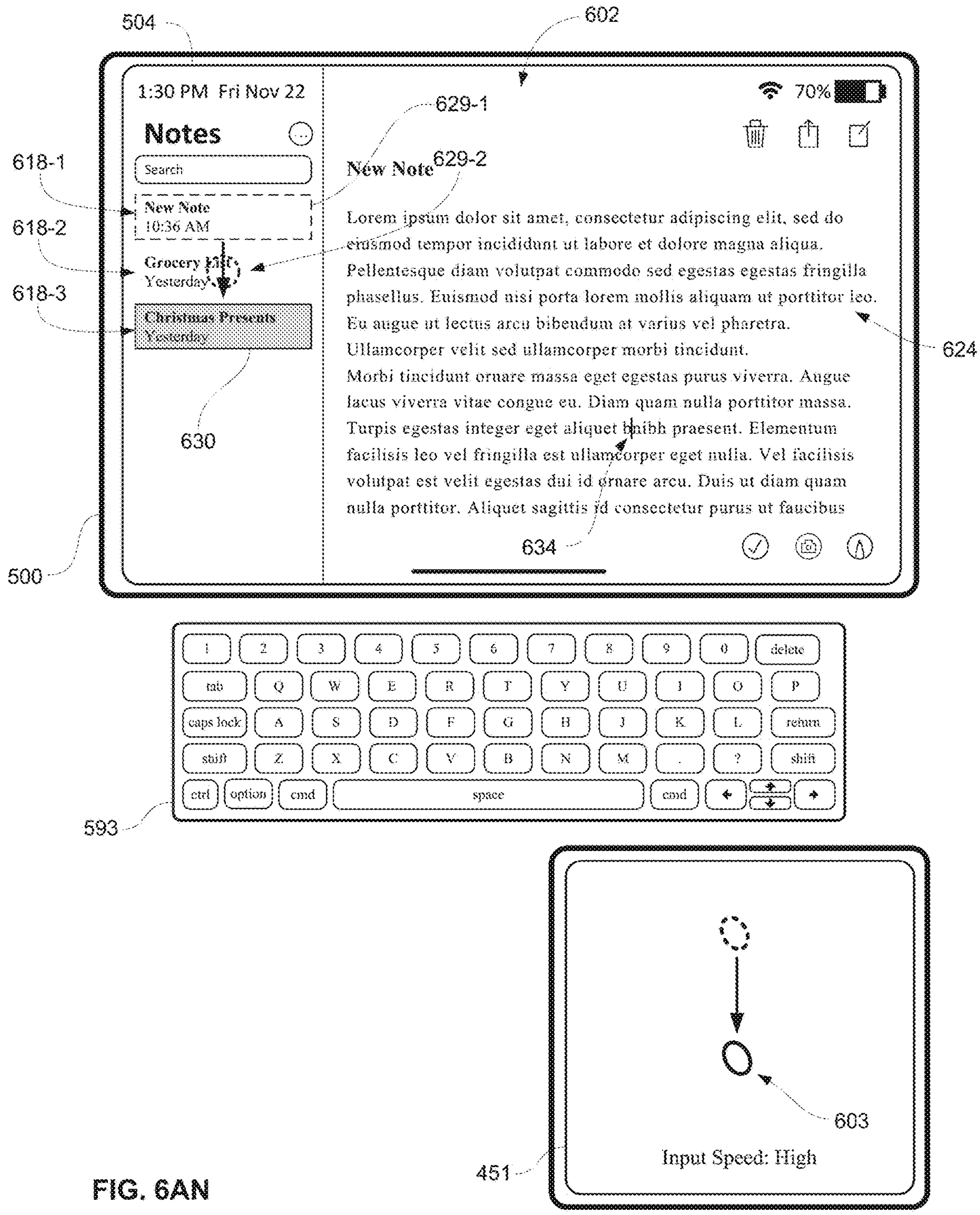
Figure 6A:
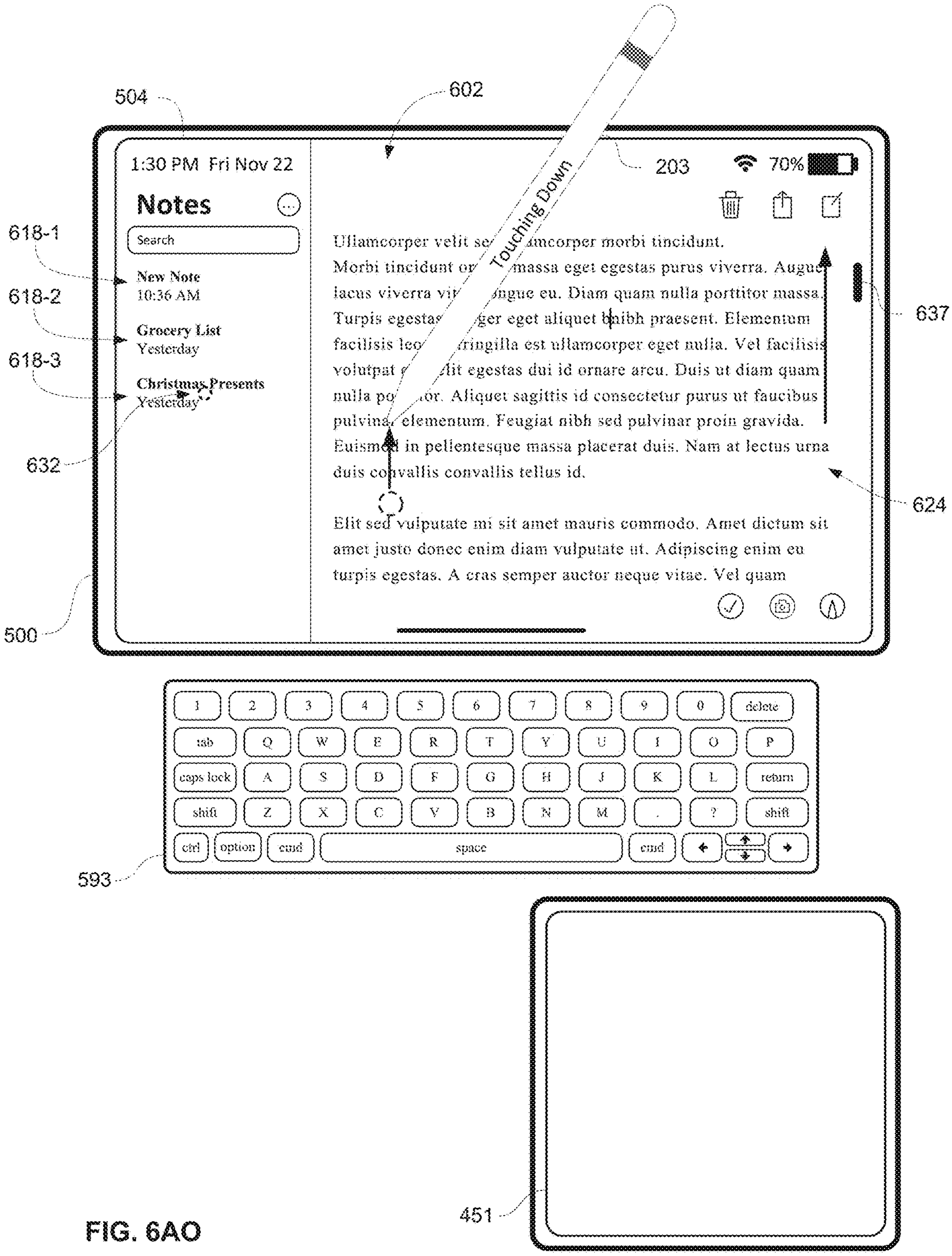
Figure 6A:
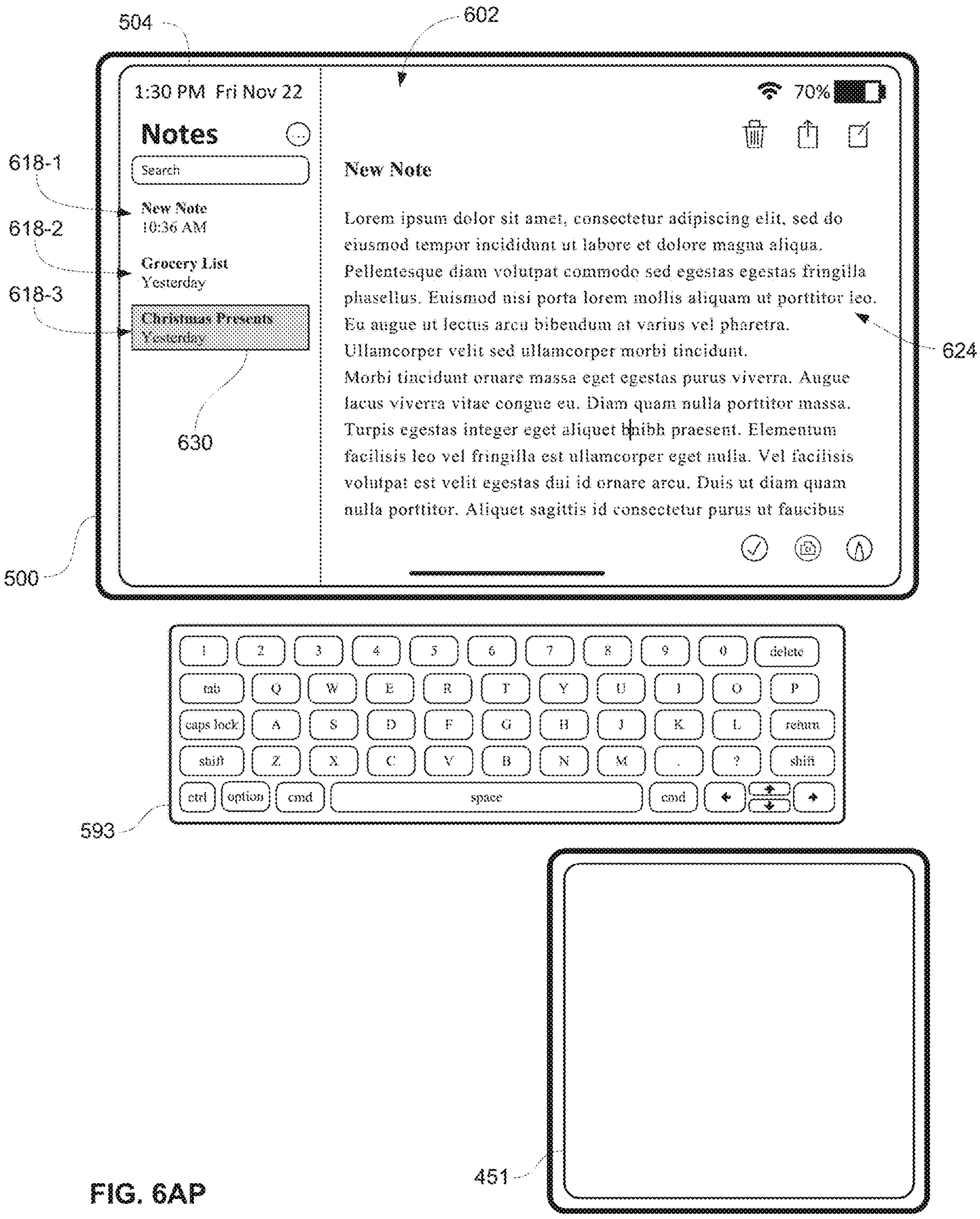
Figure 6A:
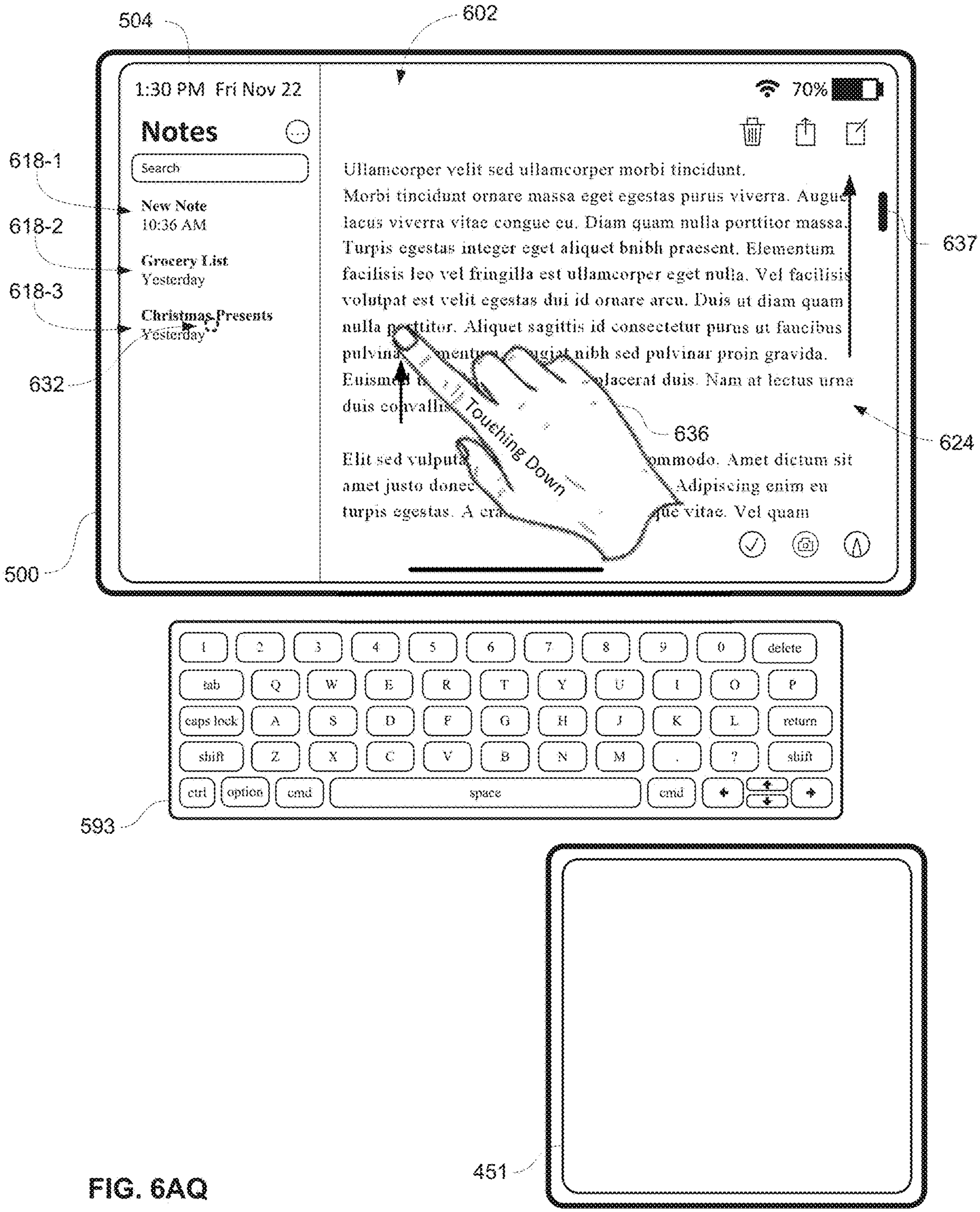
Figure 6A:
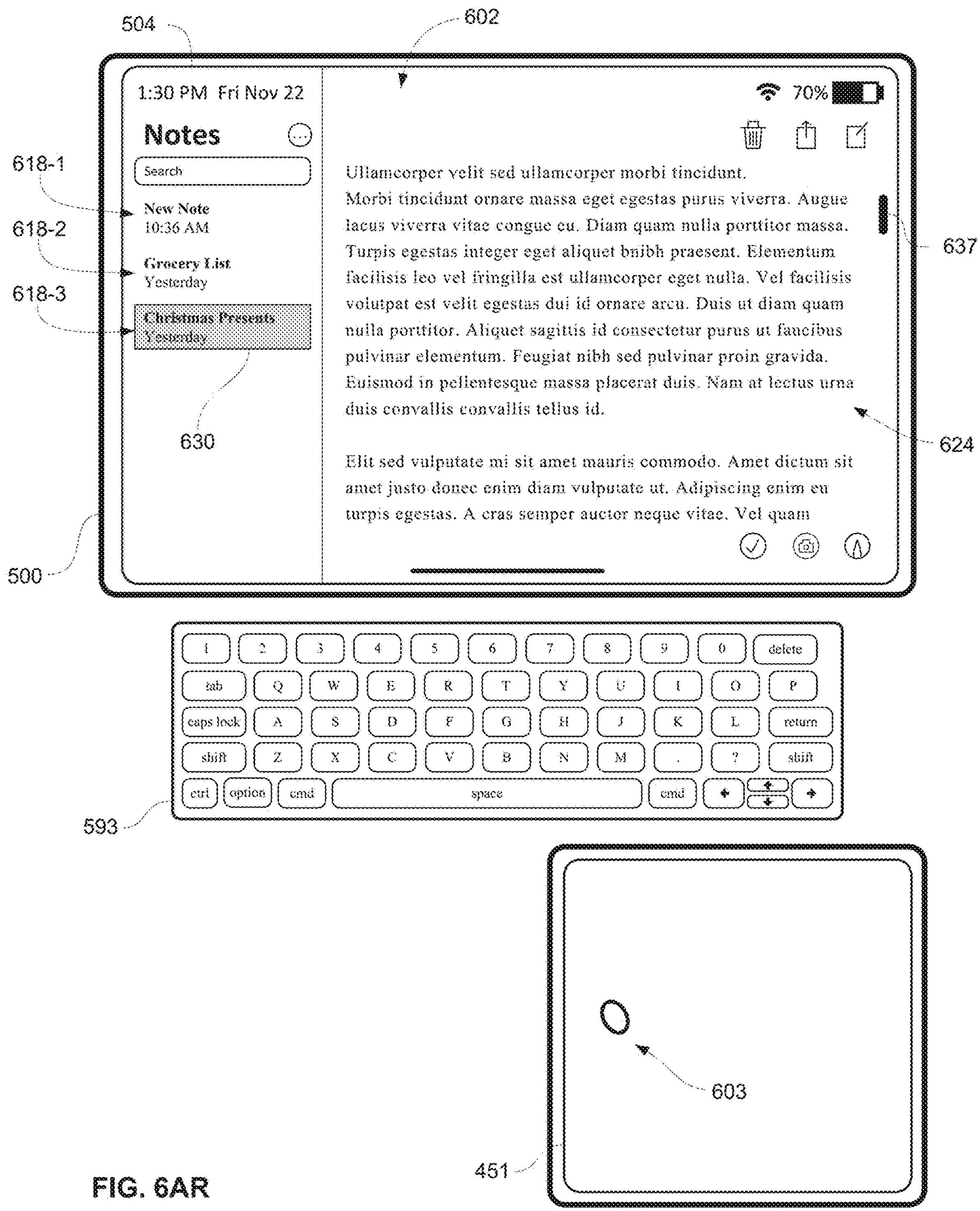
Figure 6A:
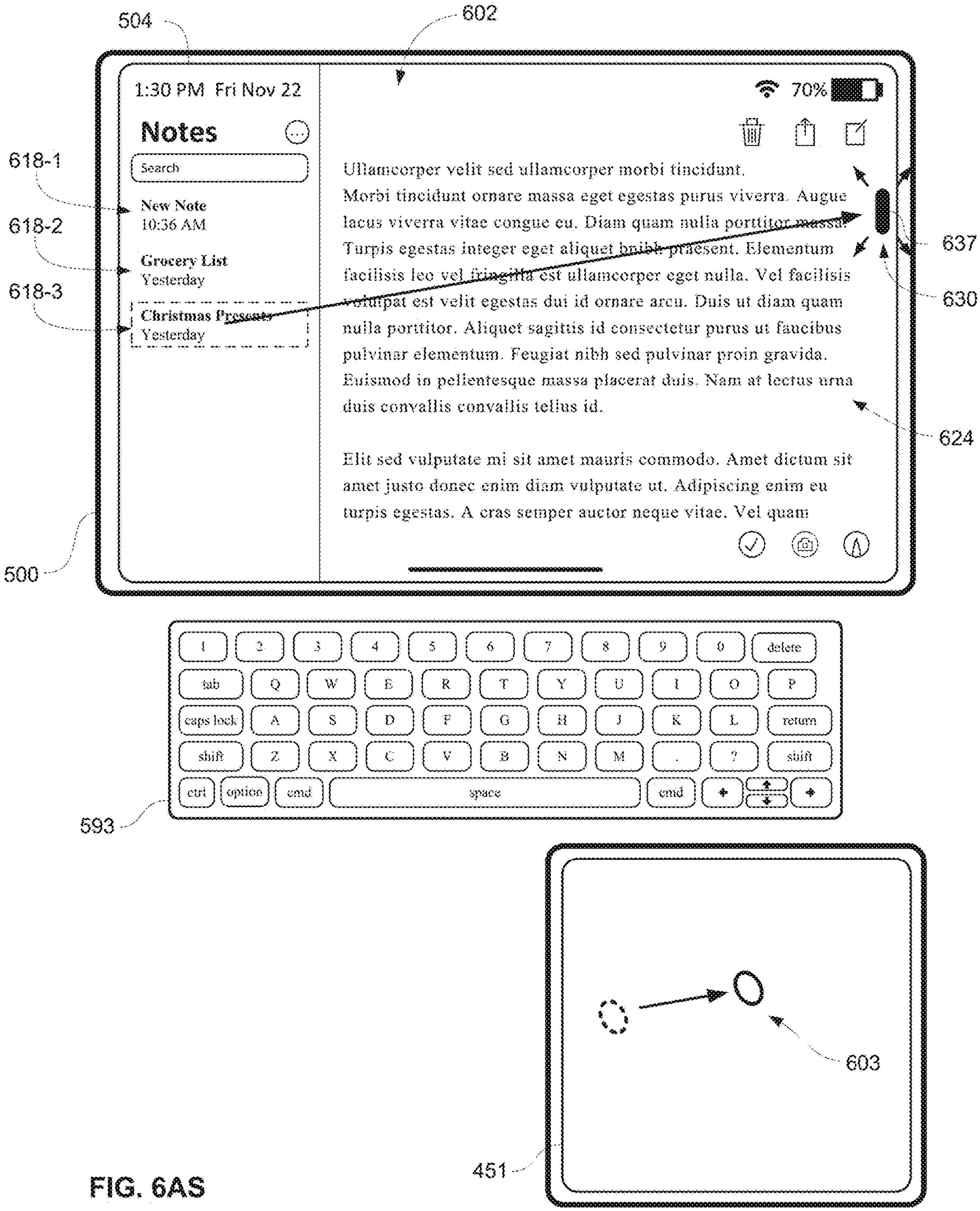
Figure 6A:
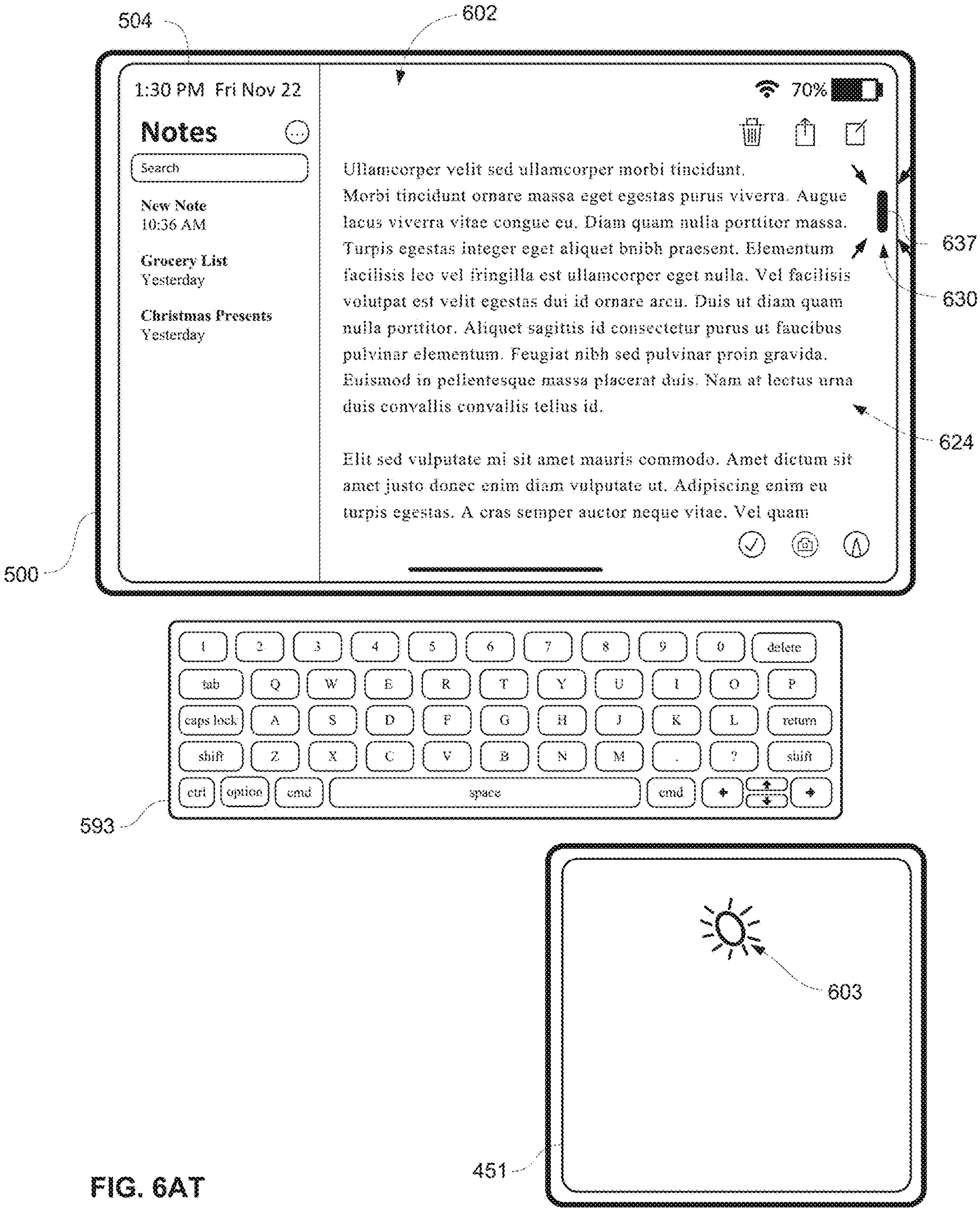
Figure 6A:
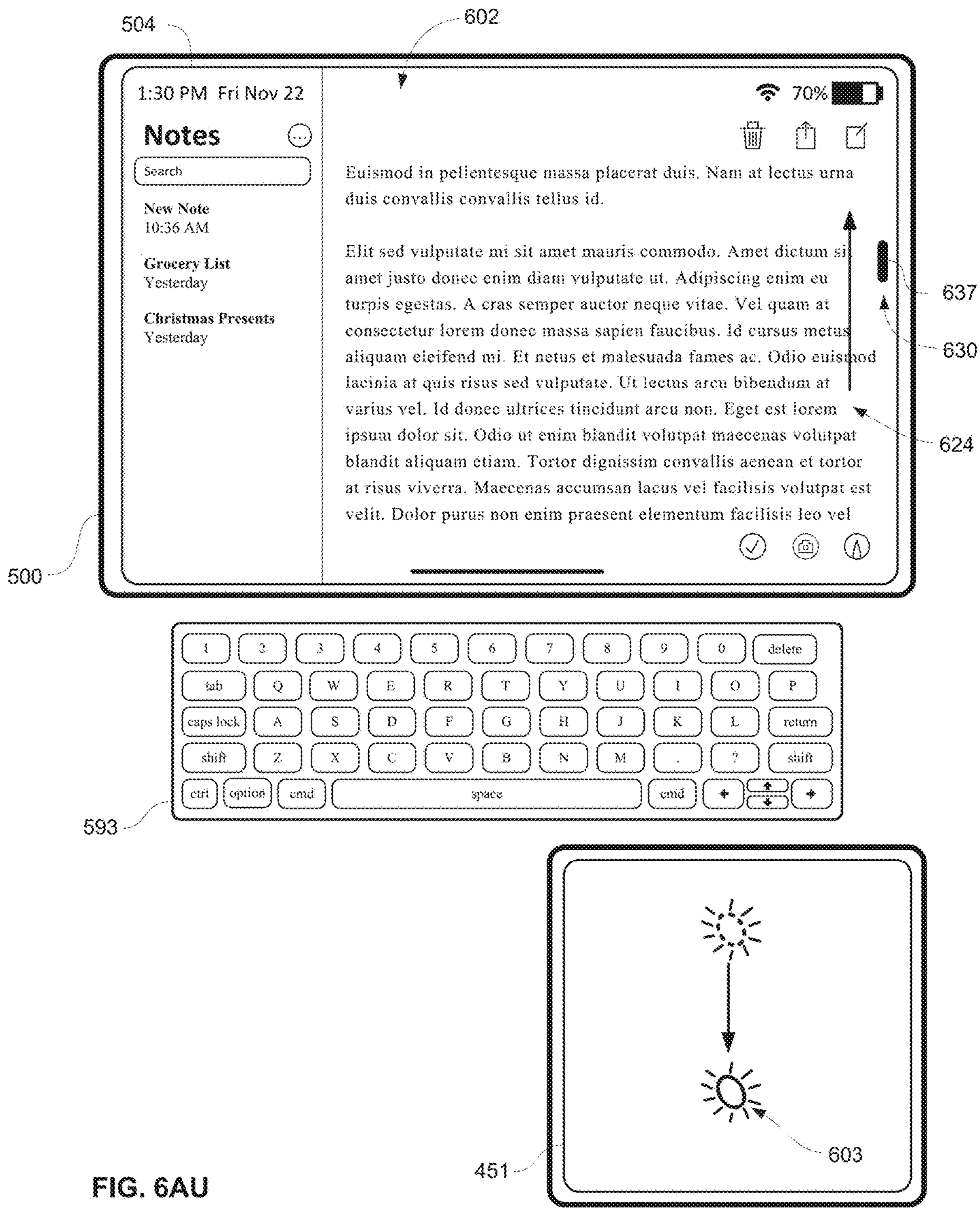
Figure 6A:
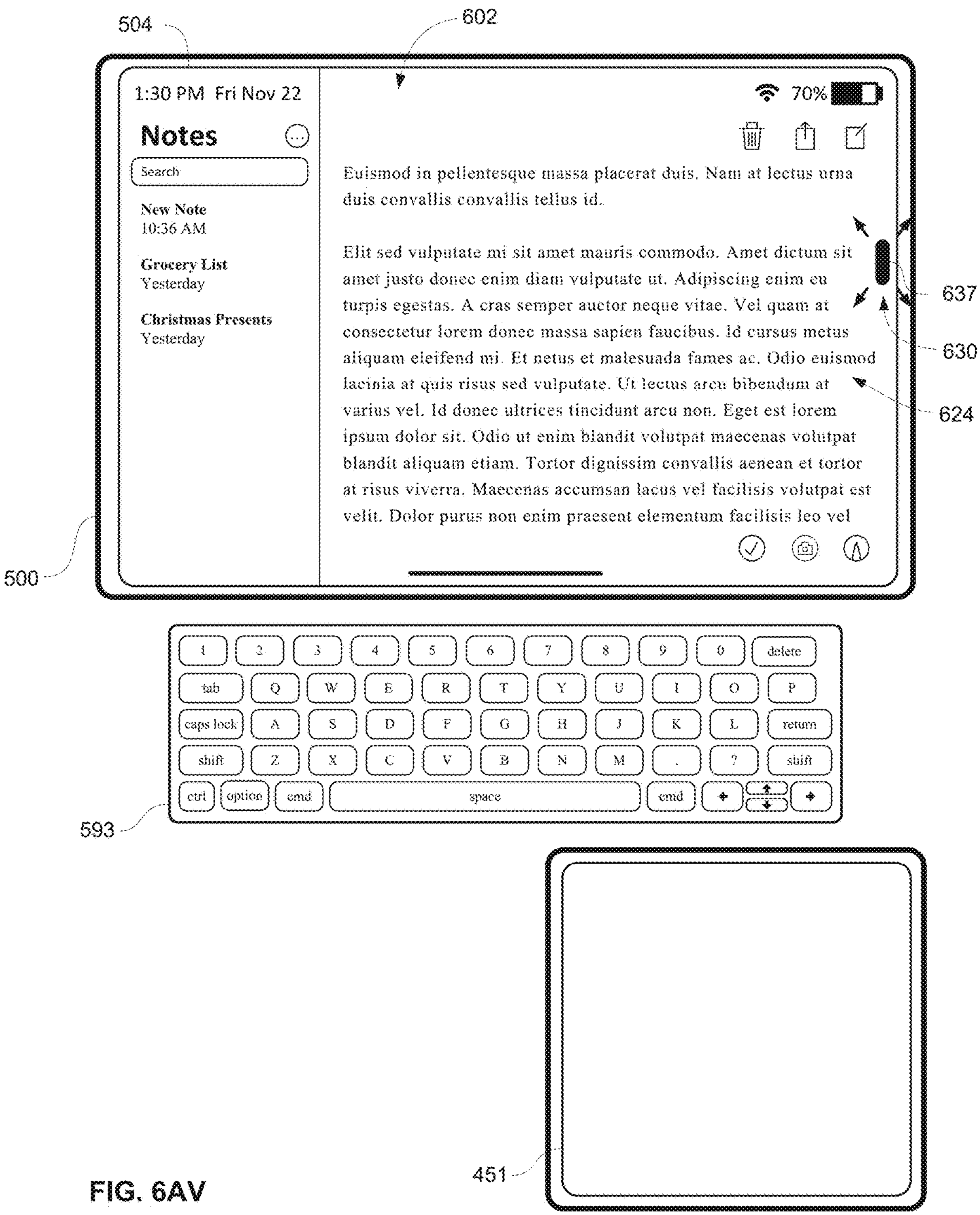
Figure 6A:
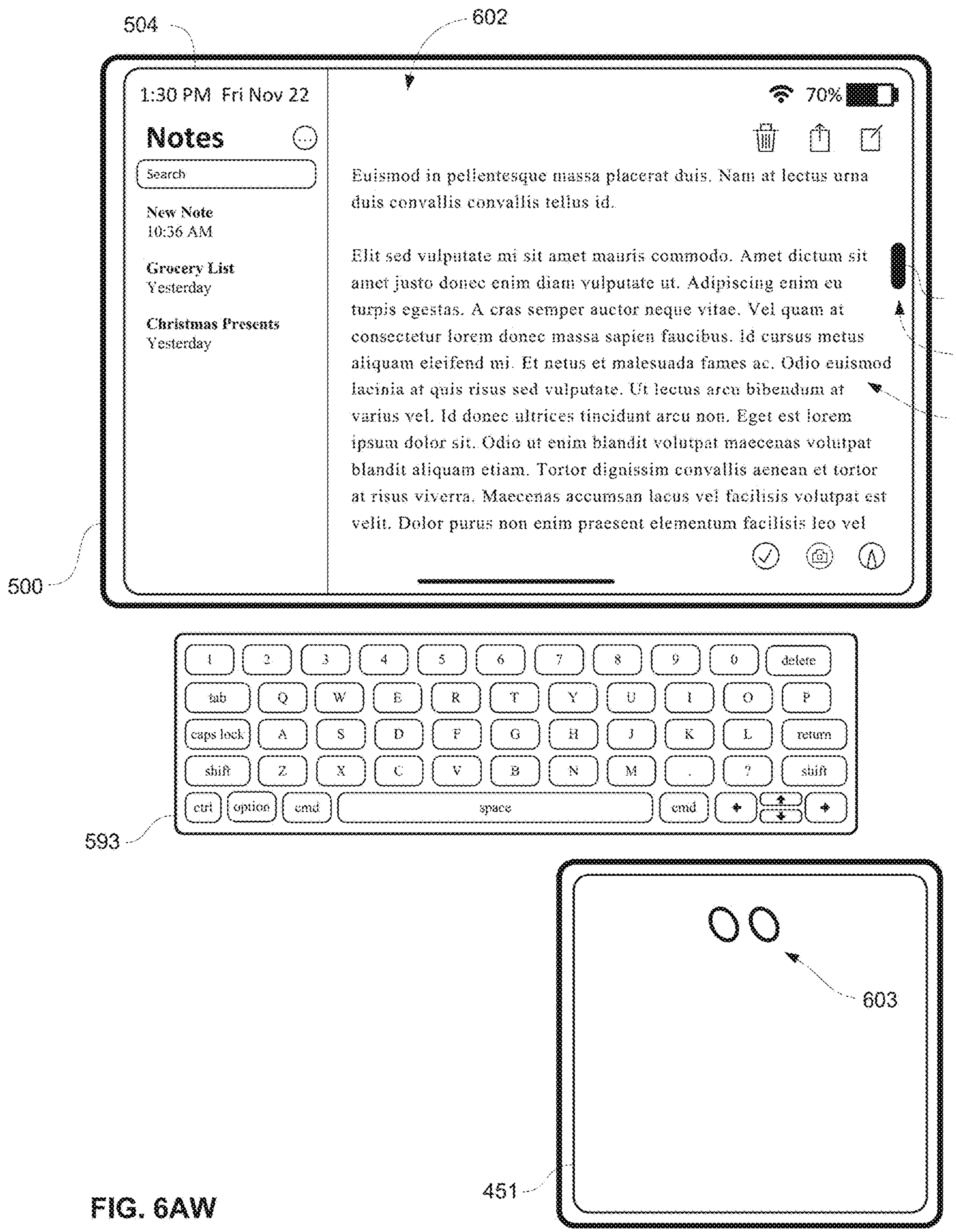
Figure 6A:
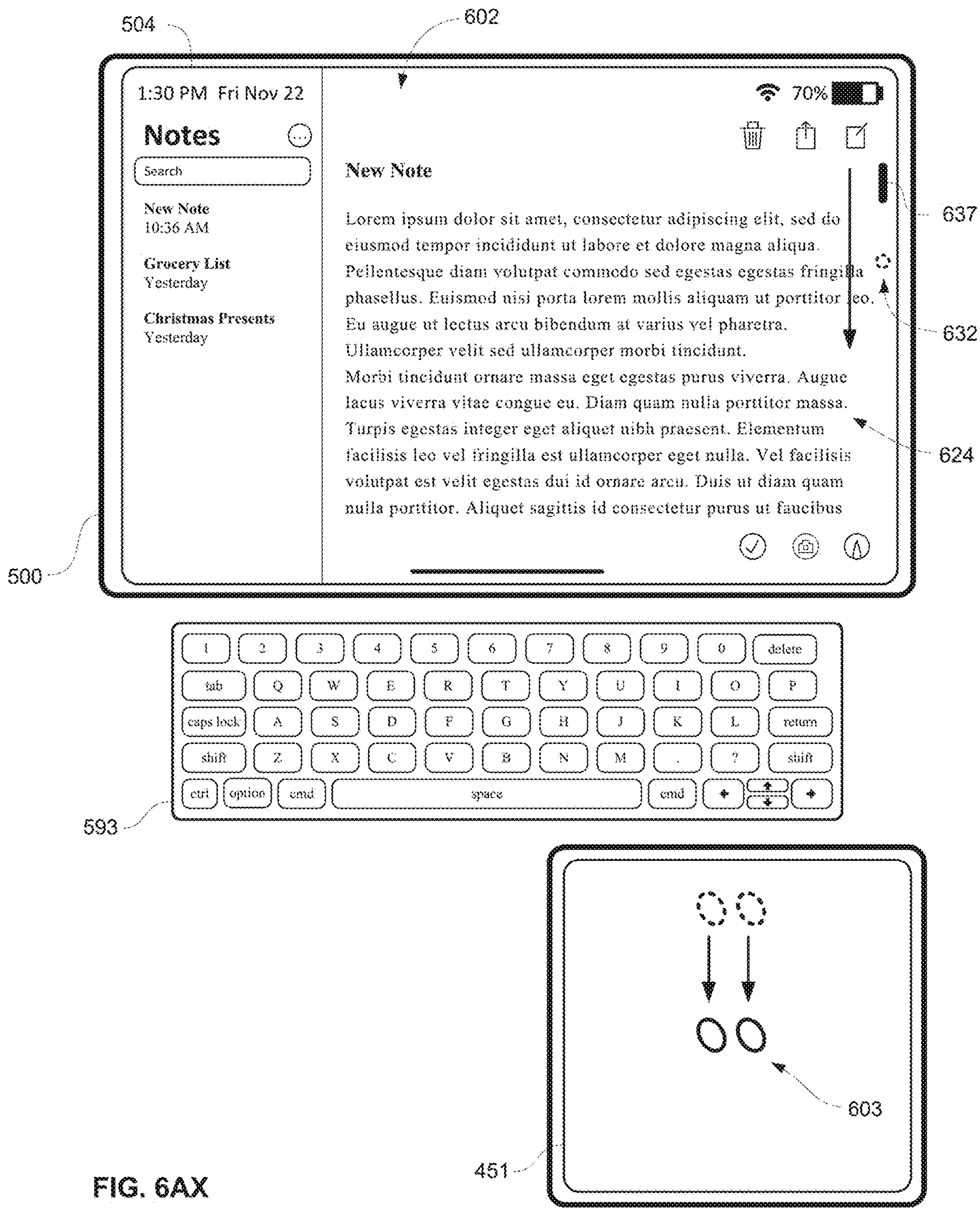
Figure 6A:
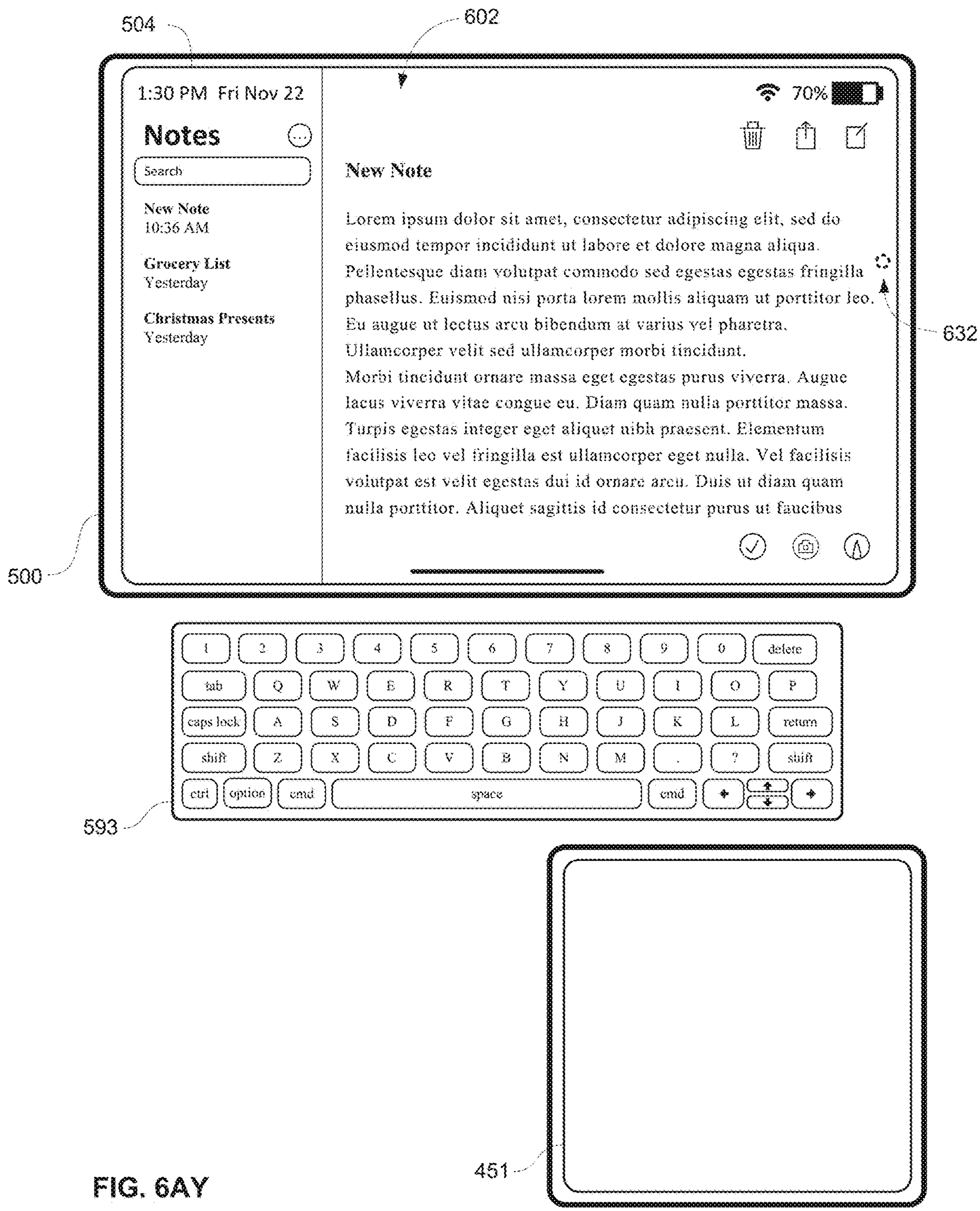
Figure 6A:
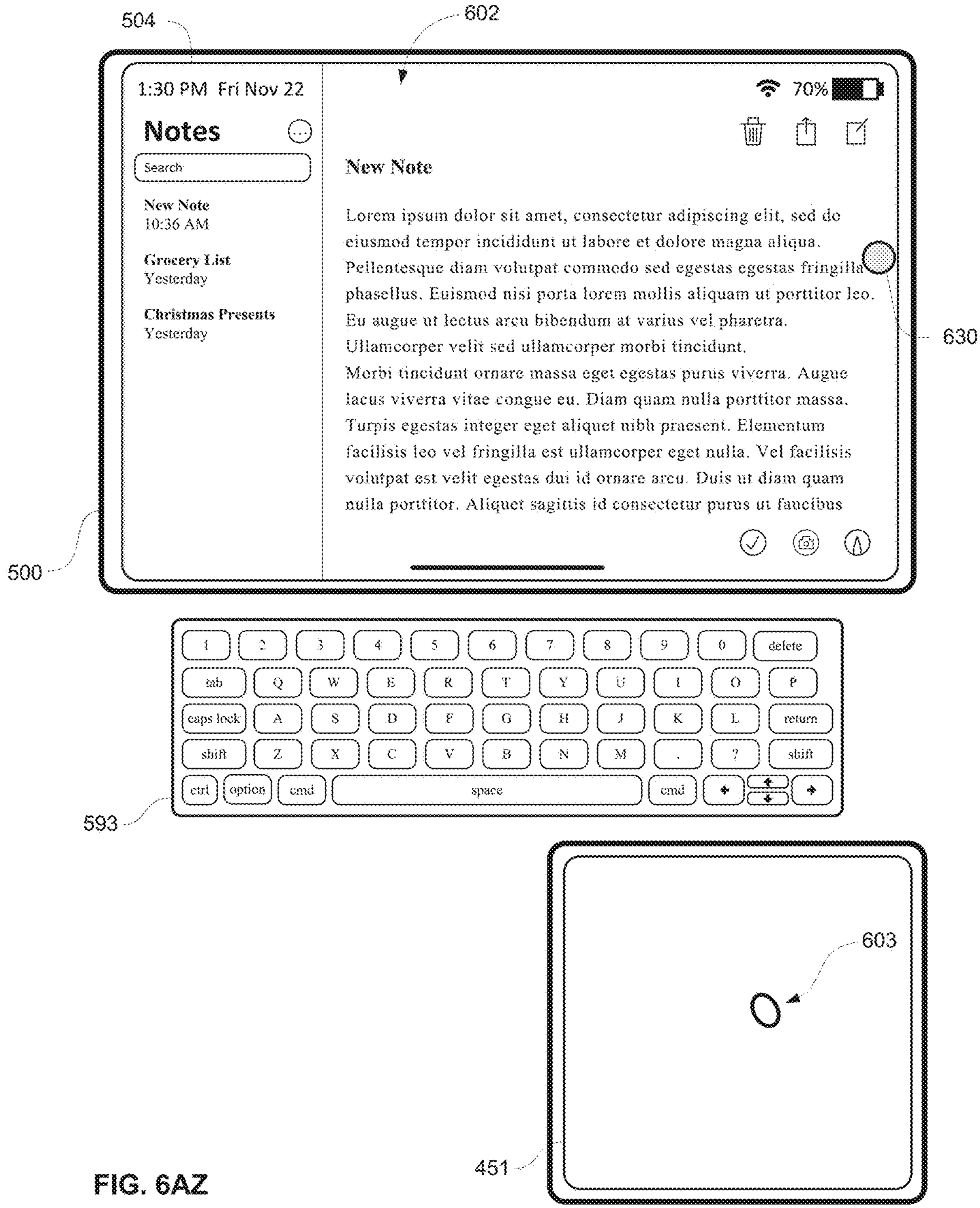
Figure 6B:
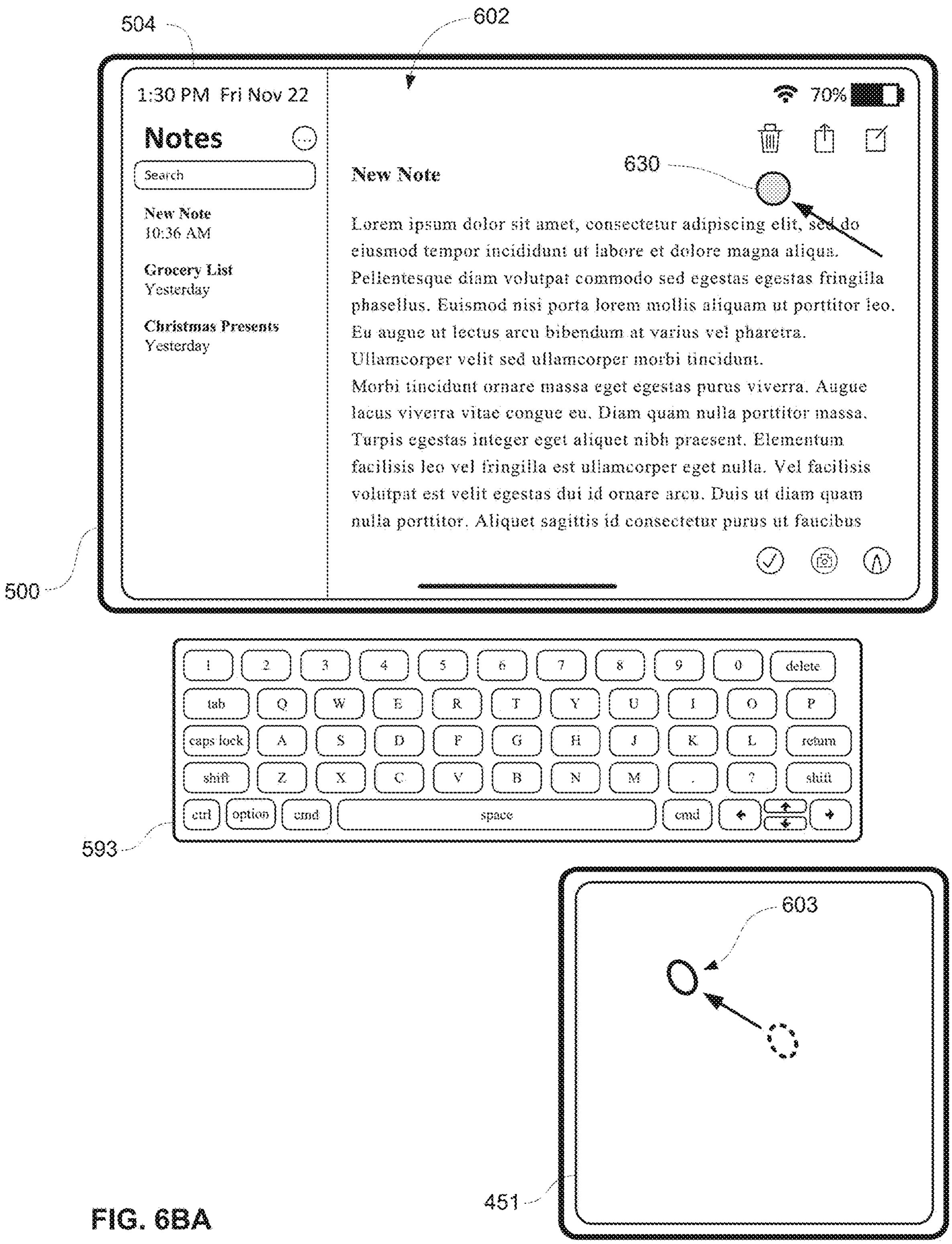
Figure 6B:
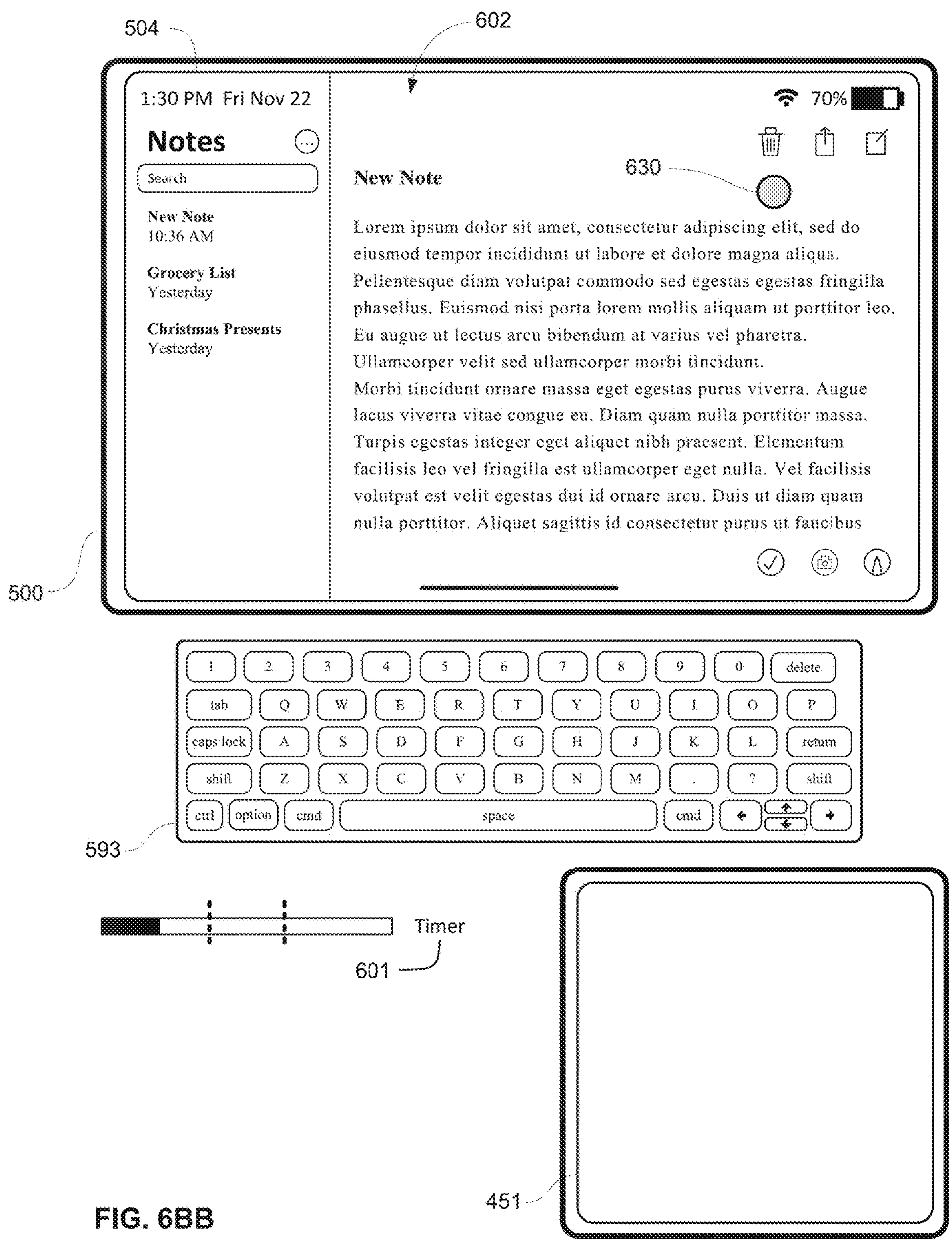
Figure 6B:
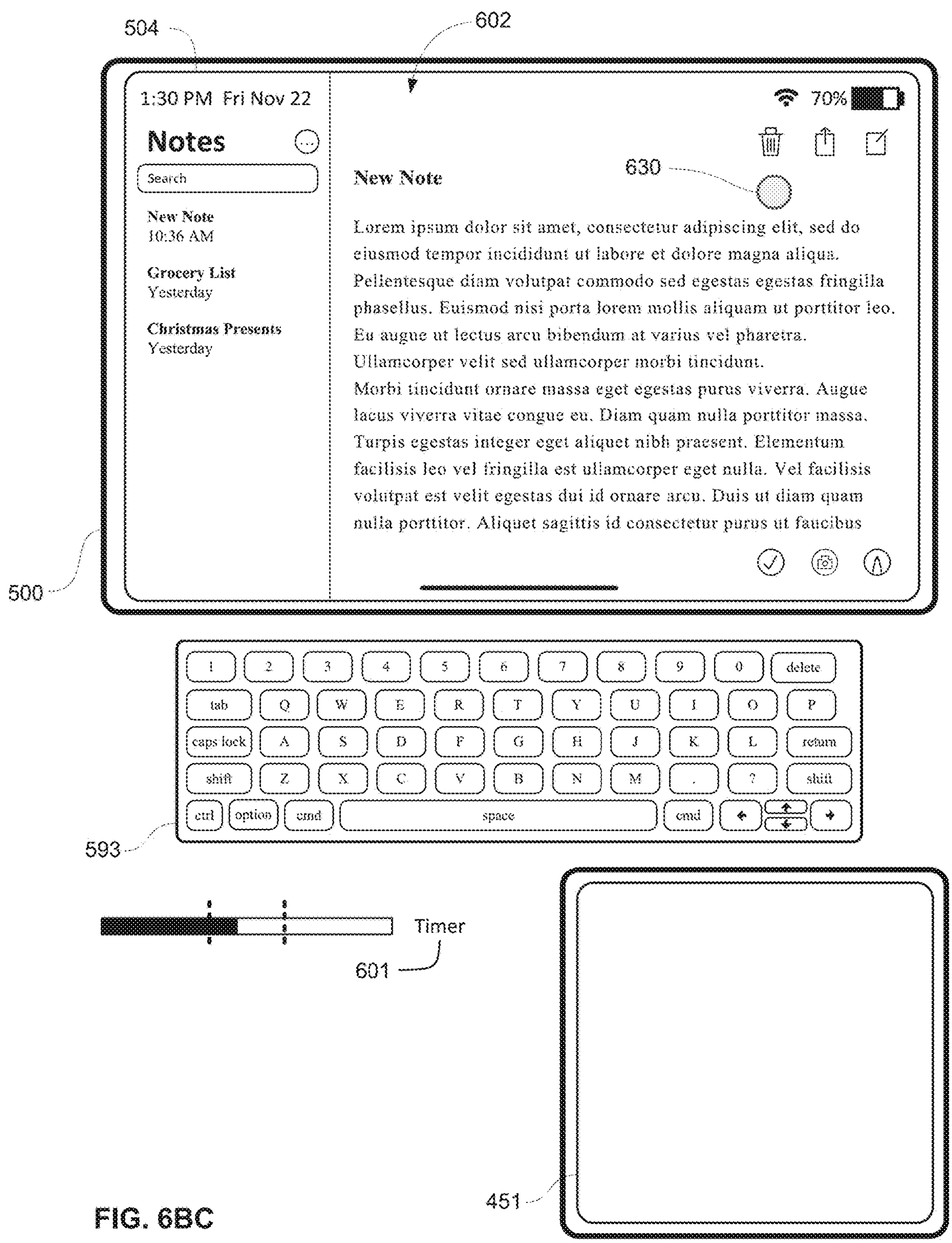
Figure 6B:
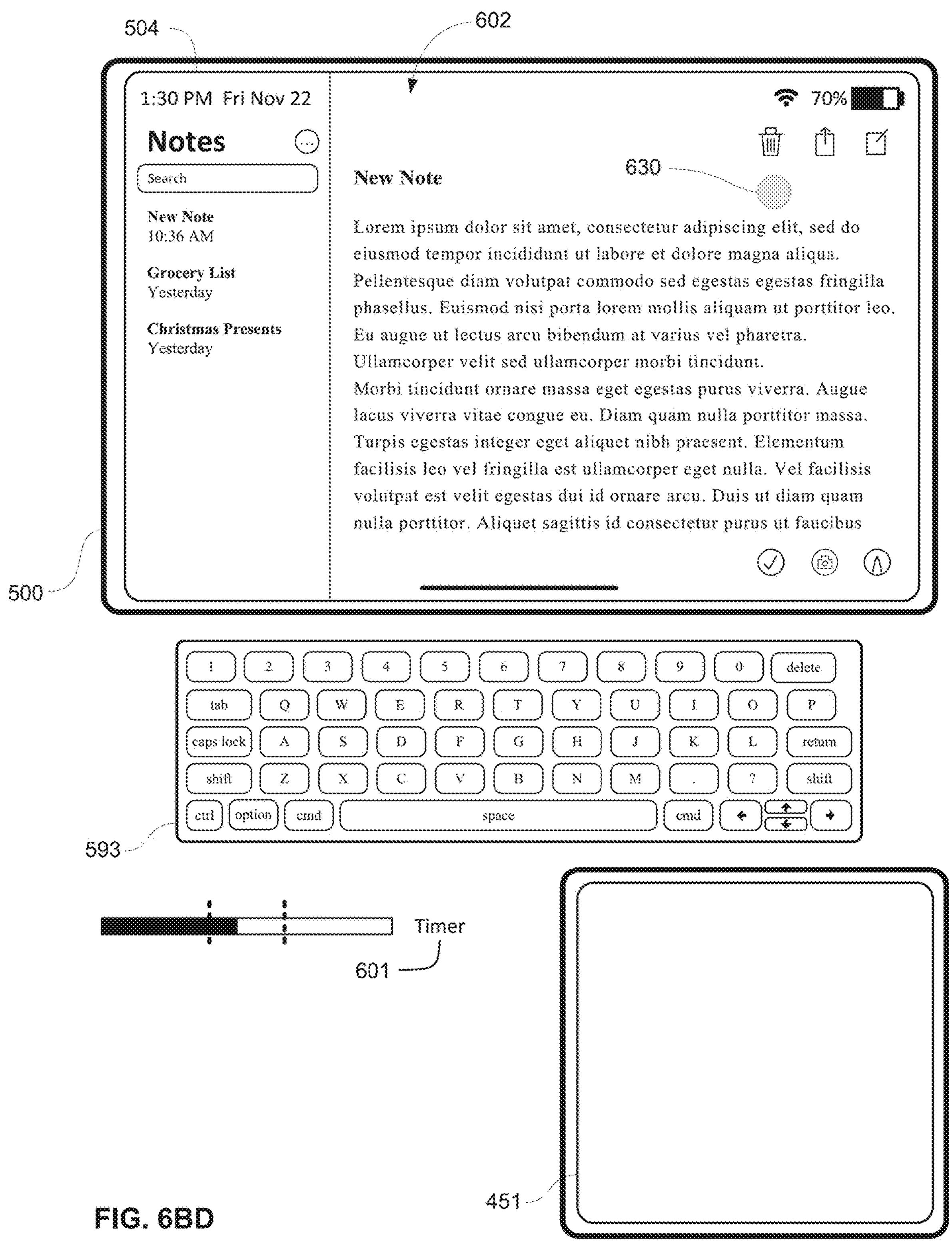
Figure 6B:
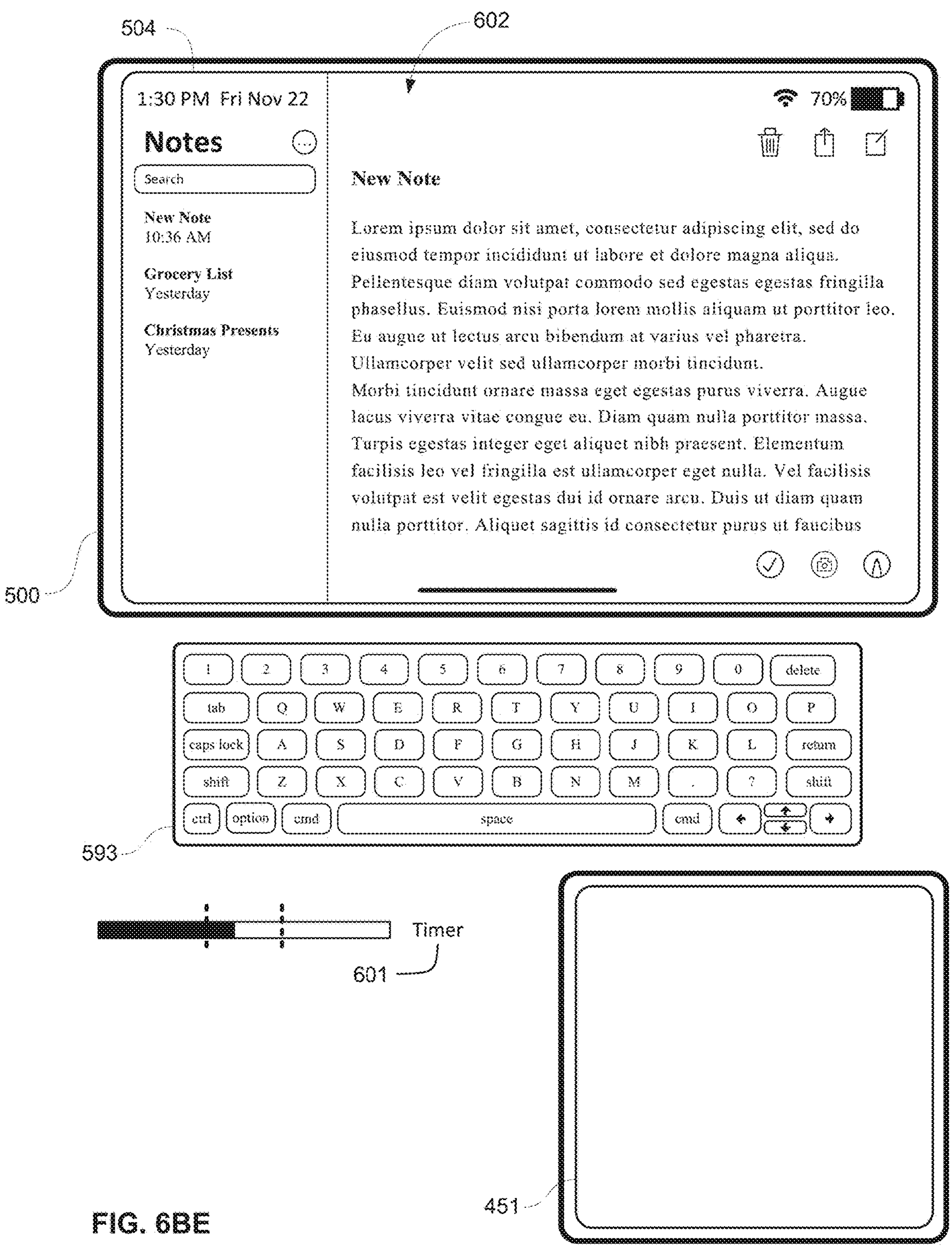
Figure 6B:
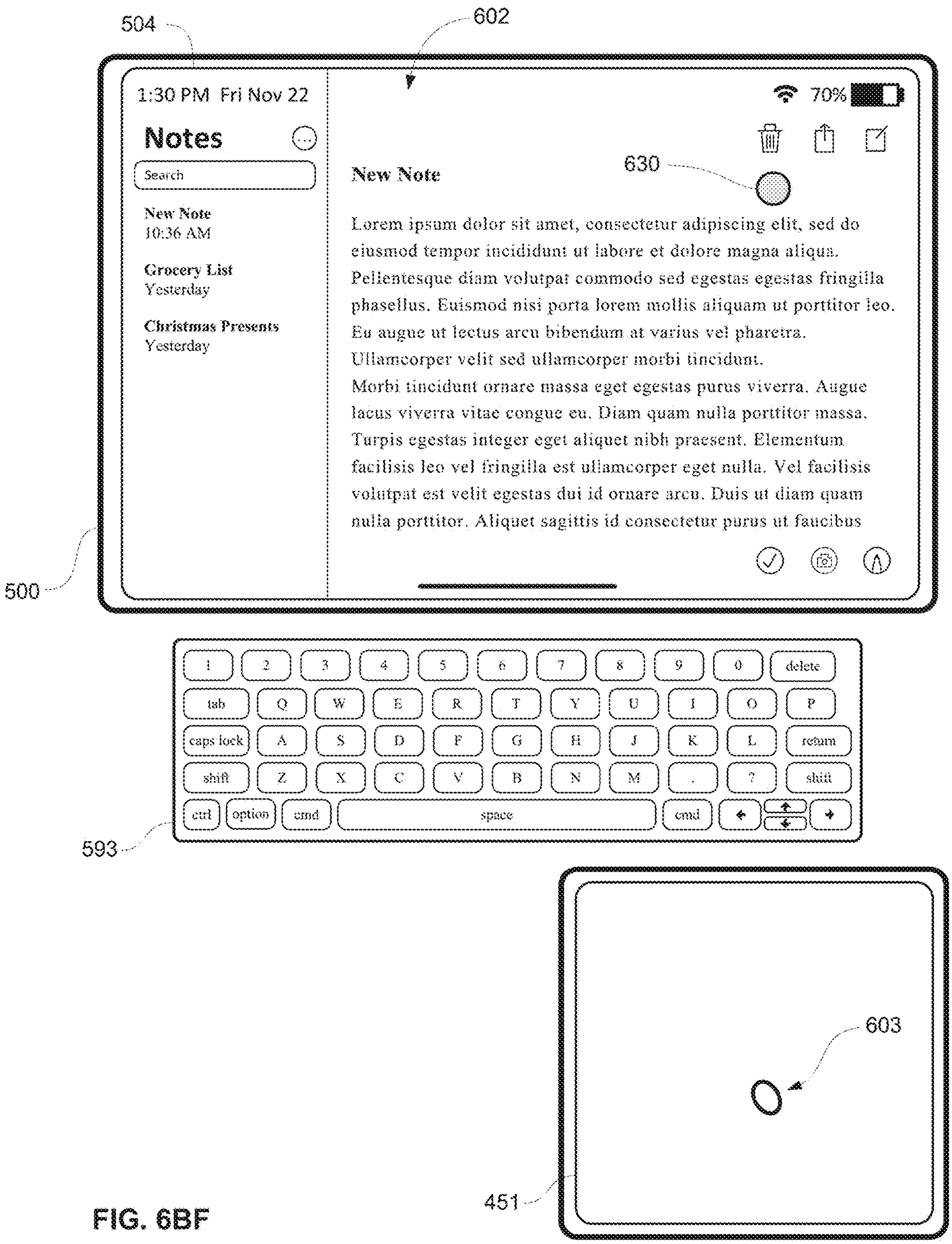
Figure 6B:
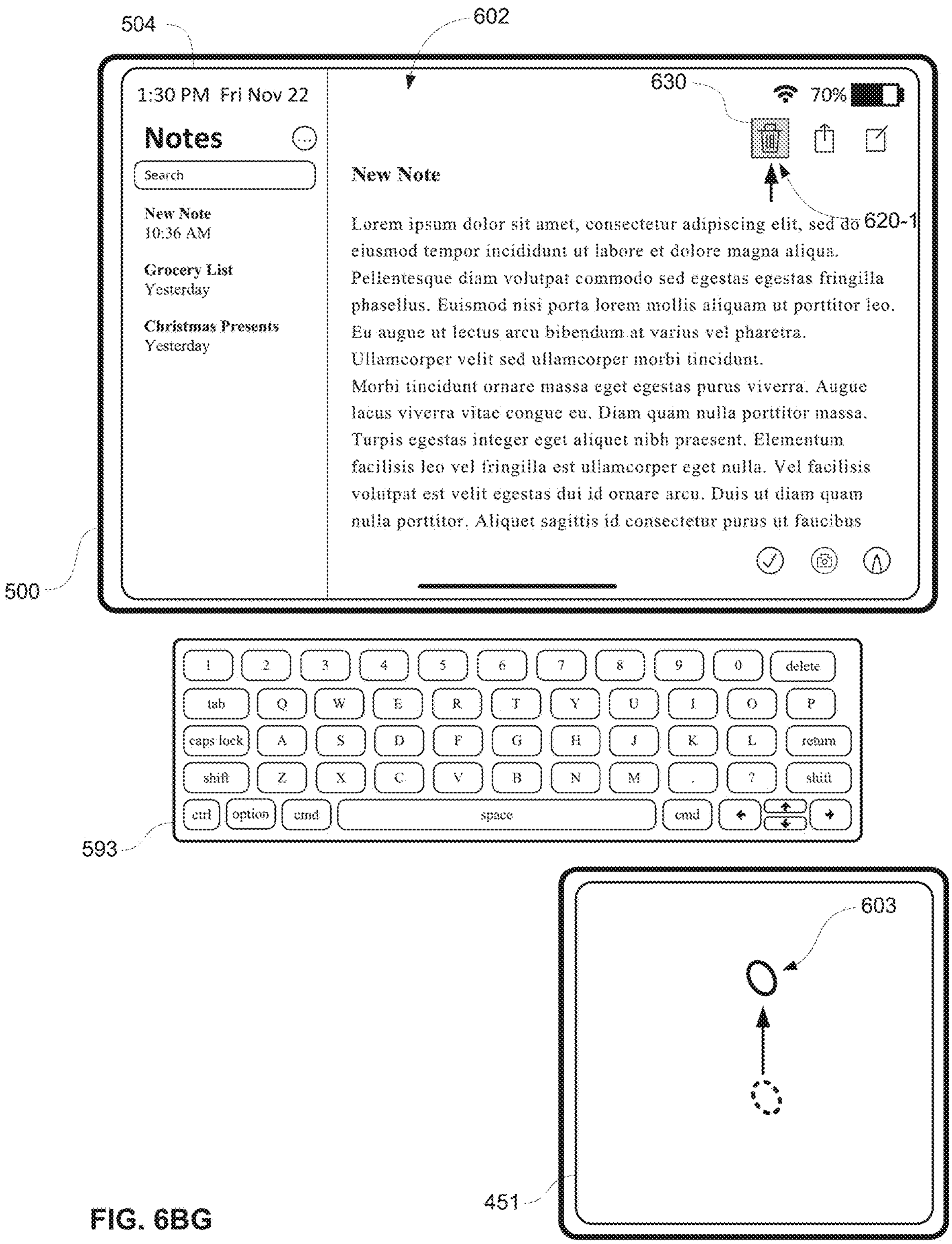
Figure 6B:
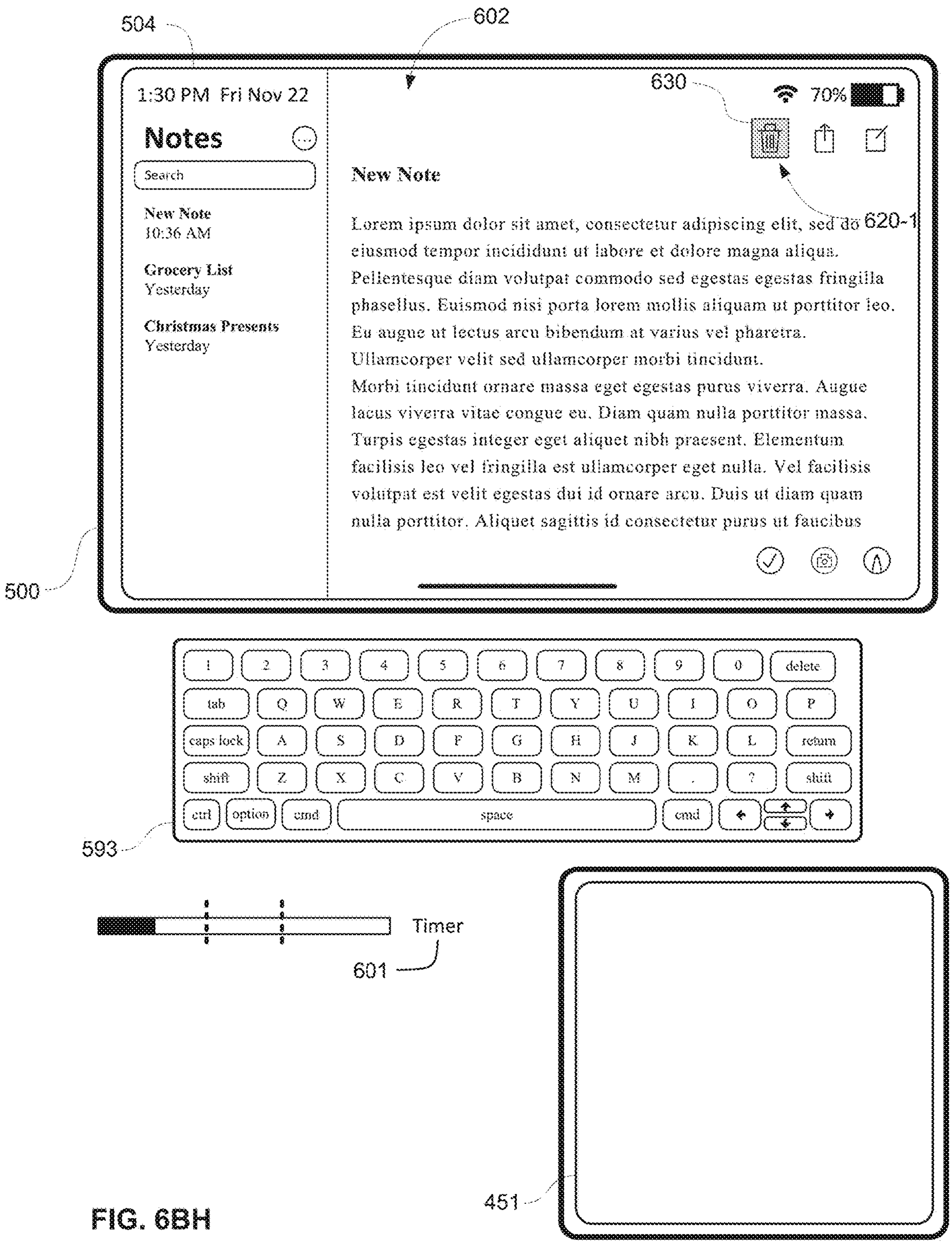
Figure 6B:
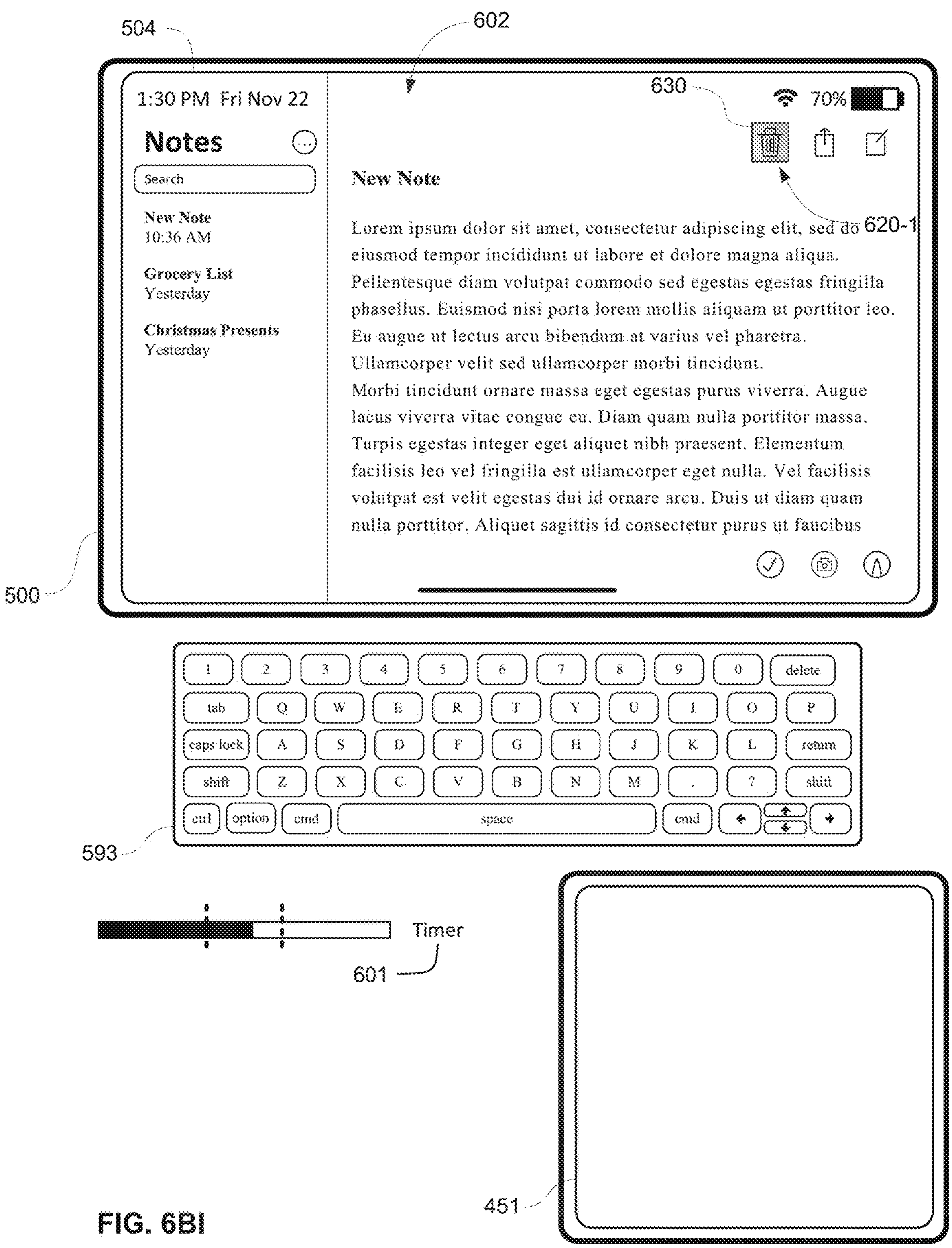
Figure 6B:
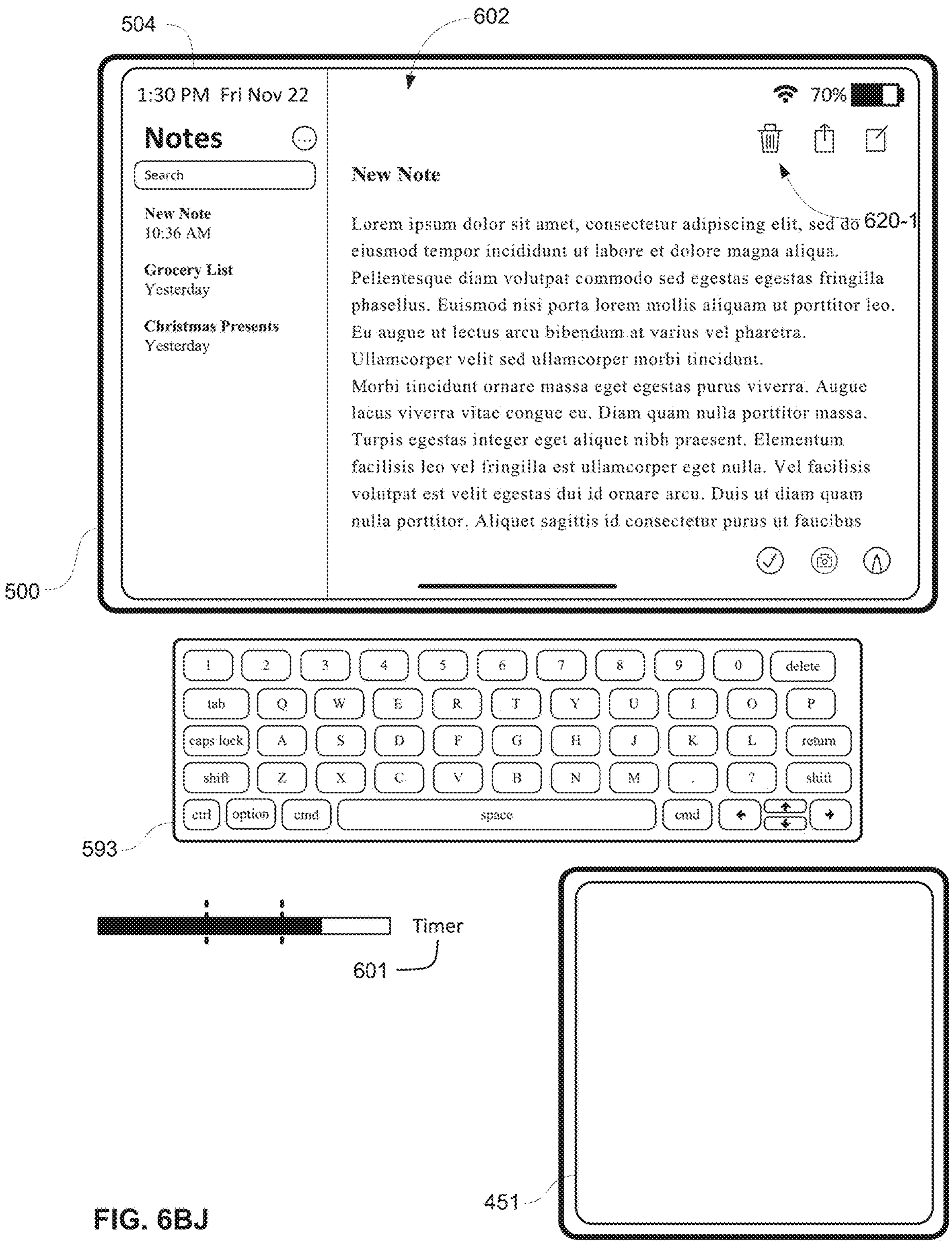
Figure 6B:
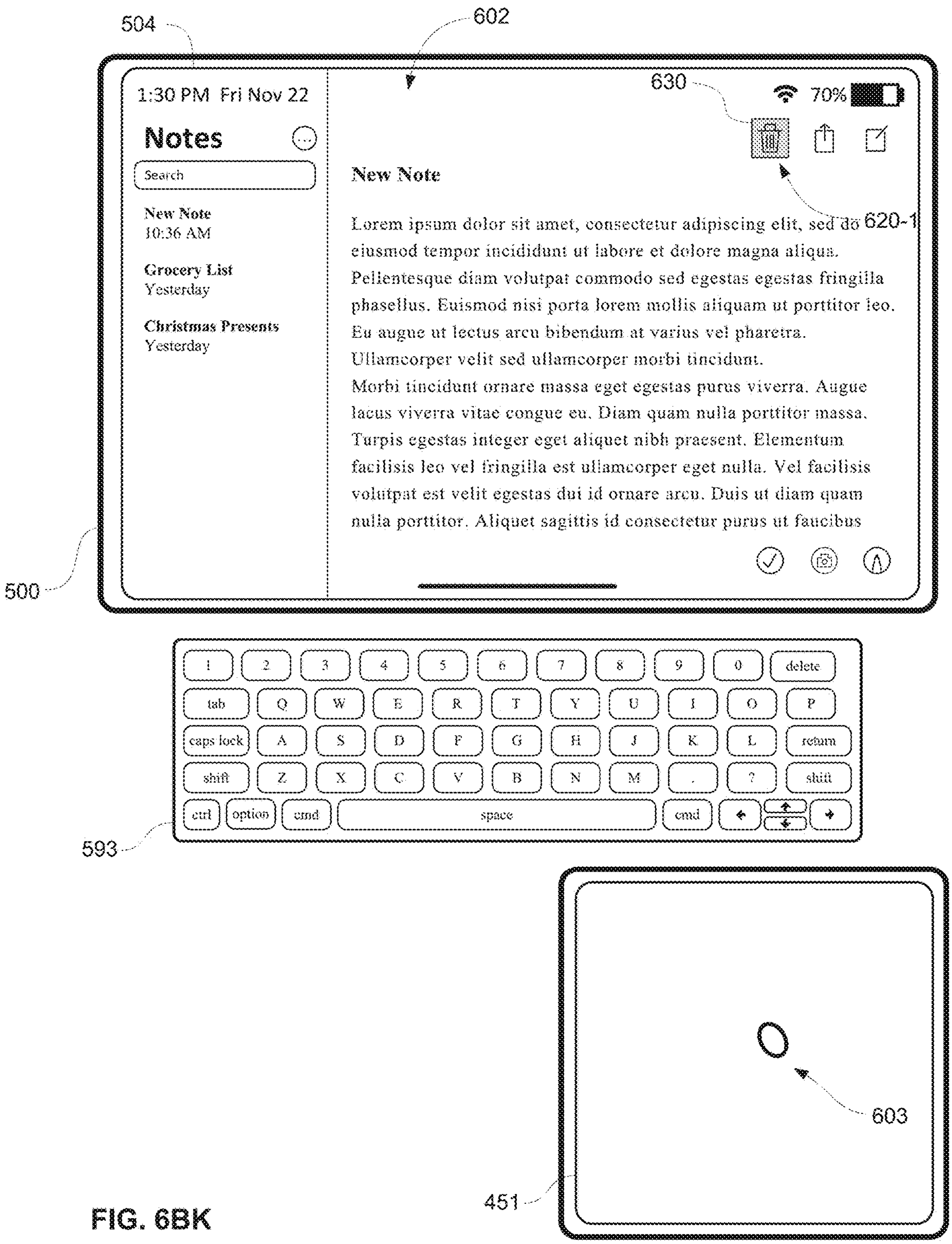
Figure 6B:
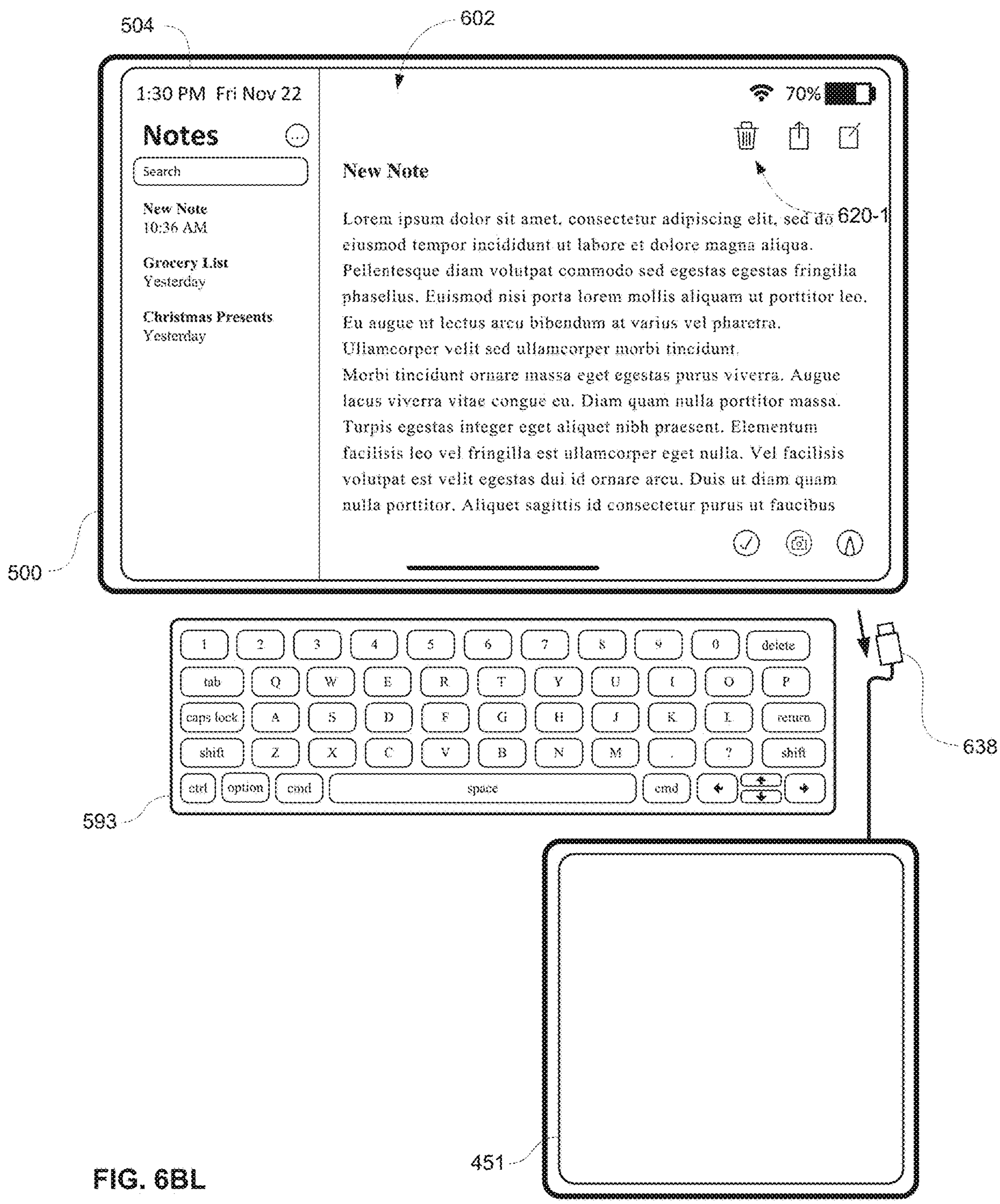
Figure 6B:
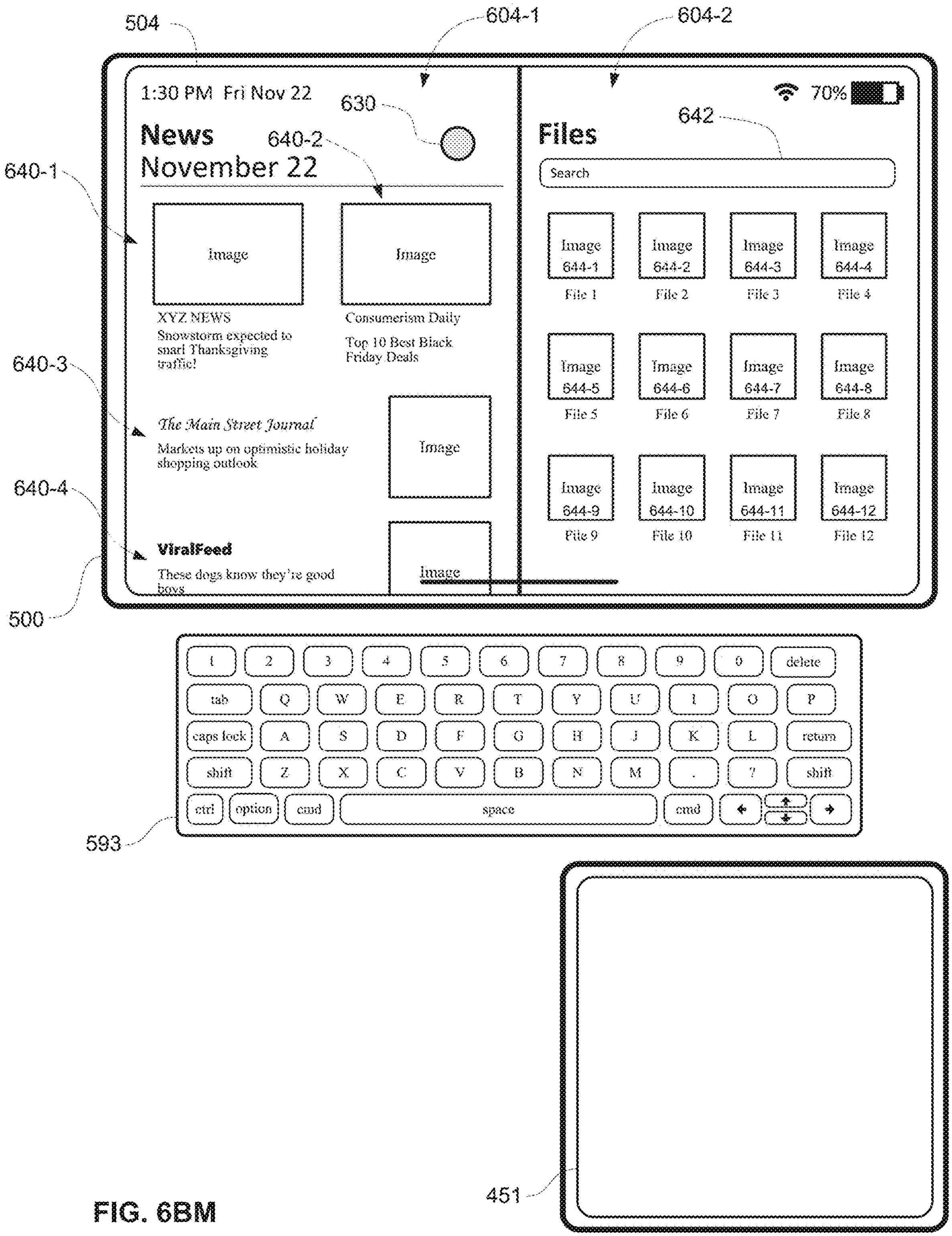
Figure 6B:
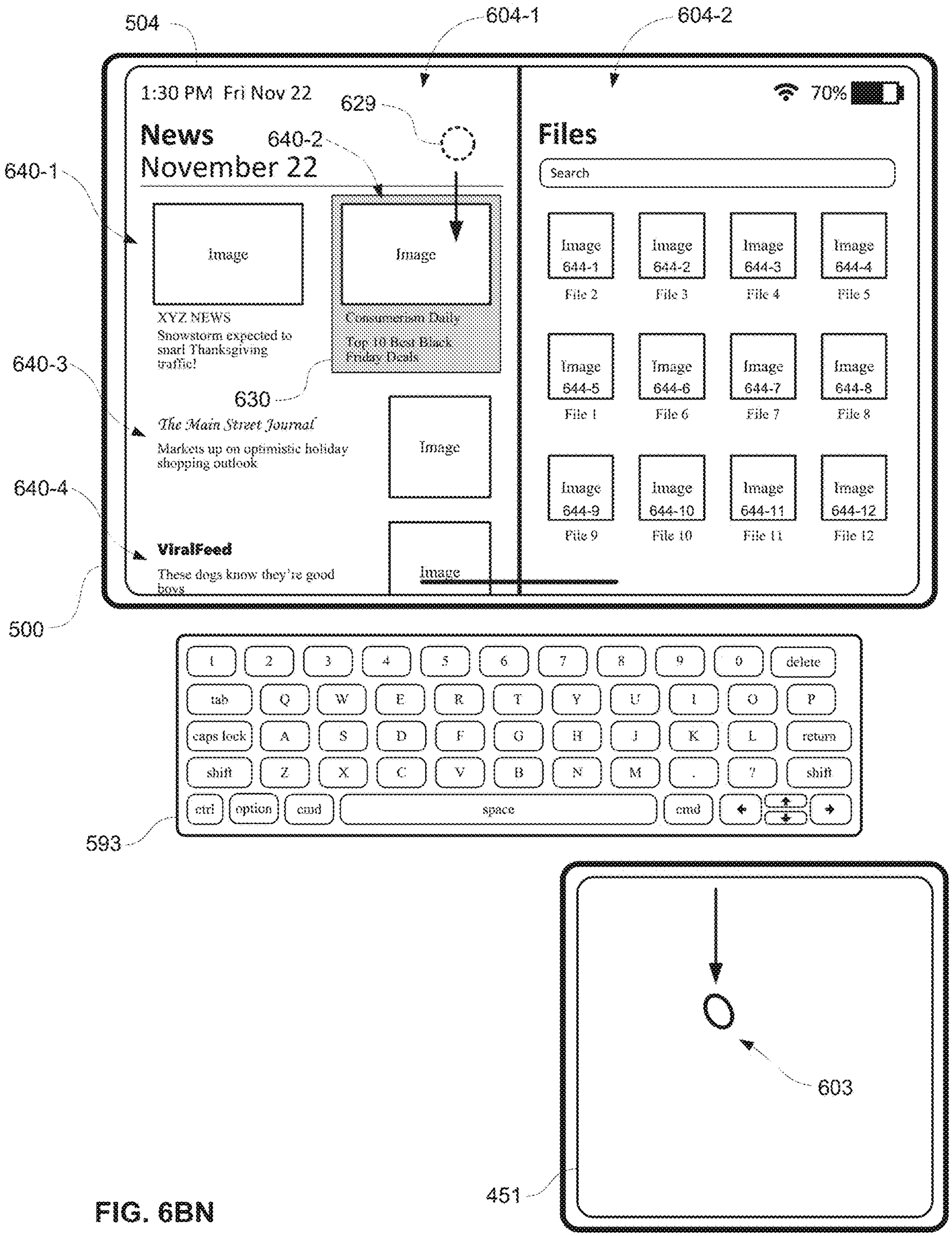
Figure 6B:
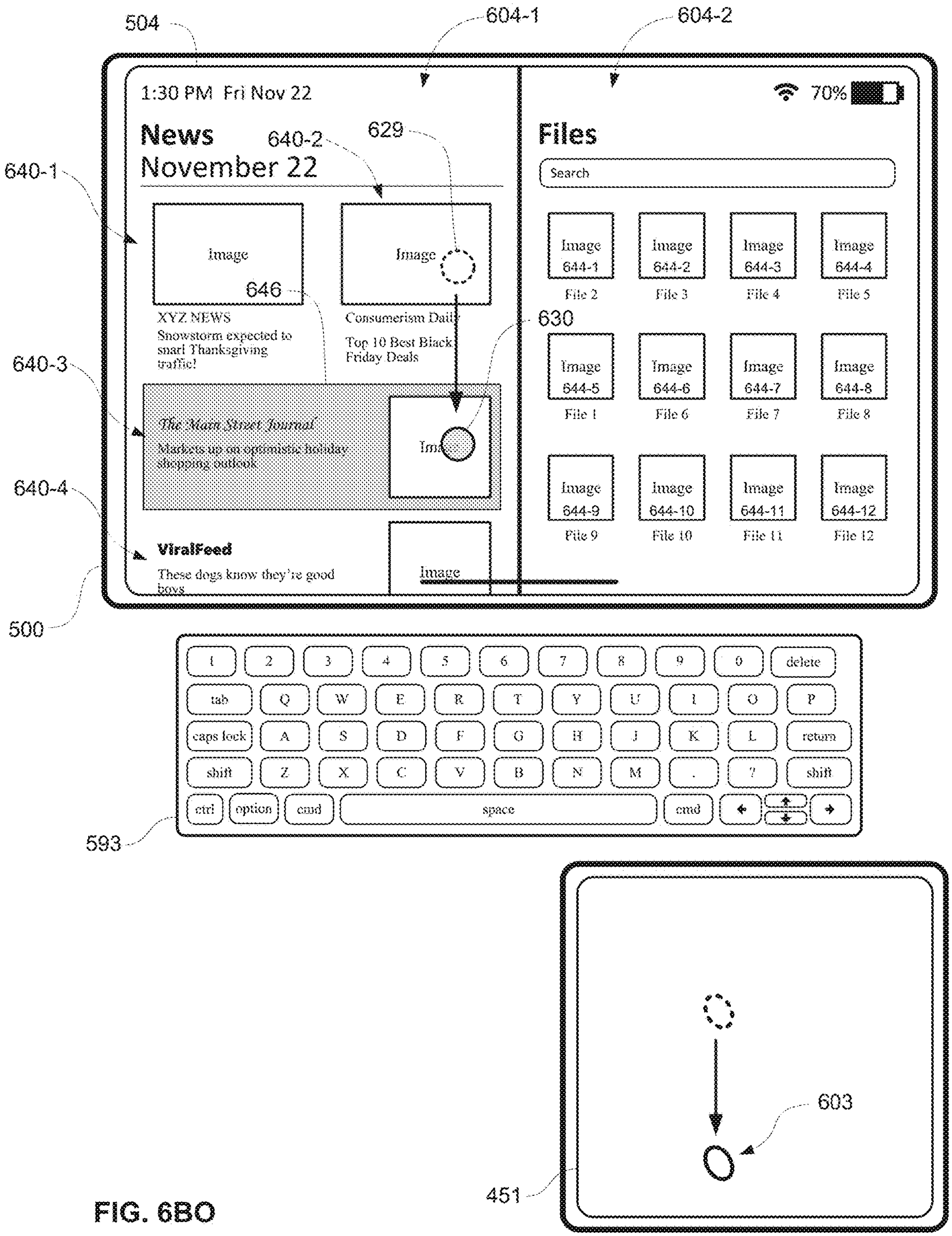
Figure 6B:
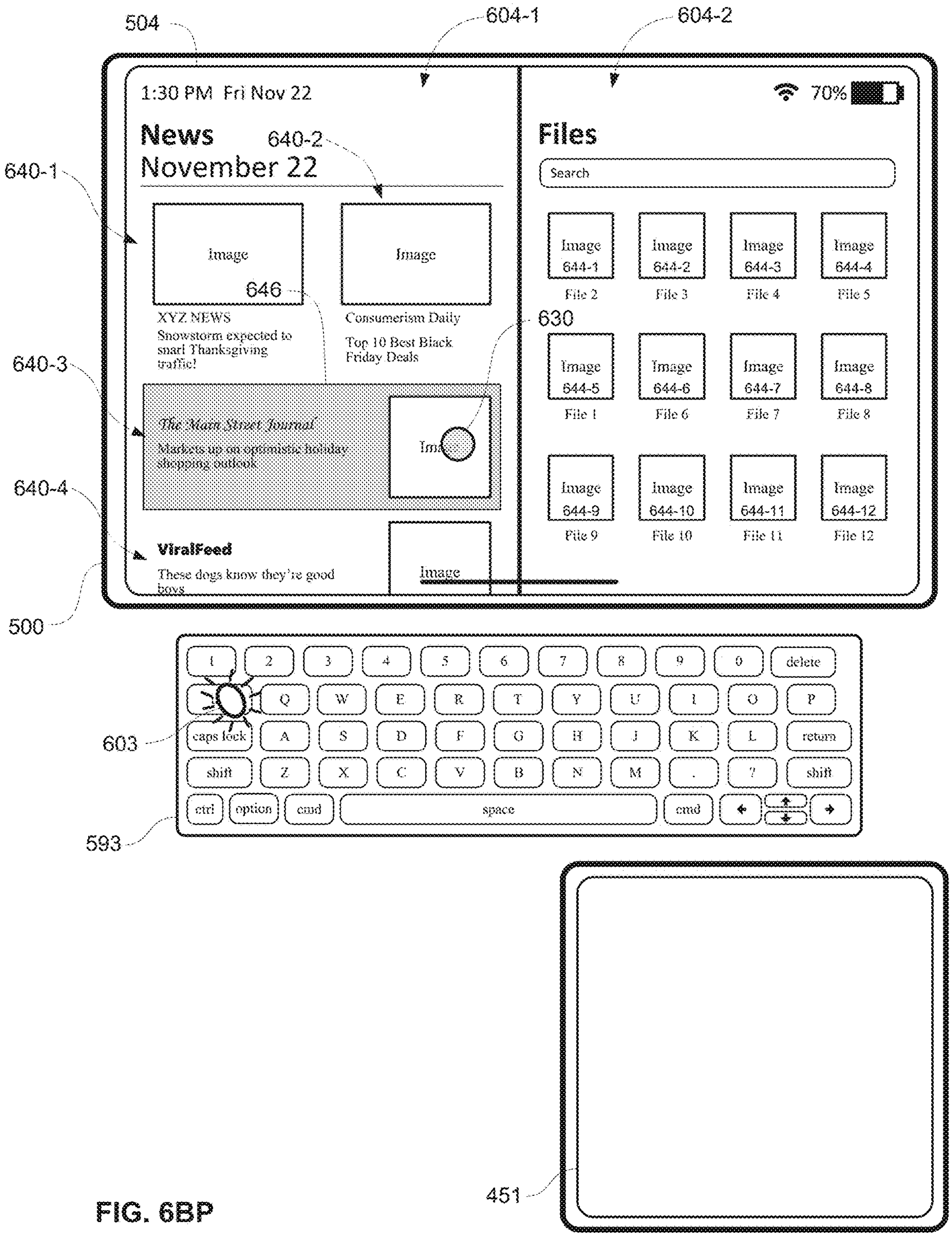
Figure 6B:
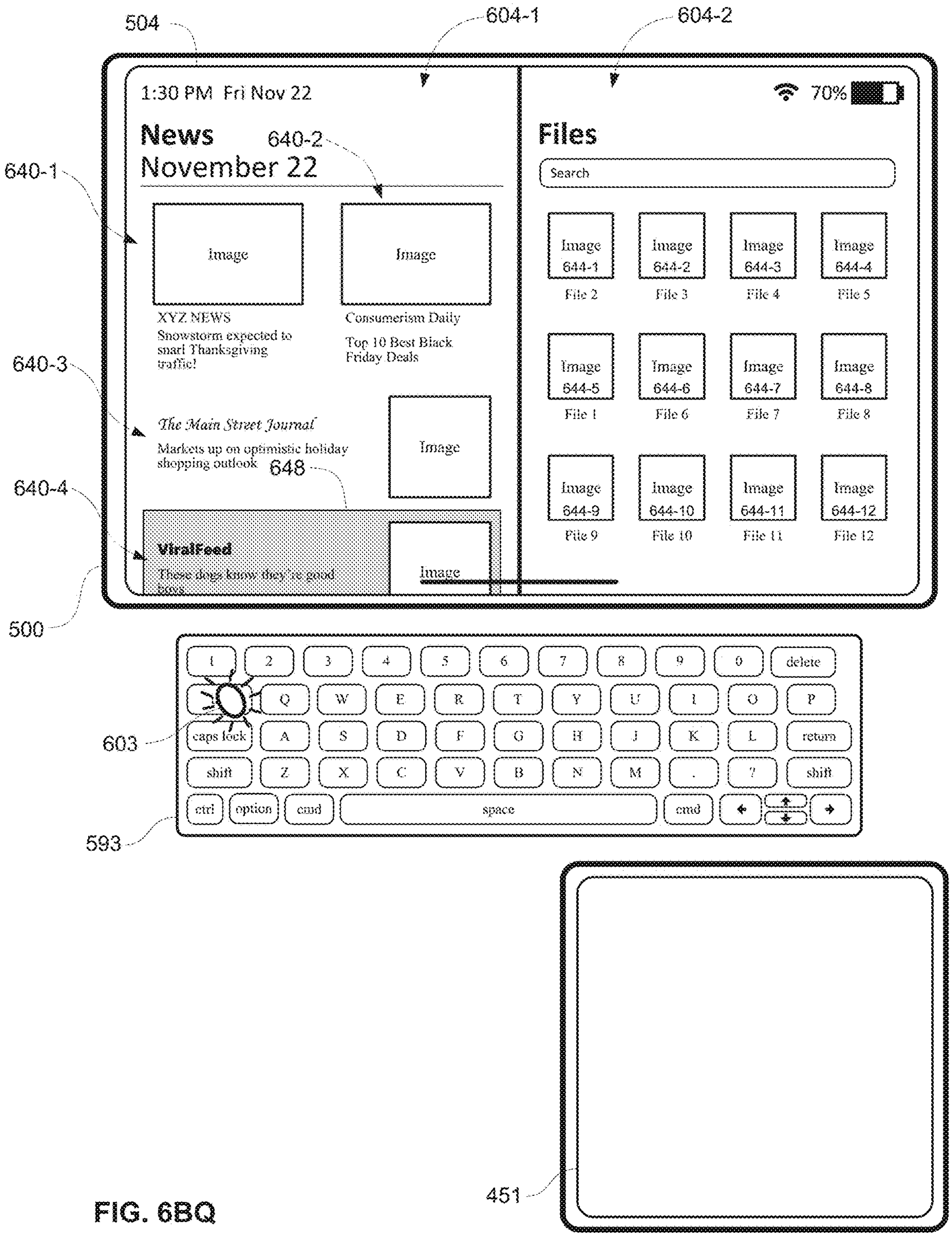
Figure 6B:
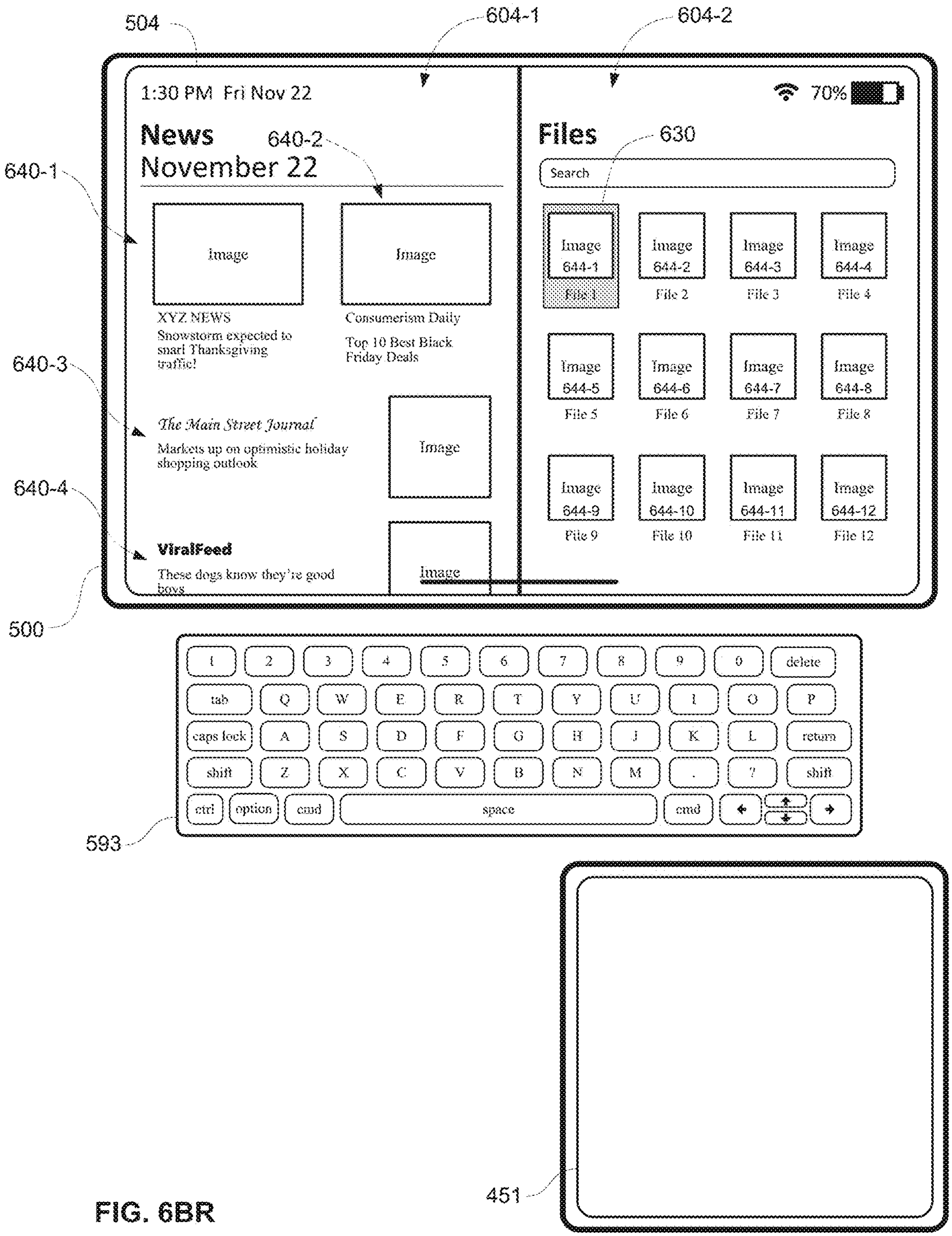
Figure 6B:
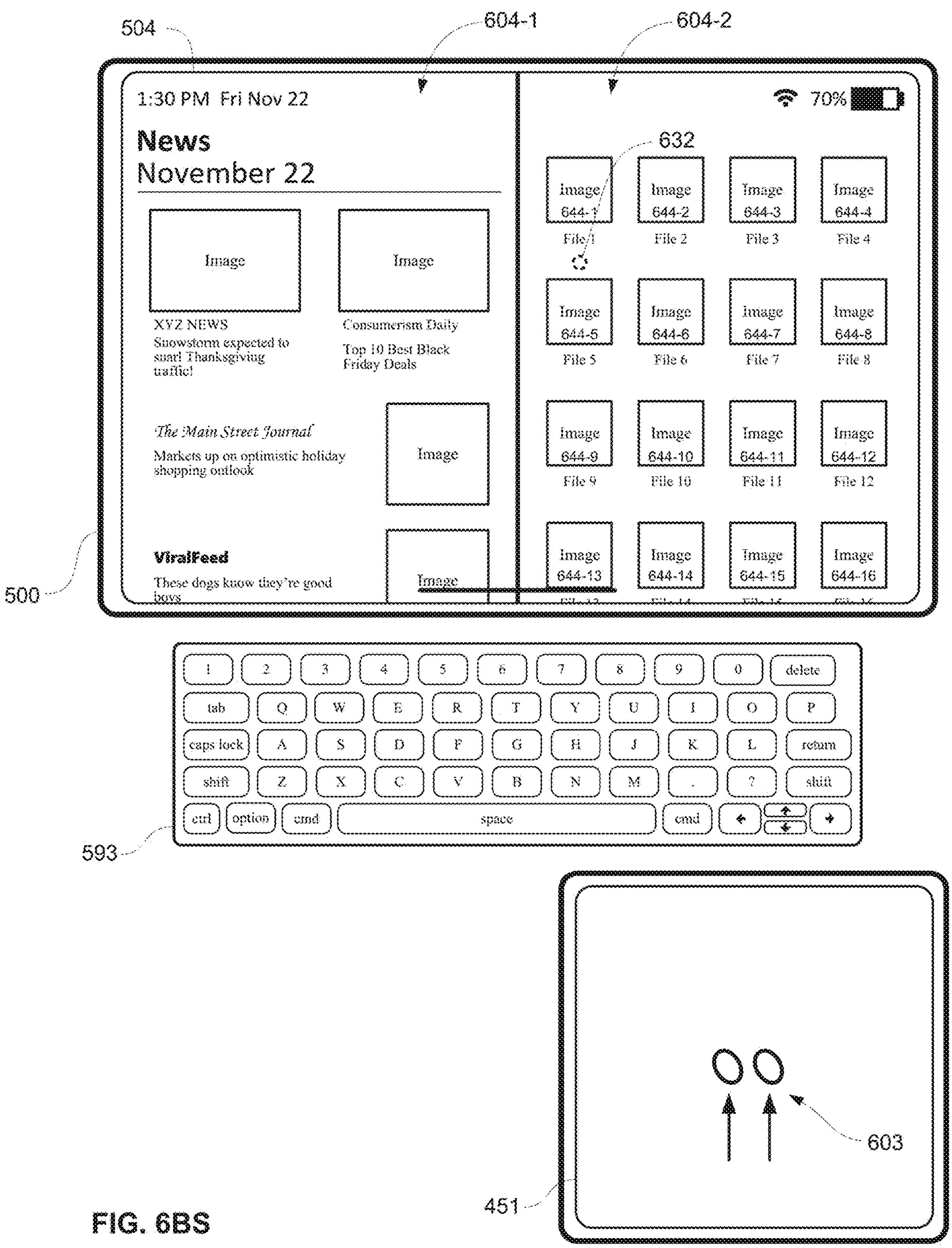
Figure 6B:
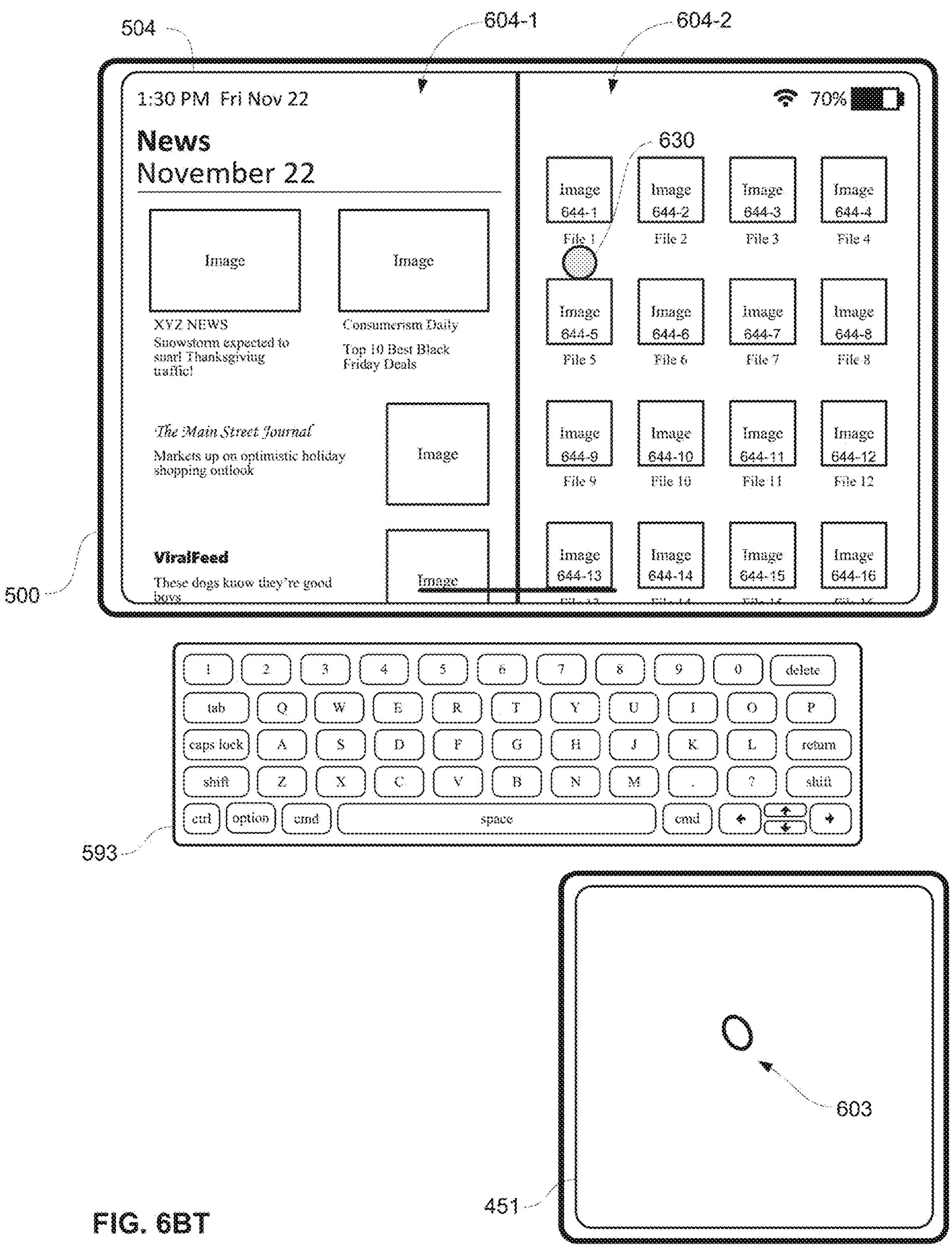
Figure 6B:
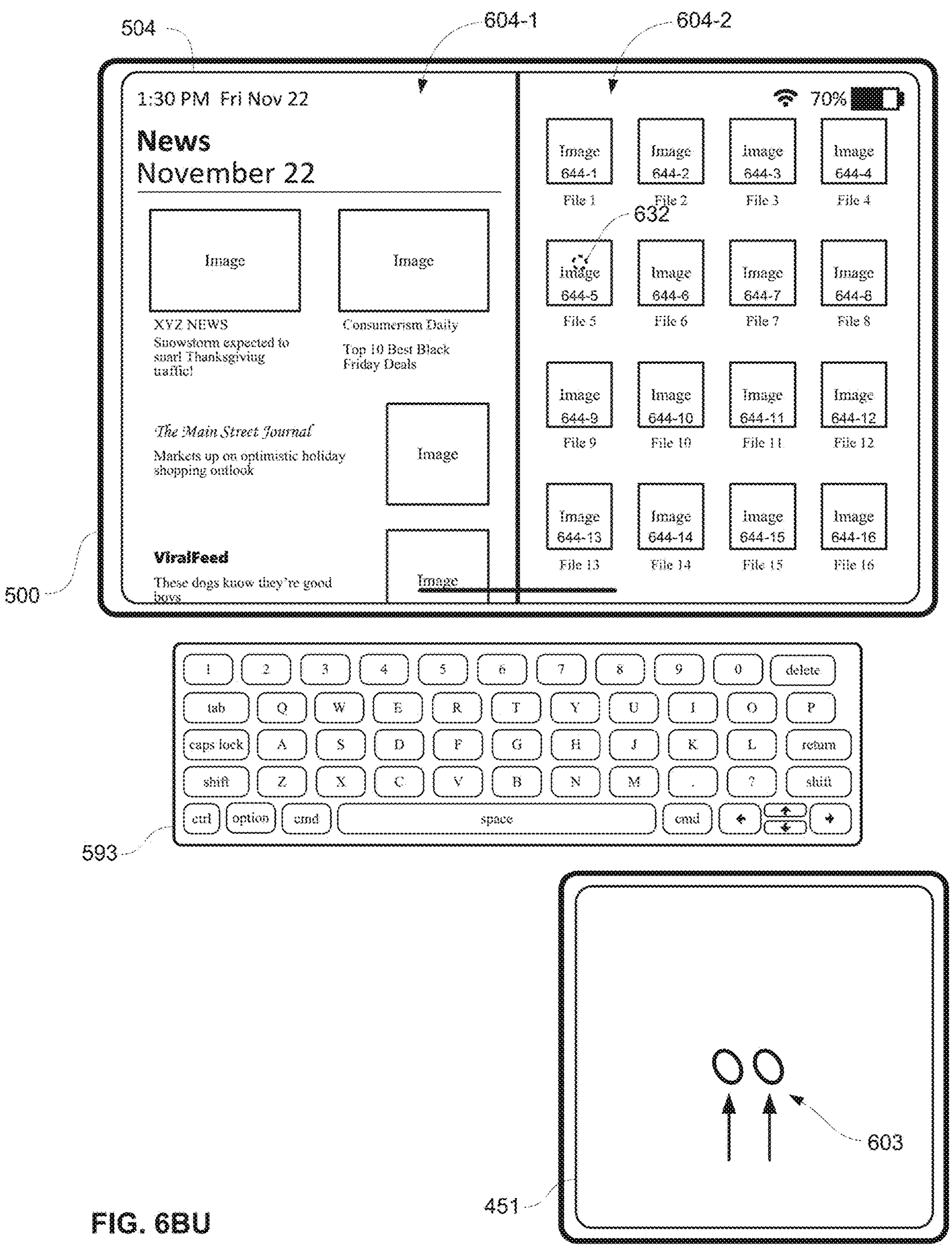
Figure 6B:
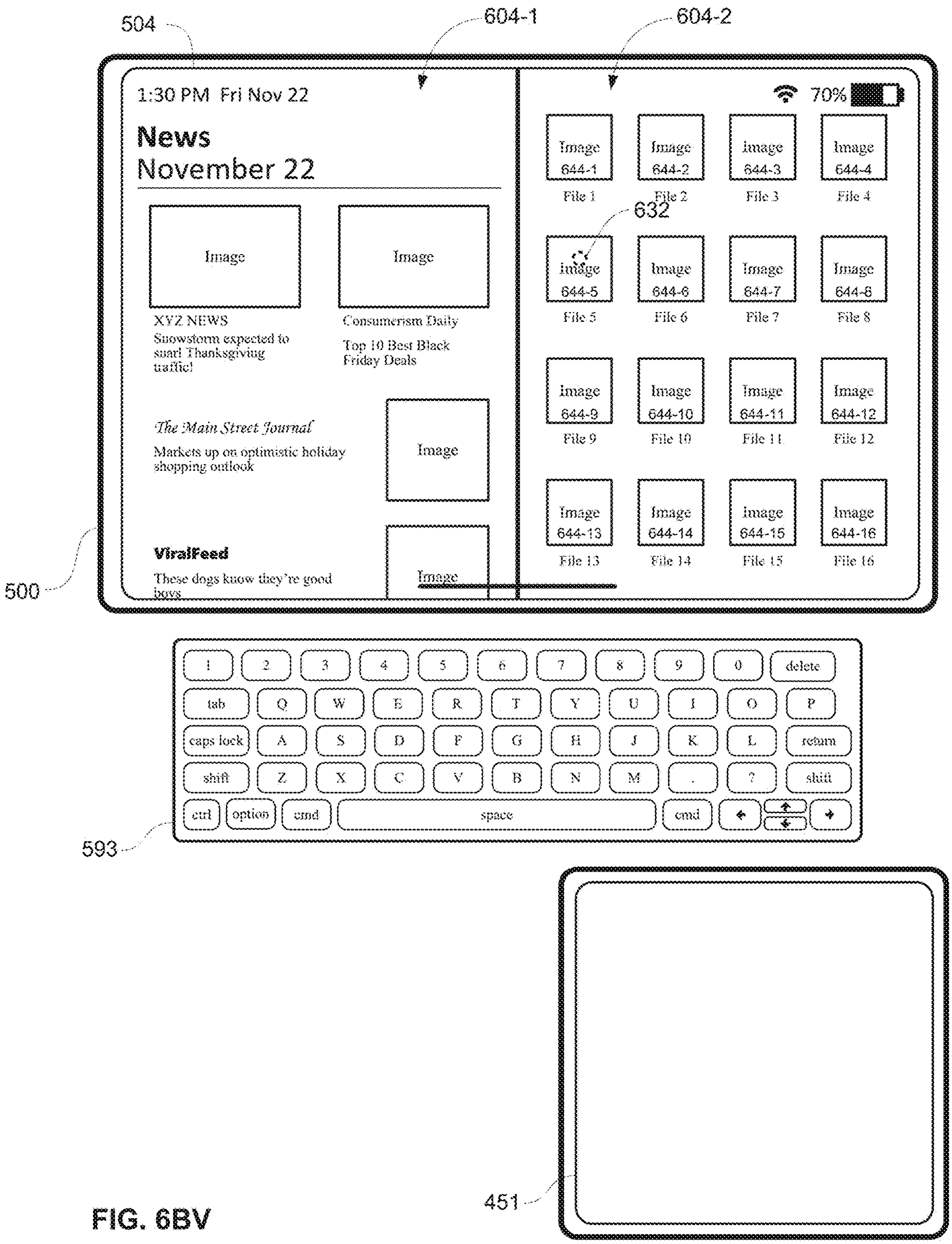
Figure 6B:
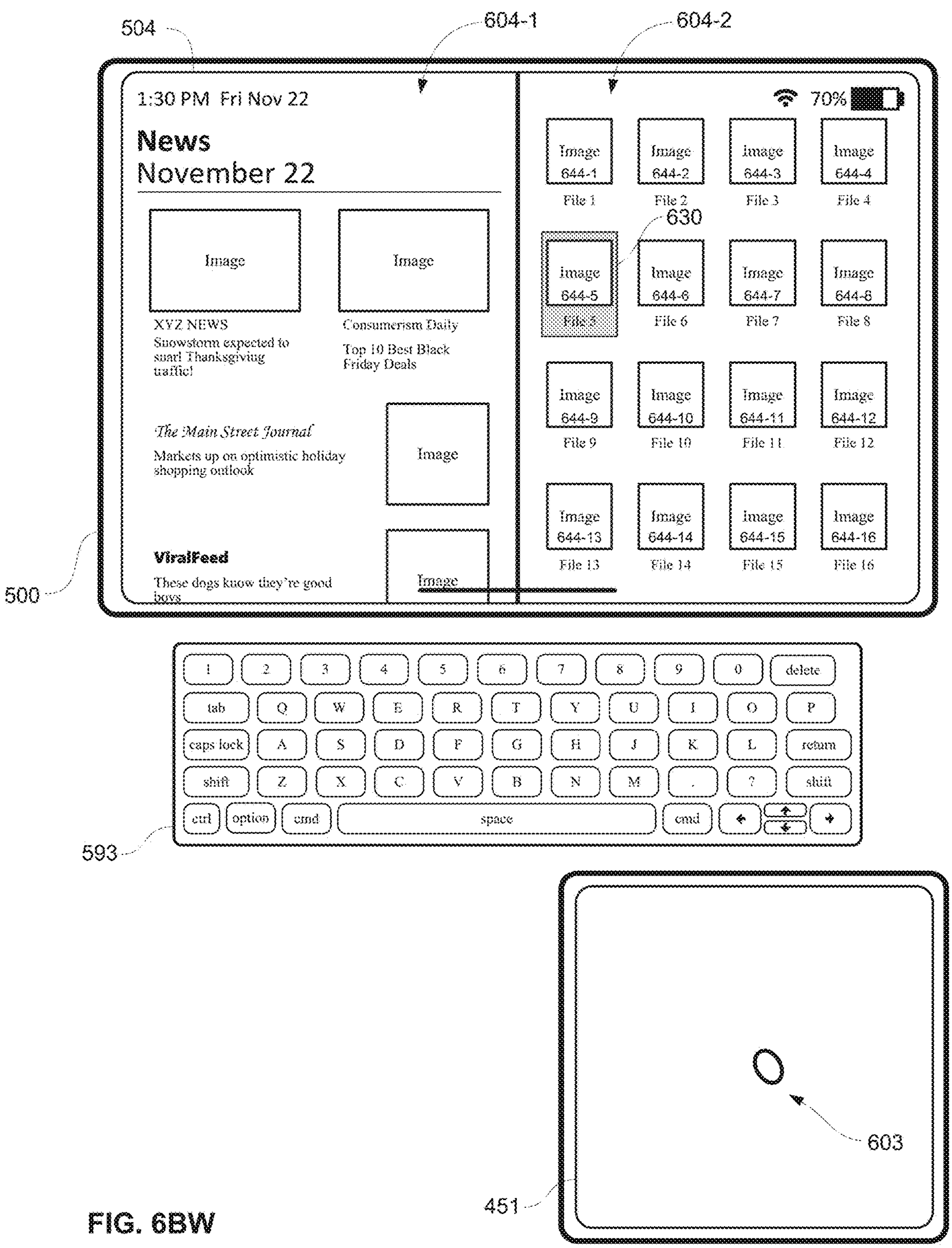
Figure 6B:
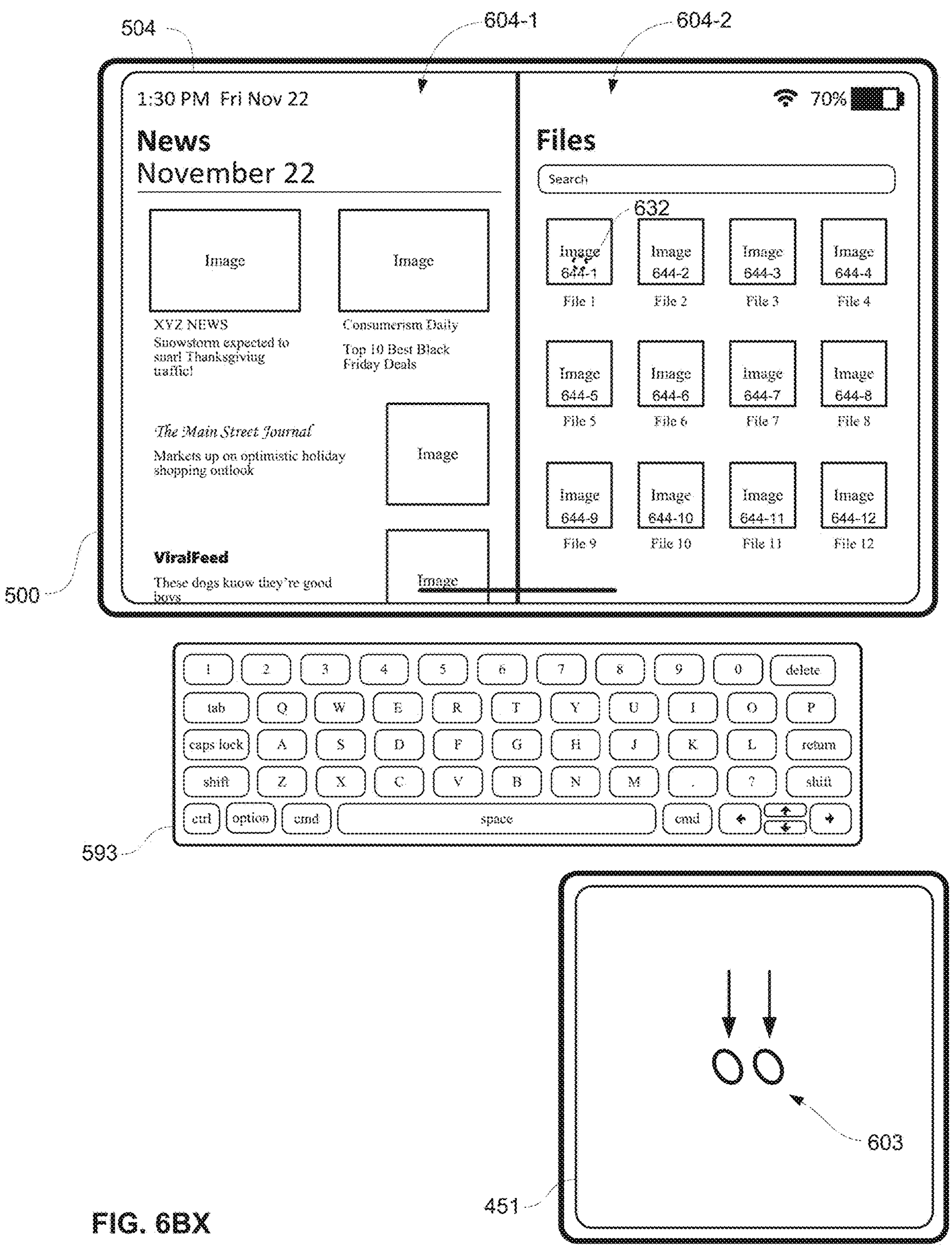
Figure 6B:
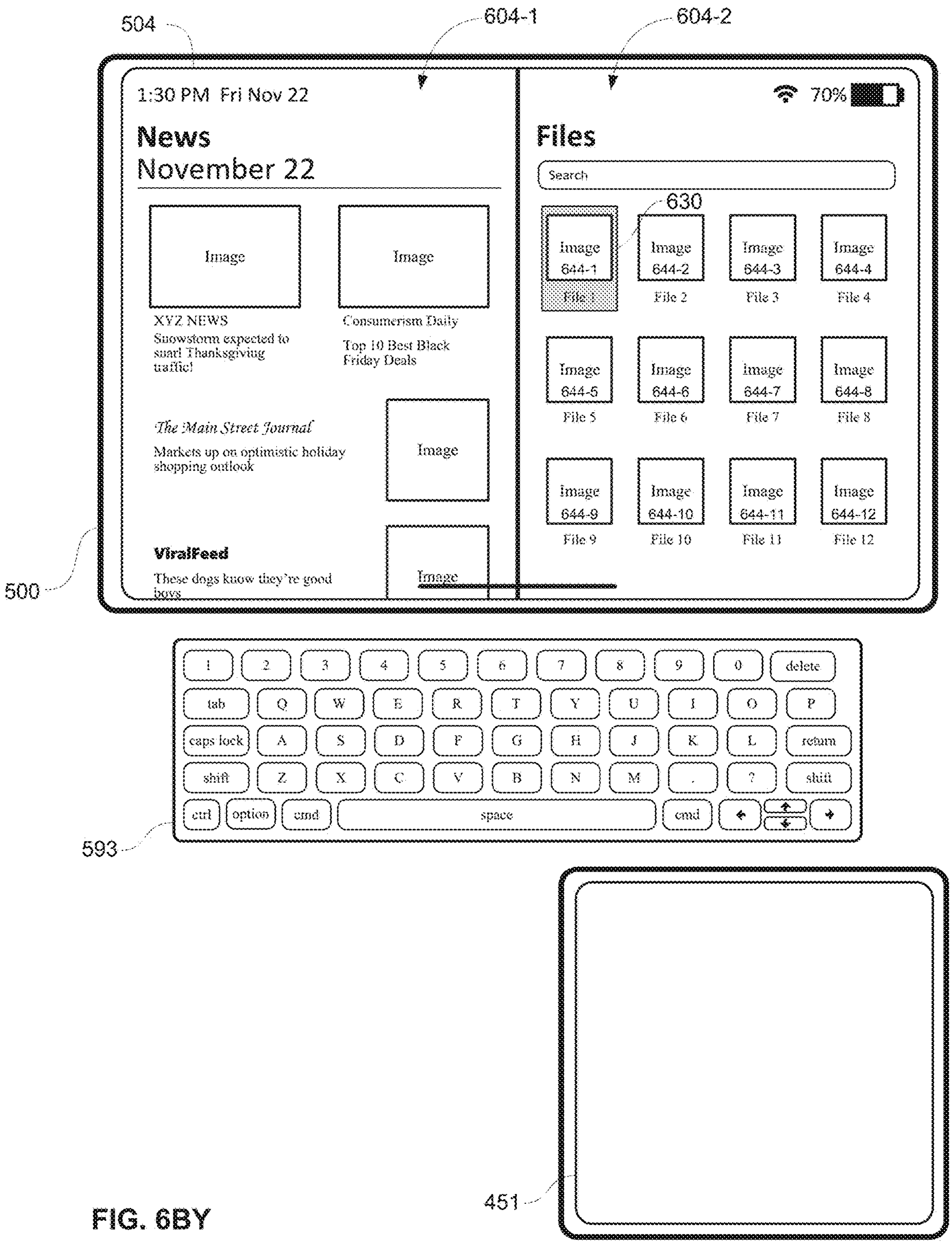
Figure 6B:
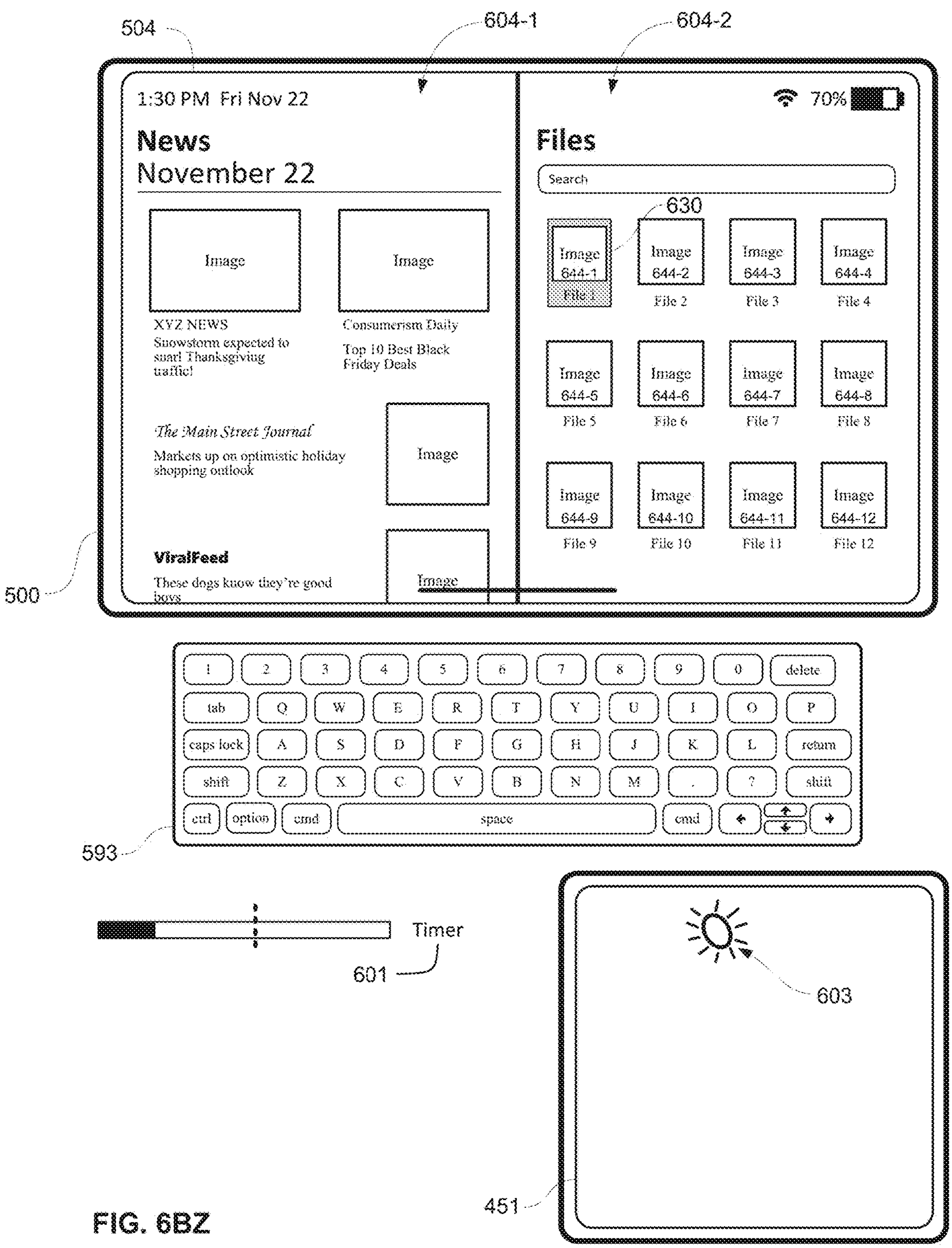
Figure 6C:
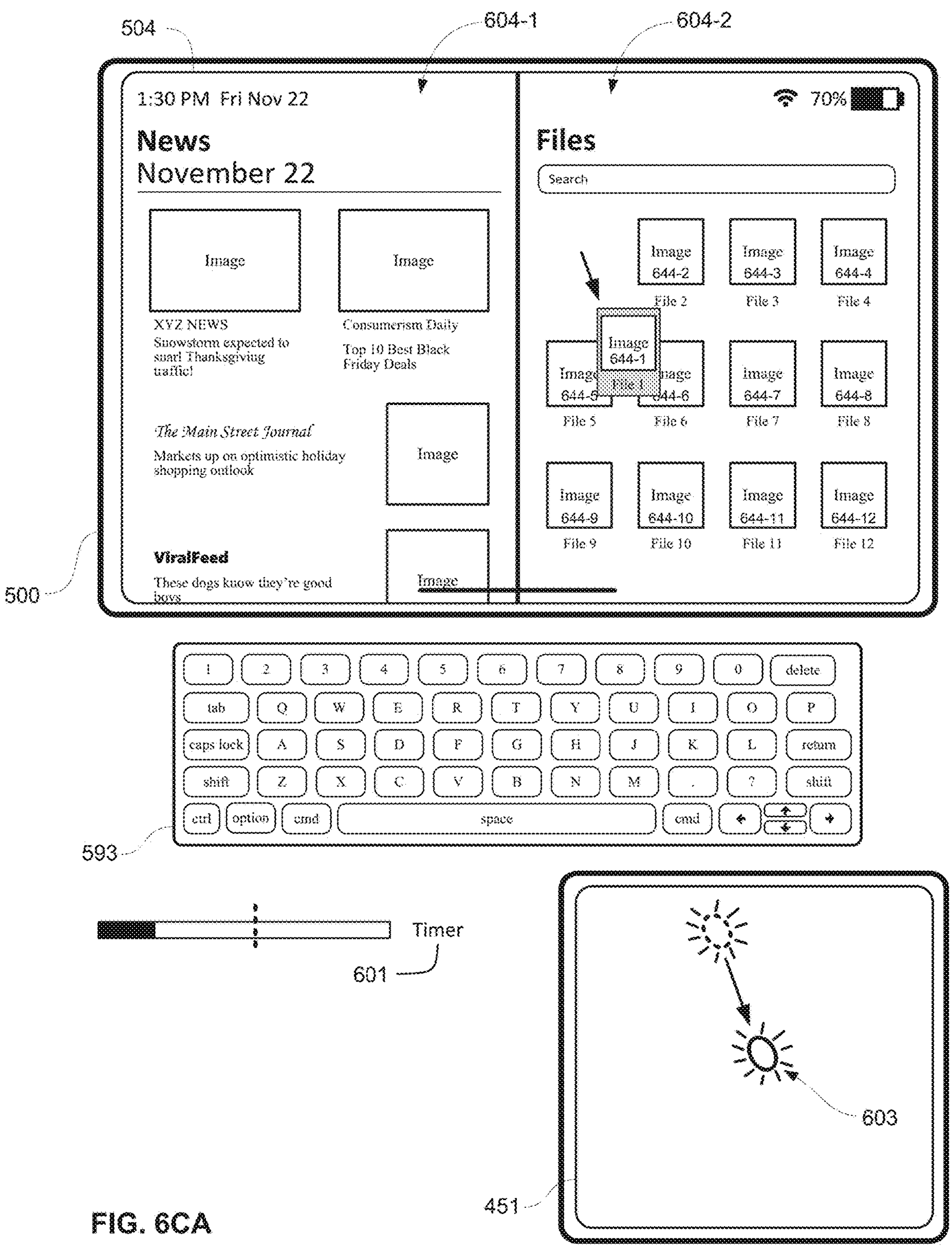
Figure 6C:
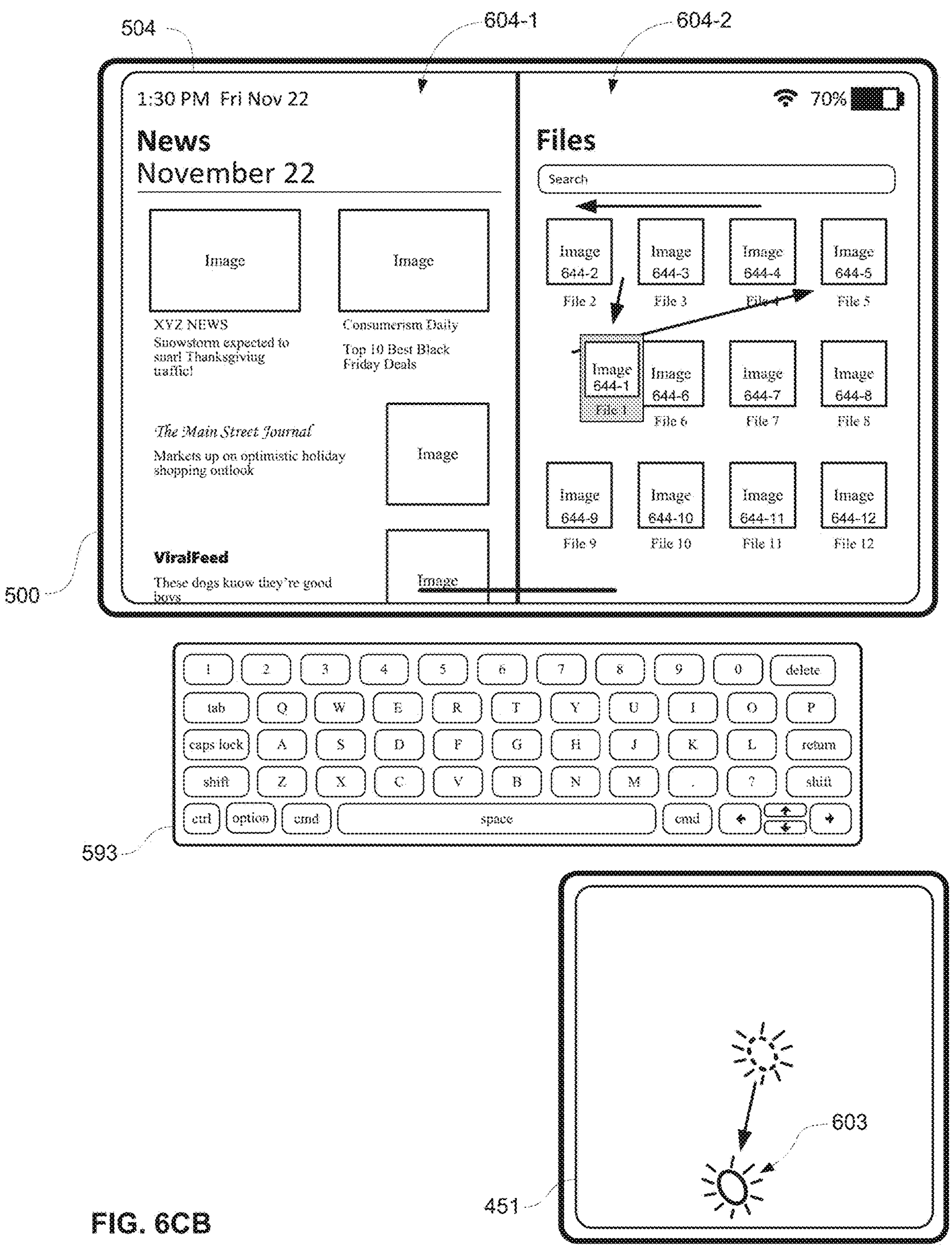
Figure 6C:
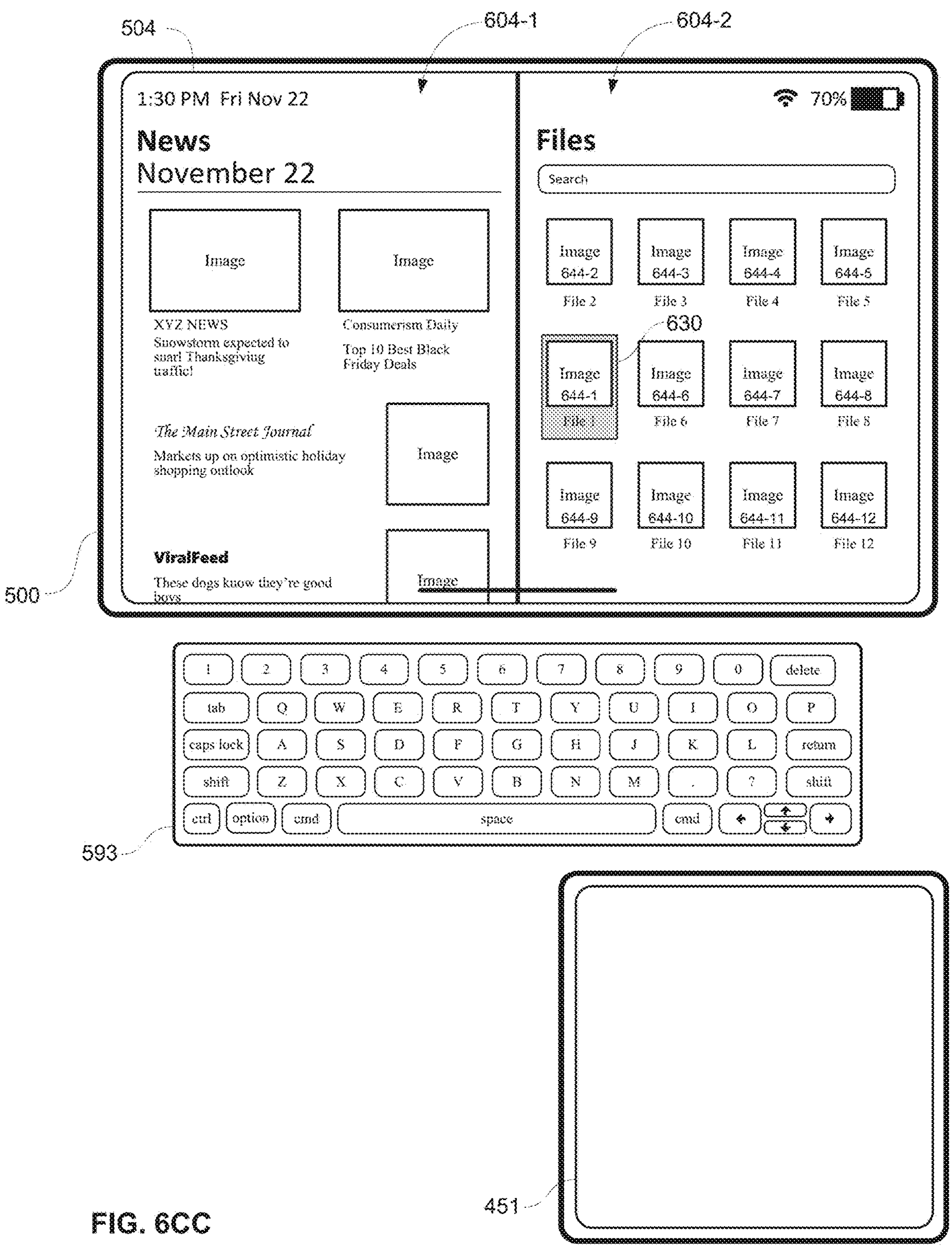
Figure 6C:
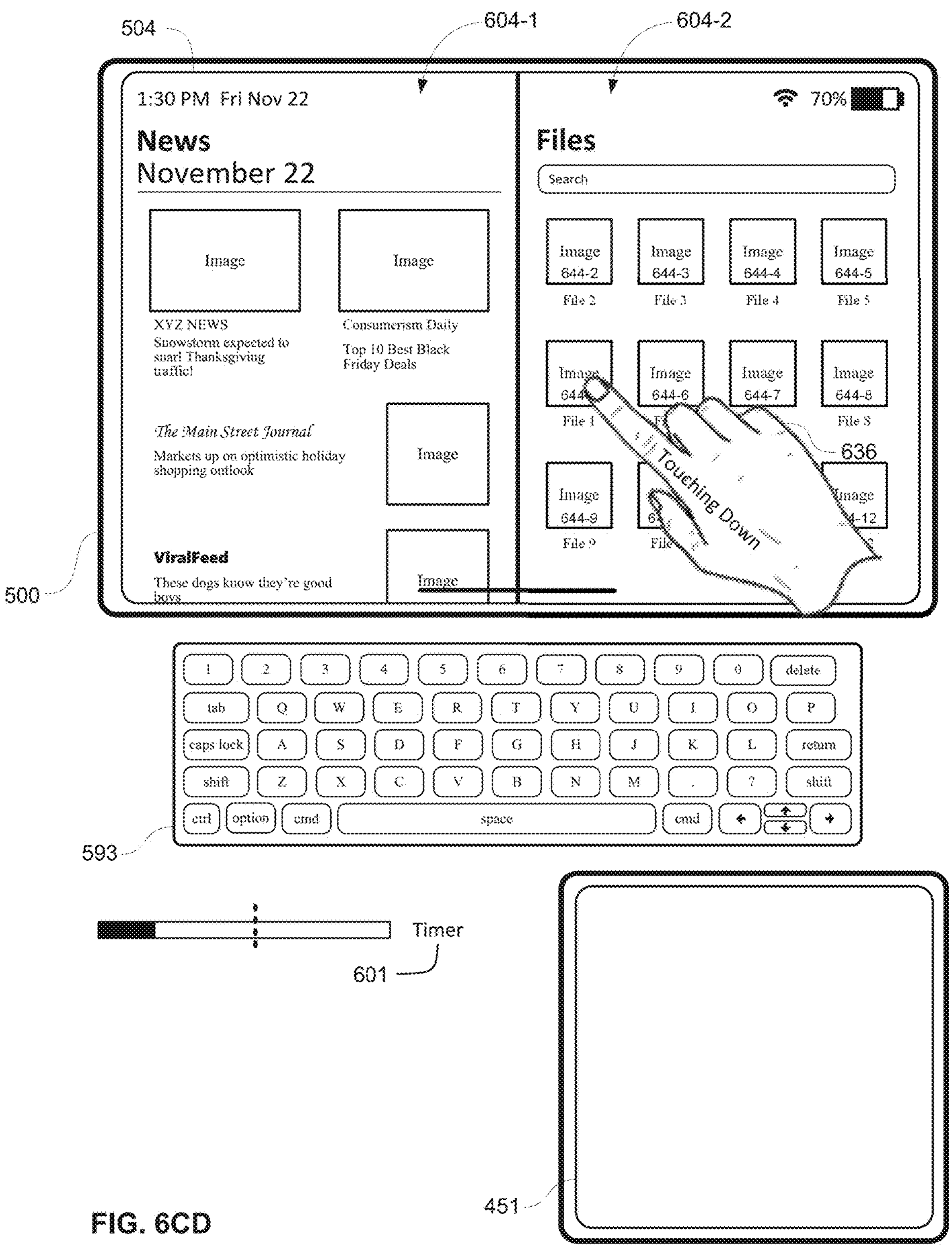
Figure 6C:
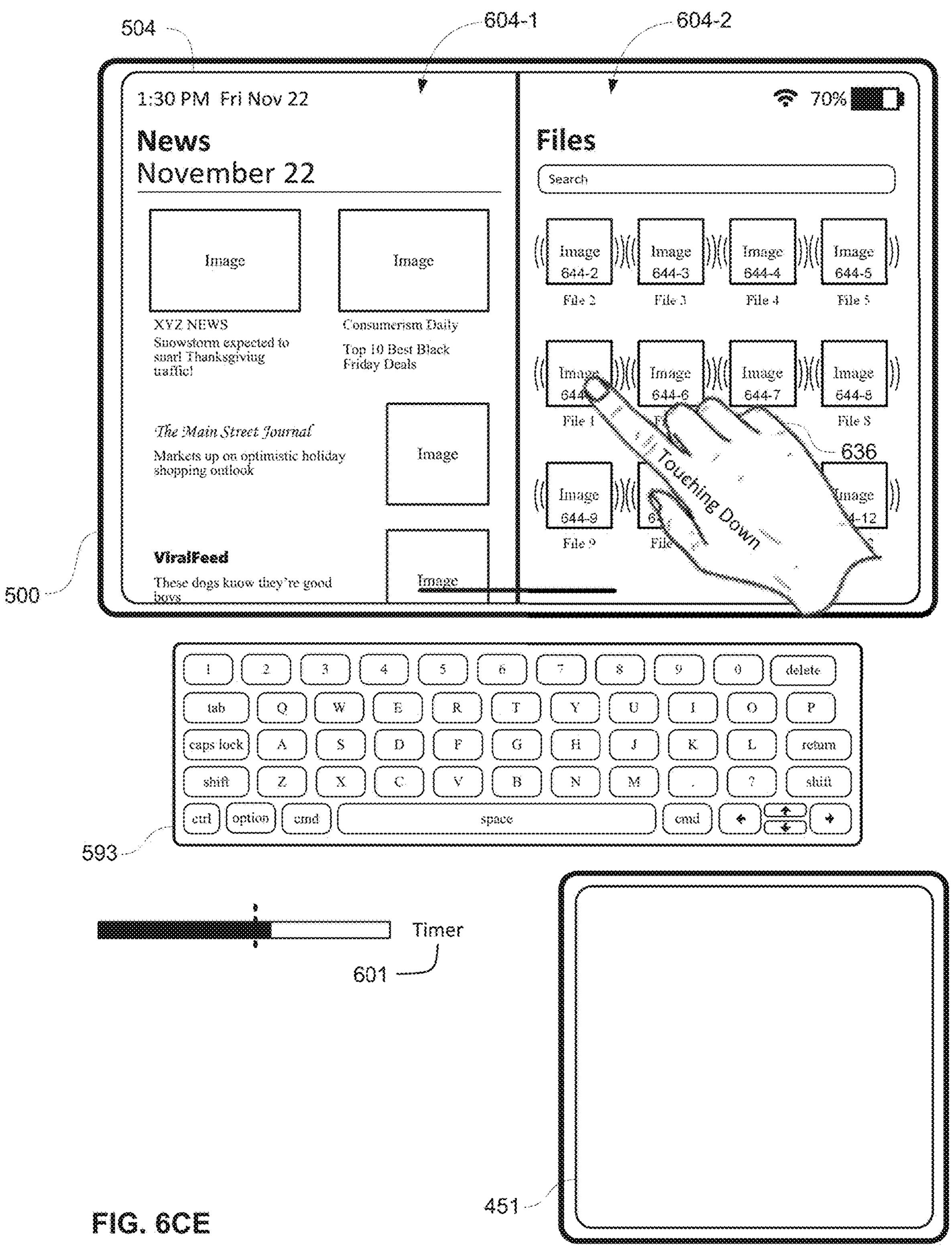
Figure 6C:
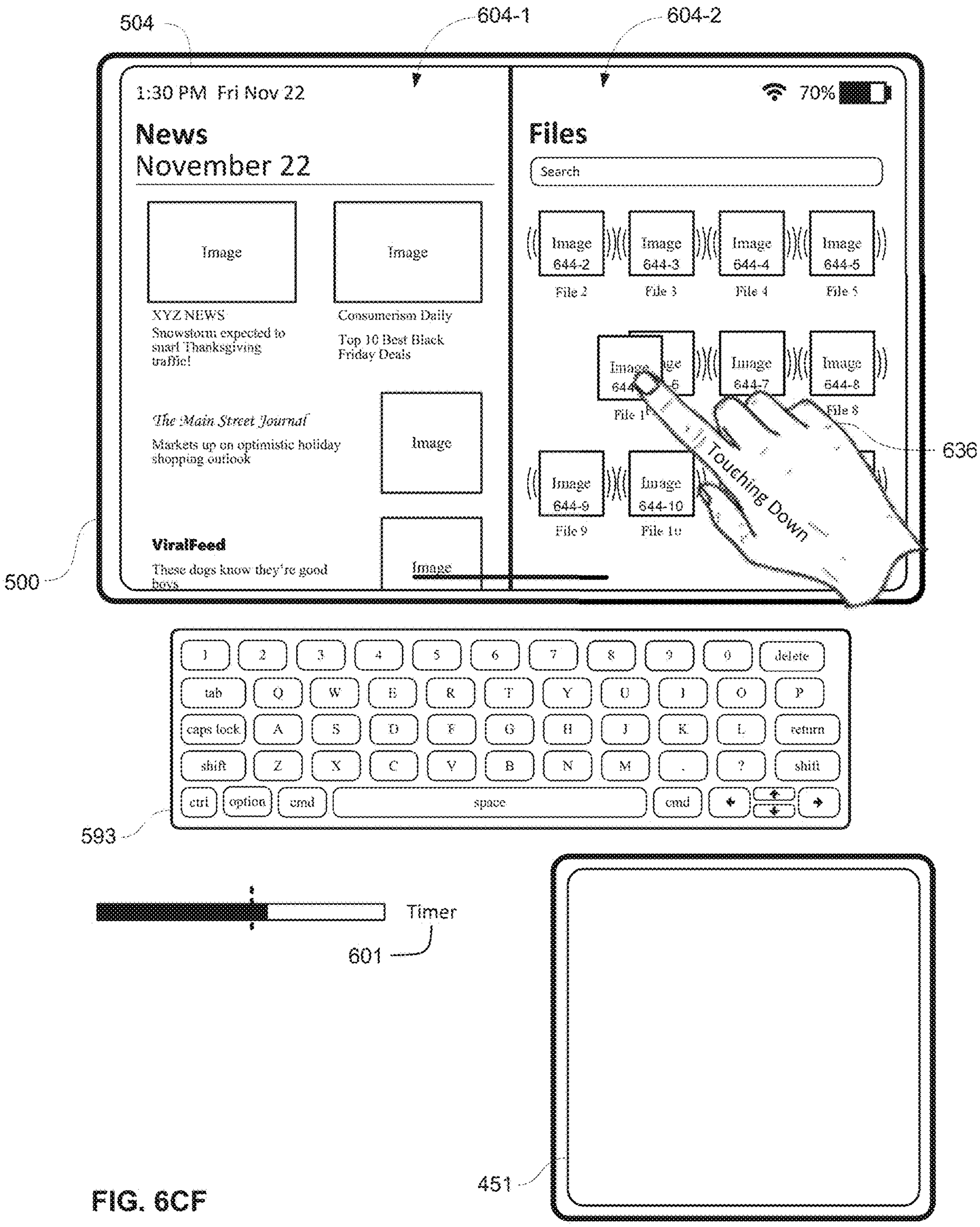
Figure 6C:
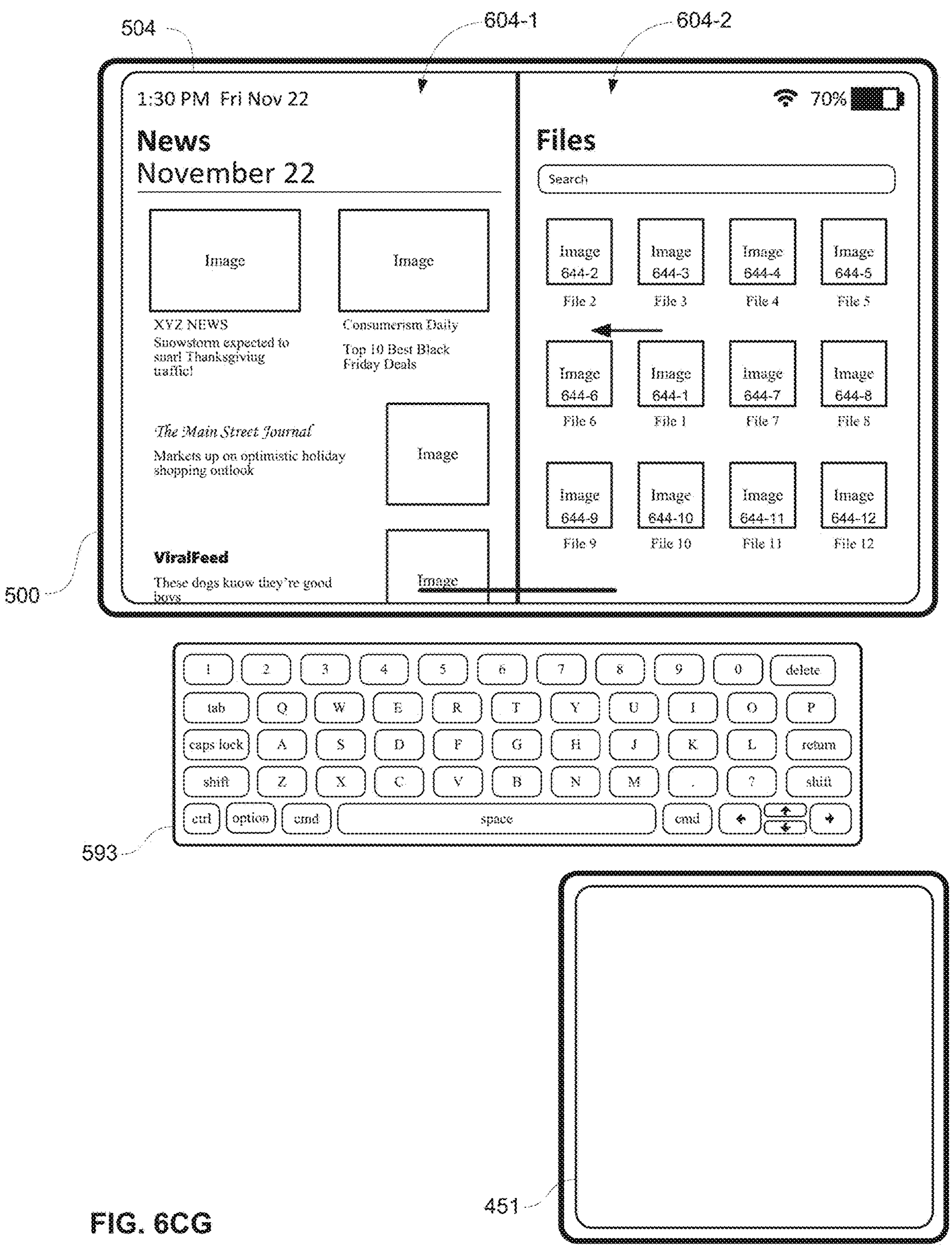
Figure 6C:
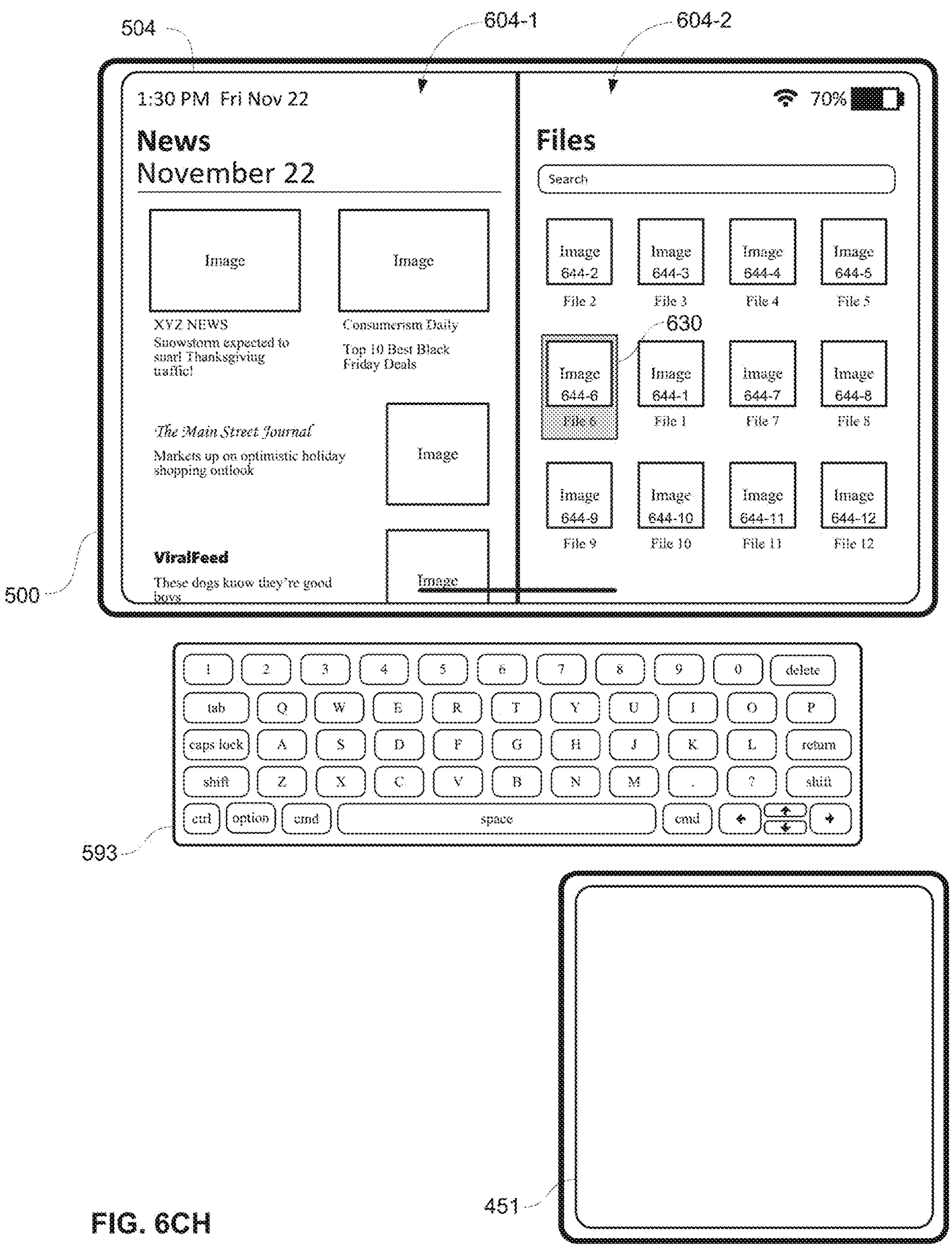
Figure 6C:
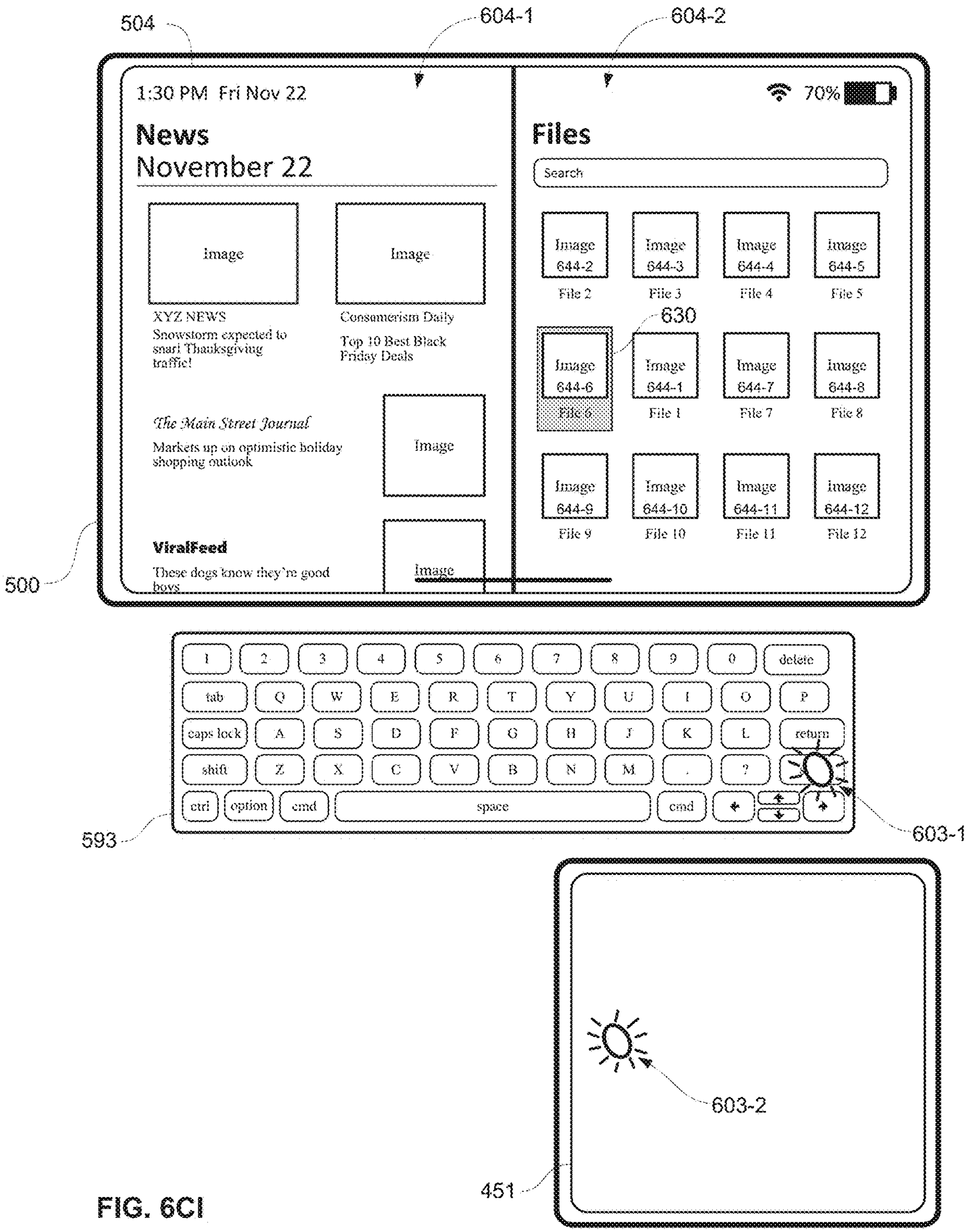
Figure 6C:
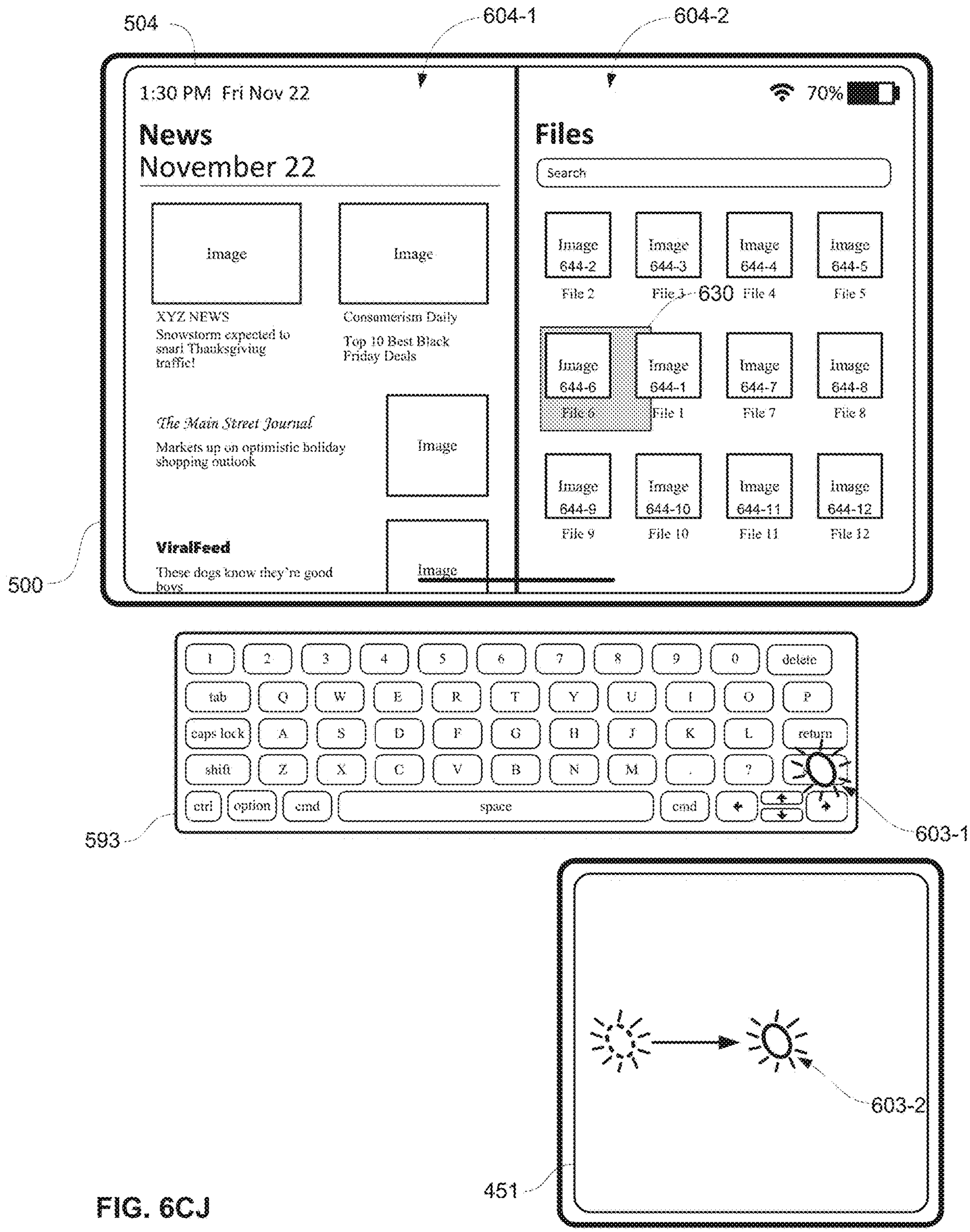
Figure 6C:
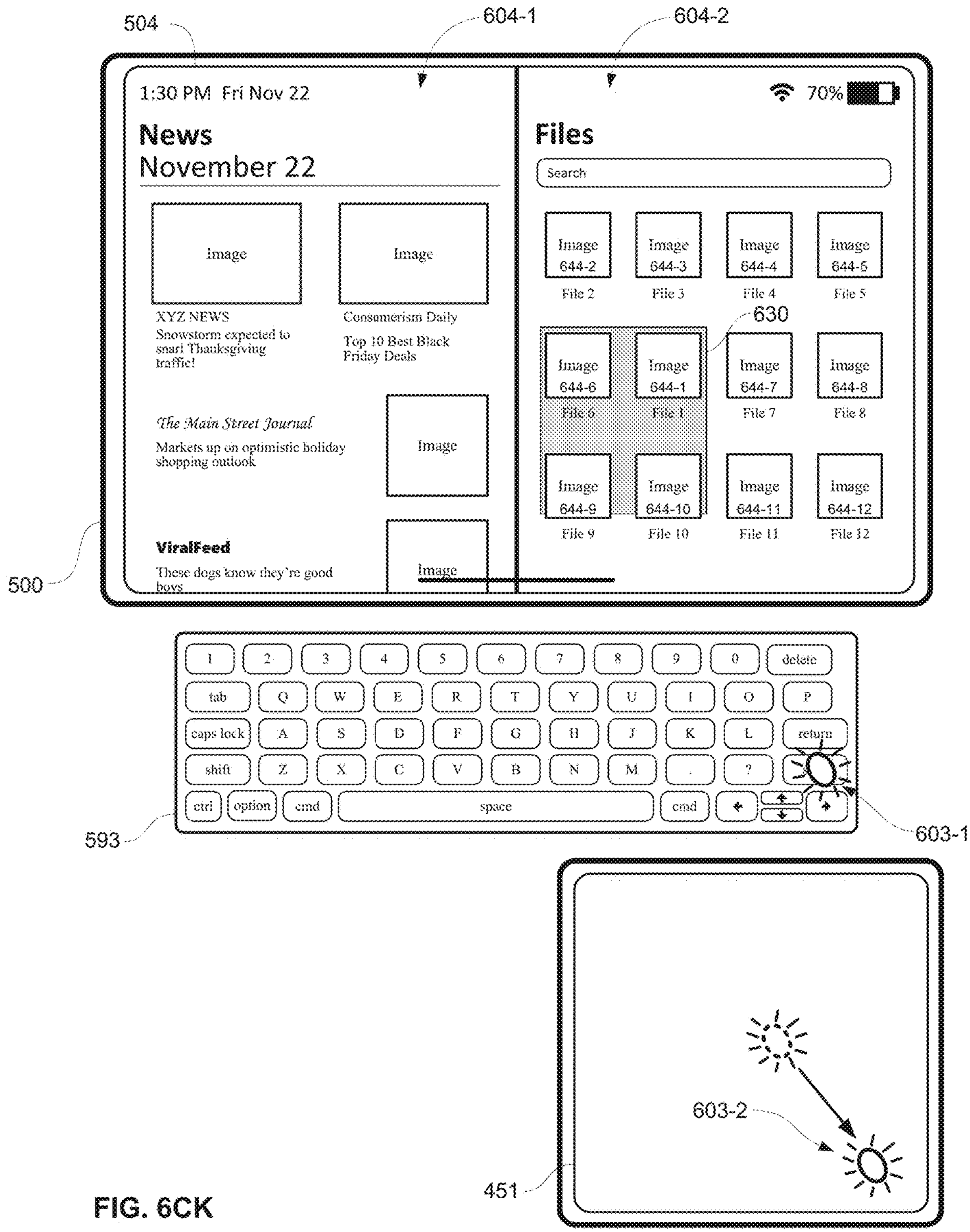
Figure 6C:
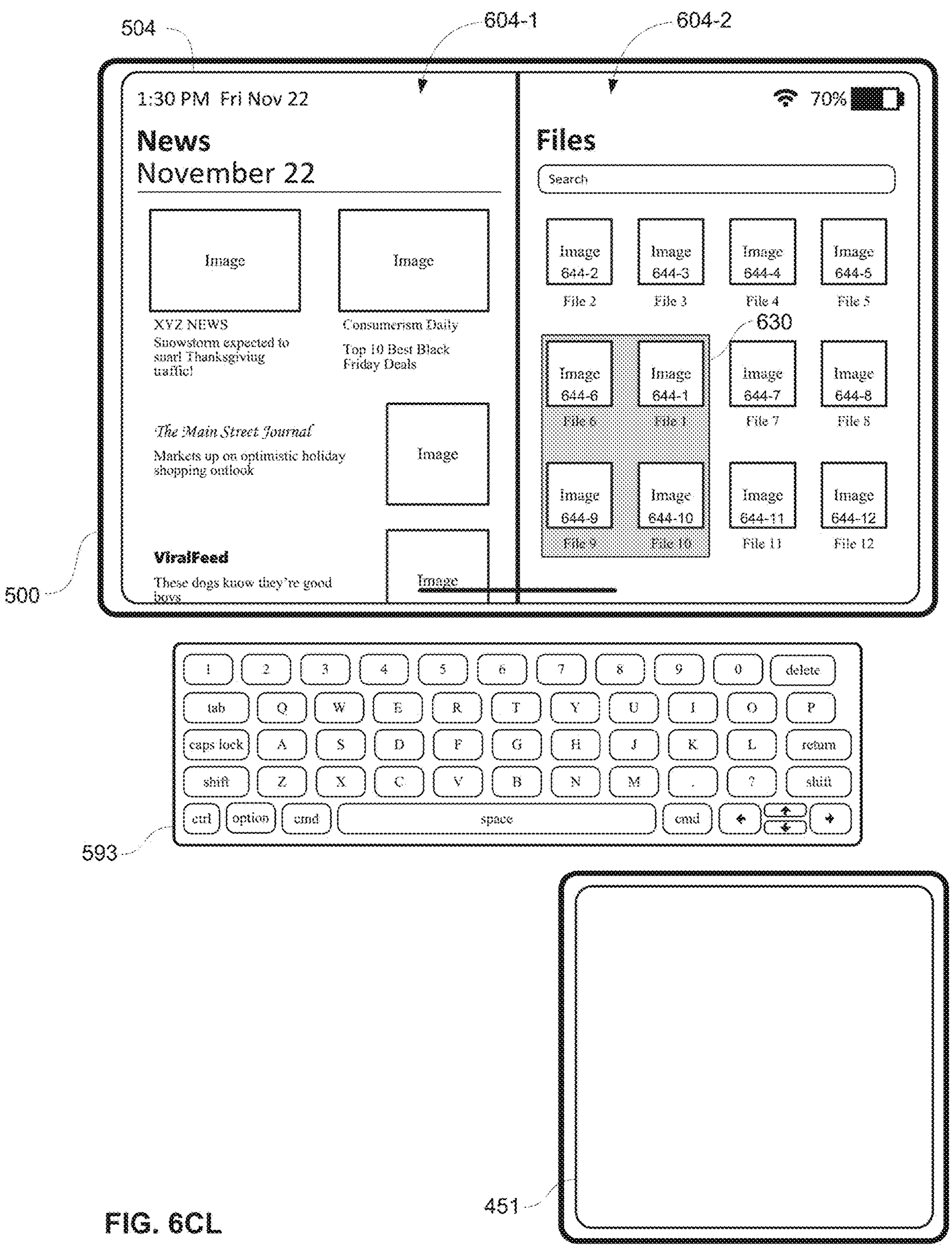
Figure 6C:
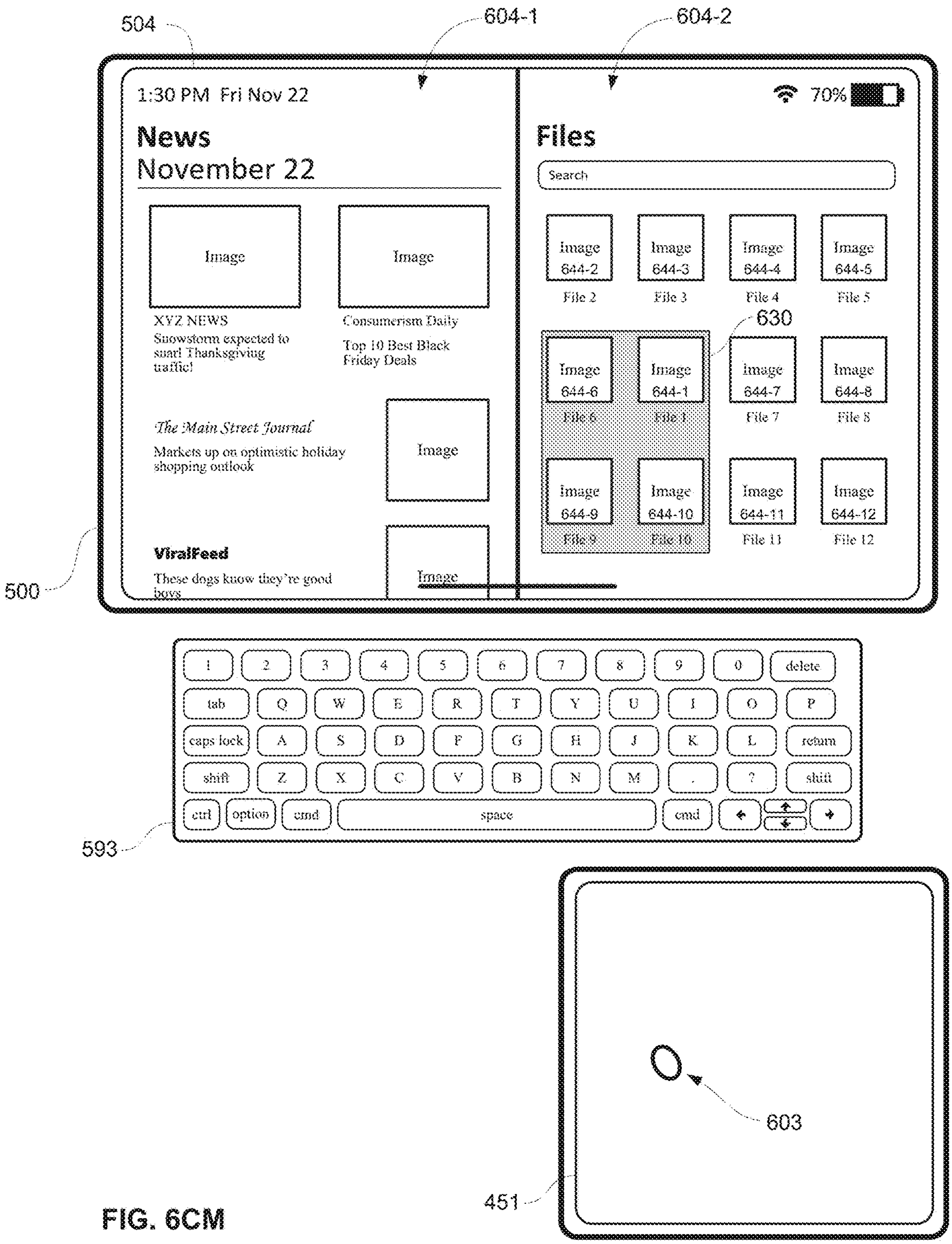
Figure 6C:
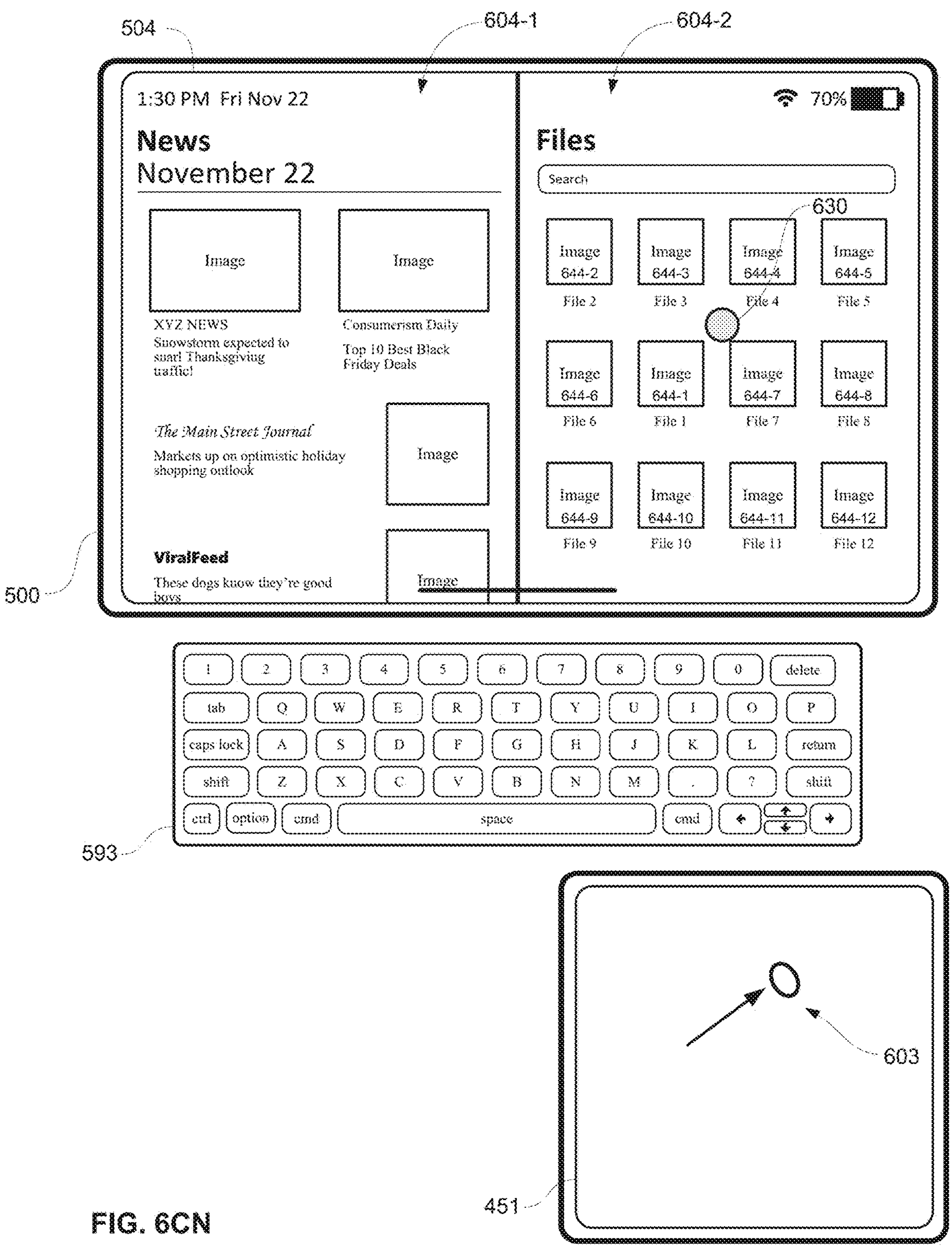
Figure 6C:
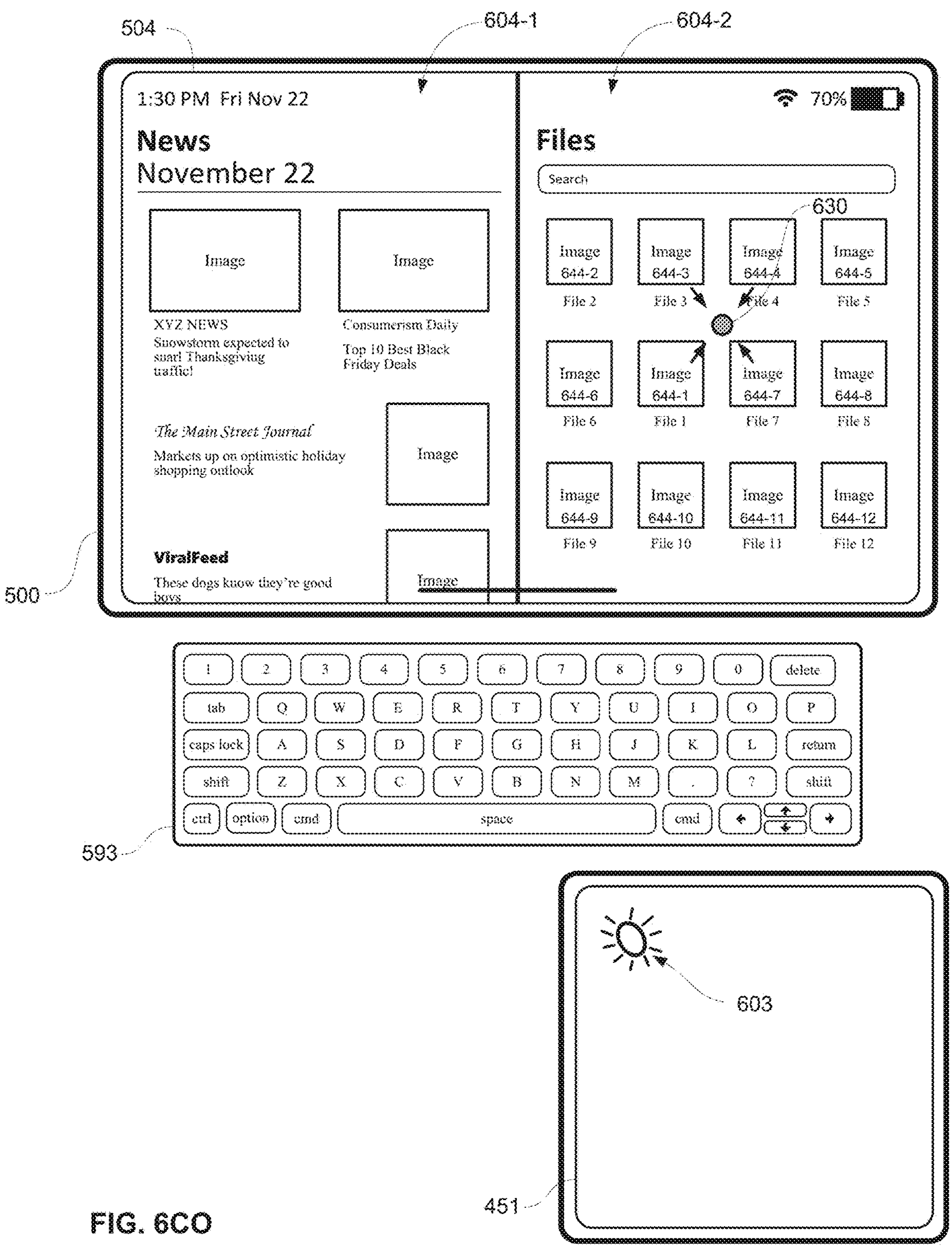
Figure 6C:
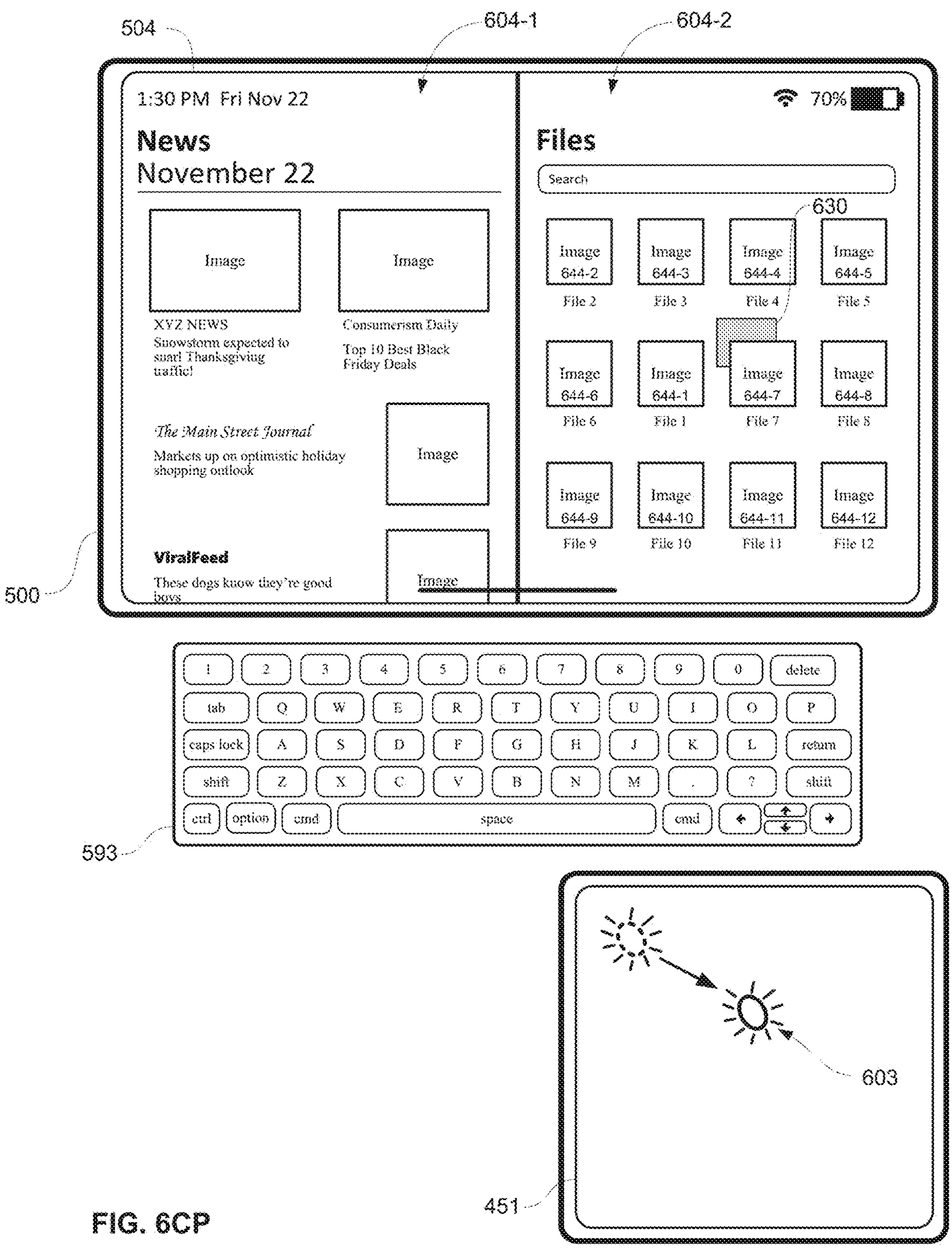
Figure 6C:
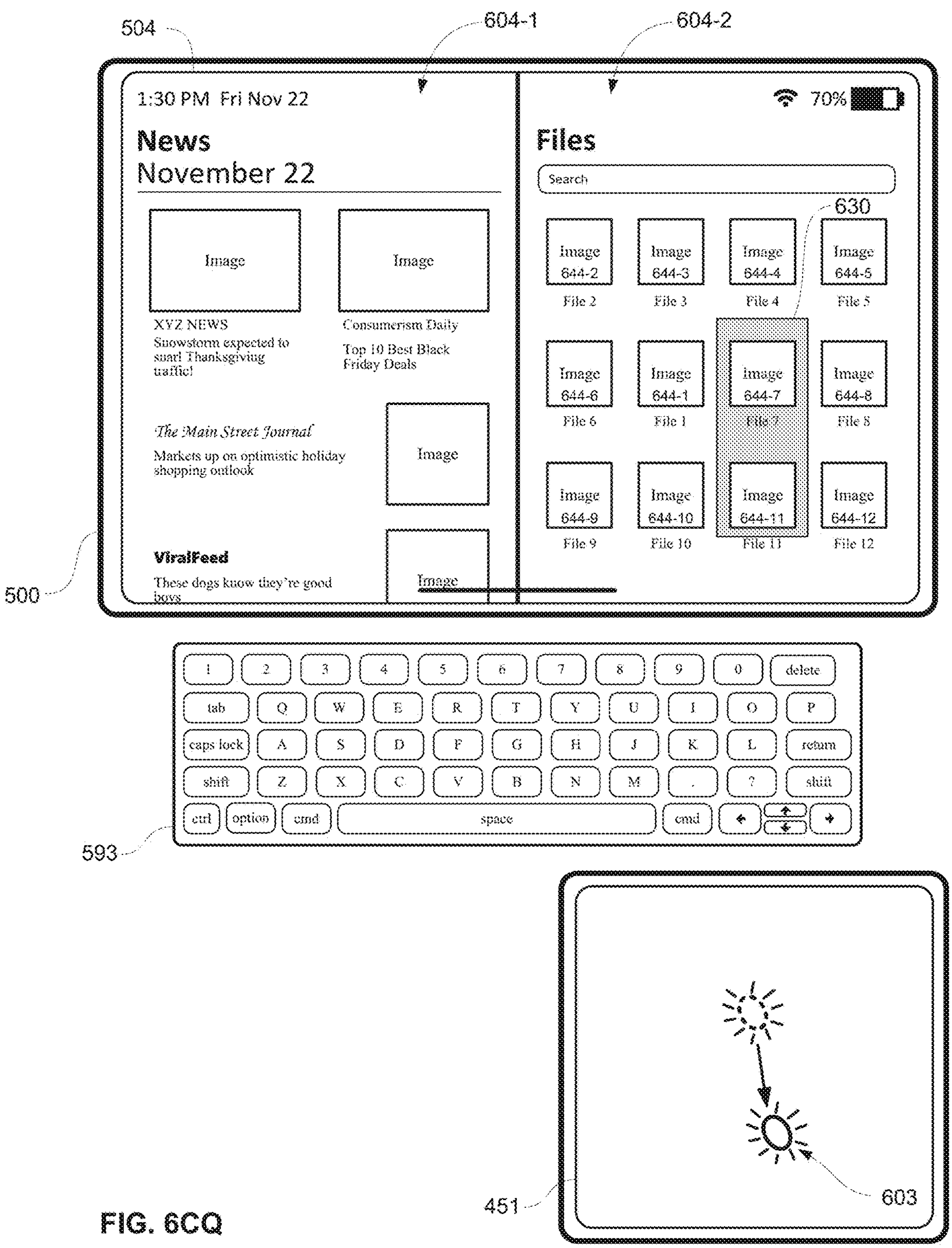
Figure 6C:
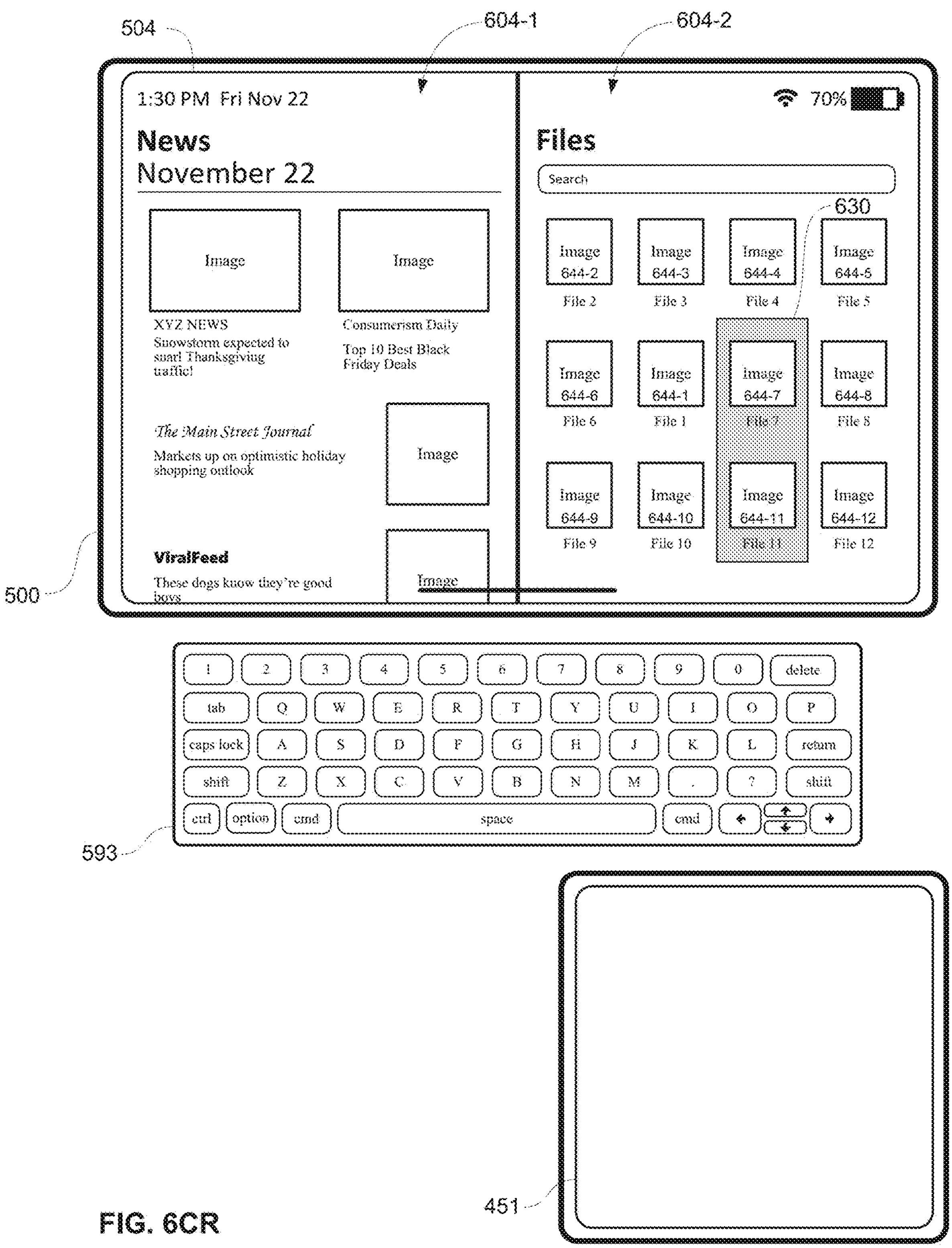
Figure 6C:
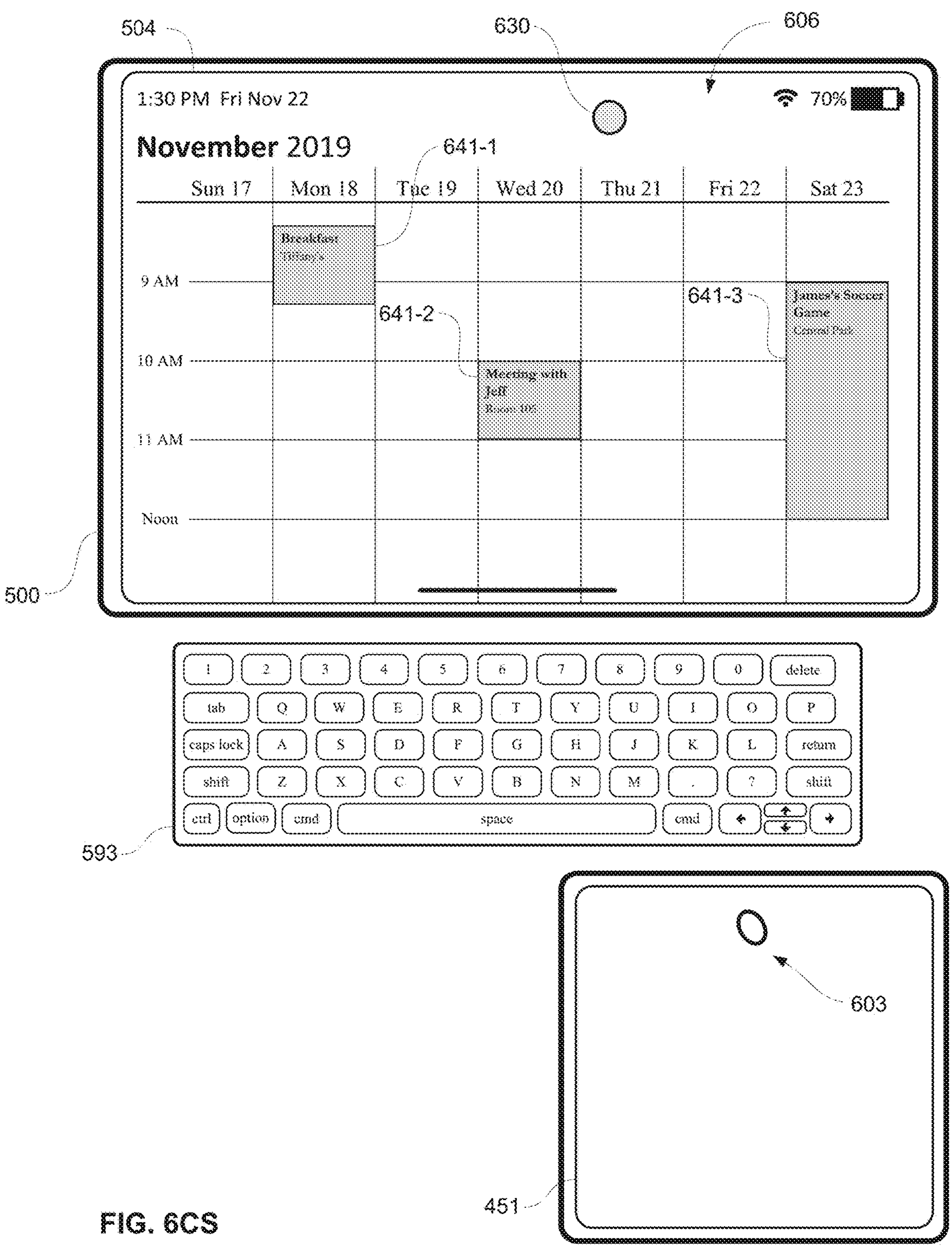
Figure 6C:
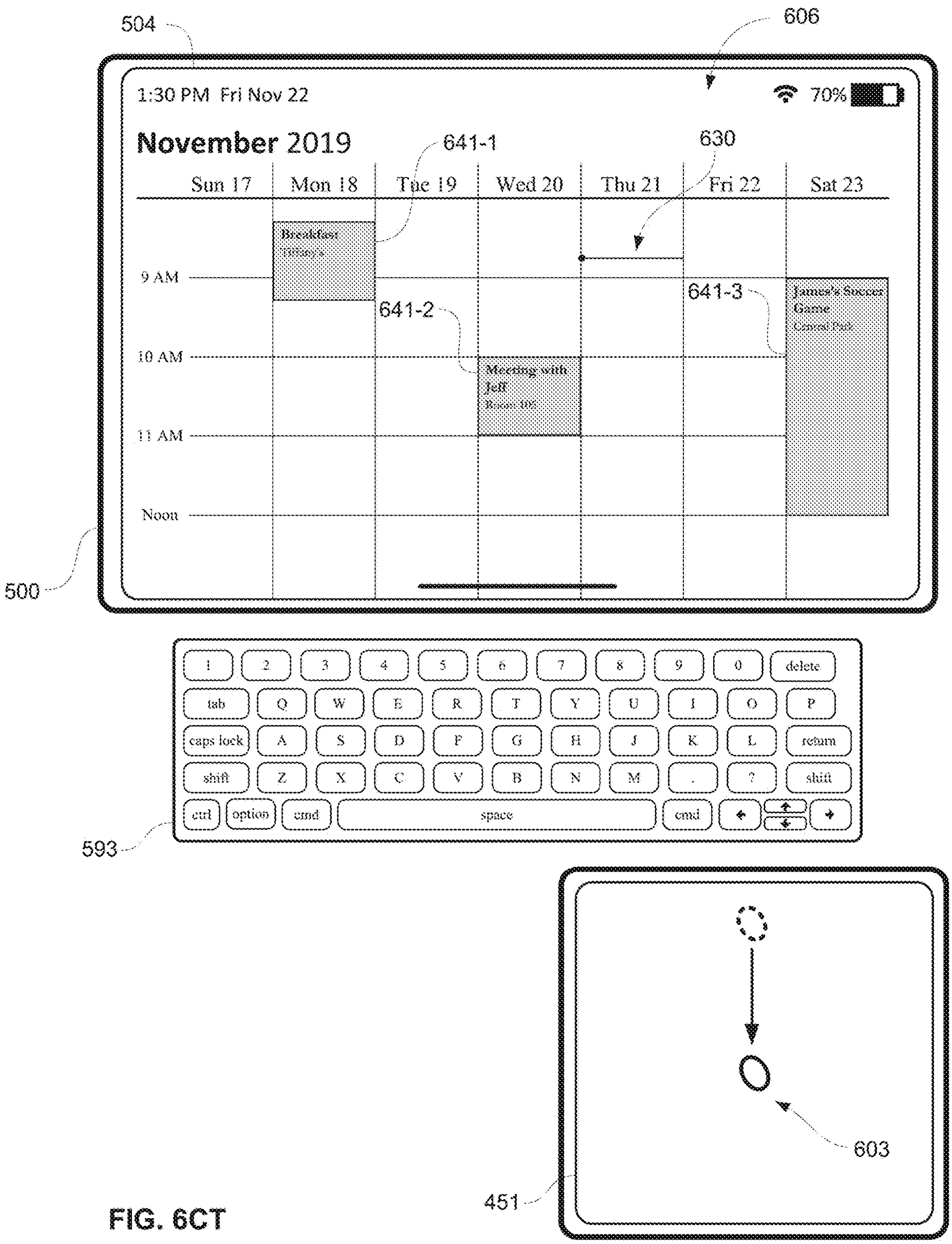
Figure 6C:
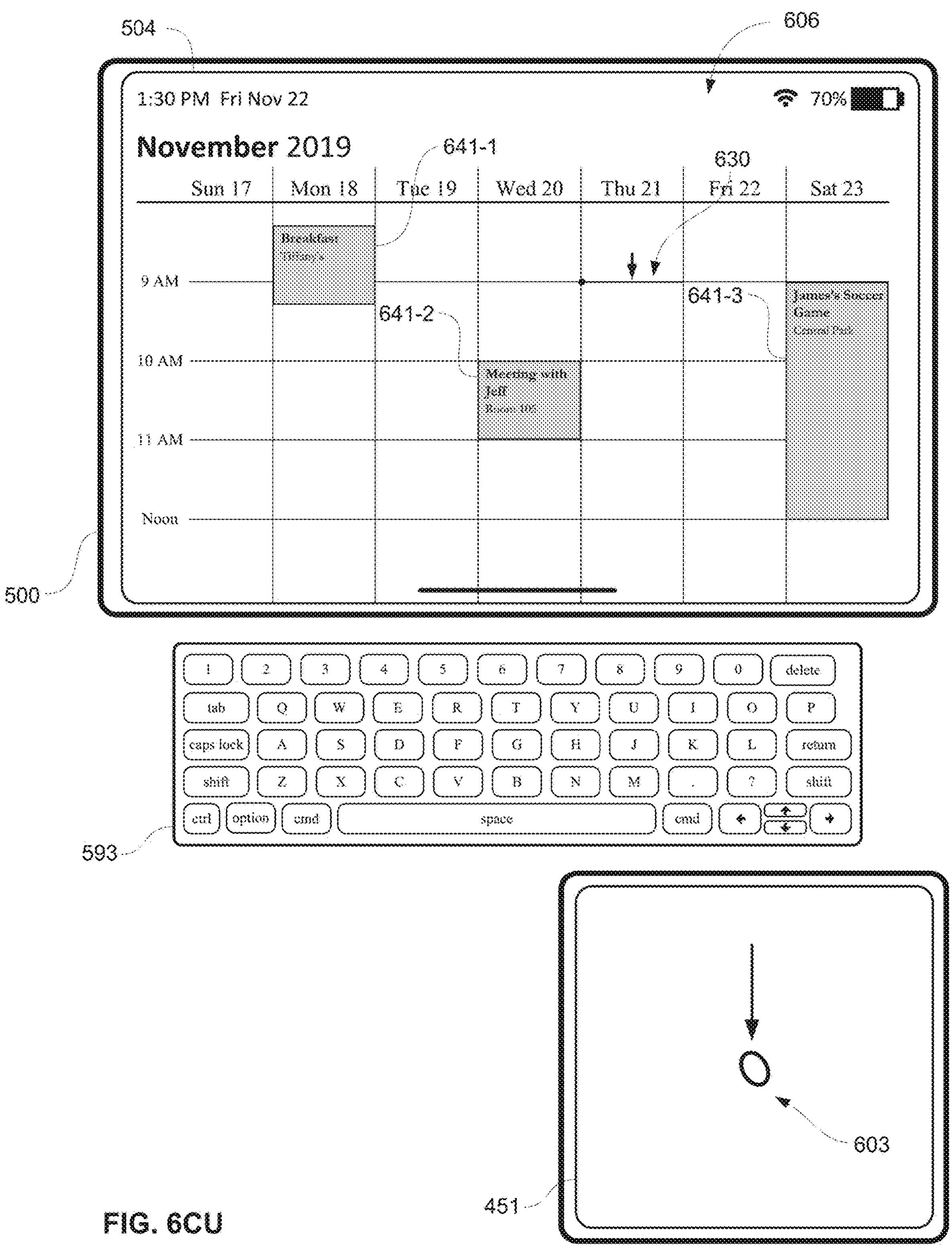
Figure 6C:
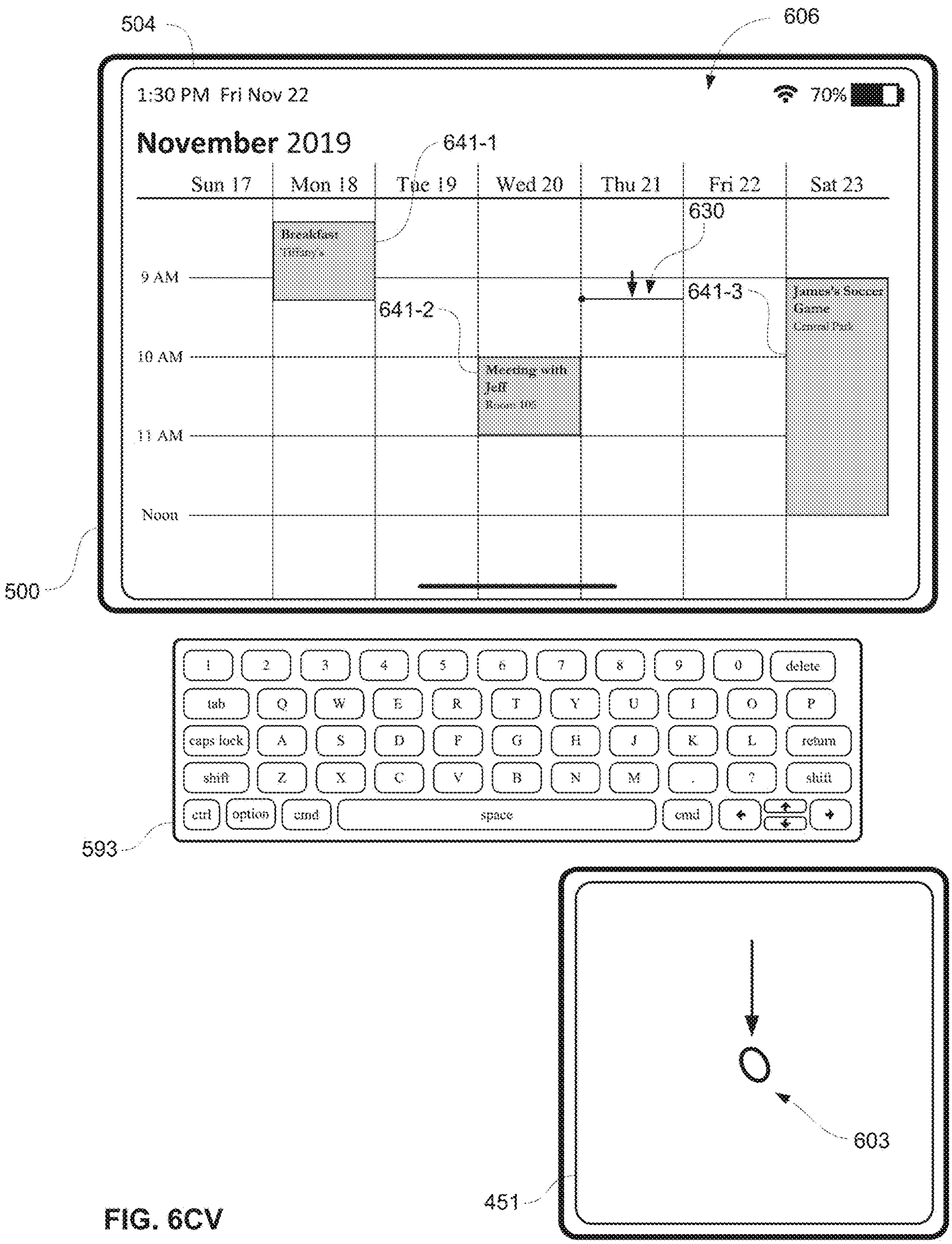
Figure 6C:
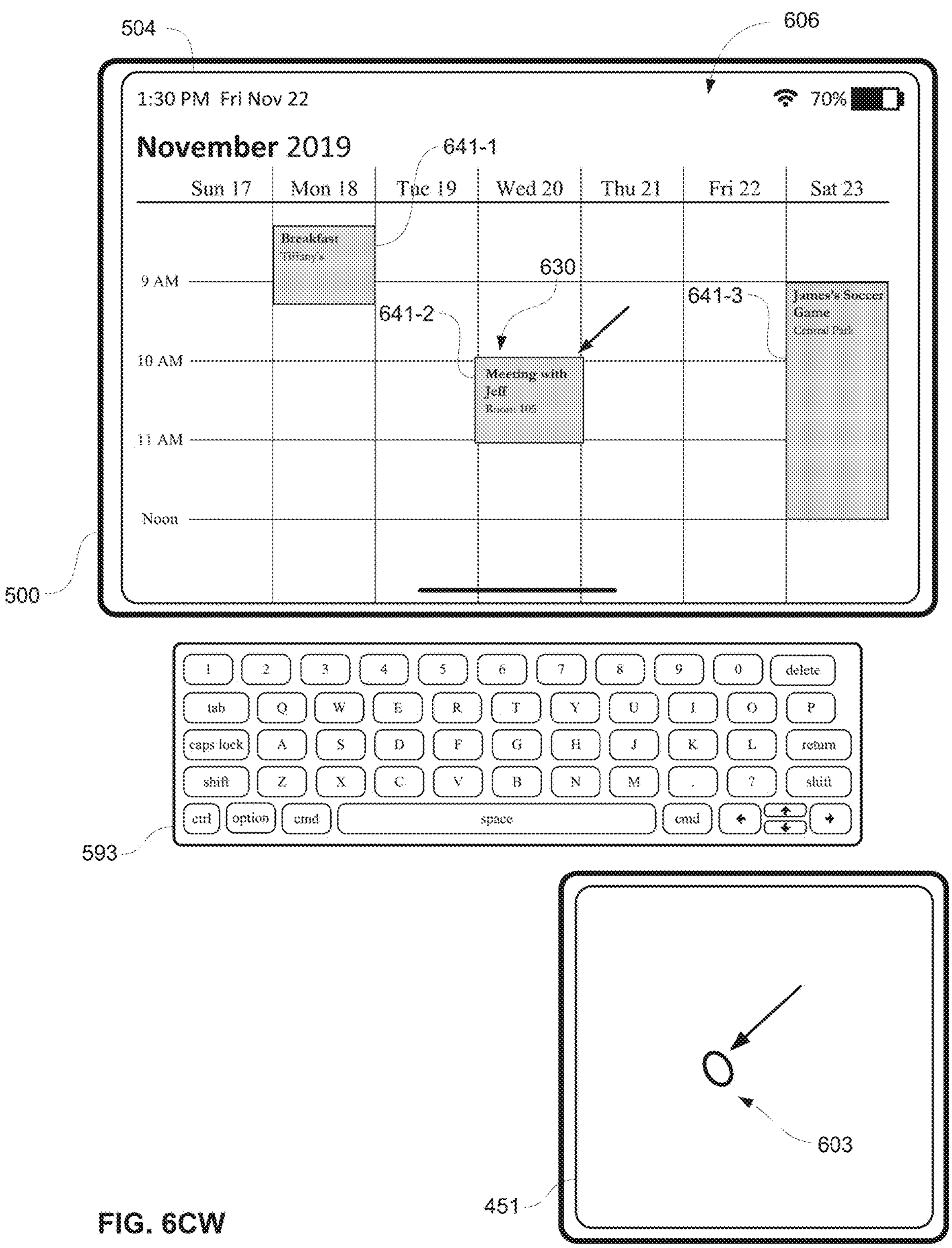
Figure 6C:
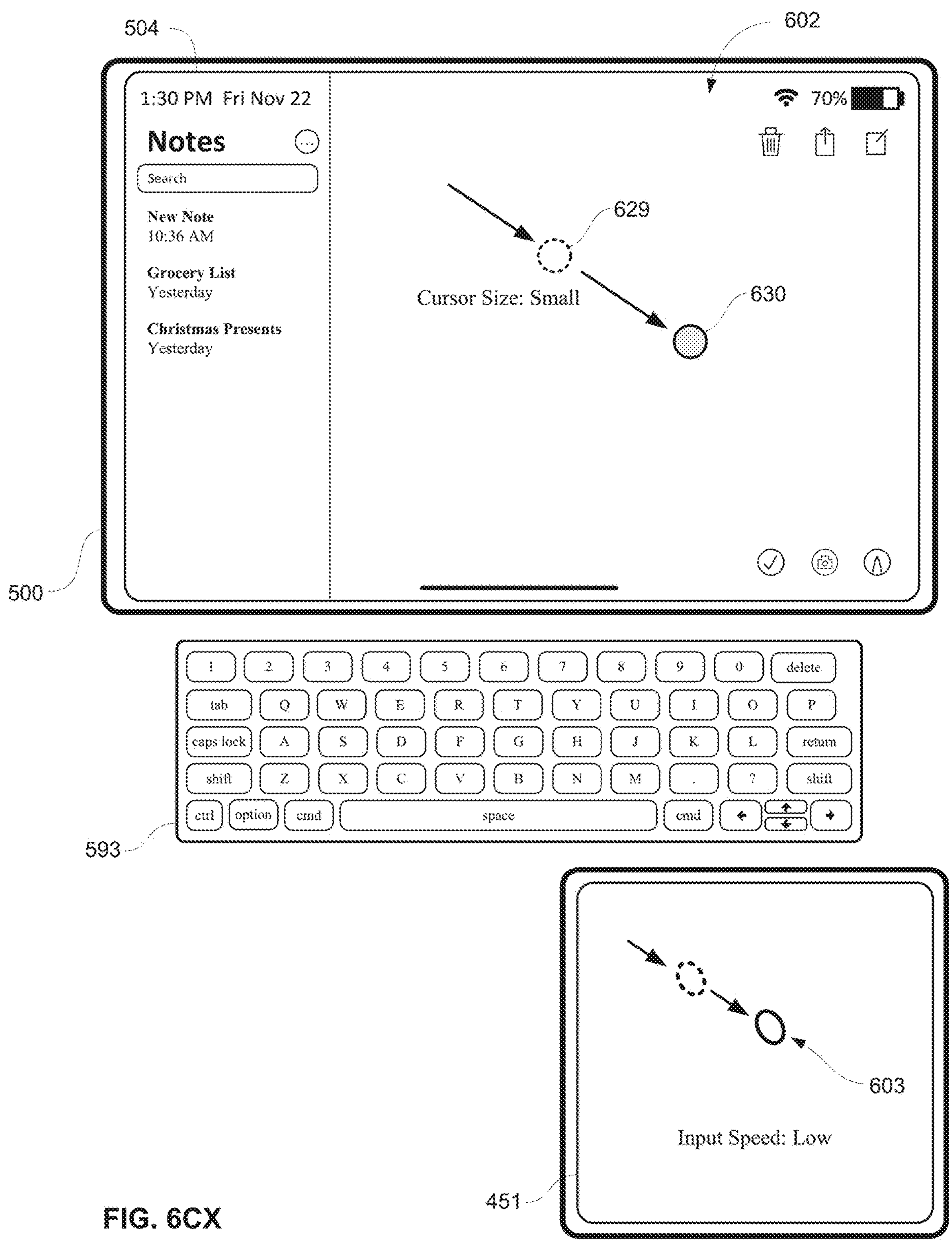
Figure 6C:
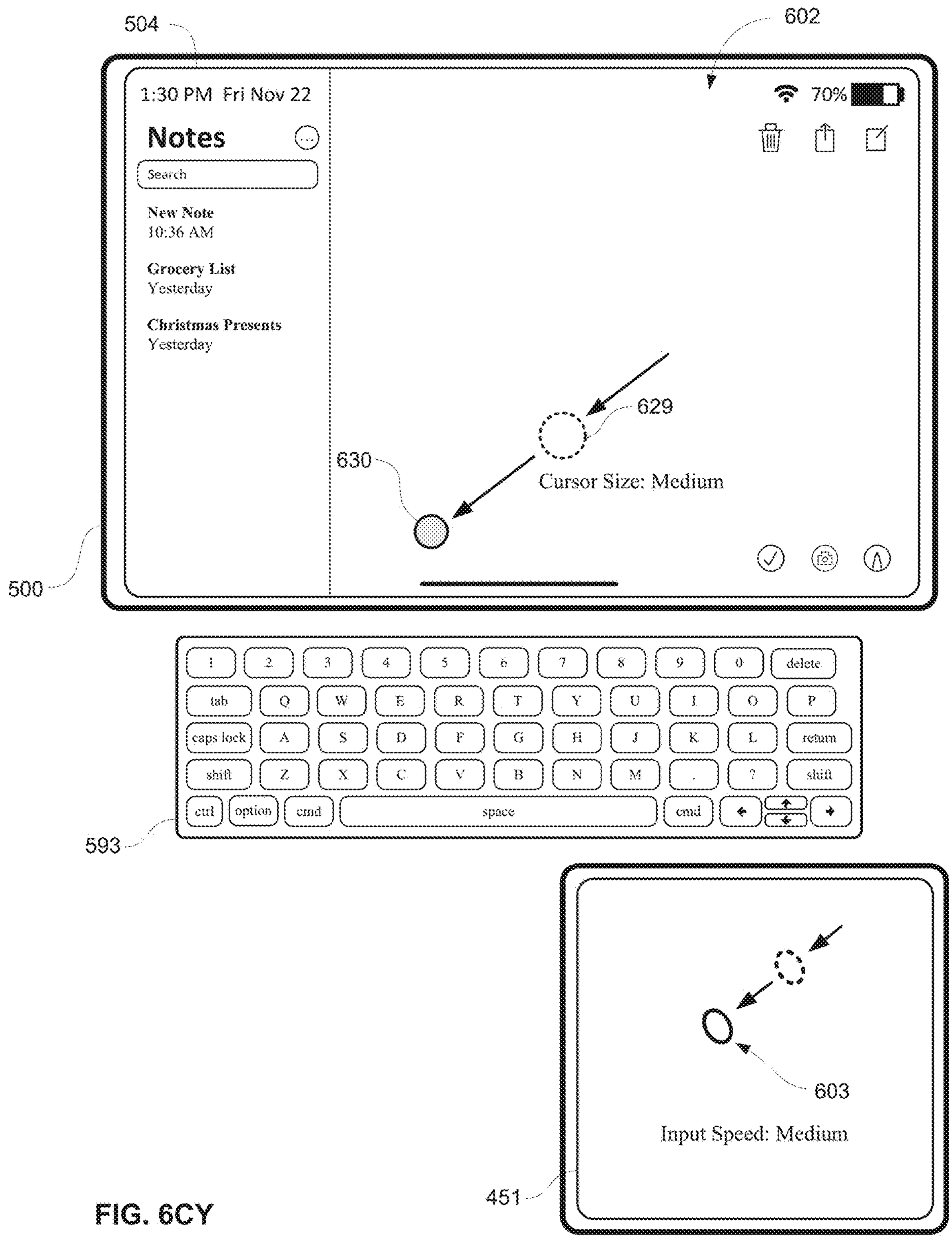
Figure 6C:
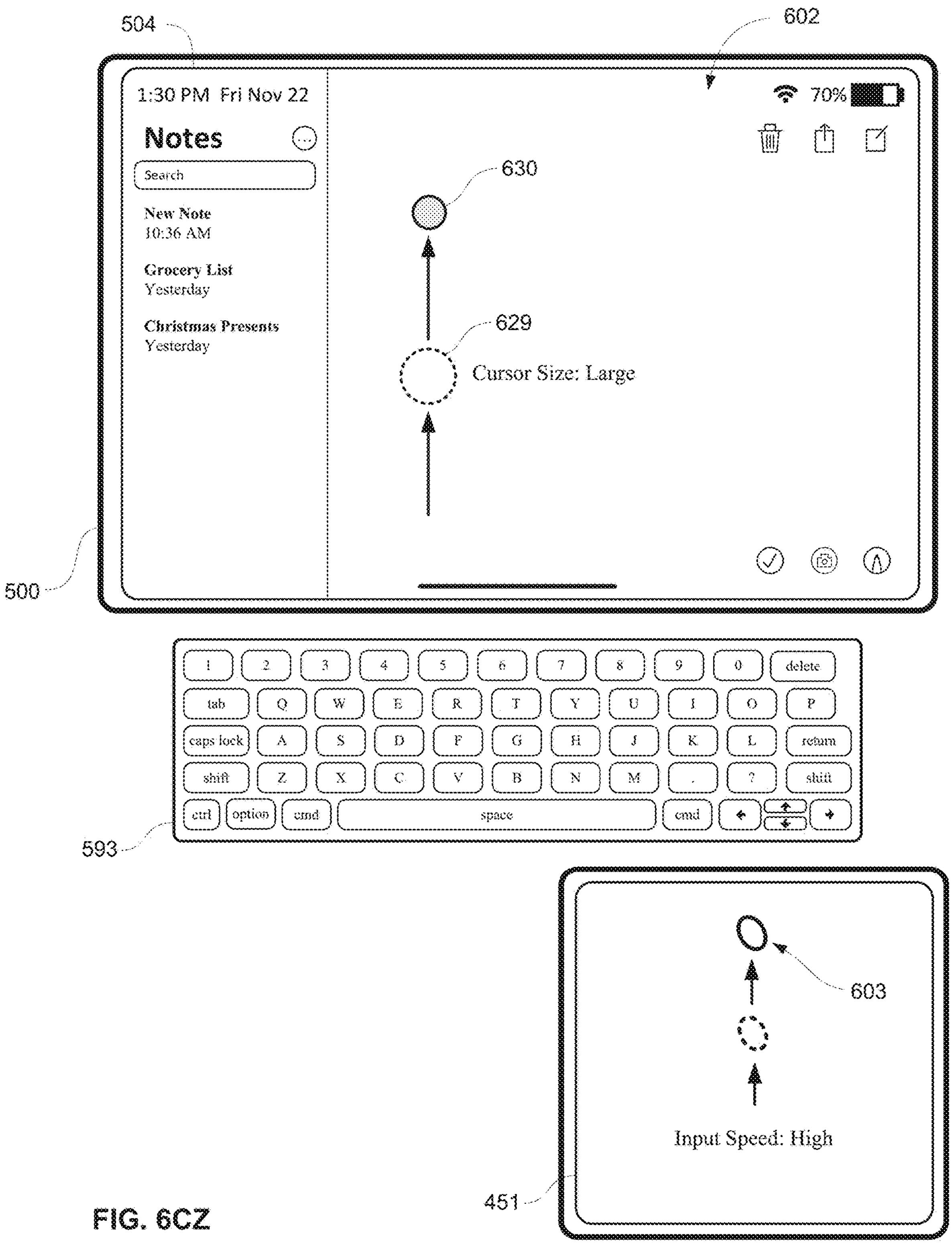
Figure 6D:
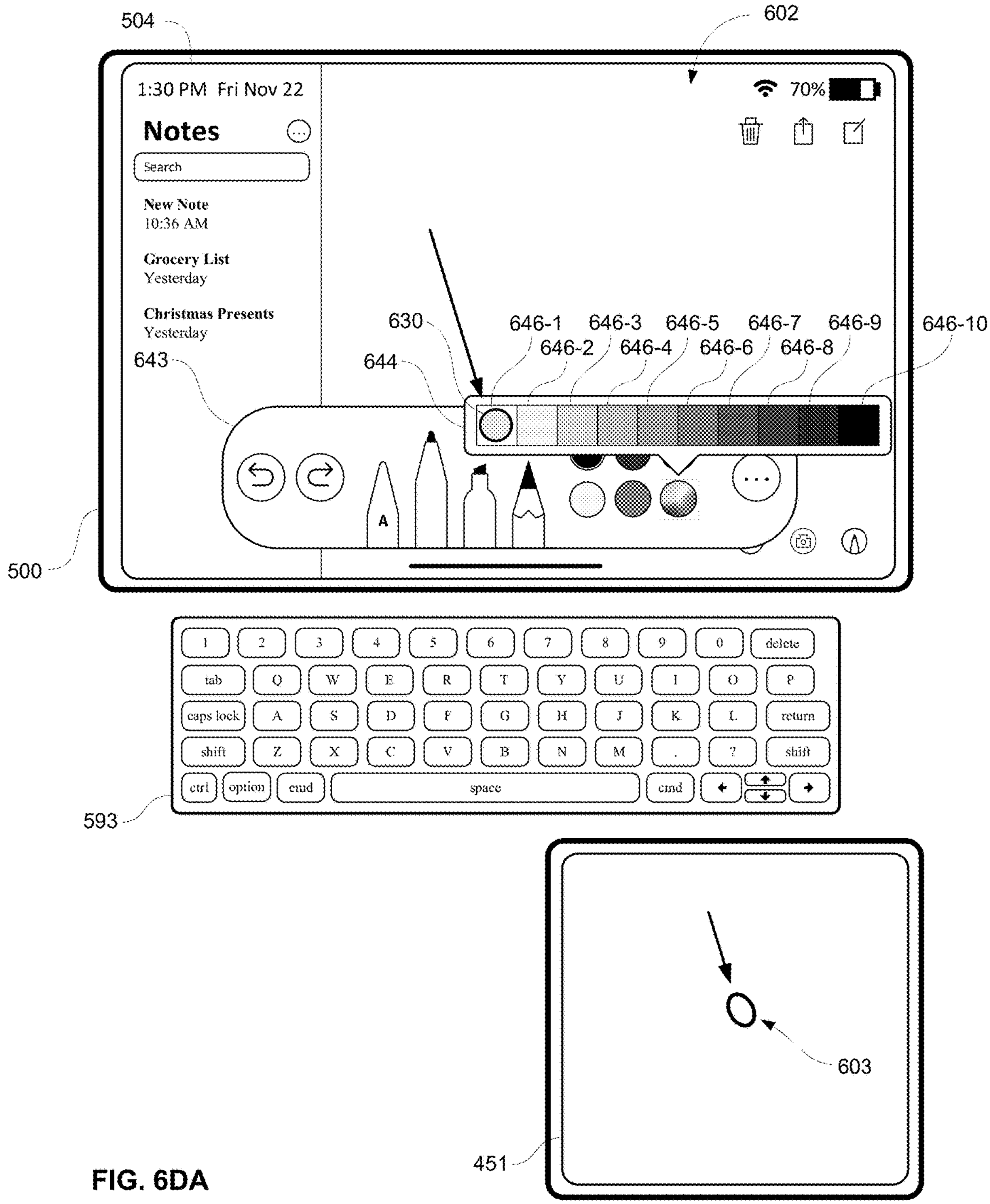
Figure 6D:
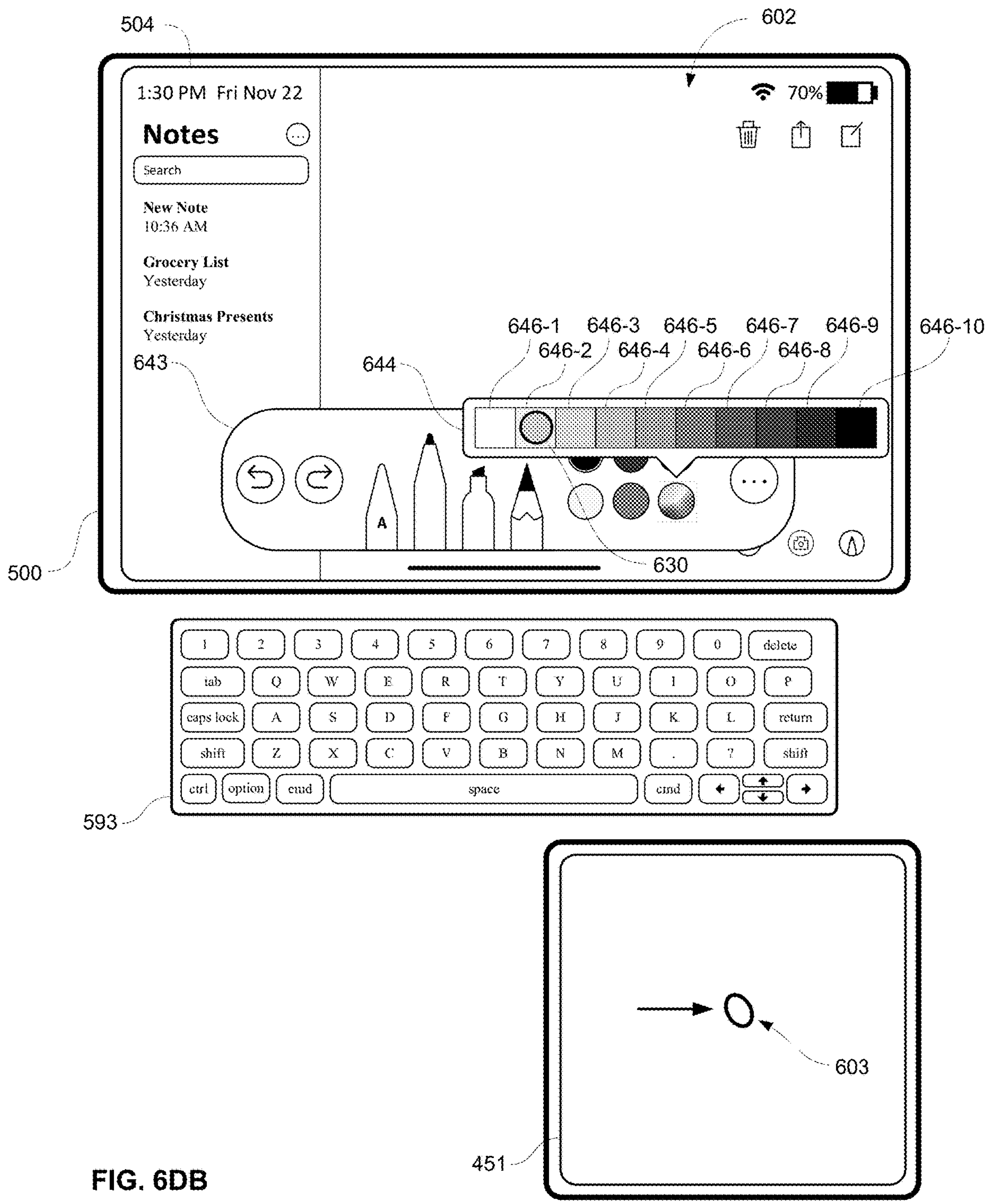
Figure 6D:
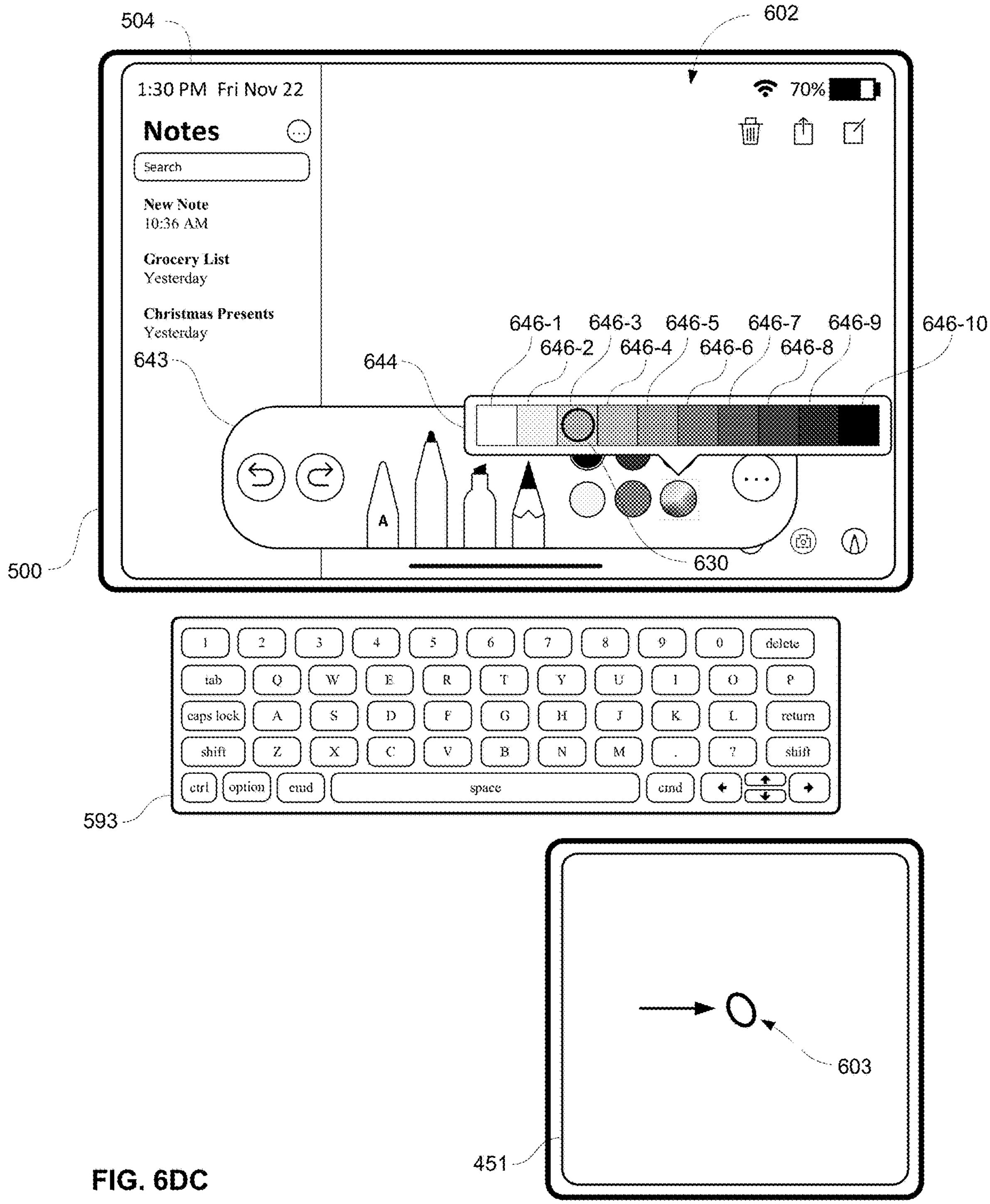
Figure 6D:
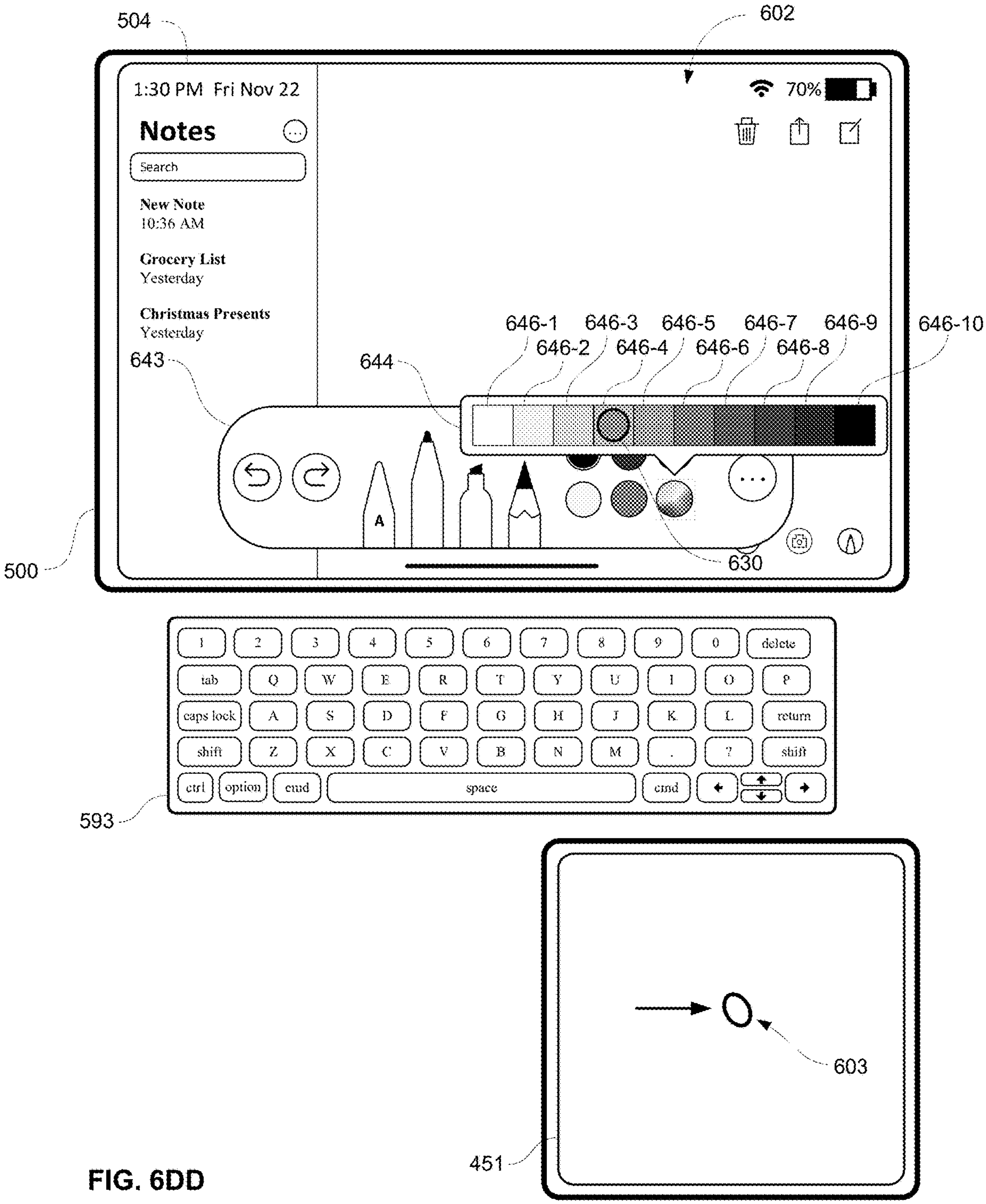
Figure 6D:
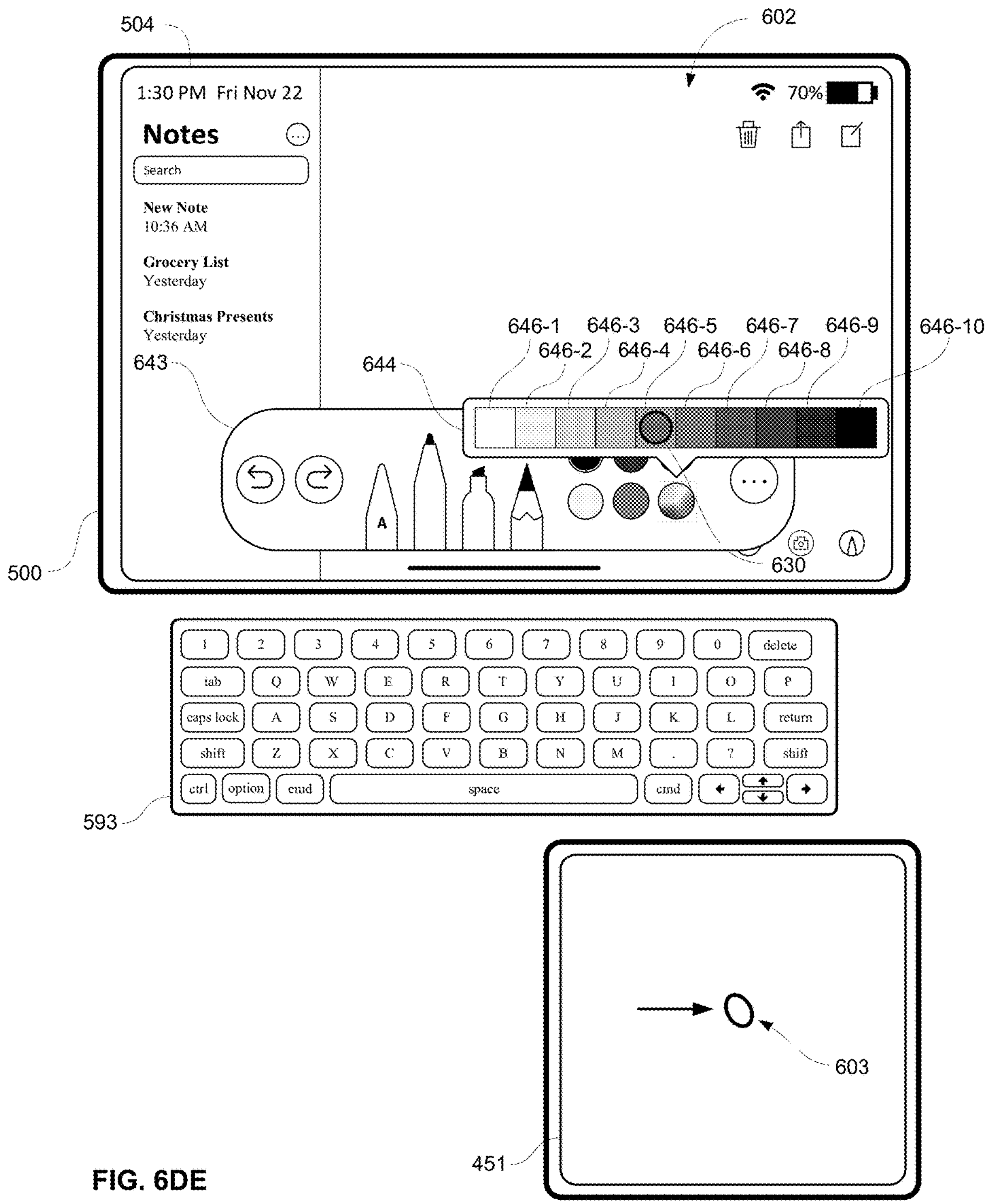
Figure 6D:
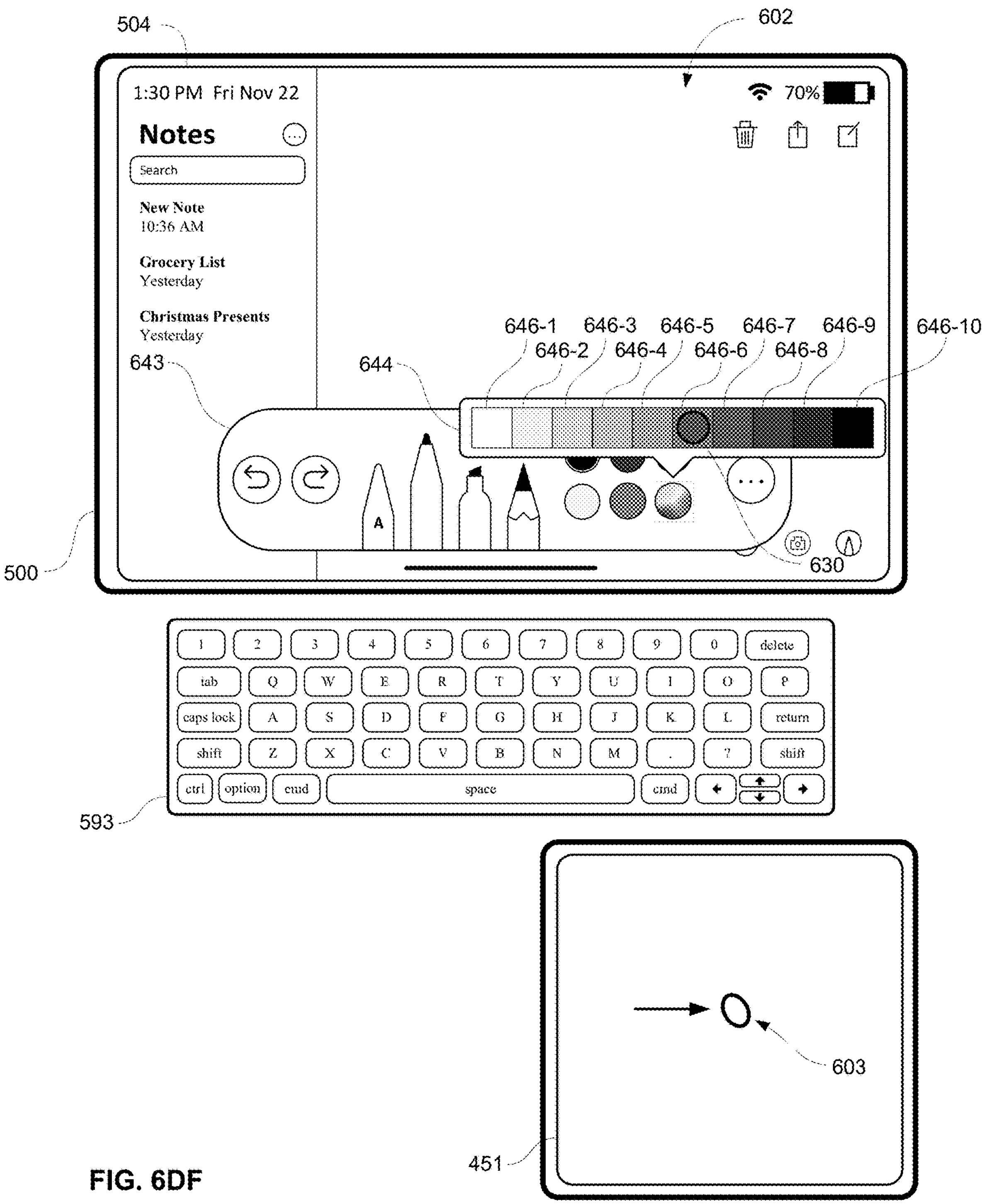
Figure 6D:
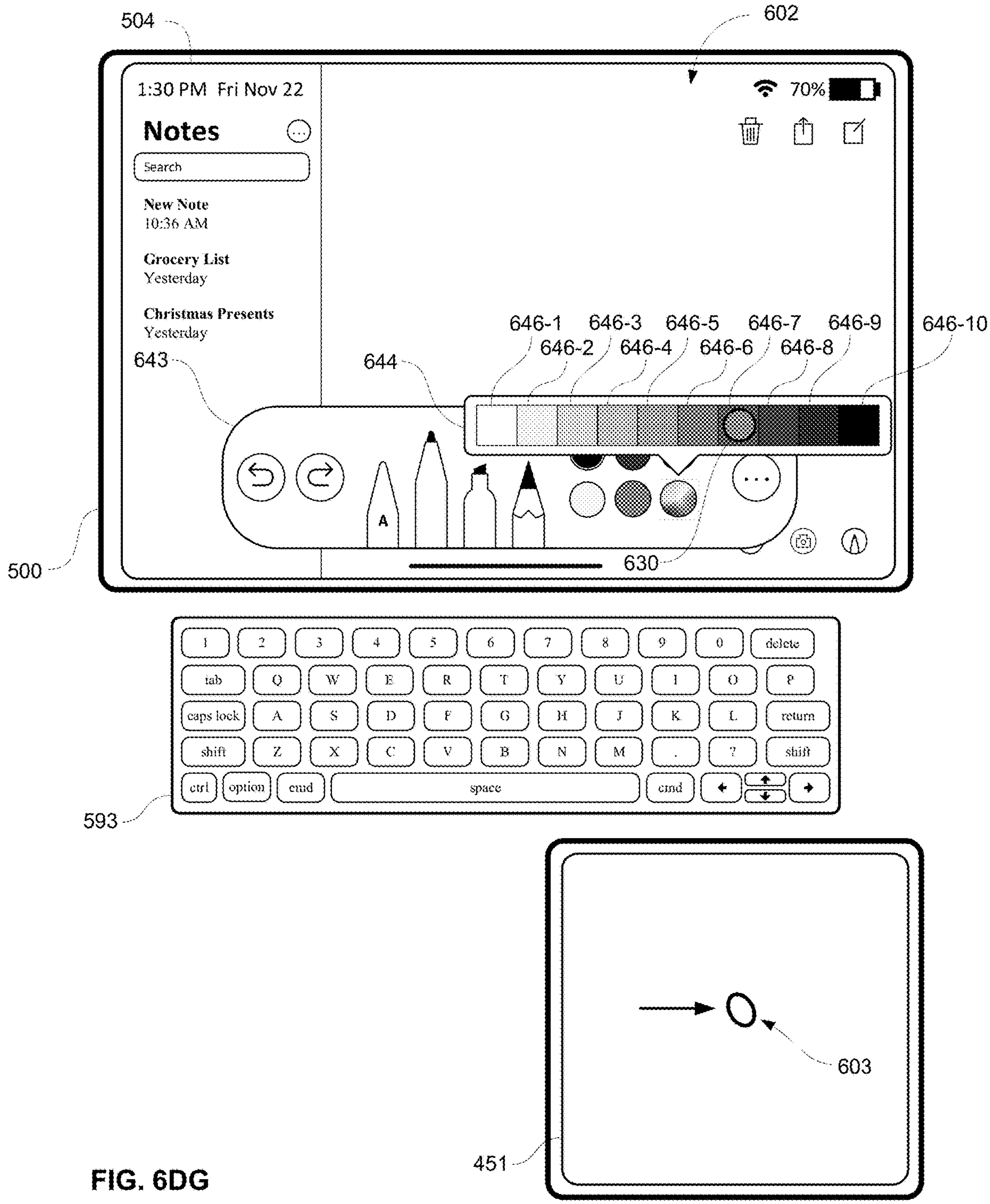
Figure 6D:
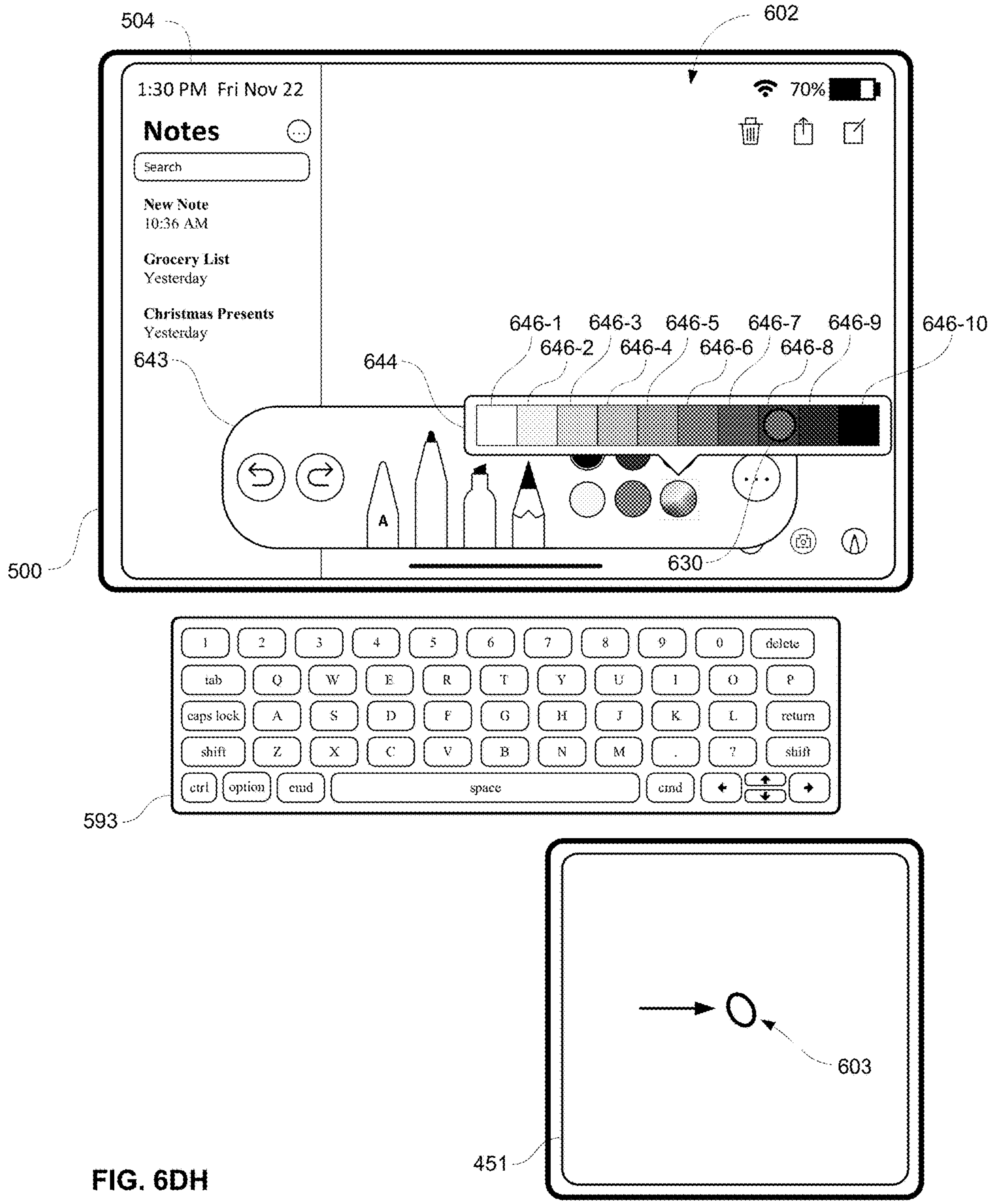
Figure 6D:
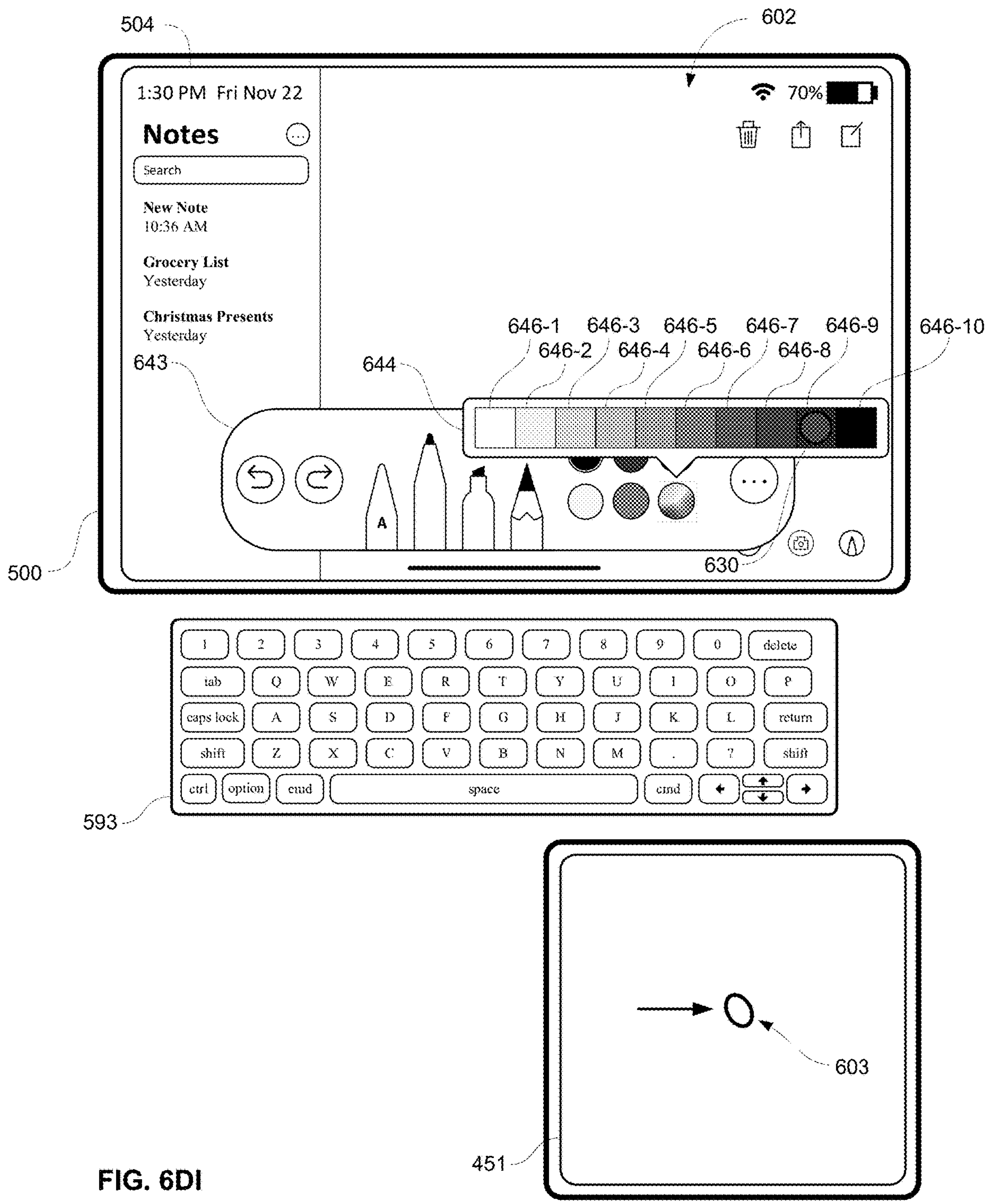
Figure 6D:
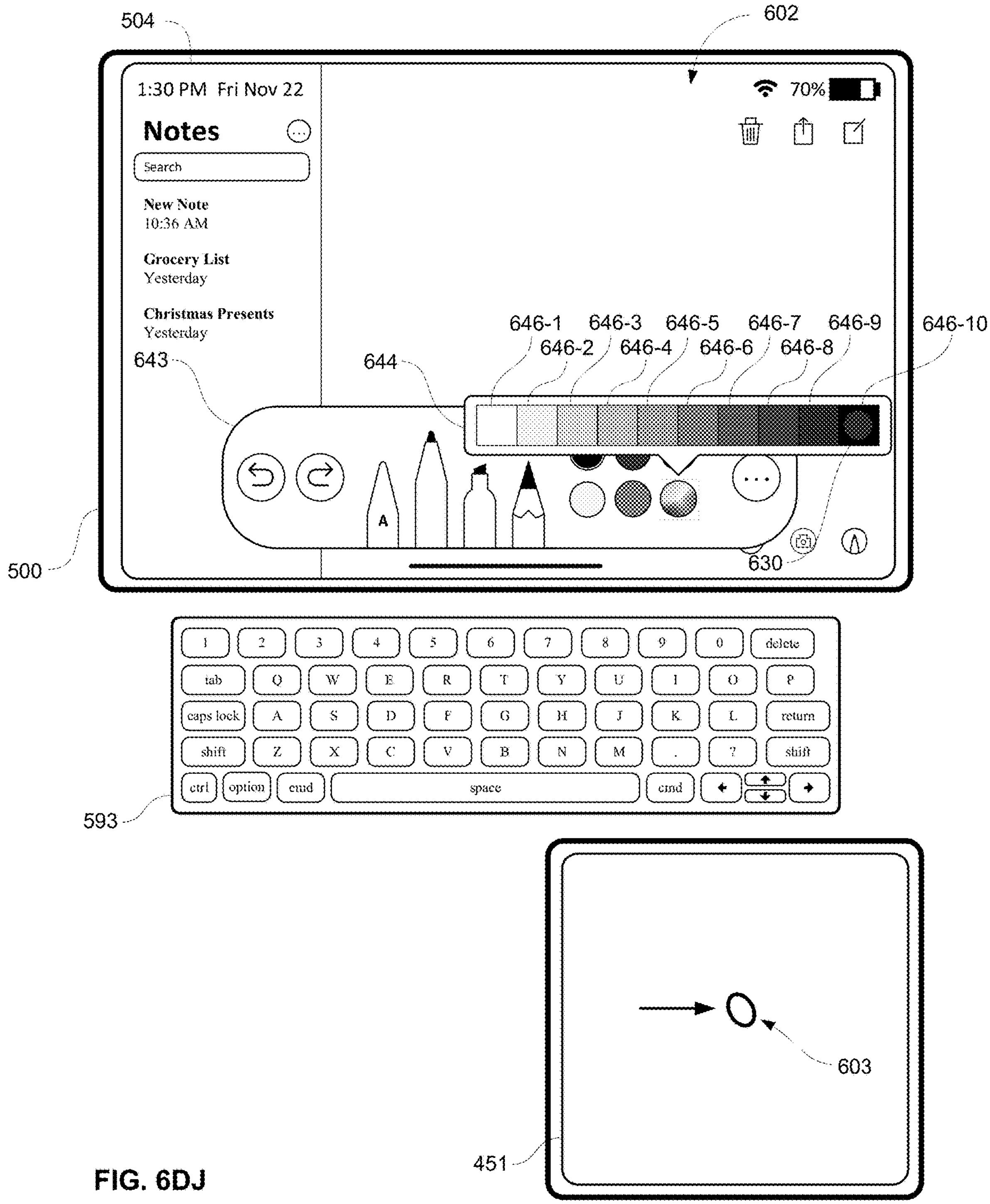
Figure 6D:
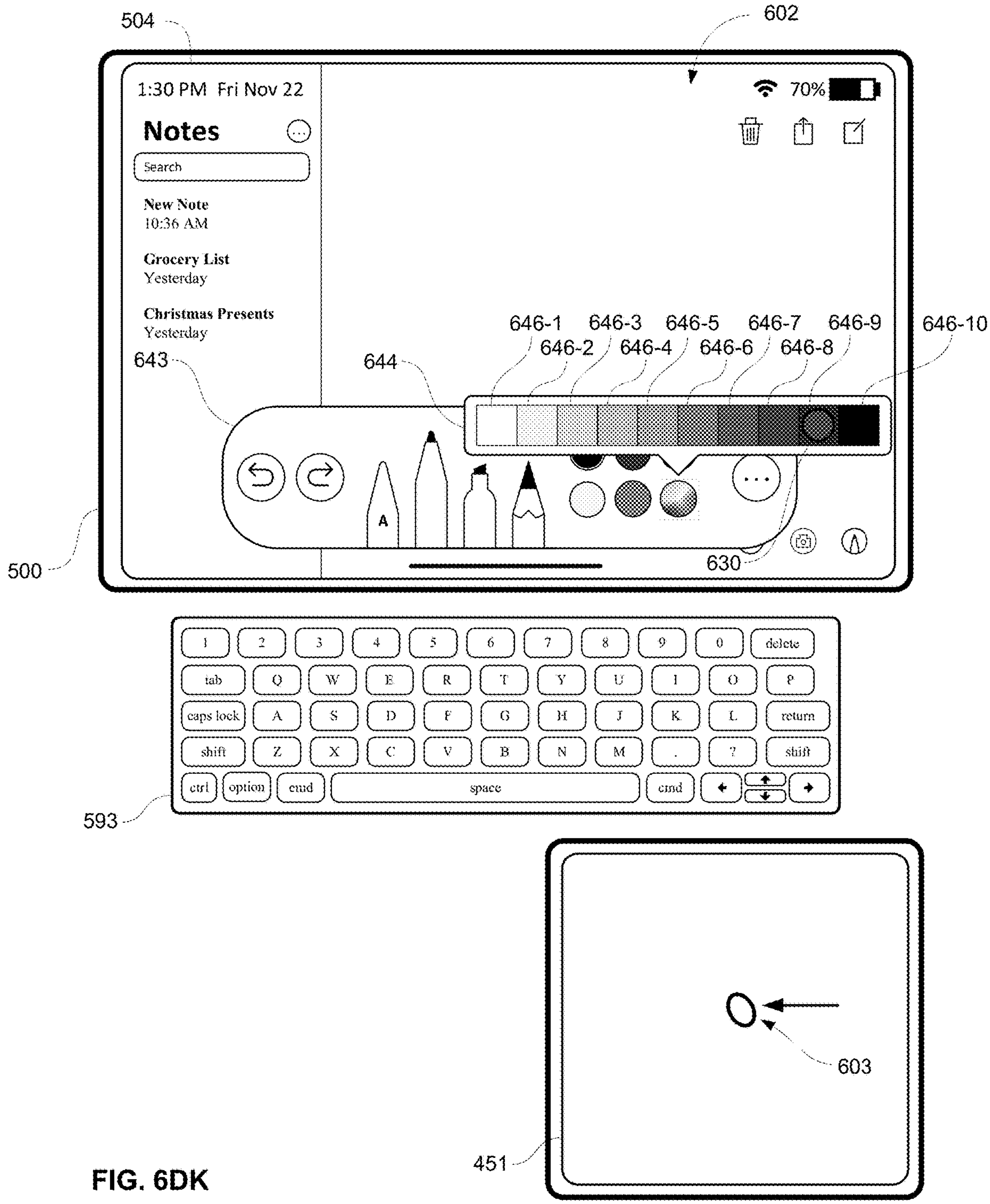
Figure 6D:
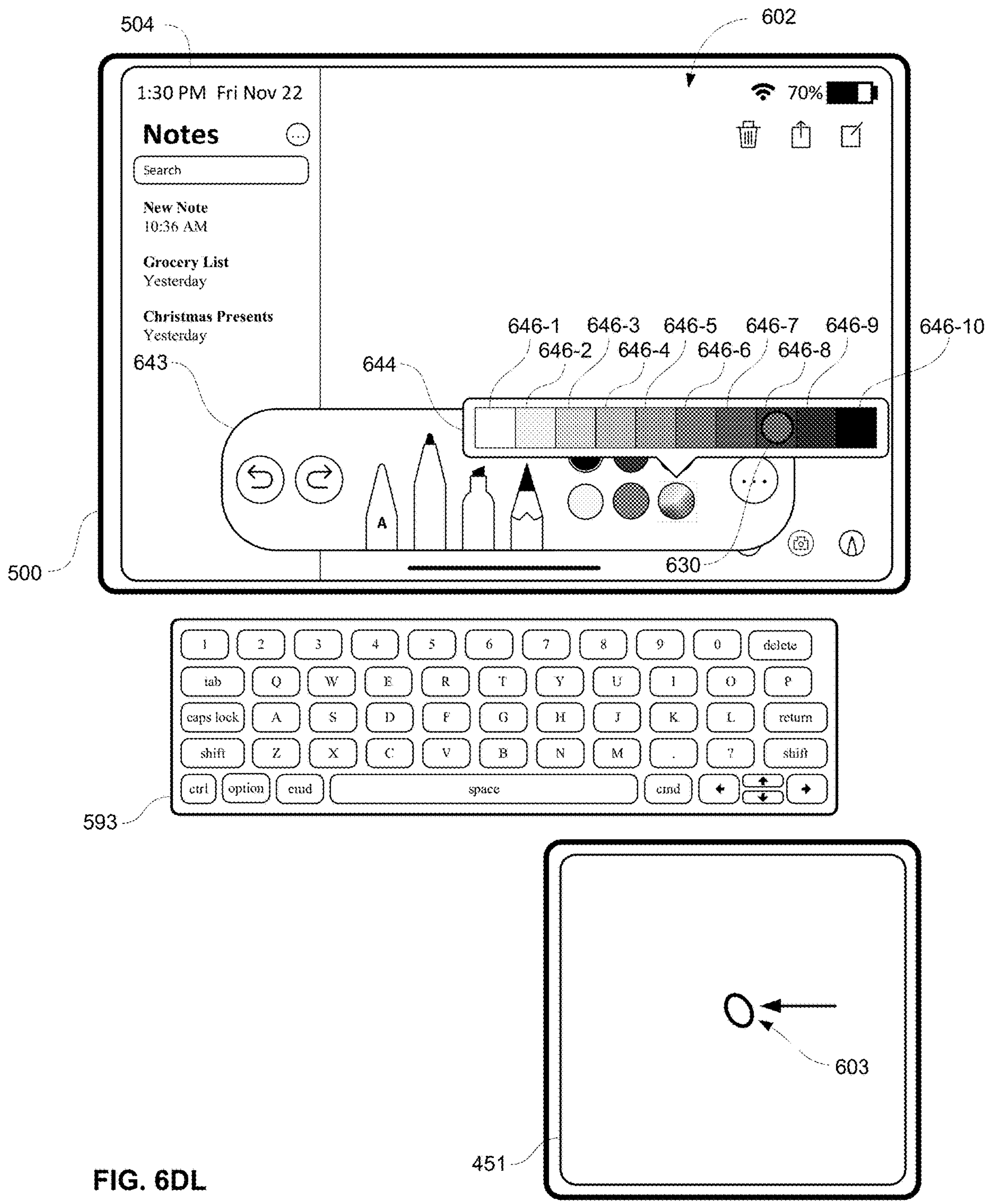
Figure 6D:
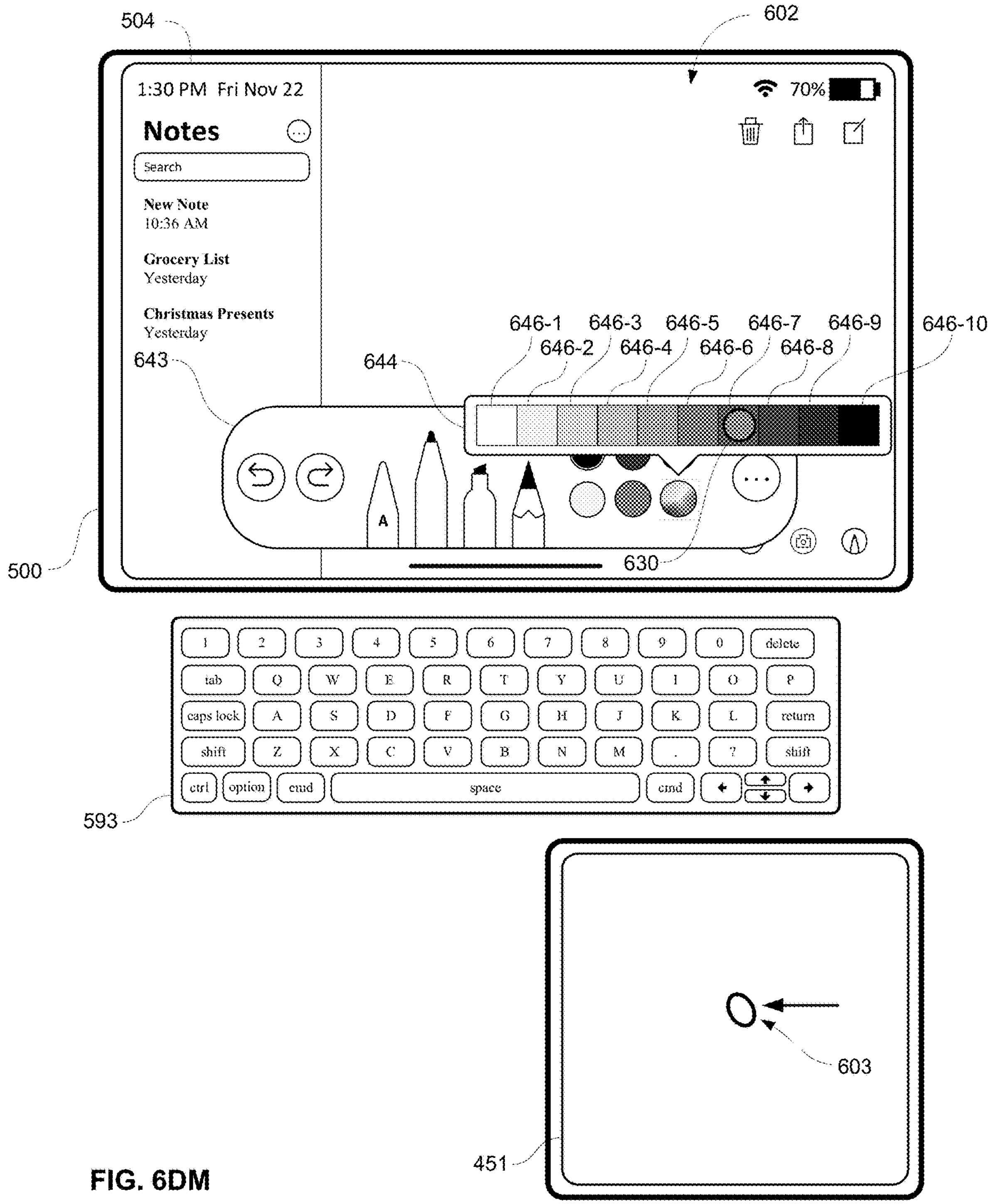
Figure 6D:
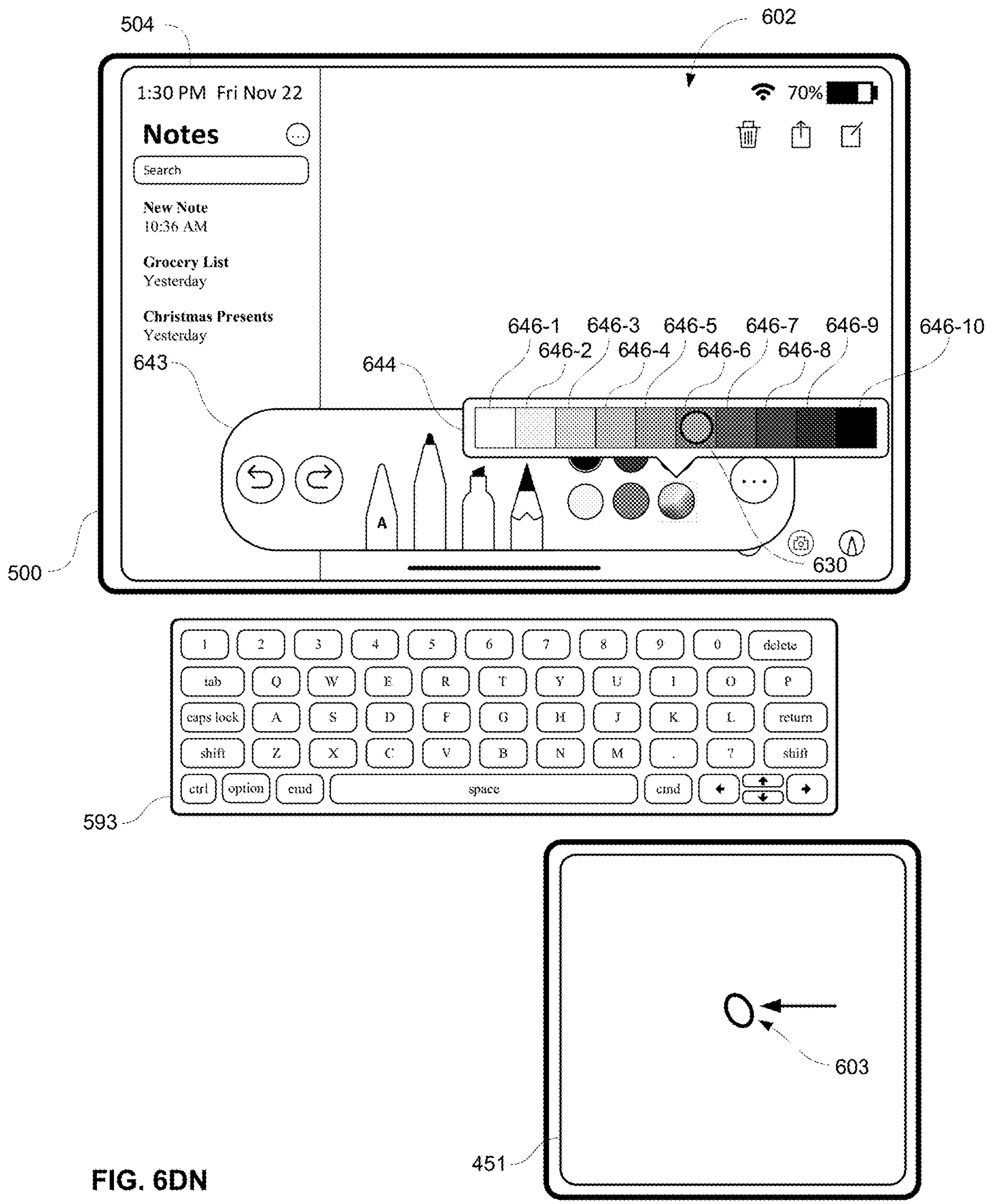
Figure 6D:
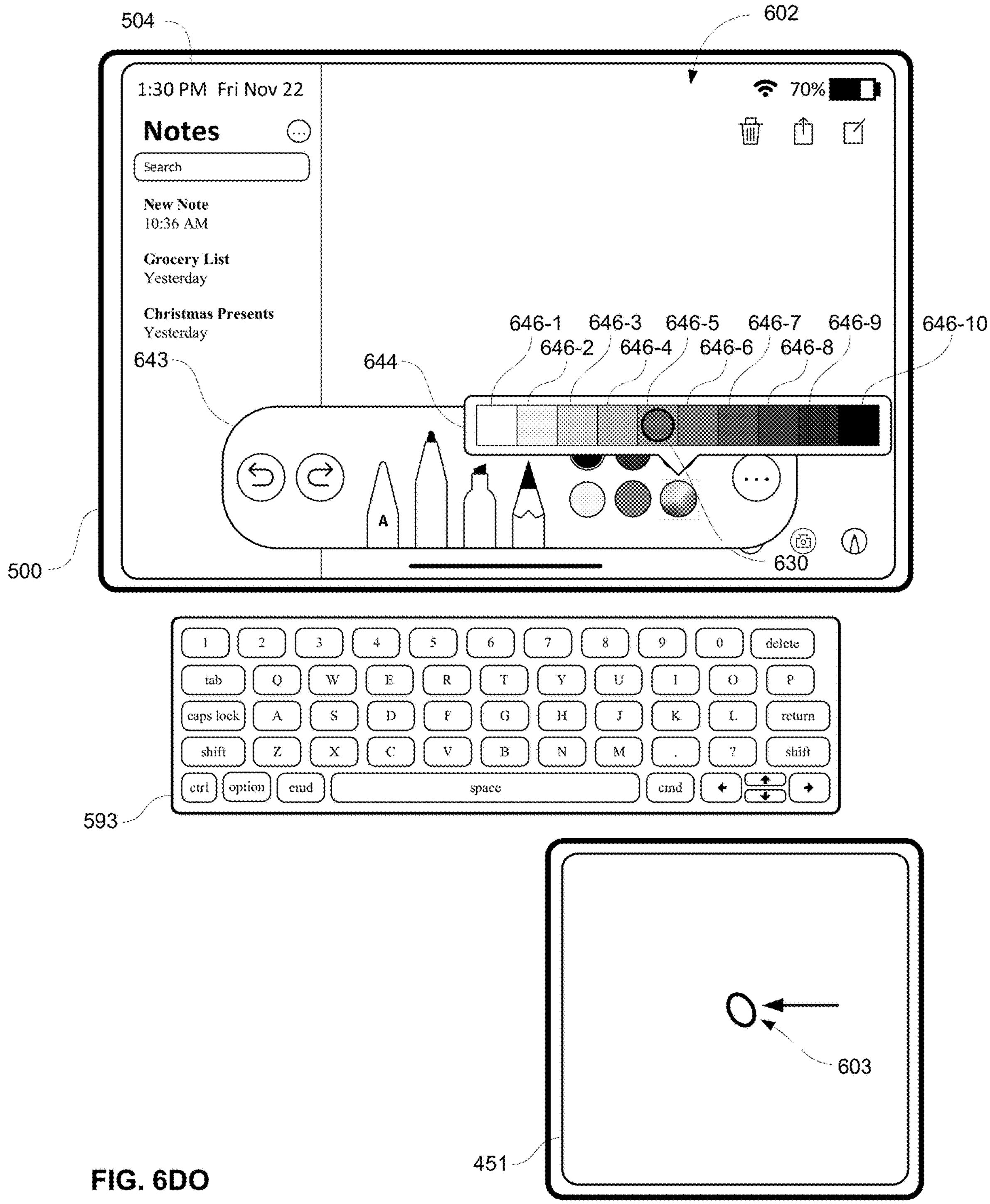
Figure 6D:
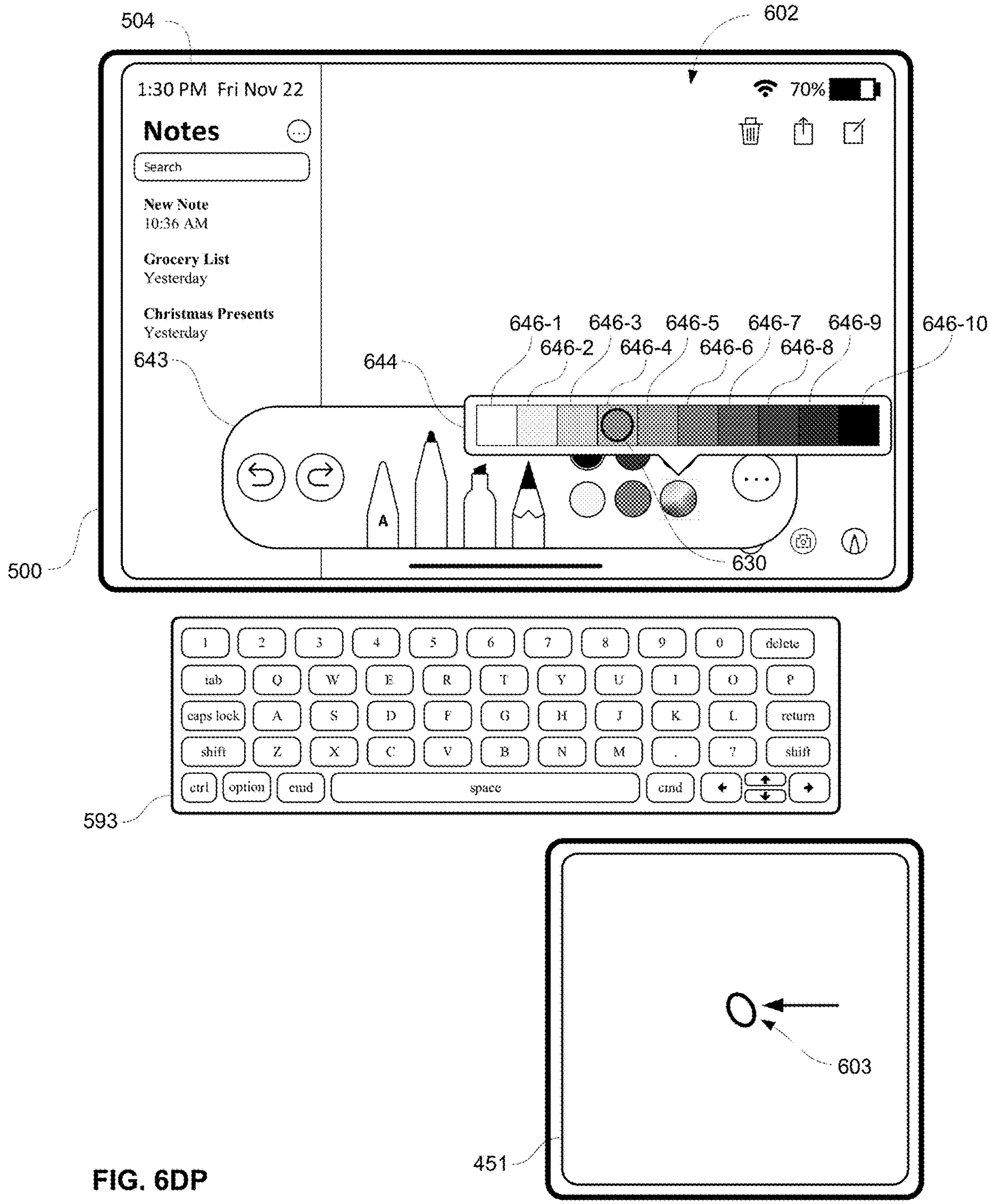
Figure 6D:
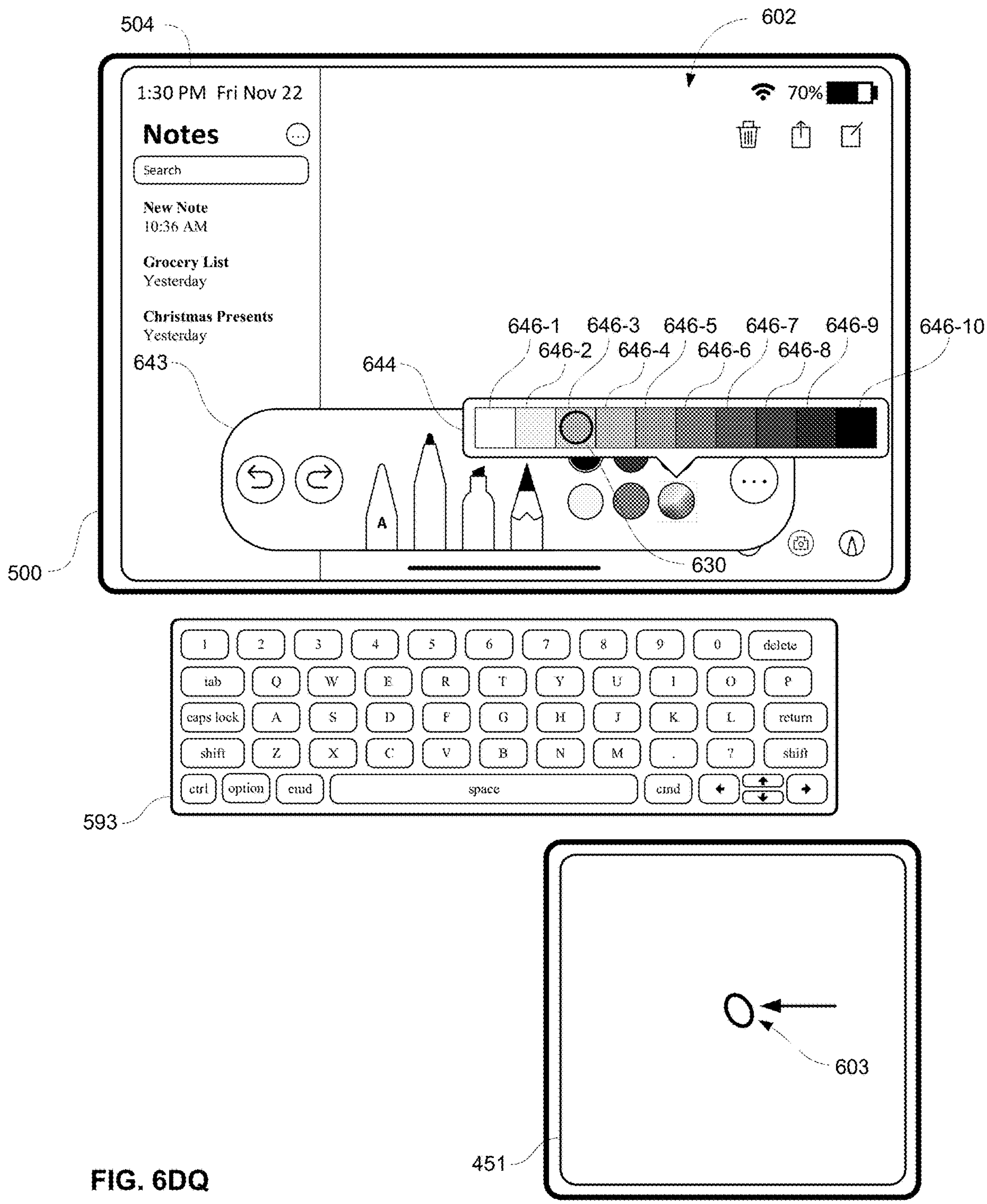
Figure 6D:
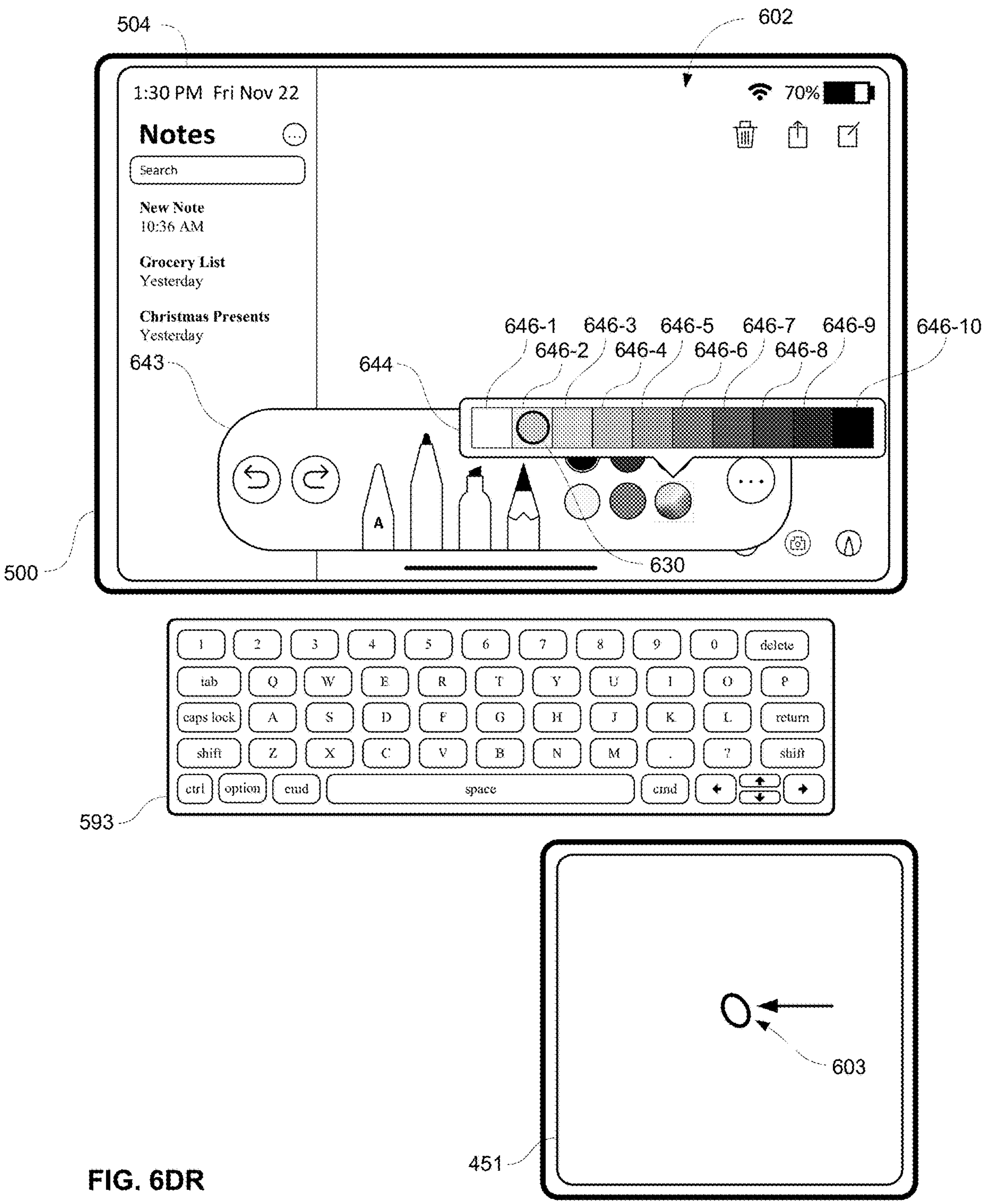
Figure 6D:
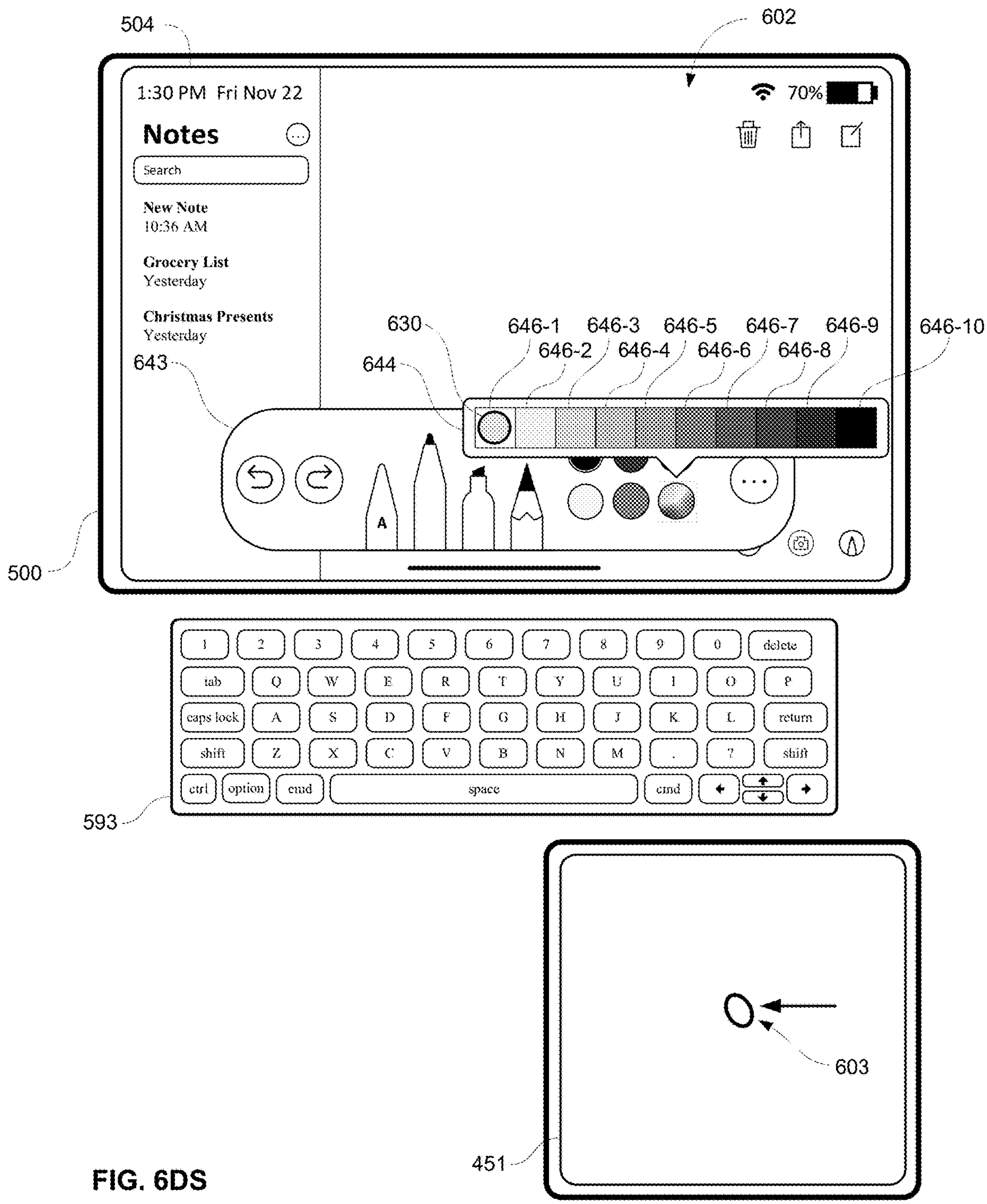
Figure 6D:
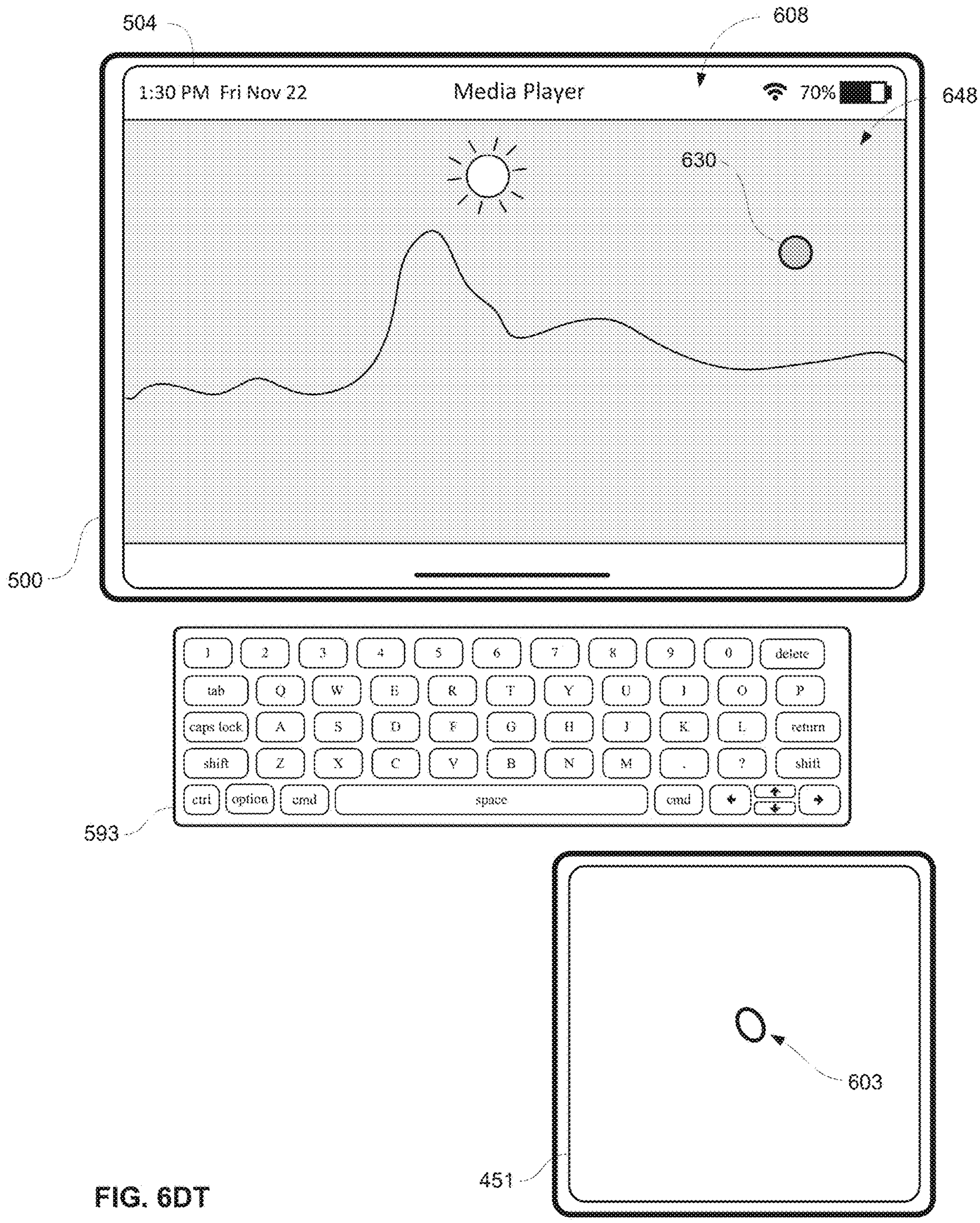
Figure 6D:
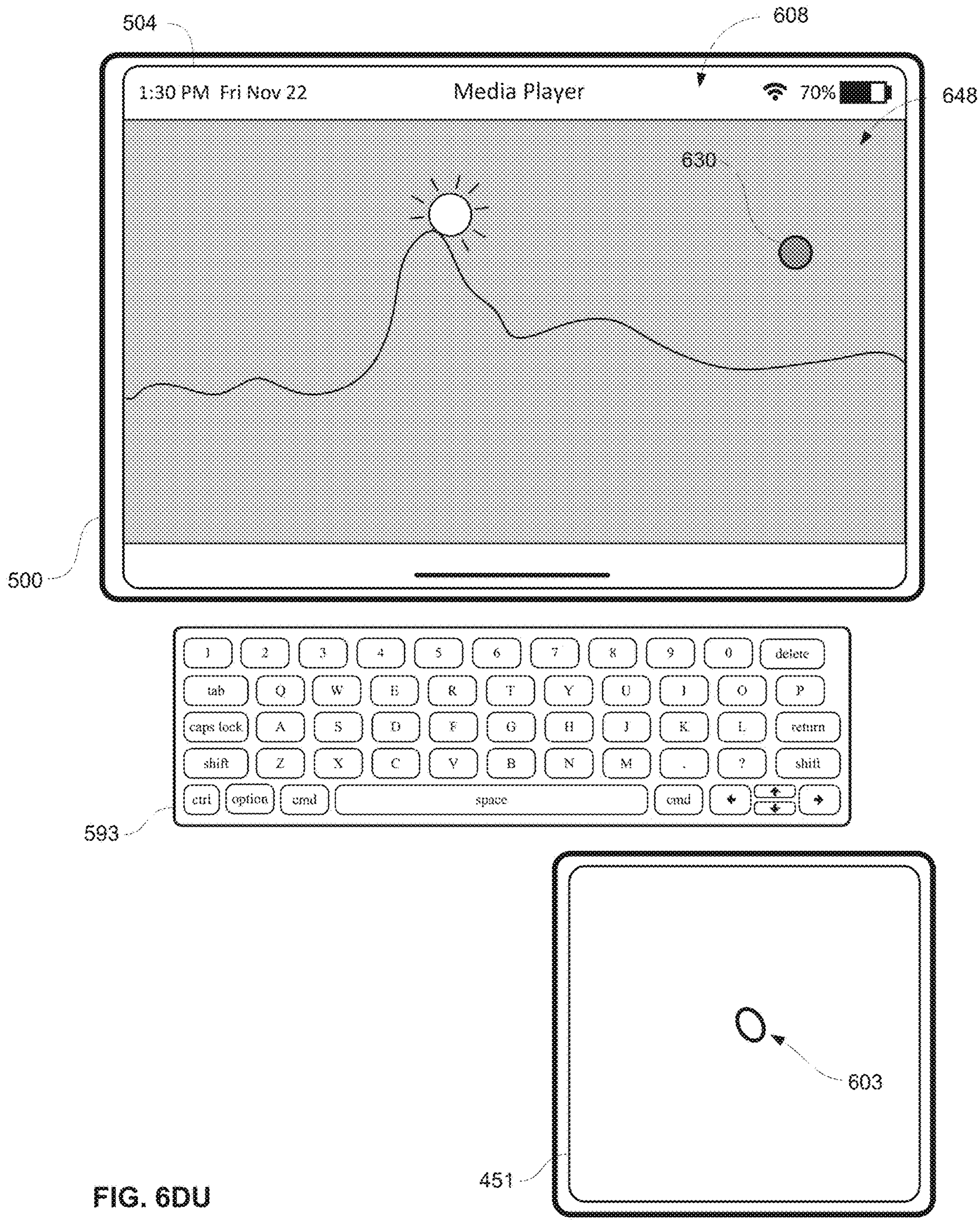
Figure 6D:
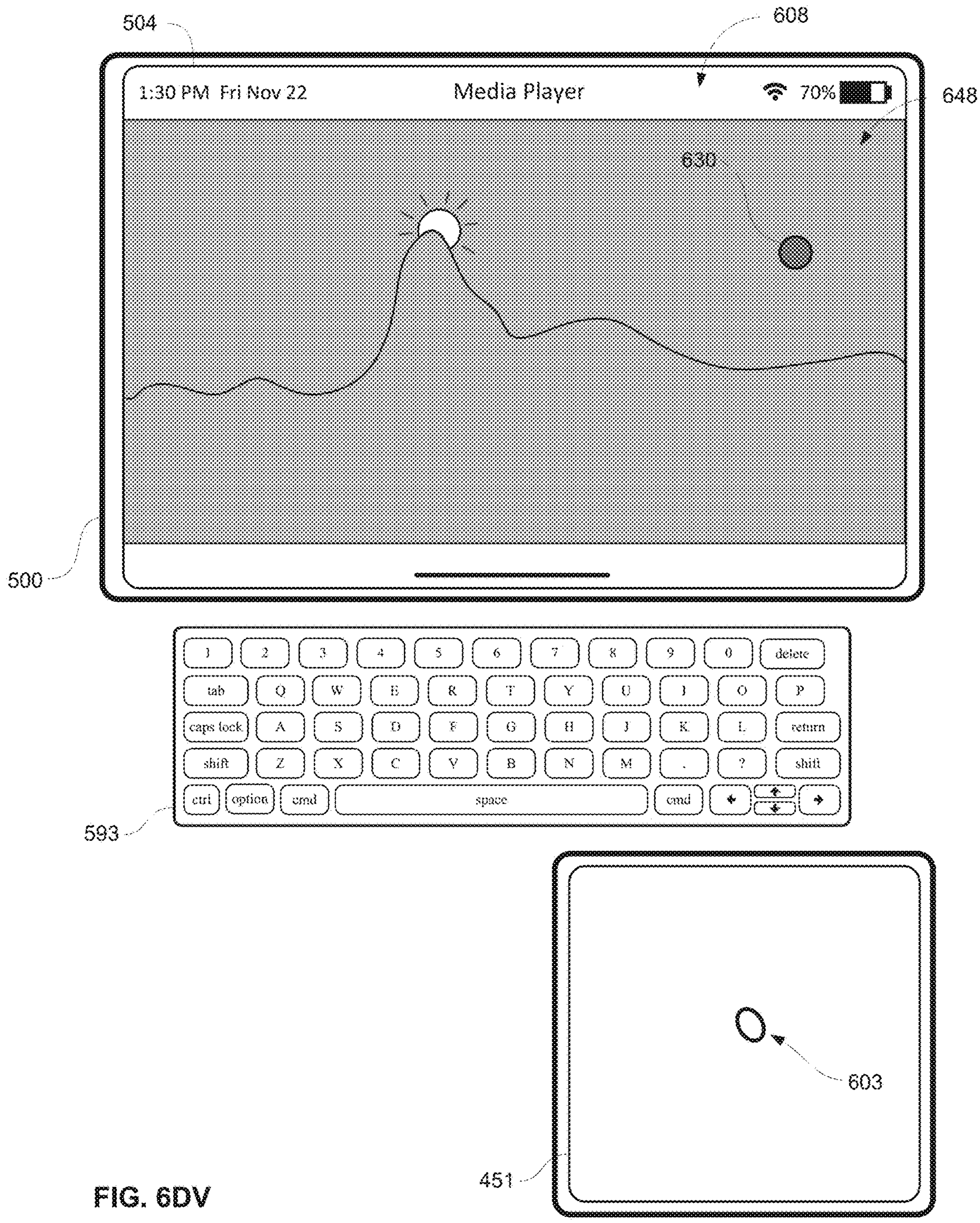
Figure 6D:
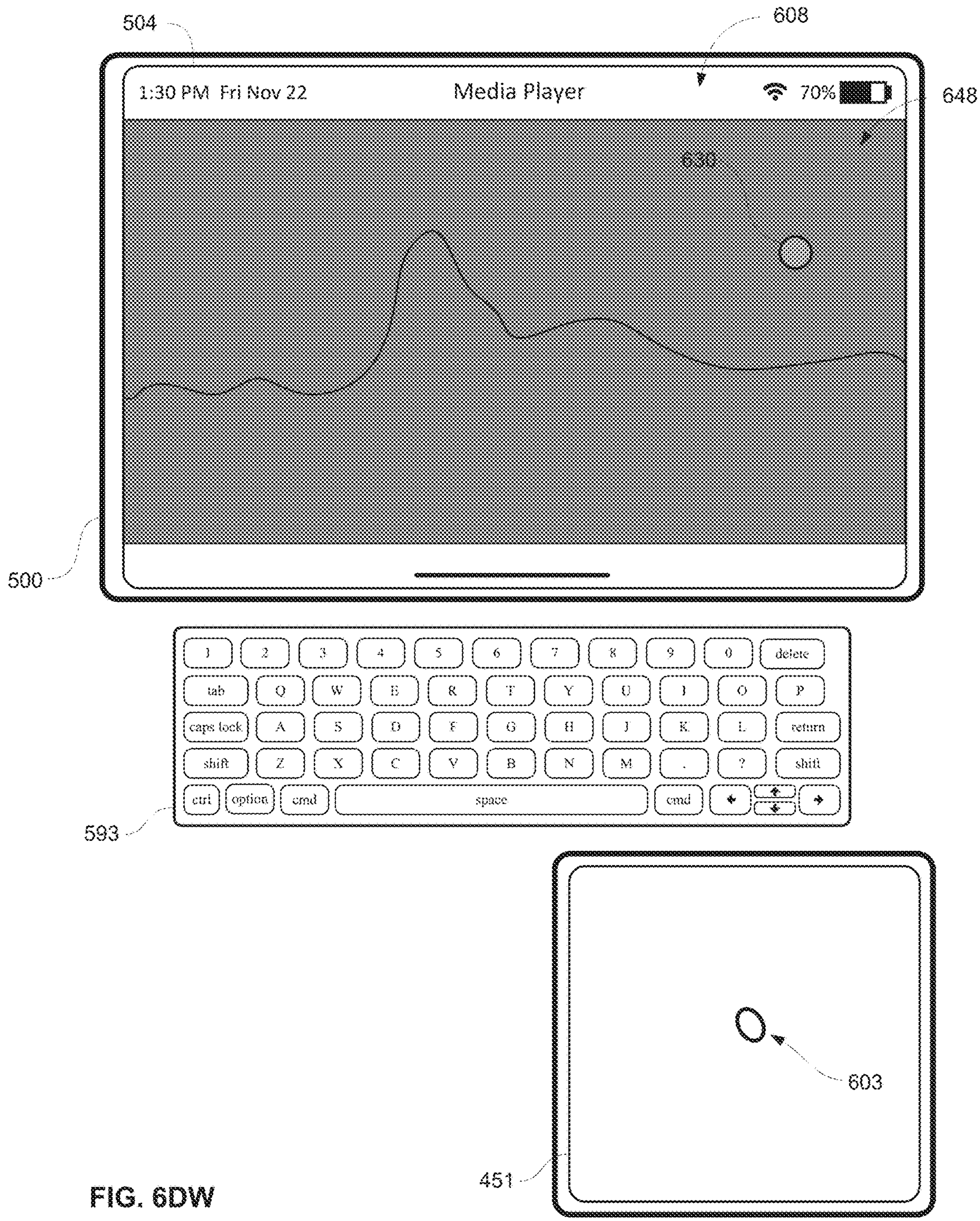
Figure 7A:
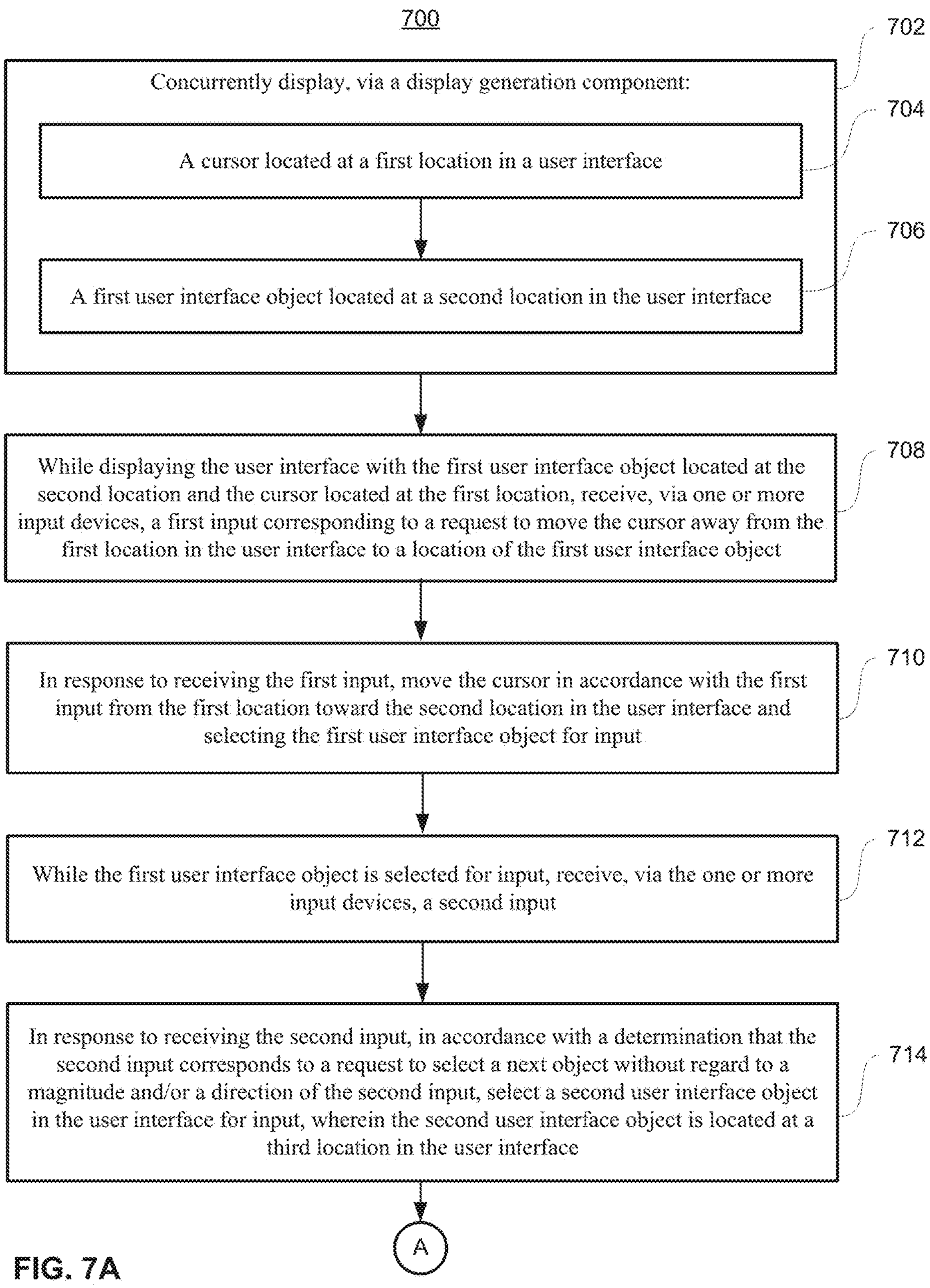
Figure 7B:
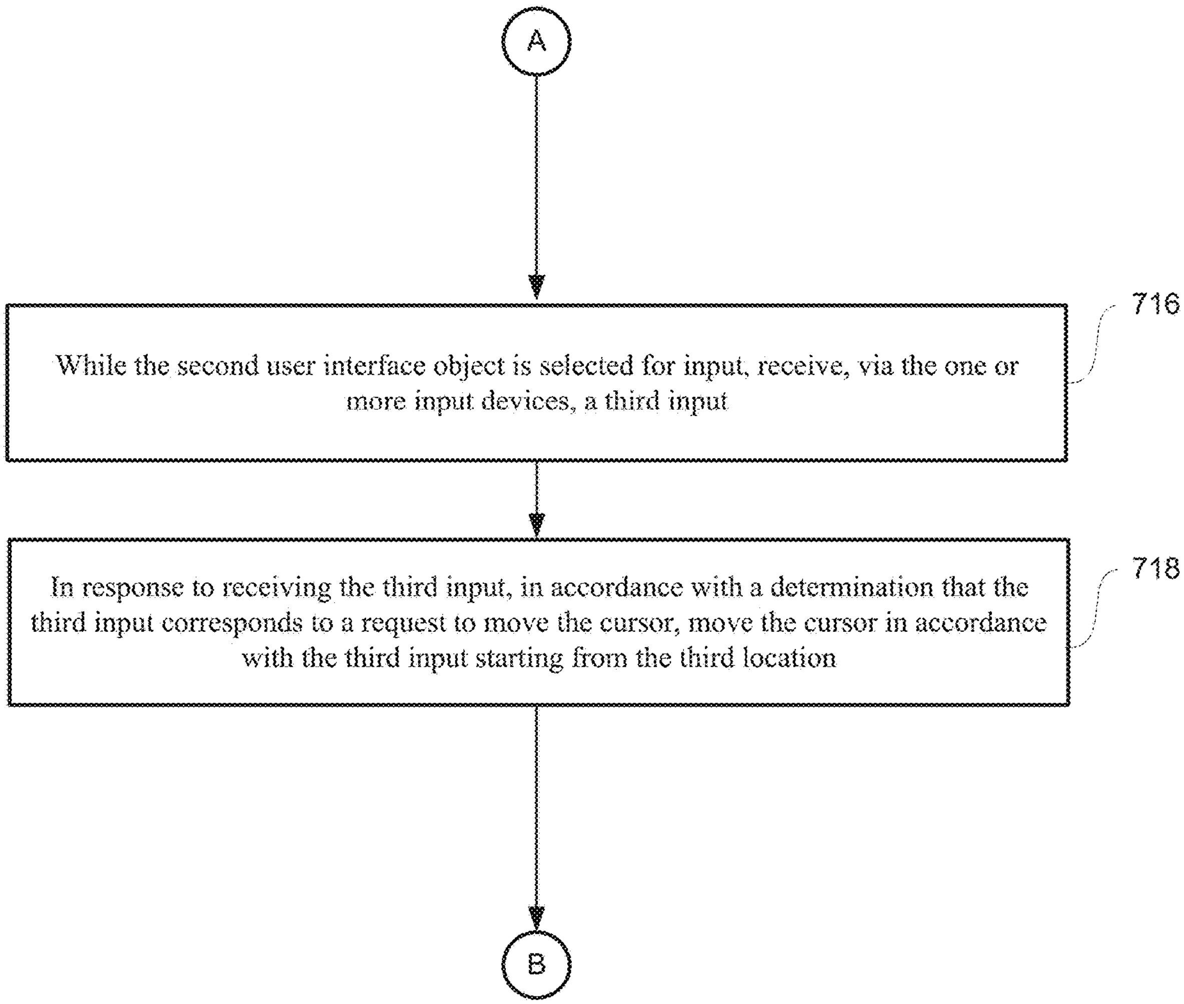
Figure 7C:
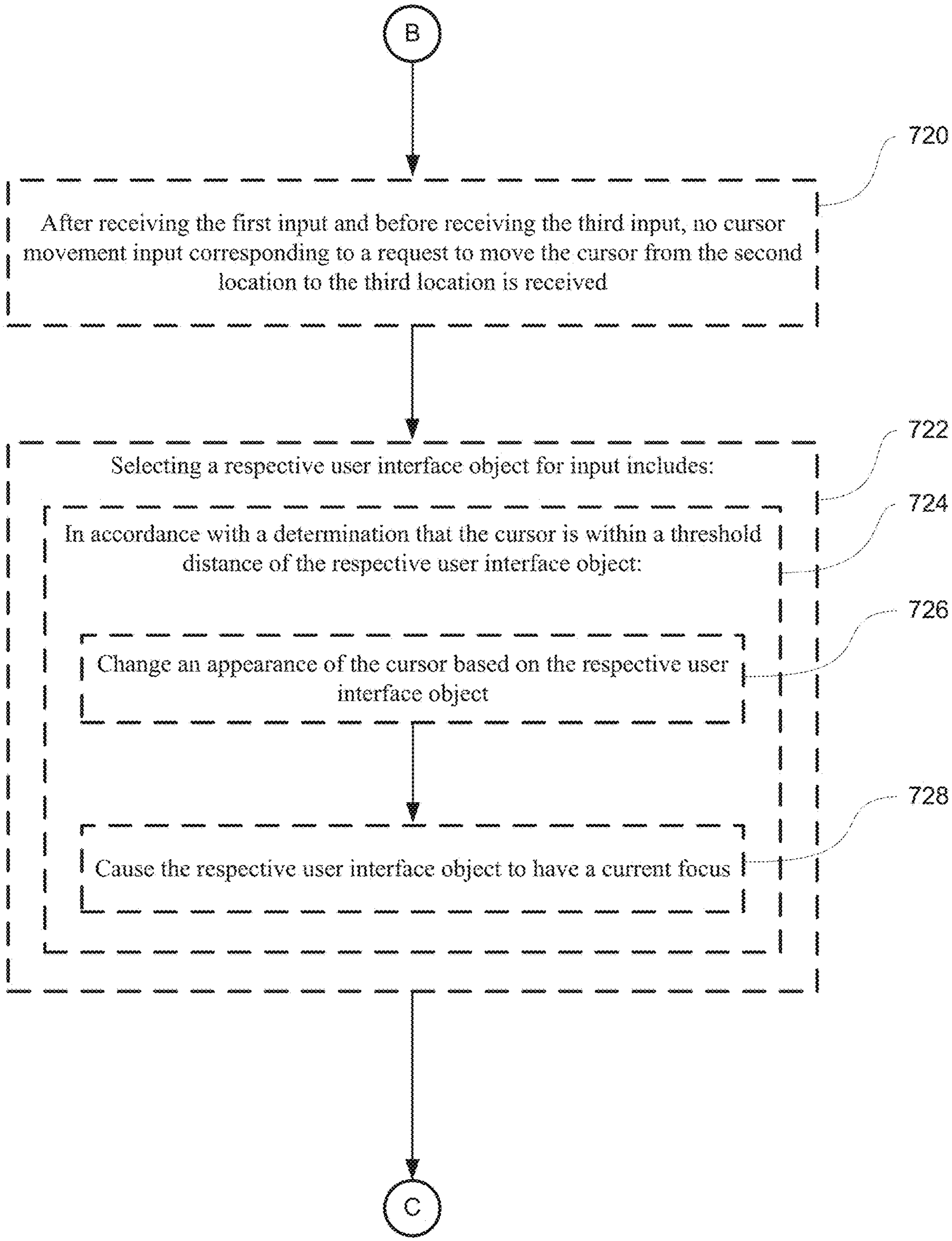
Figure 7D:
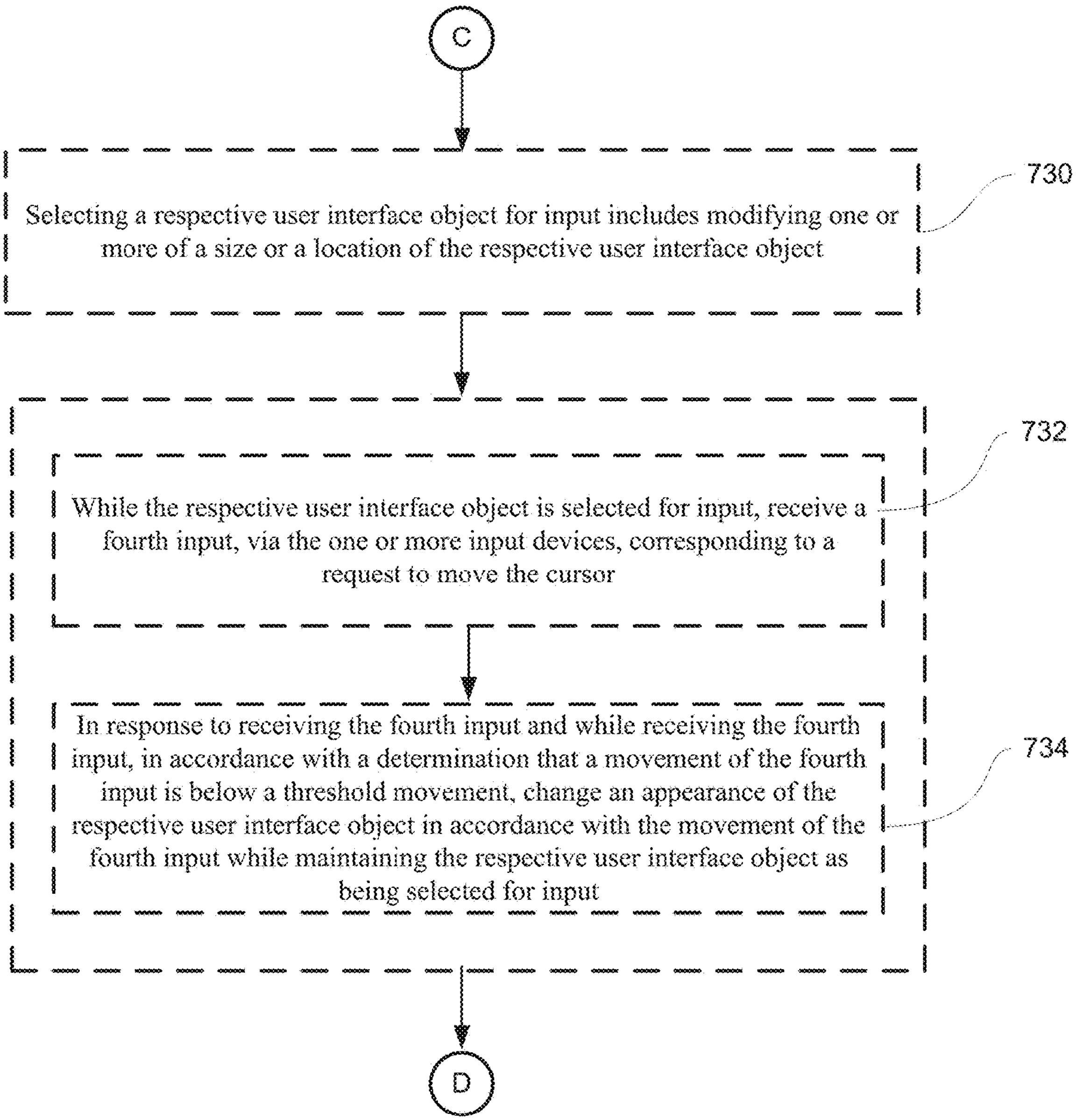
Figure 7E:
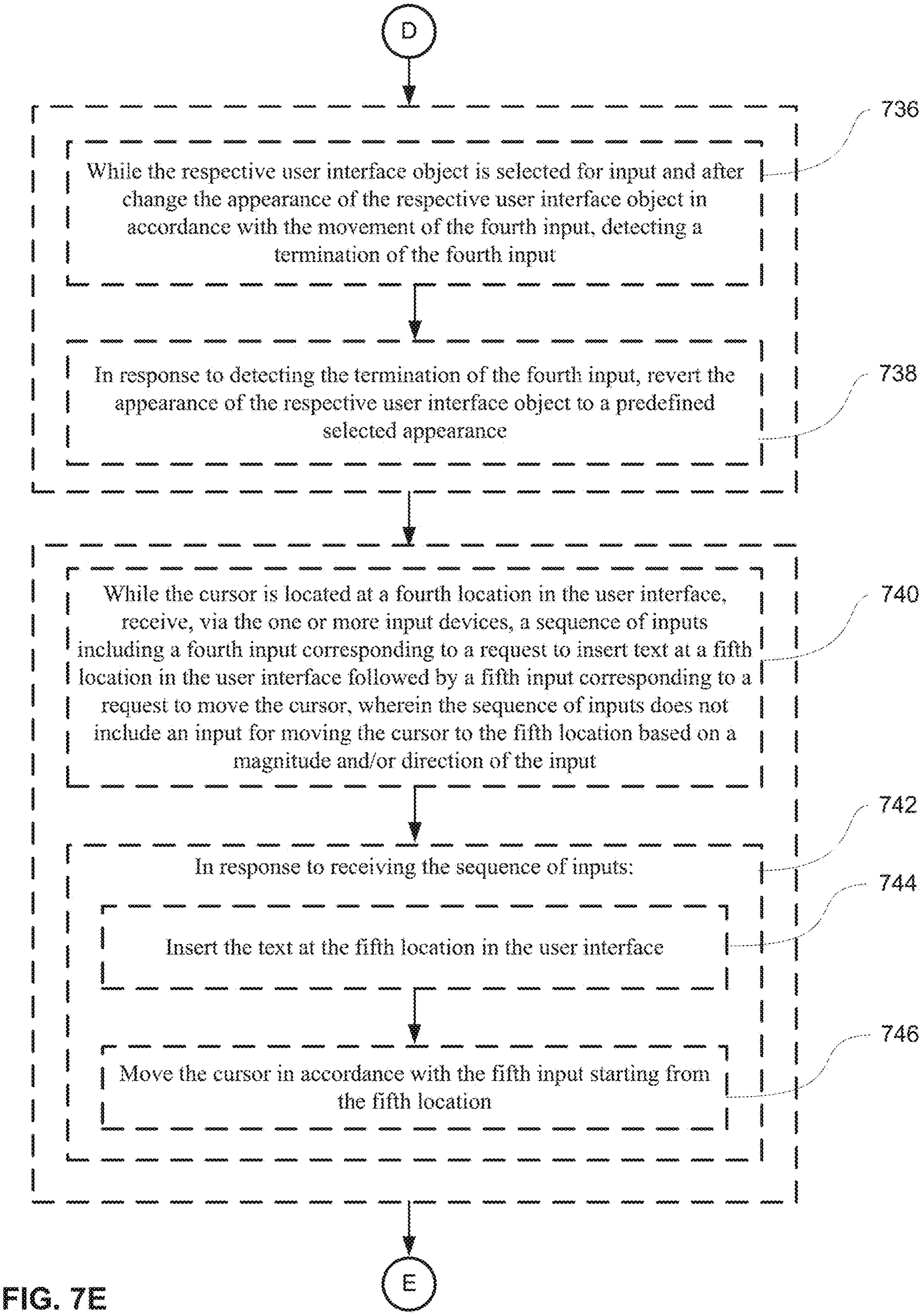
Figure 7F:
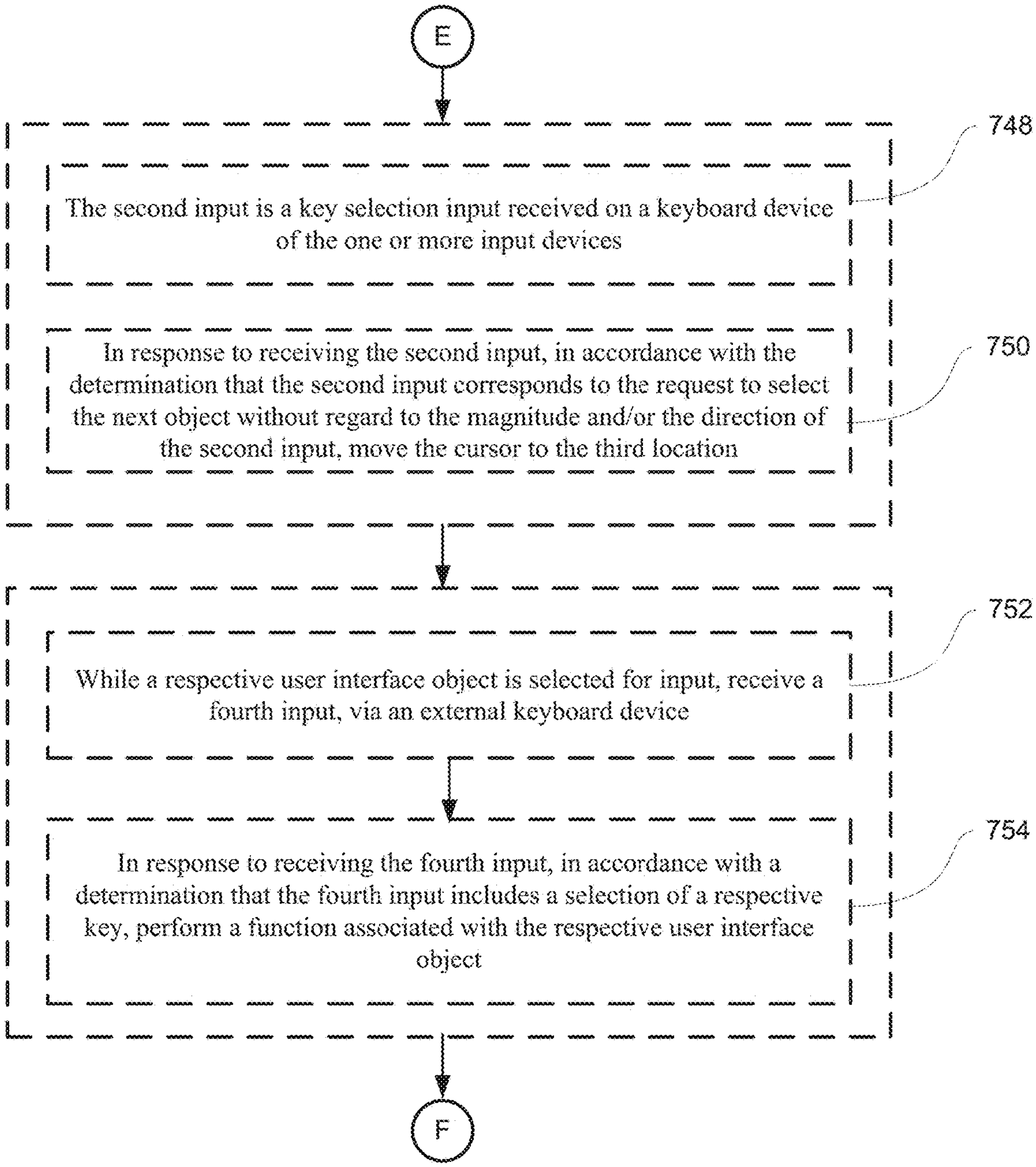
Figure 7G:
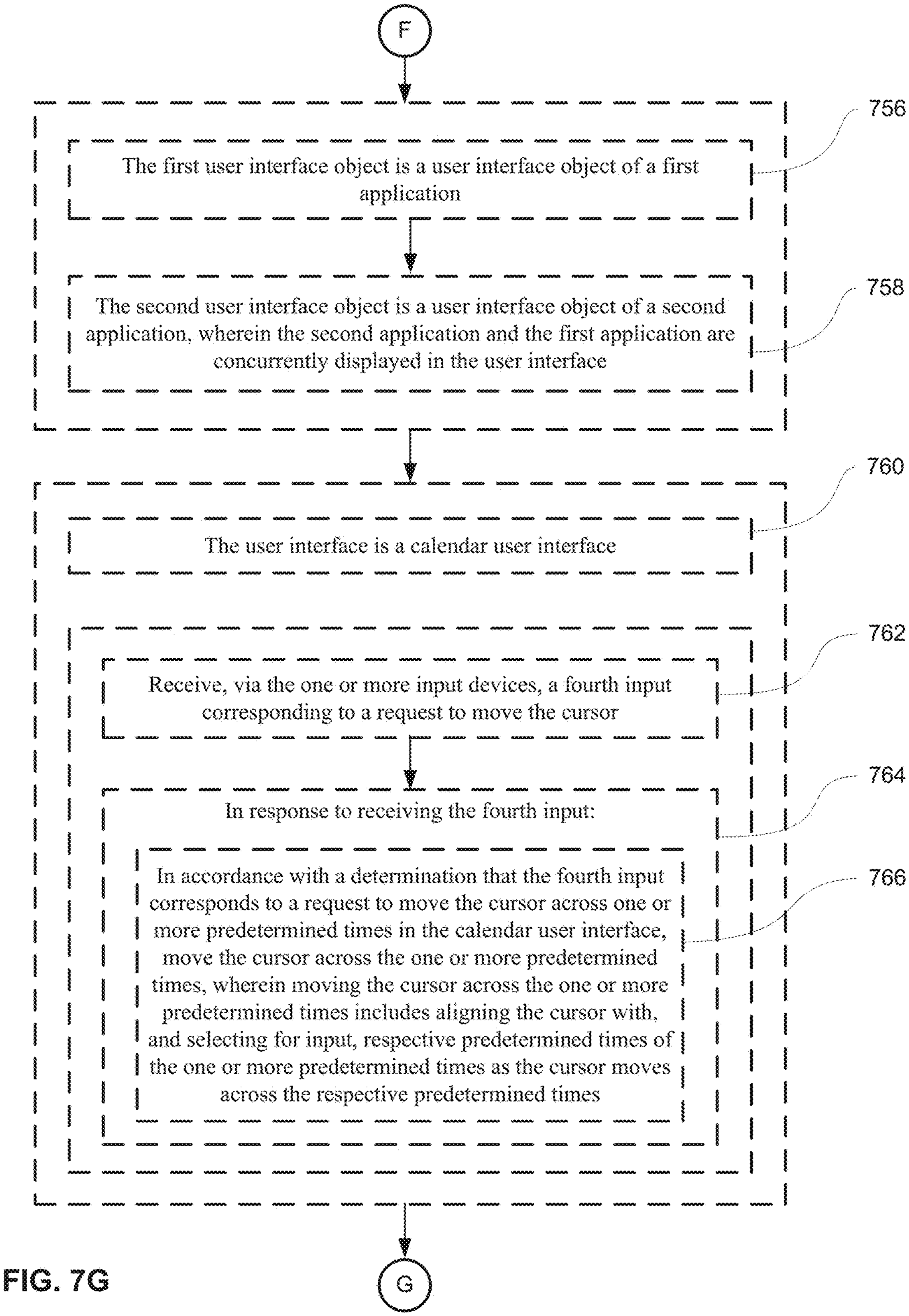
Figure 7I:
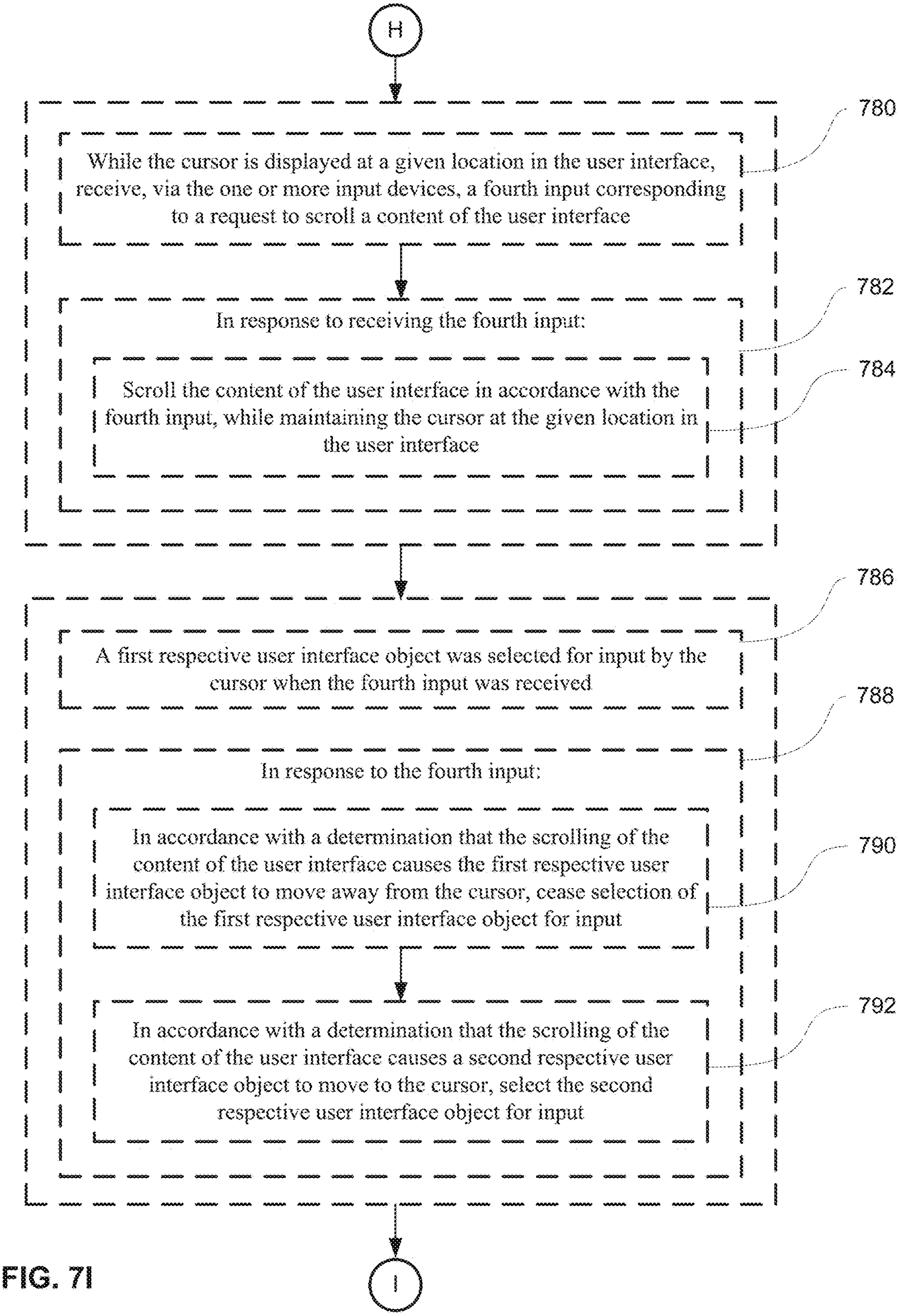
Figure 7J:
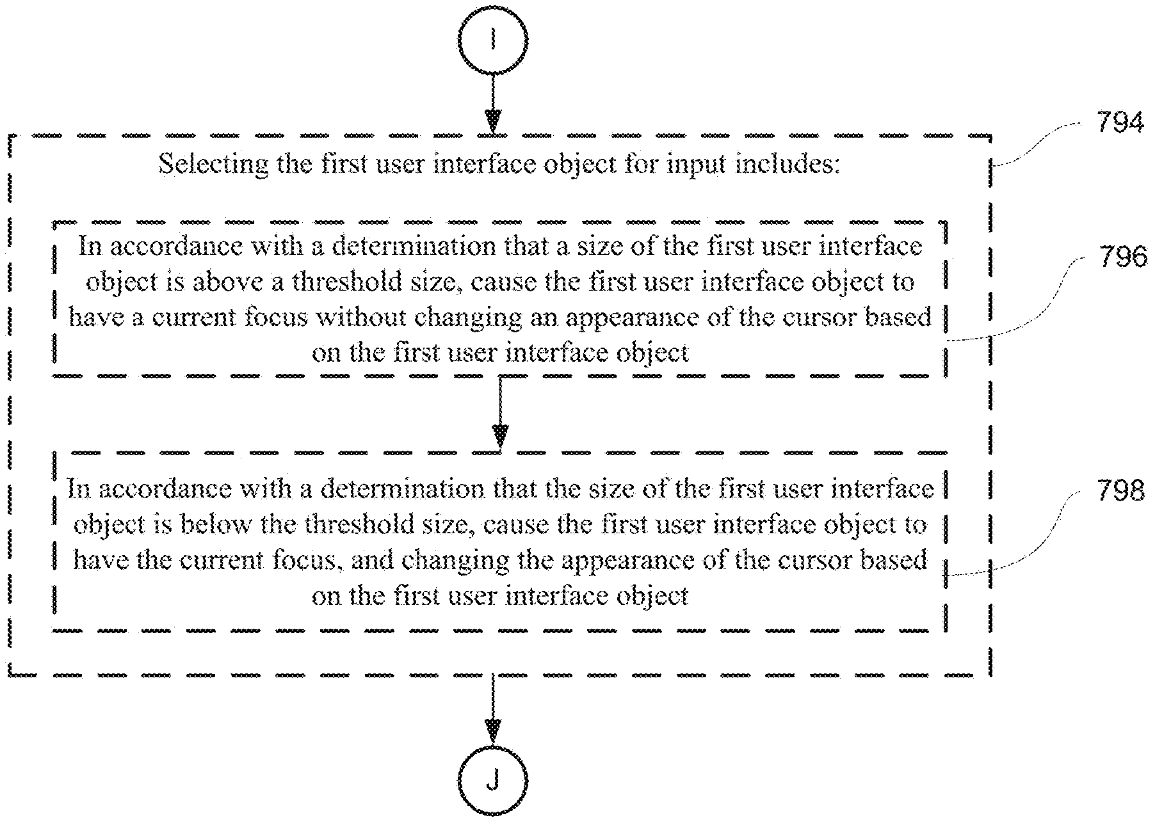
Figure 7K:
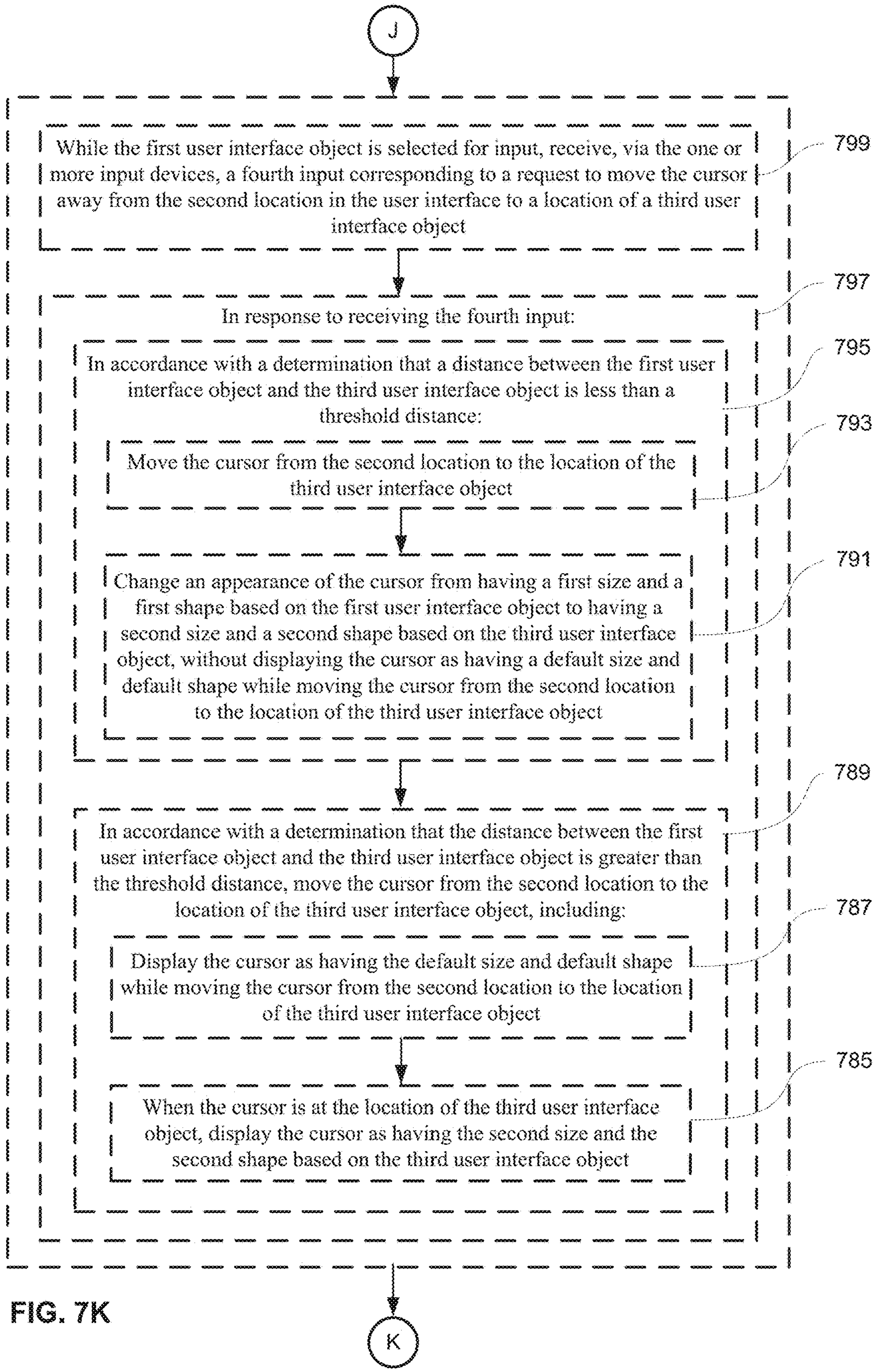
Figure 7L:
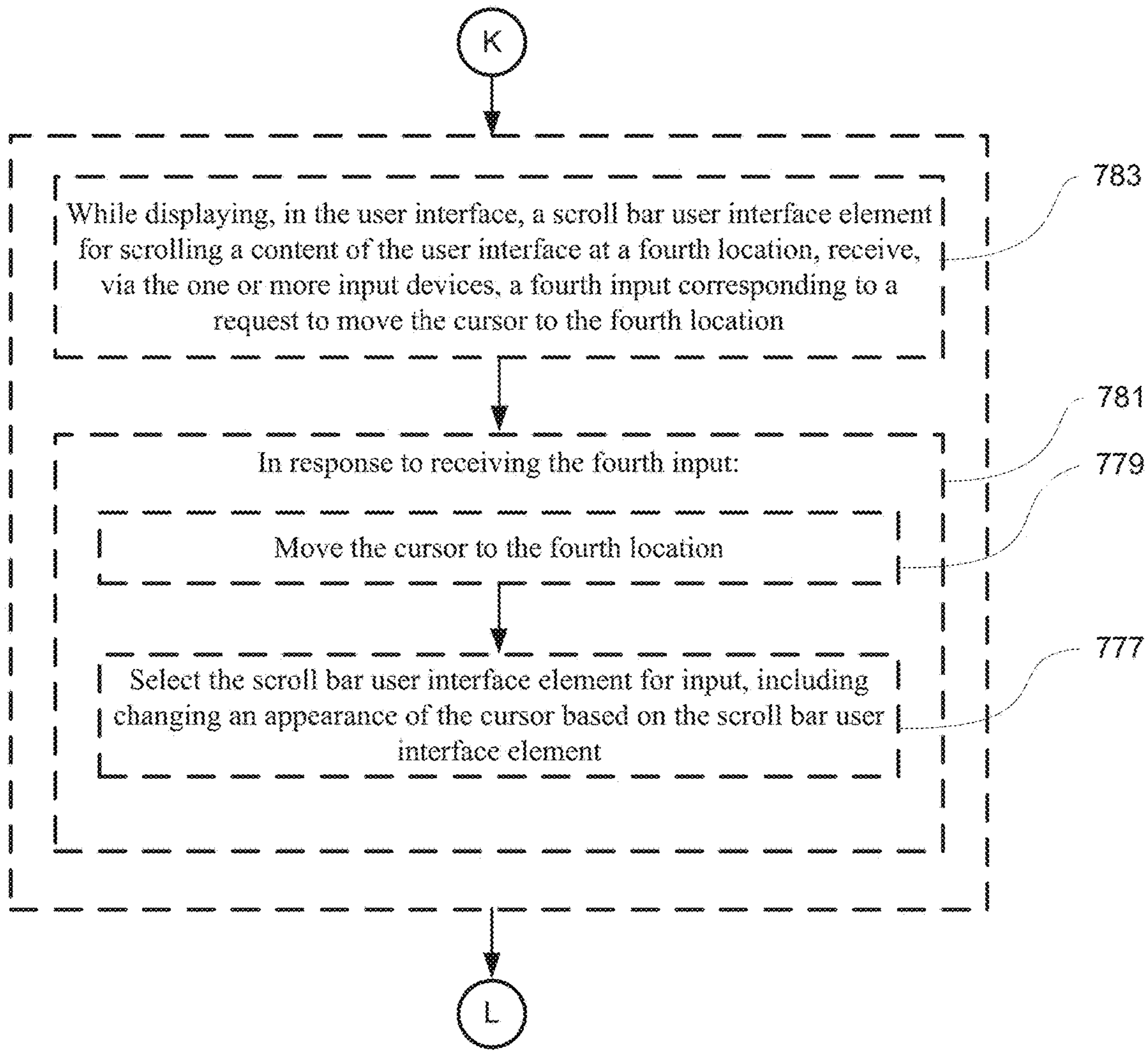
Figure 7M:
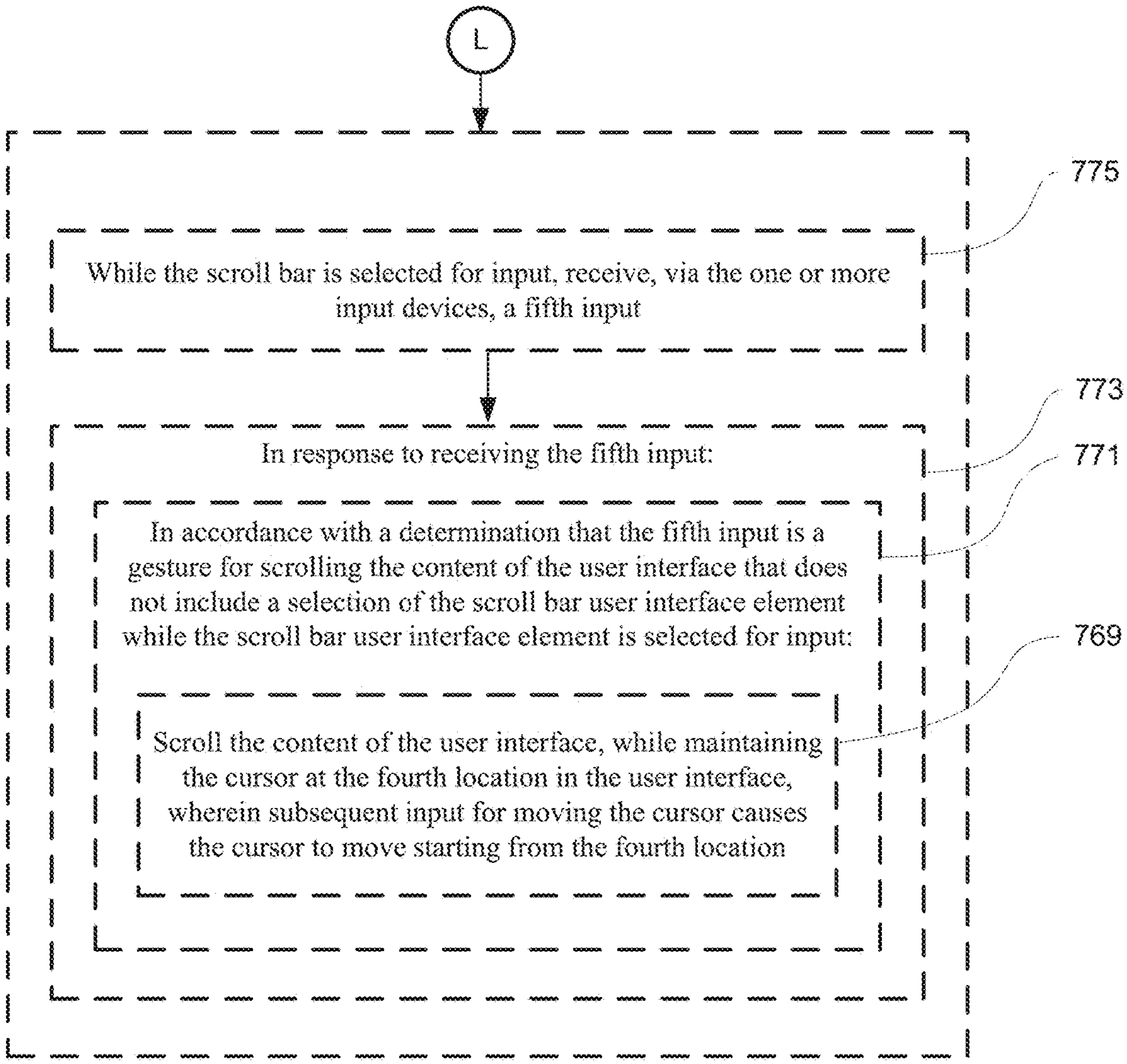

In FIG. 6Z, a leftward swipe of contact 603 is detected on touch-sensitive surface 451. In response to the leftward swipe of contact 603, cursor 630 is moved leftward in the content viewing and entry region 624. As illustrated in FIG. 6Z, cursor 630 moves leftwards smoothly along a single line of text. In some embodiments, the cursor moves freely (e.g., in proportion to the movement of contact 603 on touch-sensitive surface 451) within a particular line of text in a text entry region. In FIG. 6AA, a downward, leftward swipe of contact 603 is detected on touch-sensitive surface 451. In response to the downward, leftward swipe of contact 603, cursor 630 moves in a downward, leftward direction in accordance with the input across multiple lines of text. As illustrated in FIG. 6AA, cursor 630 snaps from one line of text to another line of text. For example, as cursor 630 moves downwards, when cursor 630 reaches a threshold vertical position between the first line of text and the second line of text, the cursor jumps downwards towards the second line of text. In some embodiments, the cursor snaps to the center of the second line of text. In some embodiments, the cursor snaps to a position just above the center of the second line of text (or just below the center of the second line of text, if cursor 630 is moving upwards). The same behavior optionally occurs with the cursor in snapping to the third line of text. However, in some embodiments, even though the vertical movement of cursor 630 does not remain proportional in the same way (e.g., with a constant proportionality) to the vertical component of the movement of contact 603 on touch-sensitive surface 451, the horizontal movement of cursor 630 within the lines of text remains proportional in the same way (e.g., with a constant proportionality) to the horizontal component of the movement of contacts 603 on touch-sensitive surface 451. In some embodiments, cursor 630 moves slightly above and below the center of a line of text before snapping to the previous or next line of text. In some embodiments, if the cursor is not at the center of a respective line of text, then when contact with the touch-sensitive surface 451 is terminated, the cursor snaps to the center of the respective line of text (e.g., returns to being aligned with the center of the text). Thus, cursor 630 moves smoothly horizontally within a line of text, but otherwise snaps between lines of text when moving vertically between lines of text (e.g., optionally with some "play" before snapping).

In FIGS. 6AB-6AC, a user input 603 corresponding to a selection input is received while cursor 630 is at a respective position in text entry region 624. In some embodiments, in response to the user input 603, a text cursor 634 (e.g., vertical line, vertical bar, etc.) is displayed in text entry region 624 at the position of cursor 630 to indicate the location where text will be inserted (as will be visible in FIG. 6AD).

In FIG. 6AD, a user input 603 corresponding to an upward scrolling input (e.g., a two-finger downward swipe gesture) is received on touch-sensitive surface 451. In some embodiments, in response to user input 603, device 500 scrolls user interface 602 upwards (e.g., revealing content at the top of user interface 602), as shown in FIG. 6AD. In some embodiments, in response to receiving the scrolling input, device 500 ceases display of cursor 630 in the user interface. As shown in FIG. 6AD, device 500 maintains the absolute position of cursor 630 on the display (e.g., shown as position 632) corresponding to the position of the previous position of the cursor and/or the location where the cursor would appear in response to a subsequent contact with the touch-sensitive surface 451. In FIG. 6AD, text cursor 634 is displayed at the location in the text entry region 634 where text would be inserted (e.g., in response to a text insertion input and/or a content entry input) corresponding to the position of the cursor within text entry region 634 when the selection input was received in FIGS. 6AB-6AC. As shown in FIG. 6AD, in some embodiments, in response to the scrolling input, scroll bar 637 is displayed in the user interface indicating the current scroll position of the text entry region 624. It is understood that although the upward scrolling input is indicated as a two-finger downward swipe gesture, device 500 can be configured such that a two-finger upward swipe gesture corresponds to an upward scrolling input and a two-finger downward swipe gesture corresponds to a downward scrolling input (e.g., reversing the scroll direction).

In FIG. 6AE, scroll bar 637 ceases to be displayed, optionally after a threshold of time has elapsed in which no scrolling input was received (e.g., 0.5 s, 1 s, 3 s, 5 s, 8 s, etc.). In FIG. 6AF, a contact 603 is received on touch-sensitive surface 451 causing display of cursor 630 in user interface 602. As shown in FIG. 6AF, cursor 630 is displayed at the same absolute position on touch screen 504 at which it was located before the scrolling input was received (e.g., as in FIG. 6AC). In FIG. 6AG, a user input 603 corresponding to a selection of the "b" key on external keyboard 593 is received (e.g., a text and/or content insertion input). In response to user input 603, electronic device 500 inserts a "b" character into text entry region 624 at the location of text cursor 634, as shown in FIG. 6AH. In some embodiments, as shown in FIG. 6AH, cursor 630 is hidden from display in response to the keyboard input. In some embodiments, device 500 maintains the position of cursor 630 at the same location (e.g., at the location where it was previously displayed at the time that the keyboard input was received, in FIG. 6AG). In some embodiments, in response to the text insertion input, device 500 moves the position of cursor 630 to the location where text was inserted (e.g., the location of text cursor 634).

In FIG. 6AI, a contact 603 is received on touch-sensitive surface 451 causing display of cursor 630 in user interface 602. As shown in FIG. 6AI, cursor 630 is displayed at the location of text cursor 634 (e.g., the location where text was most recently inserted), rather than at the previous location of cursor 630 (e.g., in FIG. 6AG). Thus, inserting text in the user interface optionally causes the cursor's location to move from its previous location to the location where the text was inserted.

In FIG. 6AJ, an upward, leftward swipe of contact 603 is detected on touch-sensitive surface 451. In response to the upward, leftward swipe of contact 603, cursor 630 moves from initial position 629 (e.g., where text was previously inserted) in an upward leftward manner in accordance with the input. In FIG. 6AK, contact 603 continues its upward, leftward swipe (e.g., from FIG. 6AJ, without termination of contact 603 from the touch-sensitive surface 451) on touch-sensitive surface 451. In response to the continued upward leftward swipe, cursor 630 moves to within the threshold distance of note 618-3. In some embodiments, because note 618-3 is a selectable or otherwise interactable user interface element, note 618-3 becomes selected for input and cursor 630 changes size and shape to conform to note 618-3. In FIG. 6AK, cursor 630 is rectangular in shape (e.g., because note 618-3 is rectangular in shape) and visually appears as if it is highlighting note 618-3.

In FIG. 6AL, a contact 603 is detected on a touch-sensitive surface 451 causing cursor 630 to continue to be displayed in user interface 602. In FIG. 6AM, an upward swipe of contact 603 is detected on touch-sensitive surface 451. In response to the upward swipe of contact 603, cursor 630 moves from initial position 629-1 to an intermediate position 629-2 and then its final location at the location of note 618-1. As shown in FIG. 6AM, the upward swipe of contact 603 has a low input speed (e.g., the swipe and the corresponding movement of the cursor was slow). Thus, because the input speed was low, the movement speed of cursor 630 was also low. In some embodiments, as cursor 630 moved across note 618-2, note 618-2 was selected for input and cursor 630 appeared to visually highlight note 618-2 before the cursor moved to the location of note 618-1 and appeared to visually highlight note 618-1. Thus, when a cursor moves within the user interface at a speed lower than a threshold speed, respective user interface objects that are selectable become selected for input as the cursor moves across the respective user interface objects (optionally when within a threshold distance of the respective user interface objects).

In FIG. 6AN, a downward swipe of contact 603 is detected on touch-sensitive surface 451. In response to the downward swipe of contact 603, cursor 630 moves from initial position 629-1 to an intermediate position 629-2 and then its final location at the location of note 618-3. As shown in FIG. 6AN, the downward swipe of contact 603 has a high input speed (e.g., the swipe and the corresponding movement of the cursor was fast). Thus, because the input speed was high, the movement speed of cursor 630 was also high. In some embodiments, as cursor 630 moved across note 618-2, note 618-2 was not selected for input and cursor 630 returned to its default size and shape (as shown by the dotted circle) before the cursor moved to the location of note 618-3 and appeared to visually highlight note 618-3 (e.g., because the movement of contact 603 on touch-sensitive surface 451 slowed down when cursor 630 was at the location of note 618-3). Thus, when a cursor moves within the user interface at a speed higher than a threshold speed, respective user interface objects that are selectable are not selected for input and the cursor appears to move over and across the respective user interface objects while maintaining its default size and shape. In some embodiments, as the cursor's speed slows to below the threshold speed, or comes to a stop, then selectable user interface elements are able to be selected for input, such as note 618-3 as shown in FIG. 6AN.

In FIG. 6AO, an upward swipe gesture is received on the touch screen 504 from stylus 203. As shown in FIG. 6AO, in response to the upward swipe gesture, the contents of user interface 602 are scrolled upwards based on the upward swipe input. In some embodiments, in response to the scrolling input, scroll bar 637 is displayed in the user interface. In some embodiments, cursor 630 is no longer displayed in the user interface (although device 500 optionally maintains location 632 as the previous and/or current location of the cursor). In some embodiments, note 618-3 is no longer selected for input.

FIGS. 6AP-6AQ illustrate an embodiment in which an upward swipe gesture is received on the touch screen 504 from a hand or finger. In FIG. 6AP, device 500 is in a state in which note 618-3 is selected for input, similar to in FIG. 6AN. In FIG. AQ, an upward swipe gesture is received on the touch screen 504 from hand 636 (e.g., from a finger on hand 636). In some embodiments, the upward swipe from a hand is considered a scrolling input (e.g., similar to the upward swipe from the stylus). In some embodiments, in response to the scrolling input, scroll bar 637 is displayed in the user interface and/or cursor 630 is no longer displayed in the user interface (although device 500 optionally maintains location 632 as the previous and/or current location of the cursor). In some embodiments, note 618-3 is no longer selected for input.

In FIG. 6AR, a contact 603 is received on a touch-sensitive surface 451 after the scrolling input shown in FIG. 6AQ, causing cursor 630 to be displayed in the user interface. In some embodiments, because cursor 630 is at the location of note 618-3 (optionally within a threshold distance of note 618-3), note 618-3 is selected for input and the size and shape of cursor 630 conforms to note 618-3. In some embodiments, the location of the scrolling input detected on touch screen 504 in FIG. 6AQ, thus, did not change the location of cursor 630 in user interface 602—therefore, upon redisplay of cursor 630, cursor was displayed at note 618-3, and note 618-3 was selected for input, as shown in FIG. 6AR.

In FIG. 6AS, an upward-rightward swipe of contact 603 is detected on touch-sensitive surface 451 causing cursor 630 to move in an upward-rightward direction to the location of scroll bar 637, as shown in FIG. 6AS. In some embodiments, because scroll bar 637 is displayed in the user interface (e.g., has not faded away), scroll bar 637 is selected for input and the size and shape of cursor 630 conforms to scroll bar 637 to appear as if the scroll bar 637 has become enlarged.

In FIG. 6AT, a user input 603 corresponding to a selection input is received on touch-sensitive surface 451. In some embodiments, in response to detecting the selection input and while the selection input is being received (e.g., while and for the duration of when the click is held), cursor 630 and/or scroll bar 637 becomes smaller and/or darker, as shown in FIG. 6AT. In FIG. 6AU, while maintaining the selection input (e.g., while clicking), a downward swipe of contact 603 is detected. As shown in FIG. 6AU, in response to the downward swipe input, scroll bar 637 is moved downwards in accordance with the downward swipe input, and the contents of user interface 602 are scrolled upwards accordingly.

In FIG. 6AV, electronic device 500 detects the termination of contact 603 from touch-sensitive surface 451 (e.g., release of contact, lift-off of contact, etc.). In some embodiments, in response to the termination of the user input, scroll bar 637 and cursor 630 expands back to their expanded size (e.g., un-selected state), as shown in FIG. 6AV.

In FIG. 6AW, while scroll bar 637 is displayed (and selected for input by cursor 630) in the user interface, a two-finger contact 603 is detected on touch-sensitive surface 451. In FIG. 6AX, a downward swipe of the two-finger contact 603 is received. In some embodiments, in response to the two-finger downward swipe input, the contents of user interface 602 are scrolled downwards. In some embodiments, cursor 630 moves upwards to reflect the scrolling of user interface 602. In some embodiments, as shown in FIG. 6AX, cursor 630 is no longer displayed in the user interface (e.g., scroll bar 637 returns to its default size). In some embodiments, device 500 maintains the position 632 of the cursor on touch screen 504 at the previous location of the cursor (e.g., the previous position of scroll bar 637 before the scrolling input). Thus, in some embodiments, when the user interface is scrolled in response to a scrolling input (e.g., via a multi-finger gesture on touch-sensitive surface 451 and/or a gesture on touch-sensitive display 504, but not including a scrolling input involving a click and drag input directed to scroll bar 637 involving cursor 630), the cursor remains in its absolute location on the touch screen 504 (and optionally is no longer displayed), even if the scroll bar is selected for input and moved in response to the scrolling input (e.g., via a multi-finger gesture on touch-sensitive surface 451 and/or a gesture on touch-sensitive display 504, but not including a scrolling input involving a click and drag input directed to scroll bar 637 involving cursor 630).

In FIG. 6AY, after no input is received for a threshold amount of time (e.g., 0.5 seconds, 1 seconds, 5 seconds, 10 seconds), device 500 ceases display of scroll bar 637. In some embodiments, device 500 continues to maintain the absolute location of cursor 630 on touch screen 504 (e.g., illustrated by position 632), even though scroll bar 637 is no longer displayed. In FIG. 6AZ, a contact 603 is received on a touch-sensitive surface 451 causing cursor 630 to be re-displayed on the touch screen 504 at the cursor's previous location in on touch screen 504 (e.g., location 632 maintained by device 500 in FIGS. 6AX-6AY).

In FIG. 6BA, an upward-leftward swipe of contact 603 is detected on touch-sensitive surface 451 and cursor 630 moves in an upward-leftward direction, as shown. In FIG. 6BB, device 500 detects the termination of contact 603 (e.g., liftoff of contact 603). In some embodiments, when no contact is detected at the touch-sensitive surface 451, device 500 tracks timer 601 for determining when to cease displaying cursor 630 in the user interface. In FIG. 6BB, timer 601 is below both a lower threshold and an upper threshold, and thus cursor 630 remains displayed in the user interface.

In FIG. 6BC, after a threshold amount of time has elapsed (e.g., 1 second, 3 seconds, 5 seconds, 8 seconds, 10 seconds, etc., illustrated by timer 601 reaching the first threshold), device 500 begins ceasing display of cursor 630. In FIG. 6BC, cursor 630 begins fading away (optionally in a similar manner as cursor 630 fading into view such as in FIGS. 6C-6E). In FIG. 6BD, cursor 630 continues fading away (e.g., becoming lighter and/or more transparent) and in FIG. 6BE, cursor 630 is fully removed from display.

In FIG. 6BF, a contact 603 is received on touch-sensitive surface 451 causing cursor 630 to be displayed in the user interface at its previous location (in FIG. 6BB). In FIG. 6BG, an upward swipe of contact 603 is detected on touch-sensitive surface 451. In response to the upward swipe of contact 603, cursor 630 moves upwards to the location of button 620-1 and button 620-1 is selected for input, as shown in FIG. 6BG.

In FIG. 6BH, device 500 detects the termination of contact 603. In some embodiments, when no contact is detected at the touch-sensitive surface 451, device 500 tracks timer 601 for determining when to cease displaying cursor 630 in the user interface. In FIG. 6BH, timer 601 is below both the lower threshold and upper threshold and thus cursor 630 remains displayed in the user interface. In FIG. 6BI, timer 601 is above the lower threshold, but below the upper threshold and cursor 630 remains displayed in the user interface. In FIG. 6BJ, after a threshold amount of time has elapsed (e.g., 3 second, 5 seconds, 8 seconds, 10 seconds, 15 seconds, etc., illustrated by timer 601 reaching the second threshold), device 500 ceases display of cursor 630. Thus, in some embodiments, when cursor 630 is not currently selecting any objects for input and has a default size and shape, cursor 630 begins fading out sooner (e.g., after a shorter threshold amount of time with no contact being detected on touch-sensitive surface 451) than when cursor 630 has selected an object for input. In this manner, device 500 maintains display of cursor 630 when the user has shown interest in interacting with cursor 630 and/or the user interface. For example, if the user has moved cursor 630 such that cursor 630 is selecting a respective user interface object for input, then device 500 maintains display of cursor 630 for a longer period of time, thus allowing the user time to perform a selection input to execute a function associated with the respective user interface object, whereas when cursor 630 is not selecting a user interface object for input, a selection input does not cause execution of a function and the user has indicated less intent to interact with cursor 630 and/or user interface.

In FIG. 6BK, a contact 603 is received on a touch-sensitive surface 451 causing cursor 630 to be displayed in the user interface at its previous location (e.g., at button 620-1), thus causing button 620-1 to be selected for input. In FIG. 6BL, while cursor 630 is displayed in the user interface, device 500 detects that touch-sensitive surface 451 has been disconnected from device 500. In some embodiments, in response to detecting that touch-sensitive surface 451 is no longer in communication with device 500, device 500 removes display of cursor 630 from the user interface, as shown in FIG. 6BL. In some embodiments, disconnecting touch-sensitive surface 451 from device 500 includes physically unplugging touch-sensitive surface 451 from device 500, device 500 losing wireless connectivity with touch-sensitive surface 451, or any other means of terminating communication with touch-sensitive surface 451. In some embodiments, cursor 630 is ceased to be displayed only if the input device that was disconnected is an input device that controls the cursor (e.g., such as when touch-sensitive surface 451 is disconnected, but optionally not when external keyboard 593 is disconnected). In some embodiments, cursor 630 is ceased to be displayed only if there are no more input devices for controlling the cursor connected to device 500 (e.g., cursor 630 remains displayed as long as there is at least one input device for controlling the cursor in communication with device 500).

In FIG. 6BM, the electronic device 500 presents user interface 604 on touch screen 504. In FIG. 6BM, the electronic device 500 is concurrently displaying two different applications corresponding to two different user interfaces: user interface 604-1 and user interface 604-2. For example, user interface 604-1 corresponds to an application for a news application and user interface 604-2 corresponds to a different application for a file browser application. In FIG. 6BM, user interface 604-1 includes news stories 640-1 to 640-4. In some embodiments, the news story includes an image, a title and a brief description. In some embodiments, the news story is displayed vertically or horizontally. In some embodiments, the news stories 640-1 to 640-4 are selectable to display the corresponding news story within user interface 604-1. User interface 604-2 includes search field 642 and files 644-1 to 644-12. In some embodiments, the files include an image and the name of the file.

In FIG. 6BN, a downward swipe of contact 603 is detected on touch-sensitive surface 451. In response to the downward swipe, cursor 630 moves downwards from initial position 629 to news story 640-2. In some embodiments, because news story 640-2 is smaller than a threshold size (e.g., 0.25 cm^2, 1 cm^2, 4 cm^2, 6 cm^2, 10 cm^2, etc. of the display screen space or 200%, 300%, 500%, etc. larger than the default size of the cursor), the size and shape of cursor 630 conforms to news story 640-2 and news story 640-2 is selected for input. In some embodiments, cursor 630 has a rectangular shape, as shown in FIG. 6BN.

In FIG. 6BO, a downward swipe of contact 603 is detected on touch-sensitive surface 451. In response to the downward swipe, cursor 630 moves downwards from initial position 629 to news story 640-3. As shown in FIG. 6BO, because news story 640-3 is larger than the above-described threshold size, the size and shape of cursor 630 does not conform to news story 640-3 and maintains its default size and shape. In some embodiments, news story 640-3 is selected for input and receives a focus and/or highlighting similar to as if cursor 630 had conformed to news story 640-3. In FIG. 6BO, cursor 630, at its default size/shape, overlays news story 640-3. In some embodiments, because cursor 630 is at least partially transparent (e.g., translucent), the portion of news story 640-3 beneath cursor 630 is partially visible.

In FIG. 6BP, a selection 603 of the "tab" key is received on external keyboard 593. In some embodiments, a "tab"

key input corresponds to a request to select the next object in the user interface for input. In some embodiments, news story 640-4 is the next selectable user interface object in user interface 604-1 (e.g., after news story 640-3). Thus, in response to selection 603, electronic device 500 causes news story 640-4 to be selected for input. In some embodiments, cursor 630 is moved to the position of news story 640-4. In some embodiments, because news story 640-4 is larger than the threshold size, cursor 630 is displayed overlaying news story 640-4. In some embodiments, cursor 630 is hidden from display. In some embodiments, news story 640-4 has a focus and/or highlighting similar to as if cursor 630 had conformed to news story 640-4.

In FIG. 6BR, another selection 603 of the "tab" key is received on external keyboard 593. As described above, a "tab" key input optionally corresponds to a request to select the next object in the user interface for input. In some embodiments, news story 640-4 is the last selectable user interface object in user interface 604-1 and file 644-1 is the first selectable user interface object in user interface 604-2 (corresponding to a file browser application). Thus, in response to selection 603, electronic device 500 causes cursor 630 to move to file 644-1, and file 644-1 to be selected for input. In some embodiments, because file 644-1 is smaller than the threshold size, the size and shape of cursor 630 conforms to file 644-1 similarly to as described above (e.g., as opposed to maintaining the default size and shape and overlaying the respective user interface element).

In some embodiments, cursor 630 moved from selecting news story 640-4 to file 644-1 because news story 640-4 is the last selectable user interface object currently displayed on touch screen 504 by user interface 604-1. Thus, in some embodiments, a "tab" input causes the cursor to move from one user interface object to the next until the cursor reaches the last displayed user interface object (e.g., even though user interface 604-1 includes selectable user interface objects below news story 640-4, which are not currently displayed on touch screen 504), at which point the next "tab" input causes the cursor to move to the first user interface object in the next displayed user interface (if multiple user interfaces are concurrently displayed), without scrolling user interface 604-1. In some embodiments, instead of the cursor moving from one application to the next concurrently displayed application when cursor 630 reaches the last displayed selectable user interface object, the cursor causes user interface 604-1 to scroll downward until cursor 630 reaches the last selectable user interface object on user interface 604-1 (e.g., reaching the end of user interface 604-1 and not just the last user interface object currently displayed when the input was received) before moving to the first user interface object in the next displayed user interface.

In FIG. 6BS, a user input 603 corresponding to a downward scrolling input (e.g., a two-finger upward swipe gesture) is received on touch-sensitive surface 451. In some embodiments, in response to user input 603, device 500 scrolls user interface 604-2 upwards (e.g., revealing more content at the bottom of user interface 604-2, optionally while not scrolling user interface 604-1), thus moving file 644-1 away from the previous location of cursor 630, as shown in FIG. 6BS. As shown in FIG. 6BS, in response to the scrolling input, cursor 630 ceases displaying in the user interface. In some embodiments, device 500 maintains the position of the cursor (as shown by position 632) at the same absolute position on the display area of touch screen 504 as before the scrolling input was received (e.g., the location of file 644-1 before it was scrolled upwards). In some embodiments, the cursor remains displayed in the user interface, but returns to its default shape and size if the object that was previously selected for input (e.g., file 644-1) moves farther than the threshold distance within which the object becomes selected for input in the first instance.

In FIG. 6BT, a contact 603 is received on a touch-sensitive surface 451 causing display of cursor 630 in user interface 604-2. As shown in FIG. 6BT, cursor 630 is displayed at the same absolute position in the user interface at which it was located before the scrolling input was received (e.g., as in FIG. 6BR). In some embodiments, because cursor 630 is farther than a threshold distance from file 644-1 and file 644-5, cursor 630 has a default shape and size, and neither file 644-1 nor file 644-5 are selected for input. In some embodiments, if cursor 630 were within the threshold distance from file 644-1 or file 644-5, then that respective object would be selected for input and the size and shape of cursor 630 would conform to the size and/or shape of the respective object (e.g., such as in FIG. 6BR with respect to file 644-1).

In FIG. 6BU, a user input 603 corresponding to a downward scrolling input (e.g., a two-finger upward swipe gesture) is received on touch-sensitive surface 451. In some embodiments, in response to user input 603, device 500 scrolls user interface 604-2 upwards (e.g., revealing more content at the bottom of user interface 604-2, optionally while not scrolling user interface 604-1) and moving file 644-5 to the previous position of cursor 630, as shown in FIG. 6BU. As shown in FIG. 6BU, in response to the scrolling input, cursor 630 ceases displaying in the user interface. In some embodiments, device 500 maintains the position of the cursor (as shown by position 632) at the same absolute position on the display area of touch screen 504 as before the scrolling input was received. In some embodiments, the cursor remains displayed in the user interface, but changes shape to conform to new selectable objects that move to the position of the cursor (e.g., file 644-5 as shown in FIG. 6BU). As shown in FIG. 6BV, a termination of user input 603 is detected and the scrolling of user interface 602 is terminated accordingly. In some embodiments, cursor 630 remains hidden from display, even though file 644-5 has moved to the location 632 of the cursor.

In FIG. 6BW, a contact 603 is received on touch-sensitive surface 451 causing display of cursor 630 in user interface 604-2. As shown in FIG. 6BW, cursor 630 is displayed at the same absolute position on touch screen 504 at which it was located before the scrolling input was received (e.g., as in FIG. 6BT). In some embodiments, because cursor 630 is at or within a threshold distance from file 644-5, file 644-5 becomes selected for input and the size and shape of cursor 630 conforms to file 644-5, as shown in FIG. 6BW.

FIGS. 6BX-6BY illustrate an alternative embodiment in which cursor 630 is displayed after the termination of a scrolling input and selects new objects that are at the location of the cursor. In FIG. 6BX, a user input 603 corresponding to an upward scrolling input (e.g., a two-finger downward swipe gesture) is received on touch-sensitive surface 451. In some embodiments, in response to user input 603, device 500 scrolls user interface 602 downwards (e.g., revealing more content at the top of user interface 604-2, optionally while not scrolling user interface 604-1) and moving file 644-1 to the location of cursor 630, as shown in FIG. 6BX. In FIG. 6BY, a termination of user input 603 is detected and the scrolling of user interface 602 is terminated accordingly. In some embodiments, cursor 630 is displayed in response to the termination of user input 603 (e.g., cursor 630 was hidden while user interface 604-2 was scrolled and re-appears at the end of scrolling), and because cursor 630 is at the position of file 644-1, file 644-1 is selected for input and the size and shape of cursor 630 conforms to file 644-1. In some embodiments, cursor 630 maintains being displayed while user interface 604-2 is scrolled (e.g., rather than being hidden while user interface 604-2 is scrolled), and when file 644-1 comes within a threshold distance of cursor 630, then file 644-1 becomes selected for input and the size and shape of cursor 630 conforms to file 644-1.

In FIG. 6BZ, a user input 603 corresponding to a selection input is received at touch-sensitive surface 451. In some embodiments, in response to detecting the selection input and while the selection input is being received (e.g., while and for the duration of when the click is held), cursor 630 and/or file 644-1 becomes smaller and/or darker, as shown in FIG. 6BZ. In some embodiments, as soon as and while the selection input is being received, device 500 enters into an object movement mode in which the user interface object that is selected (e.g., file 644-1) can be moved around user interface 604-2. Thus, the user does not need to hold the selection input for more than a threshold amount of time. For example, in FIG. 6CA, while maintaining the selection input, (e.g., while clicking), a downward rightward swipe of user input 603 is detected. In response to the downward rightward swipe of user input 603, file 644-1 is moved in user interface 604-2 in accordance with the user's movement input. In some embodiments, file 644-1 is displayed as if floating above the other files in user interface 644-1. In some embodiments, cursor 630 and/or file 644-1 maintain their smaller and/or darker appearance while moving (e.g., because the selection input on touch-sensitive surface 451 is maintained while moving). In FIG. 6CB, while maintaining the selection input, (e.g., while clicking), a downward leftward swipe of user input 603 is detected moving file 644-1 to a location between the original positions of file 644-5 and file 644-6. In some embodiments, in response to moving file 644-1 to a location between the original positions of file 644-5 and file 644-6, the files in user interface 604-2 are re-ordered such that file 644-1 is placed in a new position (e.g., files 644-2 to 644-4 move leftwards to fill the empty position left by file 644-1, and file 644-5 moves upwards to fill the empty position left by file 644-4). In FIG. 6CC, device 500 detects the termination of user input 603 (lift-off of the selection input). In some embodiments, in response to detecting the termination of user input 603, device 500 exits object movement mode and the positions of the respective moved files are finalized and the files optionally snap into position (e.g., file 644-1 snaps to the grid of files).

FIGS. 6CD-6CG illustrate an embodiment of entering object movement mode and moving an object via an input on the touch screen 504 instead of touch-sensitive surface 451. In FIG. 6CD, an input from hand 636 (e.g., a finger on hand 636) is received on the touch screen 504 selecting file 644-1. In some embodiments, because the selection of file 644-1 has not been held for more than a threshold amount of time (e.g., as shown by timer 601), device 500 does not enter object movement mode, and any movement of hand 636 on the touch screen 504 will not move file 644-1 (and optionally will be interpreted as a swipe input, such as for scrolling user interface 604-2).

In FIG. 6CE, the input from hand 636 selecting file 644-1 is maintained on the touch screen 504 for longer than the threshold amount of time (e.g., 2 seconds, 4 seconds, 6 seconds, 10 seconds, etc.). In some embodiments, in response to selection of file 644-1 on touch screen 504 for longer than the threshold amount of time, device 500 enters into object movement mode, as shown in FIG. 6CE. In some embodiments, when object movement mode is entered via the touch screen 504 (e.g., as opposed to touch-sensitive surface 451 as described above with respect to FIGS. 6BZ-6CC), all objects that are moveable in user interface 604-2 are displayed with an animation indicating that the respective objects are able to be moved. For example, files 644-1 to 644-12 are displayed with a shaking or vibrating animation. In some embodiments, only objects within user interface 604-2 enter the object movement mode, and objects in user interface 604-1 do not. In some embodiments, device 500 remains in object movement mode until device 500 receives a separate user input to exit object movement mode (e.g., a selection of a button to exit object movement mode that is optionally displayed on touch screen 504 when device 500 enters into object movement mode).

In FIG. 6CF, while in object movement mode, a swipe from hand 636 (e.g., a finger on hand 636) is detected while maintaining selection of file 644-1 via touch screen 504. In some embodiments, because device 500 is in object movement mode, in response to the swipe input, file 644-1 moves in user interface 604-2 in accordance with the swipe input (e.g., follows the user's contact with touch screen 504, rather than causing scrolling of user interface 604-2), as shown in FIG. 6CF. In FIG. 6CG, a termination of the user input from hand 636 is detected (e.g., lift-off of the contact with touch screen 504). In some embodiments, in response to the termination of the user input, the movement of file 644-1 is finalized (e.g., file 644-1 moves to the original location of file 644-6 and file 644-6 optionally moves to the location vacated by file 644-1). In some embodiments, device 500 remains in object movement mode. In some embodiments, device 500 exits object movement mode in response to the termination of the input. Thus, as shown above, in some embodiments, device 500 enters into object movement mode in response to receiving a selection input received via touch-sensitive surface 451 while a user interface object is selected for input without requiring the selection input be held for a threshold amount of time, whereas device 500 enters object movement mode in response to a selection input received via touch-sensitive display 504 only after the selection input is held for a threshold amount of time. In this manner, device 500 prevents the device from unintentionally entering into object movement mode when the user is interacting using the touch-sensitive surface, whereas unintentional selection inputs are less likely from touch-sensitive surface 451.

FIGS. 6CH-CL illustrate a method of highlighting multiple files using cursor 630. FIG. 6CH illustrates user interface 604-2 in which file 644-6 is selected for input and the size and shape of cursor 630 conforms to file 644-6. In FIG. 6CI, while file 644-6 is selected for input, device 500 concurrently detects user input 603-1 and 603-2. In some embodiments, user input 603-1 corresponds to a selection of a "shift" key on external keyboard 593. In some embodiments, user input 603-2 corresponds to a selection input on touch sensitive surface 451. In some embodiments, selection of a "shift" key indicates a request to select multiple objects. In FIG. 6CJ, while user input 603-1 is maintained, a rightward swipe of user input 603-2 is detected on touch sensitive surface 451 (e.g., while the selection input on touch-sensitive surface 451 is maintained). In some embodiments, in response to the rightward swipe of user input 603-2 while maintaining selection of the "shift" key, cursor 630 expands rightwards in accordance with the rightward swipe of user input 603-2, as shown in FIG. 6CJ. Thus, in some embodiments, while file 644-6 is selected for input, cursor 630 expands its size and/or shape from an initial size and/or shape that is based on a user interface object (e.g., that is selected for input) to select additional objects for input.

In FIG. 6CK, a downward, rightward swipe of user input 603-2 is detected on touch-sensitive surface 451 while selection of the "shift" key is maintained by user input 603-1. In response to the downward, rightward swipe of user input 603-2, cursor 630 continues expanding in a downward, rightward direction in accordance with the input. As shown, cursor 630 encompasses files 644-6 and 644-1, and has partially encompassed files 644-9 and 644-10. In some embodiments, respective user interface objects become selected for input when the cursor fully encompasses the respective user interface object. In some embodiments, respective user interface objects become selected for input when the cursor has encompassed a threshold amount of the respective user interface object (e.g., 25%, 33%, 50%, 66%, 75% of the area of the user interface object). In such embodiments, when the cursor encompasses the threshold amount of the respective user interface object, the respective user interface object becomes selected for input and cursor 630 optionally changes size and/or shape to "snap" to encompassing the entirety of the respective user interface object.

In FIG. 6CL, electronic device 500 detects the termination of user input 603 from touch-sensitive surface 451 (e.g., release of or lift-off of any of user input 603-1 or 603-2). In some embodiments, in response to the termination of the user input, files 644-6, 644-1, 644-9, and 644-10 are selected for input, as shown in FIG. 6CL. In some embodiments, cursor 630 expands in size and/or shape to accommodate the four selected files. In some embodiments, if cursor 630 did not encompass more than the threshold amount of a given file, then the file is not selected for input when user input 603 is terminated. In some embodiments, if cursor 630 encompasses more than the threshold amount of a given file, then the file is selected for input when user input 603 is terminated.

In FIG. 6CM, a contact 603 is received on touch-sensitive surface 451 causing cursor 630 to continue to be displayed in the user interface (e.g., selecting file 644-6, 644-1, 644-9, and 644-10 for input). In FIG. 6CN, a user input 603 corresponding to an upward and rightward swipe while maintaining contact with touch-sensitive surface 451 is detected on touch-sensitive surface 451. In some embodiments, in response to the upward, rightward swipe, cursor 630 moves in an upward and rightward direction in accordance with the user input, as shown in FIG. 6CN. In some embodiments, if and/or when cursor 630 moves beyond a threshold distance from files 644-6, 644-1, 644-9, and/or 644-10, then cursor 630 returns to its default shape and size and files 644-6, 644-1, 644-9, and 644-10 are no longer selected for input.

In FIG. 6CO, user input 603 corresponding to a selection input is received. In some embodiments, in response to detecting the selection input and while the selection input is being received (e.g., while and for the duration of when the click is held), cursor 630 becomes smaller and/or darker, as shown in FIG. 6CO. In FIG. 6CP, a downward and rightward swipe of user input 603 is detected while the selection input is maintained. In some embodiments, in response to the user input, cursor 630 changes shape and/or size and begins expanding in accordance with the user input (e.g., changes from circular to rectangular). In some embodiments, the expanded shape and/or size of cursor 630 allows the user to select multiple objects for input. Thus, in some embodiments, when the cursor has a default shape and size when a request to select an area of the user interface is received, the initial shape and size of the cursor is the default shape and size, and the cursor begins expanding (in accordance with the user input) from the default shape and size (e.g., and optionally changes to have a rectangular shape upon expanding). In some embodiments, when the cursor has a shape and size based on a user interface object (e.g., due to the user interface object being selected for input) when the request to select an area of the user interface is received, then the initial shape and size of the cursor is the shape and size based on the user interface object, and begins expanding (in accordance with the user input) from that shape and size based on the user interface object.

In FIG. 6CQ, a downward and rightward swipe of user input 603 is detected while the selection input is maintained. In some embodiments, in response to the user input, cursor 630 continues changing shape and/or size and expanding in accordance with the user input, as shown in FIG. 6CQ. In FIG. 6CQ, cursor 630 has encompassed all of file 644-7 and some of file 644-11. Similarly as described above, if cursor 630 encompasses more than a threshold amount of file 644-11, then file 644-11 is optionally selected for input. In FIG. 6CR, electronic device 500 detects the termination of user input 603 from touch-sensitive surface 451 (e.g., release of or lift-off of user input 603). In some embodiments, in response to the termination of the user input, files 644-7 and 644-11 are selected for input, as shown in FIG. 6CR. In some embodiments, cursor 630 expands in size and/or shape to accommodate the two selected files. In some embodiments, if cursor 630 did not encompass more than the threshold amount of a given file (e.g., file 644-1), then the file is not selected for input when user input 603 is terminated. In some embodiments, if cursor 630 encompasses more than the threshold amount of the file, then the file is selected for input when user input 603 is terminated.

FIGS. 6CS-6CW illustrate cursor 630 interactions with a calendar user interface. In FIG. 6CS, device 500 displays user interface 606 corresponding to a calendar application. User interface 606 optionally includes a graphical calendar (e.g., an hourly, daily, monthly, yearly, etc. calendar). In FIG. 6CS, user interface 606 displays a weekly calendar with seven columns corresponding to the seven days of the week. In some embodiments, each position within a column represents a different time within the respective day (e.g., 9:00 AM, 9:15 AM, 9:30 AM, 10:00 AM, etc.). In some embodiments, user interface 606 includes one or more calendar events such as event 641-1 (set on Monday, Nov. 18, 2019 at 8:15 AM until 9:15 AM), event 641-2 (set for Wednesday, November 20 at 10 AM until 11 AM), and event 641-3 (set for Saturday, November 23 at 9 AM until noon). In some embodiments, each of the events in user interface 606 are selectable to edit the respective event, move the respective event, or delete the respective event. In some embodiments, a user is able to insert events into the calendar user interface optionally by selecting a particular time in the user interface (e.g., such as by performing a selection input when cursor 630 is at a respective time increment, as described below).

In FIG. 6CT, a downward swipe of user input 603 is detected on touch sensitive surface 451. In some embodiments, in response to the user input 603, device 500 moves cursor 630 downwards in accordance with the user input, as shown in FIG. 6CT. In some embodiments, when cursor 630 is at or over the portion of user interface 606 corresponding to particular times on the calendar (e.g., 9:00 AM, 10:00 AM, etc.), cursor 630 snaps to particular increments of time (e.g., every 15 minutes, every 30 minutes, every hour, every day, etc.) as cursor 630 moves across the user interface. For example, in FIG. 6CT, cursor 630 has snapped to the 8:45 AM increment of time. Thus, in response to a selection input on touch-sensitive surface 451 (e.g., a click input), the user is able to insert an event at 8:45 AM on Thursday, Nov. 21, 2019. As shown in FIG. 6CT, cursor 630 is displayed as a horizontal line across the column corresponding to Thursday, November 21. In some embodiments, cursor 630 includes a circular dot on the left side of the horizontal line.

In FIG. 6CU, while cursor 630 is snapped to the 8:45 AM increment of time, user input 603 corresponding to a further downward swipe is detected on touch sensitive surface 451. In some embodiments, in response to the user input, cursor 630 moves directly from the 8:45 AM increment of time to the 9:00 AM increment of time (e.g., the cursor is displayed snapping from 8:45 AM to 9:00 AM without displaying the cursor moving between 8:45 AM and 9:00 AM in accordance with the user input). In FIG. 6CV, while cursor 630 is snapped to the 9:00 AM increment of time, user input corresponding to a further downward swipe of user input 603 is detected on touch sensitive surface 451. In some embodiments, in response to the user input, cursor 630 moves directly from the 9:00 AM increment of time to the 9:15 AM increment of time (e.g., the cursor is displayed snapping to 9:15 AM without displaying the cursor moving between 9:00 AM and 9:15 AM in accordance with the user input). Thus, as shown, cursor 630 snaps to particular increments of time in response to the user input such that upon termination of the user input, cursor 630 will be located at one of the predetermined increments of time that the user is able to interact with in the calendar user interface 606.

In FIG. 6CW, a downward, leftward swipe of user input 603 is received on touch sensitive surface 451. In some embodiments, in response to the user input 603, cursor 630 moves in a downward, leftward direction in accordance with the user input, as shown in FIG. 6CW. In some embodiments, as cursor 630 is moving in a downward, leftward direction towards event 641-2, cursor 630 optionally snaps to the 9:30 AM and 9:45 AM time increments. In some embodiments, if cursor 630 has a movement speed above a threshold, then cursor 630 does not snap to the respective increments of time, similarly to as described above with respect to FIG. 6AN. In FIG. 6CW, because cursor 630 has moved to the position of event 641-2 (or optionally within a threshold distance of event 641-2), event 641-2 becomes selected for input and cursor 630 changes size and/or shape to accommodate event 641-2. Thus, in some embodiments, event 641-2 appears to be slightly larger than its default size (e.g., such as if it is brought up in the z plane) or otherwise highlighted.

FIGS. 6CX-6CZ illustrate embodiments in which the size of cursor 630 changes based on the speed of the user input and/or cursor 630. In FIG. 6CX, while displaying user interface 602, device 500 detects a downward, rightward swipe of user input 603 having a low input speed on touch sensitive surface 451. In some embodiments, in response to the user input 603, cursor 630 moves in a downward, rightward direction in accordance with the user input. In some embodiments, because the input speed is low (e.g., and thus, the cursor movement speed is low), cursor 630 has a small size (optionally the default size), as illustrated by intermediate cursor 629 (e.g., an illustration of cursor 630 while receiving user input 603 with the low input speed).

In FIG. 6CY, device 500 detects a downward, leftward swipe of user input 603 having a medium input speed on touch sensitive display 451. In some embodiments, in response to the user input 603, cursor 630 moves in a downward, leftward direction in accordance with the user input. In some embodiments, because the input speed is medium (e.g., and thus, the cursor movement speed is medium, higher than the input/cursor velocities in FIG. 6CX), cursor 630 has a medium size (optionally larger than the default size) while moving at that medium speed, as illustrated by intermediate cursor 629 (e.g., an illustration of cursor 630 while receiving user input 603 with the medium input speed). As shown in FIG. 6CY, cursor 630 returns to its default size when user input 603 slows down to a low speed or stops moving (e.g., in FIG. 6CY, the input speed is medium when cursor 630 is at the position of intermediate cursor 629, and then the input speed is low when cursor 630 reaches its final position shown in FIG. 6CY).

In FIG. 6CZ, device 500 detects an upward swipe of user input 603 having a high input speed on touch sensitive display 451. In some embodiments, in response to the user input 603, cursor 630 moves in an upward direction in accordance with the user input. In some embodiments, because the input speed is high (e.g., and thus, the cursor movement speed is high, higher than the input/cursor velocities in FIGS. 6CX and 6CY), cursor 630 has a large size (optionally larger than the default size and the medium size) while moving at the high speed, as illustrated by intermediate cursor 629 (e.g., an illustration of cursor 630 while receiving user input 603 with the medium input speed). As shown in FIG. 6CZ, cursor 630 returns to its default size when user input 603 slows down to a low speed or stops moving (e.g., in FIG. 6CZ, the input speed is high when cursor 630 is at the position of intermediate cursor 629, and then the input speed is low when cursor 630 reaches its final position shown in FIG. 6CZ). Thus, as shown in FIGS. 6CX-6CZ, the size of the cursor changes (optionally while maintaining its default shape) based on the speed of the cursor movement and/or the speed of the input. Changing the shape allows the user to better track the cursor as it moves across the user interface and/or helps the user find the cursor. In some embodiments, the cursor size increases smoothly based on the input speed (e.g., is a continuous function). In some embodiments, the cursor size increases piece-wise based on the input speed (e.g., jumps in size when it reaches certain thresholds). In some embodiments, the cursor size increases linearly, exponentially, logarithmically, asymptotically (e.g., has and approaches a maximum size), or any combination of these, based on the input speed. In some embodiments, the cursor maintains a default size until it reaches a predetermined threshold speed and then begins to scale in size based on user input.

FIGS. 6DA-6DS illustrate embodiments in which the color of cursor 630 depends on the color of the content over which cursor 630 is overlaid. In FIG. 6DA, device 500 is displaying content palette 643 in user interface 602. In some embodiments, content palette 643 includes a plurality of tools and options for managing how content is inserted into content entry regions. For example, content palette 643 includes one or more pen options and one or more color options. In FIG. 6DA, a greyscale color palette 644 is displayed including ten different selectable colors (e.g., colors 646-1 to 646-10). It is understood that content palette 643 and color palette 644 displayed herein are merely illustrative.

In FIG. 6DA, a downward, rightward swipe of a user input 603 is detected on touch sensitive surface 451 moving cursor 630 to the position of color 646-1. In some embodiments, color 646-1 corresponds to a fully white color. As shown in FIG. 6DA, when cursor 630 is overlaying color 646-1, cursor 630 has a grey color that is darker (e.g., having less luminance) than color 646-1. Thus, while cursor 630 is overlaying color 646-1, cursor 630 is in a "dark" mode (e.g., cursor 630 is darker than the color of the content overlaid by the cursor). As described below, in FIGS. 6DA-6DF, cursor 630 is in a "dark" mode and is consistently darker than the content overlaid by the cursor.

In FIG. 6DB, a rightward swipe of user input 603 is detected on touch sensitive surface 451 moving cursor 630 to the position of color 646-2. In some embodiments, color 646-2 is darker than color 646-1. In some embodiments, in response to cursor 630 overlaying color 646-2, cursor 630 is updated to be darker than when cursor 630 was overlaying color 646-1. In FIG. 6DC, a rightward swipe of user input 603 is detected on touch sensitive surface 451 moving cursor 630 to the position of color 646-3. In some embodiments, color 646-3 is darker than color 646-2. In some embodiments, in response to cursor 630 overlaying color 646-3, cursor 630 is updated to be darker than when cursor 630 was overlaying color 646-2. In FIG. 6DD, a rightward swipe of user input 603 is detected on touch sensitive surface 451 moving cursor 630 to the position of color 646-4. In some embodiments, color 646-4 is darker than color 646-3. In some embodiments, in response to cursor 630 overlaying color 646-4, cursor 630 is updated to be darker than when cursor 630 was overlaying color 646-3. In FIG. 6DE, a rightward swipe of user input 603 is detected on touch sensitive surface 451 moving cursor 630 to the position of color 646-5. In some embodiments, color 646-5 is darker than color 646-4. In some embodiments, in response to cursor 630 overlaying color 646-5, cursor 630 is updated to be darker than when cursor 630 was overlaying color 646-4. In FIG. 6DF, a rightward swipe of user input 603 is detected on touch sensitive surface 451 moving cursor 630 to the position of color 646-6. In some embodiments, color 646-6 is darker than color 646-5. In some embodiments, in response to cursor 630 overlaying color 646-6, cursor 630 is updated to be darker than when cursor 630 was overlaying color 646-5. Thus, as shown in FIGS. 6DA-6DF, the color of cursor 630 is optionally based on the color of the user interface over which the cursor is overlaid. In some embodiments, as cursor 630 moves around in the user interface such that the content below the cursor changes from a first color to a second color, cursor 630 updates or changes color (e.g., darkness, luminance, color, hue, saturation, etc.) to be based on the second color.

In FIG. 6DG, a rightward swipe of user input 603 is detected on touch sensitive surface 451 moving cursor 630 to the position of color 646-7. In some embodiments, color 646-7 is darker than color 646-6. In some embodiments, color 646-7 is below a threshold amount of luminance (e.g., 30% luminance, 40% luminance, 50% luminance, 60% luminance, etc.). As shown in FIG. 6DG, when cursor 630 is overlaying color 646-7, cursor 630 has a grey color that is lighter (e.g., having more luminance) than color 646-7. Thus, while cursor 630 is overlaying color 646-7, cursor 630 is in a "light" mode (e.g., cursor 630 is lighter than the color of the content overlaid by the cursor). In some embodiments, in response to cursor 630 moving from color 646-6 to color 646-7, cursor 630 changes from "dark" mode to "light" mode. Thus, in some embodiments, cursor 630 is updated to be lighter than when cursor 630 was overlaying color 646-6. Therefore, as shown above, while cursor 630 is in the "dark" mode, upon overlaying a color having a luminance below a first threshold (e.g., color 646-7), cursor 630 switches to being in the "light" mode. As will be shown below, while cursor 630 is in the "light" mode, upon overlaying a color having a luminance above a second threshold (e.g., different than the first threshold), cursor 630 switches back to being in the "dark" mode.

As described below, in FIGS. 6DG-6DJ, cursor 630 is in a "light" mode and is consistently lighter than the content overlaid by the cursor. In FIG. 6DH, a rightward swipe of user input 603 is detected on touch sensitive surface 451 moving cursor 630 to the position of color 646-8. In some embodiments, color 646-8 is darker than color 646-7. In some embodiments, in response to cursor 630 overlaying color 646-8, cursor 630 is updated to be darker than when cursor 630 was overlaying color 646-7 (optionally lighter than when cursor 630 was overlaying color 646-6). In FIG. 6DI, a rightward swipe of user input 603 is detected on touch sensitive surface 451 moving cursor 630 to the position of color 646-9. In some embodiments, color 646-9 is darker than color 646-8. In some embodiments, in response to cursor 630 overlaying color 646-9, cursor 630 is updated to be darker than when cursor 630 was overlaying color 646-8 (optionally lighter than when cursor 630 was overlaying color 646-6). In FIG. 6DJ, a rightward swipe of user input 603 is detected on touch sensitive surface 451 moving cursor 630 to the position of color 646-10. In some embodiments, color 646-10 is darker than color 646-9. In some embodiments, in response to cursor 630 overlaying color 646-10, cursor 630 is updated to be darker than when cursor 630 was overlaying color 646-9 (optionally lighter than when cursor 630 was overlaying color 646-6).

Thus, as described above, when cursor 630 is in dark mode, cursor 630 has a color within a first range of colors and when cursor 630 is in light mode, cursor 630 has a color within a second range of colors. In some embodiments, the first range and second range of colors at least partially overlap. In some embodiments, the darkest color in the first range of colors is darker than the lightest color in the second range of colors. It is understood that although the above embodiments describe the cursor changing in darkness and/or luminance, the cursor is optionally displayed with a color within any color spectrum based on the color of the content overlaid by the cursor (e.g., the contrast changes, the saturation changes, the hue changes, the red component changes, the blue component changes, etc.).

FIGS. 6DK-6DS illustrate embodiments in which the color of the cursor changes from "light" mode to "dark" mode as the content overlaid by the cursor changes from dark to light. As described below, in FIGS. 6DK-6DN, cursor 630 is in a "light" mode and is consistently lighter than the content overlaid by the cursor. In FIG. 6DK, a leftward swipe of user input 603 is detected on touch sensitive surface 451 moving cursor 630 to the position of color 646-9. In some embodiments, color 646-9 is lighter than color 646-10. In some embodiments, in response to cursor 630 overlaying color 646-9, cursor 630 is updated to be lighter than when cursor 630 was overlaying color 646-10 (optionally the same color as shown in FIG. 6DI). In FIG. 6DL, a leftward swipe of user input 603 is detected on touch sensitive surface 451 moving cursor 630 to the position of color 646-8. In some embodiments, color 646-8 is lighter than color 646-9. In some embodiments, in response to cursor 630 overlaying color 646-8, cursor 630 is updated to be lighter than when cursor 630 was overlaying color 646-9 (optionally the same color as shown in FIG. 6DH). In FIG. 6DM, a leftward swipe of user input 603 is detected on touch sensitive surface 451 moving cursor 630 to the position of color 646-7. In some embodiments, color 646-7 is lighter than color 646-8. In some embodiments, in response to cursor 630 overlaying color 646-7, cursor 630 is updated to be lighter than when cursor 630 was overlaying color 646-8 (optionally the same color as shown in FIG. 6DG).

In FIG. 6DN, a leftward swipe of user input 603 is detected on touch sensitive surface 451 moving cursor 630 to the position of color 646-6. In some embodiments, color 646-6 is lighter than color 646-7. In some embodiments, in response to cursor 630 overlaying color 646-6, cursor 630 is updated to be lighter than when cursor 630 was overlaying color 646-7 (optionally a lighter color than the color of cursor 630 shown in FIG. 6DF). Thus, in some embodiments, while cursor 630 is in light mode, the threshold at which cursor 630 transitions into dark mode is different than the threshold at which cursor 630 transitions into light mode from dark mode (e.g., cursor 630 did not switch to "dark" mode by moving from color 646-7 to 646-6). In some embodiments, the threshold has a hysteresis (e.g., the threshold is a lower luminance of the background content when the cursor is in dark mode, and a higher luminance of the background content when the cursor is in light mode). For example, as shown herein, cursor 630 switched from "dark" mode to "light" mode when cursor 630 moved from color 646-6 to color 646-7, whereas moving from color 646-7 to color 646-6 optionally does not cause cursor 630 to switch from "light" mode to "dark" mode. For example, as will be described below, cursor 630 optionally switches from "light" mode to "dark" mode when cursor 630 moved from 646-6 to 646-5.

In FIG. 6DO, a leftward swipe of user input 603 is detected on touch sensitive surface 451 moving cursor 630 to the position of color 646-5. In some embodiments, color 646-5 is lighter than color 646-6. In some embodiments, color 646-5 is above a threshold amount of luminance (e.g., 30% luminance, 40% luminance, 50% luminance, 60% luminance, etc.). As shown in FIG. 6DO, when cursor 630 is overlaying color 646-5, cursor 630 has a grey color that is darker (e.g., having less luminance) than color 646-5. Thus, while cursor 630 is overlaying color 646-5, cursor 630 is in a "dark" mode (e.g., cursor 630 is darker than the color of the content overlaid by the cursor). In some embodiments, in response to cursor 630 moving from color 646-6 to color 646-5, cursor 630 changes from "light" mode to "dark" mode. Thus, in some embodiments, cursor 630 is updated to be darker than when cursor 630 was overlaying color 646-6 (and/or optionally the same color as shown in FIG. 6DE). As illustrated, the threshold to switch from "dark" mode to "light" mode is optionally somewhere between color 646-6 and color 646-7 whereas the threshold to switch from "light" mode to "dark" mode is optionally somewhere between color 646-5 and color 646-6, thus the thresholds are offset from each other. Thus, in FIGS. 6DO-6DS, cursor 630 is in a "dark" mode and is consistently darker than the content overlaid by the cursor.

In FIG. 6DP, a leftward swipe of user input 603 is detected on touch sensitive surface 451 moving cursor 630 to the position of color 646-4. In some embodiments, color 646-4 is lighter than color 646-5. In some embodiments, in response to cursor 630 overlaying color 646-4, cursor 630 is updated to be lighter than when cursor 630 was overlaying color 646-5 (optionally darker than when cursor 630 was overlaying color 646-6 and/or optionally the same color as shown in FIG. 6DD). In FIG. 6DQ, a leftward swipe of user input 603 is detected on touch sensitive surface 451 moving cursor 630 to the position of color 646-3. In some embodiments, color 646-3 is lighter than color 646-4. In some embodiments, in response to cursor 630 overlaying color 646-3, cursor 630 is updated to be lighter than when cursor 630 was overlaying color 646-4 (optionally lighter than when cursor 630 was overlaying color 646-6 and/or optionally the same color as shown in FIG. 6DC). In FIG. 6DR, a leftward swipe of user input 603 is detected on touch sensitive surface 451 moving cursor 630 to the position of color 646-2. In some embodiments, color 646-2 is lighter than color 646-3. In some embodiments, in response to cursor 630 overlaying color 646-2, cursor 630 is updated to be lighter than when cursor 630 was overlaying color 646-3 (optionally lighter than when cursor 630 was overlaying color 646-6 and/or optionally the same color as shown in FIG. 6DB). In FIG. 6DS, a leftward swipe of user input 603 is detected on touch sensitive surface 451 moving cursor 630 to the position of color 646-1. In some embodiments, color 646-1 is lighter than color 646-2. In some embodiments, in response to cursor 630 overlaying color 646-1, cursor 630 is updated to be lighter than when cursor 630 was overlaying color 646-2 (optionally lighter than when cursor 630 was overlaying color 646-6 and/or optionally the same color as shown in FIG. 6DA).

FIGS. 6DT-6DW illustrate embodiments in which cursor 630 changes color when the content below the cursor changes color (e.g., when the cursor is stationary or when the cursor does not otherwise move to a location in the user interface having a different color). In FIG. 6DT, device 500 is displaying user interface 608 corresponding to a media player application. In some embodiments, the media player application is displaying a content item, such as a sunset scene, as shown in FIG. 6DT. In FIG. 6DT, cursor 630 is displayed over a part of the user interface in "dark" mode (e.g., is consistently darker than the content overlaid by the cursor) and has a first color based on the color of the user interface over which the cursor is overlaid. In some embodiments, cursor 630 remains displayed in the user interface 608 because contact 603 is maintained on touch sensitive surface 451.

In FIG. 6DU, playback of the content item continues and the part of the user interface over which cursor 630 is overlaid has become darker than in FIG. 6DT. Thus, in response to the part of the user interface over which cursor 630 is overlaid becoming darker than in FIG. 6DT, cursor 630 is updated to be darker than the color of cursor 630 in FIG. 6DT and remaining darker than the color of the part of the user interface over which cursor 630 is overlaid (e.g., remaining in dark mode). In FIG. 6DV, playback of the content item continues, and the part of the user interface over which cursor 630 is overlaid has become darker than in FIG. 6DU. Thus, in response to the part of the user interface over which cursor 630 is overlaid becoming darker than in FIG. 6DU, cursor 630 is updated to be darker than the color of cursor 630 in FIG. 6DU and remaining darker than the color of the part of the user interface over which cursor 630 is overlaid (e.g., remaining in dark mode).

In FIG. 6DW, playback of the content item continues and the part of the user interface over which cursor 630 is overlaid has become darker than in FIG. 6DV. In some embodiments, the part of the user interface over which cursor 630 is overlaid is darker than a threshold luminance (e.g., 30% luminance, 40% luminance, 50% luminance, 60% luminance, etc.). In response to the part of the user interface over which cursor 630 is overlaid becoming darker than a threshold luminance, cursor 630 is changed from "dark" mode to "light" mode. Thus, in some embodiments, cursor 630 is updated to be lighter than the color of cursor 630 in FIG. 6DV and becoming lighter than the color of the part of the user interface over which cursor 630 is overlaid. Thus, in some embodiments, cursor 630 exhibits the same behavior in FIGS. 6DT-6DW in changing color and/or luminance as shown in FIGS. 6DD-6DG. In some embodiments, cursor 630 exhibits the same behavior in changing color and/or luminance as shown in FIGS. 6DA-6DS (optionally including the offset threshold illustrated by FIG. 6DG and FIG. 6DO). As shown above, cursor 630 changes color (e.g., darkness, luminance, color, hue, saturation, etc.) based on the color of the content over which the cursor is overlaid, optionally when the user interface does not change color and the cursor moves from one location with one color to another location with a different color, and in some embodiments even when the cursor is stationary and the user interface changes from one color to a different color.

FIGS. 7A-7M are flow diagrams illustrating a method 700 in which a cursor interacts with user interface objects. The method 700 is optionally performed at an electronic device such as device 100, device 300, device 500, device 501, device 510, and device 591 as described above with reference to FIGS. 1A-1B, 2-3, 4A-4B and 5A-5I. Some operations in method 700 are, optionally combined and/or order of some operations is, optionally, changed.

As described below, the method 700 provides ways in which a cursor interacts with user interface objects. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display generation component and one or more input devices, including a touch-sensitive surface (e.g., a mobile device (e.g., a tablet, a smartphone, a media player, or a wearable device), or a computer, optionally in communication with one or more of a (e.g., external) mouse, (e.g., external) trackpad, and/or (e.g., external) touchpad, etc.) concurrently displays (702), such as in FIG. 6E, via the display generation component: a cursor located at a first location in a user interface (704), such as cursor 630 in FIG. 6E (e.g., a pointer that indicates the current position of interest); and a first user interface object located at a second location in the user interface (706), such as button 620-1 in FIG. 6E (e.g., text entry field, a button, a selectable icon, a link, a scroll bar, a home affordance, a calendar event in a calendar application, a news article object in a news application, or any a other highlight-able (e.g., an element that is able to have the current focus in the user interface) or selectable object or element, etc.).

In some embodiments, the display generation component is a display integrated with the electronic device (optionally a touch screen display) and/or an external display such as a monitor, projector, television, etc. For example, a mouse cursor that indicates that selection inputs optionally cause selection of the object in the user interface at the location of the mouse cursor. In some embodiments, the second location is different from the first location. For example, the cursor is at a location in the user interface that is different from the location of the first user interface object.

In some embodiments, while displaying the user interface with the first user interface object located at the second location and the cursor located at the first location, the device receives (708), via the one or more input devices, a first input corresponding to a request to move the cursor away from the first location (e.g., the current cursor location) in the user interface to a location of the first user interface object, such as rightward swipe of user input 603 in FIG. 6H (e.g., an input for moving the cursor). For example, a movement of a mouse in communication with the electronic device, a contact and movement (while maintaining contact) detected on a touchpad in communication with the electronic device, etc. In some embodiments, the input is not an input detected via a touch-sensitive display of the electronic device.

In some embodiments, in response to receiving the first input, the device moves (710) the cursor in accordance with (e.g. in accordance with a path of) the first input from the first location toward the second location in the user interface and selecting the first user interface object for input, such as button 620-1 in FIG. 6H (e.g., in response to the cursor movement input, moving the cursor according to the vector of the movement input (e.g., magnitude and/or direction)).

For example, if the input is a contact and movement on a touchpad, the cursor moves according to the movement component of the input (e.g., magnitude and/or direction). In some embodiments, the first user interface object is selected when and/or in response to the cursor moving to the location of the first user interface object. In some embodiments, selecting the first user interface object for input includes visually adapting the cursor to the first user interface object as described herein with respect to method 700 and/or method 800. In some embodiments, the cursor visually appears as if it is a single unit with the first user interface object. In some embodiments, the cursor visually appears as if it is highlighting the first user interface object. In some embodiments, selecting the first user interface object includes highlighting the first user interface object or otherwise causing the first user interface object to have focus. In some embodiments, while the first user interface object is selected for input, certain inputs, such as selection inputs, are directed to the first user interface object. For example, while the first user interface object is selected for input, an "enter" key input from a keyboard causes the first user interface object to be activated.

In some embodiments, while the first user interface object is selected for input, the device receives (712), via the one or more input devices, a second input, such as selection of the "tab" key on keyboard 593 in FIG. 6Q (e.g., an input received from the same input device as the first input). In some embodiments, the input is received from a different input device as the first input.

In some embodiments, in response to receiving the second input, in accordance with a determination that the second input corresponds to a request to select a next object without regard to a magnitude and/or a direction of the second input (e.g., a user input for selecting an object different from the first user interface object), the device selects (714) a second user interface object in the user interface for input, wherein the second user interface object is located at a third location in the user interface, such as button 620-3 in FIG. 6R (e.g., highlighting the second user interface object or otherwise causing the second user interface object to have focus).

In some embodiments, the request to select the next object without regard to a magnitude and/or direction of the second input is not a mouse movement or swipe input on a touch sensitive surface for moving the cursor. For example, a "tab" input from a keyboard device is optionally a request to select the next object (e.g., move focus from the first user interface object to the next object). In some embodiments, the second input is a voice input requesting to select the next object. In some embodiments, the second input is a discrete gesture that programmatically corresponds to a request to select the next object, such as a three-finger swipe or a four-finger swipe, or a swipe of a specific pattern. In some embodiments, a tap input on a touch screen at a location of another object is a request to select the other object. In some embodiments, the second input is a keyboard input entering text into a text entry field, a keyboard input moving focus to the second user interface object, such as a tab input, a directional input, enter input, backspace input, any other suitable navigational input, etc. In some embodiments, the second input is not an input for moving the cursor (e.g., one in which the cursor is moved based on a movement metric (e.g., magnitude and/or direction) of the input optionally without regard to user interface objects on the user interface). In some embodiments, the second input is not a movement of a mouse or a contact and movement (while maintaining contact) detected on a touchpad in communication with the electronic device.

In some embodiments, the second user interface object is the next object with respect to the first user interface object. In some embodiments, when the second user interface object receives a focus, the first user interface object loses focus (e.g., focus is moved from the first user interface object to the second user interface object. In some embodiments, the cursor is not displayed moving from the first user interface object to the second user interface object). In some embodiments, in accordance with a determination that the second input corresponds to interaction with the first user interface object (e.g., a tap input, double-click input on the first user interface object, an "enter" or input while the first user interface object is selected, or otherwise an activation input on the first user interface object), performing an operation associated with the first user interface object (e.g., performing an activation operation associated with the first user interface object and/or inserting content at a location of the first user interface object). In some embodiments, in accordance with a determination that the second input corresponds to a request to move the cursor, moving the cursor in accordance with (e.g., in accordance with a path of) the second input starting from the second location.

In some embodiments, while the second user interface object is selected for input, the device receives (716), via the one or more input devices, a third input, such as downward swipe of user input 603 in FIG. 6T (e.g., an input received from the same input device as the first input). In some embodiments, the input is received from a different input device as the first input.

In some embodiments, in response to receiving the third input, in accordance with a determination that the third input corresponds to a request to move the cursor (e.g., a movement of a mouse in communication with the electronic device, a contact and movement (while maintaining contact) detected on a touchpad in communication with the electronic device, etc.), the device moves (718) the cursor in accordance with (e.g. in accordance with a path of) the third input starting from the third location, such as the downward movement of cursor 630 from the location of button 620-3 in FIG. 6T (e.g., moving the cursor from the location of the second user interface object to a location determined by the movement input).

In some embodiments, the input is not an input detected via a touch-sensitive display of the electronic device. Thus, in some embodiments, the position of the cursor is reset/set to the position of the second user interface object when or in response to an input, such as those described above, requesting to select a next object. In some embodiments, the user input requesting to select a next object causes the cursor to move to the location of the second user interface object without otherwise requiring a cursor movement input (e.g., trackpad swipe input, mouse movement, etc.) for doing so. In some embodiments, the location of the cursor begins from the user interface object that has the focus or is otherwise highlighted. In some embodiments, when the cursor is moved away from the location of the second user interface object, the second user interface object is ceased to be selected for input). In some embodiments, in accordance with a determination that the third input corresponds to interaction with the second user interface object, performing an operation associated with the second user interface object (e.g., performing an activation operation associated with the second user interface object and/or inserting content at a location of the second user interface object.

The above-described manner of setting the location of the cursor to the user interface object that last received an input selecting it (e.g., by causing the cursor to begin moving from the location of the second user interface object in response to cursor movement inputs after receiving a request selecting the second user interface object) provides a quick and efficient manner of positioning the cursor at the user's most recent location of interest (e.g., by moving the starting position of the cursor to the location of the second user interface object), which simplifies the interaction between the user and the electronic device and enhances the operability of the electronic device and makes the user-device interface more efficient (e.g., by automatically determining that the user's attention has shifted from the previous location of the cursor to another location in the user interface and beginning cursor movements from the new location of interest indicated by the user's actions, without requiring the user to find the location of the cursor after having performed non-cursor-movement inputs), which additionally reduces power usage and improves battery life of the electronic device by enabling the user to use the electronic device more quickly and efficiently while reducing errors in the usage of the device.

In some embodiments, after receiving the first input and before receiving the third input, no cursor movement input corresponding to a request to move the cursor from the second location to the third location is received (720), such as illustrated in FIGS. 6Q-6T (e.g., the cursor moves starting from the third location in response to the third input without receiving an explicit cursor movement input (with magnitude and/or direction components such as a mouse movement or a swipe gesture on a touch pad) moving the cursor to the third location). For example, the second input moves the cursor from the second location to the third location. In some embodiments, selecting a respective user interface object for input moves the cursor to the location of the respective user interface object.

The above-described manner of setting the location of the cursor to the user interface object that last received an input selecting it (e.g., and, thus, causing the cursor to begin moving from the location of the second user interface object in response to cursor movement inputs without receiving a cursor movement input) provides a quick and efficient manner of positioning the cursor at the user's most recent location of interest, which simplifies the interaction between the user and the electronic device and enhances the operability of the electronic device and makes the user-device interface more efficient (e.g., by moving the cursor based on the user's indications of interest and/or inputs requesting respective user interface objects to be selected without requiring the user to perform explicit cursor movement inputs), which additionally reduces power usage and improves battery life of the electronic device by enabling the user to use the electronic device more quickly and efficiently while reducing errors in the usage of the device.

In some embodiments, selecting a respective user interface object for input (722), such as in FIG. 6H, includes: in accordance with a determination that the cursor is within a threshold distance of the respective user interface object (724), such as in FIG. 6H and FIG. 6I (e.g., within 1 mm, 2 mm, 5 mm, 1 cm, 1.5 cm, etc. of the respective user interface object): changing an appearance of the cursor based on the respective user interface object (726), such as in FIG. 6H (e.g., changing one or more of size, shape, color, and transparency of the cursor based on the size and/or shape of the respective user interface object, the type of respective user interface object, the selectability, interactability and/or other properties of the respective user interface object, as will be described with more detail below with respect to method 800) and causing the respective user interface object to have a current focus (728), such as in FIG. 6H (e.g., the current focus of the device is moved to the respective user interface object).

In some embodiments, changing an appearance of the cursor includes changing the shape of the cursor to match the shape of the respective user interface object. In some embodiments, changing an appearance of the cursor includes changing the size of the cursor to the same size of the respective user interface object or slightly larger than the respective user interface object to appear as a halo around and/or behind the respective user interface object. In some embodiments, the resulting appearance of the cursor appears as if the respective user interface object is highlighted for selection. In some embodiments, changing an appearance of the cursor includes changing the color of the respective user interface object, such as changing the luminance value of the cursor (e.g., causing the cursor to become darker or lighter than the default color of the cursor). In some embodiments, changing the appearance includes displaying an animation of the cursor morphing from its default size and shape to the size and shape based on the respective user interface object. In some embodiments, when a respective user interface object has a focus, certain inputs are directed to the respective user interface object. For example, when a respective user interface object has a focus, an "enter" key selection on a keyboard causes the respective user interface object to be actuated. In some embodiments, at most, only one object in the user interface has a current focus at any time. In some embodiments, at most, only one object in the user interface is selected for input at any time.

The above-described manner of selecting a user interface object for input (e.g., by changing the appearance of the cursor when the cursor is within a threshold distance and causing the user interface object to have a current focus) provides a quick and efficient manner of visually indicating that the user interface object has been selected for input, which simplifies the interaction between the user and the electronic device and enhances the operability of the electronic device and makes the user-device interface more efficient (e.g., by using the cursor's appearance itself to indicate that the user interface object has been selected for input, without separately highlighting the user interface object and maintaining the default size and/or shape of the cursor, and reducing mistaken inputs by reducing user confusion over how the device will respond to user inputs), which additionally reduces power usage and improves battery life of the electronic device by enabling the user to use the electronic device more quickly and efficiently while reducing errors in the usage of the device.

In some embodiments, selecting a respective user interface object for input includes modifying one or more of a size or a location of the respective user interface object (730), such as event 642-1 appearing larger and/or slightly shifted in FIG. 6CW (e.g., bringing the object up in the z plane, which would appear as a slight increase in size and/or a slight shift in location). In some embodiments, modifying the size and/or location of the respective user interface object causes the respective user interface object to become visually emphasized or otherwise indicate to the user that the respective user interface object has been selected for input and has a current focus. In some embodiments, certain parts of the respective user interface object shift in size and/or location while other parts of the respective user interface object remain unchanged or shift in a different way. For example, the background of the respective user interface object (if any) optionally remains unchanged while text, symbols, and/or icons of the respective user interface object optionally shifts.

The above-described manner of selecting the respective user interface object for input (e.g., by modifying the size and/or location of the respective user interface object) provides a quick and efficient manner of visually indicating that the user interface object has been selected for input, which simplifies the interaction between the user and the electronic device and enhances the operability of the electronic device and makes the user-device interface more efficient (e.g., by modifying the respective user interface object's appearance to indicate that the user interface object has been selected for input without separately highlighting the user interface object or requiring the user to perform user inputs to verify that the respective user interface is selected for input or otherwise actuate incorrect objects), which additionally reduces power usage and improves battery life of the electronic device by enabling the user to use the electronic device more quickly and efficiently while reducing errors in the usage of the device.

In some embodiments, while the respective user interface object is selected for input, the device receives (732) a fourth input, via the one or more input devices, corresponding to a request to move the cursor, such as in FIG. 6M (e.g., an input for moving the cursor from the location of the respective user interface object while the respective user interface object is selected for input) and in response to receiving the fourth input and while receiving the fourth input, in accordance with a determination that a movement of the fourth input is below a threshold movement (e.g., for moving the cursor by less than 0.25 mm, 0.5 mm, 1 mm, 2 mm, 4 mm, 6 mm, 10 mm, etc.), the device changes (734) an appearance of the respective user interface object in accordance with the movement of the fourth input while maintaining the respective user interface object as being selected for input, such as cursor 630 and button 620-1 shifting rightwards in FIG. 6M (e.g., shifting the respective user interface object (the content of the respective user interface object) in the direction of the cursor movement).

For example, a movement of a mouse in communication with the electronic device, a contact and movement (while maintaining contact) detected on a touchpad in communication with the electronic device, etc. In some embodiments, the input is not an input detected via a touch-sensitive display of the electronic device. In some embodiments, the cursor moves in accordance with the movement of the fourth input while maintaining its size and/or shape based on the respective user interface object. For example, the respective user interface object moves concurrently with the movement of the cursor (e.g., follow the cursor). In some embodiments, the respective user interface object continues to have a current focus while it is moved while maintaining being selected for input. Thus, the user is able to perform slight movement inputs without the respective user interface object losing its focus, but while providing visual feedback to the user of the user's movement inputs. In some embodiments, when the movement of the fourth input increases beyond the threshold movement, the respective user interface object moves back to its original position (e.g., snaps back or displays an animation gradually moving the object back to its original position). In some embodiments, when the respective user interface object moves back to its original position, the size and/or shape of the cursor returns to the size and/or shape that it had at its original position (e.g., default size and/or default shape) and is optionally visually separated from the respective user interface object. In some embodiments, when the respective user interface object moves back to its original position and/or the size and/or shape of the cursor returns to the size and/or shape that it had at its original position and is optionally visually separated from the respective user interface object, the respective user interface object is no longer selected for input and does not have a current focus (optionally another user interface element becomes selected for input and/or receives a current focus, or no element is selected for input and/or receives a current focus). In some embodiments, the threshold distance at which the respective user interface object snaps back to its original position and the cursor "snaps out" of the respective user interface object is the threshold within which the cursor causes the respective user interface object to be selected for input (e.g., within 1 mm, 2 mm, 5 mm, 1 cm, 1.5 cm, etc. of the respective user interface object). For example, if the cursor selects the respective user interface object for input when the cursor is 2 mm away (or 1 mm away, 5 mm away, 1 cm away, 1.5 cm away, etc. as described above) from the respective user interface object, then when the user moves the cursor to a position just more than 2 mm away (e.g., the same threshold distance) from the respective user interface object, the cursor snaps out of the respective user interface object and the respective user interface object is no longer selected. In some embodiments, the threshold distance beyond which the cursor snaps out of the respective user interface object is more than the threshold distance within which the respective user interface becomes selected for input (e.g., the thresholds have a hysteresis to prevent the cursor from rapidly flickering between default size and shape and the size and shape based on the respective user interface object when the cursor is at or near the threshold distance).

The above-described manner of maintaining selection of a user interface object for input (e.g., by changing the appearance of the object in accordance with a movement input while maintaining the object as selected for input if the movement input is less than a threshold movement) provides a quick and efficient manner of providing visual feedback that the user is moving the cursor without causing the user interface object to lose focus, which simplifies the interaction between the user and the electronic device and enhances the operability of the electronic device and makes the user-device interface more efficient (e.g., by providing a certain amount of tolerance to small movements while providing the user an indication of control over the cursor without requiring the user to perform additional inputs or large inputs to find and/or verify the location of the cursor followed by additional inputs to return the current focus to the respective user interface object), which additionally reduces power usage and improves battery life of the electronic device by enabling the user to use the electronic device more quickly and efficiently while reducing errors in the usage of the device.

In some embodiments, while the respective user interface object is selected for input and after changing the appearance of the respective user interface object in accordance with the movement of the fourth input (e.g., shifting the respective user interface object (the content of the respective user interface object) in the direction of the cursor movement), the device detects (736) a termination of the fourth input, such as in FIG. 6J (e.g., a lift-off of a contact with an external touch-sensitive surface on which the fourth input was detected, or a release of a click on a mouse from which the fourth input was provided), and in response to detecting the termination of the fourth input, the device reverts (738) the appearance of the respective user interface object to a predefined selected appearance, such as cursor 630 snapping to the center of button 620-1 when button 620-1 is selected for input but cursor 630-2 is not centered on button 620-1 when the input is terminated in FIGS. 6I-6J (e.g., moving the respective user interface object back to a predefined position after having moved the object in accordance with the movement of the fourth input that is below the threshold movement).

In some embodiments, the predefined position is the default position of the cursor. In some embodiments, the predefined position is the position of the cursor before the user input was received. In some embodiments, the predefined position is centered on the location of the respective user interface object. In some embodiments, the location of the cursor is reverted to the location of the respective user interface object (optionally the center of the respective user interface object). In some embodiments, if the movement of the fourth input is above the threshold movement, then the termination of the fourth input does not cause the reverting of the appearance of the respective user interface object.

The above-described manner of reverting the appearance of the respective user interface object (e.g., upon termination of the fourth input after changing the appearance of the respective user interface object in accordance with the movement of the input) provides a quick and efficient manner of indicating reversion of the cursor location to the user, which simplifies the interaction between the user and the electronic device and enhances the operability of the electronic device and makes the user-device interface more efficient (e.g., by providing the user with a method of undoing the cursor movement input without requiring the user to perform additional inputs to move the respective user interface object and/or cursor back to its default position or re-select the respective user interface object for input), which additionally reduces power usage and improves battery life of the electronic device by enabling the user to use the electronic device more quickly and efficiently while reducing errors in the usage of the device.

In some embodiments, while the cursor is located at a fourth location in the user interface, the device receives (740), via the one or more input devices, a sequence of inputs including a fourth input corresponding to a request to insert text at a fifth location in the user interface (e.g., while the cursor is at a location different from the location at which the user is requesting to insert text) followed by a fifth input corresponding to a request to move the cursor (e.g., an input for moving the cursor), wherein the sequence of inputs does not include an input for moving the cursor to the fifth location based on a magnitude and/or direction of the input, such as in FIG. 6AG (e.g., the fifth input is received after the fourth input without an intervening cursor movement input moving the cursor to the fifth location based on a movement/magnitude of an input (e.g., mouse movement, swipe on touchpad, etc.)).

In some embodiments, in response to receiving the sequence of inputs (742), such as in FIG. 6AH: the device inserts (744) the text at the fifth location in the user interface, such as in FIG. 6AH (e.g., inserting text at the location of the text insertion cursor at the fifth location in accordance with the fourth input) and moves (746) the cursor in accordance with the fifth input starting from the fifth location, such as illustrated by FIG. 6AI (e.g., moving the cursor from the location of the text insertion (as opposed to the fourth location) to a location determined by the fifth input).

For example, a text insertion region is at the fifth location. In some embodiments, the request to insert text at the fifth location includes key selections on a keyboard (e.g., a virtual keyboard or a physical keyboard). In some embodiments, the request to insert text is received when a text insertion cursor (e.g., text cursor, insertion point, underscore, vertical line, etc.) is at the fifth location and the text is inserted at the position of the text insertion cursor. For example, a movement of a mouse in communication with the electronic device, a contact and movement (while maintaining contact) detected on a touchpad in communication with the electronic device, etc. In some embodiments, the input is not an input detected via a touch-sensitive display of the electronic device. Thus, in some embodiments, the position of the cursor is reset/set from the fourth location to the fifth position (the position where text was inserted). In some embodiments, when text is inserted at the fifth location, the cursor is hidden from display. In some embodiments, when the cursor is moved from the fifth location, the cursor is re-displayed in the user interface.

The above-described manner of setting the location of the cursor to the location where text was inserted in response to a user input (e.g., by causing the cursor to begin moving from the location of the text insertion in response to cursor movement inputs after receiving a request to insert text) provides a quick and efficient manner of positioning the cursor at the user's most recent location of interest (e.g., by moving the starting position of the cursor to the location of where text is inserted), which simplifies the interaction between the user and the electronic device and enhances the operability of the electronic device and makes the user-device interface more efficient (e.g., by automatically determining that the user's attention has shifted from the previous location of the cursor to the text insertion location and beginning cursor movements from the new location of interest indicated by the user's actions, without requiring the user to find the location of the cursor after having inserted text into the user interface), which additionally reduces power usage and improves battery life of the electronic device by enabling the user to use the electronic device more quickly and efficiently while reducing errors in the usage of the device.

In some embodiments, the second input is a key selection input received on a keyboard device of the one or more input devices (748), such as in FIG. 6Q (e.g., a "tab" key input, a directional key input, a combination of multiple keys, etc.). In some embodiments, in response to receiving the second input, in accordance with the determination that the second input corresponds to the request to select the next object without regard to the magnitude and/or the direction of the second input, the device moves (750) the cursor to the third location, such as in FIG. 6R (e.g., moving the cursor to the location of the object that is selected for input in response to the second input). In some embodiments, the appearance of the cursor changes based on the object that is selected for input.

The above-described manner of setting the location of the cursor (e.g., to the location of the second user interface object in response to a request to select a next object received from a keyboard device) provides a quick and efficient manner of selecting user interface objects (e.g., by accepting keyboard inputs to select the next object for input), which simplifies the interaction between the user and the electronic device and enhances the operability of the electronic device and makes the user-device interface more efficient (e.g., by providing additional methods for selecting objects for input other than a cursor movement input without requiring the user to switch input devices to move the cursor), which additionally reduces power usage and improves battery life of the electronic device by enabling the user to use the electronic device more quickly and efficiently while reducing errors in the usage of the device.

In some embodiments, while a respective user interface object is selected for input, the device receives (752) a fourth input, via an external keyboard device, such as in FIG. 6P (e.g., an enter key input, a shift key and concurrent enter key input, a space bar key input, etc.) and in response to receiving the fourth input, in accordance with a determination that the fourth input includes a selection of a respective key, the device performs (754) a function associated with the respective user interface object, such as in FIG. 6P (e.g., actuating the respective user interface object and performing the function associated with actuating the respective user interface object). For example, if the respective user interface object is a button for sharing content, the fourth input optionally initiates a process to share the content, or if the respective user interface object is an application icon, the fourth input optionally displays (e.g., launches) the corresponding application.

The above-described manner of actuating a user interface object (e.g., via a selection input on an external keyboard device) provides an alternative and quick method of actuating user interface objects (e.g., by accepting keyboard inputs to actuate a user interface object in addition to a selection input from an external touch pad and/or or touch screen), which simplifies the interaction between the user and the electronic device and enhances the operability of the electronic device and makes the user-device interface more efficient (e.g., by providing another method for actuating objects for input other than a cursor movement input), which additionally reduces power usage and improves battery life of the electronic device by enabling the user to use the electronic device more quickly and efficiently while reducing errors in the usage of the device.

In some embodiments, the first user interface object is a user interface object of a first application (756) (e.g., the first user interface object is an element on a first application of a plurality of applications that are currently active and displayed), and the second user interface object is a user interface object of a second application, such as in FIG. 6BM, wherein the second application and the first application are concurrently displayed in the user interface (758), such as in FIG. 6BM (e.g., the second user interface object is an element displayed by a second application of the plurality of applications that are currently active and displayed).

In some embodiments, the second application is displayed concurrently with the first application (e.g., above, below, left of, or right of). In some embodiments, both the first and second applications are concurrently displayed in the user interface in a multi-tasking or multi-application mode. Thus, in some embodiments, in response to a user input to select the next object, the focus moves from an object displayed by a first application to an object displayed by a second application. In some embodiments, the focus moves to the next application when the focus reaches the last focus-able object on the user interface of the first application (e.g., the first application is scrolled until reaching an end of the user interface of the first application, at which point the focus moves to the second application). In some embodiments, the focus moves to the next application when the focus reaches the last focus-able object that is currently displayed by the first application in the user interface (e.g., the first application is not scrolled, and the focus switches to the second application before reaching the end of the user interface of the first application). In some embodiments, if the device is not in multi-application mode and only one application is active and displayed in the user interface, focus does not move to another application. In some embodiments, the "next" application is the application that is displayed to the right or below the current application.

The above-described manner of moving the current focus (e.g., from one application to another) provides a quick and efficient manner of cycling through a plurality of available selectable user interface objects in the user interface (e.g., by moving the current focus to another application optionally after reaching the last selectable object in the first application), which simplifies the interaction between the user and the electronic device and enhances the operability of the electronic device and makes the user-device interface more efficient (e.g., by automatically moving the focus from one application to the next without requiring that the user perform additional inputs to move the focus to the next application), which additionally reduces power usage and improves battery life of the electronic device by enabling the user to use the electronic device more quickly and efficiently while reducing errors in the usage of the device.

In some embodiments, the user interface is a calendar user interface (760), such as in FIG. 6CS (e.g., a user interface for a calendar application. In some embodiments, the calendar user interface is a user interface for viewing a calendar optionally including the ability to view, edit, and/or add events to a user's calendar).

In some embodiments, the device receives (762), via the one or more input devices, a fourth input corresponding to a request to move the cursor, such as in FIG. 6CT (e.g., an input for moving the cursor. For example, a movement of a mouse in communication with the electronic device, a contact and movement (while maintaining contact) detected on a touchpad in communication with the electronic device, etc. In some embodiments, the input is not an input detected via a touch-sensitive display of the electronic device), and in response to receiving the fourth input (764), such as in FIG. 6CT: in accordance with a determination that the fourth input corresponds to a request to move the cursor across one or more predetermined times in the calendar user interface (e.g., moving the cursor along the calendar user interface at locations that correspond to different times of day in the calendar), the device moves (766) the cursor across the one or more predetermined times, wherein moving the cursor across the one or more predetermined times includes aligning the cursor with, and selecting for input, respective predetermined times of the one or more predetermined times as the cursor moves across the respective predetermined times, such as in FIGS. 6CT-6CV (e.g., moving the cursor along and selecting respective predetermined increments of time).

In some embodiments, the cursor snaps between the increments of time (e.g., jumps between the increments without displaying the cursor at locations between respective increments of time). In some embodiments, the predetermined times (e.g., increments of time) are at every 5 minutes, 10 minutes, 15 minutes, 30 minutes, 60 minutes, etc. in a day. In some embodiments, performing a selection input while a respective increment of time is selected for input (e.g., has a focus), causes an event to be added at the selected time (e.g., for a predetermined duration, such as 15 or 30 minutes) and/or increment. In some embodiments, while the cursor is moving in the calendar user interface across the one or more predetermined times, the cursor is displayed as a horizontal line (representing a particular time) across the width of a respective column representing a respective day in the calendar.

The above-described manner of moving the cursor in a calendar user interface (e.g., aligning the cursor to predetermined times in the calendar user interface) provides a quick and efficient manner of interacting with the calendar user interface (e.g., by automatically aligning the cursor with locations corresponding to time increments that are most likely to be used), which simplifies the interaction between the user and the electronic device and enhances the operability of the electronic device and makes the user-device interface more efficient (e.g., without requiring the user to manually align the cursor to the intended time position), which additionally reduces power usage and improves battery life of the electronic device by enabling the user to use the electronic device more quickly and efficiently while reducing errors in the usage of the device.

In some embodiments, while the cursor is aligned with a respective predetermined time and the respective predetermined time is selected for input, the device receives (768), such as in FIG. 6CW, via the one or more input devices, a fifth input corresponding to a request to move the cursor to a representation of an event in the calendar user interface (e.g., the calendar user interface includes a representation of an event), and in response to receiving the fifth input, the device aligns (770) the cursor with the representation of the event, and selecting the representation of the event for input, such as in FIG. 6CW (e.g., the representation of the event receives a focus).

In some embodiments, the representation of the event is selectable or otherwise interactable to view more information about the event or perform actions with respect to the event. In some embodiments, a representation of an event in the calendar user interface is displayed as a rectangular block of time (e.g., displayed as having a duration of time) corresponding to the duration of the event. In some embodiments, the appearance of the cursor changes based on the representation of the event as described below with respect to method 800. In some embodiments, when the representation of the event is selected for input, the cursor has a size and shape based on the block of time corresponding to the event, such as a rectangular shape (e.g., as opposed to a horizontal line representing to a particular interval of time).

The above-described manner of selecting a calendar event (e.g., by selecting the calendar event when the cursor is moved to the location of the calendar event) provides a quick and efficient manner of interacting with calendar events (e.g., by automatically selecting a calendar event for input in response to the cursor moving to the representation of the event), which simplifies the interaction between the user and the electronic device and enhances the operability of the electronic device and makes the user-device interface more efficient (e.g., without requiring the user to perform additional inputs or use a selection mechanism to interact with the calendar event), which additionally reduces power usage and improves battery life of the electronic device by enabling the user to use the electronic device more quickly and efficiently while reducing errors in the usage of the device.

In some embodiments, while displaying a text entry region in the user interface, including a first row of text and a second row of text (e.g., the text entry region supports and includes multiple lines of text), and while the cursor is located at the first row of text, the device receives (776) a fourth input corresponding to a request to move the cursor, such as in FIG. 6Z (e.g., an input for moving the cursor).

In some embodiments, in response to (receiving) the fourth input (774), such as in FIG. 6Z: in accordance with a determination that the fourth input corresponds to a request to move the cursor within the first row of text, the device moves (776) the cursor within the first row of text in accordance with the fourth input, such as in FIG. 6Z (e.g., movement of the cursor within a row of text moves smoothly in accordance with the movement of the fourth input and/or as the movement is detected) and in accordance with a determination that the fourth input corresponds to a request to move the cursor from the first row of text to the second row of text, the device aligns (778) the cursor with the second row of text, such as in FIG. 6AA (e.g., movement of a cursor between two rows of text snaps the cursor to the rows of text).

For example, a movement of a mouse in communication with the electronic device, a contact and movement (while maintaining contact) detected on a touchpad in communication with the electronic device, etc. In some embodiments, the input is not an input detected via a touch-sensitive display of the electronic device. For example, the cursor moves away from the first row of text towards the second row of text and at some threshold position, the cursor snaps to the second row of text. In some embodiments, as the cursor moves away from the first row of text towards the second row of text, the cursor appears to resist the movement (e.g., the amount of movement of the cursor for a given amount of movement of the input is less than when the cursor is ordinarily moving around in the user interface, such as movement within the first row of text). Thus, in some embodiments, the speed of the cursor movement relative to the movement of the fourth input changes while the cursor moves along the path from the first and second rows of text (e.g., slower relative to the input, then faster relative to the input), but optionally does not change while the cursor moves within a given line of text. In some embodiments, if the user input is terminated before reaching the threshold position, the cursor re-aligns to the first row of text. In some embodiments, the cursor remains at the cursor location it had when the user input was terminated. In some embodiments, the threshold position at which the cursor snaps to the next row of text is halfway between the first and second rows, a third of the way to the second row, a fourth of the way to the second row, two thirds of the way to the second row, three quarters of the way to the second row, etc.

The above-described manner of moving the cursor within rows of text in a text entry region (e.g., by moving the cursor smoothly along a row of text, but snapping the cursor between rows of text) provides a quick and efficient manner of maintaining the cursor's alignment with the text (e.g., by automatically aligning the cursor with rows of text when the cursor moves between rows of text), which simplifies the interaction between the user and the electronic device and enhances the operability of the electronic device and makes the user-device interface more efficient (e.g., by ensuring that the cursor is always at a location in which a selection input selects a valid position in the text entry region without requiring the user to manually align the cursor to valid positions), which additionally reduces power usage and improves battery life of the electronic device by enabling the user to use the electronic device more quickly and efficiently while reducing errors in the usage of the device.

In some embodiments, while the cursor is displayed at a given location in the user interface, the device receives (780), via the one or more input devices, a fourth input corresponding to a request to scroll a content of the user interface, such as in FIG. 6AD (e.g., a gesture on a touch-sensitive surface (e.g., external from the electronic device) for scrolling in the user interface, such as a two-finger swipe, a swipe on a touch-sensitive display, a navigation input on a keyboard device such as a page-down or page-up key press, etc.).

In some embodiments, in response to receiving the fourth input (782), such as in FIG. 6AD: the device scrolls (784) the content of the user interface in accordance with the fourth input, while maintaining the cursor at the given location in the user interface, such as in FIG. 6AD (e.g., scrolling the content in the user interface without moving the cursor in accordance with the scrolling input).

In some embodiments, a request to scroll a content of the user interface does not include a selection of a scroll bar with the cursor and subsequent movement input while selecting the scroll bar. For example, the cursor is maintained at the same position in the user interface despite the content in the user interface moving. In some embodiments, scrolling the content causes the cursor to not be displayed, while in other embodiments, scrolling the content occurs while the cursor remains displayed, as described below with respect to method 800.

The above-described manner of positioning the cursor (e.g., by maintaining the cursor position when the content in a user interface is scrolled in response to an input requesting scrolling of content) provides a quick and efficient manner of maintaining the cursor's position (e.g., by maintaining the cursor at a position most likely expected by the user), which simplifies the interaction between the user and the electronic device and enhances the operability of the electronic device and makes the user-device interface more efficient (e.g., without requiring the user to perform additional inputs to locate the cursor after scrolling the content in the user interface), which additionally reduces power usage and improves battery life of the electronic device by enabling the user to use the electronic device more quickly and efficiently while reducing errors in the usage of the device.

In some embodiments, a first respective user interface object was selected for input by the cursor when the fourth input was received (786), such as in FIG. 6BR (e.g., the first respective user interface object had a current focus at the time that the scrolling input was received).

In some embodiments, in response to receiving the fourth input (788), such as in FIG. 6BS: in accordance with a determination that the scrolling of the content of the user interface causes the first respective user interface object to move away from the cursor, the device ceases (790) selection of the first respective user interface object for input, such as in FIG. 6BS (e.g., the user interface object that had a focus is scrolled in accordance with the fourth input (e.g., along with the content of the user interface)). In some embodiments, in accordance with a determination that the scrolling of the content of the user interface causes a second respective user interface object to move to the cursor, the device selects (792) the second respective user interface object for input, such as in FIG. 6BW (e.g., if scrolling the contents of the user interface causes a second respective user interface object to move to the location of the cursor (optionally move to within a threshold distance of the cursor), then the second respective user interface object is selected for input (and optionally change appearance based on the second respective user interface object as described below with respect to method 800)).

In some embodiments, if the first respective user interface object is scrolled away from the position of the cursor such that the cursor is farther than a threshold distance away from the first respective user interface object (e.g., the threshold at which the appearance of the cursor is changed based on the respective user interface object and the first respective user interface object gains a current focus), then the first respective user interface object is no longer selected for input (e.g., no longer has a current focus). The appearance of the cursor is optionally reverted to its previous size and/or shape (e.g., size and/or shape of the cursor before the fourth input was received, the default shape and/or size, etc. In some embodiments, in response to a scrolling input, the cursor is maintained at the same location in the user interface but is hidden from display. In such embodiments, the second respective user interface object is optionally not selected for input until a further input (e.g., touch-down on a touch-sensitive surface or cursor movement input) causes the cursor to be displayed.

The above-described manner of selecting objects in the user interface (e.g., by maintaining the cursor position when the content in a user interface is scrolled and de-selecting an object if it moves away from the cursor and/or selecting another object if it moves to the cursor) provides a quick and efficient manner of selecting items (e.g., by maintaining the cursor position and providing the user with a method of de-selecting or selecting items by scrolling the contents in the user interface), which simplifies the interaction between the user and the electronic device and enhances the operability of the electronic device and makes the user-device interface more efficient (e.g., without requiring the user to perform additional inputs to move the cursor to de-select or select items), which additionally reduces power usage and improves battery life of the electronic device by enabling the user to use the electronic device more quickly and efficiently while reducing errors in the usage of the device.

In some embodiments, selecting the first user interface object for input (794), such as in FIG. 6H, includes: in accordance with a determination that a size of the first user interface object is above a threshold size (e.g., 0.25 cmˆ2, 1 cmˆ2, 4 cmˆ2, 6 cmˆ2, 10 cmˆ2, etc. of display screen space, or a certain percentage larger (e.g., area) than the default, unselected size (e.g., area) of the cursor, such as 200%, 300%, 500%, etc. the size of the default cursor), causing the first user interface object to have a current focus without changing an appearance of the cursor based on the first user interface object (796), such as in FIG. 6BO (e.g., if the first user interface object is larger than the threshold size, then the first user interface object is selected for input while the cursor is displayed at a default size and default shape), and in accordance with a determination that the size of the first user interface object is below the threshold size, causing the first user interface object to have the current focus, and changing the appearance of the cursor based on the first user interface object (798), such as in FIG. 6H (e.g., if the first user interface object is smaller than the threshold size, then the size and shape of the cursor is changed based on the first user interface object).

In some embodiments, selecting the first user interface object includes highlighting the first user interface object (e.g., even though the cursor remains its default shape/size, the selected user interface object is optionally visually altered, such as becoming slightly enlarged, slightly lighter, slightly darker, etc.). In some embodiments, the cursor is displayed overlaid over the first user interface object. In some embodiments, the cursor is partially transparent as will be described in more detail below with respect to method 800. For example, the cursor changes its size and shape to closely match the first user interface object and appear as if the first user interface object is highlighted, as described below with respect to method 800.

The above-described manner of selectively maintaining the cursor when objects are selected for input (e.g., by changing the size and shape of the cursor to match small objects but maintaining the default size and shape of the cursor for large objects) provides a quick and efficient manner of visually identifying the position of the cursor (e.g., by displaying the cursor in its default size and shape if the resulting size and shape of the cursor would be over a size threshold), which simplifies the interaction between the user and the electronic device and enhances the operability of the electronic device and makes the user-device interface more efficient (e.g., without requiring the user to perform additional inputs or visually search around the user interface to find the location of the cursor), which additionally reduces power usage and improves battery life of the electronic device by enabling the user to use the electronic device more quickly and efficiently while reducing errors in the usage of the device.

In some embodiments, while the first user interface object is selected for input, the device receives (799), via the one or more input devices, a fourth input corresponding to a request to move the cursor away from the second location in the user interface to a location of a third user interface object, such as in FIG. 6N (e.g., a movement of a mouse in communication with the electronic device, a contact and movement (while maintaining contact) detected on a touch-pad in communication with the electronic device, etc.). In some embodiments, the input is not an input detected via a touch-sensitive display of the electronic device.

In some embodiments, in response to receiving the fourth input (797), such as in FIG. 6N: in accordance with a determination that a distance between the first user interface object and the third user interface object is less than a threshold distance (795), such as in FIG. 6N (e.g., 1 mm, 3 mm, 5 mm, 10 mm, etc. in the user interface): the device moves (793) the cursor from the second location to the location of the third user interface object, such as in FIG. 6N (e.g., moving the cursor from the location of the first user interface object to the location of the third user interface object), and changes (791) an appearance of the cursor from having a first size and a first shape based on the first user interface object to having a second size and a second shape based on the third user interface object, without displaying the cursor as having a default size and default shape while moving the cursor from the second location to the location of the third user interface object, such as in FIG. 6N (e.g., directly changing the size and shape of the cursor from being based on the first user interface object to being based on the third user interface object). For example, the cursor moves directly from selecting the first user interface object to selecting the third user interface object. In some embodiments, the threshold distance is the same or less than the threshold distance at which the appearance of the cursor is changed to be based on the user interface object that receives a current focus. In some embodiments, the third user interface object is selected for input.

In some embodiments, in accordance with a determination that the distance between the first user interface object and the third user interface object is greater than the threshold distance, the device moves (789) the cursor from the second location to the location of the third user interface object, such as in FIGS. 6T-6U (e.g., moving the cursor from the location of the first user interface object to the location of the third user interface object), including: displaying (787) the cursor as having the default size and default shape while moving the cursor from the second location to the location of the third user interface object, such as in FIG. 6T (e.g., changing the appearance of the cursor from being based on the first user interface object to it is default shape while traveling along the path towards the third user interface object), and when the cursor is at the location of the third user interface object (e.g., if the cursor is at or within the threshold distance of the third user interface object), displaying (785) the cursor as having the second size and the second shape based on the third user interface object, such as in FIG. 6U (e.g., changing the appearance of the cursor to be based on the third user interface object and optionally selecting the third user interface object for input).

For example, once the cursor is more than the threshold distance at which the first user interface object has a focus, then the cursor returns to its default shape and the first user interface object is no longer selected for input. Thus, if two user interface objects are close to each other, then the cursor will move from selecting one user interface object to another without displaying the default cursor size and shape. But if the two objects are far away from each other, the cursor will return to its default size and shape before then changing appearance based on the next object.

The above-described manner of changing the appearance of the cursor when moving between objects (e.g., by changing the appearance of the cursor from being based on the first object directly to being based on the second object if the two objects are within a threshold distance) provides a quick and efficient manner of selecting adjacent objects for input (e.g., by automatically selecting the next user interface object for input and changing appearance based on the next user interface object when next user interface object is within a threshold distance), which simplifies the interaction between the user and the electronic device and enhances the operability of the electronic device and makes the user-device interface more efficient (e.g., without requiring the user to perform additional inputs to move the cursor and select the next user interface object), which additionally reduces power usage and improves battery life of the electronic device by enabling the user to use the electronic device more quickly and efficiently while reducing errors in the usage of the device.

In some embodiments, while displaying, in the user interface, a scroll bar user interface element for scrolling a content of the user interface at a fourth location (e.g., displaying a scroll bar on the right side of the user interface), the device receives (783), via the one or more input devices, a fourth input corresponding to a request to move the cursor to the fourth location, such as in FIG. 6AS (e.g., a movement of a mouse in communication with the electronic device, a contact and movement (while maintaining contact) detected on a touchpad in communication with the electronic device, etc.). In some embodiments, the scroll bar is selectable to scroll the contents of the user interface based on the movement of the input (while selecting). In some embodiments, the scroll bar is hidden by default and is displayed in response to a scroll input to visually indicate the current scroll position of the user interface. In some embodiments, the input is not an input detected via a touch-sensitive display of the electronic device.

In some embodiments, in response to receiving the fourth input (781), such as in FIG. 6AS: the device moves (779) the cursor to the fourth location, such as in FIG. 6AS (e.g., moving the cursor to the location of the scroll bar) and selects (777) the scroll bar user interface element for input, including changing an appearance of the cursor based on the scroll bar user interface element, such as in FIG. 6AS (e.g., changing the size and/or shape of the cursor based on the scroll bar and selecting the scroll bar for input). In some embodiments, a selection input (e.g., a click and hold on an external touchpad) while the scroll bar user interface element is selected for input actuates the scroll bar such that an upward or downward movement input (e.g., at the external touchpad) causes the content in the user interface to scroll up or down.

The above-described manner of selecting a scroll bar user interface for input (e.g., in response to moving the cursor to the location of the scroll bar user interface and changing the appearance of the cursor based on the scroll bar) provides an efficient and consistent method of scrolling contents in a user interface (e.g., by configuring the scroll bar user interface to be interactable in the same way as other selectable objects that are selectable for input, such as buttons, application icons, and the like), which simplifies the interaction between the user and the electronic device and enhances the operability of the electronic device and makes the user-device interface more efficient (e.g., by providing the user with the same method of selecting the scroll bar user interface for input as other selectable objects without requiring the user to perform a different input or gesture as compared to other selectable objects), which additionally reduces power usage and improves battery life of the electronic device by enabling the user to use the electronic device more quickly and efficiently while reducing errors in the usage of the device.

In some embodiments, while the scroll bar is selected for input, the device receives (775), via the one or more input devices, a fifth input, such as in FIG. 6AX. In some embodiments, in response to receiving the fifth input (773), such as in FIG. 6AX: in accordance with a determination that the fifth input is a gesture for scrolling the content of the user interface that does not include a selection of the scroll bar user interface element while the scroll bar user interface element is selected for input (771), such as in FIG. 6AX (e.g., a two-finger downward or upward swipe on a touch-sensitive surface (e.g., external to the electronic device), a swipe gesture on a touch-sensitive display, a navigation input on a keyboard device, etc.): the device scrolls (769) the content of the user interface (e.g., scrolling the content of the user interface in accordance with the user input), while maintaining the cursor at the fourth location in the user interface, wherein subsequent input for moving the cursor causes the cursor to move starting from the fourth location, such as in FIGS. 6AX-6BA (e.g., the cursor remains at the same position in the user interface even though the content moves).

In some embodiments, future cursor movement inputs start from the fourth location. For example, after scrolling the content of the user interface (without having received a cursor movement input moving the cursor from another location to the fourth location), if the device receives a fifth input via the one or more input devices corresponding to a request to move the cursor, in response to receiving the fifth input, the device moves the cursor in accordance with the fifth input from the fourth location. In some embodiments, when the content of the user interface is scrolled in response to a gesture for scrolling that does not include a selection of the scroll bar user interface, the cursor is hidden from display as will be described in more detail below with respect to method 800. In such embodiments, despite being hidden from display, the system maintains the position of the cursor at the fourth location (e.g., maintains the position and/or location property of the cursor at the fourth location). In some embodiments, a selection of the scroll bar followed by a movement of the cursor (e.g., in response to a cursor movement input) while maintaining the selection causes the content of the user interface to be scrolled in accordance with the movement of the input and the cursor to move in accordance with the movement of the input (e.g., the scroll bar moves in accordance with the cursor movement and the content of the user interface is scrolled accordingly).

The above-described manner of scrolling the contents of the user interface (e.g., in response to a scrolling gesture while maintaining the cursor at its respective location) provides a quick and efficient manner of scrolling contents in a user interface (e.g., by providing for an indirect manipulation method of scrolling the contents of the user interface and maintaining the location of the cursor), which simplifies the interaction between the user and the electronic device and enhances the operability of the electronic device and makes the user-device interface more efficient (e.g., by maintaining the position of the cursor such that future inputs start from the expected position of the cursor even after the contents of the user interface is scrolled without requiring the user to perform additional inputs to locate the cursor), which additionally reduces power usage and improves battery life of the electronic device by enabling the user to use the electronic device more quickly and efficiently while reducing errors in the usage of the device.

It should be understood that the particular order in which the operations in FIGS. 7A-7M have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, 1200, and 1400) are also applicable in an analogous manner to method 700 described above with respect to FIGS. 7A-7M. For example, the interaction of the cursor with user interface objects described above with reference to method 700 optionally has one or more of the characteristics of selectively displaying a cursor in a user interface, the displaying of a cursor while manipulating objects in the user interface, the dismissing or switching of applications using a cursor, and ways an electronic device displays user interface elements in response to requests to move a cursor beyond an edge of the display, etc., described herein with reference to other methods described herein (e.g., methods 800, 1000, 1200, and 1400). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 7A-7M are, optionally, implemented by components depicted in FIGS. 1A-1B. For example, displaying operations 702, and receiving operations 708, 712, 716, 732, 740, 752, 762, 768, 776, 780, 799, 783, and 775, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 8A:
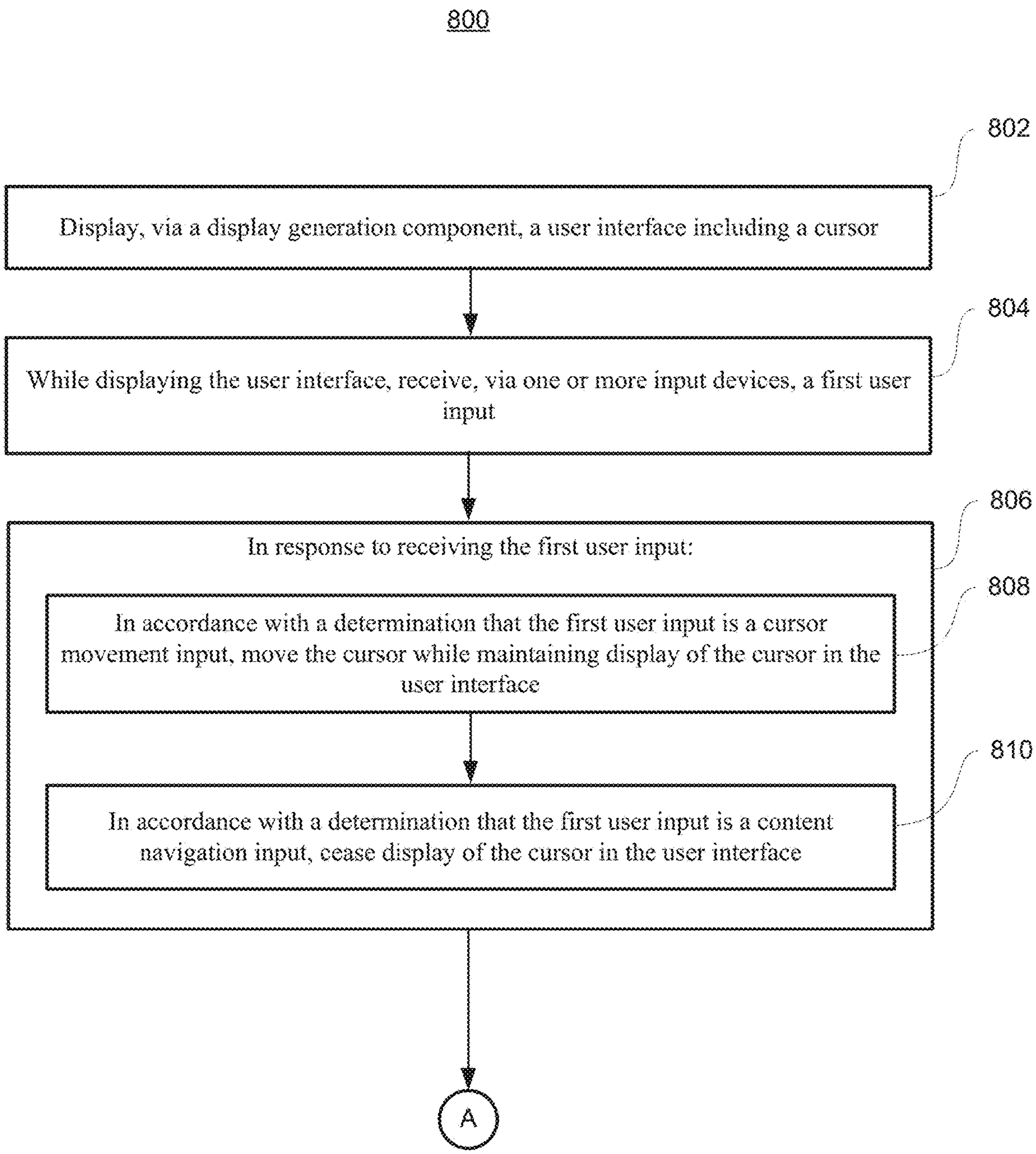
FIGS. 8A-8O are flow diagrams illustrating a method of selectively displaying a cursor in a user interface in accordance with some embodiments.
Figure 8B:
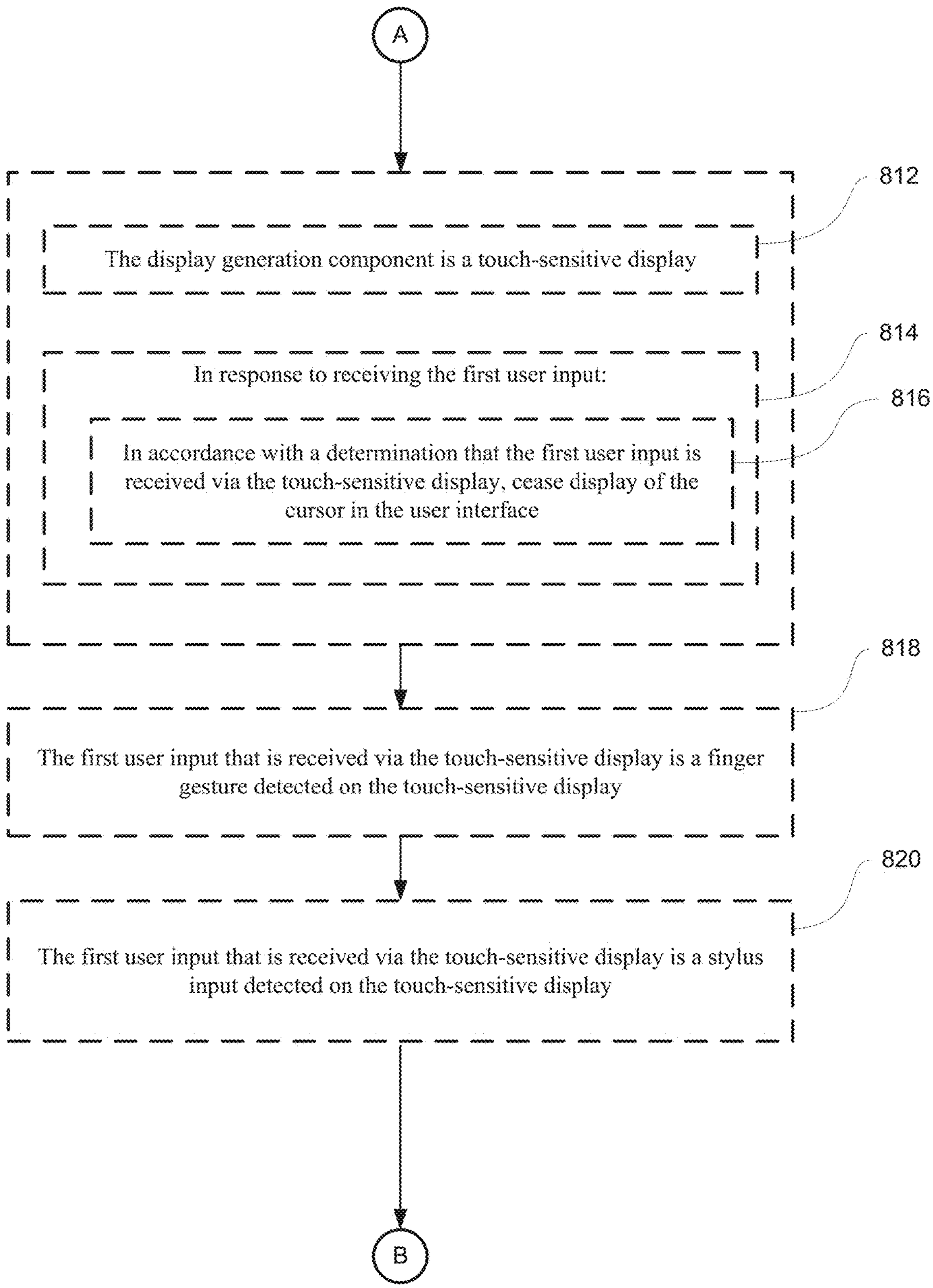
Figure 8C:
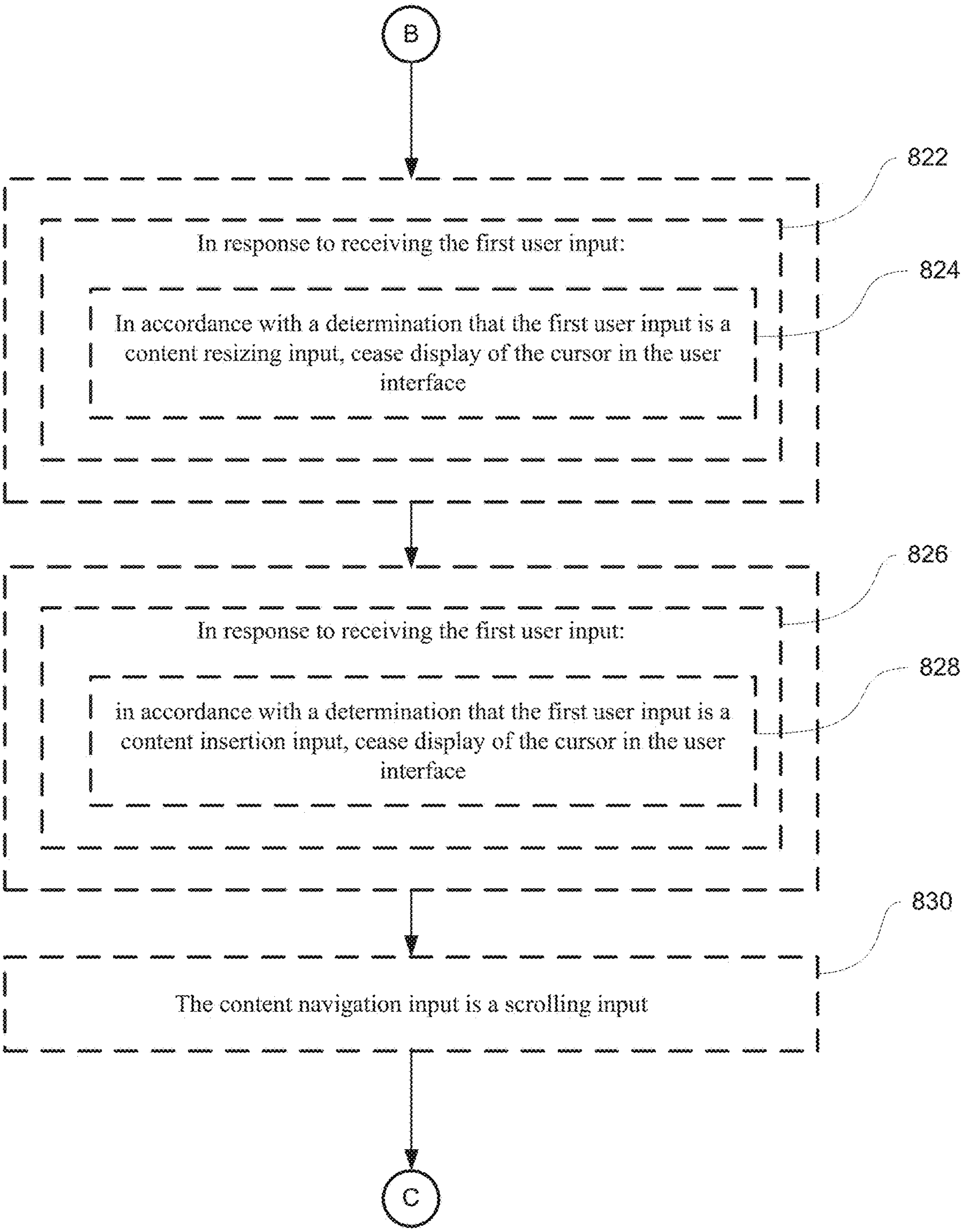
Figure 8D:
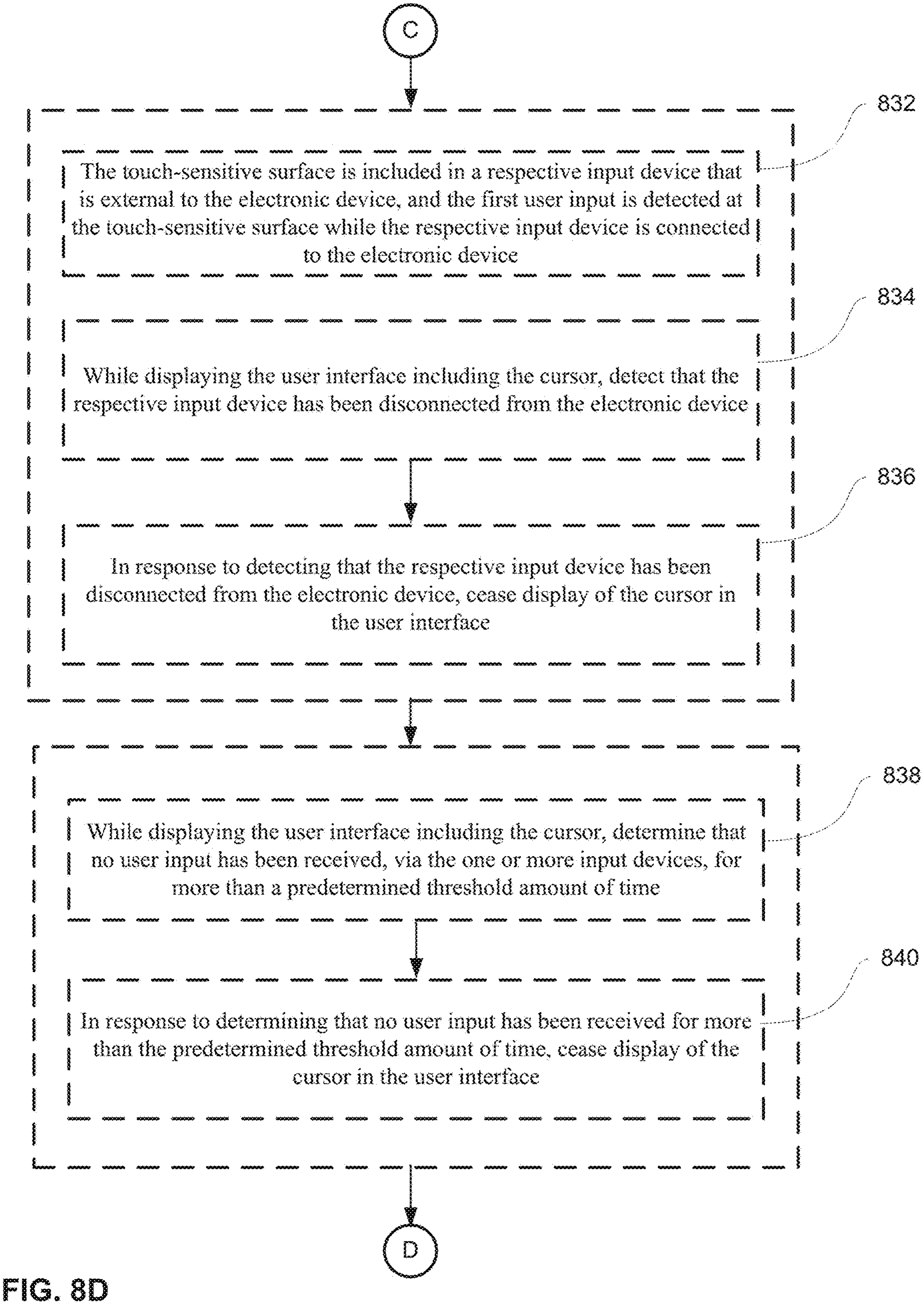
Figure 8E:
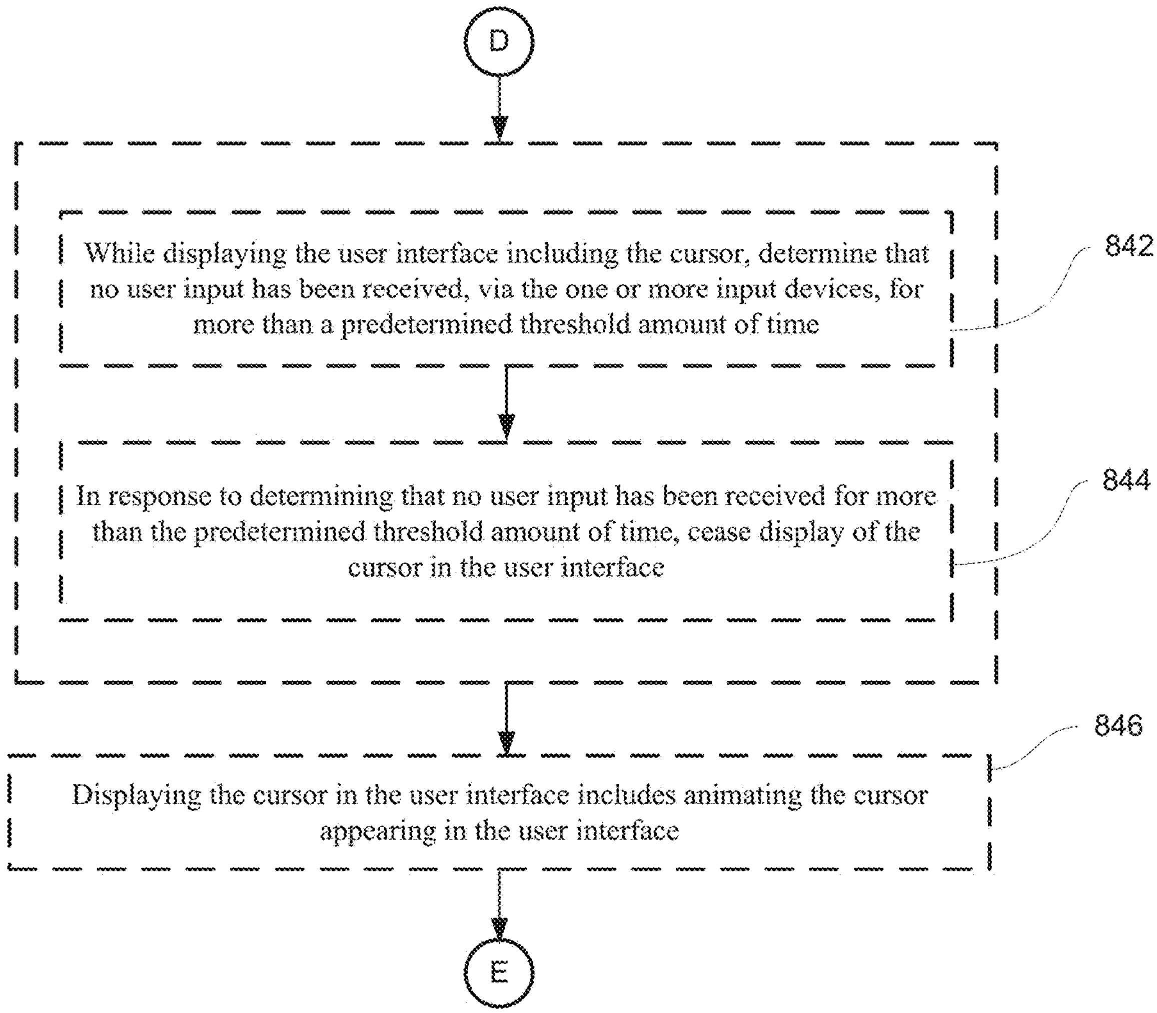
Figure 8F:
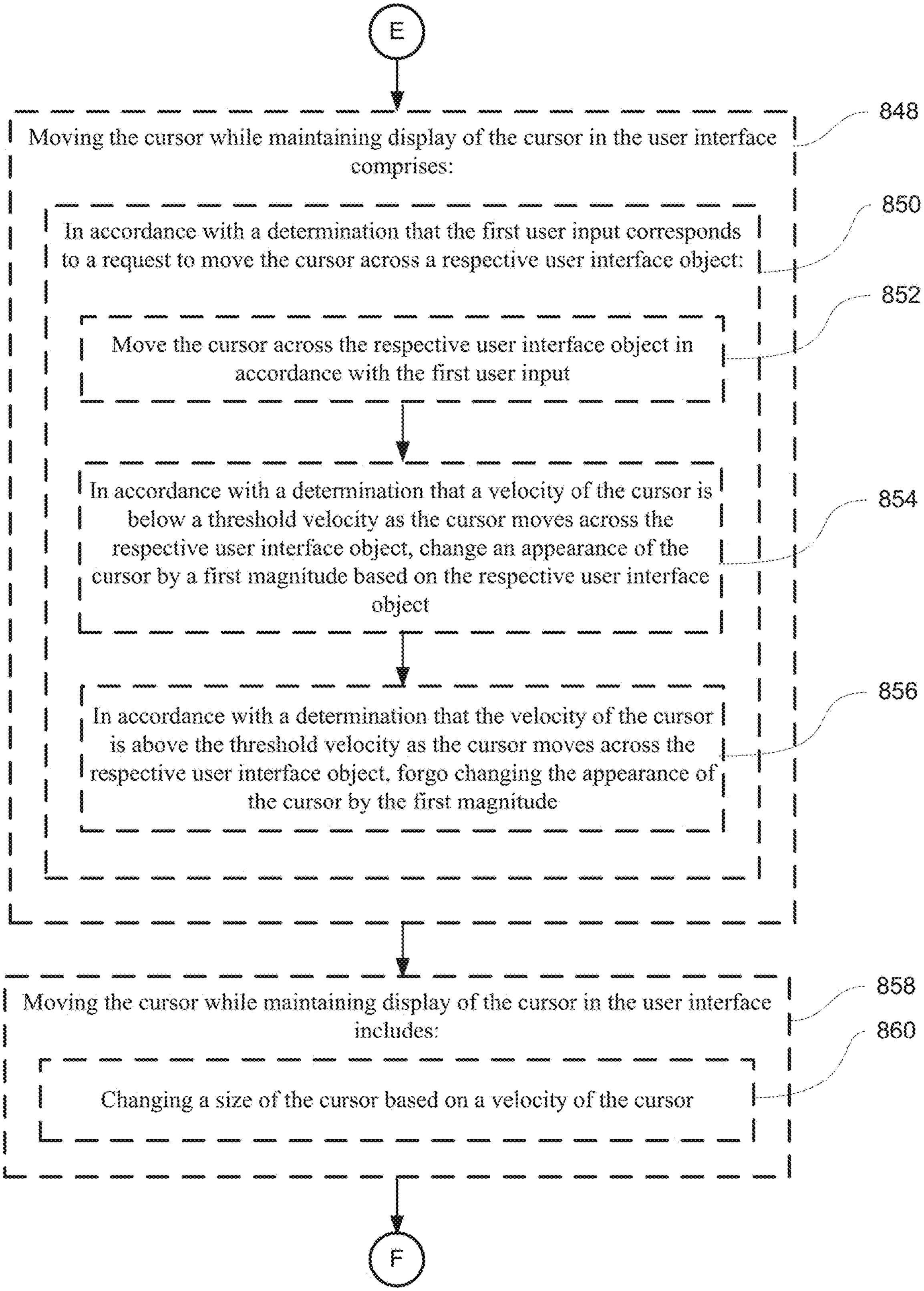
Figure 8G:
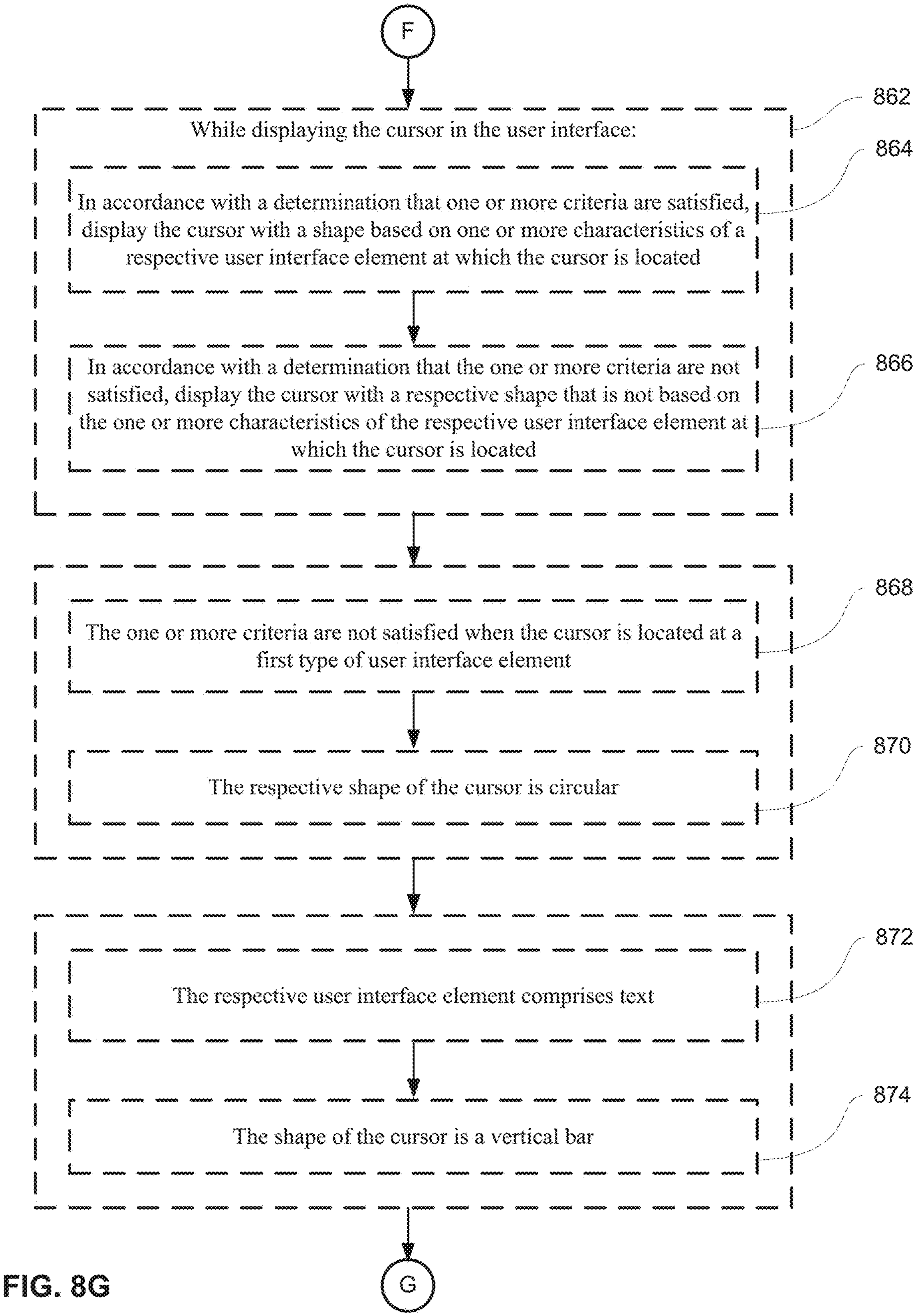
Figure 8H:
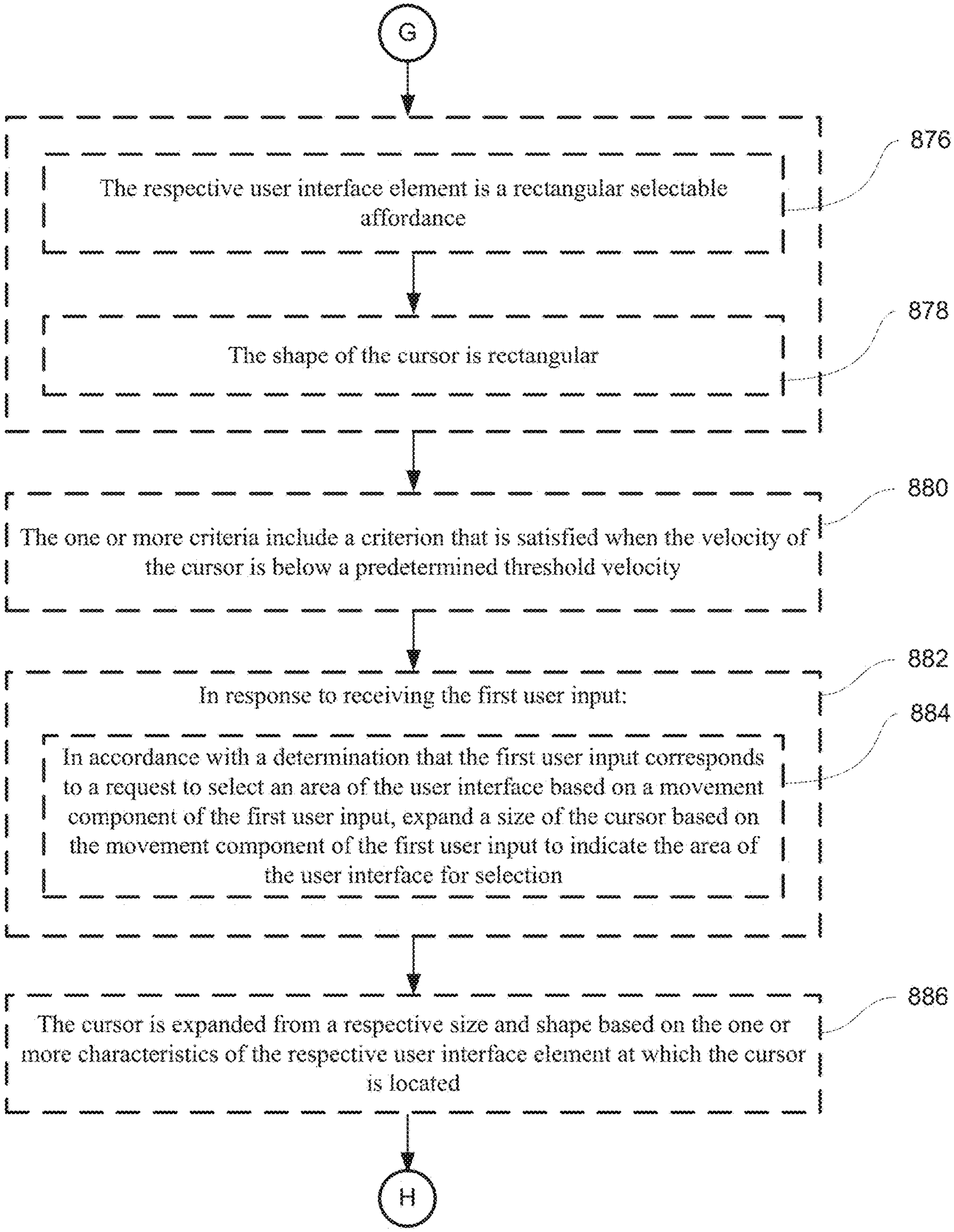
Figure 8I:
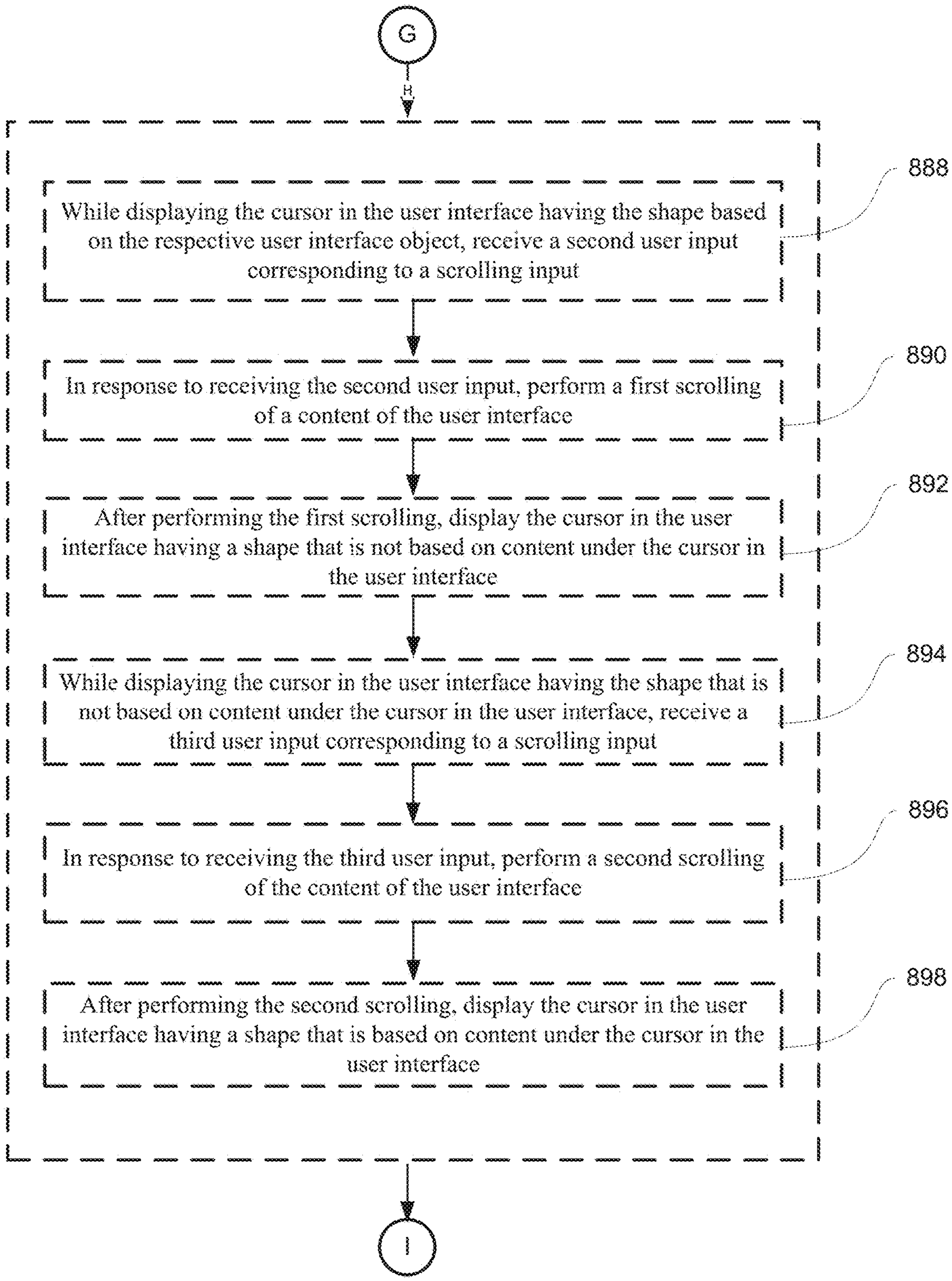
Figure 8J:
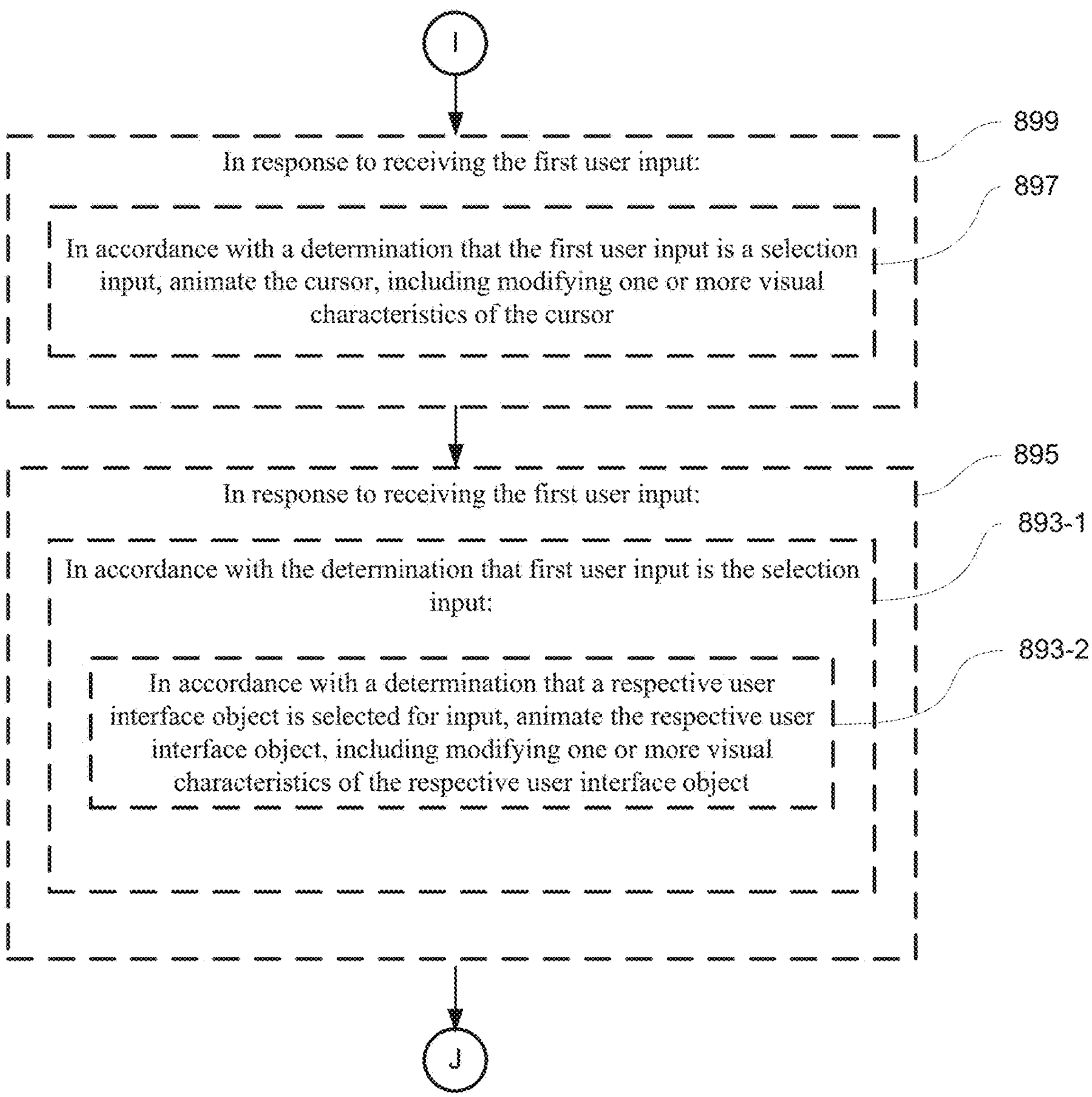
Figure 8K:
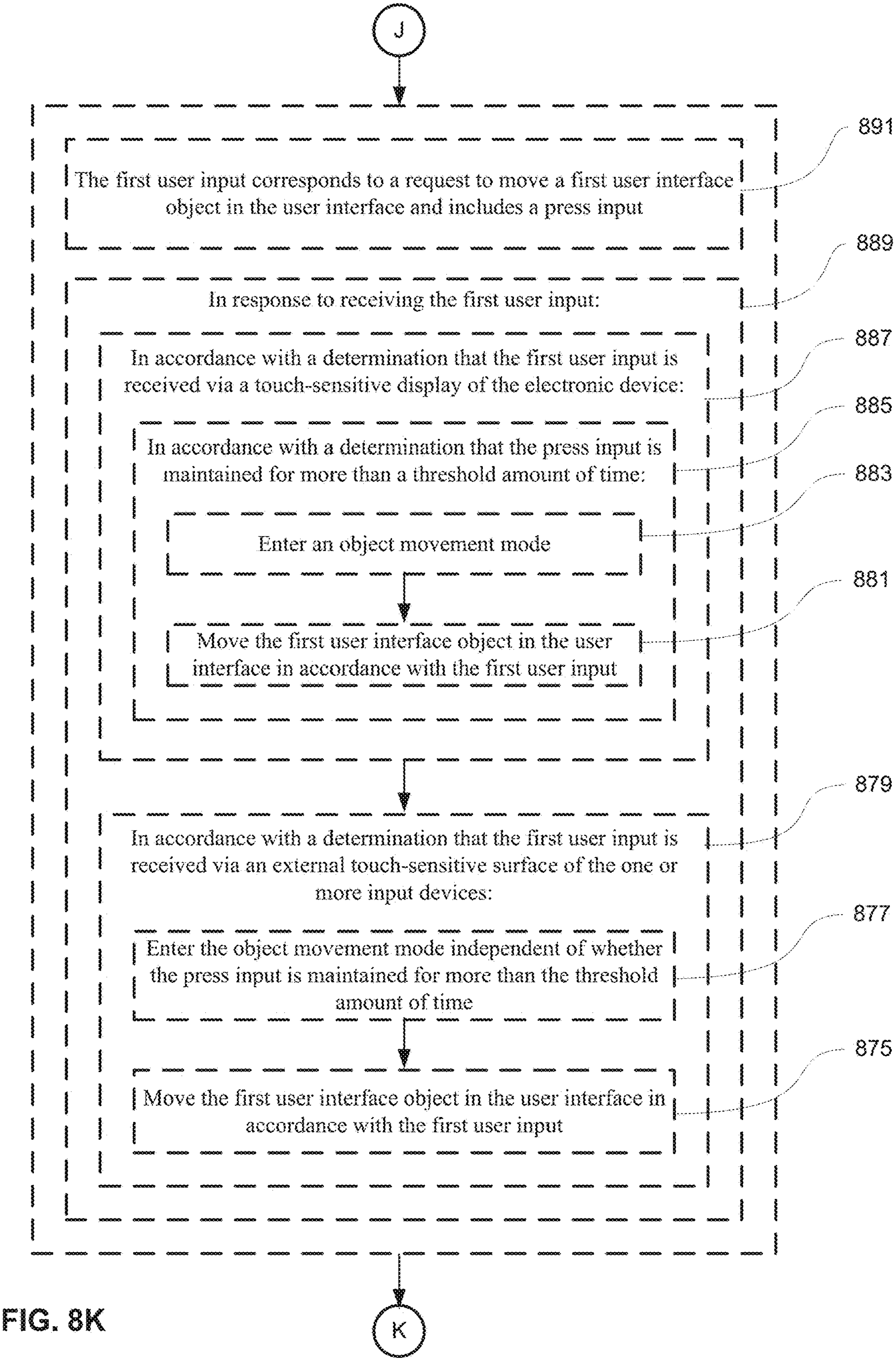
Figure 8L:
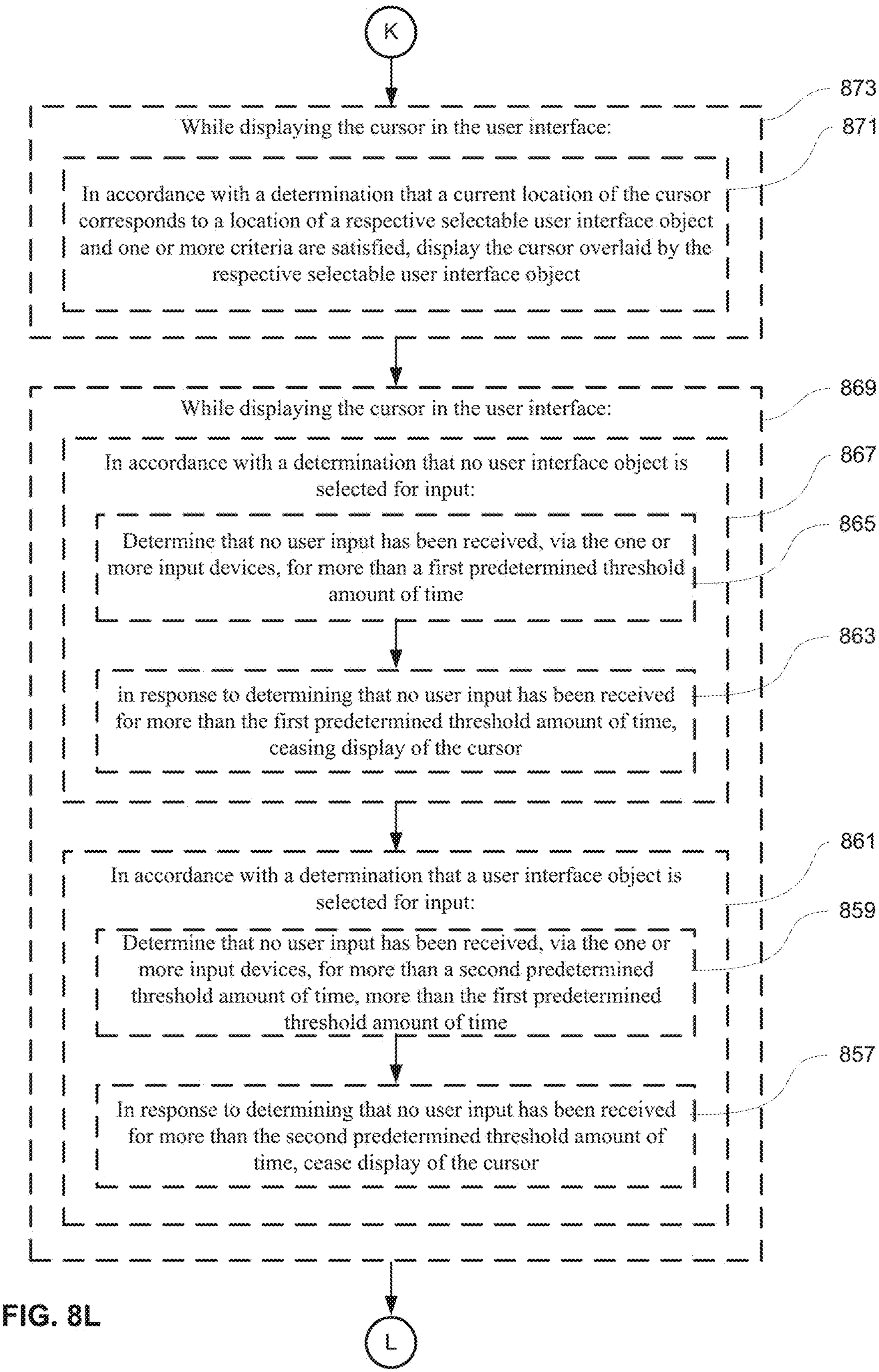
Figure 8M:
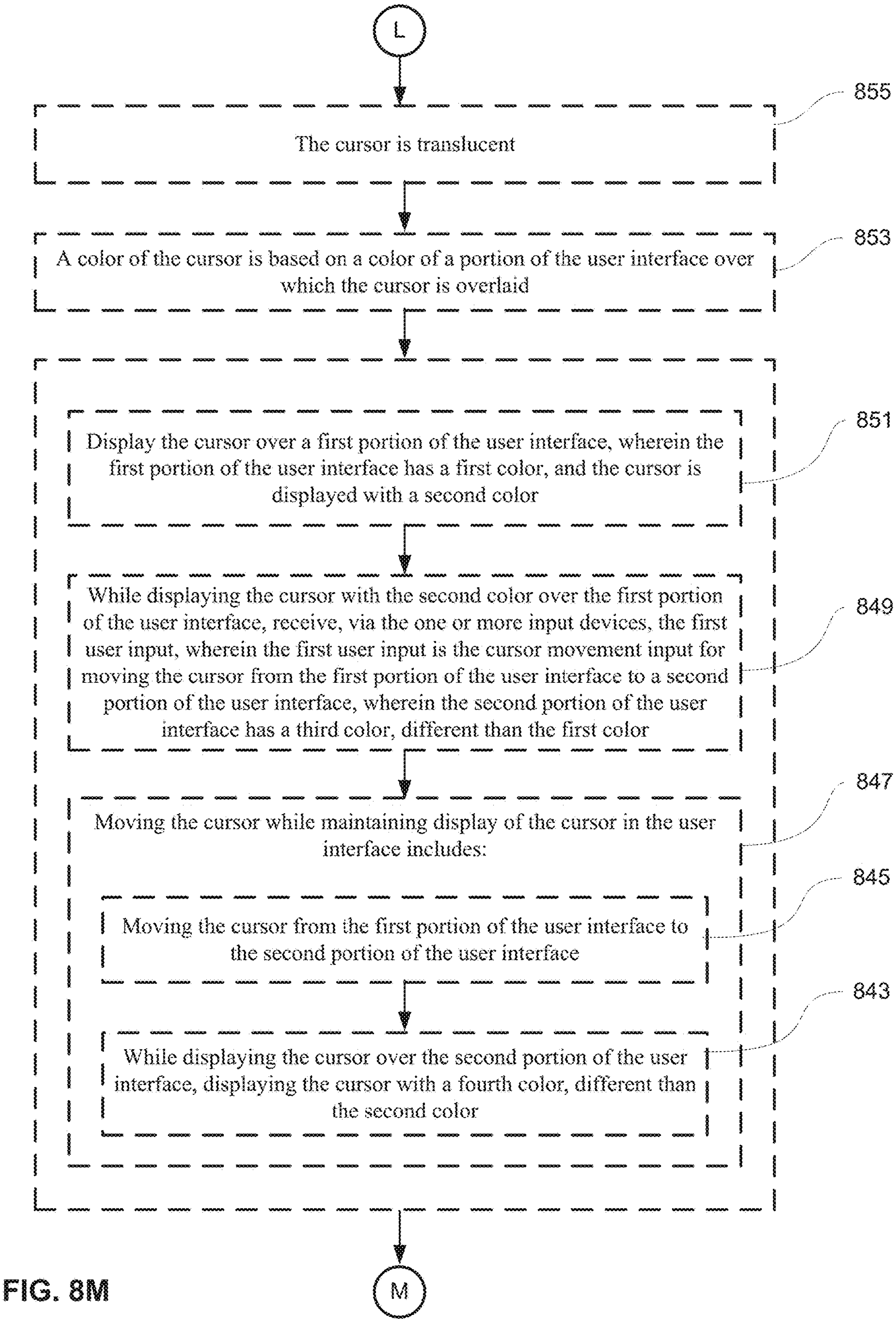
Figure 8N:
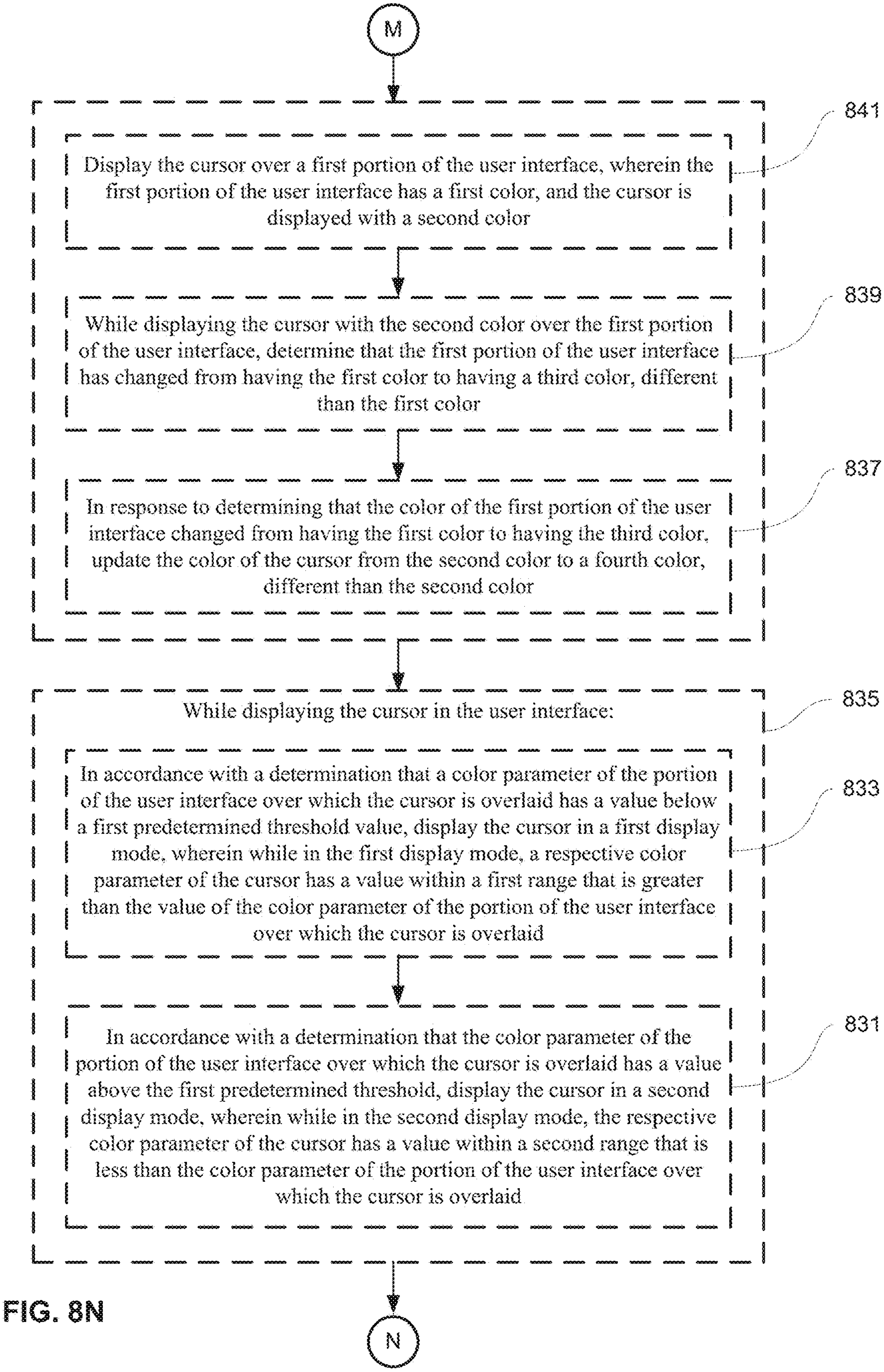
Figure 8O:
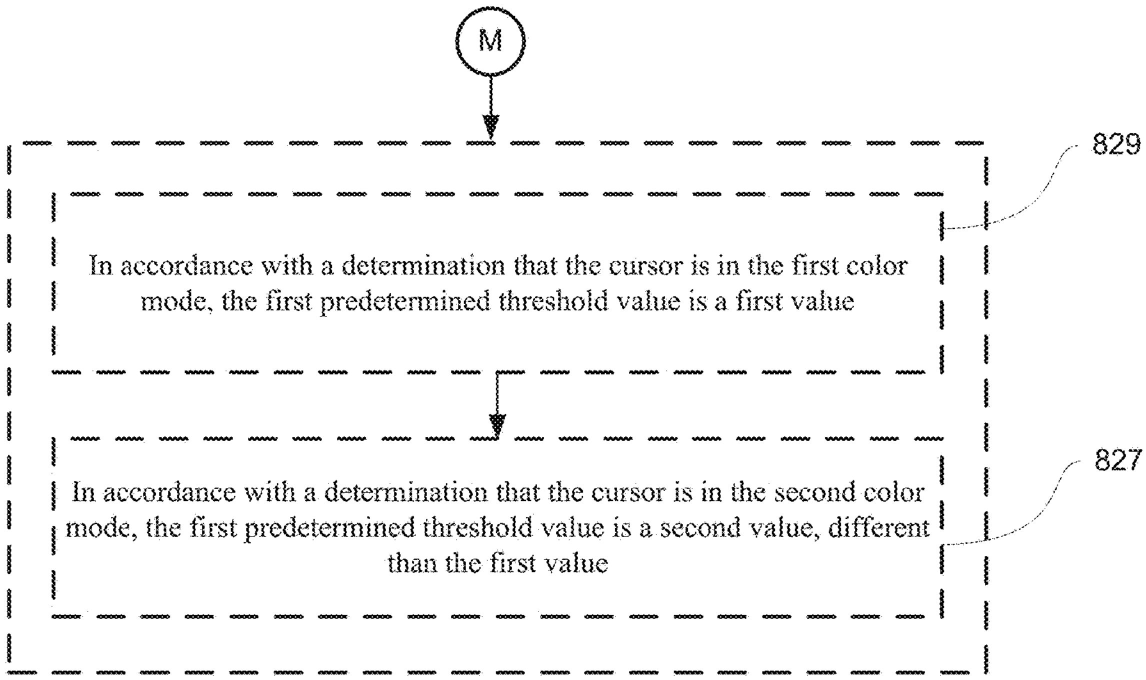

FIGS. 8A-8O are flow diagrams illustrating a method 800 of selectively displaying a cursor in a user interface. The method 800 is optionally performed at an electronic device such as device 100, device 300, device 500, device 501, device 510, and device 591 as described above with reference to FIGS. 1A-1B, 2-3, 4A-4B and 5A-5I. Some operations in method 800 are, optionally combined and/or order of some operations is, optionally, changed.

As described below, the method 800 provides ways in which an electronic device selectively displays a cursor in a user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display generation component and one or more input devices, including a touch-sensitive surface (e.g., a mobile device (e.g., a tablet, a smartphone, a media player, or a wearable device), or a computer, optionally in communication with one or more of a (e.g., external) mouse, (e.g., external) trackpad, and/or (e.g., external) touchpad, etc.) displays (802), via the display generation component, a user interface including a cursor, such as in FIG. 6E (e.g., a user interface with a pointer that indicates the current position of interest. For example, a mouse cursor that indicates that selection inputs optionally cause selection of the object at the location of the mouse cursor). In some embodiments, the display generation component is a display integrated with the electronic device (optionally a touch screen display) and/or an external display such as a monitor, projector, television, etc.

In some embodiments, while displaying the user interface, the device receives (804), via the one or more input devices, a first user input, such as upward swipe of user input 603 in FIG. 6F (e.g., an input detected via the touch-sensitive display, an input via an external trackpad, etc.). In some embodiments, in response to receiving the first user input (804): in accordance with a determination that the first user input is a cursor movement input, the device moves (808) the cursor while maintaining display of the cursor in the user interface, such as the upward movement of cursor 630 in FIG. 6F (e.g., if the user input is an input for moving the cursor, moving the cursor in accordance with the input (based on the movement component of the input) and maintaining display of the cursor), and in accordance with a determination that the first user input is a content navigation input, the device ceases (810) display of the cursor in the user interface, such as user input 603 corresponding to a scrolling input in FIG. 6AD (e.g., if the user input is an input to navigate within the user interface, such as a scrolling input, then hide display of the cursor).

In some embodiments, cursor movement inputs are received via the external mouse, trackpad, touchpad, such as the cursor movement inputs described with reference to method 700. In some embodiments, inputs via the touch-sensitive display are not cursor movement inputs. In some embodiments, display of the user interface is maintained when the cursor is ceased to be displayed. In some embodiments, other types of inputs cause the device to hide the cursor. For example, if the user input is a request to insert content into the user interface (e.g., keyboard text insertion input), then the cursor is hidden. Optionally, if the user input is a visualization manipulation input, such as a resizing or zooming input or an input from a touch screen, such as a tap input or a swipe gesture, then the cursor is hidden. If the input is other than those described herein, display of the cursor is optionally maintained. In some embodiments, ceasing display of the cursor includes displaying an animation of the cursor fading out.

The above-described manner of hiding the cursor (e.g., by ceasing display of the cursor in response to receiving a content navigation input) provides a quick and efficient manner of removing display of the cursor when the user indicates that the user no longer needs to use the cursor (e.g., by hiding the cursor while scrolling through the user interface, when the cursor is unnecessary for interaction with the user interface), which simplifies the interaction between the user and the electronic device and enhances the operability of the electronic device and makes the user-device interface more efficient (e.g., by automatically hiding the cursor and thus allowing more of the user interface to be unobstructed when the user is navigating amongst the user interface, without requiring the user to perform additional inputs to dismiss the cursor or move the cursor to a location that doesn't obstruct the user interface), which additionally reduces power usage and improves battery life of the electronic device by enabling the user to use the electronic device more quickly and efficiently while reducing errors in the usage of the device.

In some embodiments, the display generation component is a touch-sensitive display (812), such as touch screen 504 in FIG. 6A (e.g., a touch screen of the electronic device that is displaying the user interface). In some embodiments, in response to receiving the first user input (814), such as user input on touch screen 504 from stylus 203 in FIG. 6AO: in accordance with a determination that the first user input is received via the touch-sensitive display, the device ceases (816) display of the cursor in the user interface, such as in FIG. 6AO illustrating cursor 630 no longer displayed in the user interface (e.g., if the cursor is displayed in the user interface when an input is received at the touch-sensitive display, then cease displaying the cursor (e.g., while continuing to display the user interface on which the cursor was displayed)). In some embodiments, ceasing displaying the cursor includes displaying an animation of the cursor fading away. In some embodiments, user inputs received via the touch-sensitive display are not cursor movement inputs. For example, cursor movement inputs are received only via input devices other than the touch-sensitive display.

The above-described manner of hiding the cursor (e.g., by ceasing display of the cursor in response to receiving an input via the touch-sensitive display) provides a quick and efficient manner of removing display of the cursor when the user indicates that the user is no longer interacting with the cursor (e.g., by hiding the cursor when the user has switched from an input device that controls the cursor to the touch-sensitive display, which does not control the cursor), which simplifies the interaction between the user and the electronic device and enhances the operability of the electronic device and makes the user-device interface more efficient (e.g., by automatically hiding the cursor and thus allowing more of the user interface to be unobstructed when the user is interacting with the touch-sensitive display), which additionally reduces power usage and improves battery life of the electronic device by enabling the user to use the electronic device more quickly and efficiently while reducing errors in the usage of the device.

In some embodiments, the first user input that is received via the touch-sensitive display is a finger gesture detected on the touch-sensitive display (818), such as the user input by hand 636 (e.g., a finger of hand 636) in FIG. 6AQ (e.g., if the cursor is displayed in the user interface when a finger gesture input is received at the touch-sensitive display, then cease displaying the cursor). In some embodiments, a finger gesture input is an interaction of one or more fingers with the touch-sensitive display.

The above-described manner of hiding the cursor (e.g., by ceasing display of the cursor in response to receiving a finger gesture input via the touch-sensitive display) provides a quick and efficient manner of removing display of the cursor when the user indicates that the user is no longer interacting with the cursor (e.g., by hiding the cursor when the user has switched from an input device that controls the cursor to the touch-sensitive display, which does not control the cursor), which simplifies the interaction between the user and the electronic device and enhances the operability of the electronic device and makes the user-device interface more efficient (e.g., by automatically hiding the cursor and thus allowing more of the user interface to be unobstructed when the user is physically interacting with the touch-sensitive display with one or more fingers), which additionally reduces power usage and improves battery life of the electronic device by enabling the user to use the electronic device more quickly and efficiently while reducing errors in the usage of the device.

In some embodiments, the first user input that is received via the touch-sensitive display is a stylus input detected on the touch-sensitive display (820), such as in FIG. 6AO (e.g., if the cursor is displayed in the user interface when a stylus device is received at the touch-sensitive display, then cease displaying the cursor). In some embodiments, a stylus input is an interaction of a stylus device with the touch-sensitive display. In some embodiments, a user input received via a stylus is not a cursor movement input. For example, a swipe input from a stylus is optionally interpreted as a scrolling input or a content insertion input (drawing input) rather than a cursor movement input. In some embodiments, the stylus device is an active device that is in communication with the electronic device. In some embodiments, the stylus device is a passive device that the electronic device determines is not a finger.

The above-described manner of hiding the cursor (e.g., by ceasing display of the cursor in response to receiving a stylus input via the touch-sensitive display) provides a quick and efficient manner of removing display of the cursor when the user indicates that the user is no longer interacting with the cursor (e.g., by hiding the cursor when the user has switched from an input device that controls the cursor to using a stylus, which does not control the cursor), which simplifies the interaction between the user and the electronic device and enhances the operability of the electronic device and makes the user-device interface more efficient (e.g., by automatically hiding the cursor and thus allowing more of the user interface to be unobstructed when the user is physically interacting with the touch-sensitive display with a stylus), which additionally reduces power usage and improves battery life of the electronic device by enabling the user to use the electronic device more quickly and efficiently while reducing errors in the usage of the device.

In some embodiments, in response to receiving the first user input (822): in accordance with a determination that the first user input is a content resizing input (e.g., an input corresponding to a request to resize respective content of the user interface), the device ceases (824) display of the cursor in the user interface (e.g., content resizing inputs, whether received via the touch-sensitive display, a touch-sensitive surface, or any other user input, cause the cursor to cease to be displayed). For example, an input for zooming in or out of content such as a pinch gesture. In some embodiments, the content resizing input is received via the touch-sensitive display, an integrated touch-sensitive surface, an external touch-sensitive surface, etc. In some embodiments, in response to a content resizing input, the cursor is maintained in the user interface and resized as described below with respect to method 1000.

The above-described manner of hiding the cursor (e.g., by ceasing display of the cursor in response to a content resizing input) provides a quick and efficient manner of removing display of the cursor when the user indicates that the user is no longer interacting with the cursor (e.g., by hiding the cursor when the user is performing an action not associated with a cursor, such as resizing content in the user interface), which simplifies the interaction between the user and the electronic device and enhances the operability of the electronic device and makes the user-device interface more efficient (e.g., by automatically hiding the cursor and thus allowing the content in the user interface to be unobstructed when the user is resizing the content), which additionally reduces power usage and improves battery life of the electronic device by enabling the user to use the electronic device more quickly and efficiently while reducing errors in the usage of the device.

In some embodiments, in response to receiving the first user input (826), such as in FIG. 6AH: in accordance with a determination that the first user input is a content insertion input (e.g., an input from an external keyboard or a virtual keyboard entering one or more characters into the user interface), the device ceases (828) display of the cursor in the user interface, such as in FIG. 6AH (e.g., text entry and/or content entry inputs cause the cursor to cease to be displayed). In some embodiments, the one or more characters are inserted into a text entry region in the user interface.

The above-described manner of hiding the cursor (e.g., by ceasing display of the cursor in response to a content insertion input) provides a quick and efficient manner of removing display of the cursor when the user indicates that the user is no longer interacting with the cursor (e.g., by hiding the cursor when the user is performing an action not associated with a cursor, such as inserting content into the user interface), which simplifies the interaction between the user and the electronic device and enhances the operability of the electronic device and makes the user-device interface more efficient (e.g., by automatically hiding the cursor and thus allowing the content in the user interface to be unobstructed when the user is inserting content into the user interface), which additionally reduces power usage and improves battery life of the electronic device by enabling the user to use the electronic device more quickly and efficiently while reducing errors in the usage of the device.

In some embodiments, the content navigation input is a scrolling input (830), such as in FIG. 6AD (e.g., a swipe input from a touch-sensitive display, a two-finger swipe input from an external touchpad, a page-up or page-down key input from a keyboard, etc. causes the cursor to cease to be displayed).

The above-described manner of hiding the cursor (e.g., by ceasing display of the cursor in response to a scrolling input) provides a quick and efficient manner of removing display of the cursor when the user indicates that the user is no longer interacting with the cursor (e.g., by hiding the cursor when the user is performing an action not associated with a cursor, such as scrolling the user interface), which simplifies the interaction between the user and the electronic device and enhances the operability of the electronic device and makes the user-device interface more efficient (e.g., by automatically hiding the cursor and thus allowing the content in the user interface to be unobstructed when the user is scrolling the content of the user interface), which additionally reduces power usage and improves battery life of the electronic device by enabling the user to use the electronic device more quickly and efficiently while reducing errors in the usage of the device.

In some embodiments, the touch-sensitive surface is included in a respective input device that is external to the electronic device (e.g., a touch-sensitive surface on a trackpad device, not integrated with the electronic device, that is in wired or wireless connection with the electronic device), and the first user input is detected at the touch-sensitive surface while the respective input device is connected to the electronic device (832), such as in FIG. 6J (e.g., via a wired or wireless connection).

In some embodiments, while displaying the user interface including the cursor, the device detects (834) that the respective input device has been disconnected from the electronic device, such as in FIG. 6BL (e.g., the physical wired connection is disconnected, a wireless connection is disconnected (e.g., via losing wireless connectivity, via disabling the wireless protocol on the input device or the electronic device or via turning off the input device, etc.)). In some embodiments, in response to detecting that the respective input device has been disconnected from the electronic device, the device ceases (836) display of the cursor in the user interface, such as in FIG. 6BL (e.g., ceasing display of the cursor if the input device for controlling the cursor is no longer connected to the electronic device such that it is no longer able to control the cursor).

In some embodiments, the cursor is maintained if another input device for controlling the cursor is still connected to the electronic device. In some embodiments, the cursor is ceased to be displayed even if another input device for controlling the cursor is still connected to the electronic device. In some embodiments, the cursor is ceased to be displayed only if there are no other input devices for controlling the cursor connected to the electronic device.

The above-described manner of hiding the cursor (e.g., by ceasing display of the cursor in response to detecting that the input device for controlling the cursor has been disconnected from the electronic device) provides a quick and efficient manner of removing display of the cursor when the user is no longer able to interact with the cursor (e.g., when the input device for controlling the cursor has been disconnected from the electronic device), which simplifies the interaction between the user and the electronic device and enhances the operability of the electronic device and makes the user-device interface more efficient (e.g., by automatically hiding the cursor when the input device for controlling the cursor is disconnected, thus preventing the user from attempting to control the cursor or otherwise requiring the user to perform additional inputs to disable display of the cursor), which additionally reduces power usage and improves battery life of the electronic device by enabling the user to use the electronic device more quickly and efficiently while reducing errors in the usage of the device.

In some embodiments, while displaying the user interface including the cursor, the device determines (838) that no user input has been received, via the one or more input devices, for more than a predetermined threshold amount of time, such as in FIG. 6BJ (e.g., receiving no user input from any input device or any input device for controlling the cursor for more than 2 seconds, 3 seconds, 5 seconds, 10 seconds, 30 seconds, etc.), and in response to determining that no user input has been received for more than the predetermined threshold amount of time, the device ceases (840) display of the cursor in the user interface, such as in FIG. 6BJ (e.g., removing display of the cursor). In some embodiments, ceasing display includes displaying an animation of the cursor fading away.

The above-described manner of hiding the cursor (e.g., by ceasing display of the cursor in response to determining that there has been no user input for a threshold amount of time) provides a quick and efficient manner of removing display of the cursor when the user is not interacting with the cursor (e.g., when no input has been received for a threshold amount of time), which simplifies the interaction between the user and the electronic device and enhances the operability of the electronic device and makes the user-device interface more efficient (e.g., by automatically hiding the cursor when the user is not interacting with the cursor, without requiring the user to perform additional inputs to disable display of the cursor), which additionally reduces power usage and improves battery life of the electronic device by enabling the user to use the electronic device more quickly and efficiently while reducing errors in the usage of the device.

In some embodiments, while displaying the user interface without displaying the cursor, the device detects (842) a contact on the touch-sensitive surface of the one or more input devices, such as in FIG. 6BK (e.g., detecting a user input on an input device that controls the cursor including a press or click input, a swipe input, a tap input, a touch-down of a contact, etc.). In some embodiments, in response to detecting the contact on the touch-sensitive surface, the device displays (844) the cursor in the user interface, such as in FIG. 6BK (e.g., the cursor is displayed at a location as described above with respect to method 700). For example, the cursor is displayed at a default location, the cursor is displayed at its previously displayed location, or the cursor is displayed at a location of the user interface object that currently has a focus and/or is selected for input.

The above-described manner of displaying the cursor (e.g., in response to detecting contact on a touch-sensitive surface of an input device) provides a quick and efficient manner of displaying the cursor when the user indicates a desire to interact with the cursor (e.g., when the input device for controlling the cursor detects a contact), which simplifies the interaction between the user and the electronic device and enhances the operability of the electronic device and makes the user-device interface more efficient (e.g., by automatically displaying the cursor when the user begins interaction with a input device that controls the cursor without requiring the user to perform additional inputs to display the cursor), which additionally reduces power usage and improves battery life of the electronic device by enabling the user to use the electronic device more quickly and efficiently while reducing errors in the usage of the device.

In some embodiments, displaying the cursor in the user interface includes animating the cursor appearing in the user interface (846), such as in FIGS. 6C-6E (e.g., an animation fading the cursor into view or any other suitable animation). The above-described manner of displaying the cursor (e.g., by animating the cursor appearing in the user interface) provides a quick and efficient manner of displaying the cursor (e.g., by slowly bringing the cursor into view), which simplifies the interaction between the user and the electronic device and enhances the operability of the electronic device and makes the user-device interface more efficient (e.g., by preventing sudden changes in the user interface that could be distracting or jarring to the user experience), which additionally reduces power usage and improves battery life of the electronic device by enabling the user to use the electronic device more quickly and efficiently while reducing errors in the usage of the device.

In some embodiments, moving the cursor while maintaining display of the cursor in the user interface (848), such as in FIG. 6AM (e.g., while receiving a cursor movement input) comprises: in accordance with a determination that the first user input corresponds to a request to move the cursor across a respective user interface object (850)), such as in FIG. 6AM (e.g., a cursor movement input moving the cursor over and/or across a user interface object that is selectable for input, such as passing the cursor to and beyond the location of the respective user interface object): moving the cursor across the respective user interface object in accordance with the first user input (852), such as in FIG. 6AM (e.g., moving the cursor based on the user input to and beyond the location of the respective user interface object); and in accordance with a determination that a velocity of the cursor (optionally, a speed of the cursor) is below a threshold velocity (optionally, a threshold speed, such as less than 0.5 inches per second, 1 inch per second, 2 inches per second, 5 inches per second, etc.) as the cursor moves across the respective user interface object, changing an appearance of the cursor by a first magnitude based on the respective user interface object (854), such as in FIG. 6AM (e.g., change the appearance of the cursor by a first amount based on user interface elements in the user interface over which the cursor passes as described above with respect to method 700).

In some embodiments, in accordance with a determination that the velocity of the cursor (optionally, a speed of the cursor) is above the threshold velocity (optionally, a threshold speed) as the cursor moves across the respective user interface object, the device forgoes (856) changing the appearance of the cursor by the first magnitude, such as in FIG. 6AN (e.g., if the cursor is moving more than 0.5 inches per second, 1 inch per second, 2 inches per second, 5 inches per second, etc., then change the appearance of the cursor by an amount different than the second amount or do not change the appearance of the cursor at all).

For example, if the cursor moves across selectable user interface elements at a speed below the threshold, the cursor will change its size, shape, and/or color to conform to the respective selectable user interface elements as it moves. Thus, in some embodiments, the user is able to see user interface elements being selected for input as the cursor moves around in the user interface. In some embodiments, the color of the cursor changes based on the content as described herein with respect to method 800.

For example, if the cursor's speed is above the threshold, then the appearance of the cursor is not changed based on any selectable user interface elements that it moves across (e.g., until the speed falls below the threshold or the cursor stops moving). In some embodiments, if the cursor's speed is above the threshold, then only some of the cursor's changes are permitted and others are not. For example, the color of the cursor changes while the size and shape is not able to change. In some embodiments, when the cursor speed is below the threshold, the cursor is in full animation mode and when the cursor speed is above the threshold, the cursor is in reduced or no animation mode).

The above-described manner of animating the cursor (e.g., by changing the appearance of the cursor by a first magnitude if the cursor's movement speed is below a threshold, but forgoing changing by the first magnitude when the cursor's movement speed is above the threshold) provides a quick and efficient manner of displaying the cursor (e.g., by disabling or reducing certain animations if the user is moving the cursor quickly, which prevents the cursor from constantly changing size, shape, and/or color when the user is not likely interacting with the user interface elements that the cursor is moving past), which simplifies the interaction between the user and the electronic device and enhances the operability of the electronic device and makes the user-device interface more efficient (e.g., by preventing sudden changes in the user interface that could be distracting or jarring to the user experience), which additionally reduces power usage and improves battery life of the electronic device by enabling the user to use the electronic device more quickly and efficiently while reducing errors in the usage of the device.

In some embodiments, moving the cursor while maintaining display of the cursor in the user interface (858), such as in FIGS. 6CX-6CZ, includes: changing a size of the cursor based on a velocity of the cursor (optionally, a speed of the cursor) (860), such as in FIGS. 6CX-6CZ (e.g., while the cursor is moving in the user interface (such as in response to a cursor movement input), the size of the cursor scales based on the movement speed). In some embodiments, as the cursor speed increases, the size of the cursor increases and as the cursor speed decreases, the size of the cursor decreases. For example, if the movement is below a threshold, then the cursor has a default size. If the movement is above the threshold and within a certain speed window, then the cursor optionally has a medium size. And if the movement is above the speed window, then the cursor optionally has a large size. In some embodiments, the cursor scales linearly with the cursor speed. In some embodiments, the cursor size does not scale linearly with the cursor speed. In some embodiments, the cursor maintains a default size until the speed reaches a threshold amount, at which point the cursor begins to scale based on speed. In some embodiments, the cursor size is asymptotic (e.g., approaches a maximum size and/or the default size as speed increases or decreases, respectively). In some embodiments, the cursor size changes while maintaining the shape of the cursor. In some embodiments, the cursor size changes only if the cursor has the default shape. For example, if the shape of the appearance is changing due to selecting user interface elements for input as the cursor is moving, then the size of the cursor does not depend on the cursor's speed. Thus, the cursor size is based on cursor speed only when it is not selecting objects for input. In some embodiments, after the cursor stops moving and scales back to its default size and/or shape, the cursor gradually fades away and/or hides (e.g., gradually ceases to be displayed) after a user input directed to the cursor is not received for a threshold amount of time, such as in FIGS. 6BB-6BE.

The above-described manner of animating the cursor (e.g., by changing the size of the cursor based on the cursor's movement speed) provides a quick and efficient manner of displaying the cursor (e.g., by increasing the cursor size as the cursor speed increases, thus increasing the user's ability to see and track the cursor as its moving in the user interface), which simplifies the interaction between the user and the electronic device and enhances the operability of the electronic device and makes the user-device interface more efficient (e.g., by helping the user see the cursor even if it is moving quickly and preventing the user from losing the position of the cursor as its moving and requiring the user to perform additional inputs to find the cursor or move it to its originally intended position), which additionally reduces power usage and improves battery life of the electronic device by enabling the user to use the electronic device more quickly and efficiently while reducing errors in the usage of the device.

In some embodiments, while displaying the cursor in the user interface (862), such as in FIG. 6J: in accordance with a determination that one or more criteria are satisfied (e.g., the one or more criteria optionally includes a criterion that is satisfied when the cursor speed is below a threshold and/or a criterion that is satisfied when the respective user interface element is selectable for input or otherwise interactable), the device displays (864) the cursor with a shape based on one or more characteristics of a respective user interface element at which the cursor is located, such as in FIG. 6J (e.g., the size, shape, and/or appearance of the cursor is based on the characteristics of the respective user interface element including its size, shape, color, type, and/or how the user interacts with it).

For example, certain selectable user interface elements cause the cursor to be circular while others cause the cursor to be rectangular, etc. as will be described in more detail below. In some embodiments, the cursor changes appearance and the respective user interface element is selected for input as described above with respect to method 700.

In some embodiments, in accordance with a determination that the one or more criteria are not satisfied (e.g., the cursor is above a speed threshold, the cursor is not at a location of a user interface object that is selectable for input, etc.), the device displays (866) the cursor with a respective shape that is not based on the one or more characteristics of the respective user interface element at which the cursor is located, such as in FIG. 6G (e.g., a default shape for the cursor, such as circular, or the previous shape of the cursor).

The above-described manner of displaying the cursor (e.g., having a shape based on characteristics of a user interface element) provides a quick and efficient manner of indicating that a user interface element is selected for input (e.g., by changing the shape of the cursor to accommodate the user interface element that is selected for input), which simplifies the interaction between the user and the electronic device and enhances the operability of the electronic device and makes the user-device interface more efficient (e.g., by visually indicating that user inputs via the device that controls cursor movements will be directed at the user interface element), which additionally reduces power usage and improves battery life of the electronic device by enabling the user to use the electronic device more quickly and efficiently while reducing errors in the usage of the device.

In some embodiments, the one or more criteria are not satisfied when the cursor is located at a first type of user interface element (868), such as in FIG. 6G (e.g., general content, content that is not selectable for input, etc.) and the respective shape of the cursor is circular (870), such as in FIG. 6G (e.g., if the cursor is at the location of general content or content that is not otherwise selectable for input by a cursor, then the shape of the cursor is the default shape and does not conform to the user interface element). In some embodiments, the default shape of the cursor is circular. In some embodiments, the one or more criteria includes a criterion that is satisfied when the cursor is located at a second type of user interface element, different from the first type. In some embodiments, the second type of user interface element is a user interface element that is selectable or otherwise interactable by the user (e.g., a button, an affordance, a text entry region, etc.).

The above-described manner of displaying the cursor (e.g., having a circular shape when it is not based on the characteristics of a user interface element) provides a quick and efficient manner of maintaining the cursor in the user interface (e.g., by maintaining the shape of the cursor at a default shape except for when the cursor is at a location of an element that is selectable for input), which simplifies the interaction between the user and the electronic device and enhances the operability of the electronic device and makes the user-device interface more efficient (e.g., by visually indicating that no user interface element is currently selected for input, which prevents the user from attempting to perform inputs directed to elements that are not selectable for input or are not otherwise interactable), which additionally reduces power usage and improves battery life of the electronic device by enabling the user to use the electronic device more quickly and efficiently while reducing errors in the usage of the device.

In some embodiments, the respective user interface element comprises text (872), such as in FIG. 6Y (e.g., text in the user interface that is selectable by the user (optionally only if it's editable, optionally regardless of whether or not it is editable), text in a text entry region which the user is able to select and/or edit, and/or a text entry region (optionally regardless of whether it has text) in which the user is able to insert text) and the shape of the cursor is a vertical bar (874), such as in FIG. 6Y (e.g., an I-beam, etc. For example, when the cursor is at the location of text or a text insertion region, the cursor is displayed as an I-beam to indicate that the user is able to perform a selection input (e.g., click input) to cause selection of the text (optionally highlighting one or more letters in response to a swipe input (while maintaining the selection input) moving the cursor across the one or more letters to be highlighted) or to place a text insertion cursor for use in inserting text via a virtual or external keyboard). In some embodiments, when the cursor is at the location of text or text entry region and the shape of the cursor is a vertical bar, the text or text entry region is not selected for input until the user performs a selection input (e.g., a click input) on the text or text entry region. In some embodiments, when the cursor is at the location of text or text entry region and the shape of the cursor is a vertical bar, the text or text entry region is selected for input, and text entry from a keyboard will be inserted at the location of the cursor without the need for an intervening selection input.

The above-described manner of displaying the cursor (e.g., having a vertical bar shape when the user interface element is text) provides a quick and efficient manner of indicating that the user is interacting with text (e.g., by changing the shape of the cursor to a recognizable cursor shape commonly associated with text), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently while reducing errors in the usage of the device.

In some embodiments, the respective user interface element is a rectangular selectable affordance (876), such as in FIG. 6J (e.g., a button, a selectable user interface element, etc.) and the shape of the cursor is rectangular (878), such as in FIG. 6J (e.g., the cursor has a rectangular shape and conforms to the shape of the respective user interface element). For example, the cursor appears as a rectangular highlighting around the respective user interface element. In some embodiments, the size of the cursor is slightly larger than the user interface element. In some embodiments, if the affordance has a border with a particular shape, the cursor optionally conforms to the shape of the border (e.g., if the border is circular, the cursor is optionally circular). In some embodiments, the cursor is rectangular, regardless of whether the affordance has a circular border.

The above-described manner of displaying the cursor (e.g., having a rectangular shape when the user interface element is a selectable affordance) provides a quick and efficient manner of indicating that an affordance is selected for input (e.g., by changing the shape of the cursor to accommodate the user interface element that is selected for input), which simplifies the interaction between the user and the electronic device and enhances the operability of the electronic device and makes the user-device interface more efficient (e.g., by visually highlighting the affordance to indicate that user inputs will be directed at the user interface element), which additionally reduces power usage and improves battery life of the electronic device by enabling the user to use the electronic device more quickly and efficiently while reducing errors in the usage of the device.

In some embodiments, the one or more criteria include a criterion that is satisfied when the velocity of the cursor (optionally, speed of the cursor) is below a predetermined threshold velocity (optionally, a predetermined threshold speed) (880), such as in FIG. 6AM (e.g., if the cursor is moving slower than 0.5 inch/second, 1 inch/second, 2 inches/second, 5 inches/second, etc., then the appearance of the cursor changes as the cursor moves across different user interface objects).

For example, if the user moves the cursor past two affordances, the appearance of the cursor is modified based on the first affordance, and then the second affordance and optionally to the default shape before, after, and between the two affordances. In such embodiments, when the appearance of the cursor is modified, the respective affordance is selected for input as described above with respect to method 700. In some embodiments, the one or more criteria is not satisfied when the speed of the cursor is above the predetermined threshold speed. In such embodiments, the cursor maintains the default size and shape, and the user interface objects that the cursor moves past are optionally not selected for input. In some embodiments, if the cursor has a speed above the threshold when the cursor reaches the location of a respective user interface element and then the cursor slows down below the threshold (e.g., slows down or stops altogether), then the respective user interface element is optionally selected for input and the shape of the cursor is modified to be based on the respective user interface element.

The above-described manner of displaying the cursor (e.g., having a shape based on user interface elements if the speed is less than a predetermined threshold) provides a quick and efficient manner of selecting user interface objects for input when the user is likely interested in selecting objects for input (e.g., by changing the shape of the cursor and selecting user interface objects for input only if cursor speed is less than a threshold, but not when the cursor speed is above a threshold and the user is likely not intending to select certain objects for input), which simplifies the interaction between the user and the electronic device and enhances the operability of the electronic device and makes the user-device interface more efficient (e.g., by only changing the shape of the cursor if the cursor speed is below a threshold, thus preventing sudden changes in the shape of the cursor that could be distracting or jarring to the user experience), which additionally reduces power usage and improves battery life of the electronic device by enabling the user to use the electronic device more quickly and efficiently while reducing errors in the usage of the device.

In some embodiments, in response to receiving the first user input (882), such as in FIG. 6CJ: in accordance with a determination that the first user input corresponds to a request to select an area of the user interface based on a movement component of the first user input, such as in FIG. 6CJ (e.g., mechanical actuation or a pressure above a threshold amount and a movement of a contact detected at an external touchpad while maintaining the mechanical actuation or pressure above the threshold amount), the device expands (884) a size of the cursor based on the movement component of the first user input to indicate the area of the user interface for selection, such as in FIG. 6CJ (e.g., changing the size and/or shape of the cursor itself based on the movement component).

In some embodiments, the drag input is a movement of the contact from the press input (e.g., single finger click and drag). In some embodiments, the press input and the drag input are separate contacts (e.g., one finger clicking, another finger dragging). In some embodiments, the request to select an area of the user interface includes a request to select from among a plurality of selectable objects. In some embodiments, the cursor becomes the selection indicator and any objects within the cursor become selected for input (optionally as the cursor encompasses the items or when the input is terminated, such as upon liftoff of the contact from the touchpad). Thus, in some embodiments, a separate selection box (e.g., separate from the cursor) is not displayed. In some embodiments, the shape of the cursor is rectangular and one of the vertices (e.g., the "starting" point) is the location of the cursor when the input was first received. In some embodiments, the starting point is fixed at the location of the cursor when the input was first received and the opposite vertex (e.g., the opposite corner defined by the corner towards which the drag input is directed) is controlled by the movement component of the first user input to expand or contract the cursor.

The above-described manner of selecting an area of the user interface (e.g., by expanding the cursor itself as the indicator of the area of selection) provides a quick and efficient manner of selecting multiple user interface objects for input (e.g., by using the cursor itself as the selection indicator without displaying a separate box), which simplifies the interaction between the user and the electronic device and enhances the operability of the electronic device and makes the user-device interface more efficient (e.g., by using the cursor as the point of interest and indicating that all items selected by the cursor will be selected for input), which additionally reduces power usage and improves battery life of the electronic device by enabling the user to use the electronic device more quickly and efficiently while reducing errors in the usage of the device.

In some embodiments, the cursor is expanded from a respective size and shape based on the one or more characteristics of the respective user interface element at which the cursor is located (886), such as in FIG. 6CJ and FIG. 6CP (e.g., the respective size and shape of the cursor is the size and shape of the cursor when the request to select an area of the user interface is received (e.g., the initial size and/or shape of the cursor)). In some embodiments, the respective size and shape is based on the size and shape of the user interface element that is selected for input when the input is received. Thus, for example, if the cursor has a default circular size and shape, then the cursor begins expanding from the circular size and shape at the point of the cursor. On the other hand, if an affordance is selected for input and the cursor has a rectangular shape and a larger size (larger than the default size), then the cursor begins expanding from the rectangular shape and the larger size. Thus, in such embodiments, the cursor is initially able to select a larger area of the user interface when the initial size of the cursor is larger than the default size.

The above-described manner of selecting an area of the user interface (e.g., by expanding the cursor from an initial size and shape based on the size and shape of the cursor defined by the user interface element that is selected for input when the input was received) provides a quick and efficient manner of selecting multiple similar user interface objects for input (e.g., by using the current size and shape of the cursor to determine the initial size and shape of the selection indicator without requiring the user to perform additional inputs to expand the cursor when a respective user interface element is already selected for input), which simplifies the interaction between the user and the electronic device and enhances the operability of the electronic device and makes the user-device interface more efficient (e.g., by determining that the user likely intends to select more items of a similar type to the item that currently is selected for input (likely of similar size and shape) and thus using the size and shape of the item that is currently selected for input as the initial size for the selection indicator), which additionally reduces power usage and improves battery life of the electronic device by enabling the user to use the electronic device more quickly and efficiently while reducing errors in the usage of the device.

In some embodiments, while displaying the cursor in the user interface having the shape based on the respective user interface object, the device receives (888) a second user input corresponding to a scrolling input, such as in FIG. 6BS (e.g., while the respective user interface object is selected for input, receiving a scrolling input). In some embodiments, the scrolling input is a multi-finger swipe gesture (e.g., two-finger swipe) detected on an external touchpad. In some embodiments, the scrolling input is a selection of a navigation key on a keyboard (e.g., page-up key, page-down key, arrow keys, etc.

In some embodiments, in response to receiving the second user input, the device performs (890) a first scrolling of a content of the user interface, such as in FIG. 6BS (e.g., scrolling the user interface in accordance with the scrolling input). In some embodiments, after performing the first scrolling, the device displays (892) the cursor in the user interface having a shape that is not based on content under the cursor in the user interface, such as in FIG. 6BT (e.g., after scrolling the user interface, the content at the location of the cursor is different from the content that was at the location of the cursor before the scrolling input). In some embodiments, the cursor remains in the same position in the user interface when the user interface is scrolled (as described above with respect to method 700) and the content scrolls such that the content that was at the position of the cursor scrolls away from the cursor and other content is scrolled to the position of the cursor. In some embodiments, if the new content is not able to be selected for input or otherwise not interactable by the user (e.g., content of the first type, general content, etc.), then the shape of the cursor is not based on the content. In some embodiments, the cursor is displayed in the user interface after scrolling the user interface. In some embodiments, the cursor is hidden after scrolling the user interface and is re-displayed with the updated shape in response to detecting a user input that causes the cursor to be displayed as described herein.

In some embodiments, while displaying the cursor in the user interface having the shape that is not based on content under the cursor in the user interface, the device receives (894) a third user input corresponding to a scrolling input, such as in FIG. 6BU (e.g., receiving another scrolling input further scrolling the user interface). In some embodiments, in response to receiving the third user input, the device performs (896) a second scrolling of the content of the user interface, such as in FIG. 6BU (e.g., scrolling the user interface in accordance with the scrolling input). In some embodiments, after performing the second scrolling, the device displays (898) the cursor in the user interface having a shape that is based on content under the cursor in the user interface, such as in FIG. 6BW (e.g., after scrolling the user interface, the new content at the location of the cursor is able to be selected for input and/or interactable by the user). In some embodiments, the shape of the cursor is, thus, based on the content. Thus, in some embodiments, the new content at the location of the cursor after scrolling is selected for input.

The above-described manner of displaying the cursor after scrolling the user interface (e.g., with a size and/or shape based on the content at the location of the cursor if the content at the location of the cursor is selectable for input) provides a quick and efficient manner of selecting user interface objects for input (e.g., by automatically selecting an object for input if the object is scrolled to the location of the cursor), which simplifies the interaction between the user and the electronic device and enhances the operability of the electronic device and makes the user-device interface more efficient (e.g., by automatically selecting an object for input without requiring the user to move the cursor or perform additional inputs to select the object for input), which additionally reduces power usage and improves battery life of the electronic device by enabling the user to use the electronic device more quickly and efficiently while reducing errors in the usage of the device.

In some embodiments, in response to receiving the first user input (899), such as in FIG. 6K: in accordance with a determination that the first user input is a selection input (e.g., a tap on a touch-sensitive surface, a click on a touch-sensitive surface, a click on a mouse, etc.), the device animates (897) the cursor, including modifying one or more visual characteristics of the cursor, such as in FIG. 6K (e.g., displaying an animation of the cursor indicative of a selection or click). In some embodiments, the animation includes modifying the visual characteristics of the cursor such as changing the size of the cursor (e.g., making the cursor smaller as the click down occurs, and then reverting the size of the cursor as the click up occurs) and/or changing the color of the cursor. In some embodiments, the cursor reduces in size in response to the selection input, the cursor becomes darker in response to the selection input, the cursor becomes less transparent in response to the selection input, or any combination of these. In some embodiments, the visual characteristics of the cursor revert upon the termination of the selection input (e.g., upon click-release).

The above-described manner of reacting to a selection input (e.g., by modifying the visual characteristics of the cursor in response to the selection input) provides a quick and efficient manner of visually indicating a selection input (e.g., by modifying the visual characteristic of the cursor in response to a selection input both when the cursor's appearance is based on a user interface object that is selected for input and when the cursor has a default appearance), which simplifies the interaction between the user and the electronic device and enhances the operability of the electronic device and makes the user-device interface more efficient (e.g., by visually acknowledging the user's input without requiring the user to perform additional inputs to determine whether the user's inputs are being properly received and will cause selection of the object that is currently selected for input), which additionally reduces power usage and improves battery life of the electronic device by enabling the user to use the electronic device more quickly and efficiently while reducing errors in the usage of the device.

In some embodiments, in response to receiving the first user input (895), such as in FIG. 6K: in accordance with the determination that first user input is the selection input (893-1), such as in FIG. 6K (e.g., a tap on a touch-sensitive surface, a click on a touch-sensitive surface, a click on a mouse, etc.): in accordance with a determination that a respective user interface object is selected for input (e.g., the cursor has highlighted the respective user interface object), the device animates (893-2) the respective user interface object, including modifying one or more visual characteristics of the respective user interface object, such as in FIG. 6K (e.g., displaying an animation of the respective user interface object indicative of a selection or click).

In some embodiments, the animation includes modifying the visual characteristics of the respective user interface object such as changing the size of the user interface object and/or changing the color of the user interface object. In some embodiments, the respective user interface object reduces in size in response to the selection input, the respective user interface object becomes darker in response to the selection input, or any combination of these. In some embodiments, these changes in visual characteristics of the respective user interface object change as the selection input is initiated (e.g., upon click-down), and in some embodiments, the visual characteristics of the respective user interface object revert upon the termination of the selection input (e.g., upon click-release).

The above-described manner of reacting to a selection input (e.g., by modifying the visual characteristics of the user interface object that is selected for input in response to the selection input) provides a quick and efficient manner of visually indicating a selection of the respective user interface object (e.g., by modifying the visual characteristic of the respective user interface object itself when the user performs a selection input), which simplifies the interaction between the user and the electronic device and enhances the operability of the electronic device and makes the user-device interface more efficient (e.g., by visually acknowledging the user's input to indicate that the user's input will cause selection of the respective user interface object without requiring the user to perform additional inputs to determine whether the user's inputs are being properly received), which additionally reduces power usage and improves battery life of the electronic device by enabling the user to use the electronic device more quickly and efficiently while reducing errors in the usage of the device.

In some embodiments, the first user input corresponds to a request to move a first user interface object in the user interface and includes a press input (891), such as in FIG. 6CA (e.g., a selection on the first user interface object and drag input both detected on the touch-sensitive display, or a selection input while the first user interface object is selected for input followed by a drag input while maintaining the selection input, both detected via an external touchpad).

In some embodiments, in response to receiving the first user input (889), such as in FIG. 6CA: in accordance with a determination that the first user input is received via a touch-sensitive display of the electronic device (887), such as in FIG. 6CE: in accordance with a determination that the press input is maintained for more than a threshold amount of time (885), such as in FIG. 6CE (e.g., 0.5 seconds, 1 second, 2 seconds, 5 seconds, 8 seconds, etc.): the device enters (883) an object movement mode, such as in FIG. 6CE (e.g., entering a mode in which one or more items are able to be moved in the user interface (e.g., representations of files selectable to display the contents of the files, application icons selectable to display applications, etc.)), and moves (881) the first user interface object in the user interface in accordance with the first user input, such as in FIG. 6CF (e.g., moving the object based on the drag input)

In some embodiments, the respective items that can be moved are updated to display an indication that the items can be moved. In some embodiments, in response to a termination of the first user input, the device remains in object movement mode. In some embodiments, an affordance is displayed to exit object movement mode. In some embodiments, when already in the object movement mode, user interface objects can be moved by selecting and dragging the objects without requiring the selection to be maintained for more than the threshold amount of time. In some embodiments, if the press input is maintained for less than the predetermined threshold amount of time, the device does not enter into object movement mode and user interface objects cannot be moved. In some embodiments, if the press input is maintained for less than the predetermined threshold amount of time and is followed by a drag input, the input is interpreted as a swipe input rather than a click-and-drag input (e.g., which optionally causes interacting with the user interface other than object movement, such as scrolling the user interface in accordance with the swipe).

In some embodiments, in accordance with a determination that the first user input is received via an external touch-sensitive surface of the one or more input devices (879), such as in FIG. 6CA (e.g., an external touchpad or mouse): the device enters (877) the object movement mode independent of whether the press input is maintained for more than the threshold amount of time, such as in FIG. 6CA (e.g., entering a mode in which the first user interface object is able to be moved in the user interface), and moves (875) the first user interface object in the user interface in accordance with the first user input, such as in FIG. 6CA (e.g., moving the object based on the drag input). In some embodiments, the user is not required to maintain the press input for more than the threshold amount of time to be able to move the first user interface object. Thus, in some embodiments, a drag input following the press input causes the first user interface object to move in accordance with the first user input. In some embodiments, upon termination of the first user input, the device exits object movement mode.

The above-described manner of moving a user interface object (e.g., by allowing the user interface object to be moved after a press input if it is maintained for more than a threshold amount of time if the input is received on the touch-sensitive display, but otherwise allowing the object to be moved without requiring the press input to be maintained for more than the threshold amount of time if the input is received on an external touch-sensitive surface) provides a quick and efficient manner of moving a user interface object (e.g., by requiring confirmation in the form of requiring the user to maintain the press input if the input is received on the touch-sensitive display, but not requiring confirmation if the input is received on an external touch-sensitive surface), which simplifies the interaction between the user and the electronic device and enhances the operability of the electronic device and makes the user-device interface more efficient (e.g., by preventing accidentally moving the user interface object when the user is interacting with the object using a touch-sensitive display while not requiring the same level of confirmation from a touch-sensitive surface due to inputs on an external touch-sensitive surface likely being intentional), which additionally reduces power usage and improves battery life of the electronic device by enabling the user to use the electronic device more quickly and efficiently while reducing errors in the usage of the device.

In some embodiments, while displaying the cursor in the user interface (873), such as in FIG. 6J: in accordance with a determination that a current location of the cursor corresponds to a location of a respective selectable user interface object and one or more criteria are satisfied (e.g., the cursor speed is below a threshold speed, the user interface object is able to be selected for input, and/or the user interface object is below a size threshold), the device displays (871) the cursor overlaid by the respective selectable user interface object, such as in FIG. 6J (e.g., the cursor has an appearance based on the respective selectable user interface object and is displayed below (behind, overlaid by) the respective selectable user interface object).

In some embodiments, the cursor is a similar (e.g., same) shape to the respective selectable user interface object and is larger than the respective selectable user interface object such that the cursor visually appears to be highlighting the respective selectable user interface object. In some embodiments, if the one or more criteria are not satisfied, then the cursor is displayed overlaying the respective selectable user interface object (optionally with a default shape and size).

The above-described manner of displaying the cursor (e.g., overlaid by the respective user interface object that is selected for input, or otherwise overlaying the content in the user interface if no object is selected for input) provides a quick and efficient manner of maintaining the cursor in the user interface, which simplifies the interaction between the user and the electronic device and enhances the operability of the electronic device and makes the user-device interface more efficient (e.g., by displaying the cursor prominently when no object is selected for input, but otherwise displaying the cursor below the object that is selected for input thus visually emphasizing the object that is selected for input), which additionally reduces power usage and improves battery life of the electronic device by enabling the user to use the electronic device more quickly and efficiently while reducing errors in the usage of the device.

In some embodiments, while displaying the user interface including the cursor (869), such as in FIG. 6BB: in accordance with a determination that no user interface object is selected for input (867), such as in FIG. 6BB (e.g., the cursor has a default size and shape and no object is selected for input): the device determines (865) that no user input has been received, via the one or more input devices, for more than a first predetermined threshold amount of time, such as in FIGS. 6BC-6BE (e.g., 5 seconds, 10 seconds, 30 seconds, 1 minute, 2 minutes, 5 minutes, etc.), and in response to determining that no user input has been received for more than the first predetermined threshold amount of time, the device ceases (863) display of the cursor, such as in FIGS. 6BC-BE (e.g., fading out the cursor from the user interface).

In some embodiments, in accordance with a determination that a user interface object is selected for input (861), such as in FIG. 6BH (e.g., the cursor has a size and/or shape based on the user interface object and/or the user interface object is selected for input): the device determines (859) that no user input has been received, via the one or more input devices, for more than a second predetermined threshold amount of time, more than the first predetermined threshold amount of time, such as in FIG. 6BJ (e.g., 30 seconds, 1 minute, 2 minutes, 5 minutes, 10 minutes, etc.), and in response to determining that no user input has been received for more than the second predetermined threshold amount of time, the device ceases (857) display of the cursor, such as in FIG. 6BJ (e.g., fading out the cursor from the user interface). Thus, display of the cursor is maintained longer when a user interface object is selected for input than when no object is selected for input. In some embodiments, ceasing selecting the user interface object for input.

The above-described manner of ceasing display of the cursor (e.g., after no input has been received for different threshold periods of time based on whether an object has been selected for input) provides a quick and efficient manner of removing the cursor from the user interface based on whether the user is likely to interact with the cursor (e.g., by using a longer time-out period when an object is selected for input than when no object is selected for input), which simplifies the interaction between the user and the electronic device and enhances the operability of the electronic device and makes the user-device interface more efficient (e.g., by automatically determining whether the user is likely to use the cursor and ceasing display of the cursor without requiring the user to perform additional inputs to disable display of the cursor), which additionally reduces power usage and improves battery life of the electronic device by enabling the user to use the electronic device more quickly and efficiently while reducing errors in the usage of the device.

In some embodiments, the cursor is translucent (855), such as in FIG. 6BP (e.g., at least partially transparent (e.g., 10% transparency, 30% transparency, 50% transparency, 70% transparency, etc.)). In some embodiments, the transparency of the cursor is dynamic and changes based on the context, environment, the characteristics of the content in the user interface beneath the cursor, etc.

The above-described manner of displaying of the cursor (e.g., with translucency) provides a quick and efficient manner of displaying the cursor concurrently with the contents of the user interface (e.g., by displaying the cursor with transparency such that the user is able to at least partially see the contents below the cursor), which simplifies the interaction between the user and the electronic device and enhances the operability of the electronic device and makes the user-device interface more efficient (e.g., without requiring the user to perform additional inputs to move the cursor to determine the content below the cursor or whether the cursor is at the user's intended position), which additionally reduces power usage and improves battery life of the electronic device by enabling the user to use the electronic device more quickly and efficiently while reducing errors in the usage of the device.

In some embodiments, a color of the cursor is based on a color of a portion of the user interface over which the cursor is overlaid (853), such as in FIGS. 6DA-6DW (e.g., at least one color component of the cursor changes dynamically based on at least one color component of the portion of the user interface over which the cursor is overlaid). For example, any of the luminance value, brightness value, contrast value, red/blue/green value, any other color parameter, etc. changes dynamically based on at least one color component of the portion of the user interface over which the cursor is overlaid. In some embodiments, the color of the cursor is adjusted such that the cursor is distinguishable from the content of the user interface (e.g., such that the cursor can be easily identified). In some embodiments, the color of the portion of the user interface over which the cursor is overlaid is continuously sampled or sampled at a predetermined frequency (e.g., every 0.5 second, every 1 second, every 2 seconds, every 5 seconds, etc.) and the color is updated or adjusted based on the results of the sampling. For example, if the portion of the user interface over which the cursor is overlaid has a first luminance value, then the cursor has a second luminance value, and if the portion of the user interface over which the cursor is overlaid has a third luminance value, then the cursor had a fourth luminance value. In some embodiments, updating or adjusting the color from a first color to a second color includes displaying an animation of the color gradually changing from the first color to the second color.

The above-described manner of displaying of the cursor (e.g., with a color that is based on the content below the cursor) provides a quick and efficient manner of distinguishing the cursor from the contents of the user interface (e.g., by basing the cursor color on the content over which the cursor is overlaid and displaying the cursor with a different color such that the user is able to easily identify the cursor separate from the contents of the user interface), which simplifies the interaction between the user and the electronic device and enhances the operability of the electronic device and makes the user-device interface more efficient (e.g., without requiring the user to perform additional inputs to locate the cursor), which additionally reduces power usage and improves battery life of the electronic device by enabling the user to use the electronic device more quickly and efficiently while reducing errors in the usage of the device.

In some embodiments, the device displays (851) the cursor over a first portion of the user interface, wherein the first portion of the user interface has a first color, and the cursor is displayed with a second color, such as in FIG. 6DA (e.g., the color of the cursor is based on the color of the first portion of the user interface and is optionally different from the color of the first portion of the user interface). In some embodiments, while displaying the cursor with the second color over the first portion of the user interface, the device receives (849), via the one or more input devices, the first user input, wherein the first user input is the cursor movement input for moving the cursor from the first portion of the user interface to a second portion of the user interface, wherein the second portion of the user interface has a third color, different than the first color, such as in FIG. 6DB (e.g., moving the cursor to another portion of the user interface that has a different color than the first portion of the user interface).

In some embodiments, moving the cursor while maintaining display of the cursor in the user interface (847), such as in FIG. 6DB, includes: moving the cursor from the first portion of the user interface to the second portion of the user interface (845) (e.g., in accordance with the cursor movement input) and while displaying the cursor over the second portion of the user interface, displaying the cursor with a fourth color, different than the second color (843), such as in FIG. 6DB (e.g., changing the color of the cursor from the second color to the fourth color based on the color of the second portion of the user interface, which is optionally different from the color of the second portion of the user interface).

The above-described manner of changing the color of the cursor (e.g., in response to moving the cursor from a portion of the user interface with a different color than the previous portion of the user interface) provides a quick and efficient manner of distinguishing the cursor from the contents of the user interface (e.g., by changing the cursor color as the cursor moves within the user interface to portions with different colors), which simplifies the interaction between the user and the electronic device and enhances the operability of the electronic device and makes the user-device interface more efficient (e.g., by automatically maintaining the visibility of the cursor throughout the user interface without requiring the user to perform additional inputs to locate the cursor), which additionally reduces power usage and improves battery life of the electronic device by enabling the user to use the electronic device more quickly and efficiently while reducing errors in the usage of the device.

In some embodiments, the device displays (842) the cursor over a first portion of the user interface, wherein the first portion of the user interface has a first color, and the cursor is displayed with a second color, such as in FIG. 6DT (e.g., the color of the cursor is based on the color of the first portion of the user interface and is optionally different from the color of the first portion of the user interface). In some embodiments, while displaying the cursor with the second color over the first portion of the user interface, the device determines (839) that the first portion of the user interface has changed from having the first color to having a third color, different than the first color, such as in FIG. 6DU (e.g., the color of the first portion of the user interface changed to a different color.) For example, the first portion of the user interface is a video or a graphics element that changes color over time.

In some embodiments, in response to determining that the color of the first portion of the user interface changed from having the first color to having the third color, the device updates (837) the color of the cursor from the second color to a fourth color, different than the second color, such as in FIG. 6DU (e.g., changing the color of the cursor from the second color to the fourth color based on the new color of the first portion of the user interface, which is optionally different from the new color of the first portion of the user interface).

The above-described manner of changing the color of the cursor (e.g., in response to determining that the color of the portion of the user interface over which the cursor is overlaid has changed colors) provides a quick and efficient manner of distinguishing the cursor from the contents of the user interface (e.g., by changing the cursor color as the user interface changes colors), which simplifies the interaction between the user and the electronic device and enhances the operability of the electronic device and makes the user-device interface more efficient (e.g., by automatically maintaining the visibility of the cursor when the user interface changes color, even though the cursor isn't moving, without requiring the user to perform additional inputs to locate the cursor), which additionally reduces power usage and improves battery life of the electronic device by enabling the user to use the electronic device more quickly and efficiently while reducing errors in the usage of the device.

In some embodiments, while displaying the user interface including the cursor (835), such as in FIG. 6DA: in accordance with a determination that a color parameter of the portion of the user interface over which the cursor is overlaid (e.g., luminance value, brightness value, contrast value, hue value, red/blue/green value, any other color parameter, etc.) has a value below a first predetermined threshold value, the device displays (833) the cursor in a first display mode, wherein while in the first display mode, a respective color parameter of the cursor (e.g., luminance value, brightness value, contrast value, red/blue/green value, any other color parameter, etc.) has a value within a first range (e.g., within a first range of values for the respective color parameter) that is greater than the value of the color parameter of the portion of the user interface over which the cursor is overlaid, such as in FIGS. 6DG-6DJ (e.g., if the luminance of the portion of the user interface over which the cursor is overlaid is within a first range, then the cursor is in a first display mode). In some embodiments, the respective color parameter is the same color parameter as the color parameter whose value causes the cursor to be displayed in the first or second display mode. For example, the luminance value of the cursor is based on the luminance value of the portion of the user interface over which the cursor is overlaid. In some embodiments, the respective color parameter is a different color parameter from the color parameter whose value causes the cursor to be displayed in the first or second display mode. For example, the luminance value of the cursor is based on the hue value of the portion of the user interface over which the cursor is overlaid. In some embodiments, the first range is a darker luminance range than the second range described below. In some embodiments, while in the first display mode, the luminance of the cursor is always lighter than the luminance of the portion of the user interface over which the cursor is overlaid. In some embodiments, while the cursor is in the second display mode, the cursor is in a "light" mode (e.g., lighter than the background). Thus, in some embodiments, when the background is dark (e.g., below a luminance threshold), the cursor is lighter than the background.

In some embodiments, in accordance with a determination that the color parameter of the portion of the user interface over which the cursor is overlaid has a value above the first predetermined threshold, the device displays (831) the cursor in a second display mode, wherein while in the second display mode, the respective color parameter of the cursor has a value within a second range that is less than the color parameter of the portion of the user interface over which the cursor is overlaid, such as in FIGS. 6DA-6DF (e.g., if the luminance of the portion of the user interface over which the cursor is overlaid is within a second range, then the cursor is in a second display mode).

In some embodiments, the second range is a lighter luminance range than the first range described above. In some embodiments, while in the second display mode, the luminance of the cursor is always darker than the luminance of the portion of the user interface over which the cursor is overlaid. Thus, in some embodiments, when the background is light (e.g., above a luminance threshold), the cursor is darker than the background. In some embodiments, while the cursor is in the second display mode, the cursor is in a "dark" mode (e.g., darker than the background). In some embodiments, the first predetermined threshold changes depending on whether the cursor is currently in the first or second display mode, as will be described in more detail below. In some embodiments, the first predetermined threshold dynamically changes depending on other factors such as context, device ambient brightness, etc. In some embodiments, the cursor is never completely black and never completely white (e.g., due to switching from one mode to another before reaching completely black or completely white).

The above-described manner of governing the color of the cursor (e.g., displaying the cursor in a first display mode or a second display mode depending on whether the luminance of the user interface is above or below respective threshold values) provides a quick and efficient manner of distinguishing the cursor from the contents of the user interface (e.g., by displaying the cursor as being lighter than the user interface or as being darker than the user interface based on whether the user interface is light or dark), which simplifies the interaction between the user and the electronic device and enhances the operability of the electronic device and makes the user-device interface more efficient (e.g., by automatically maintaining the visibility of the cursor when the user interface changes color without requiring the user to perform additional inputs to locate the cursor), which additionally reduces power usage and improves battery life of the electronic device by enabling the user to use the electronic device more quickly and efficiently while reducing errors in the usage of the device.

In some embodiments, in accordance with a determination that the cursor is in the first color mode, the first predetermined threshold value is a first value (829), such as in FIG. 6DO (e.g., if the cursor is in "light" mode (e.g., lighter than the background), then crossing above the first luminance (e.g., increasing luminance such as when the portion of the user interface under the cursor changes from dark to light) will cause the cursor to switch to "dark" mode (e.g., darker than the background)). In some embodiments, in accordance with a determination that the cursor is in the second color mode, the first predetermined threshold value is a second value, different than the first value (827), such as in FIG. 6DG (e.g., if the cursor is in "dark" mode (e.g., darker than the background), then crossing below the second luminance (e.g., decreasing luminance such as when the portion of the user interface under the cursor changes from light to dark) will cause the cursor to switch to "light" mode (e.g., lighter than the background)).

In some embodiments, the threshold for changing from dark to light is different than the threshold for changing from light to dark. In some embodiments, the threshold is offset such that there is a hysteresis effect to prevent the cursor from rapidly switching between "light" and "dark" mode (e.g., flickering) if the portion of the user interface below the cursor is at or near the threshold luminance. In some embodiments, the luminance threshold to switch from dark to light is lower than the threshold to switch from light to dark (e.g., for the cursor to switch from being darker than the user interface to being lighter than the user interface, the user interface must become darker (less luminance) than the luminance threshold that caused the cursor to switch from being lighter than the user interface to being darker than the user interface).

The above-described manner of changing the first predetermined threshold (e.g., by causing the threshold to have a first value if the cursor is in the first color mode and a second, different, value, if the cursor is in the second color mode) provides a quick and efficient manner of distinguishing the cursor from the contents of the user interface while avoiding chromatic flickering (e.g., by offsetting the threshold at which the cursor switches from light mode to dark mode), which simplifies the interaction between the user and the electronic device and enhances the operability of the electronic device and makes the user-device interface more efficient (e.g., by automatically maintaining the visibility of the cursor when the user interface changes color without producing distracting visual effects), which additionally reduces power usage and improves battery life of the electronic device by enabling the user to use the electronic device more quickly and efficiently while reducing errors in the usage of the device.

It should be understood that the particular order in which the operations in FIGS. 8A-8O have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1200, and 1400) are also applicable in an analogous manner to method 800 described above with respect to FIGS. 8A-8O. For example, selectively displaying a cursor in a user interface described above with reference to method 800 optionally has one or more of the characteristics of the interaction of the cursor with user interface objects, the displaying of a cursor while manipulating objects in the user interface, the dismissing or switching of applications using a cursor, and ways an electronic device displays user interface elements in response to requests to move a cursor beyond an edge of the display, etc., described herein with reference to other methods described herein (e.g., methods 700, 1000, 1200, and 1400). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 8A-8O are, optionally, implemented by components depicted in FIGS. 1A-1B. For example, displaying operations 802, 844, 864, 866, 892, 898, 871, 851, 842, 833, and 831, and receiving operations 804, 888, 894, and 849, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Manipulating Objects with a Cursor

Users interact with electronic devices in many different manners, including manipulating (e.g., resizing, rotating, etc.) objects in a user interface displayed by the electronic device. In some embodiments, an electronic device provides a cursor in the user interface, which is controllable by the user, and allows a user to manipulate objects of interest. The embodiments described below provide ways in which a cursor changes its appearance in response to requests to manipulate content, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 9A-9K illustrate exemplary ways in which an electronic device displays a cursor while manipulating objects in the user interface. The embodiments in these figures are used to illustrate the processes described below, including the processes described with reference to FIGS. 10A-10D.

Figure 9A:
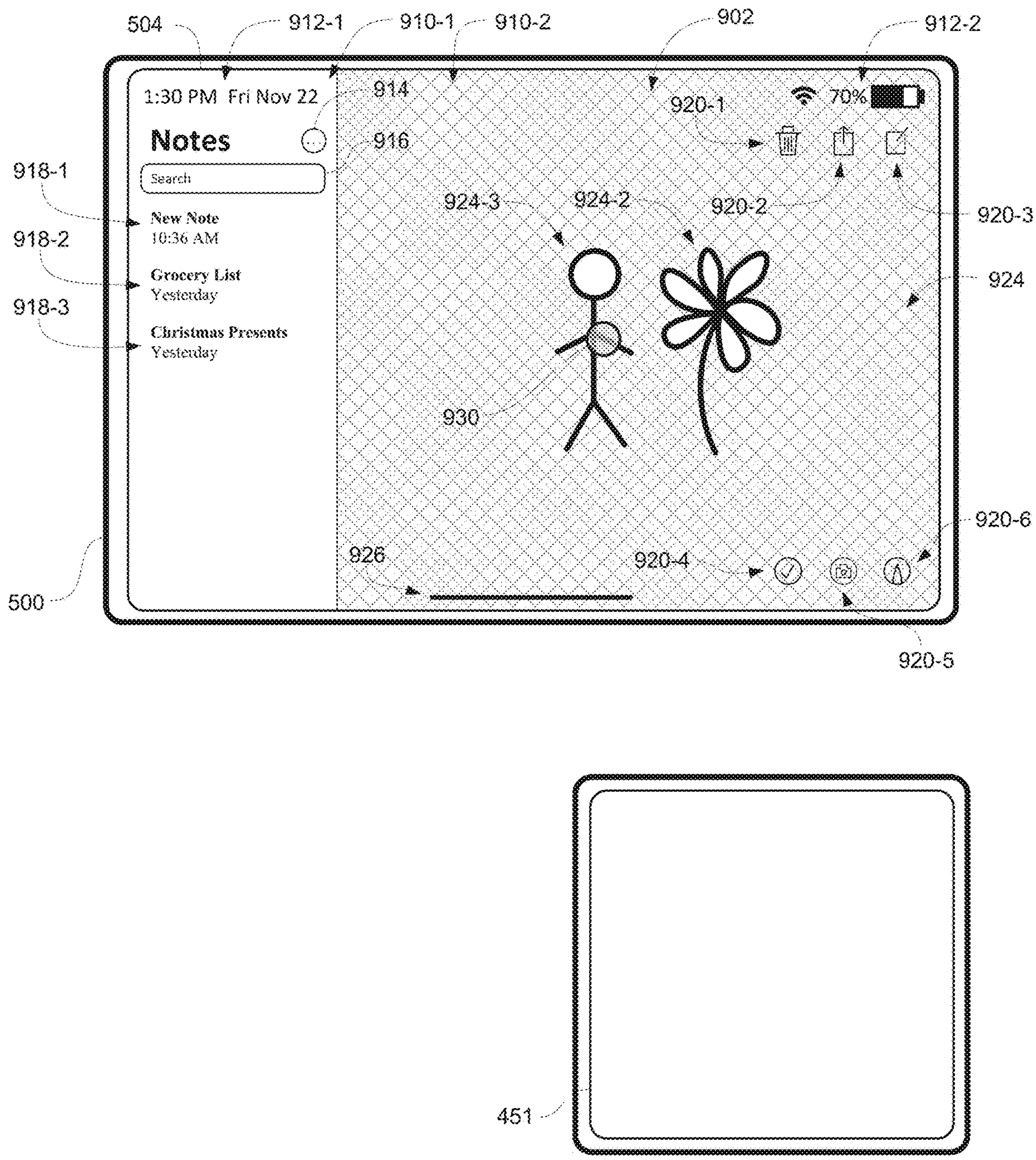
FIGS. 9A-9K illustrate exemplary ways in which an electronic device displays a cursor while manipulating objects in the user interface in accordance with some embodiments.

FIG. 9A illustrates an exemplary device 500 that is capable of displaying a user interface. In some embodiments, the user interface is displayed via a display generation component such as a touch screen display, a monitor, a television, a projector, an integrated or external display device, or any other suitable display device. As shown in FIG. 9A, the electronic device 500 presents user interface 902 on touch screen 504. In some embodiments, user interface 902 is any user interface with content that is manipulable (e.g., resizable and/or rotatable) by a user. In FIG. 9A, user interface 902 is of a note taking application (e.g., similar to user interface 602 described above). In some embodiments, the note taking application includes a first section 910-1 corresponding to a note browsing and selection sidebar and a second section 910-2 corresponding to a content viewing and entry interface. In some embodiments, first section 910-1 includes a contextual menu button 914, a search field 916, and one or more saved notes 918-1 to 918-3. In some embodiments, second section 910-2 includes content viewing and entry region 924, one or more buttons 920-1 to 920-6 for performing one or more functions associated with the note taking application, such as deleting the note, sharing the note, inserting photos, changing writing modes, etc. In some embodiments, user interface 902 includes status indicator 912-1 and 912-2. Status indicator 912-1 optionally is located at the top-left of the user interface and displays the current time and date. Status indicator 912-2 optionally is located at the top-right of the user interface and displays the network connectivity status of the device and/or the battery status of the device. It is understood that status indicators 912-1 and 912-2 can include fewer indicators than those shown or more indicators than those shown. In some embodiments, user interface 902 includes home affordance 926 for dismissing the currently displayed application and displaying either a home screen user interface or an application switching user interface as will be described in more detail below with respect to method 1200.

In FIG. 9A, content viewing and entry region 924 includes a drawing (e.g., a person 924-3 and a flower 924-2). In some embodiments, content viewing and entry region 924 has a background color (as illustrated by the crosshatch). In FIG. 9A, cursor 930 is displayed in the user interface at a particular location in the content viewing and entry region 924 (e.g., near the base of the person's arm in the drawing).

Figure 9B:
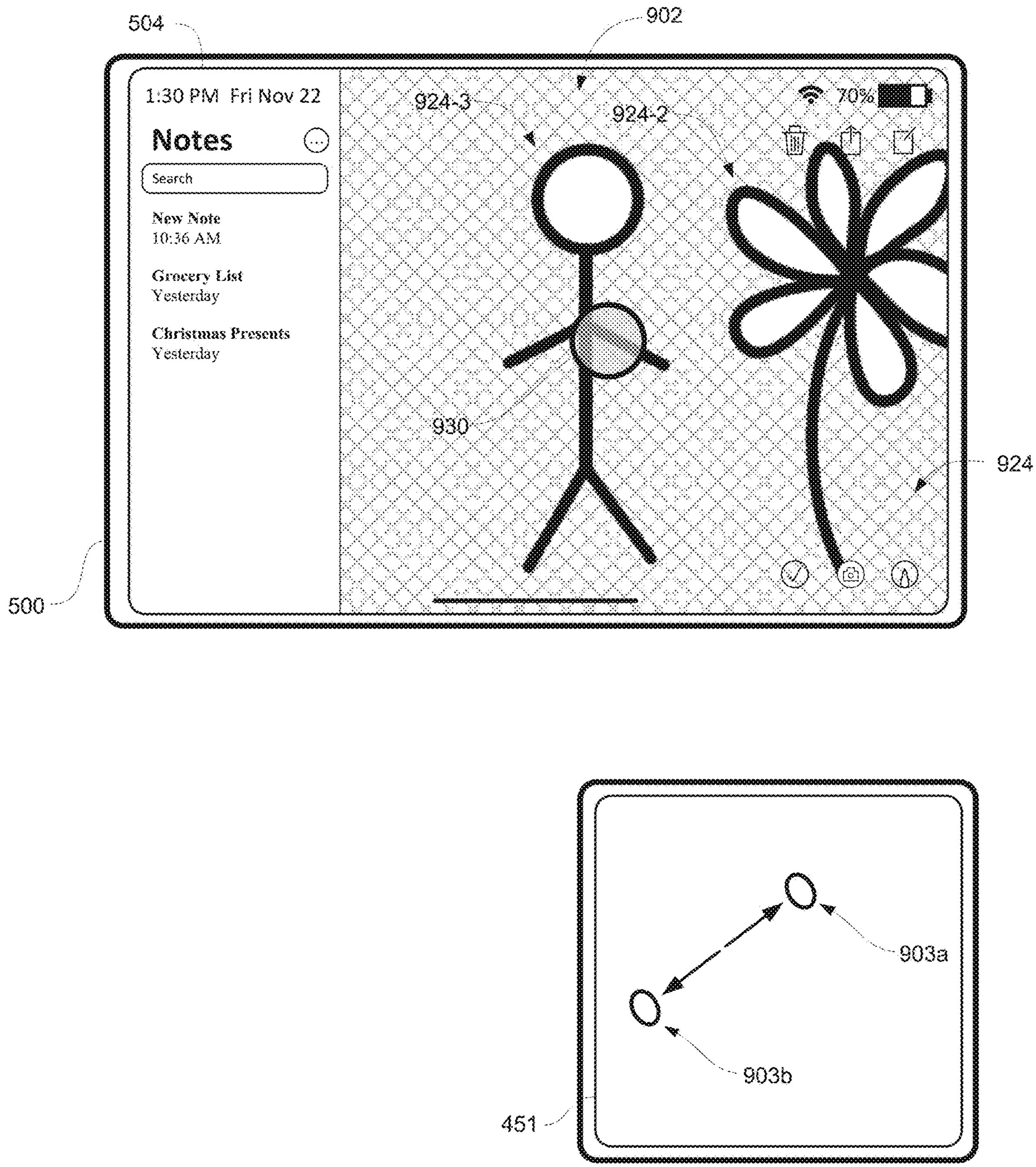

In FIG. 9B, a user input 903 is received on touch sensitive surface 451 (e.g., an external touchpad) corresponding to a request to enlarge (e.g., resize to a larger size) the content in content viewing and entry region 924. In some embodiments, the request to enlarge the content is a two-finger outward pinch gesture, as shown in FIG. 9B (e.g., contacts 903*a* and 903*b* corresponding to the outward swipe of two fingers). In some embodiments, in response to the request to enlarge the content, user input 903 enlarges the content in content viewing and entry region 924 (e.g., the drawing of the person and flower and optionally the background) in accordance with the user input, as shown in FIG. 9B. In some embodiments, the content is enlarged centered around the position of cursor 930. For example, the content at the location of the cursor remains at the position of the cursor (albeit enlarged), while the content that is not at the location of the cursor moves radially outwards away from the location of the cursor as it is being enlarged. For example, as shown in FIG. 9B, the base of the person in the drawing's arm (where the cursor is located) is at the same absolute position on touch screen 504 as before the request to enlarge the content was received. In some embodiments, if cursor 930 were at another location, the enlarging would occur centered at the other location.

In some embodiments, cursor 930 concurrently enlarges proportionately with and when the content in the content viewing and entry region 924 is enlarged (e.g., while enlarging). In some embodiments, cursor 930 is enlarged by the same percentage (e.g., same ratio, same scale) as is the content in the content viewing and entry region 924. Thus, in some embodiments, cursor 930 appears as if it is a part of the content in the content viewing and entry region 924 and enlarges by the same amount (e.g., scaled by the same amount) and the cursor encompasses (e.g., encircles) the same amount of content (e.g., the same amount of the base of the person's arm in the drawing) while the content is being resized.

Figure 9C:
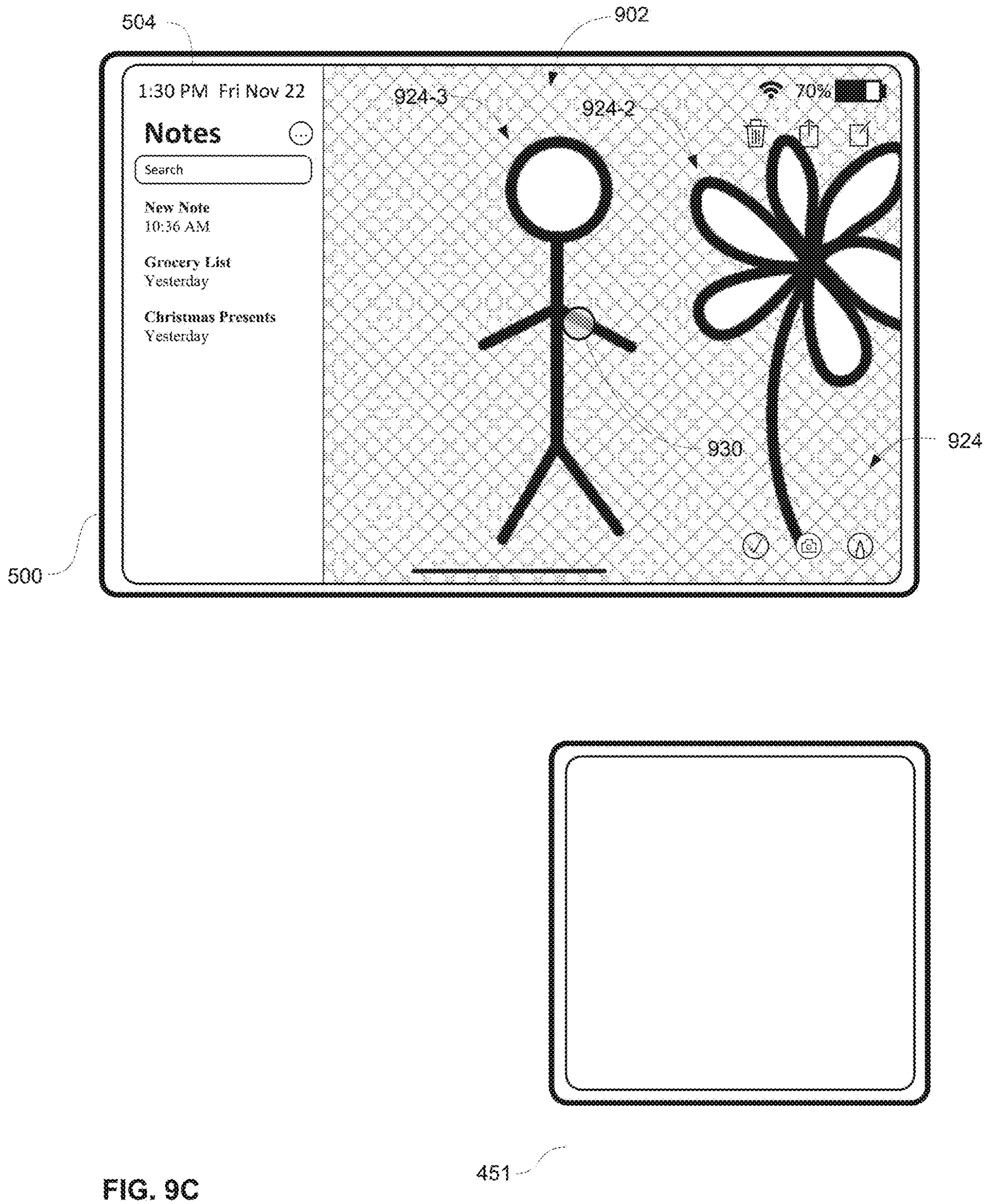

In FIG. 9C, electronic device 500 detects the termination of contacts 903 from touch-sensitive surface 451 (e.g., release of or lift-off of any of contacts 903*a* and 903*b*). In some embodiments, in response to detecting a termination of the user input, device 500 finalizes the resizing of the content in the content viewing and entry region 924. In some embodiments, finalizing the resizing comprises maintaining the view of the content (e.g., the drawing of the person and flower and optionally the background) as the view when the input was terminated (e.g., enlarged or reduced, as the case may be). In some embodiments, in response to the termination of the contacts, cursor 930 returns to its default size and shape, as shown in FIG. 9C (e.g., the size and shape it had before the resizing input was detected). In some embodiments, throughout the resizing operation, the center of cursor 930 remains fixed at its absolute location in user interface 902 and/or on touchscreen 504.

Figure 9D:
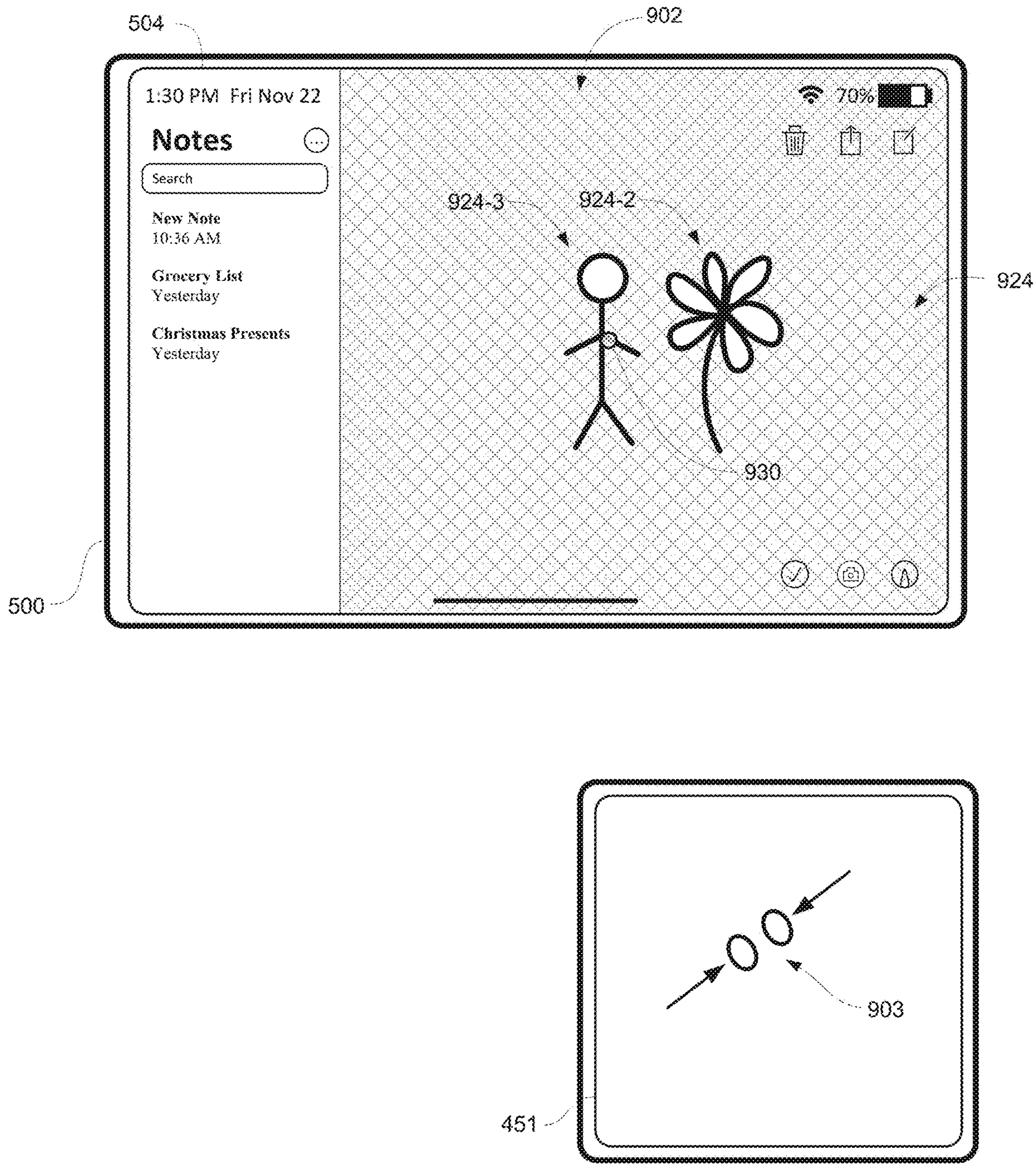

In FIG. 9D, a user input 903 is received on touch sensitive surface 451 corresponding to a request to compress (e.g., resize to a smaller size) the content in content viewing and entry region 924. In some embodiments, the request to compress the content is a two-finger inward pinch gesture, as shown in FIG. 9D. In some embodiments, in response to the request to compress the content, device 500 compresses the content in content viewing and entry region 924 (e.g., the drawing of the person and flower and optionally the background) in accordance with the user input, as shown in FIG. 9D. In some embodiments, the content is compressed centered around the position of cursor 930. For example, the content at the location of the cursor remains at the position of the cursor (albeit compressed), while the content that is not at the location of the cursor moves radially inwards towards the location of the cursor as it is being compressed. For example, as shown in FIG. 9D, the base of the person's arm in the drawing (where the cursor is located) is at the same absolute position on the touch screen as before the request to compress the content was received. In some embodiments, if cursor 930 were at another location, the compression would occur centered at the other location.

In some embodiments, cursor 930 concurrently compresses (e.g., reduces in size) proportionately with and when the content in the content viewing and entry region 924 is compressed (e.g., while compressing). In some embodiments, cursor 930 is compressed by the same percentage (e.g., same scale, same ratio, etc.) as the content in the content viewing and entry region 924 is compressed. Thus, in some embodiments, cursor 930 appears as if it is a part of the content in the content viewing and entry region 924 and compresses by the same amount (e.g., scaled by the same amount) and the cursor encompasses (e.g., encircles) the same amount of content (e.g., the same amount of the base of the person's arm in the drawing) while the content is being resized.

Figure 9E:
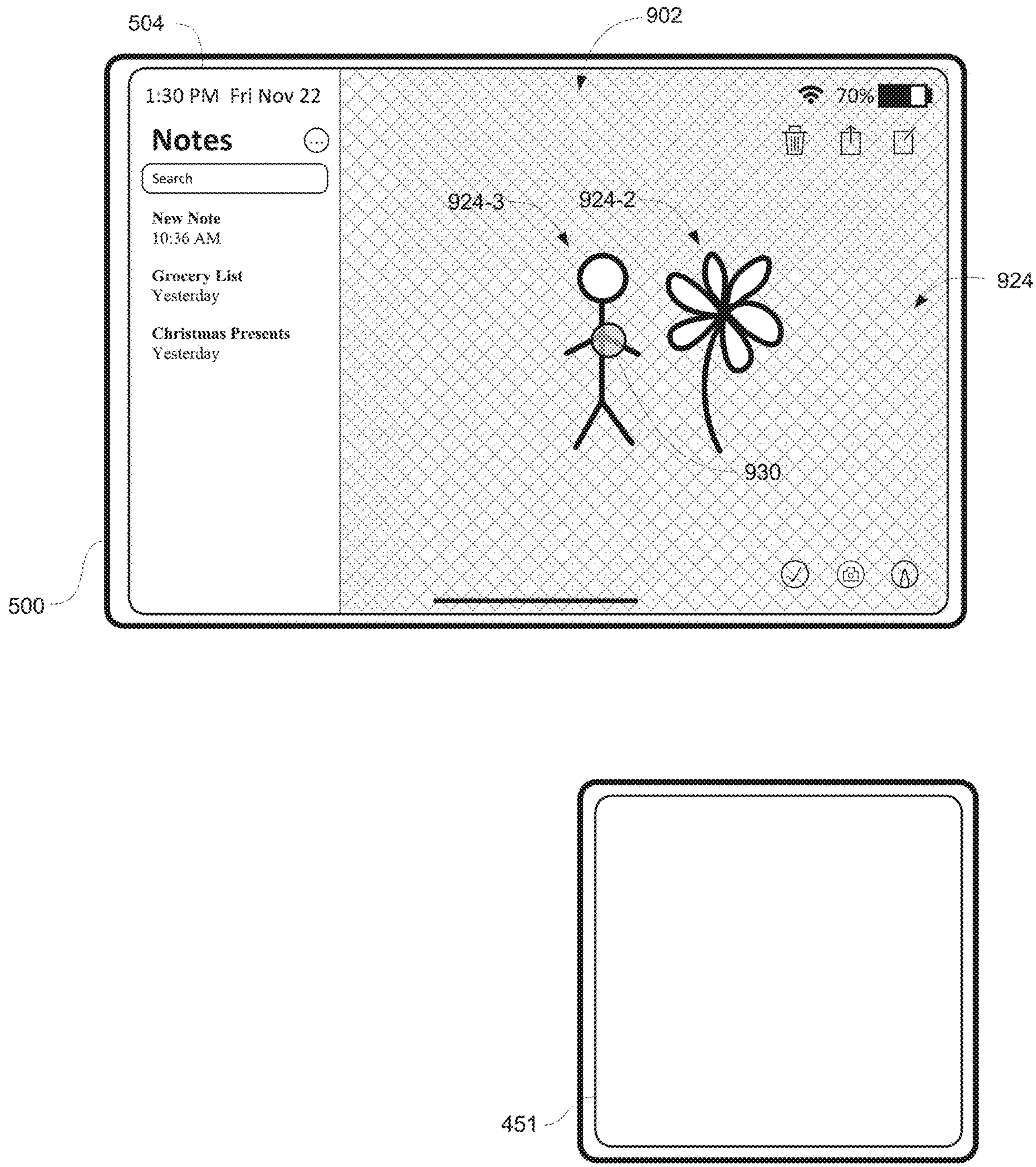

In FIG. 9E, electronic device 500 detects the termination of contact 903 from touch-sensitive surface 451. In some embodiments, in response to detecting a termination of the user input, device 500 finalizes the resizing of the content in the content viewing and entry region 924. In some embodiments, finalizing the resizing comprises maintaining the view of the content (e.g., the drawing of the person and flower and optionally the background) as the view when the input was terminated (e.g., compressed, as shown in FIG. 9E). In some embodiments, in response to the termination of the user input, cursor 930 returns to its default size and shape, as shown in FIG. 9E (e.g., the size and shape it had before the resizing input was detected). In some embodiments, throughout the resizing operation, the center of cursor 930 remains fixed at its absolute location in user interface 902 and/or on touchscreen 504.

Figure 9F:
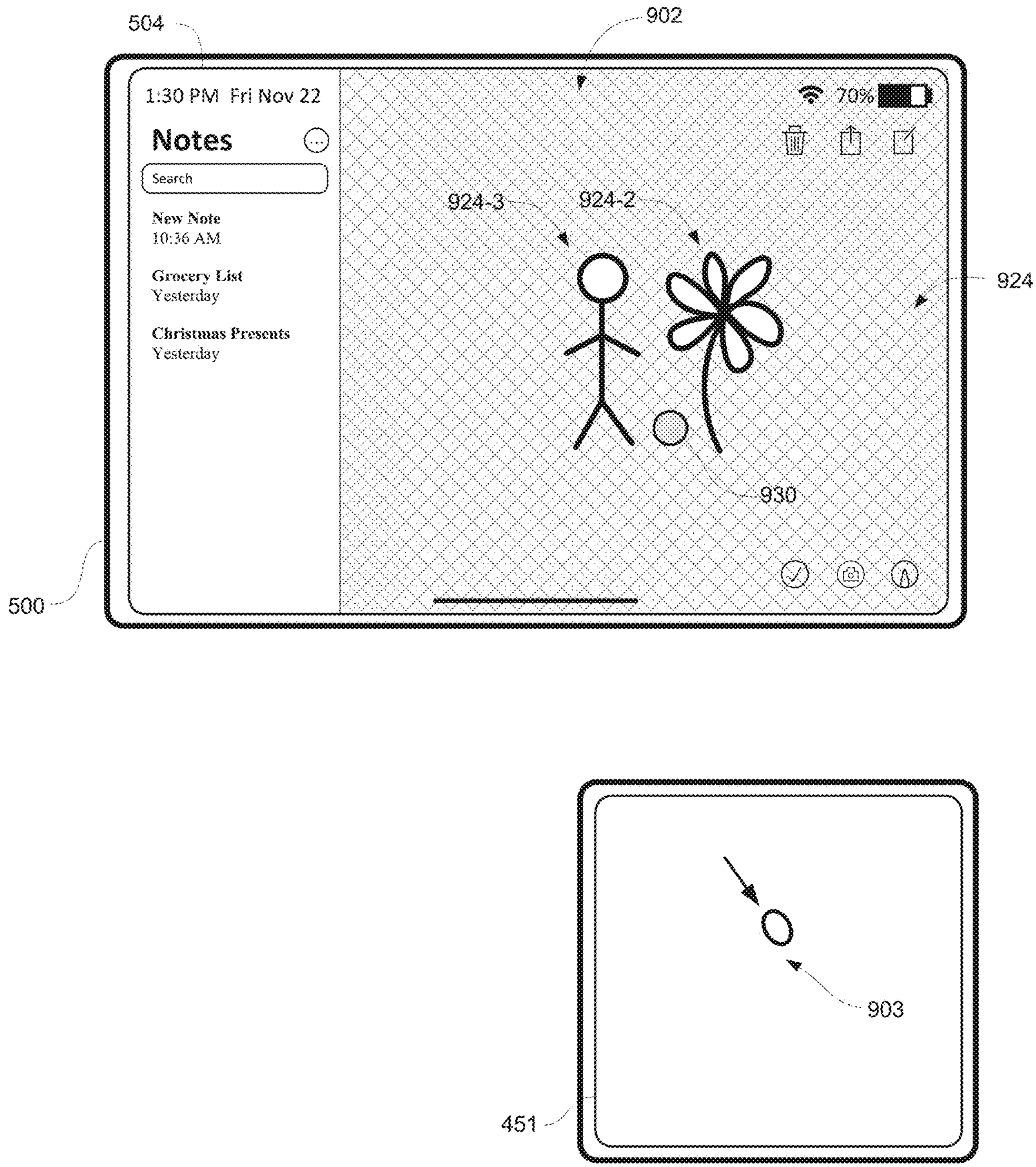
Figure 9G:
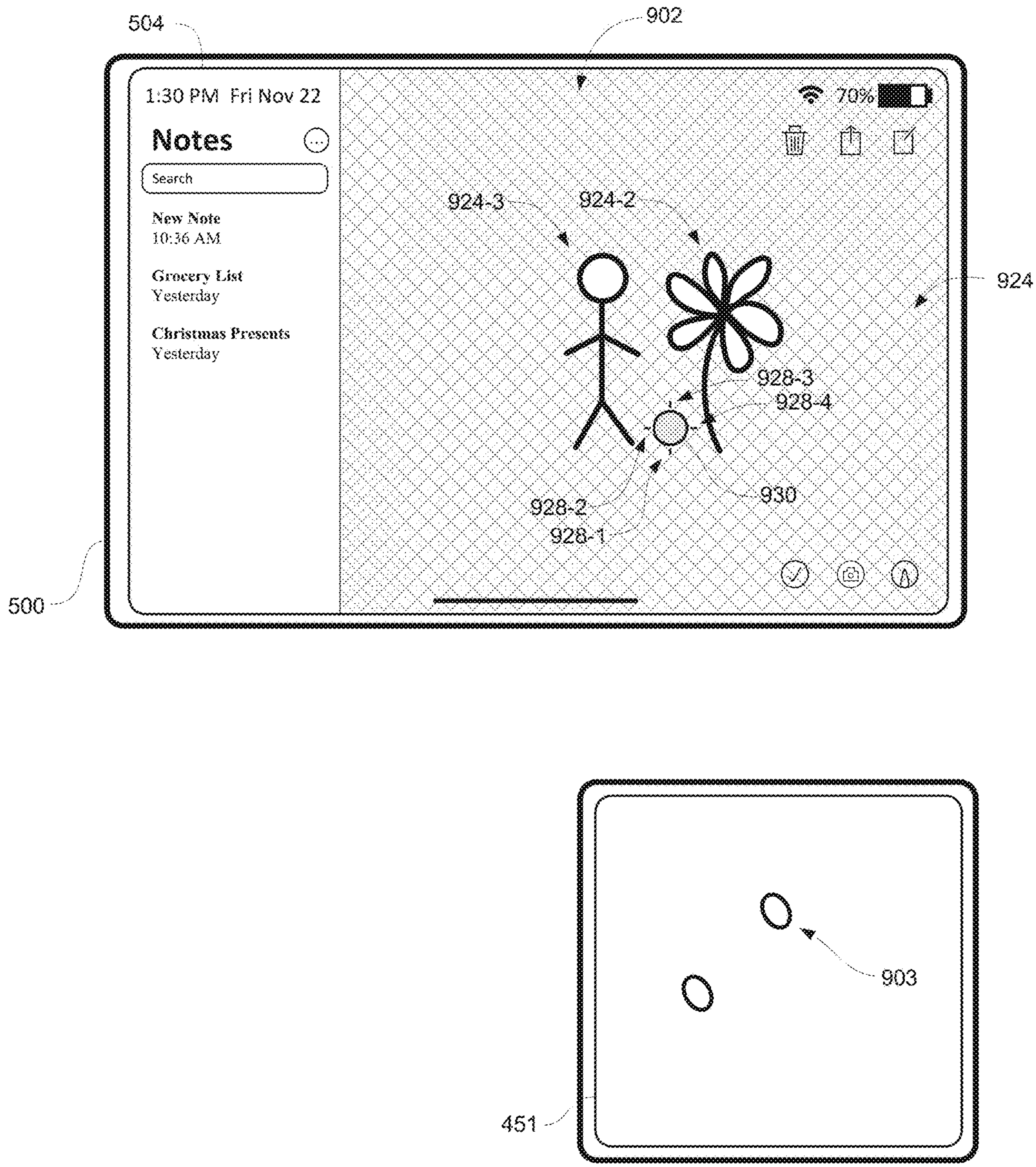

FIGS. 9F-9K illustrate embodiments in which cursor 940 displays one or more rotation indicators while rotating content. In FIG. 9F, a user input 903 is received moving cursor 930 in a downward, rightward direction in accordance with the user input, which causes cursor 930 to move downward and rightward in the user interface 902 to a new position in the user interface. In FIG. 9G, a two-finger contact 903 is detected corresponding to the initiation of a request to rotate the content in content viewing and entry region 924 (e.g., detection of two contacts 903 concurrently on touch-sensitive surface 451). In some embodiments, a request to rotate content corresponds to a two-finger rotational gesture. In some embodiments, in response to the request to rotate content (e.g., upon detecting two concurrent contacts 903 on touch-sensitive surface, or upon detecting rotation of two concurrent contacts 903 on touch-sensitive surface), device 500 displays one or more rotation indicators 928 on cursor 930. In some embodiments, the one or more rotation indicators 928 include one or more tick marks on the outside of, on the inside of, or on the border of cursor 930. In some embodiments, the one or more rotation indicators are at the 12 o'clock, 3 o'clock, 6 o'clock, and/or 9 o'clock positions (e.g., indicators 928-3, 928-4, 928-1, and 928-2). In some embodiments, other positions are possible. For example, the one or more rotation indicators include "major" and "minor" tick marks (e.g., at 1 o'clock, 2 o'clock, 4 o'clock, 5 o'clock, etc. positions). In some embodiments, the major and minor tick marks have different size, shape, and/or color. In some embodiments, the one or more indicators 928 are displayed when and/or in response to a determination that the user input has rotated by a threshold amount (e.g., as the input begins rotation, after the input has rotated more than 1 degree, 3 degrees, 5 degrees, 10 degrees, etc.). In some embodiments, the one or more indicators 928 are displayed when and in response to a detection of a two-finger contact with touch sensitive surface 451 (e.g., without detection of any rotation).

Figure 9H:
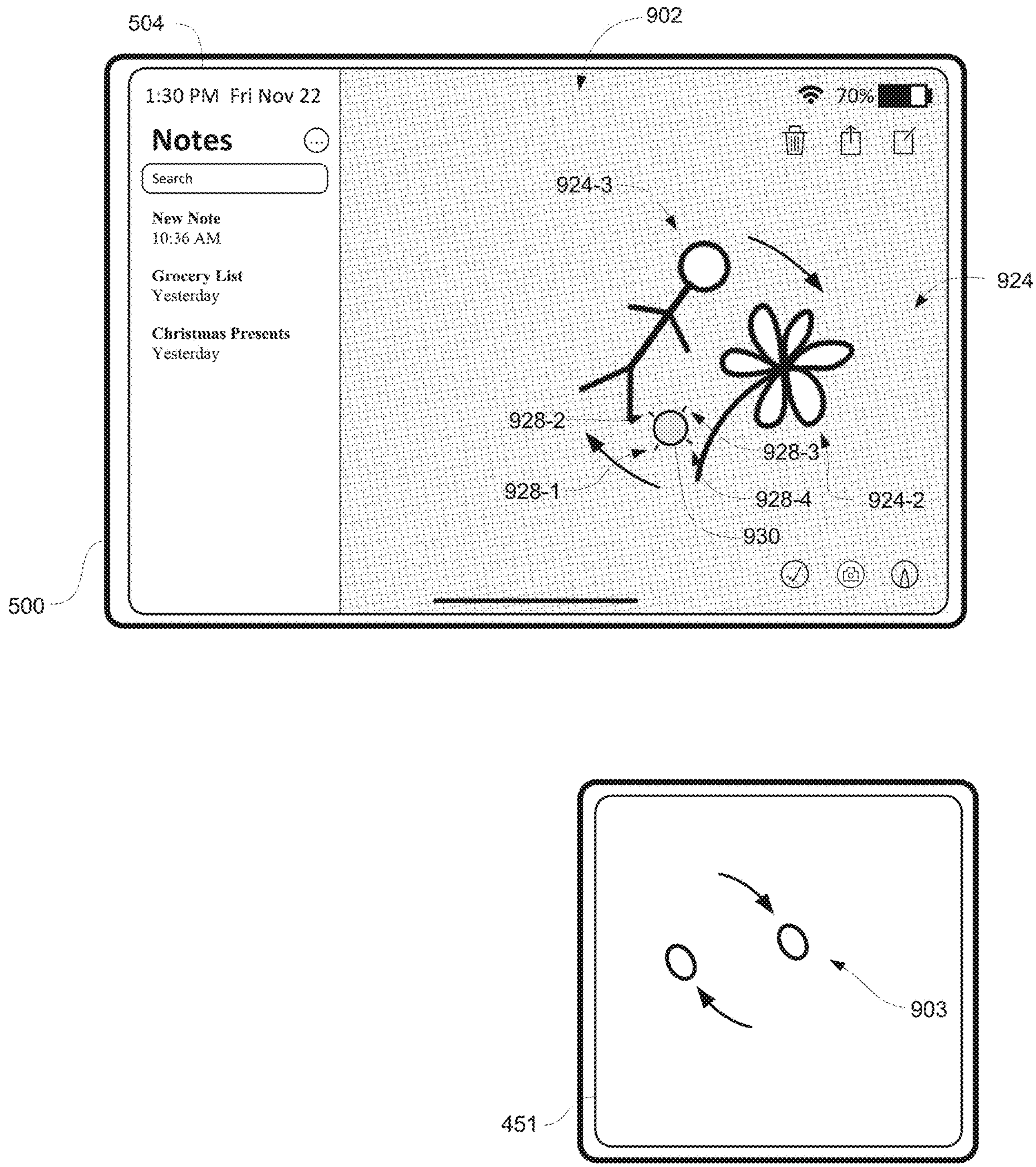

In FIG. 9H, device 500 detects a clockwise rotation of user input 903 corresponding to a request to rotate the content of content viewing and entry region 924 in a clockwise manner. In some embodiments, in response to the clockwise rotation of user input 903, the content in content viewing and entry region 924 (e.g., the drawing of the person and flower and optionally the background) rotates clockwise in accordance with the rotation of the user input, as shown in FIG. 9H (e.g. optionally while the user input is rotating).

In some embodiments, the content is rotated centered around the position of cursor 930. For example, the content at the location of the cursor remains at the position of the cursor (albeit rotated), while the content that is not at the location of the cursor moves around the location of the cursor as it is being rotated. In some embodiments, cursor 930 concurrently rotates proportionately with and when the content in the content viewing and entry region 924 is rotated (e.g., while rotating). In some embodiments, cursor 930 is rotated by the same angular amount as the content in the content viewing and entry region 924 is rotated. Thus, in some embodiments, cursor 930 appears as if it is a part of the content in the content viewing and entry region 924 and rotates by the same amount while the content is being rotated. In some embodiments, the one or more rotation indicators 928 rotate with cursor 930 (e.g., as part of cursor 930), and by the same amount as the cursor rotates, to provide reference points to indicate the amount of rotation that the cursor (and, thus, the content) is experiencing.

Figure 9I:
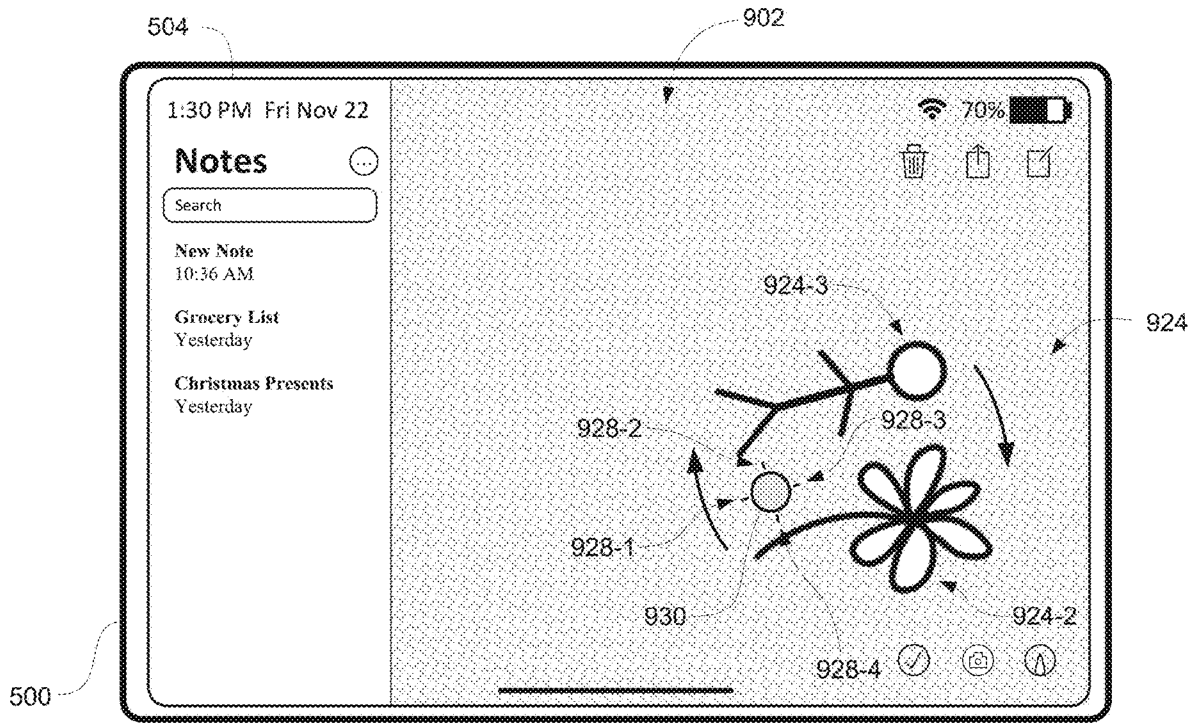
Figure 9I:
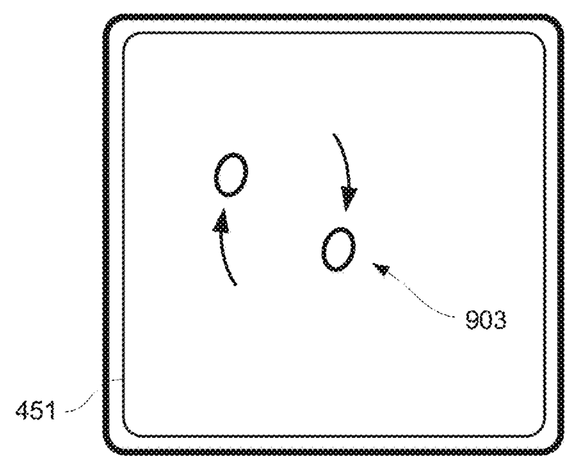

In FIG. 9I, device 500 detects a continued clockwise rotation of user input 903 corresponding to a request to further rotate the content of content viewing and entry region 924 in a clockwise manner. In some embodiments, in response to the clockwise rotation of user input 903, the content in content viewing and entry region 924 (e.g., the drawing of the person and flower and optionally the background) further rotates clockwise in accordance with the rotation of the user input, as shown in FIG. 9I (e.g. optionally while the user input is rotating). In some embodiments, the one or more rotation indicators 928 on cursor 930 rotate even further clockwise in accordance with the user input to provide an indication of the further amount of rotation that the cursor is experiencing.

Figure 9J:
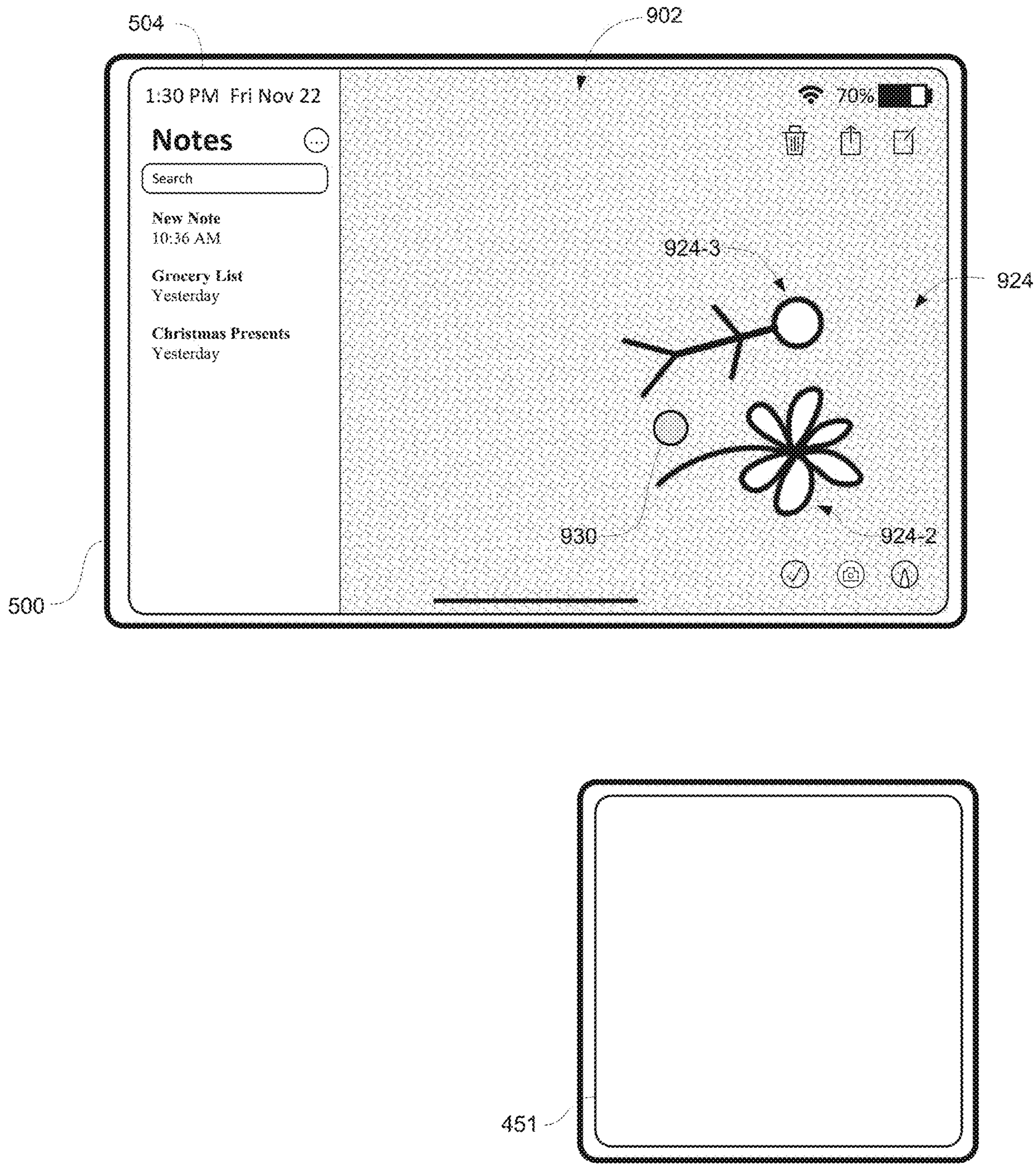
Figure 9K:
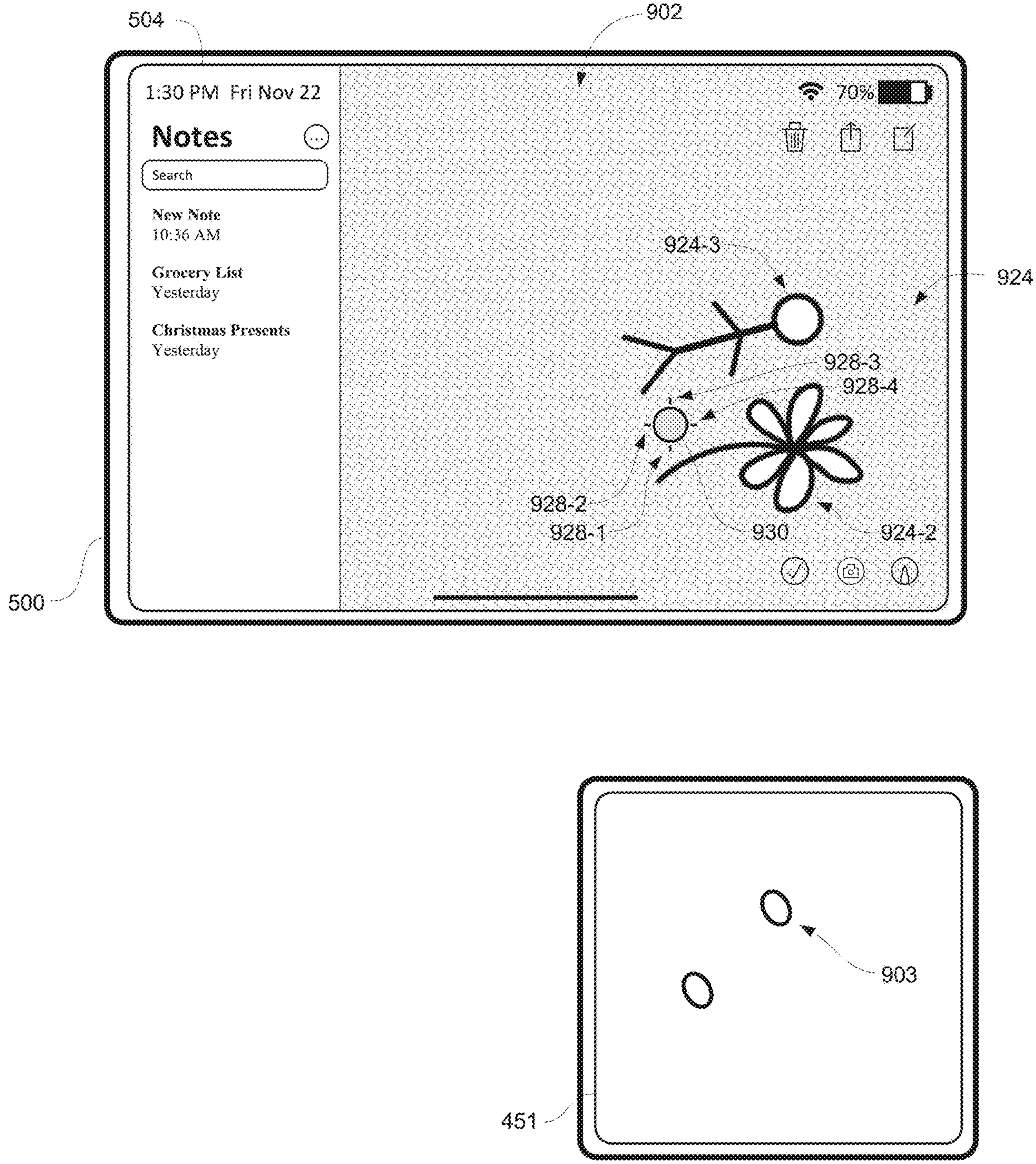
Figure 10A:
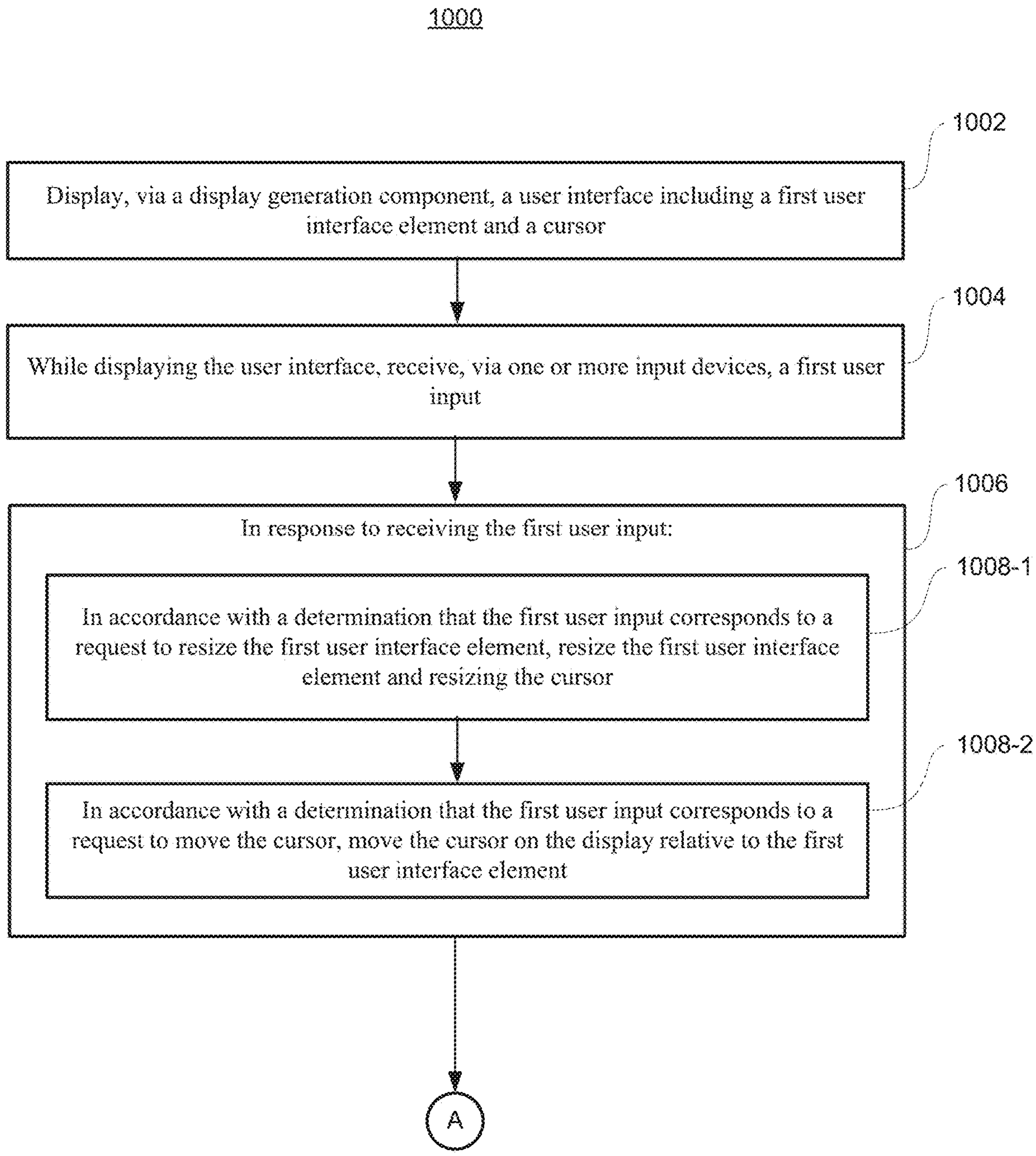
FIGS. 10A-10D are flow diagrams illustrating a method of displaying a cursor while manipulating objects in the user interface in accordance with some embodiments.
Figure 10B:
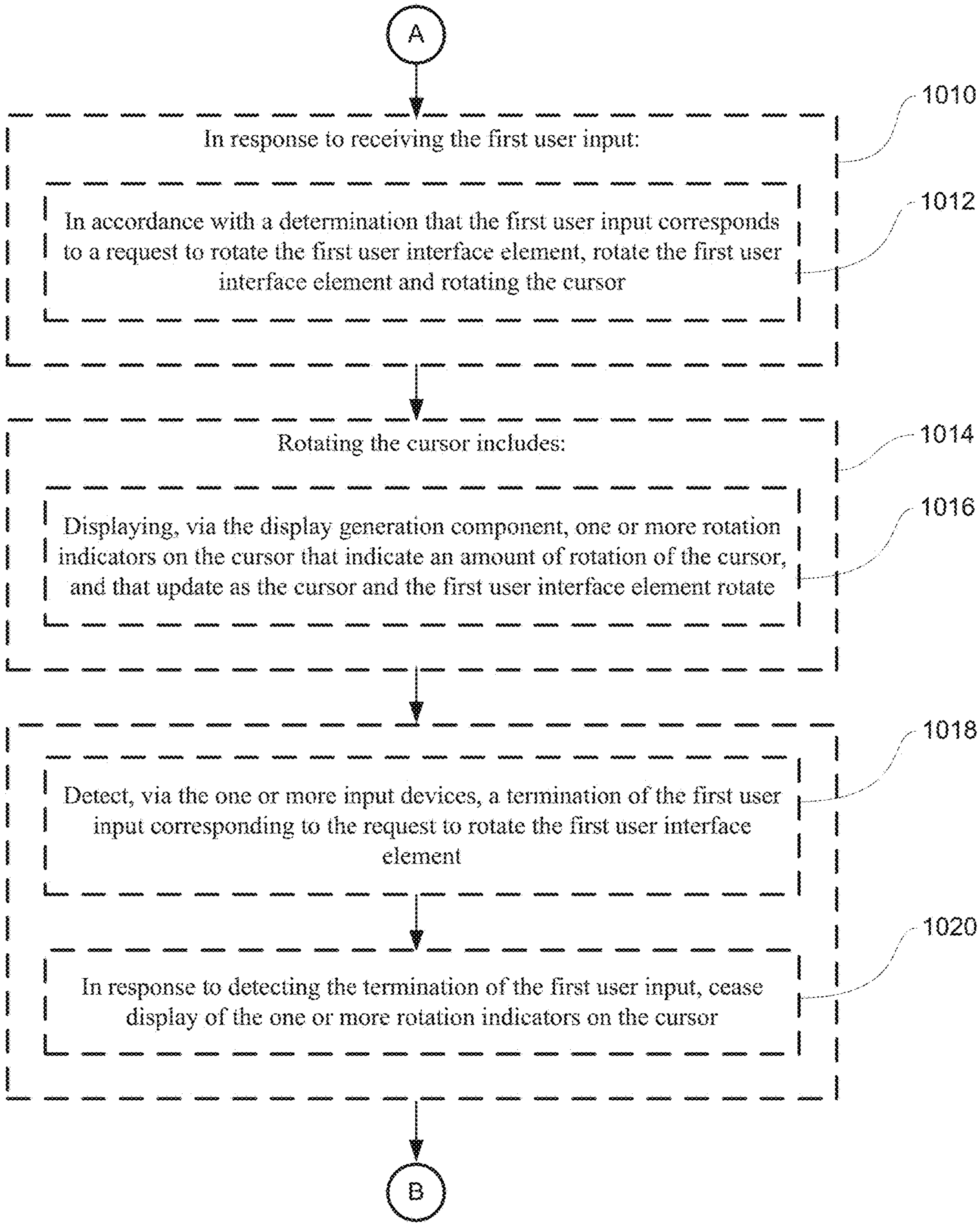
Figure 10C:
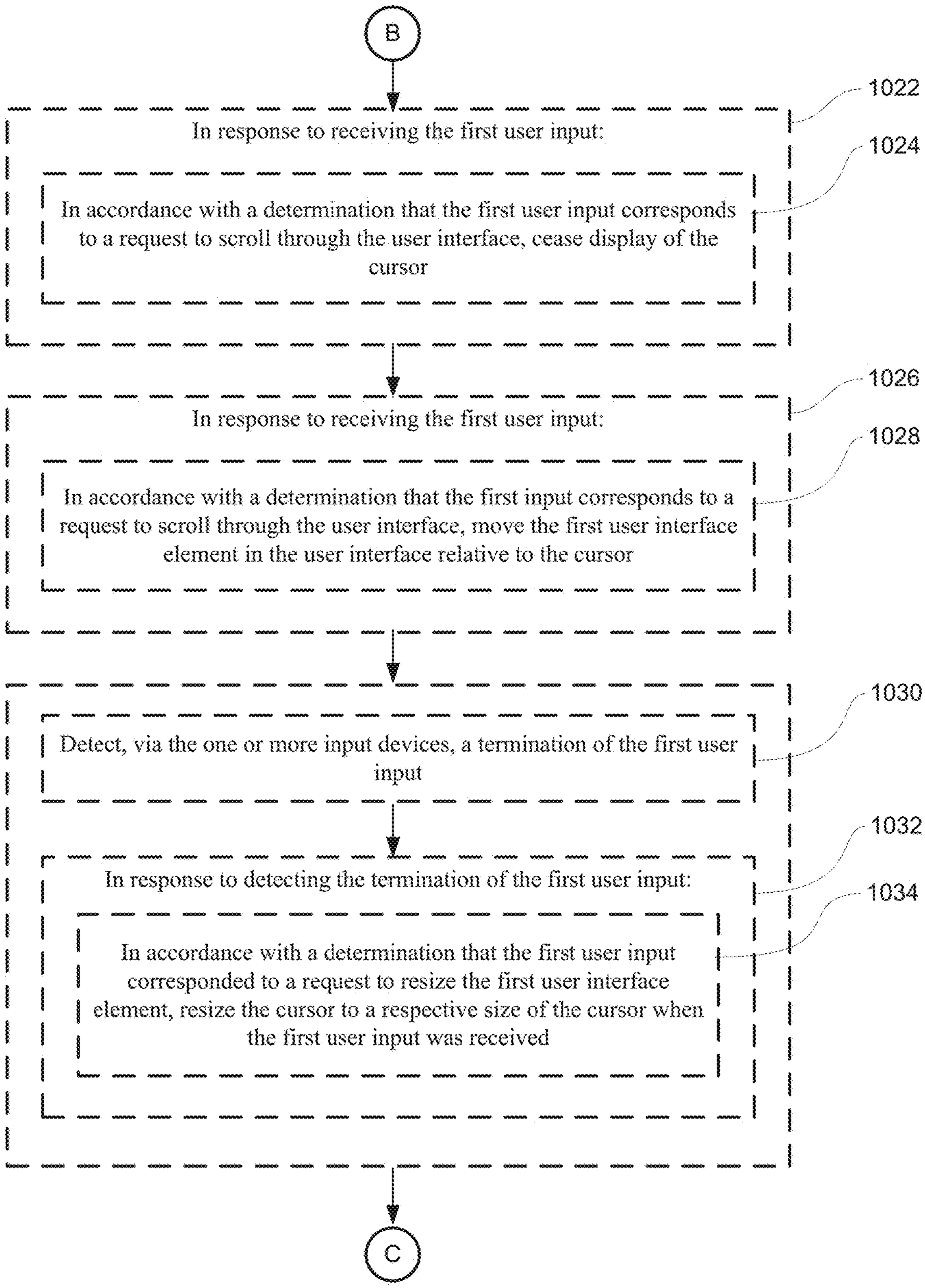
Figure 10D:
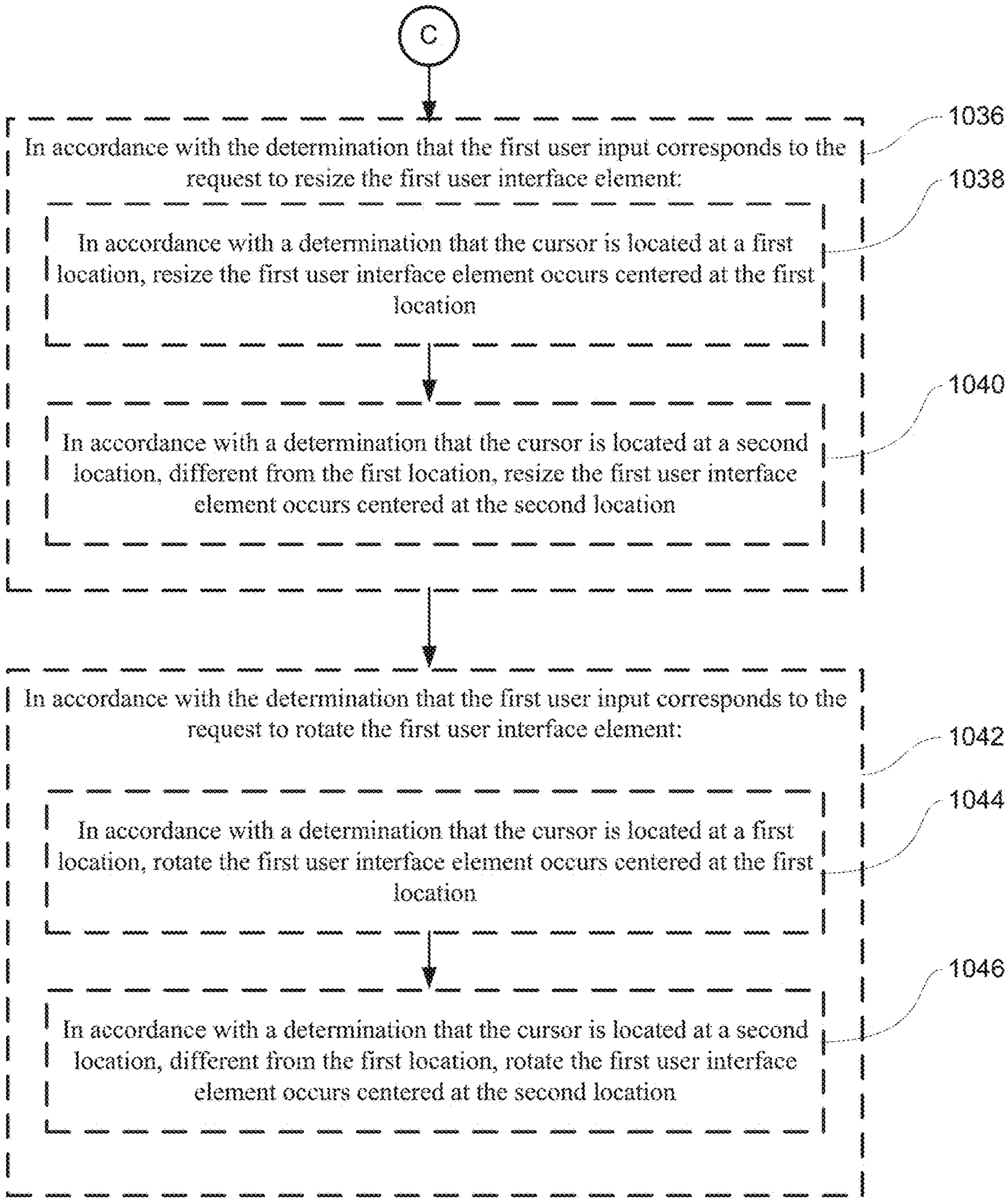

In FIG. 9J, electronic device 500 detects the termination of contact 903 from touch-sensitive surface 451 (e.g., liftoff of contacts 903 from touch-sensitive surface 451). In some embodiments, in response to detecting a termination of the user input, device 500 finalizes the rotation of the content in the content viewing and entry region 924 (e.g., the drawing of the person and flower and optionally the background). In some embodiments, finalizing the rotation comprises maintaining the rotation of the content at the angle of rotation it had when the input was terminated (e.g., rotated, as shown in FIG. 9J). In some embodiments, in response to the termination of the user input, cursor 930 returns to its default rotation and optionally ceases display of the one or more rotation indicators 928, as shown in FIG. 9J. In some embodiments, in response to the termination of the user input, rotation indicators 928 return to their default positions around/on cursor 930 (e.g., even though, in some embodiments, they are no longer displayed—though in some embodiments, they remain displayed for a time threshold (e.g., 1, 3, 5 seconds) after termination of the rotation input). In FIG. 9K, a two-finger contact 903 is detected corresponding to the initiation of another request to rotate the content in content viewing and entry region 924. In response to the user input, the one or more rotation indicators 928 are displayed. As shown in FIG. 9K, the rotation indicators have been reset to their original positions on cursor 930 (e.g., at 12 o'clock, 3 o'clock, 6 o'clock, and 9 o'clock). Rotation of cursor 930 and content 924 in FIG. 9K optionally proceeds as described with reference to FIGS. 9G-9J.

FIGS. 10A-10D are flow diagrams illustrating a method 1000 of displaying a cursor while manipulating objects in the user interface. The method 1000 is optionally performed at an electronic device such as device 100, device 300, device 500, device 501, device 510, and device 591 as described above with reference to FIGS. 1A-1B, 2-3, 4A-4B and 5A-5I. Some operations in method 1000 are, optionally combined and/or order of some operations is, optionally, changed.

As described below, the method 1000 provides ways to display a cursor while manipulating objects in the user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display generation component and one or more input devices, including a touch-sensitive surface (e.g., a mobile device (e.g., a tablet, a smartphone, a media player, or a wearable device), or a computer, optionally in communication with one or more of a (e.g., external) mouse, (e.g., external) trackpad, and/or (e.g., external) touchpad, etc.), displays (1002), via the display generation component, a user interface including a first user interface element (e.g., an image, a graphic, text, a web page, or any other element that can be zoomed, rotated, or otherwise visually manipulated) and a cursor, such as content viewing and entry region 924 including person 624-3 and flower 624-2 in FIG. 9A. In some embodiments, the display generation component is a display integrated with the electronic device (optionally a touch screen display) and/or an external display such as a monitor, projector, television, etc.

In some embodiments, while displaying the user interface, the device receives (1004), via the one or more input devices, a first user input, such as in FIG. 9B (e.g., an input detected via the touch-sensitive display, an input via an external trackpad, etc.). In some embodiments, in response to receiving the first user input (1006), such as in FIG. 9B: in accordance with a determination that the first user input corresponds to a request to resize the first user interface element, the device resizes (1008-1) the first user interface element and resizing the cursor, such as user input 903 corresponding to a request to enlarge the content in FIG. 9B causing both the content (e.g., person 924-3 and 924-2 and optionally the background) to be enlarged and cursor 930 to be enlarged (e.g., without moving the cursor relative to the first user interface element). In some embodiments, the cursor is resized by a same amount as the first user interface element is resized. In some embodiments, the amount of resizing of the cursor is proportional to the amount of resizing of the first user interface element. For example, if the first element is enlarged (e.g., zoomed in), then the cursor is enlarged proportionally (e.g., if the first element is enlarged by 2$x$, the cursor is enlarged by 2$x$, etc.). In some embodiments, resizing the first user interface element and resizing the cursor is performed concurrently. In some embodiments, the cursor is resized in such a manner that it appears as if it is a part of the first user interface element and the cursor and the first user interface element appear to be resized together and/or as a single element. In some embodiments, the user input corresponding to a request to resize the first user interface element is a two-finger pinch gesture detected via an external trackpad while the cursor is positioned over the first element for zooming the first user interface element. In some embodiments, an inward pinch gesture is a zoom-out input and an outward pinch gesture is a zoom-in input. In some embodiments, if the cursor is not positioned over the first element in the user interface when the first user input is detected, the first element is not resized, and the appearance of the cursor is not resized. In some embodiments, if the input is not detected via an external trackpad, but rather is detected via the touch-sensitive display, the appearance of the cursor is not resized, as described below (e.g., and in some embodiments, the cursor is hidden as described with reference to method 800), and the first element is or is not resized depending on whether the touch-sensitive display input corresponds to a request to resize the first element.

In some embodiments, in accordance with a determination that the first user input corresponds to a request to move the cursor, the device moves (1008-2) the cursor on the display relative to the first user interface element (e.g., without resizing the first user interface element or the cursor). In some embodiments, the first user interface element is not moved (e.g., remains stationary) while the cursor moves in accordance with the user input. In some embodiments, the request to move the cursor is a movement of a mouse in communication with the electronic device, a contact and movement (while maintaining contact) detected on a touchpad in communication with the electronic device, etc.

The above-described manner of resizing both the first user interface element and the cursor (e.g., in response to a request to resize the first user interface element, but not in response to a request to move the cursor) provides a quick and efficient visualization while resizing the first user interface element (e.g., by also resizing the cursor in a way that indicates to the user the amount of resizing that is occurring to the first user interface element), which simplifies the interaction between the user and the electronic device and enhances the operability of the electronic device and makes the user-device interface more efficient (e.g., by not only providing the user with a point of reference to determine how and how much the first element is being resized based on the user's input without requiring the user to activate another user interface to monitor the resizing of the first user interface element or verify the resizing after the resizing has been completed, but also allowing the cursor to be moved around the user interface via a request to move the cursor without requiring the user to change the cursor from one mode to another), which additionally reduces power usage and improves battery life of the electronic device by enabling the user to use the electronic device more quickly and efficiently while reducing errors in the usage of the device.

In some embodiments, in response to receiving the first user input (1010), such as in FIG. 9H: in accordance with a determination that the first user input corresponds to a request to rotate the first user interface element, the device rotates (1012) the first user interface element and rotating the cursor, such as user input 903 corresponding to a request to rotate the content in FIG. 9H causing both the content (e.g., person 924-3 and 924-2 and optionally the background) to rotate and cursor 930 to rotate (as illustrated by rotation indicators 928 rotating) (e.g., without moving the cursor relative to the first user interface element).

In some embodiments, the cursor is rotated by the same amount that the first user interface element is rotating (e.g., the same angle of rotation). In some embodiments, the amount of angular rotation of the cursor is proportional to the amount of angular rotation of the first user interface element. In some embodiments, the user input corresponding to a request to rotate the first user interface element is a two-finger spinning or rotating gesture detected via an external trackpad while the cursor is positioned over the first element. In some embodiments, a clockwise spinning gesture is a clockwise rotation input and a counter-clockwise spinning gesture is a counter-clockwise rotation input. In some embodiments, if the cursor is not positioned over the first element in the user interface when the first user input is detected, the first element is not rotated, and the appearance of the cursor is not rotated. In some embodiments, if the input is not detected via an external trackpad, but rather is detected via the touch-sensitive display, the appearance of the cursor is not rotated, as described below (e.g., and in some embodiments, the cursor is hidden as described with reference to method 800), and the first element is or is not rotated depending on whether the touch-sensitive display input corresponds to a request to rotate the first user interface element.

The above-described manner of rotating both the first user interface element and the cursor (e.g., in response to a request to rotate the first user interface element, but not in response to a request to move the cursor or resize the first user interface element) provides a quick and efficient visualization while rotating the first user interface element (e.g., by also rotating the cursor in a way that indicates to the user the amount of rotating that is occurring to the first user interface element), which simplifies the interaction between the user and the electronic device and enhances the operability of the electronic device and makes the user-device interface more efficient (e.g., by not only providing the user with a point of reference to determine how and how much the first element is being rotated based on the user's input without requiring the user to activate another user interface to monitor the rotation of the first user interface element or verify the rotation after the rotation has been completed, but also allowing the cursor to be moved around the user interface via a request to move the cursor or resize the user interface via a request to rotate the cursor without requiring the user to change the cursor from one mode to another), which additionally reduces power usage and improves battery life of the electronic device by enabling the user to use the electronic device more quickly and efficiently while reducing errors in the usage of the device.

In some embodiments, rotating the cursor (1014), such as in FIG. 9H includes: displaying (1016), via the display generation component, one or more rotation indicators on the cursor that indicate an amount of rotation of the cursor, and that update as the cursor and the first user interface element rotate, such as rotation indicators 928 in FIG. 9H (e.g., displaying one or more tick marks on, in, and/or around the cursor that rotate with the cursor as the cursor is rotating). In some embodiments, the one or more tick marks include tick marks at the 12 o'clock, 3 o'clock, 6 o'clock and 9 o'clock locations. In some embodiments, the one or more tick marks include tick marks at other locations around the cursor. In some embodiments, the tick marks are displayed inside of the cursor, similar to a clock face. In some embodiments, the tick marks are displayed outside of the cursor, such as sunshine rays. In some embodiments, indicators of other shapes and sizes can be used (e.g., circles, dots, dashes, etc.). In some embodiments, the rotation indicators appear when the input corresponding to the request to rotate the first user interface object is received and disappears when the input terminates (e.g., upon liftoff of the fingers from the external touchpad, upon termination of the movement of the fingers on the external touchpad, etc.). In some embodiments, the indicators rotate around the center of the cursor by the same amount of angular rotation as the cursor and/or the first user interface object. In some embodiments, a reference tick mark is also displayed that does not move as a function of the rotation to serve as a reference point for the tick marks that do move The above-described manner of indicating the rotation of the cursor (e.g., by displaying one or more rotation indicators that rotate with the cursor and indicate the amount of rotation of the cursor) provides a quick and efficient visualization of the rotation of the cursor, which simplifies the interaction between the user and the electronic device and enhances the operability of the electronic device and makes the user-device interface more efficient (e.g., by automatically displaying indicators to aid the user in determining how much the cursor is rotating, without requiring the user to perform additional inputs to enable the indicators or otherwise verify the amount of rotation of the cursor and/or first user interface object), which additionally reduces power usage and improves battery life of the electronic device by enabling the user to use the electronic device more quickly and efficiently while reducing errors in the usage of the device.

In some embodiments, the device detects (1018), via the one or more input devices, a termination of the first user input corresponding to the request to rotate the first user interface element, such as in FIG. 9J (e.g., detecting the end of the two-finger contact with the external touch-sensitive surface). For example, a lift-off of the contact of one or both fingers with the touch-sensitive surface. In some embodiments, the termination is the end of the movement for a threshold amount of time while maintaining contact with the touch-sensitive surface. In some embodiments, end of movement while maintaining contact with the touch-sensitive surface is not a termination of the first user input and the one or more rotation indicators remain displayed.

In some embodiments, in response to detecting the termination of the first user input, the device ceases (1020) display of the one or more rotation indicators on the cursor, such as in FIG. 9J (e.g., ceasing display of the one or more tick marks on, in, and/or around the cursor). In some embodiments, an animation is displayed fading the indicators away. In some embodiments, after the termination of the first user input, and in response to another request to rotate the first user interface element, the rotation indicators are displayed at their previous positions before the user input was received (e.g., initial and/or default positions, at 12 o'clock, 3 o'clock, 6 o'clock, and 9 o'clock, etc.) while the first user interface element is displayed at its rotated position (the result of the first rotation input).

The above-described manner of ceasing display of the rotation indicators (e.g., upon detection of the termination of the rotation input) provides a quick and efficient method of resetting the cursor to its default state (e.g., by automatically determining that the rotation indicators are no longer needed because the first user interface element is no longer being rotated and ceasing the display of the rotation indicators), which simplifies the interaction between the user and the electronic device and enhances the operability of the electronic device and makes the user-device interface more efficient (e.g., without requiring the user to perform additional inputs to disable the indicators after the user is done rotating the first user interface object), which additionally reduces power usage and improves battery life of the electronic device by enabling the user to use the electronic device more quickly and efficiently while reducing errors in the usage of the device.

In some embodiments, in response to receiving the first user input (1022), such as in FIG. 6AD: in accordance with a determination that the first user input corresponds to a request to scroll through the user interface, the device ceases (1024) display of the cursor, such as in FIG. 6AD (e.g., if the input is a request to scroll the contents of the user interface, then cease display of the cursor). In some embodiments, if the input is a request to scroll received from a touch-sensitive display, if the input is a two-finger gesture on an external touch-sensitive surface, or a mouse wheel input, then cease display of the cursor. In some embodiments, if the input is a direct manipulation of a scroll bar (e.g., if the cursor is at the location of a scroll bar and the input is a selection and movement), then display of the cursor is maintained at the location of the scroll bar.

The above-described manner of ceasing display of the cursor (e.g., in response to a request to scroll through the user interface) provides a quick and efficient method of revealing the contents of the user interface (e.g., by automatically ceasing display of the cursor in response to a request to scroll the user interface to allow unimpeded display of the contents of the user interface), which simplifies the interaction between the user and the electronic device and enhances the operability of the electronic device and makes the user-device interface more efficient (e.g., without requiring the user to perform additional inputs to cease display of the cursor or move the cursor to other locations of the user interface to avoid blocking the contents of the user interface), which additionally reduces power usage and improves battery life of the electronic device by enabling the user to use the electronic device more quickly and efficiently while reducing errors in the usage of the device.

In some embodiments, in response to receiving the first user input (1026), such as in FIG. 6AD: in accordance with a determination that the first input corresponds to a request to scroll through the user interface, the device moves (1028) the first user interface element in the user interface relative to the cursor, such as in FIG. 6AD (e.g., if the input is a request to scroll the contents of the user interface, then scroll the contents of the user interface including moving the first user interface element in accordance with the first user input). In some embodiments, if the input is a request to scroll received from a touch-sensitive display, if the input is a two-finger gesture on an external touch-sensitive surface, or a mouse wheel input, then the cursor is not moved in accordance with the first user input and remains displayed at its absolute position in the user interface such that the first user interface element moves relative to the cursor. In some embodiments, if the input is a direct manipulation of a scroll bar (e.g., if the cursor is at the location of a scroll bar and the input is a selection and movement), then the cursor moves with the movement of the scroll bar (e.g., in accordance with the input).

The above-described manner of scrolling the user interface (e.g., in response to a request to scroll through the user interface and relative to the cursor) provides a quick and efficient method of revealing the user interface (e.g., by maintaining the cursor in the same absolute position in the user interface and scrolling the contents of the user interface relative to the cursor), which simplifies the interaction between the user and the electronic device and enhances the operability of the electronic device and makes the user-device interface more efficient (e.g., without requiring the user to perform additional inputs to find the cursor after scrolling the contents of the user interface), which additionally reduces power usage and improves battery life of the electronic device by enabling the user to use the electronic device more quickly and efficiently while reducing errors in the usage of the device.

In some embodiments, the device detects (1030), via the one or more input devices, a termination of the first user input, such as in FIG. 9C (e.g., detecting the end of the two-finger contact with the touch-sensitive surface). For example, a lift-off of the contact of one or both fingers with the touch-sensitive surface. In some embodiments, the termination is the end of the movement for a threshold amount of time while maintaining contact with the touch-sensitive surface. In some embodiments, end of movement while maintaining contact with the touch-sensitive surface is not a termination of the first user input.

In some embodiments, in response to detecting the termination of the first user input (1032), such as in FIG. 9C: in accordance with a determination that the first user input corresponded to a request to resize the first user interface element, the device resizes (1034) the cursor to a respective size of the cursor when the first user input was received, such as in FIG. 9C (e.g., after resizing the cursor in response to a resizing input, returning the cursor to the size and/or shape that the cursor had before the input was received (e.g., the initial size, the default size, etc.)).

In some embodiments, the first user interface element is maintained at its resized size (e.g., maintained at its final size and not resized to the size it had before the input was received). For example, after the resizing is completed, the cursor snaps back to its previous size (e.g., the initial size, the default size, etc.). In some embodiments, after a rotational input, the cursor is returned to its previous size, shape, and/or rotation (e.g., initial state, default state, and/or state the cursor had before the input was received). In some embodiments, after any input in which the appearance of the cursor is changed concurrently with the change in appearance of the first user interface object, the cursor is returned to its previous size, shape, and/or rotation (e.g., initial state, default state, and/or state the cursor had before the input was received) in response to detecting a termination of the input while the first user interface object remains at its changed appearance resulting from the input for modifying its appearance.

The above-described manner of reverting the cursor to its initial state (e.g., in response to detecting a termination of the user input) provides a quick and efficient method of using the cursor as an object manipulation indicator multiple times for the same or different user interface objects (e.g., by using the appearance of the cursor to mimic the changes requested to the first user interface object, while automatically returning the cursor's appearance back to its original state after the input ends so further object manipulations can be accurately reflected by the reset cursor), which simplifies the interaction between the user and the electronic device and enhances the operability of the electronic device and makes the user-device interface more efficient (e.g., without requiring the user to perform additional inputs to return the cursor back to its original state), which additionally reduces power usage and improves battery life of the electronic device by enabling the user to use the electronic device more quickly and efficiently while reducing errors in the usage of the device.

In some embodiments, in accordance with the determination that the first user input corresponds to the request to resize the first user interface element (1036), such as in FIG.

9B (e.g., a two-finger pinch gesture detected via an external trackpad while the cursor is positioned over the first element for zooming the first user interface element): in accordance with a determination that the cursor is located at a first location, the device resizes (1038) the first user interface element occurs centered at the first location, such as in FIG. 9B (e.g., if the cursor is at a first location, then the resizing of the first user interface element is around the first location).

In some embodiments, an inward pinch gesture is a zoom-out input and an outward pinch gesture is a zoom-in input. In some embodiments, if the cursor is not positioned over the first element in the user interface when the first user input is detected, the user input is not a request to resize the first user interface element. In some embodiments, the cursor is the center-point of the resizing of the first user interface element. For example, the content of the first user interface element that is at the location of the cursor remains at the location of the cursor while the first user interface is resized, while the content of the first user interface element that is not at the location of the cursor shifts in the user interface as the first user interface element is resized, due to the resizing of the first user interface element.

In some embodiments, in accordance with a determination that the cursor is located at a second location, different from the first location, the device resizes (1040) the first user interface element occurs centered at the second location, such as in FIG. 9B (e.g., if the cursor is at a second location, then the resizing of the first user interface element is around the second location).

The above-described manner of resizing the first user interface element (e.g., centered at the location of the cursor) provides a quick and efficient method of resizing the first user interface element at user-defined locations, which simplifies the interaction between the user and the electronic device and enhances the operability of the electronic device and makes the user-device interface more efficient (e.g., without requiring the user to perform additional inputs to scroll the user interface to center the first user interface object at the original location of the cursor), which additionally reduces power usage and improves battery life of the electronic device by enabling the user to use the electronic device more quickly and efficiently while reducing errors in the usage of the device.

In some embodiments, in accordance with the determination that the first user input corresponds to the request to rotate the first user interface element (1042), such as in FIG. 9H (e.g., the user input corresponding to a request to rotate the first user interface element is a two-finger spinning or rotating gesture detected via an external trackpad while the cursor is positioned over the first element): in accordance with a determination that the cursor is located at a first location, the device rotates (1044) the first user interface element occurs centered at the first location, such as in FIG. 9H (e.g., if the cursor is at a first location, then the rotation of the first user interface element is around the first location)

In some embodiments, a clockwise spinning gesture is a clockwise rotation input and a counter-clockwise spinning gesture is a counter-clockwise rotation input. In some embodiments, if the cursor is not positioned over the first element in the user interface when the first user input is detected, the first element is not rotated, and the appearance of the cursor is not rotated. In some embodiments, the cursor is the center-point of the rotation of the first user interface element. For example, the content of the first user interface element that is at the location of the cursor remains at the location of the cursor while the first user interface is rotated, while the content of the first user interface element that is not at the location of the cursor shifts in the user interface as the first user interface element is rotated, due to the rotation of the first user interface element.

In some embodiments, in accordance with a determination that the cursor is located at a second location, different from the first location, the device rotates (1046) the first user interface element occurs centered at the second location, such as in FIG. 9H (e.g., if the cursor is at a second location, then the rotation of the first user interface element is around the second location).

The above-described manner of rotating the first user interface element (e.g., centered at the location of the cursor) provides a quick and efficient method of rotating the first user interface element at user-defined locations, which simplifies the interaction between the user and the electronic device and enhances the operability of the electronic device and makes the user-device interface more efficient (e.g., without requiring the user to perform additional inputs to scroll the user interface to center the first user interface object at the original location of the cursor), which additionally reduces power usage and improves battery life of the electronic device by enabling the user to use the electronic device more quickly and efficiently while reducing errors in the usage of the device.

It should be understood that the particular order in which the operations in FIGS. 10A-10D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 1200, and 1400) are also applicable in an analogous manner to method 1000 described above with respect to FIGS. 10A-10D. For example, the displaying of a cursor while manipulating objects in the user interface described above with reference to method 1000 optionally has one or more of the characteristics of the selectively displaying of a cursor in a user interface, the interaction of the cursor with user interface objects, the dismissing or switching of applications using a cursor, and ways an electronic device displays user interface elements in response to requests to move a cursor beyond an edge of the display, etc., described herein with reference to other methods described herein (e.g., methods 700, 800, 1200, and 1400). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 10A-10D are, optionally, implemented by components depicted in FIGS. 1A-1B. For example, displaying operations 1002 and receiving operations 1004 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Dismissing and Switching Applications

Users interact with electronic devices in many different manners, including dismissing applications and/or switching display of applications on the electronic device. In some embodiments, an electronic device provides a cursor in the user interface, which is controllable by the user, and allows a user to dismiss or switch display of applications. The embodiments described below provide ways in which a cursor interacts with a home affordance to display a home screen user interface or an application switching user interface, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 11A-11LL illustrate exemplary ways in which an electronic device dismisses or switches applications. The embodiments in these figures are used to illustrate the processes described below, including the processes described with reference to FIGS. 12A-12G.

Figure 11A:
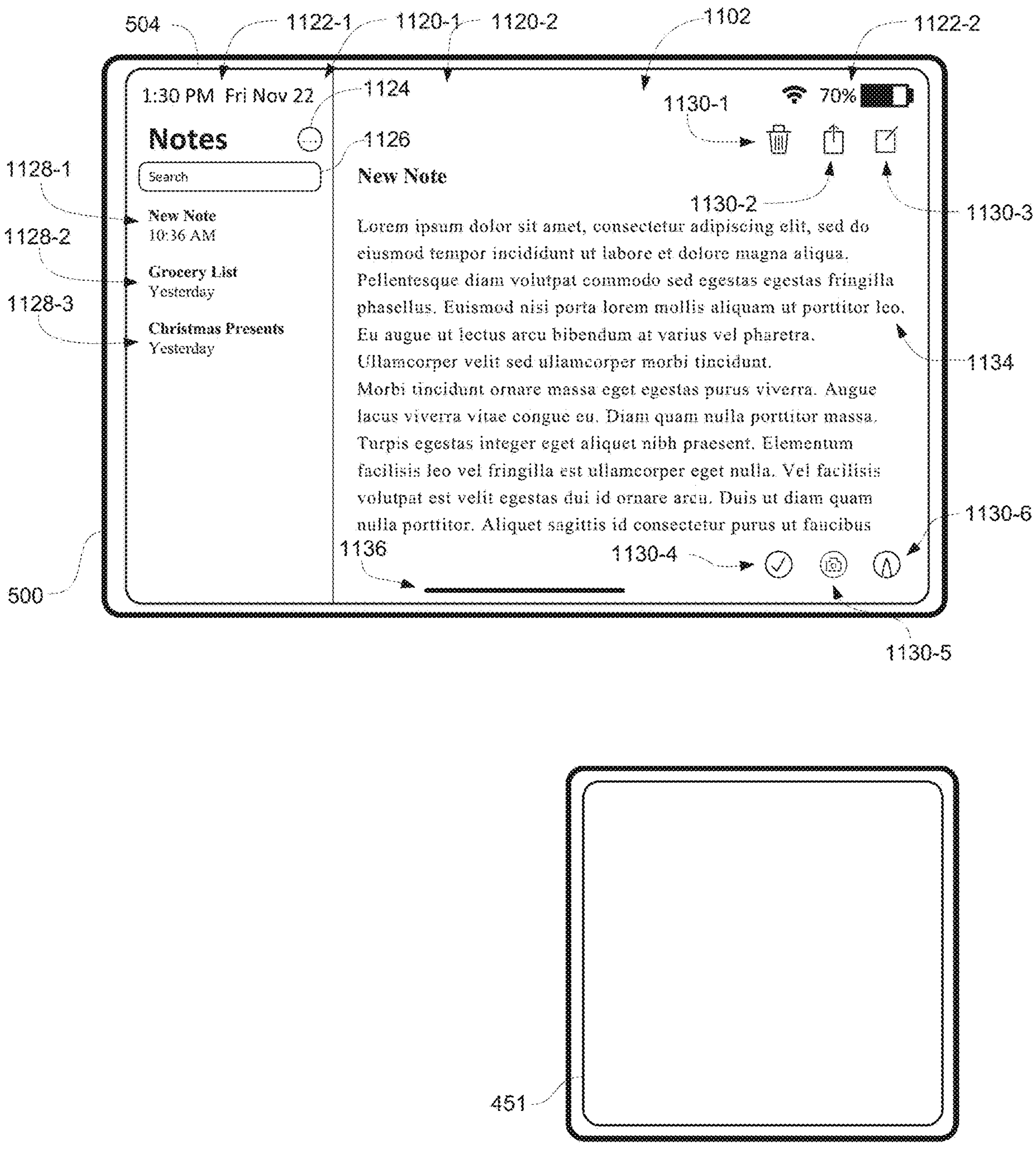
FIGS. 11A-11LL illustrate exemplary ways in which an electronic device dismisses or switches applications using a cursor in accordance with some embodiments.

FIG. 11A illustrates an exemplary device 500 that is capable of displaying a user interface. In some embodiments, the user interface is displayed via a display generation component such as a touch screen display, a monitor, a television, a projector, an integrated or external display device, or any other suitable display device. As shown in FIG. 11A, the electronic device 500 presents user interface 1102 on touch screen 504. In some embodiments, user interface 1102 is similar to user interface 602 described above. In FIG. 11A, user interface 1102 is of a note taking application (e.g., similar to user interface 902 described above). In some embodiments, the note taking application includes a first section 1120-1 corresponding to a note browsing and selection sidebar, and a second section 1120-2 corresponding to a content viewing and entry interface. In some embodiments, first section 1120-1 includes a contextual menu button 1124, a search field 1126, and one or more saved notes 1128-1 to 1128-3. In some embodiments, second section 1120-2 includes content viewing and entry region 1134, and one or more buttons 1130-1 to 1130-6 for performing one or more functions associated with the note taking application, such as deleting the note, sharing the note, inserting photos, changing writing modes, etc. In some embodiments, user interface 1102 includes status indicators 1122-1 and 1122-2. Status indicator 1122-1 optionally is located at the top-left of the user interface and displays the current time and date. Status indicator 1122-2 optionally is located at the top-right of the user interface and displays the network connectivity status of the device and/or the battery status of the device. It is understood that status indicators 1122-1 and 1122-2 can include fewer indicators than those shown or more indicators than those shown.

Figure 11B:
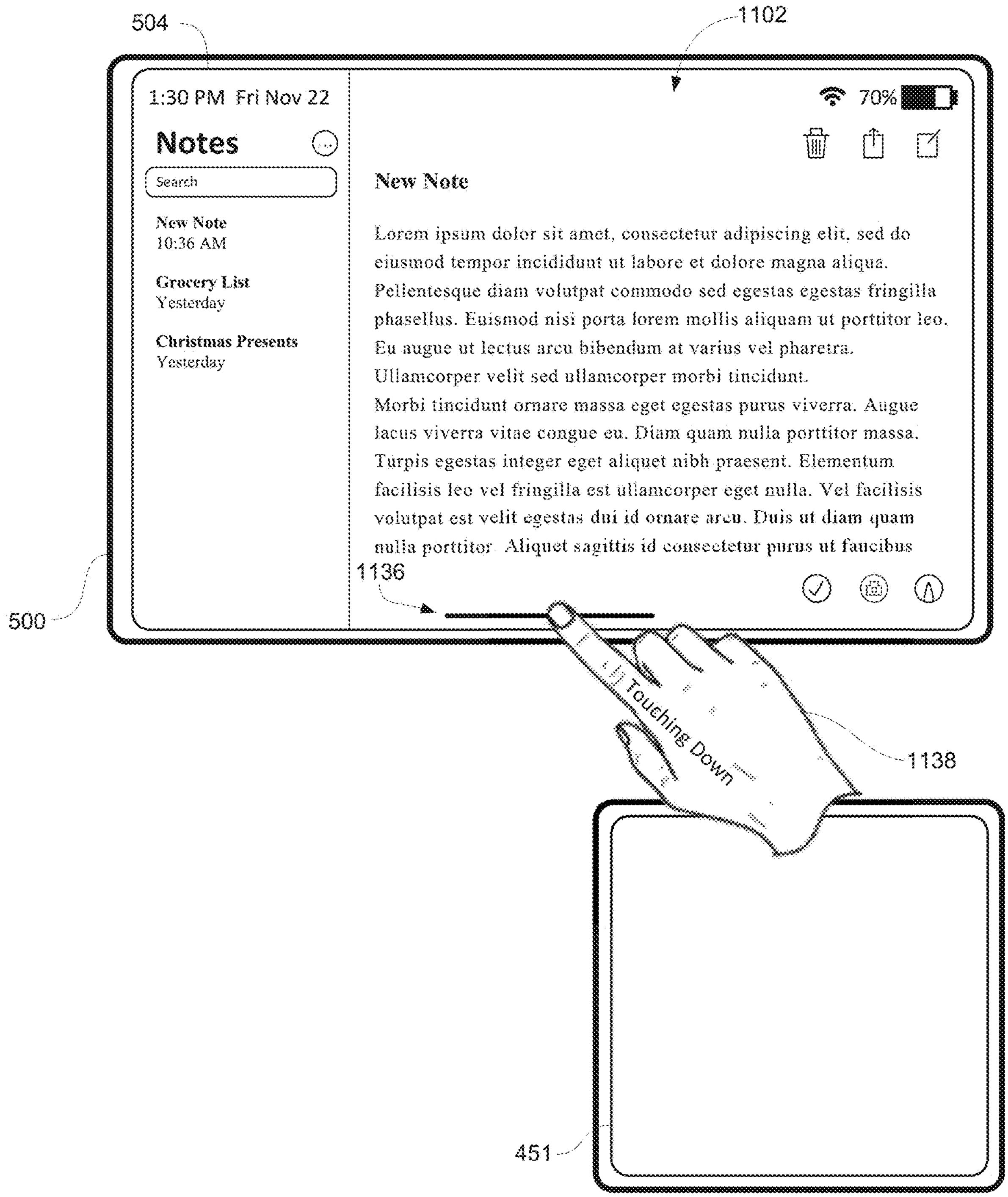
Figure 11C:
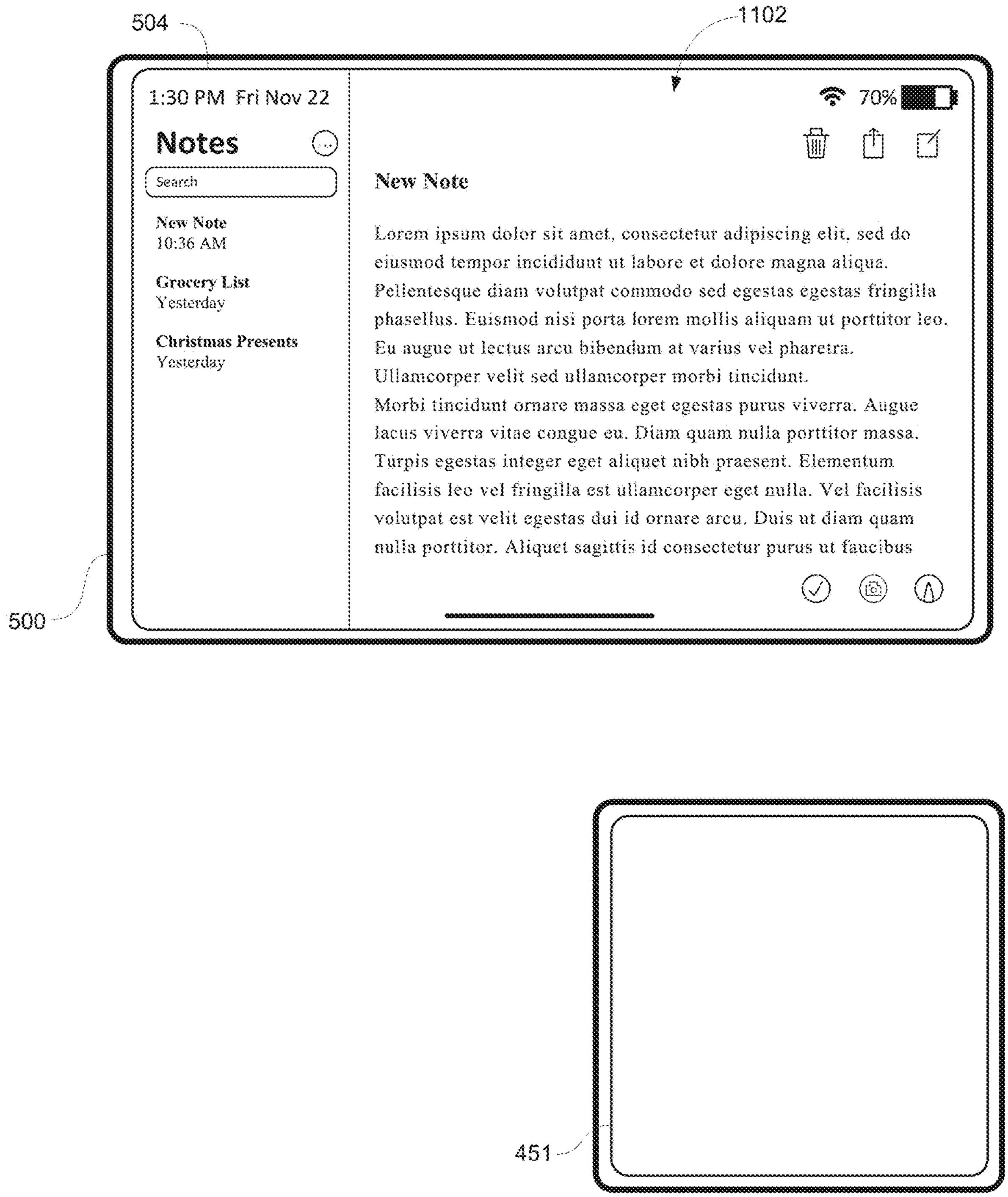

In some embodiments, user interface 1102 includes home affordance 1136. In FIG. 11B, a user input corresponding to a selection input is received on the touch screen 504 from hand 1138 (e.g., a finger on hand 1138) on home affordance 1136. In some embodiments, the selection input is a tap (e.g., touchdown followed by liftoff of a contact within a time threshold of touchdown, and having less than a threshold amount of movement while touched-down) on the touch screen 504 at the location of home affordance 1136. In some embodiments, device 500 does not respond to the selection input and does not display a home screen user interface or the application switching user interface, as shown in FIG. 11C.

Figure 11D:
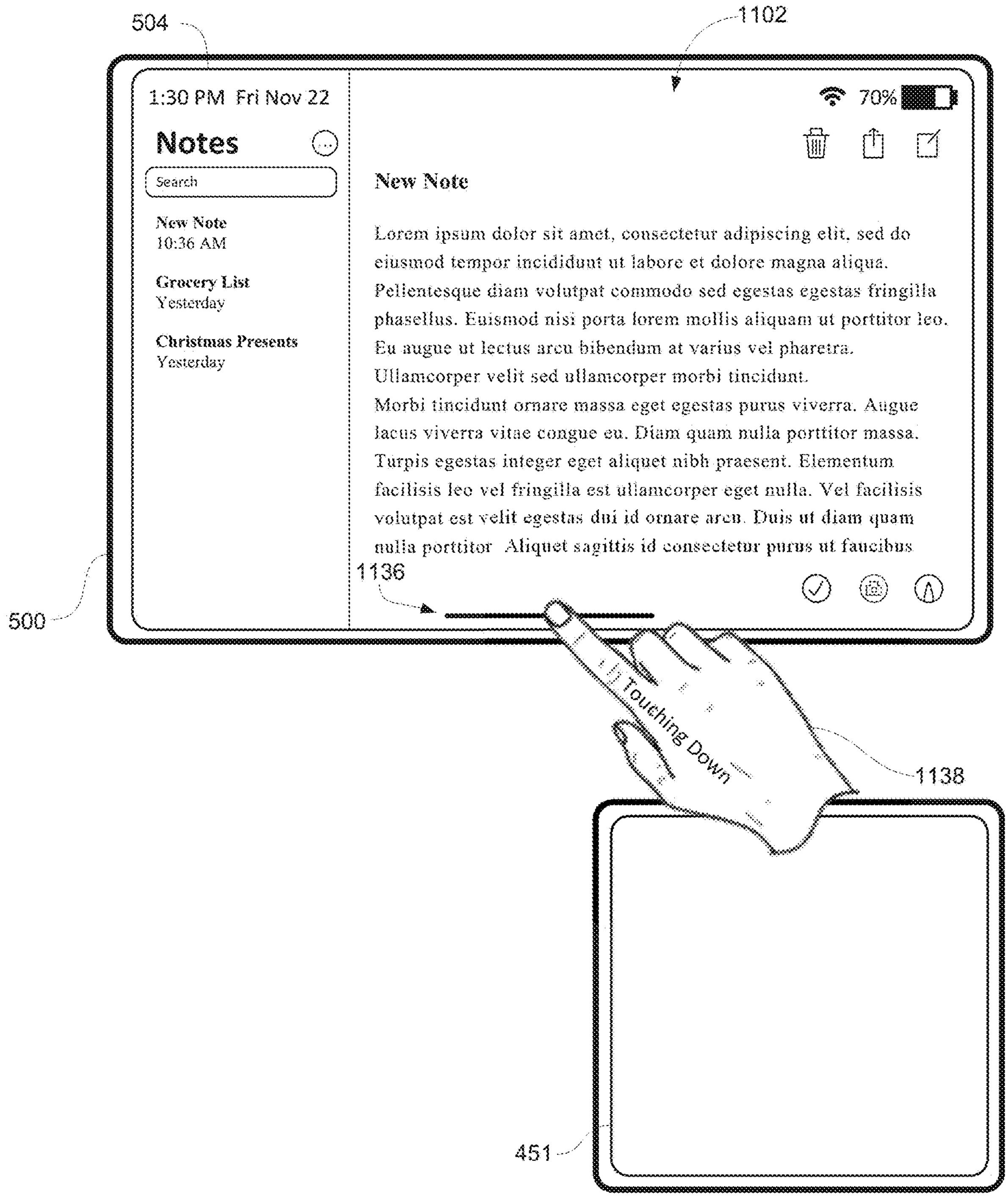
Figure 11E:
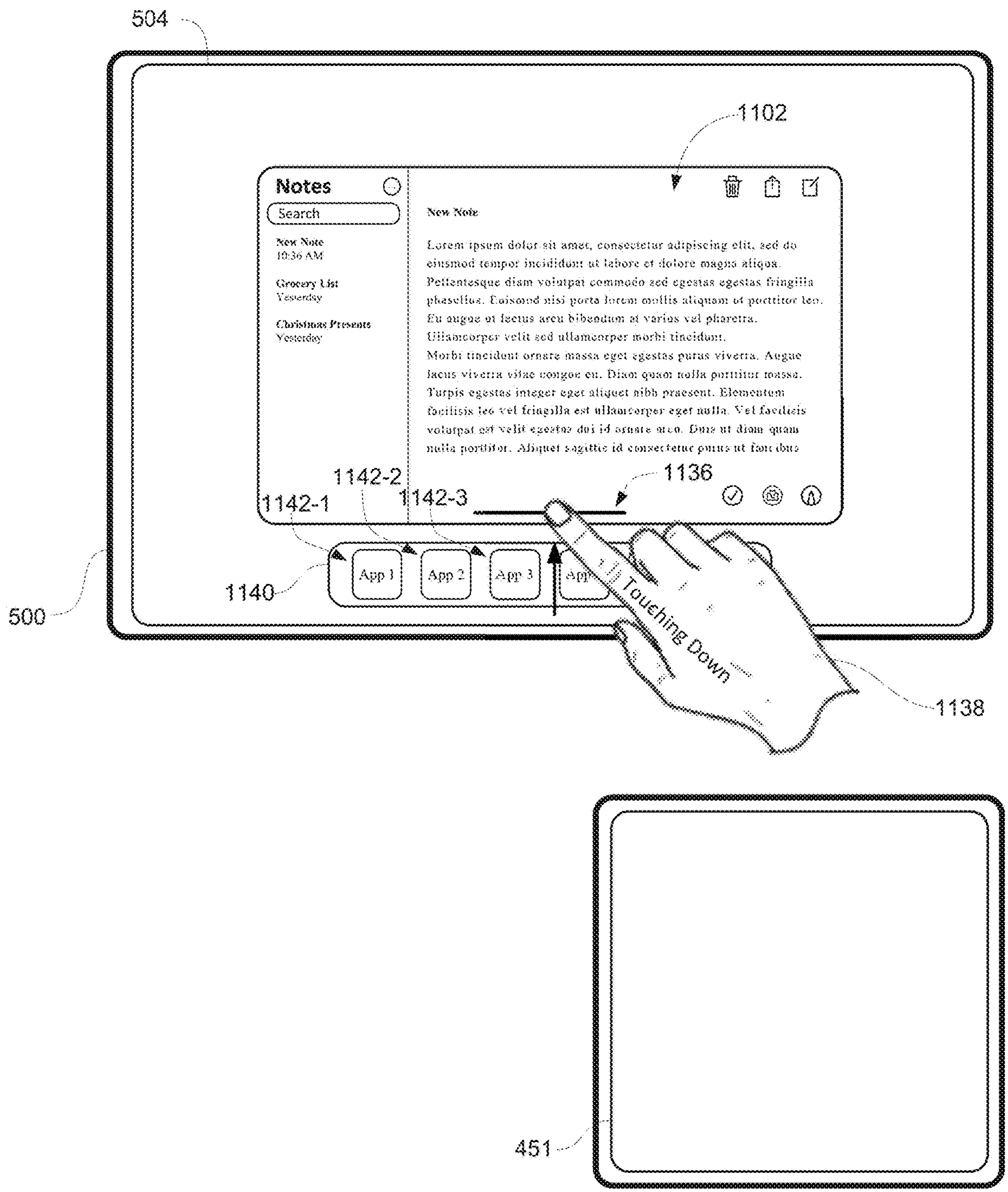

In FIG. 11D, a user input corresponding to a contact with the touch screen 504 from hand 1138 (e.g., a finger on hand 1138) is detected at the location of home affordance 1136. In FIG. 11E, while maintaining contact with touch screen 504, an upward swipe from hand 1138 on touch screen 504 is detected. In some embodiments, in response to the upward swipe, dock 1140 is displayed and user interface 1102 reduces in size and begins to move upwards in response to the user input. In some embodiments, dock 1140 is displayed before user interface 1102 reduces in size and begins moving upwards. In some embodiments, user interface 1102 reduces in size while user interface 1102 moves upwards. In some embodiments, dock 1140 includes one or more representations of applications that are selectable to cause display of the respective applications. For example, representation 1142-1 corresponding to App 1 is selectable to display App 1. In some embodiments, dock 1140 provides shortcuts for certain selected applications and/or recently opened applications (e.g., a method to cause display of the applications represented on dock 1140 without displaying a home screen user interface or an application launching user interface).

Figure 11F:
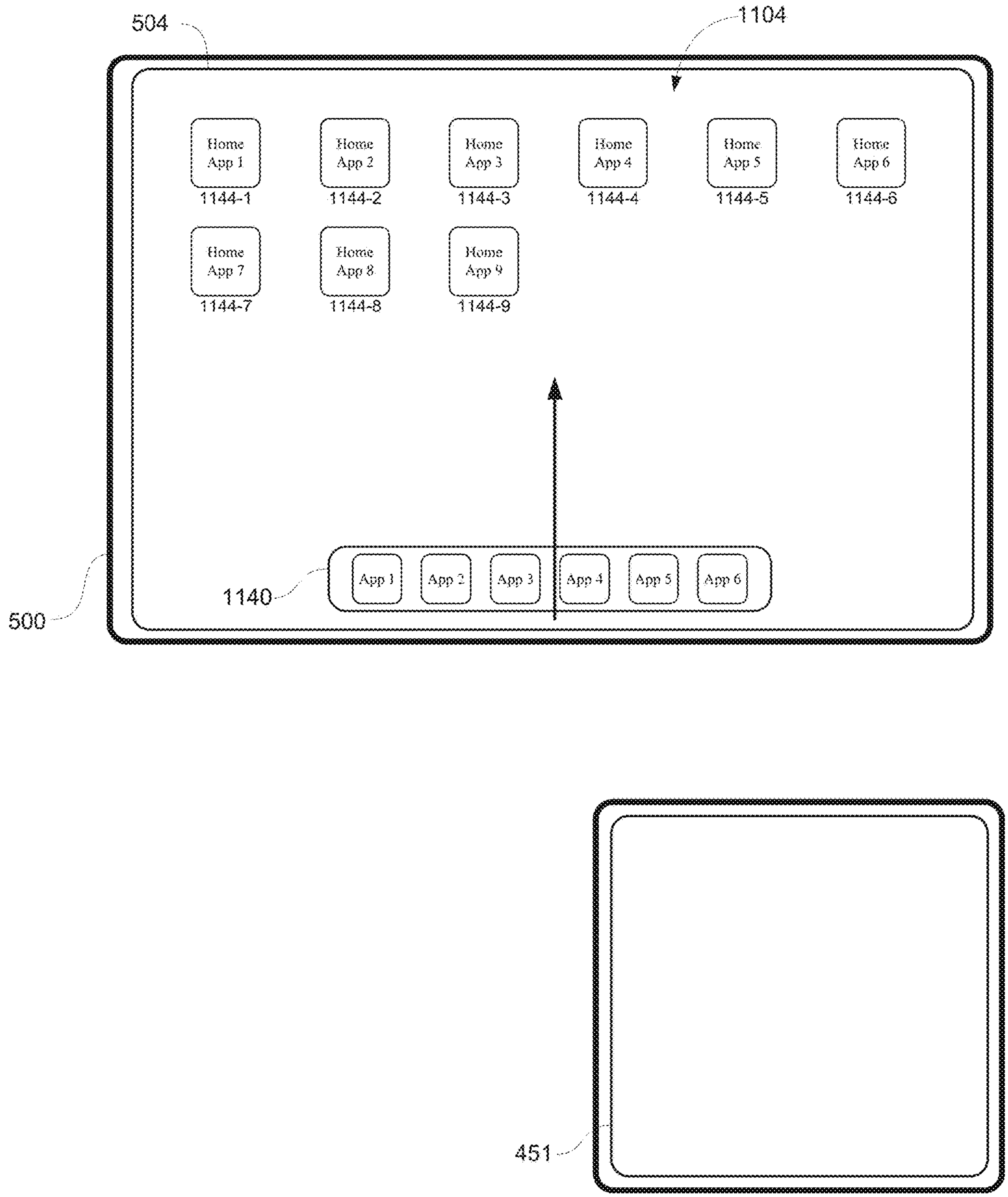

In FIG. 11F, while maintaining contact with touch screen 504, hand 1138 continues the upward swipe on touch screen 504. In some embodiments, in response to the continued upward swipe, device 500 dismisses user interface 1102 (e.g., ceases displaying) and displays user interface 1104 corresponding to a home screen user interface (optionally only if the user input satisfies a first criteria). In some embodiments, if the user input satisfies first criteria, then the home screen user interface is displayed. In some embodiments, the home screen user interface is the same as or similar to user interface 400 and includes one or more representations of one or more applications installed on device 500 that are selectable to display the selected application (e.g., app 1144-1 to 1144-9). In some embodiments, if the user input satisfies certain criteria (e.g., a second criteria different from the first criteria), then instead of displaying the home screen user interface 1104 (e.g., the second criteria is not satisfied if the first criteria is satisfied and vice versa), device 500 displays an application switching user interface, as will be described in further detail below. In some embodiments, the criteria for causing display of the home screen user interface (e.g., the first criteria) is satisfied if the input has a vertical component above a threshold, and/or a horizontal component less than a threshold, and/or if the input satisfies other possible characteristics and/or combination of characteristics. In some embodiments, the criteria for causing display of the application switching user interface (e.g., the second criteria) is satisfied if the input has a horizontal component above a threshold, and/or if the input has an upward component less than a threshold, and/or if the input satisfies other possible characteristics and/or combination of characteristics.

Figure 11G:
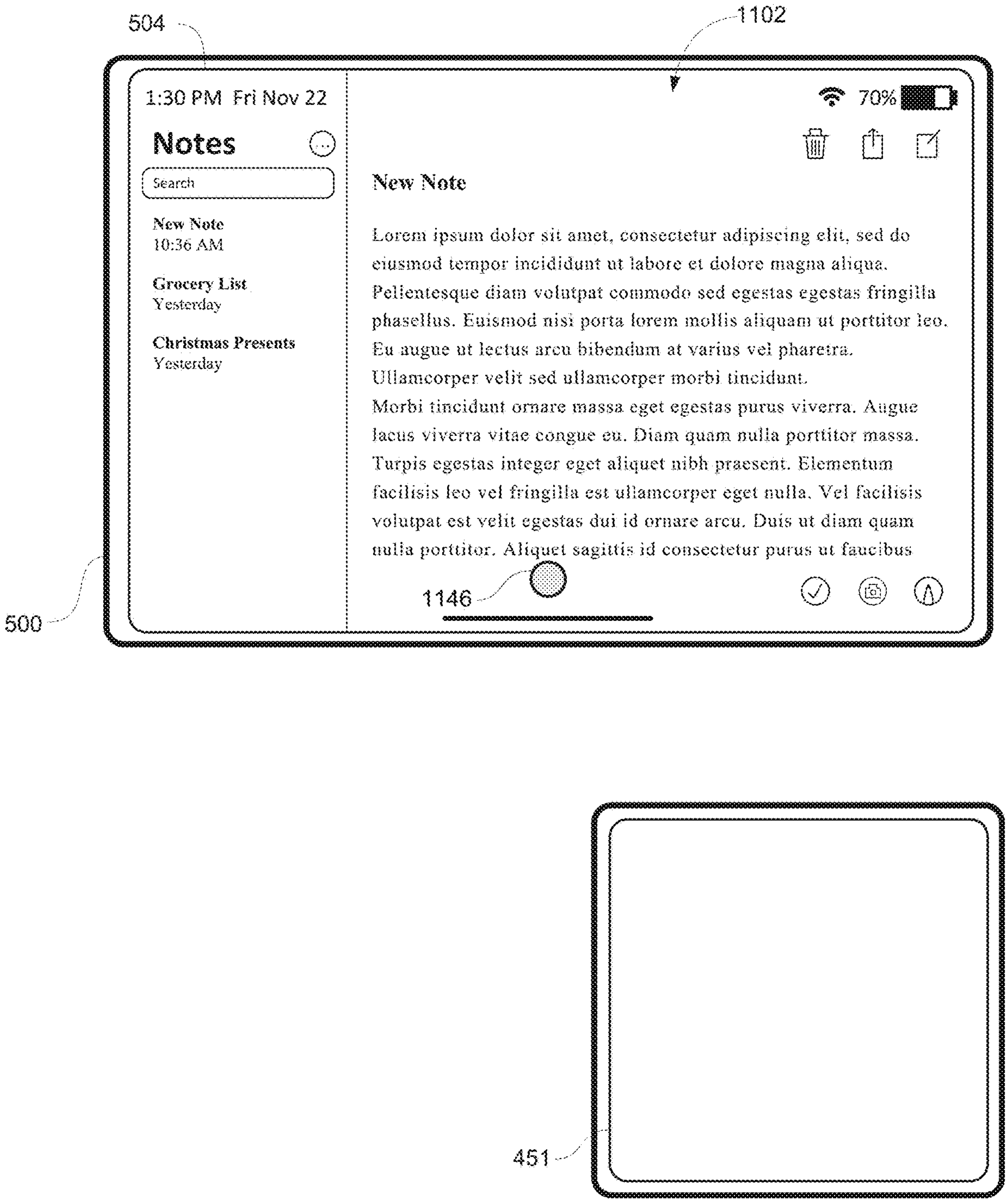
Figure 11H:
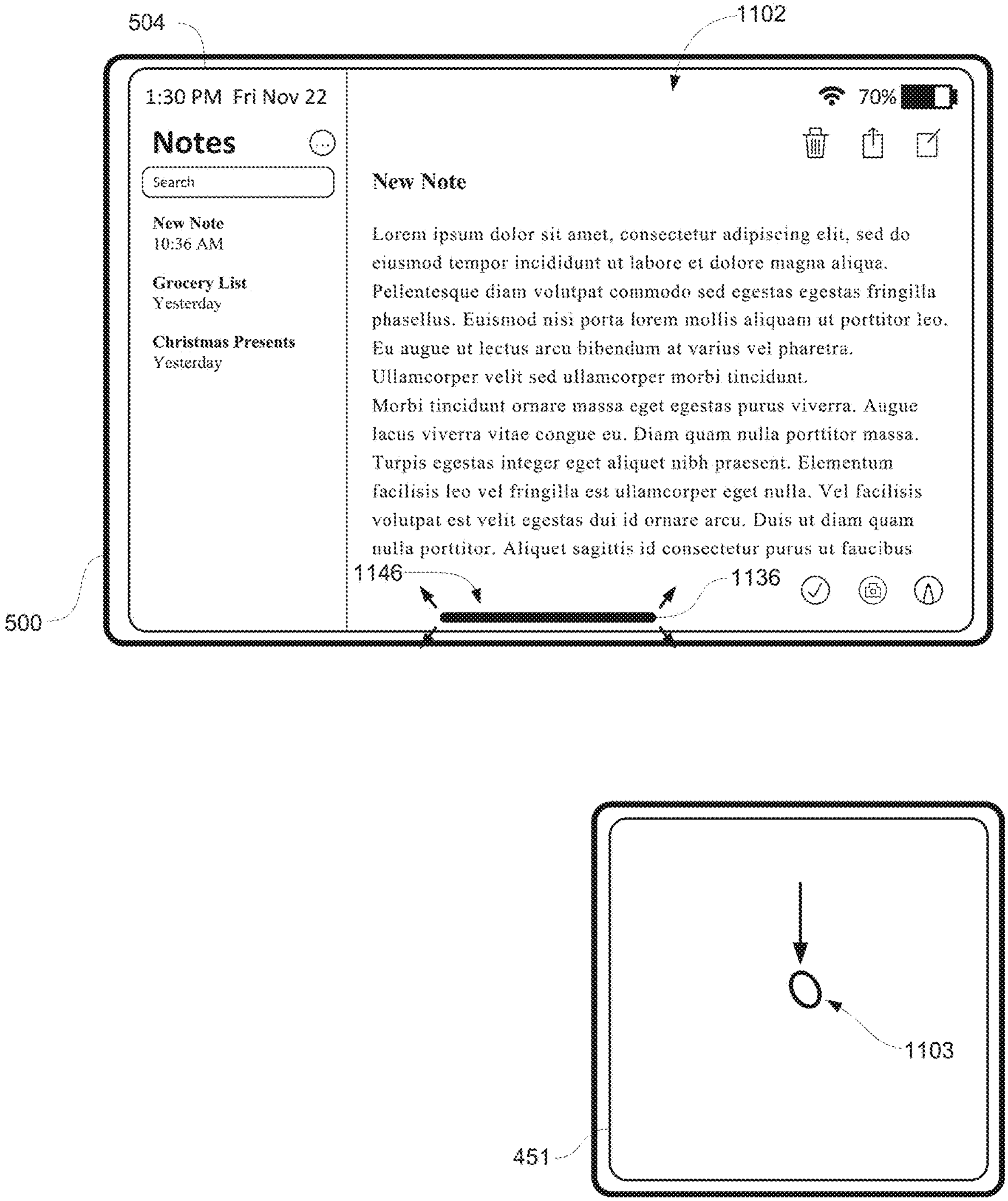

FIG. 11G illustrates an embodiment in which device 500 is displaying user interface 1102 and cursor 1146. In FIG. 11H, a downward swipe of input 1103 (e.g., contact 1103) on touch sensitive surface 451 is received moving cursor 1146 to the location of home affordance 1136. In some embodiments, in response to moving cursor 1146 to the location of home affordance 1136, home affordance 1136 is selected for input and the size and shape of cursor 1146 changes to be based on home affordance 1136 (as described above with respect to method 700 and 800). Thus, home affordance 1136 visually appears to increase in size, as shown in FIG. 11H.

Figure 11I:
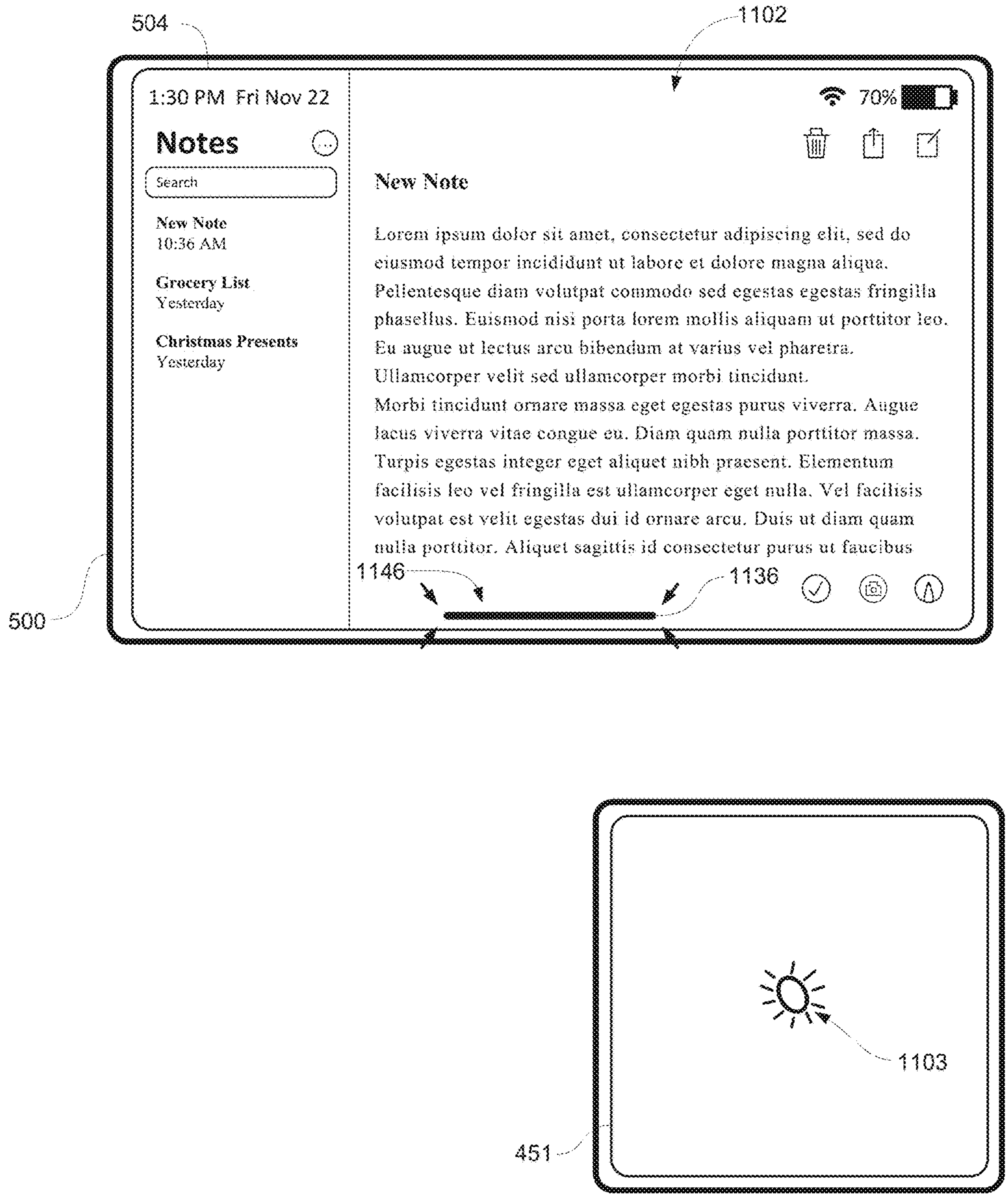

In FIG. 11I, a user input 1103 corresponding to a selection input (e.g., click-down on touch-sensitive surface 451 and/or contact with an intensity greater than an intensity threshold on touch-sensitive surface 451) is received on touch sensitive surface 451. In some embodiments, in response to detecting the selection input and while the selection input is being received (e.g., while and for the duration of when the click and/or intensity greater than a threshold is held), cursor 1146 and/or home affordance 1136 becomes smaller and/or darker, as shown in FIG. 11I. In some embodiments, in response to the selection input (e.g., optionally after the termination of the selection input), device 500 displays user interface 1104 corresponding to the home screen user interface. Thus, in some embodiments, a selection input on the home affordance 1136 received via the touch screen 504 does not cause display of the home screen user interface 1104, while a corresponding selection input received on an external touch sensitive surface 451 while the home affordance 1136 is selected by the cursor for input causes display of the home screen user interface.

Figure 11J:
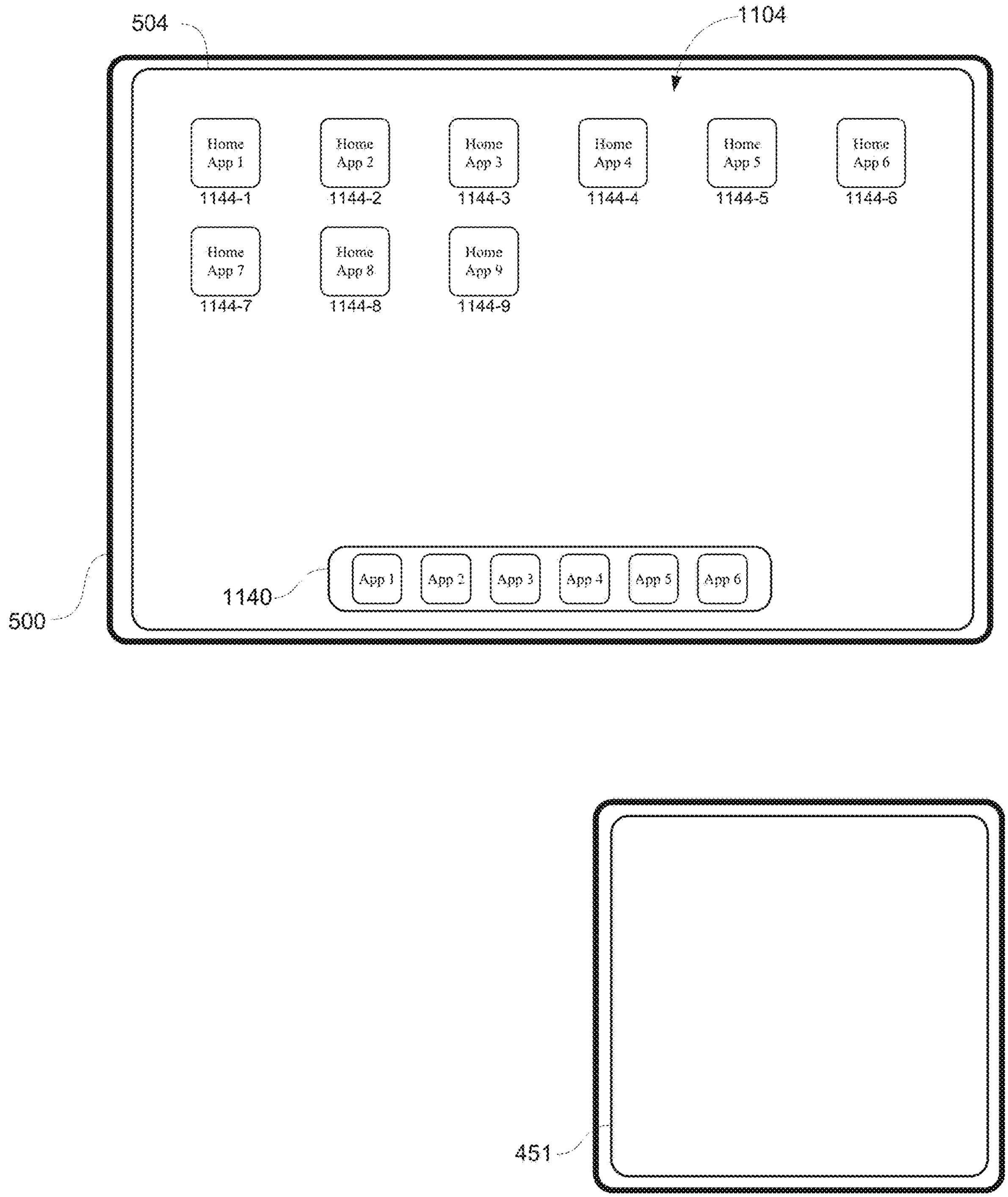
Figure 11K:
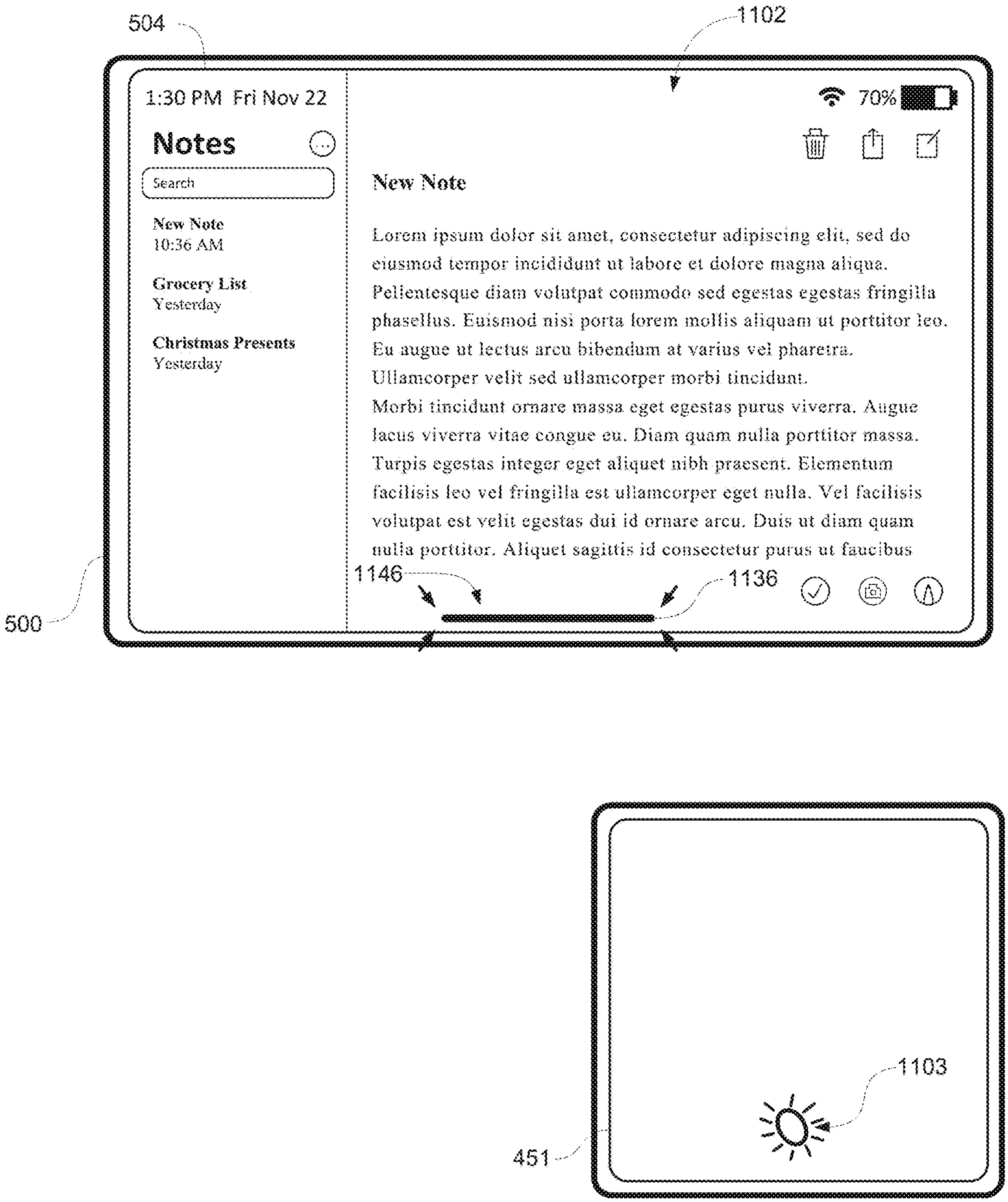
Figure 11L:
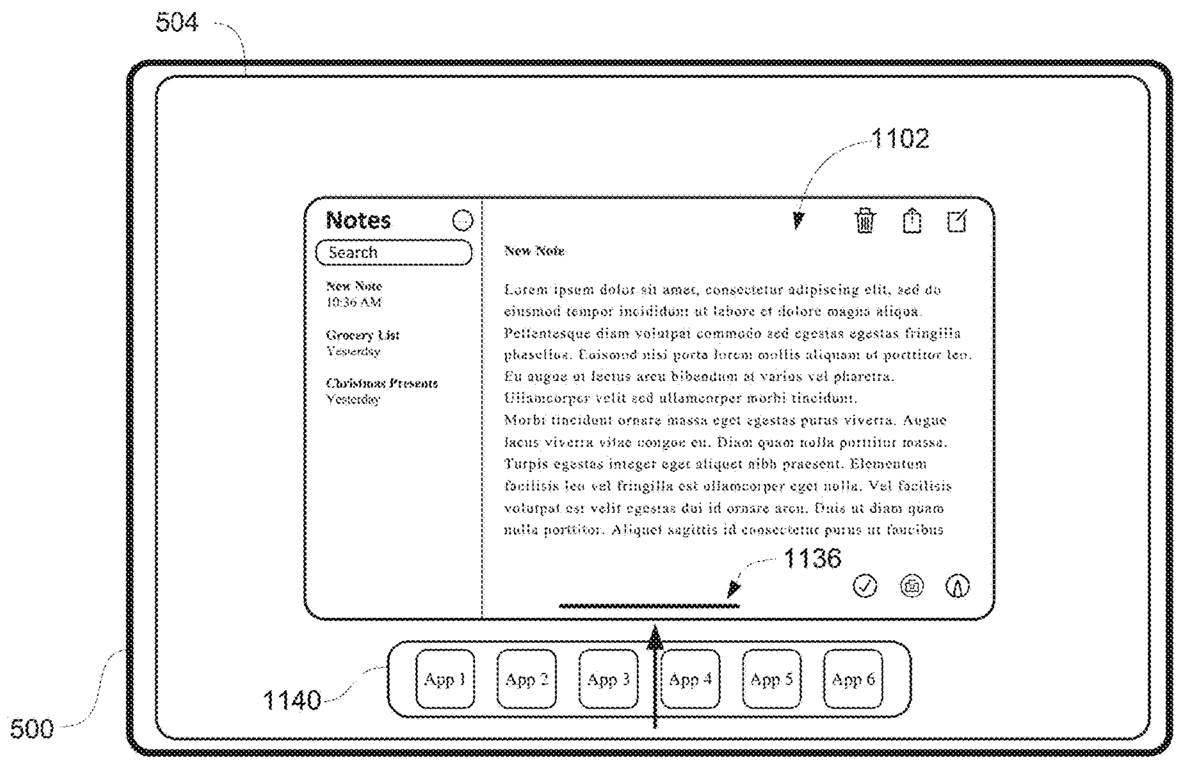
Figure 11L:
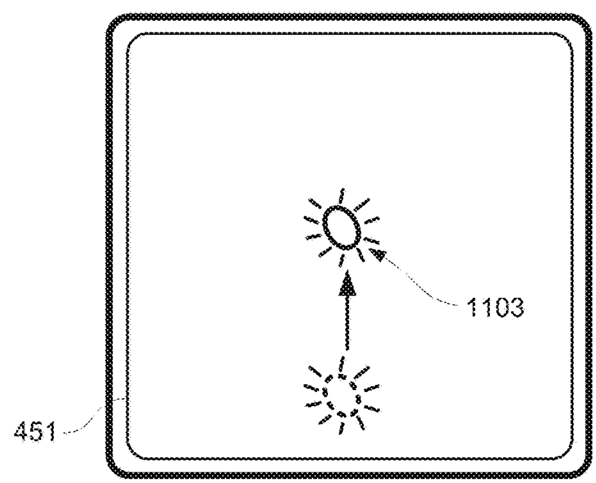

FIG. 11K illustrates an embodiment in which a user input 1103 corresponding to a selection input (e.g., a click-down with contact 1103 and/or contact 1103 having an intensity greater than an intensity threshold) is received on touch sensitive surface 451 while cursor 1146 is at the position of home affordance 1136 and home affordance 1136 is selected for input by cursor 1146, thus causing cursor 1146 and/or home affordance 1136 to become smaller and/or darker. In FIG. 11L, while maintaining the selection input (e.g., while maintaining selection of home affordance 1136), an upward swipe of user input 1103 (e.g., contact 1103) is detected on touch sensitive surface 451. In some embodiments, in response to the upward swipe input, dock 1140 is displayed and user interface 1102 reduces in size and begins to move upwards in response to the user input (optionally similarly to described above with respect to FIG. 11E) as shown in FIG. 11L.

Figure 11M:
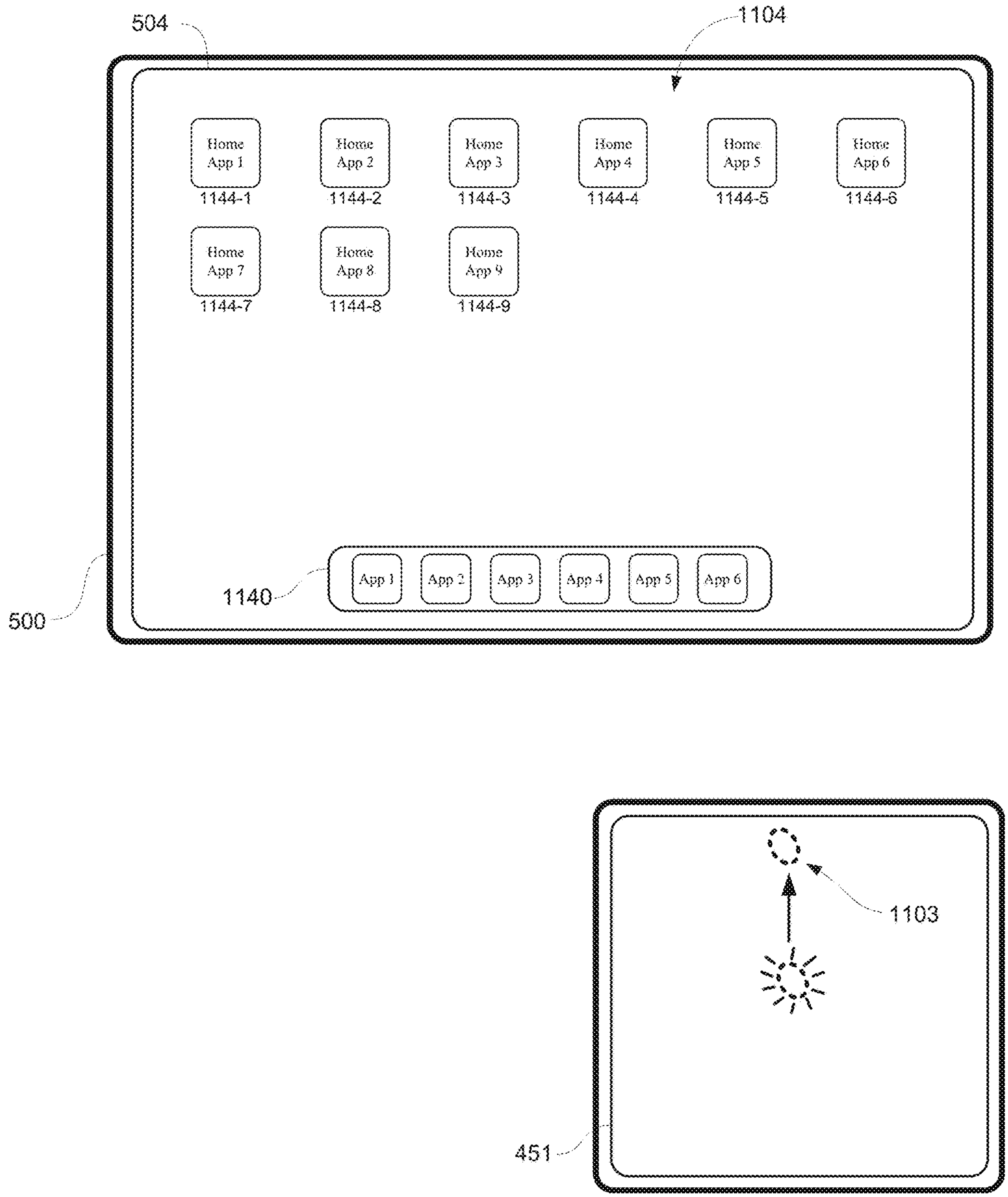
Figure 11N:
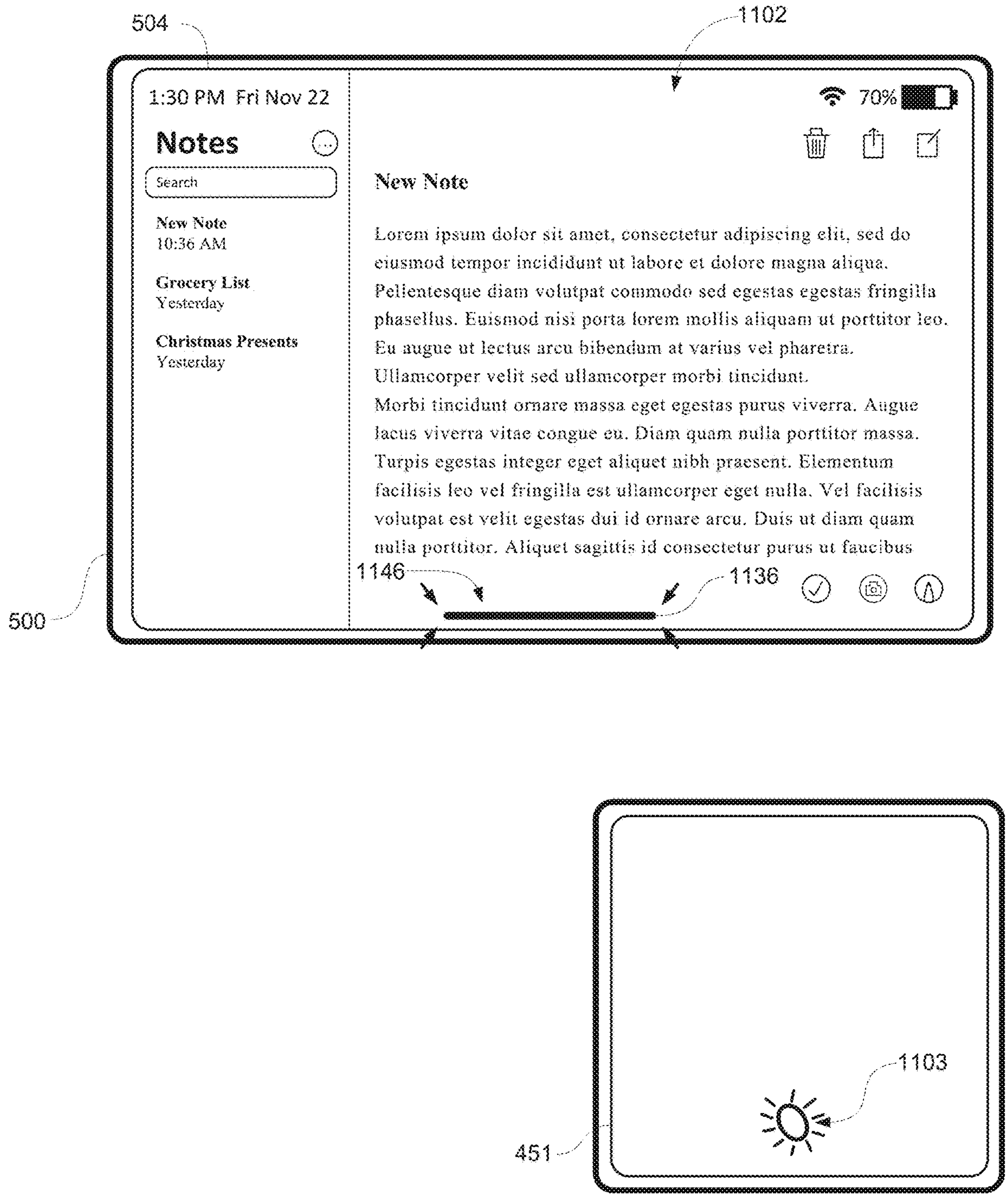
Figure 11O:
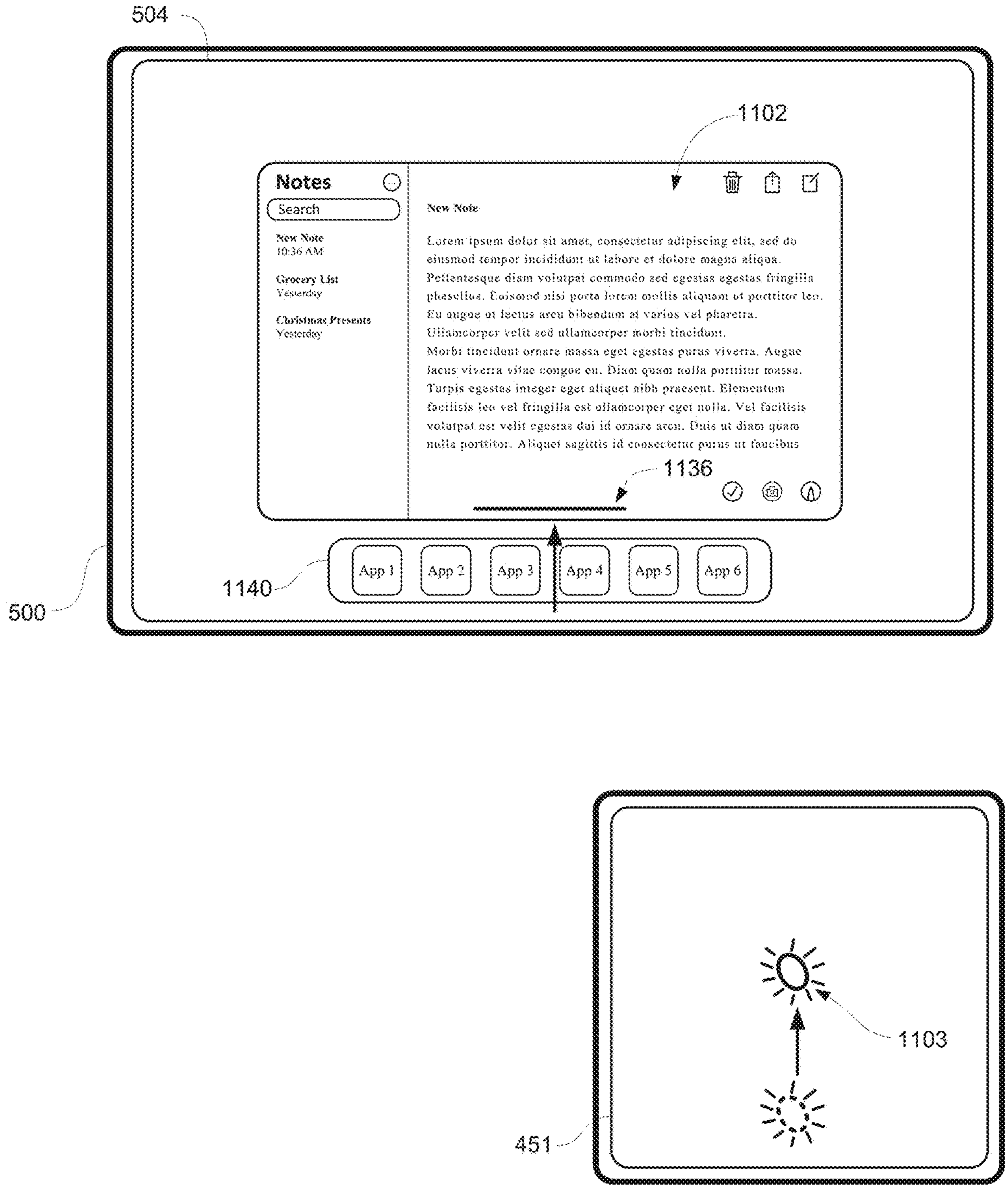

In FIG. 11M, while maintaining the selection input, the upward swipe of user input 1103 (e.g., contact 1103) continues further upwards on touch sensitive surface 451. In some embodiments, in response to the continued upward swipe, device 500 dismisses user interface 1102 (e.g., ceases displaying) and displays user interface 1104 corresponding to a home screen user interface (optionally only if the user input satisfies a first criteria), optionally similarly as described above with respect to FIG. 11J. In some embodiments, if the user input satisfies first criteria, then the home screen user interface is displayed. In some embodiments, if the user input satisfies certain criteria (e.g., a second criteria different from the first criteria), then instead of displaying the home screen user interface 1104 (e.g., the second criteria is not satisfied if the first criteria is satisfied and vice versa), device 500 displays an application switching user interface, as will be described in further detail below. In some embodiments, the criteria for causing display of the home screen user interface (e.g., the first criteria) is satisfied if the input has a vertical component above a threshold, and/or a horizontal component less than a threshold, and/or if the input satisfies other possible characteristics and/or combination of characteristics. In some embodiments, the criteria for causing display of the application switching user interface (e.g., the second criteria) is satisfied if the input has a horizontal component above a threshold, and/or if the input has an upward component less than a threshold, and/or if the input satisfies other possible characteristics and/or combination of characteristics. Thus, in some embodiments, a continuous upward swipe starting from an initial position associated with the home affordance 1136 received via the touch screen 504 and received via the touch sensitive surface 451 both satisfy the first criteria and cause display of the home screen user interface. In some embodiments, the FIG. 11N illustrates an embodiment in which a user input 1103 (e.g., contact 1103) corresponding to a selection input is received on touch sensitive surface 451 while cursor 1146 is at the position of home affordance 1136 and home affordance 1136 is selected for input by cursor 1146, thus causing cursor 1146 and/or home affordance 1136 to become smaller and/or darker. In FIG. 11O, while maintaining the selection input (e.g., while maintaining selection of home affordance 1136), an upward swipe of user input 1103 (e.g., contact 1103) is detected on touch sensitive surface 451. In some embodiments, in response to the upward swipe input, dock 1140 is displayed and user interface 1102 reduces in size and begins to move upwards in response to the user input (optionally similarly to described above with respect to FIG. 11L) as shown in FIG. 11O.

Figure 11P:
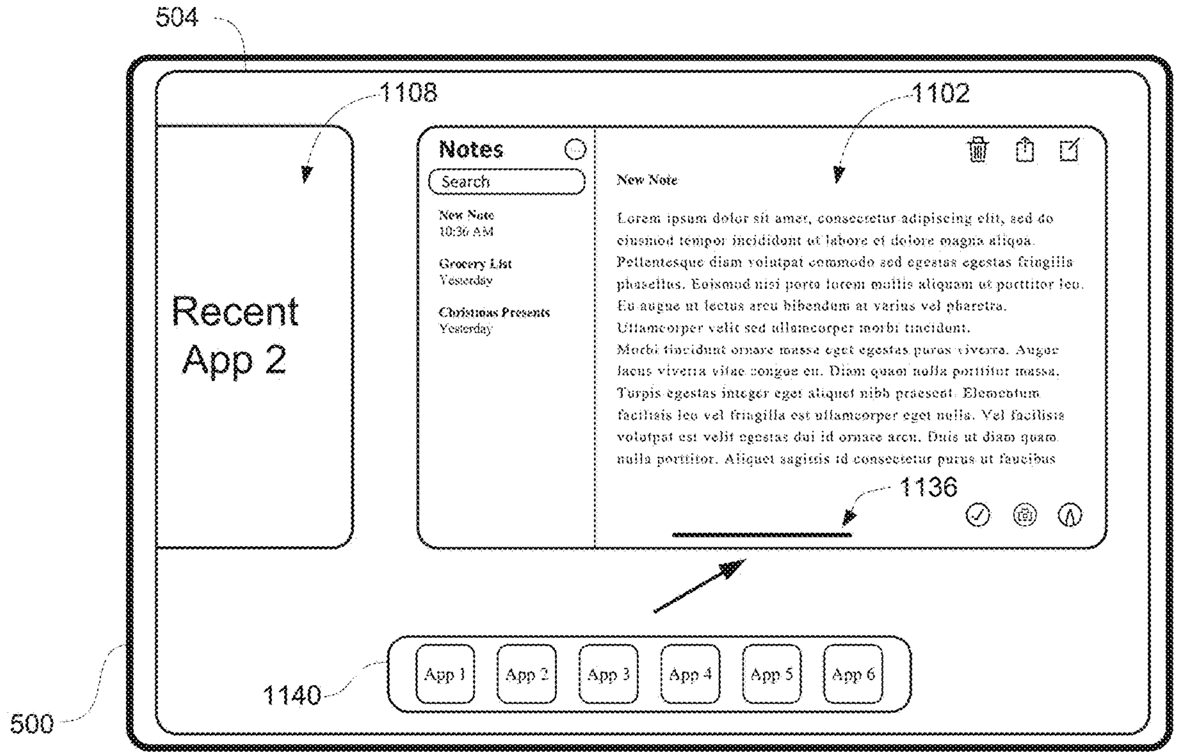
Figure 11P:
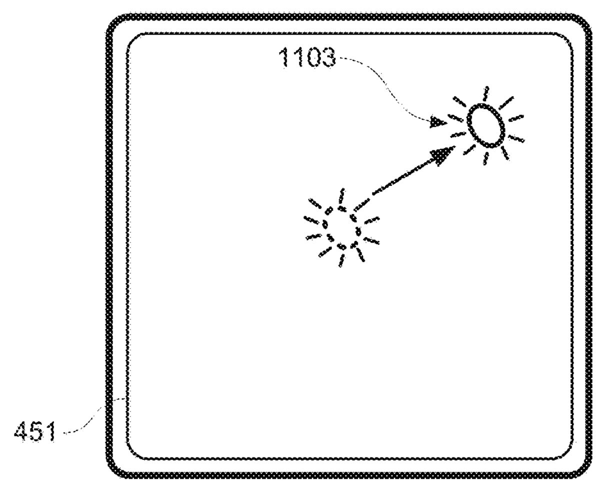
Figure 11Q:
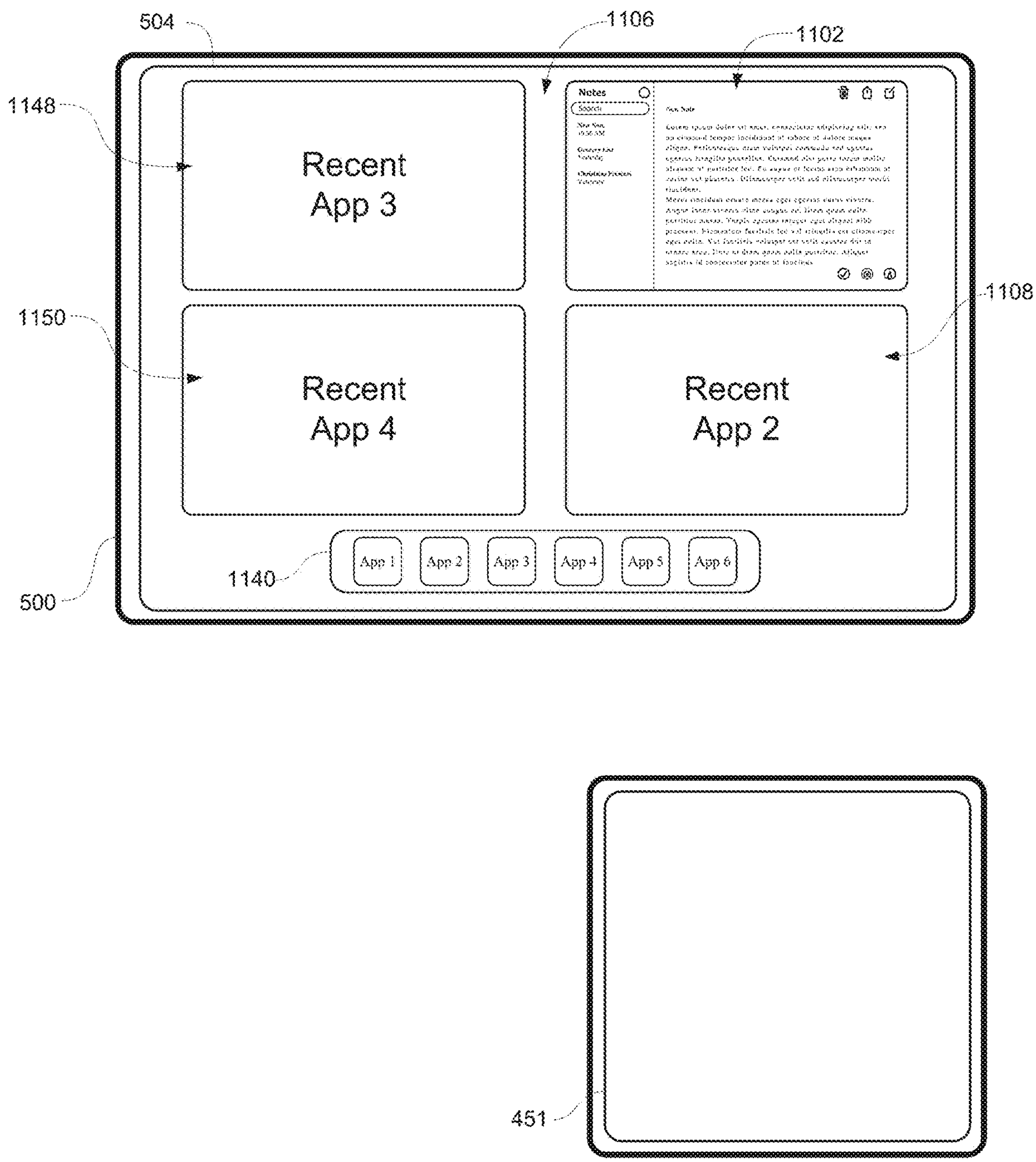

In FIG. 11P, while maintaining the selection input, user input 1103 continues in an upward, rightward direction. In some embodiments, in response to the upward, rightward swipe, user interface 1102 further reduces in size and begins to move diagonally in response to the user input, as shown in FIG. 11P. In some embodiments, device 500 begins to display user interface 1108 corresponding to a recently displayed different application (e.g., Recent App 2). Thus, device 500 indicates that the device is entering into application switching mode and will display an application switching user interface (e.g., that the second criteria is satisfied, is almost satisfied, or will be satisfied upon termination of the input). For example, in FIG. 11Q, a termination of user input 1103 is detected (e.g., lift-off of the contact 1103 with touch sensitive surface 451), and the second criteria is satisfied. In some embodiments, in response to the termination of user input 1103, device 500 displays an application switching user interface 1106. As shown in FIG. 11Q, application switching user interface 1106 displays one or more user interfaces of one or more applications that are currently available for display (e.g., as a background process, an inactive process, etc.) that are selectable to display the respective application (e.g., as an active process). For example, user interface 1102 corresponds to the note taking application and includes a snapshot of user interface 1102 when the device entered application switching mode; user interface 1108 corresponds to the most recently displayed application (e.g., "Recent App 2", the application that was displayed most recently before displaying the note taking application) and includes a snapshot of the user interface of Recent App 2 that was displayed when device 500 navigated away from Recent App 2; user interface 1148 corresponds to the second most recently displayed application (e.g., "Recent App 3"); and user interface 1150 corresponds to the third most recently displayed application (e.g., "Recent App 4"). In some embodiments, user interface 1106 is horizontally scrollable to reveal further recent applications. As described above, each representation of a user interface is selectable (e.g., via a selection input on touch screen 504 or touch sensitive surface 451) to cause the respective application to become an active and/or foreground application and displayed on touch screen 504. Thus, in some embodiments, device 500 displays an application switching user interface in response to an input directed to home affordance 1136 if the input has certain characteristics.

Figure 11R:
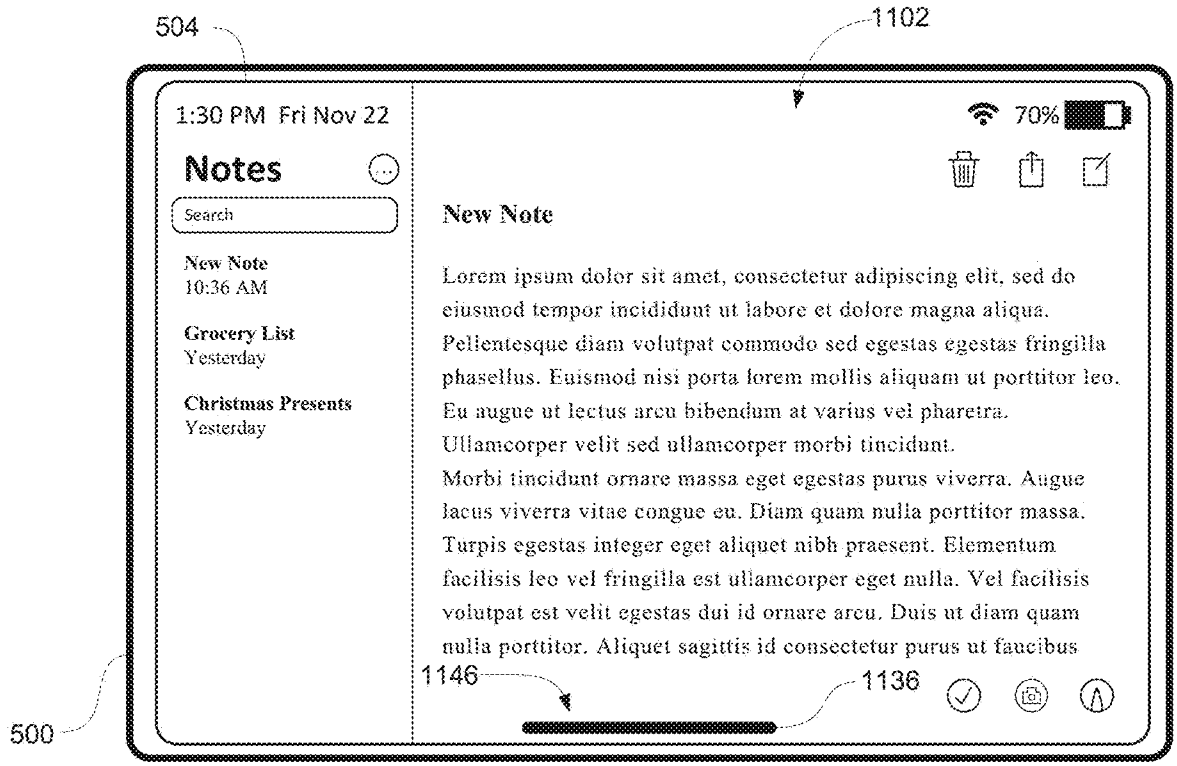
Figure 11R:
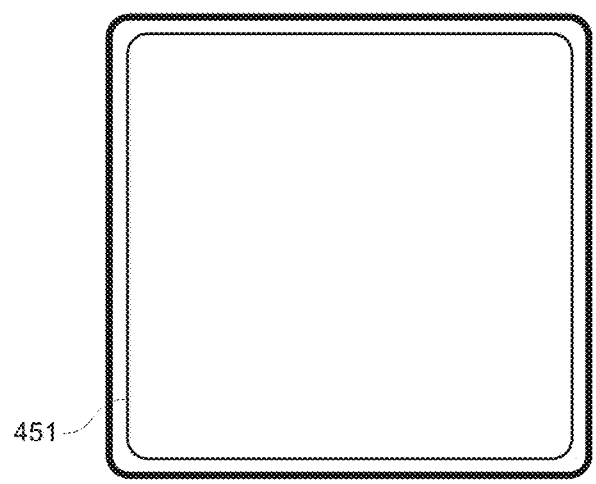
Figure 11S:
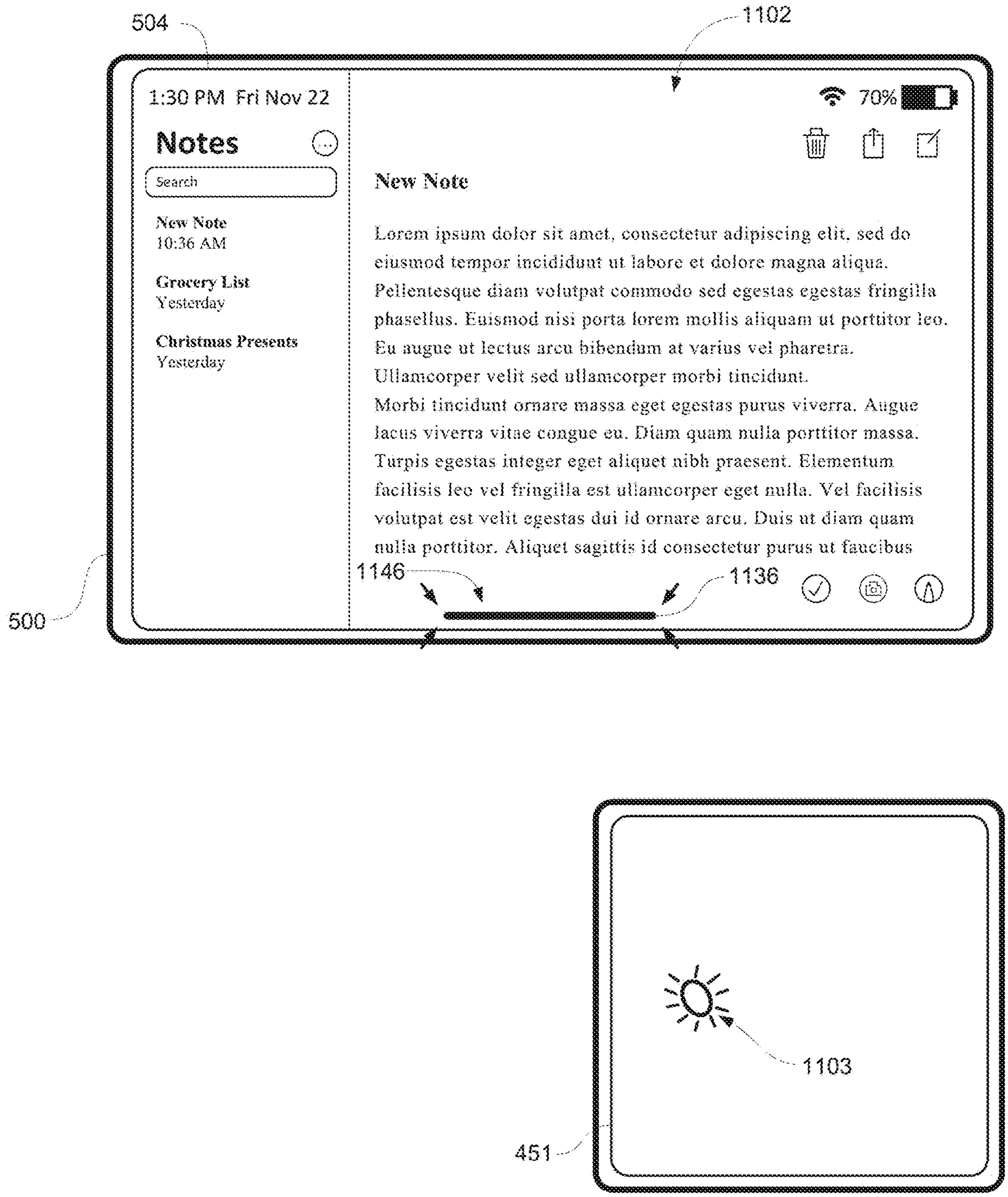

FIG. 11R illustrates an embodiment in which home affordance 1136 is selected for input. In FIG. 11S, while home affordance 1136 is selected for input, a user input 1103 (e.g., contact 1103) corresponding to a selection input is received on touch sensitive surface 451, causing cursor 1146 and/or home affordance 1136 to become smaller and/or darker.

Figure 11T:
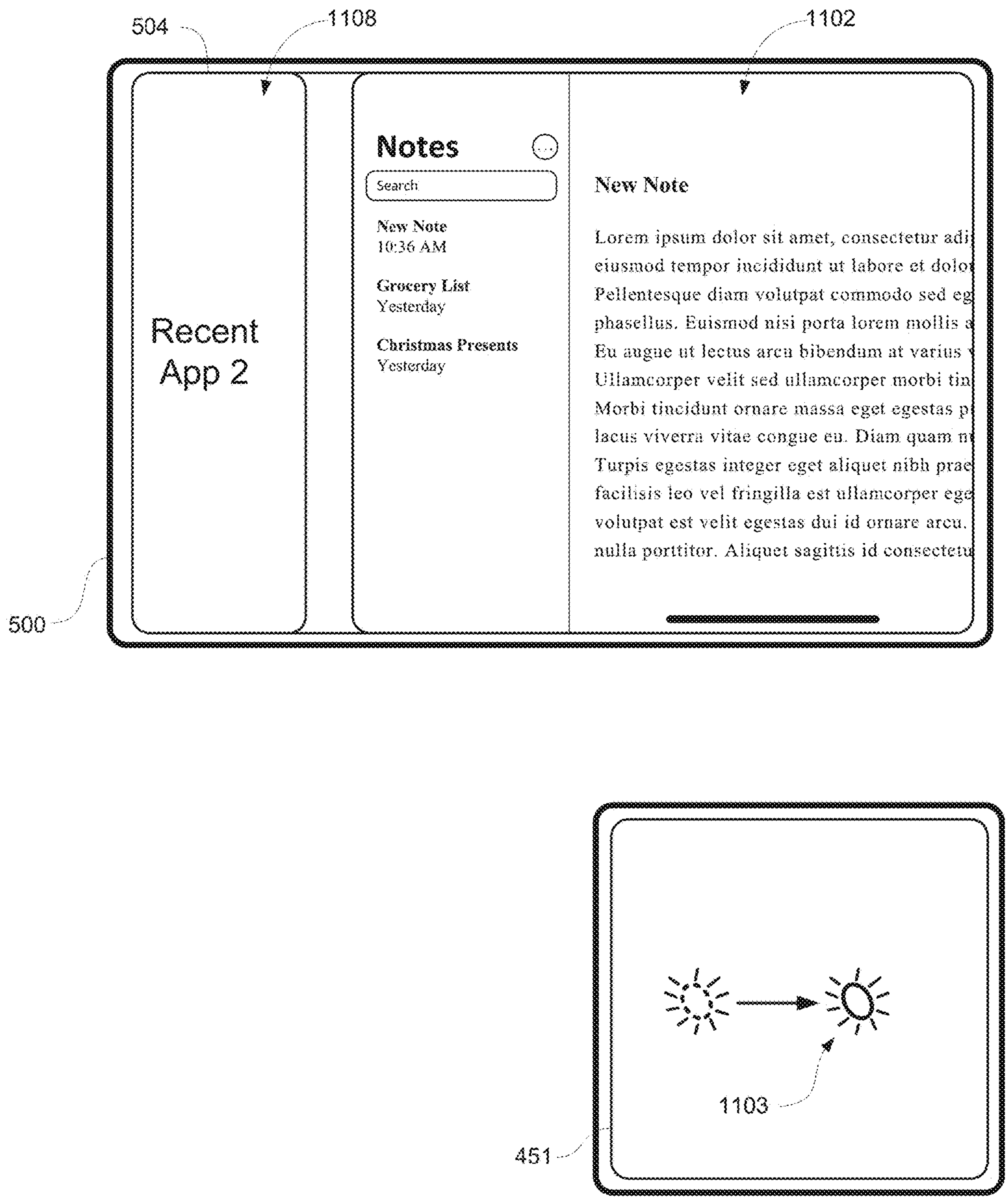
Figure 11U:
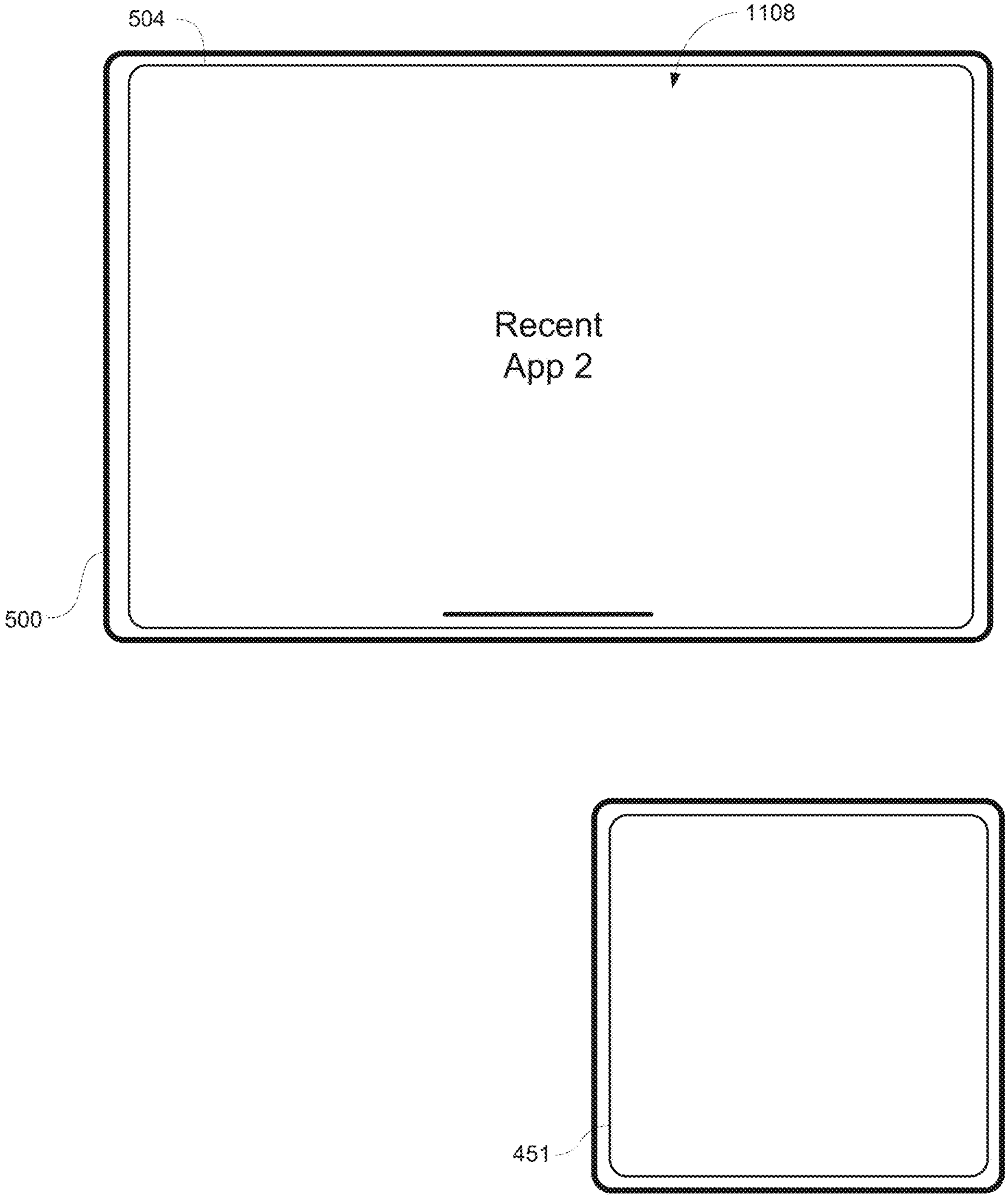

In FIG. 11T, while maintaining the selection input (e.g., while maintaining selection of home affordance 1136), a rightward swipe of user input 1103 is detected on touch sensitive surface 451. In some embodiments, in response to the rightward swipe and while receiving the rightward swipe, user interface 1102 is shifted rightwards in accordance with the user input. In some embodiments, user interface 1108 corresponding to the most recent previously used application (e.g., "Recent App 2") is displayed moving inwards from the left edge of the display area of touch screen 504 in accordance with the user input. In FIG. 11U, a termination of the rightward swipe is detected (e.g., liftoff of contact 1103 from touch-sensitive surface 451). In some embodiments, user interface 1108 corresponding to Recent App 2 is displayed and user interface 1102 is dismissed. In some embodiments, the note taking application becomes a background process or an inactive process. In some embodiments, the note taking application remains an active process, but is merely not displayed. In some embodiments, the note taking application remains at a higher position in the queue of running applications than Recent App 2 (e.g., the queue ordering is not changed). In some embodiments, the note taking application is placed below Recent App 2 in the queue of running applications (e.g., immediately below Recent App 2 or any number of positions below Recent App 2). In some embodiments, if the rightward swipe has a movement below a threshold amount (e.g., less than 1 cm, 2 cm, 5 cm, 10 cm, etc., 10%, 25%, 33%, 50%, 66%, 75%, etc. of user interface 1108 is displayed) when the user input terminated, then user interface 1108 is not displayed, and user interface 1102 is re-displayed on touch screen 504. In some embodiments, user interface 1108 is only displayed if the rightward swipe has movement above the threshold amount (e.g., 1 cm, 2 cm, 5 cm, 10 cm, etc., 10%, 25%, 33%, 50%, 66%, 75%, etc. of user interface 1108 is displayed).

Thus, as illustrated above, a user is able to switch between the currently active application to the previously active application by selecting the home affordance and performing a lateral swipe gesture using touch sensitive surface 451. In some embodiments, a leftward swipe causes the display of the next application in the application queue. For example, if the note taking application is at the head of the queue, then a leftward swipe does not cause display of any other application (optionally maintains display of user interface 1102). But if the note taking application is second in the application queue (e.g., due to it being displayed as a result of a rightward swipe when another application was displayed), then a leftward swipe optionally causes display of the application at the head of the queue. Thus, in some embodiments, a rightward swipe provides a shortcut to switch to the previous application in the queue of running applications (e.g., running as a background process, inactive process, or active process), and a leftward swipe provides a shortcut to switch to the next application in the queue of running applications. In some embodiments, a corresponding rightward or leftward swipe received on touch screen 504 directed to home affordance 1136 (e.g., from a finger on home affordance 1136) switches to the previous or next application, respectfully, similarly to described above with respect to rightward and leftward swipes received on touch sensitive surface 451.

Figure 11V:
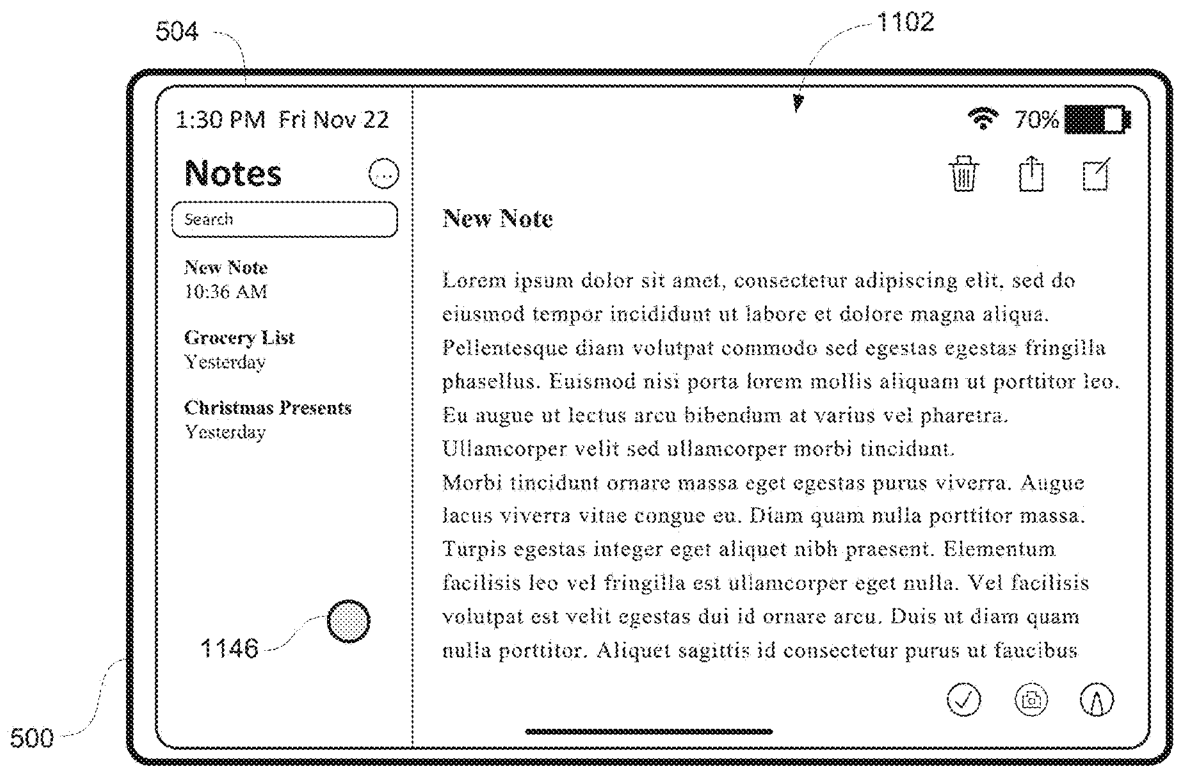
Figure 11V:
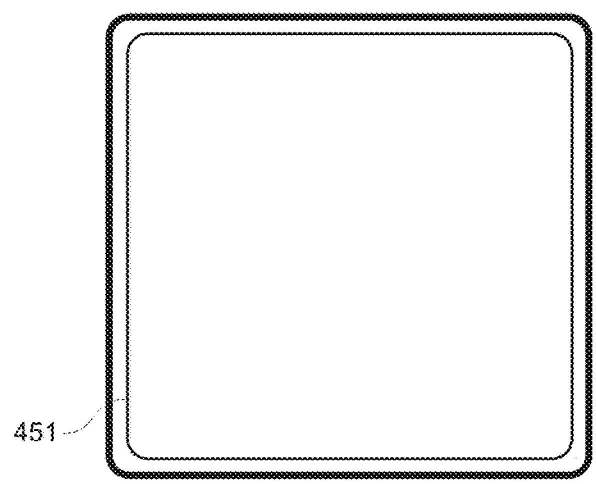

FIGS. 11V-11Z illustrate embodiments of performing the above-described functions of displaying the home screen user interface, application switching user interface, and the previous or next application using multi-finger gestures on touch sensitive surface 451. In FIG. 11V, device 500 displays user interface 1102 corresponding to the note taking application. In FIG. 11V, cursor 1146 is displayed at a location in the user interface other than at the home affordance (e.g., optionally in response to a contact on touch sensitive surface 451 or before cursor 1146 has ceased to be displayed). Thus, the home affordance is not selected for input and selection inputs received on touch sensitive surface 451 are not directed to the home affordance.

Figure 11W:
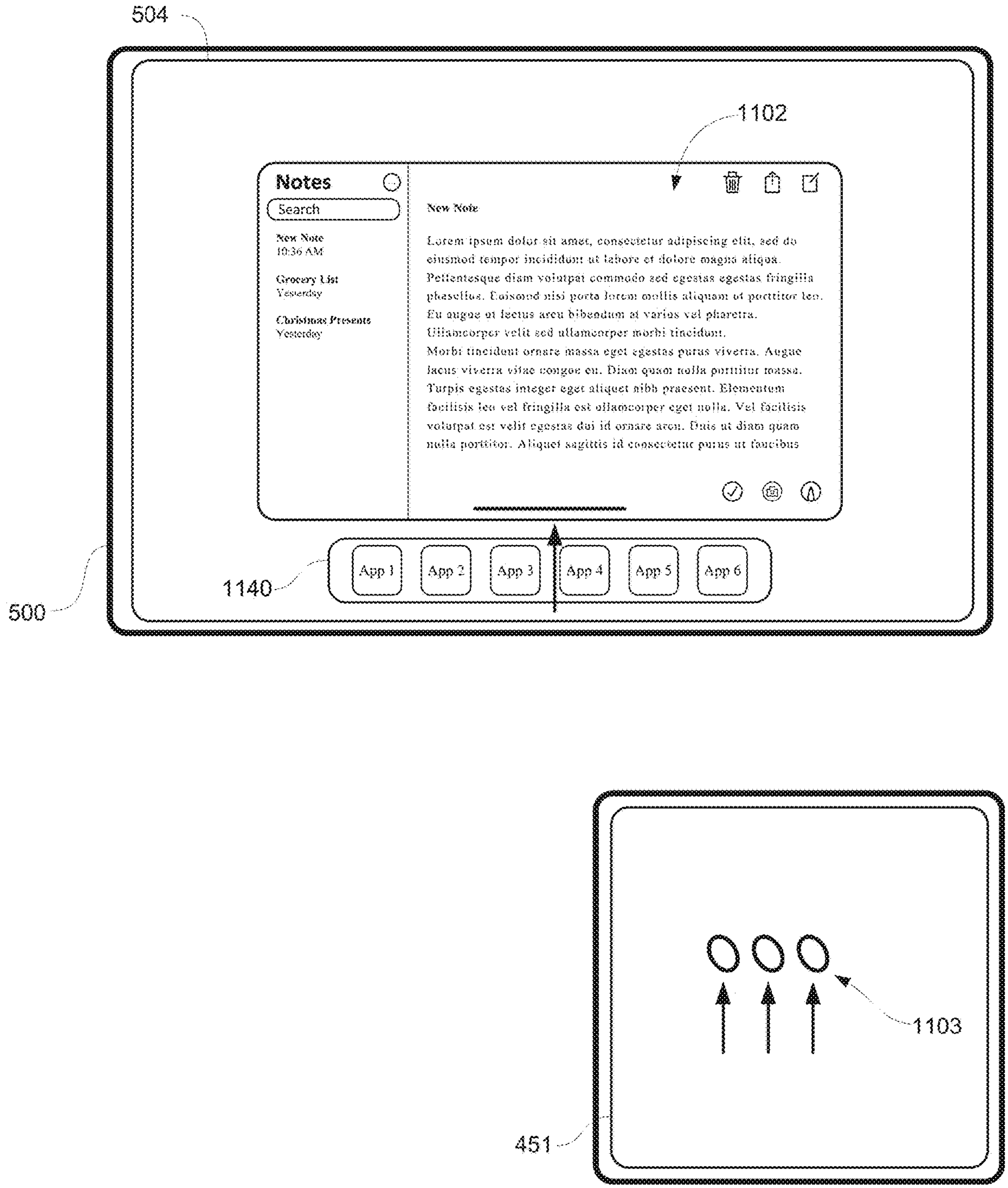

In FIG. 11W, a user input 1103 corresponding to a multi-finger upward swipe gesture (e.g., three concurrent contacts 1103 on touch-sensitive surface 451 and/or three concurrent swipes on touch-sensitive surface 451) is detected on touch sensitive surface 451. In response to the multi-finger upward swipe gesture, dock 1140 is displayed and user interface 1102 reduces in size and begins to move upwards in response to the user input (optionally similarly to described above with respect to FIG. 11O) as shown in FIG. 11W. In some embodiments, in response to continuing the upward swipe, device 500 displays a home screen user interface (such as described in FIG. 11M), or in response to continuing the input diagonally, device 500 displays an application switching user interface (such as described in FIGS. 11P-11Q). Thus, in some embodiments, a multi-finger upward swipe (e.g., three finger upward swipe) on touch sensitive surface 451 performs the same functions as a corresponding upward swipe of the home affordance received via touch screen 504, or a corresponding upward swipe while maintaining a selection input while the home affordance is selected for input received via touch-sensitive surface 451. In some embodiments, the criteria for displaying the home screen user interface or the application switching user interface via a multi-finger upward swipe gesture is similar to the criteria for upward swipes of the home affordance received via touch screen 504, or a upward swipes while maintaining a selection input while the home affordance is selected for input (e.g., a combination of factors include input speed, direction, distance, etc.).

Figure 11X:
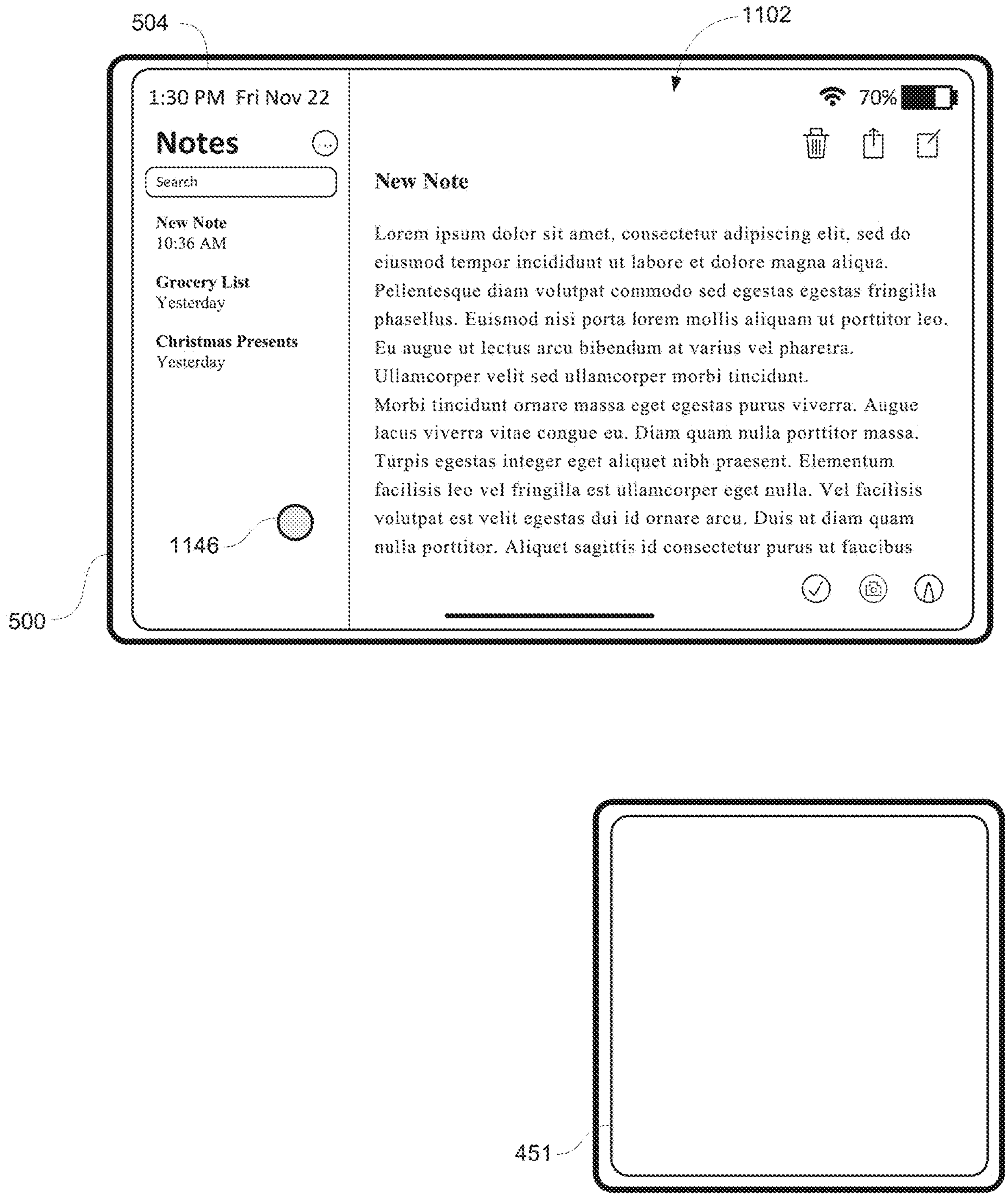

In FIG. 11X, device 500 displays user interface 1102 corresponding to the note taking application. In FIG. 11X, cursor 1146 is displayed at a location in the user interface other than at the home affordance (e.g., optionally in response to a contact on touch sensitive surface 451 or before cursor 1146 has ceased to be displayed). Thus, the home affordance is not selected for input and selection inputs received on touch sensitive surface 451 are not directed to the home affordance.

Figure 11Y:
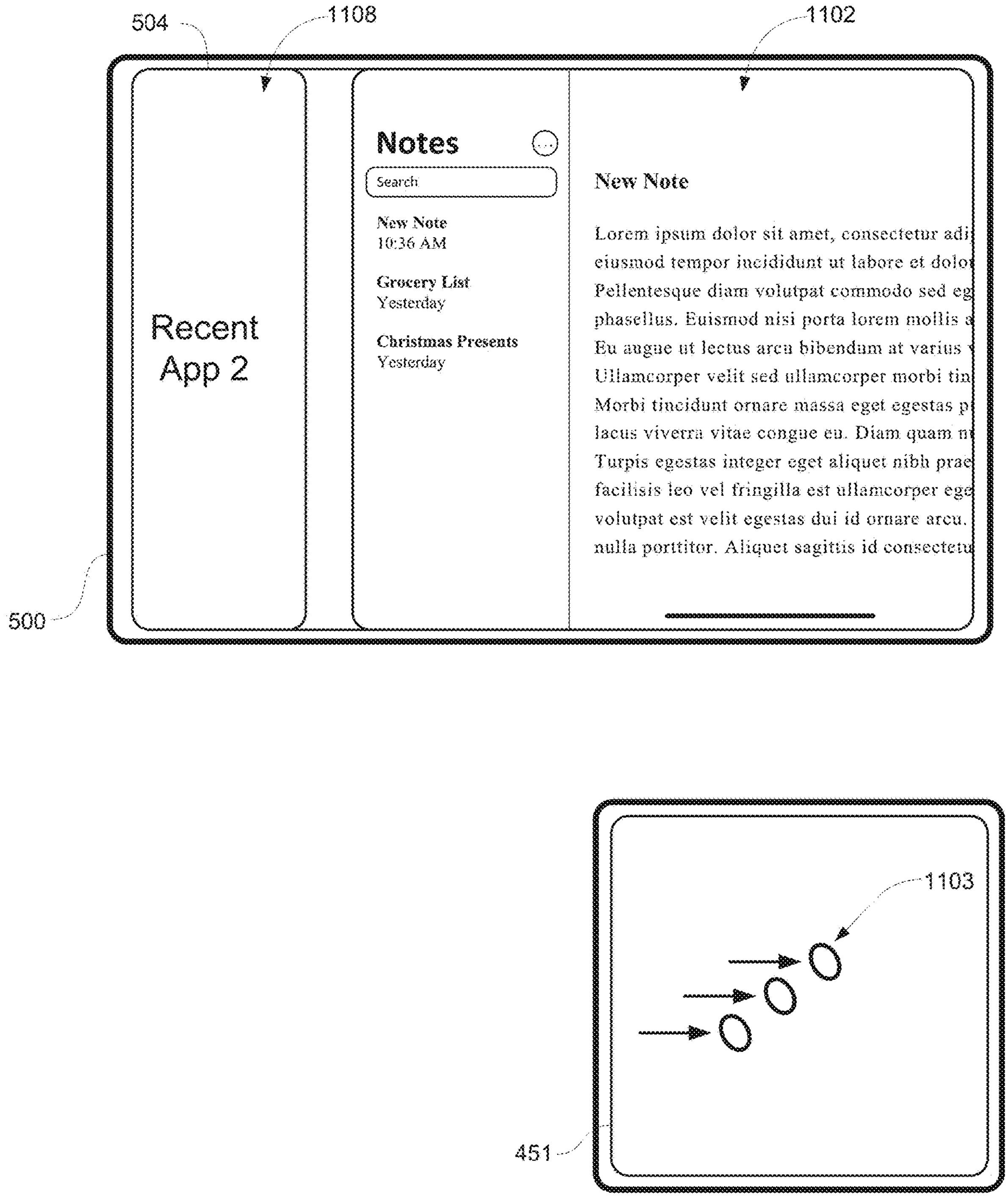
Figure 11Z:
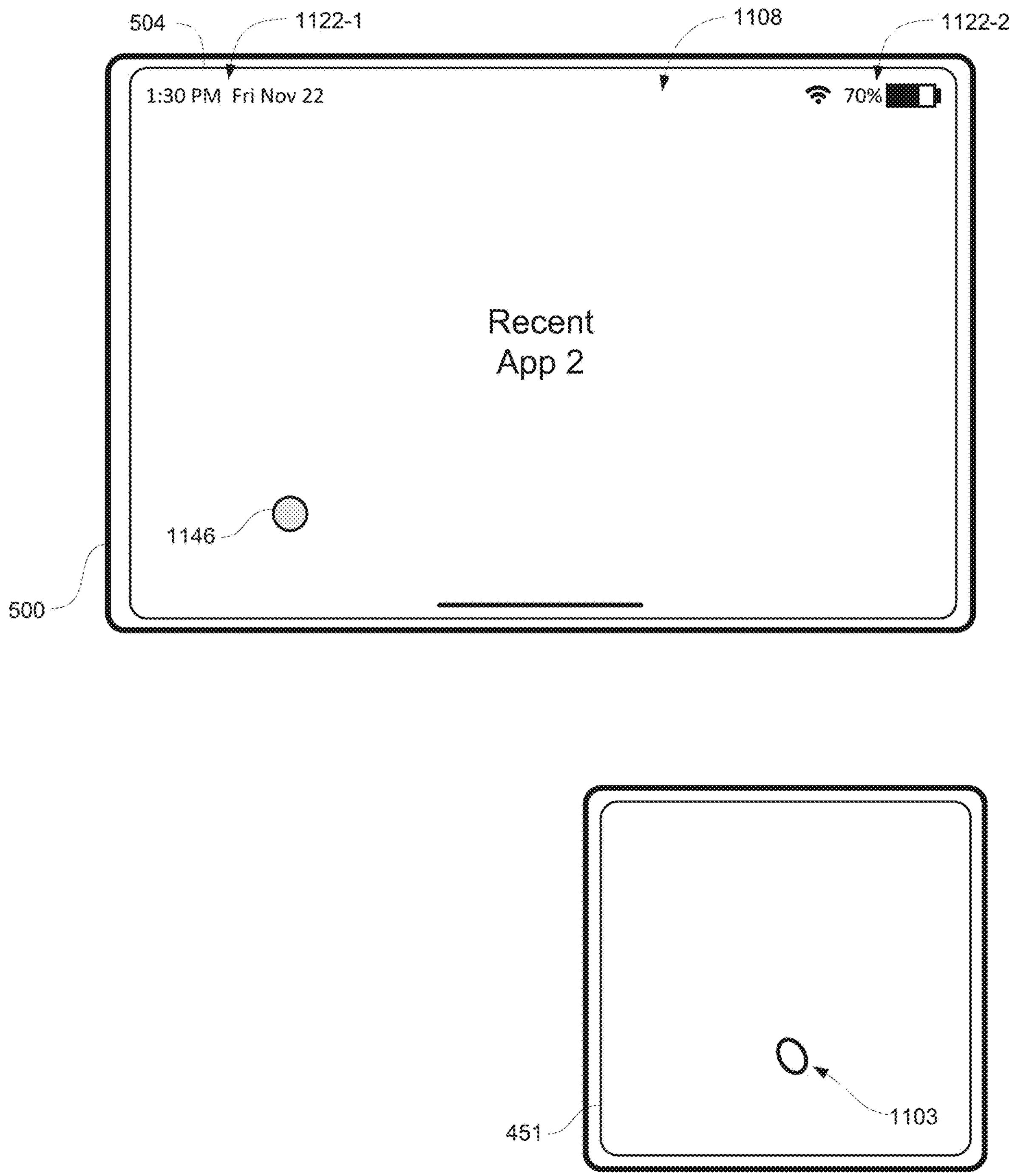
Figure 11A:
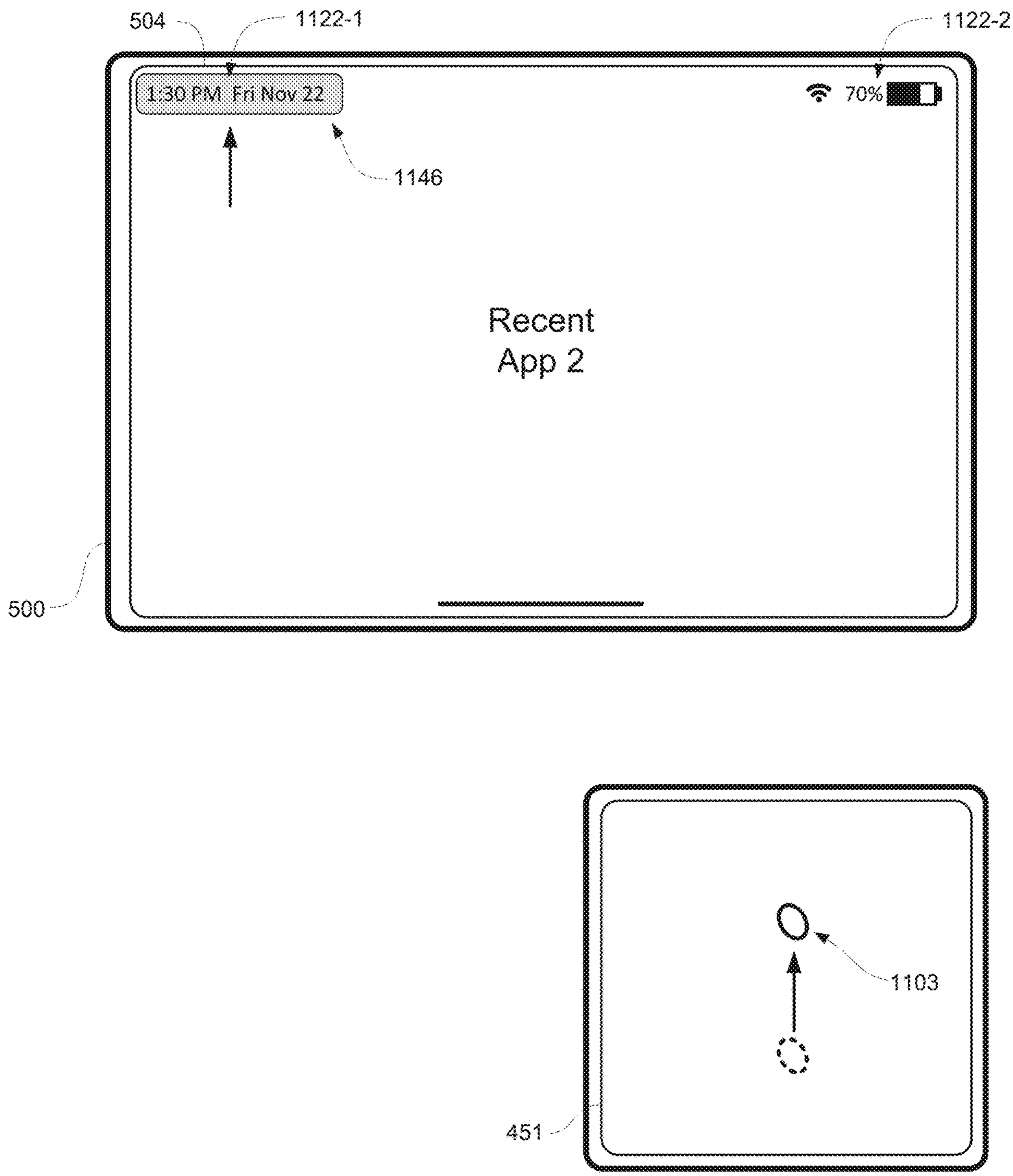
Figure 11B:
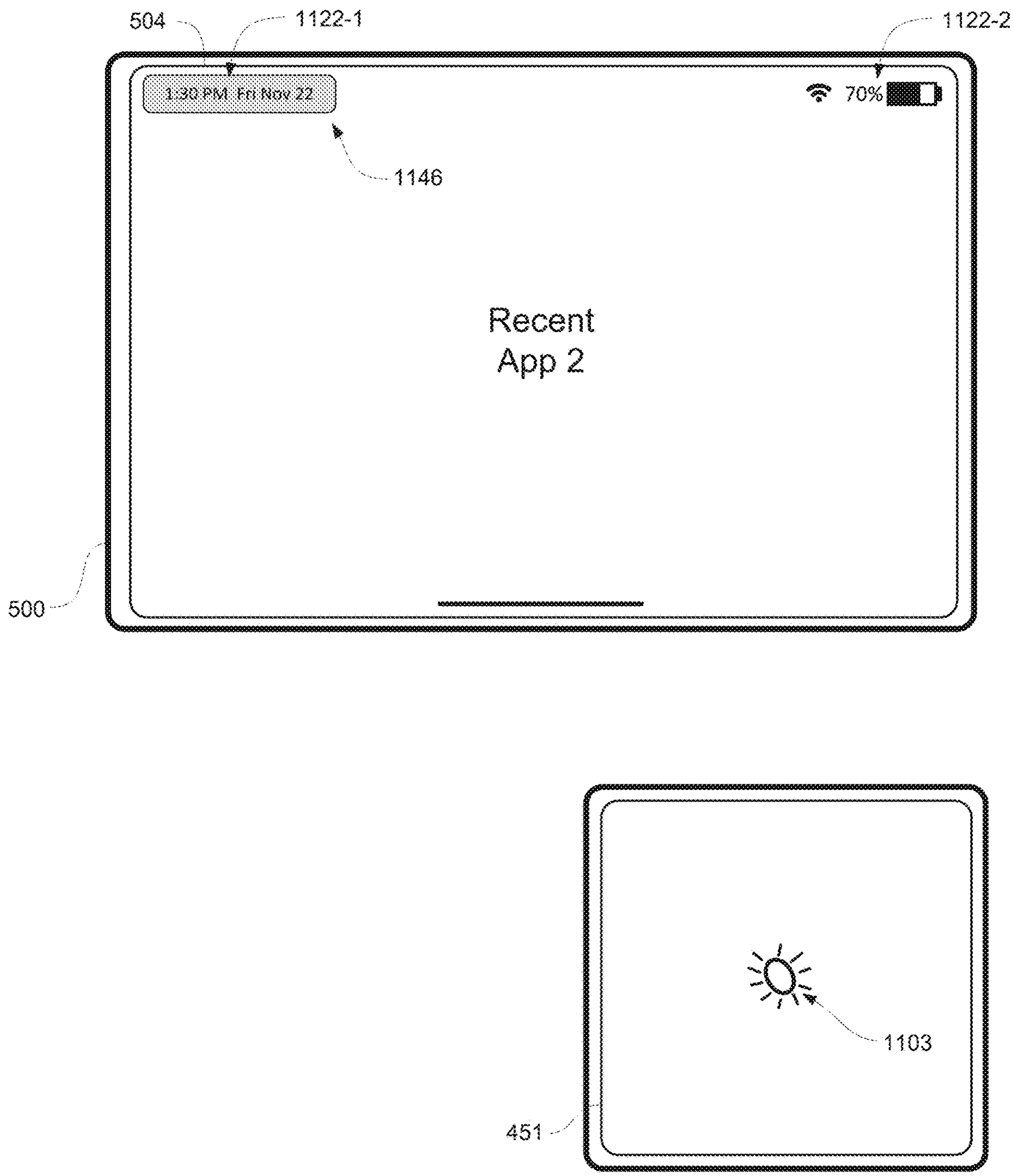
Figure 11C:
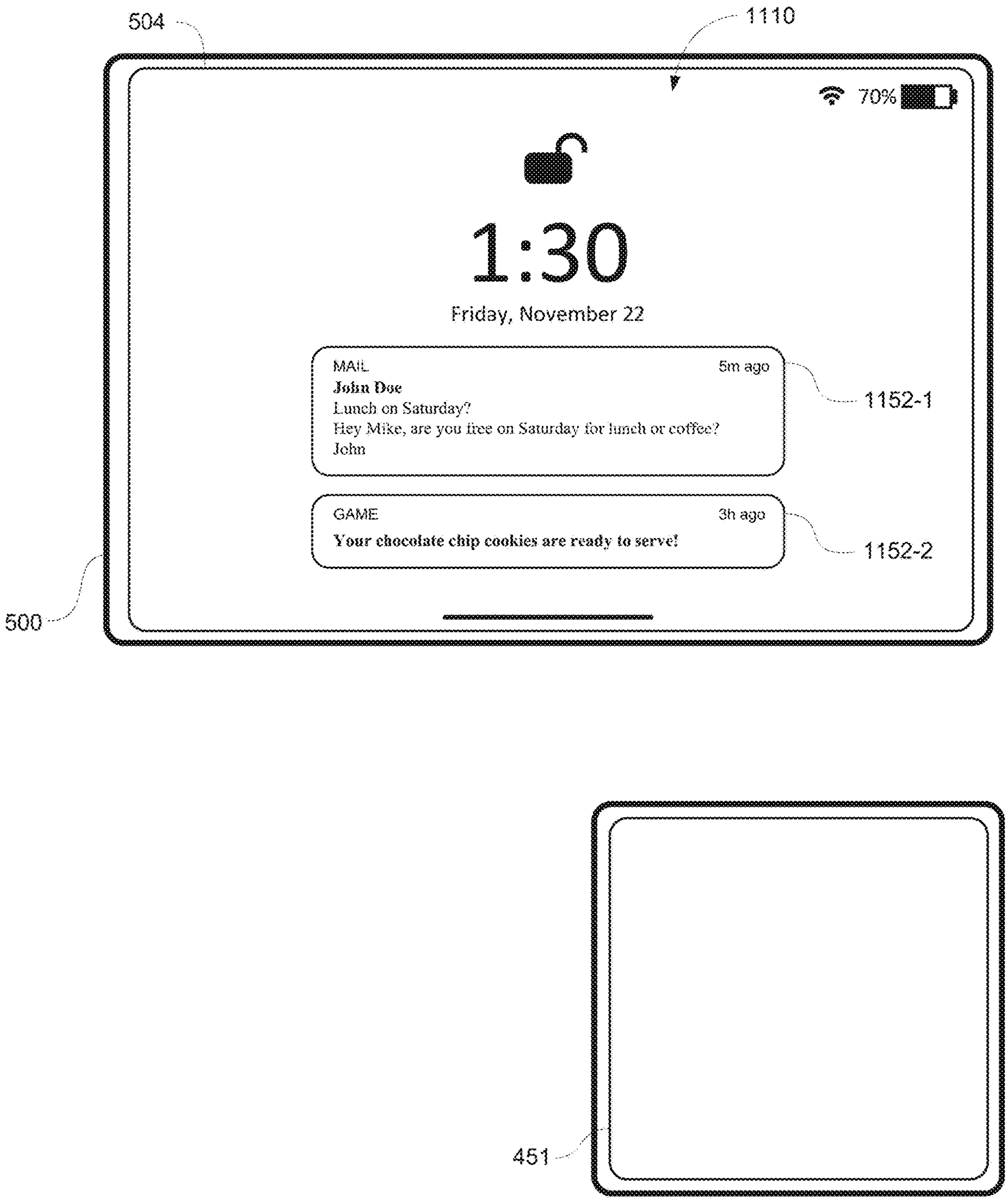
Figure 11D:
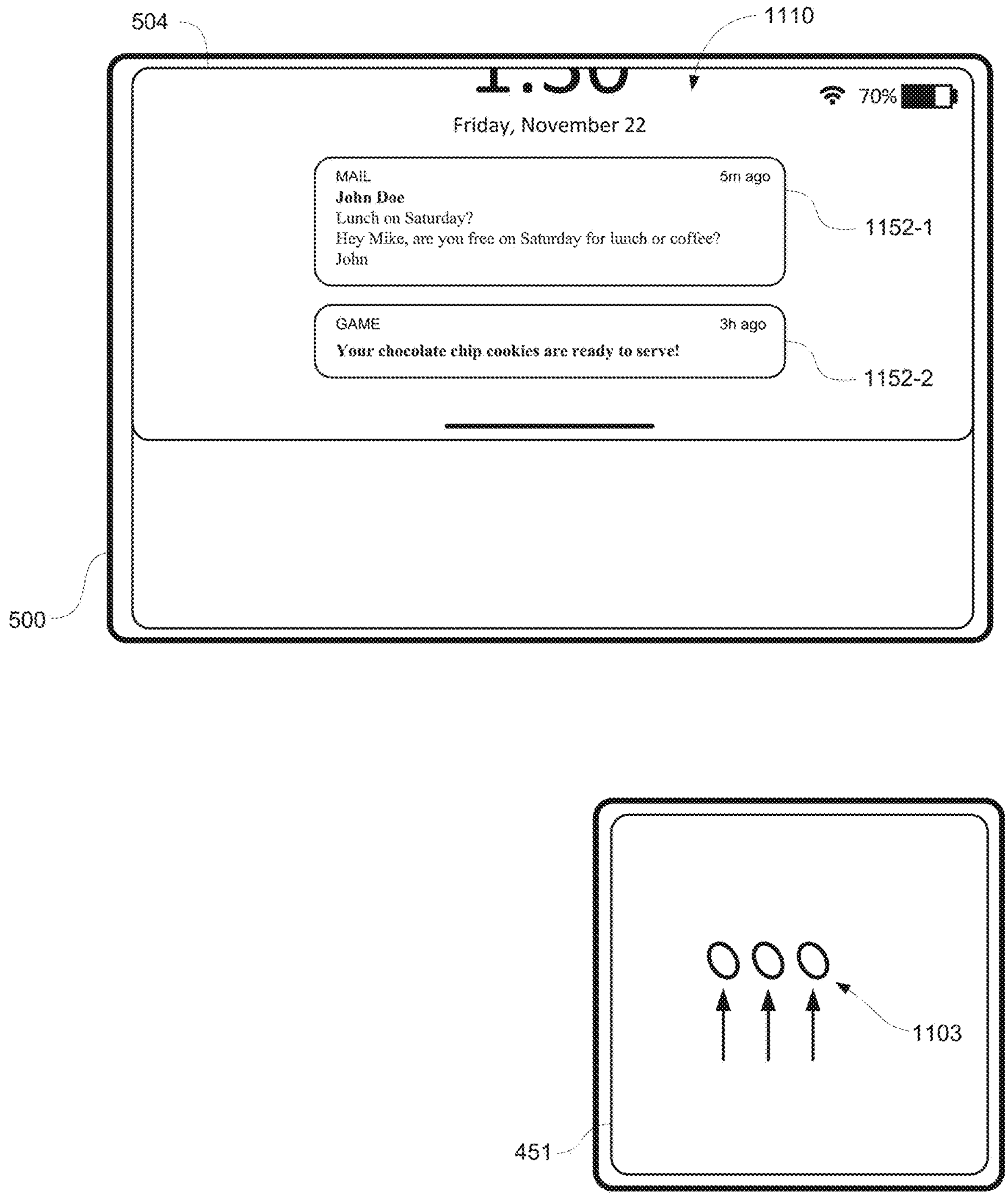
Figure 11E:
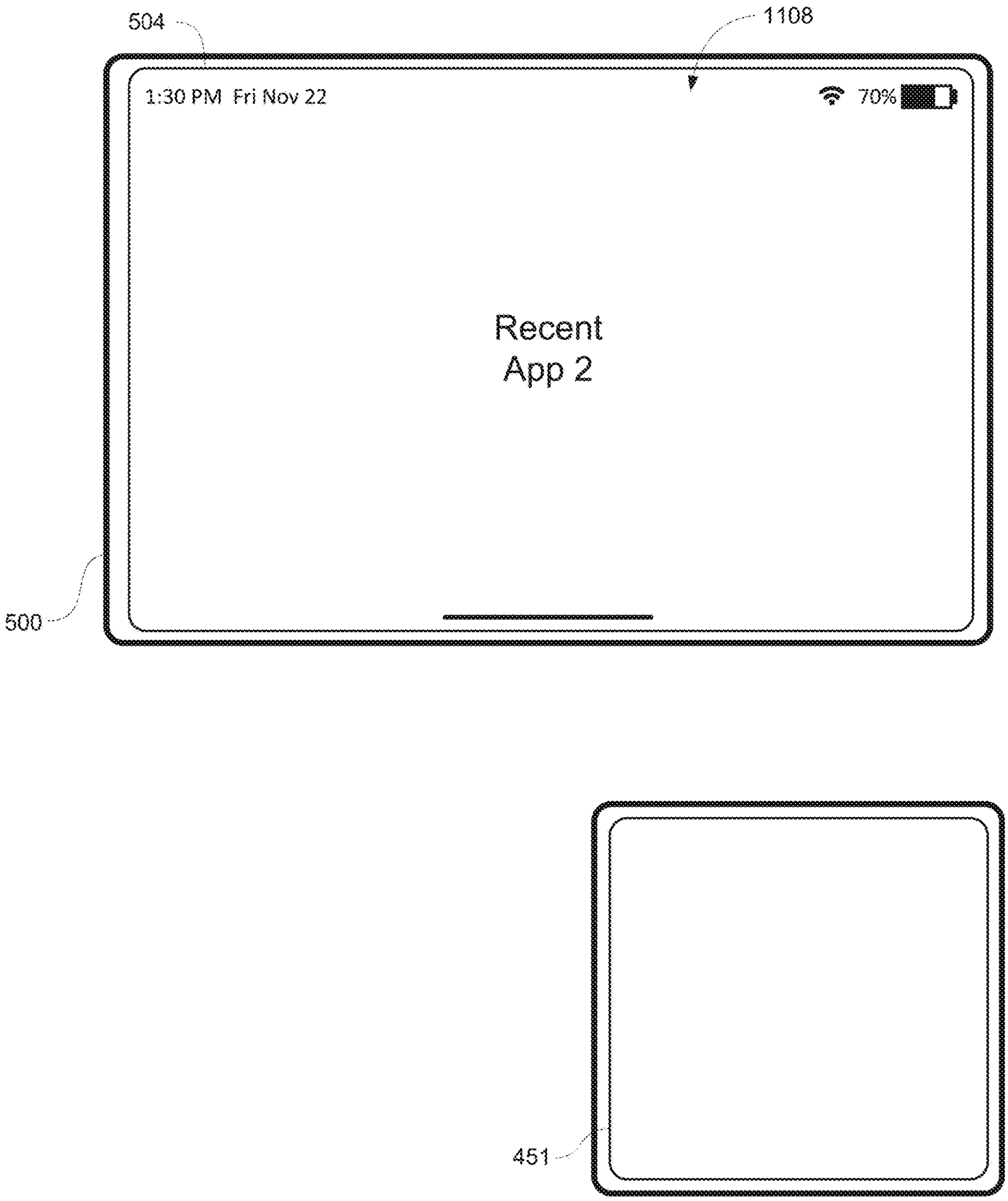
Figure 11F:
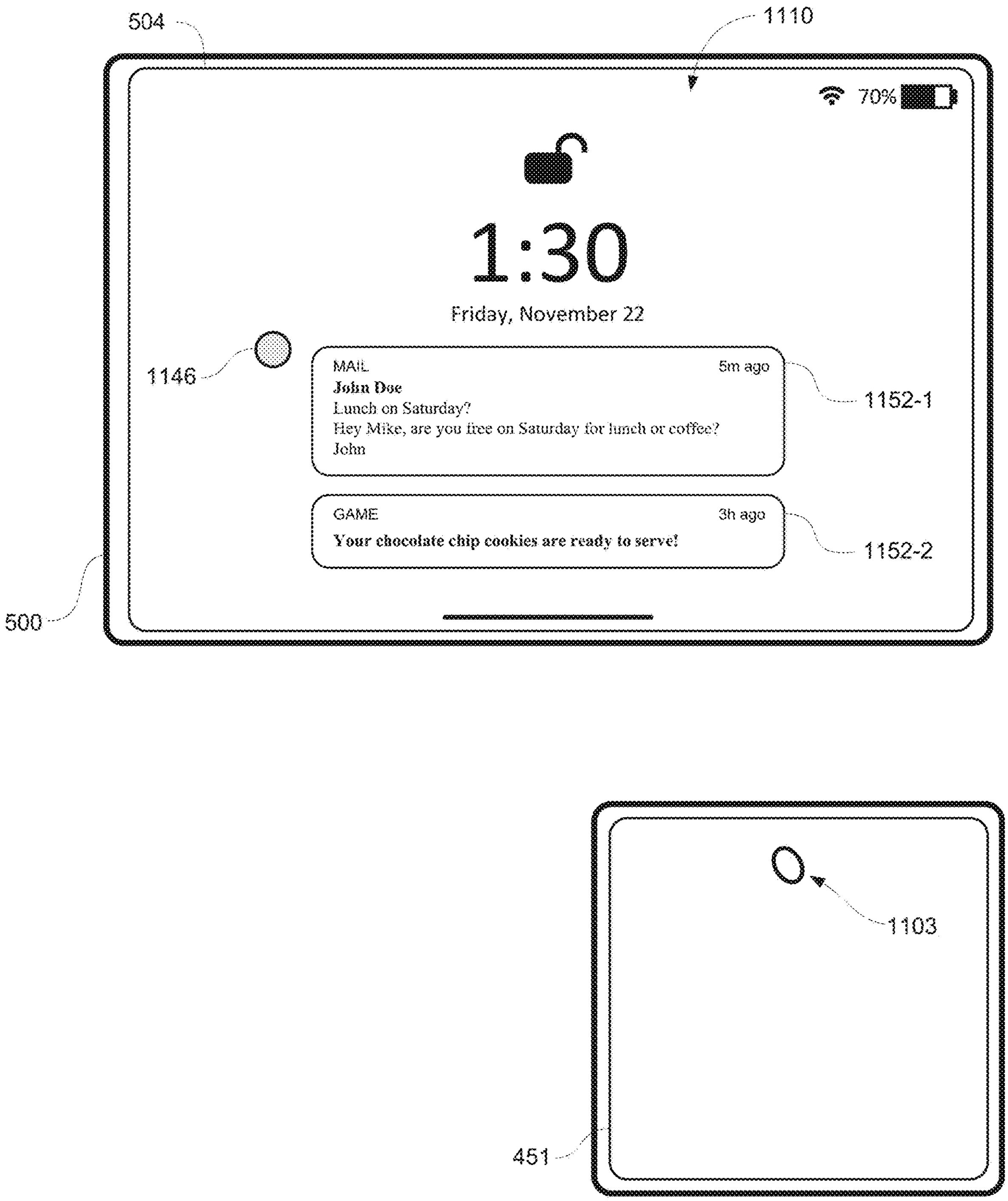
Figure 11G:
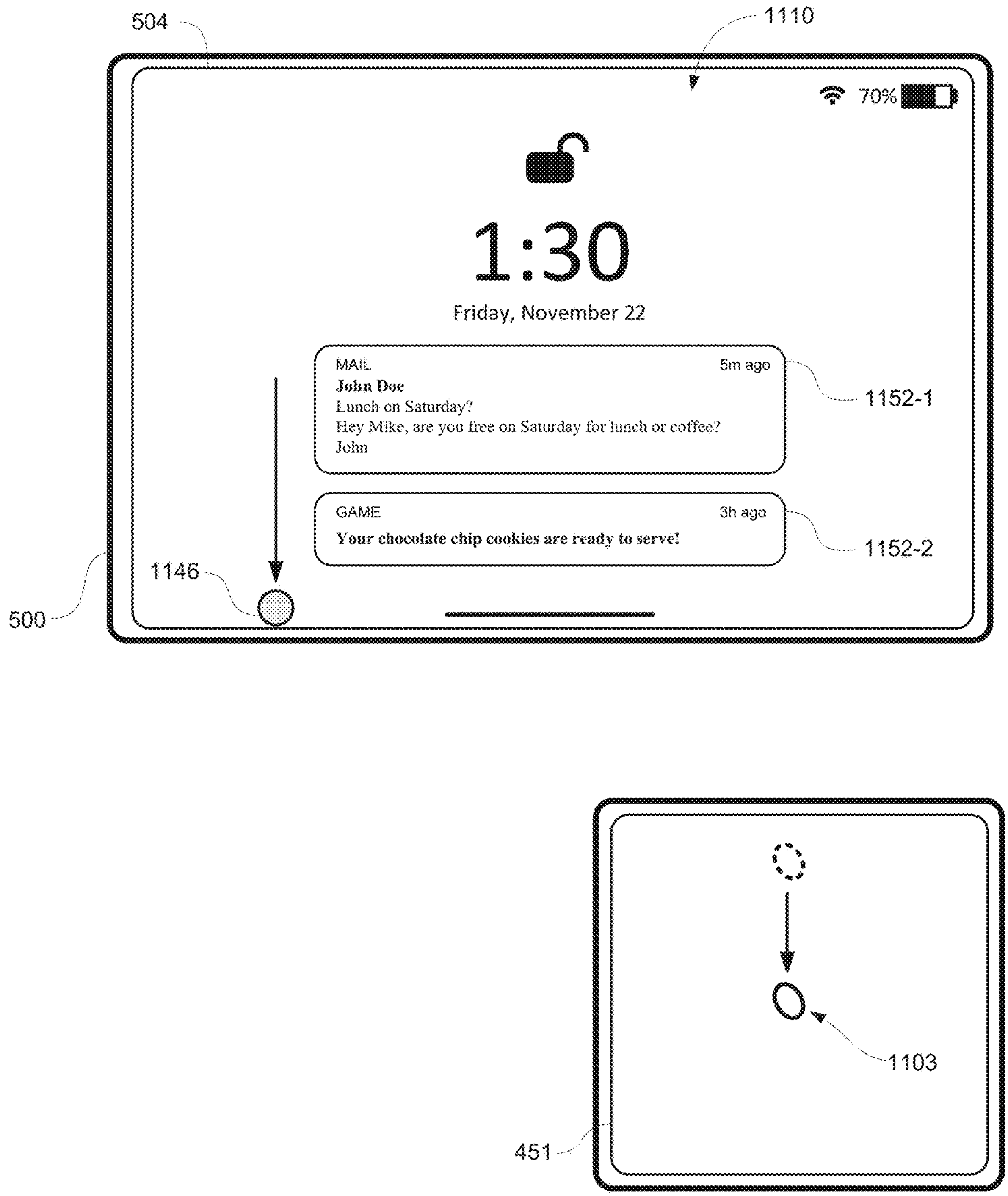
Figure 11H:
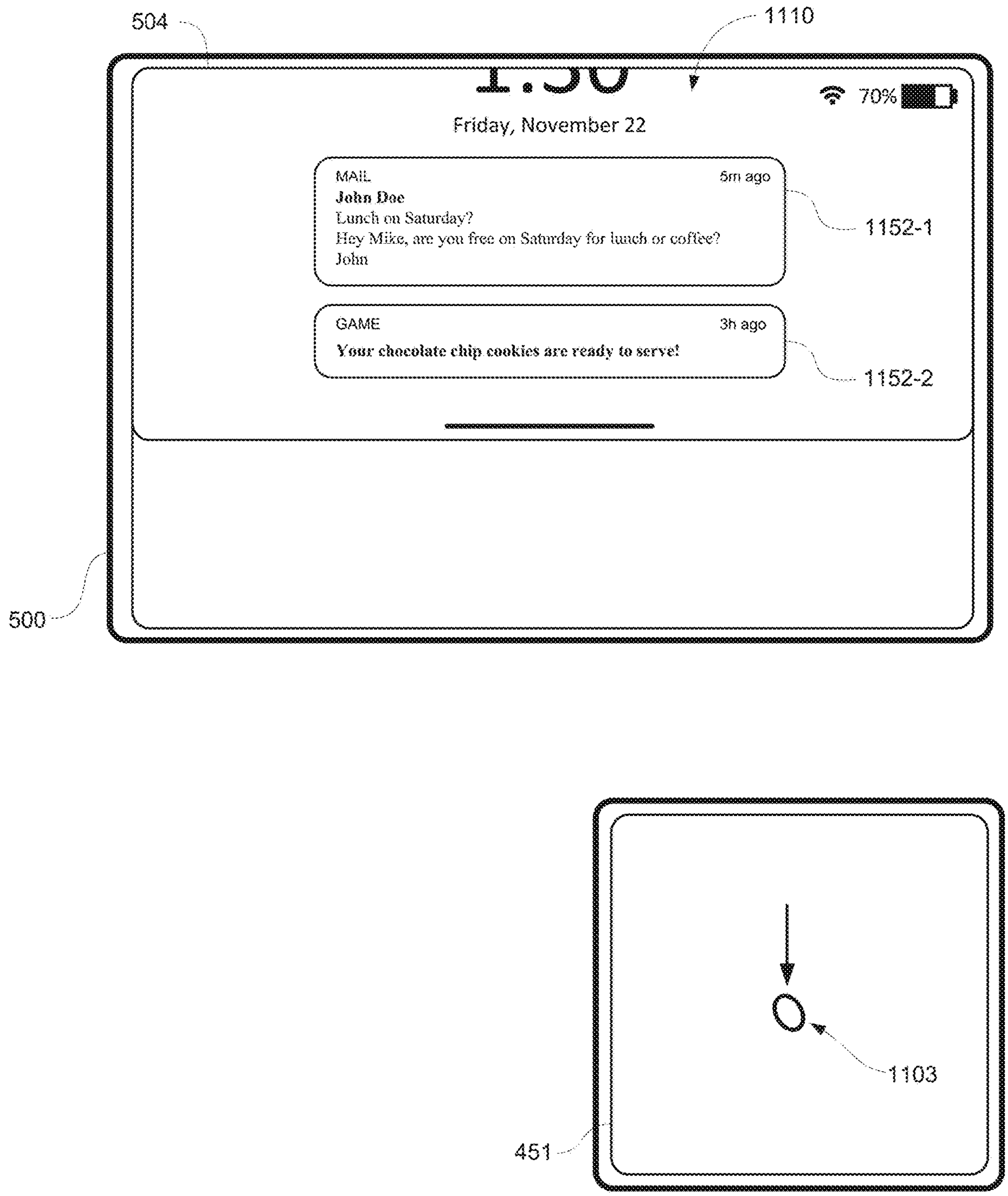
Figure 11I:
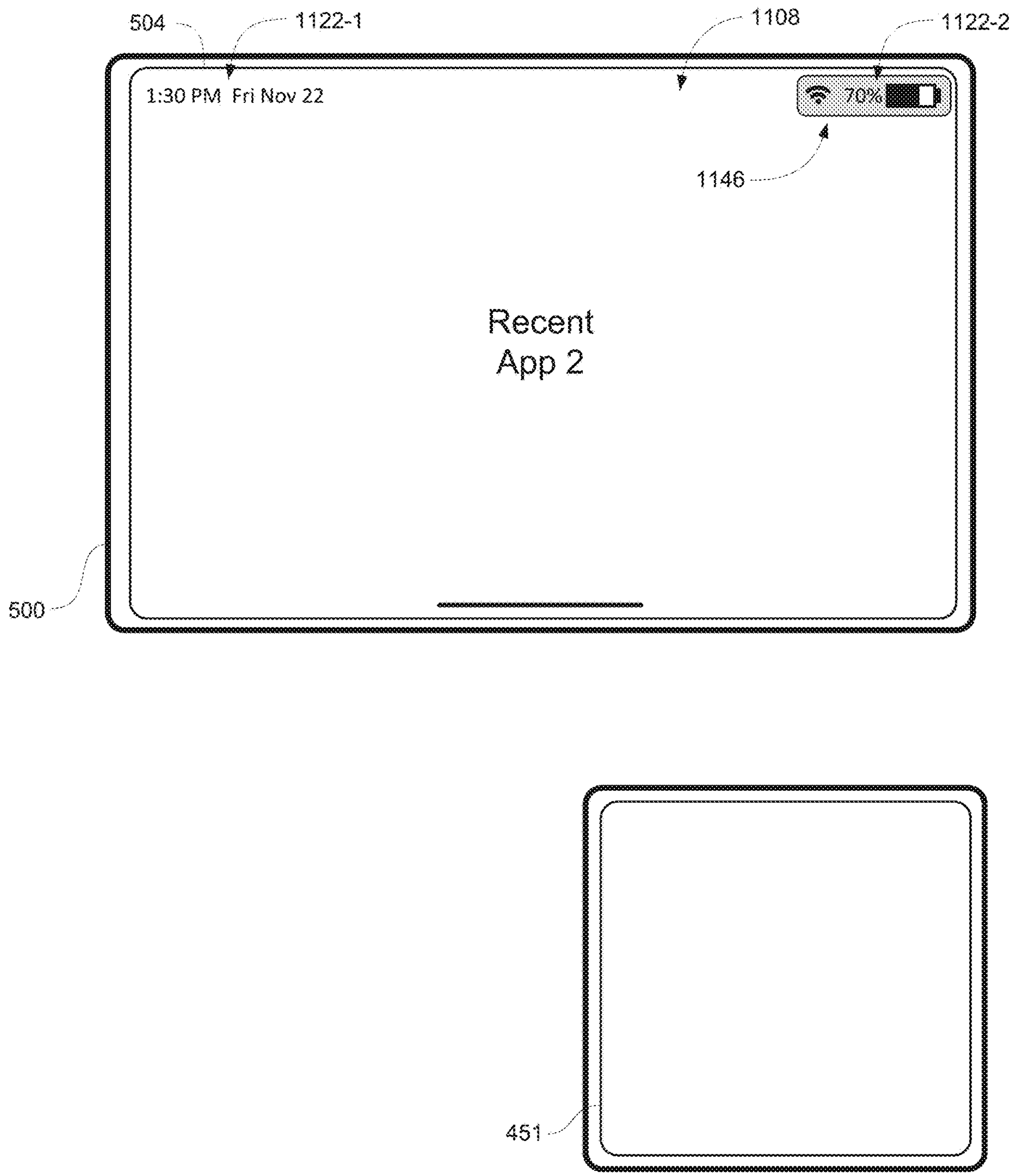
Figure 11J:
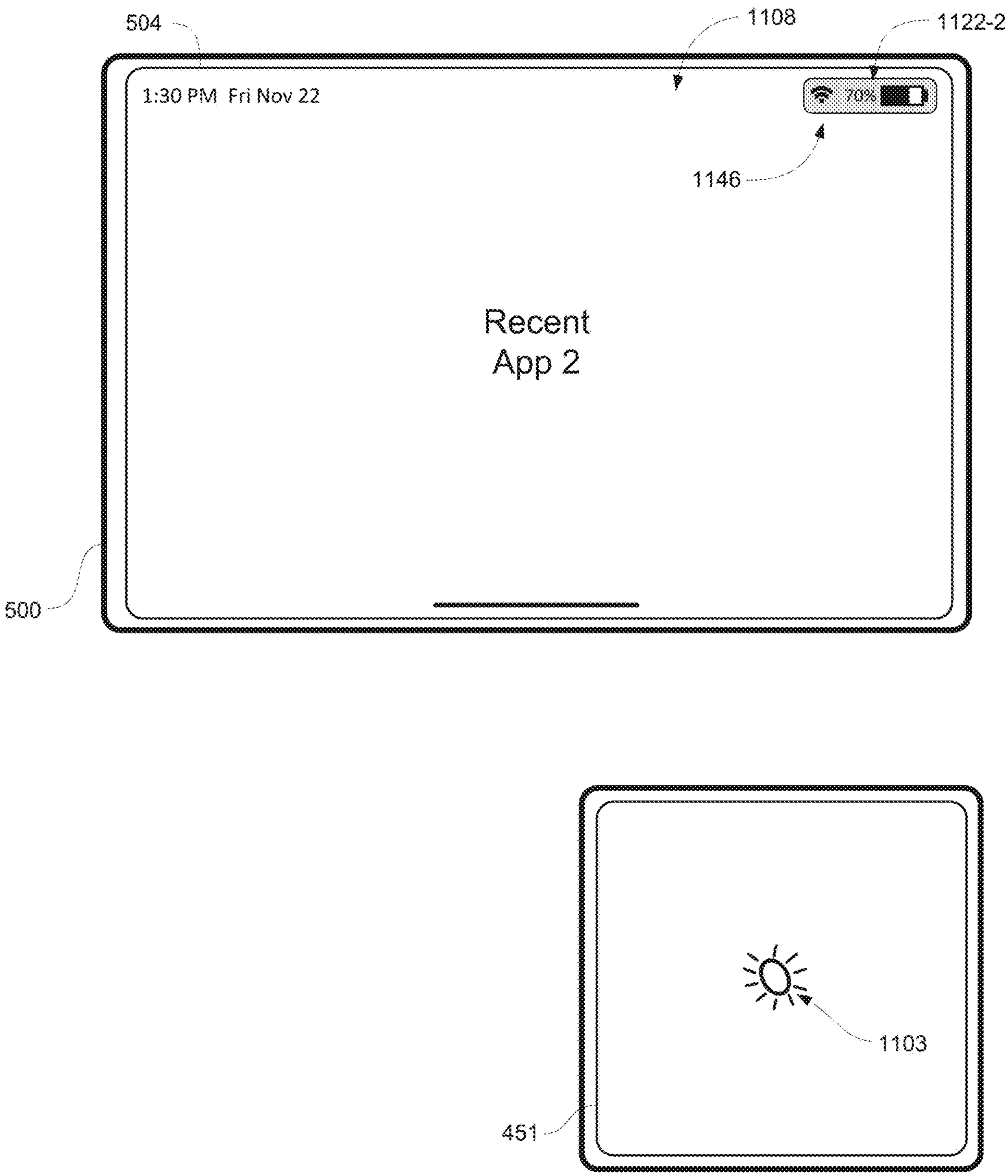
Figure 11K:
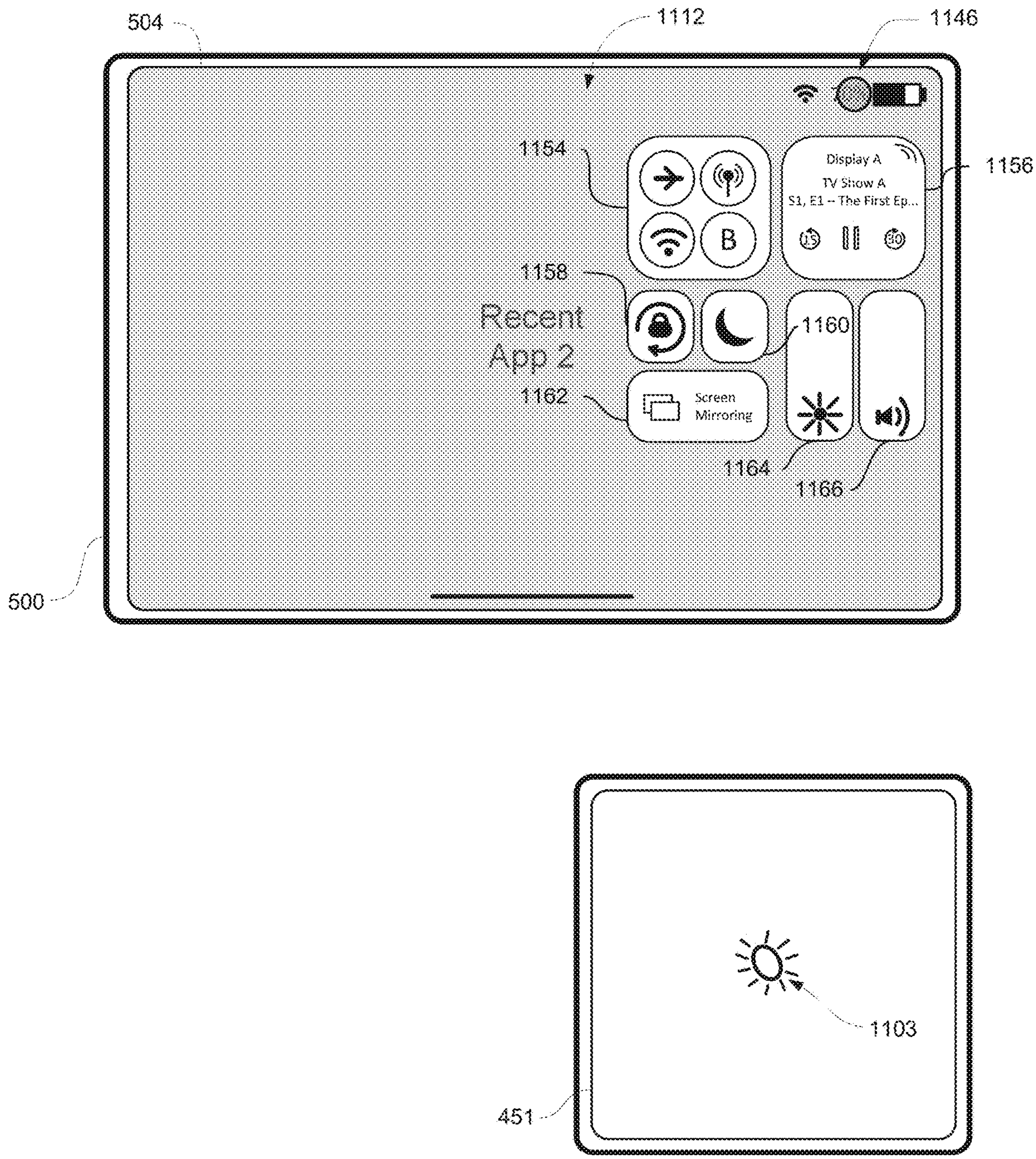
Figure 11L:
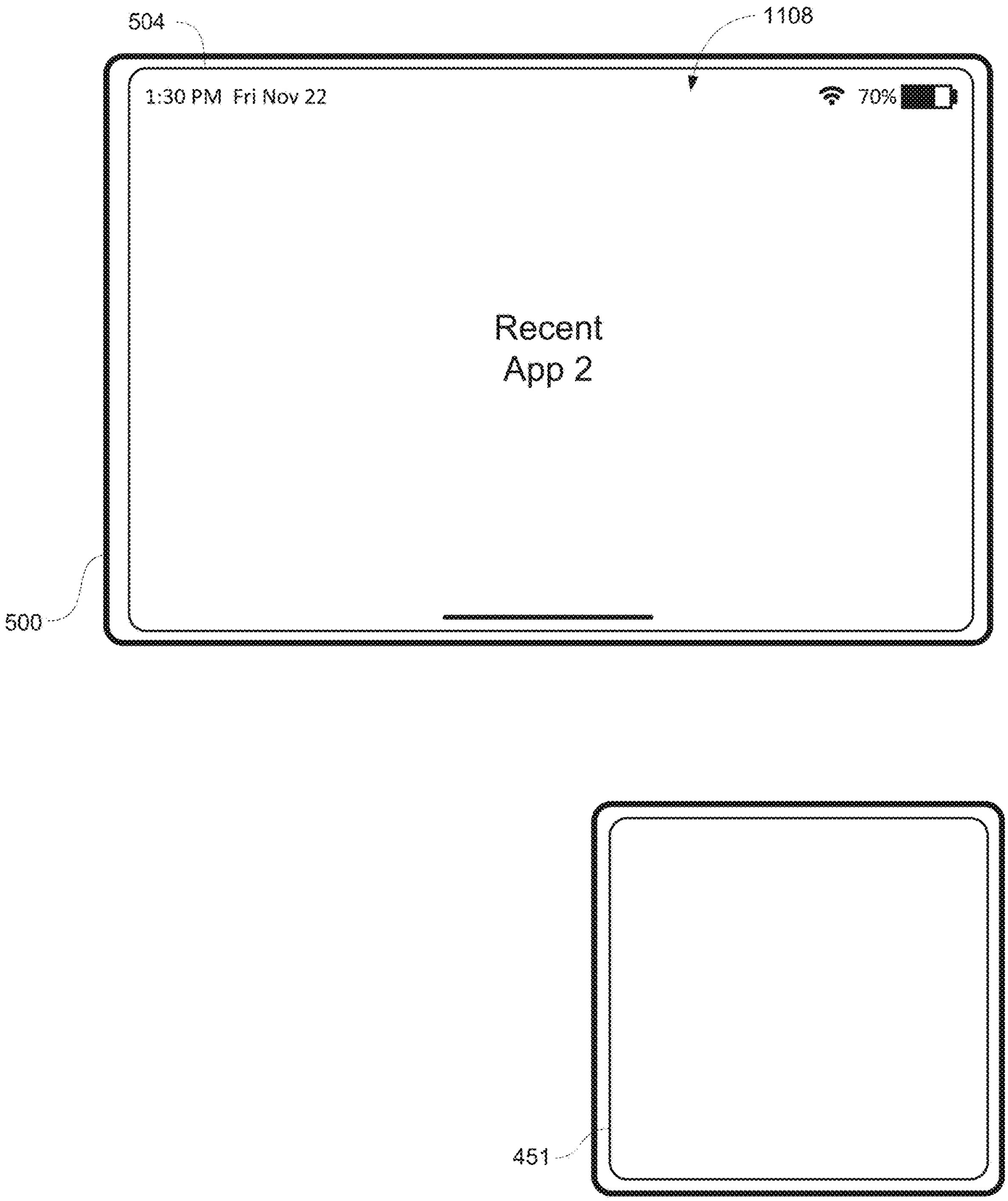
Figure 12A:
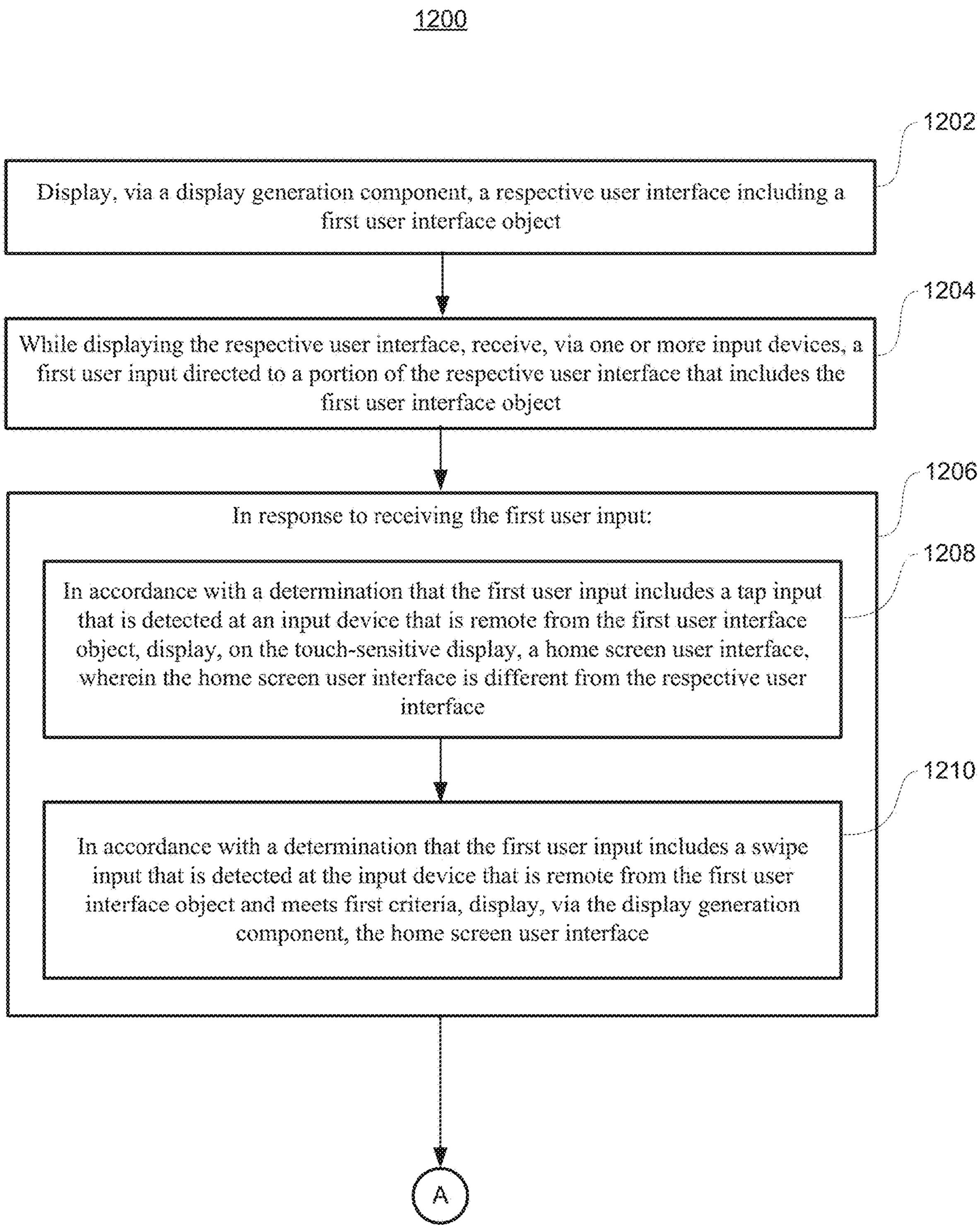
Figure 12B:
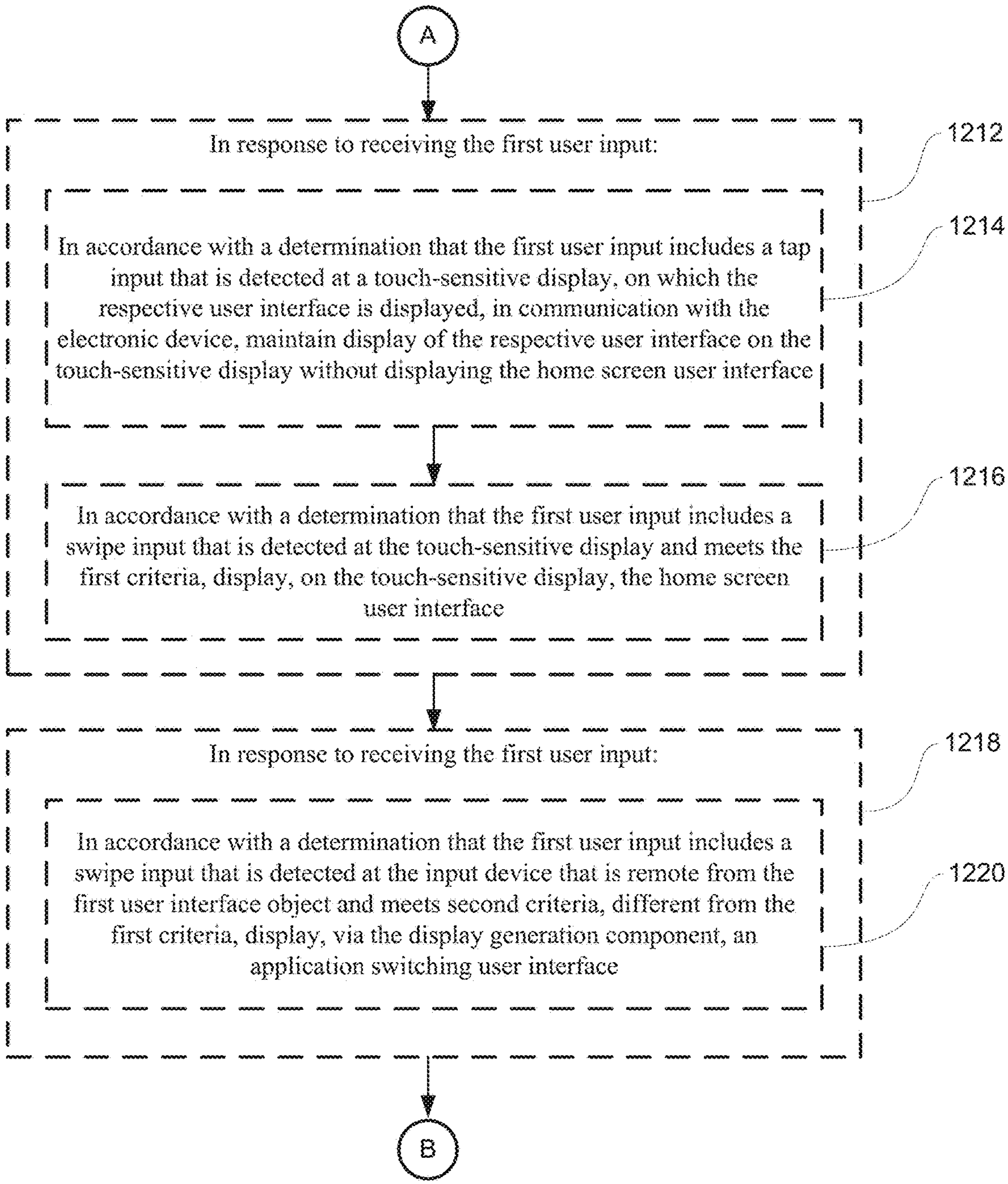
Figure 12C:
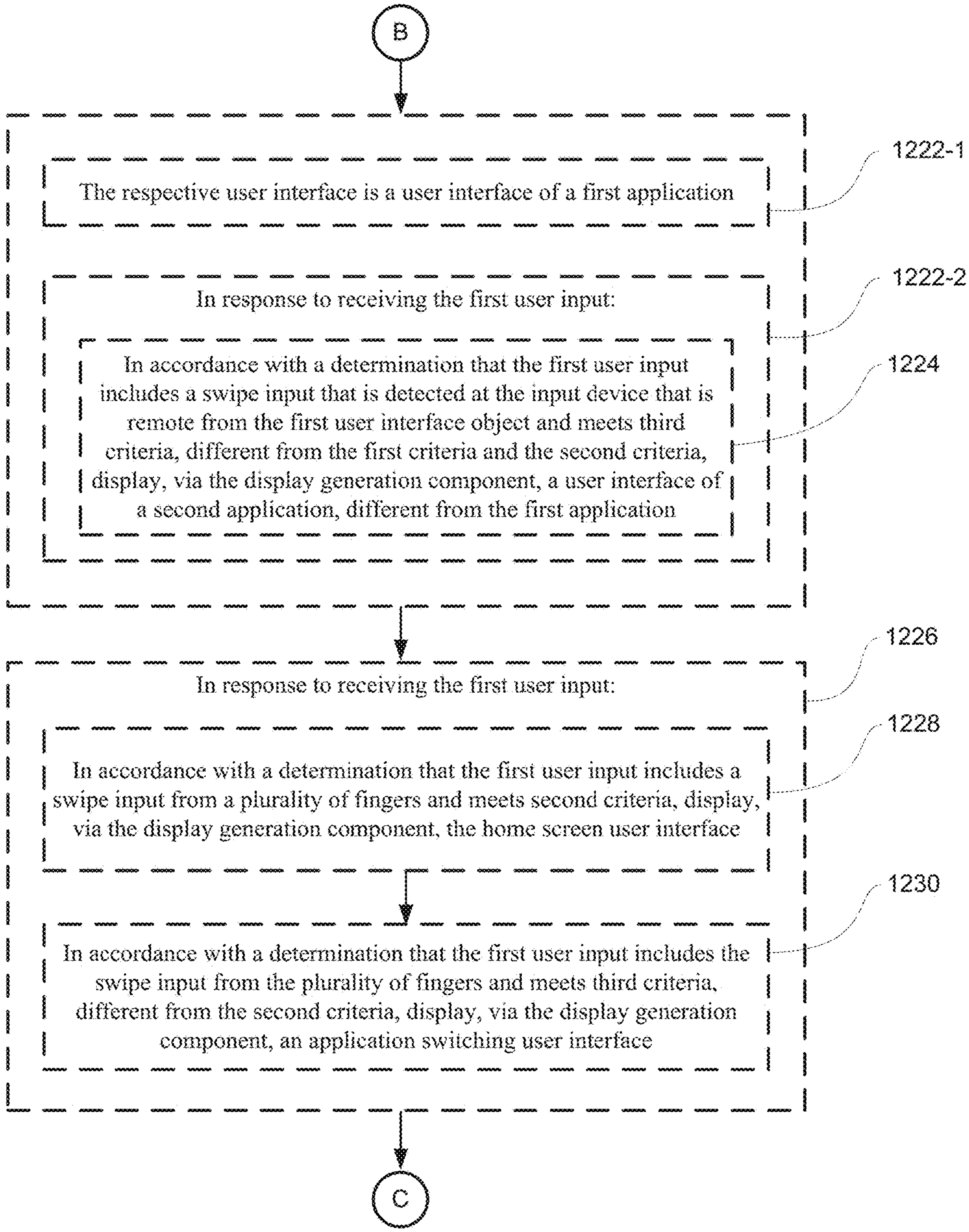
Figure 12D:
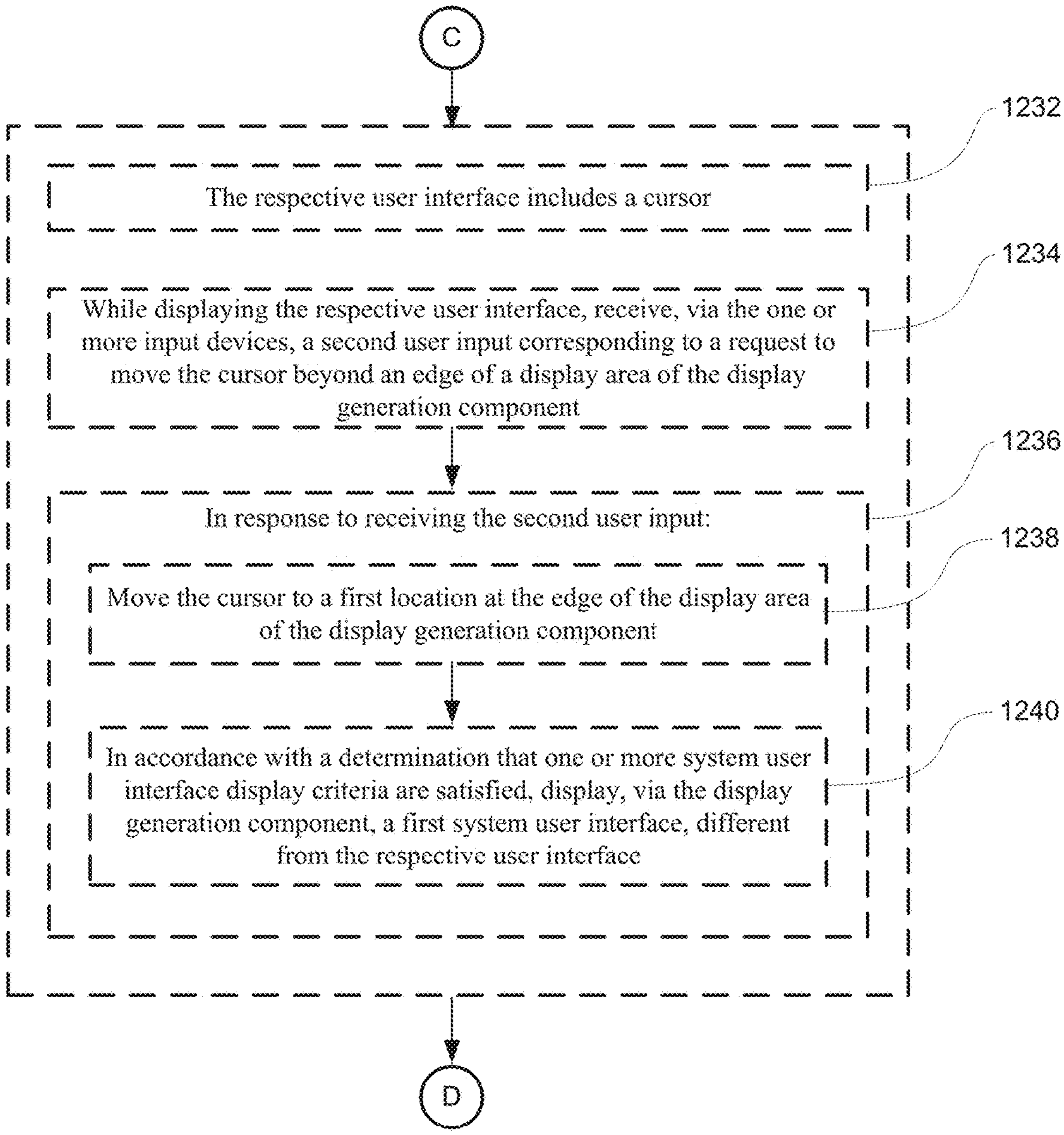
Figure 12E:
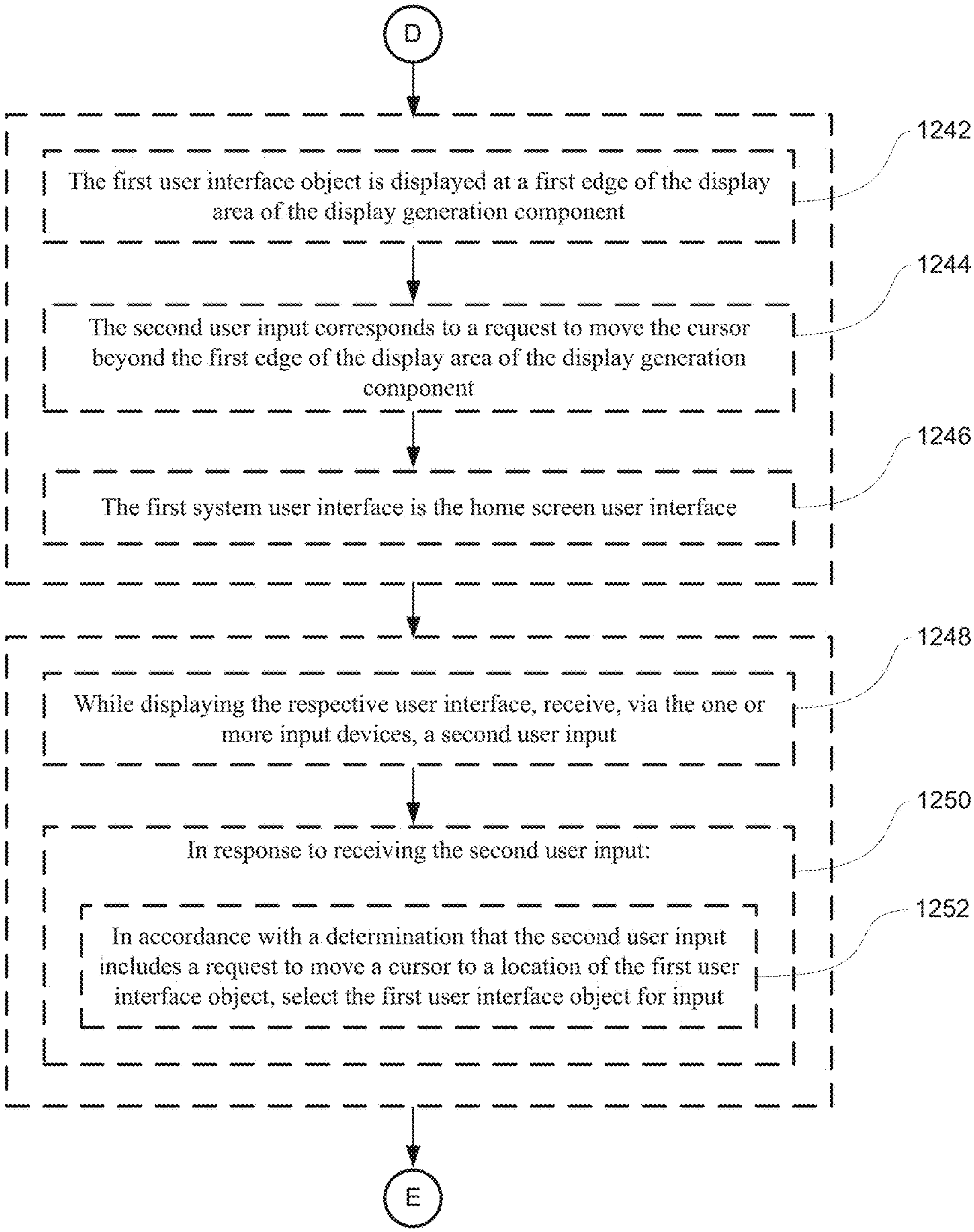

In FIG. 11Y, a user input 1103 corresponding to a multi-finger rightward swipe gesture (e.g., three concurrent contacts 1103 and/or three concurrent swipes on touch-sensitive surface 451) is detected on touch sensitive surface 451. In response to the multi-finger upward swipe gesture, user interface 1102 is shifted rightwards in accordance with the user input and user interface 1108 is displayed moving inwards from the left edge of the display area of touch screen 504 in accordance with the user input, as shown in FIG. 11Y. In FIG. 11Z, a termination of the rightward swipe is detected (e.g., liftoff of at least one of contacts 1103, or liftoff of all of contacts 1103). In some embodiments, user interface 1108 corresponding to Recent App 2 is displayed and user interface 1102 is dismissed. Optionally, if the rightward swipe has movement below a threshold amount (e.g., less than a threshold amount of user interface 1108 is displayed) when the user input is terminated, then user interface 1108 is not displayed, and user interface 1102 is re-displayed on touch screen 504. In some embodiments, user interface 1108 is only displayed if the rightward swipe has movement above the threshold amount (e.g., 1 cm, 2 cm, 5 cm, 10 cm, etc., 10%, 25%, 33%, 50%, 66%, 75% of user interface 1108 is displayed).

Similarly, as described above with respect to FIG. 11T, in some embodiments, a rightward swipe causes display of the previous application in the queue of running applications and a leftward swipe causes display of the next application in the application queue.

Thus, in some embodiments, a multi-finger lateral swipe (e.g., three finger rightward or leftward swipe) on touch sensitive surface 451 performs the same functions as a corresponding rightward or leftward swipe of the home affordance received via touch screen 504, or a corresponding rightward or leftward swipe while maintaining a selection input while the home affordance is selected for input received via touch-sensitive surface 451.

In FIG. 11Z, a contact 1103 is detected on a touch-sensitive surface 451, causing display of cursor 1146 in user interface 1108. In FIG. 11AA, a user input 1103 is received moving cursor 1146 upwards in the user interface to the location of status indicator 1122-1 and causing status indicator 1122-1 to be selected for input, as is described above with respect to method 700. In some embodiments, the size and shape of cursor 1146 changes to conform to status indicator 1122-1 (e.g., a rectangular box around status indicator 1122-1), as is described above with respect to method 800. In some embodiments, status indicator 1122-1 is only interactable via a cursor and is not responsive to inputs received via touch screen 504.

In FIG. 11BB, a user input 1103 corresponding to a selection is received on touch sensitive surface 451 while status indicator 1122-1 is selected for input. In some embodiments, in response to detecting the selection input and while the selection input is being received (e.g., while and for the duration of when the click is held and/or when the intensity of contact 1103 is greater than an intensity threshold), cursor 1146 and/or status indicator 1122-1 becomes smaller and/or darker, as shown in FIG. 11BB. In some embodiments, in response to the selection input, device 500 displays a notification user interface 1110 (e.g., a wake screen user interface, a lock screen user interface, etc.), as shown in FIG. 11CC. In some embodiments, an upwards swipe received via the touch-sensitive surface 451 corresponding to a request to move the cursor beyond the top edge of the touch screen 504 (e.g., optionally the top-left edge of touch screen 504, optionally the region associated with status indicator 1122-1) causes display of the notification user interface as will be described in further detail below with respect to method 1400. In some embodiments, a downward swipe from the top edge of the touch screen 504 (e.g., optionally the top-left edge of touch screen 504, optionally the region associated with status indicator 1122-1) received from the touch-sensitive display 504 causes display of the notification user interface.

In some embodiments, notification user interface 1110 is a user interface that displays one or more notifications (or optionally no notifications, as the case may be) associated with one or more notification events (e.g., app notifications, system notifications, etc.) detected at device 500. In some embodiments, notifications on the notification user interface 1110 are selectable to cause display of the respective application (optionally only if the device is unlocked and optionally if the device is locked, the notification is selectable to initiate a process to unlock the device such as authenticating the user via a passcode or biometric verification such as facial recognition or fingerprint recognition). In some embodiments, notification user interface 1110 is the same or similar user interface that is displayed when device 500 wakes from an inactive state or a low power state (e.g., a wake screen user interface) or when the user locks the device (e.g., a lock screen user interface). As shown in FIG. 11CC, notification user interface 1110 includes notification 1152-1 associated with the mail application notifying the user of a received email, and notification 1152-2 associated with a game application notifying the user about an event in the game application. In some embodiments, more or fewer notifications are displayed on notification user interface 1110 and notification user interface 1110 is scrollable to display additional notifications.

In FIG. 11DD, a user input 1103 corresponding to a multi-finger upward swipe gesture (e.g., three concurrent contacts 1103 and/or three concurrent swipes on touch-sensitive surface 451) is detected on touch sensitive surface 451. In some embodiments, in response to the user input, notification user interface 1110 moves upwards in accordance with the user input and begins to be dismissed. In FIG. 11EE, a termination of the multi-finger upward swipe is detected (e.g., liftoff of at least one contact 1103, or liftoff of all contacts 1103). In some embodiments, user interface 1108 corresponding to Recent App 2 is displayed and user interface 1110 is dismissed. Optionally, if the upward swipe has movement below a threshold amount (e.g., less than 1 cm, 2 cm, 5 cm, 10 cm, etc., 10%, 25%, 33%, 50%, 66%, 75%, etc. of user interface 1110 is scrolled away) when the user input terminated, then user interface 1108 is not displayed, and user interface 1110 is re-displayed on touch screen 504. In some embodiments, user interface 1108 is only displayed if the upward swipe has movement above the threshold amount (e.g., 1 cm, 2 cm, 5 cm, 10 cm, etc., 10%, 25%, 33%, 50%, 66%, 75%, etc. of user interface 1110 is scrolled away). Thus, as described above, a multi-finger swipe gesture (e.g., three-finger swipe) performs similar functions as a corresponding upward swipe from the home affordance via touch screen 504 and/or corresponding swipe while maintaining a selection of the home affordance via touch sensitive display 451 (e.g., three-finger upward swipe on touch-sensitive surface 451 is similar to an upward swipe from the home affordance via touch screen 504, three-finger lateral swipe on touch-sensitive surface 451 is similar to a lateral swipe from the home affordance via touch screen 504, etc.).

FIGS. 11FF-11II illustrate embodiments in which a request to move the cursor beyond the bottom edge of the display area of touch screen 504 causes dismissal of notification user interface 1110. In FIG. 11FF, device 500 displays user interface 1110 corresponding to a notification user interface, similar to the notification user interface described above with respect to FIG. 11CC. In FIG. 11FF, a contact 1103 is detected on touch sensitive surface 451, causing cursor 1146 to be displayed in the user interface. In FIG. 11GG, a downward swipe of contact 1103 is received on touch sensitive surface 451, moving cursor 1146 to the bottom edge of the display area of touch screen 504. As shown in FIG. 11GG, cursor 1146 is not at the location of the home affordance and the home affordance is not selected for input (although it is understood that the features described herein with respect to FIGS. 11FF-11II are also available if cursor 1146 were at the location of the home affordance and the home affordance were selected for input).

In FIG. 11HH, a further downward swipe of contact 1103 is received on touch sensitive surface 451 while cursor 1146 is at the bottom edge of the display area of touch screen 504 (e.g., a continuous downward swipe after moving cursor to the bottom edge or a subsequent downward swipe input after the cursor was moved to the bottom edge by a previous user input). In some embodiments, the downward swipe while cursor 1146 is at the bottom edge of the display area corresponds to a request to move the cursor beyond the bottom edge. In some embodiments, in response to the downward swipe while cursor 1146 is at the bottom edge of the display area, notification user interface 1110 moves upwards in accordance with the user input and begins to be dismissed (e.g., similar to the user interface described above with respect to FIG. 11DD). In some embodiments, cursor 1146 remains displayed at the bottom edge of the display area. In some embodiments, cursor 1146 ceases to be displayed. In some embodiments, in response to a termination of the downward swipe, device 500 displays user interface 1108 corresponding to Recent App 2 and user interface 1110 is dismissed (similar to the user interface described above with respect to FIG. 11EE). Thus, in some embodiments, a user input on touch-sensitive surface 451 moving the cursor to the bottom edge of touch screen 504 and beyond the bottom edge of touch screen 504 performs the same function as a corresponding upward swipe from the bottom edge of touch screen 504 detected on touch screen 504. Further details regarding requests to move the cursor beyond an edge of the display area of touch screen 504 will be described below with respect to method 1400.

In FIG. 11II, device 500 is displaying user interface 1108 with cursor 1146 at the location of status indicator 1122-2, causing status indicator 1122-2 to be selected for input, as is described above with respect to method 700. In some embodiments, the size and shape of cursor 1146 changes to conform to status indicator 1122-2 (e.g., a rectangular box around status indicator 1122-2), as is described above with respect to method 800. In some embodiments, status indicator 1122-2 is only interactable via a cursor and is not responsive to inputs received via touch screen 504.

In FIG. 11JJ, a user input 1103 corresponding to a selection is received on touch sensitive surface 451 while status indicator 1122-2 is selected for input. In some embodiments, in response to detecting the selection input and while the selection input is being received (e.g., while and for the duration of when the click is held and/or when the intensity of contact 1103 is greater than an intensity threshold), cursor 1146 and/or status indicator 1122-2 becomes smaller and/or darker, as shown in FIG. 11JJ. In some embodiments, in response to the selection input, device 500 displays a control panel user interface 1112 (e.g., a controls user interface, etc.), as shown in FIG. 11KK. In some embodiments, an upwards swipe received via the touch-sensitive surface 451 corresponding to a request to move the cursor beyond the top edge of the touch screen 504 (e.g., optionally the top-right edge of touch screen 504, optionally the region associated with status indicator 1122-2) causes display of the control panel user interface as will be described in further detail below with respect to method 1400. In some embodiments, a downward swipe from the top edge of the touch screen 504 (e.g., optionally the top-right edge of touch screen 504, optionally the region associated with status indicator 1122-2) received from the touch-sensitive display 504 causes display of the control panel user interface.

As shown in FIG. 11KK, control panel user interface 1122 (e.g., similar to controls user interface 1306 described below) includes one or more options or affordances for managing one or more controls or settings for device 500, that when selected, cause the electronic device 500 to perform various functions. For example, the communication options 1154 control the connection state of various network connections of the electronic device 500 (e.g., cellular data connection, Wi-Fi connection, Bluetooth connection) and/or displays a settings user interface for changing one or more settings associated with one or more of the network connections. The media options 1158 control playback of media content playing on electronic device 500 (e.g., skip ahead, skip back, play/pause) and/or display a user interface with additional options for controlling playback of the media content. The screen rotation lock option 1158 control a setting that enables the electronic device 500 to rotate a user interface displayed on touch screen 504 in response to detecting rotation of display 504. Do Not Disturb option 1160 toggles a Do Not Disturb mode during which notifications are silenced on the electronic device 500. Screen mirroring option 1162 initiates a process to mirror the image displayed on display 504 to another display generation component in communication with electronic device 500. Brightness option 1164 changes the brightness of display 504 and/or displays a user interface for controlling the brightness of display 504. And sound option 1166 changes the volume of audio content currently playing on a speaker in communication with the electronic device 500 and/or displays one or more options for changing audio settings of the electronic device 500. In some embodiments, as shown in FIG. 11KK, control panel user interface 1122 is partially transparent and user interface 1108 is partially viewable.

In FIG. 11KK, a user input 1103 corresponding to a selection input is detected while cursor 1146 is at a location other than the one or more options (e.g., selectable options 1154, 1156, 1158, 1160, 1162, 1164, and 1166). In some embodiments, in response to the user input, device 500 dismisses user interface 1112 and re-displays user interface 1108, as shown in FIG. 11LL.

FIGS. 12A-12G are flow diagrams illustrating a method 1200 of dismissing or switching display of applications using a cursor. The method 1200 is optionally performed at an electronic device such as device 100, device 300, device 500, device 501, device 510, or device 591 as described above with reference to FIGS. 1A-1B, 2-3, 4A-4B and 5A-5I. Some operations in method 1200 are, optionally combined and/or order of some operations is, optionally, changed.

As described below, the method 1200 provides ways to dismiss or switch display of applications using a cursor. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display generation component and one or more input devices, including a touch-sensitive surface (e.g., a mobile device (e.g., a tablet, a smartphone, a media player, or a wearable device), or a computer, optionally in communication with one or more of a (e.g., external) mouse, (e.g., external) trackpad, and/or (e.g., external) touchpad, etc.) displays (1202), via the display generation component, a respective user interface including a first user interface object, such as home affordance 1136 in FIG. 11A (e.g., the respective user interface is an application, a menu, a system user interface, or any other user interface other than the home screen user interface that is dismissible).

In some embodiments, the display generation component is a display integrated with the electronic device (optionally a touch screen display) and/or an external display such as a monitor, projector, television, etc. In some embodiments, the first user interface object is selectable, via an input detected from an external trackpad, to dismiss a currently displayed application (e.g., the respective user interface) and display the home screen user interface of the electronic device (e.g., such as user interface 400 described above with respect to FIG. 4A), or to display an application switching user interface depending on other characteristics of the input. In some embodiments, the first user interface object is a visual element (such as a button or a horizontal bar) at or near the bottom of the display. In some embodiments, a quick upward swipe of the first user interface object via a touch-sensitive display causes the currently displayed application to be dismissed and the home screen user interface to be displayed. In some embodiments, an upward swipe of the first user interface object via a touch-sensitive display that ends at or near (e.g., within a threshold distance of, such as 1, 2, or 5 cm of) the center of the touch-sensitive display while maintaining contact with the touch-sensitive display causes the device to display an application switching user interface in which the user is able to select from a plurality of applications (e.g., currently running applications, background applications, etc.) to cause display of the selected application (e.g., as a foreground application). In some embodiments, a tap input via the touch-sensitive display on the first user interface object does not cause display of the home screen user interface or the application switching user interface.

In some embodiments, while displaying the respective user interface, the device receives (1204), via the one or more input devices, a first user input directed to a portion of the respective user interface that includes the first user interface object, such as user input 1103 corresponding to a selection while home affordance 1136 is selected for input in FIG. 11I (e.g., an input moving a cursor to the location of the first user interface object and/or performing a selection input). In some embodiments, the selection input is a tap input, a click input, and/or a contact and hold input detected on the external touchpad, etc. In some embodiments, the input selecting the first user interface object is received after and/or while the first user interface object receives a focus. In some embodiments, the first user interface object receives a focus as described with reference to method 700.

In some embodiments, in response to receiving the first user input (1206), such as in FIG. 11J: in accordance with a determination that the first user input includes a tap input that is detected at an input device that is remote from the first user interface object, such as via touch sensitive surface 451 in FIG. 11I (e.g., a tap input (e.g., short, quick contact), a click input (e.g., an actuation of a mechanical button or a pressure above a threshold), or any other suitable selection input, via the input device remote from the first user interface object, on the first user interface object), the device displays (1208), on the touch-sensitive display, a home screen user interface, wherein the home screen user interface is different from the respective user interface, such as user interface 1104 in FIG. 11J (e.g., dismissing the user interface that was displayed when the gesture is received and displaying the home screen user interface).

For example, the input is received from a device other than the touch-sensitive display, such as an external mouse, external trackpad, etc. For example, the user moves the cursor to the first user interface object and performs a tap input corresponding to a selection of the first user interface object via an external touchpad. Thus, in some embodiments, the first user interface object is selectable from the touch-sensitive display with a contact and upward swipe gesture to display the home screen user interface, but is not selectable from the touch-sensitive display with a tap to display the home screen user interface. By contrast, via the input device that is remote from the first user interface object, the first user interface object is selectable using either a tap while the first user interface object has a focus or an upward swipe gesture while the first user interface object has a focus to display the home screen user interface. In some embodiments, the home screen user interface includes one or more representations of applications that are selectable to cause display of and/or launch the respective application.

In some embodiments, in accordance with a determination that the first user input includes a swipe input that is detected at the input device that is remote from the first user interface object and meets first criteria (e.g., a contact on a touchpad—not the touch-sensitive display—at a location corresponding to the first user interface object and a gesture while continuing contact with the touchpad, such as an upward drag gesture), the device displays (1210), via the display generation component, the home screen user interface, such as the upward swipe on touch sensitive surface 451 while maintaining the selection input while home affordance 1136 is selected for input in FIGS. 11K-11M (e.g., dismissing the user interface that was displayed when the gesture is received and displaying the home screen user interface).

In some embodiments, the first criteria include a requirement that the first input include a selection input (optionally while the first user interface object is selected for input as described above with respect to method 700) and a swipe while maintaining the selection. In some embodiments, the selection input is a mechanical actuation of a button or switch on the input device (e.g., a click) or an increase in pressure above a threshold amount detected by the input device—in some embodiments, if the input does not include a selection input, the cursor is moved instead of the home screen user interface being displayed. In some embodiments, the first criteria include a requirement that the swipe be in a particular direction, such as an upward direction (or have an upward directional component). In some embodiments, the first criteria include a home display criteria different from the multitasking display criteria that would cause display of a multitasking user interface (optionally an application switching user interface). In some embodiments, the home display criteria are satisfied based on a combination of one or more of the direction, distance, and speed of the swipe input. For example, if the swipe gesture includes an upward movement farther than a threshold amount while the first user interface object is selected, then the first criteria is satisfied and the home screen user interface is displayed. In some embodiments, the first criteria is the same or similar to the criteria that causes the home screen user interface to be displayed in response to an swipe input on the first user interface object via a touch-screen user interface.

In some embodiments, if the first criteria are not satisfied, then the home screen user interface is not displayed. In some embodiments, if the first criteria are not satisfied, based on the characteristics of the user input, the device displays an application switching user interface, switches the displayed application, and/or enters into a multi-tasking mode.

The above-described manner of actuating the first user interface object (e.g., in response to a tap input and in response to a particular swipe input from an input device that is remote from the first user interface object) provides an efficient and consistent method of navigating to a home screen user interface (e.g., by making the first user interface object for displaying the home screen user interface interactable in similar ways as other selectable objects that are selectable in response to a tap input, such as buttons, application icons, and the like), which simplifies the interaction between the user and the electronic device and enhances the operability of the electronic device and makes the user-device interface more efficient (e.g., by providing the user with the same method of activating the first user interface object as other selectable objects without requiring the user to perform a different input or gesture as compared to other selectable objects), which additionally reduces power usage and improves battery life of the electronic device by enabling the user to use the electronic device more quickly and efficiently.

In some embodiments, in response to receiving the first user input (1212), such as in FIG. 11B: in accordance with a determination that the first user input includes a tap input that is detected at a touch-sensitive display (e.g., a short, quick contact with the touch-sensitive display, a touchdown followed by liftoff of a contact within a time threshold of touchdown (e.g., 0.1 seconds, 0.2 seconds, 0.3 seconds, 0.5 seconds, 0.7 seconds, 1 second, etc.), and having less than a threshold amount of movement while touched-down (e.g., less than 0.1 mm, 0.3 mm, 0.5 mm, 1 mm, 2 mm, etc.)), on which the respective user interface is displayed, in communication with the electronic device, the device maintains (1214) display of the respective user interface on the touch-sensitive display without displaying the home screen user interface, such as the tap input from hand 1138 on the touch sensitive display 504 at the location of home affordance 1136 in FIG. 11C (e.g., a tap or other selection input on the touch-sensitive display at the location of the first user interface object does not cause display of the home screen user interface).

In some embodiments, if the contact has more than the threshold amount of movement, then the contact is interpreted as a swipe input and not a tap input, as described below. In some embodiments, if liftoff is not detected within the time threshold, then the contact is detected as a touch-and-hold input and not a tap input. In some embodiments, the system maintains display of the respective user interface.

In some embodiments, in accordance with a determination that the first user input includes a swipe input that is detected at the touch-sensitive display and meets the first criteria, the device displays (1216), on the touch-sensitive display, the home screen user interface, such as the upward swipe from hand 1138 starting from the position of home affordance 1136 in FIGS. 11D-11F (e.g., an upward swipe input on the touch-sensitive display starting at the location of the first user interface object causes the display of the home screen user interface or an application switching user interface).

In some embodiments, if the upward swipe input meets the first criteria, as is described in more detail above, then the home screen user interface is displayed. For example, the criteria for displaying the home screen user interface in response to a swipe input on the touch-sensitive display is the same or similar to the criteria for displaying the home screen user interface in response to a swipe input on an input device that is remote from the first user interface object.

The above-described manner of responding to inputs on the touch-sensitive display (e.g., displaying the home screen user interface in response to a swipe input on the touch-sensitive display that meets the first criteria and not displaying the home screen user interface in response to a tap input) provides a quick and reliable manner of displaying the home screen user interface only when intended, which simplifies the interaction between the user and the electronic device and enhances the operability of the electronic device and makes the user-device interface more efficient (e.g., by avoiding erroneous home screen user interface display due to errant taps on the touch-sensitive display), which additionally reduces power usage and improves battery life of the electronic device by enabling the user to use the electronic device more quickly and efficiently.

In some embodiments, in response to receiving the first user input (1218), such as in FIG. 11P: in accordance with a determination that the first user input includes a swipe input (e.g., touchdown of a contact with the touch-sensitive display including a movement more than a threshold amount while touched-down (e.g., more than 0.1 mm, 0.3 mm, 0.5 mm, 1 mm, 2 mm, etc.).) that is detected at the input device that is remote from the first user interface object and meets second criteria, different from the first criteria, the device displays (1220), via the display generation component, an application switching user interface, such as in FIGS. 11P-11Q (e.g., without displaying the home screen user interface).

In some embodiments, an upward swipe input on an input device that is remote from the first user interface object that meets a second criteria causes display of an application switching user interface. In some embodiments, the second criteria include a requirement that the first input include a selection input and a swipe while maintaining the selection. In some embodiments, the selection input is a mechanical actuation of a button or switch on the input device (e.g., a click) or an increase in pressure above a threshold amount detected by the input device—in some embodiments, if the input does not include a selection input, the cursor is moved instead of the application switching user interface being displayed. In some embodiments, the second criteria include a requirement that the first user interface object is selected for input (as described above with respect to method 700) when the first input is received. In some embodiments, the second criteria include a requirement that the swipe be in a particular direction, such as an upward direction (or have an upward directional component). In some embodiments, the second criteria include a multitasking display criteria that causes display of a multitasking user interface when satisfied. In some embodiments, the multitasking display criteria is satisfied based on a combination of one or more of the direction, distance, and speed of the swipe input. For example, if the swipe gesture includes an upward movement less than a threshold amount while the first user interface object is selected for input and/or if the swipe gesture includes a lateral (e.g., horizontal) movement greater than a threshold amount, then the second criteria is satisfied and the application switching user interface is displayed. In some embodiments, the application switching user interface includes one or more representations of one or more currently active applications and/or recently displayed applications (e.g., application running as an active process or as a background process) which are selectable to cause display of the respective application.

The above-described manner of displaying an application switching user interface (e.g., in response to a swipe input on the touch-sensitive surface that meets the second criteria) provides a quick and efficient manner method of switching the active application of the device using an input device other than the touch-sensitive display, which simplifies the interaction between the user and the electronic device and enhances the operability of the electronic device and makes the user-device interface more efficient (e.g., by providing multiple methods of displaying the application switching user interface without requiring the user to switch to a touch-sensitive display to cause display of the application switching user interface), which additionally reduces power usage and improves battery life of the electronic device by enabling the user to use the electronic device more quickly and efficiently.

In some embodiments, the respective user interface is a user interface of a first application (1222-1), such as in FIG. 11T (e.g., the device is displaying an application (as opposed to a system user interface, for example)). In some embodiments, in response to receiving the first user input (1222-2), such as in FIG. 11T: in accordance with a determination that the first user input includes a swipe input that is detected at the input device that is remote from the first user interface object and meets third criteria, different from the first criteria and the second criteria, the device displays (1224), via the display generation component, a user interface of a second application, different from the first application, such as in FIG. 11U (e.g., without displaying the application switching user interface and/or the home screen user interface).

In some embodiments, the swipe input includes a contact on a touchpad—not the touch-sensitive display—at a location corresponding to the first user interface object and a gesture while continuing contact with the touchpad, such as a lateral (optionally horizontal) drag gesture. In some embodiments, the third criteria include a requirement that the first input include a selection input (optionally while the first user interface object is selected for input as described above with respect to method 700) and a swipe while maintaining the selection. In some embodiments, the selection input is a mechanical actuation of a button or switch on the input device (e.g., a click) or an increase in pressure above a threshold amount detected by the input device—in some embodiments, if the input does not include a selection input, the cursor is moved instead of the second user interface being displayed. In some embodiments, the third criteria include a requirement that the swipe be in a particular direction, such as a horizontal direction (or have a horizontal directional component). In some embodiments, the third criteria include a criterion that the swipe input be farther than a threshold amount. For example, if the swipe gesture includes a horizontal movement farther than a threshold amount while the first user interface object is selected, then the third criteria is satisfied. In some embodiments, in accordance with a determination that the third criteria are satisfied, the device displays the user interface of an application different from the application that was displaying when the input was received. In some embodiments, the newly displayed application is the next or previous application in a queue of recent or active applications that includes the application that was displayed when the input was received. For example, the device optionally has a plurality of running applications, one or more of which are the current active application and one or more which are running in an inactive state such as background applications that are not currently being displayed but have not been terminated by the system and/or the user. In some embodiments, the next application in the queue is displayed in response to a swipe in a first direction (such as a leftward swipe) and the previous application in the queue is displayed in response to a swipe in a second direction (such as a rightward swipe).

The above-described manner of switching applications (e.g., in response to a swipe input on the touch-sensitive surface that meets the third criteria) provides a quick and efficient manner of switching the active application of the device (e.g., in response to a specific gesture and without requiring the use of the application switching user interface), which simplifies the interaction between the user and the electronic device and enhances the operability of the electronic device and makes the user-device interface more efficient (e.g., by providing a shortcut gesture to switch applications without requiring the user to perform additional inputs to return to the home screen user interface and launch the intended application or activate the application switching user interface), which additionally reduces power usage and improves battery life of the electronic device by enabling the user to use the electronic device more quickly and efficiently.

In some embodiments, in response to receiving the first user input (1226), such as in FIG. 11W: in accordance with a determination that the first user input includes a swipe input from a plurality of fingers and meets second criteria, the device displays (1228), via the display generation component, the home screen user interface, such as in FIG. 11W (e.g., an upward swipe input from three fingers causes display of the home screen user interface or the application switching user interface depending on the characteristics of the swipe input).

In some embodiments, the input is an input received on a touch-sensitive display, an external touch-sensitive surface, or any other suitable input device (e.g., the swipe input, if it meets the second criteria, will cause display of the home screen user interface regardless of whether it is detected on a touch-sensitive display on which the user interfaces are displayed, or an external touchpad in communication with the electronic device). In some embodiments, if the swipe input meets the second criteria, the home screen user interface is displayed. In some embodiments, the second criteria include a requirement that the swipe be in a particular direction, such as an upward direction (or have an upward directional component). In some embodiments, the second criteria include a home display criteria (optionally the same or similar to the home display criteria described above). In some embodiments, the home display criteria are satisfied based on a combination of one or more of the direction, distance, and speed of the swipe input. For example, if the swipe gesture includes an upward movement farther than a threshold amount is selected, then the second criteria is satisfied and the home screen user interface is displayed. In some embodiments, the home screen user interface is displayed without requiring a tap or selection input. In some embodiments, the home screen user interface is displayed without the first user interface object being selected for input.

In some embodiments, in accordance with a determination that the first user input includes the swipe input from the plurality of fingers and meets third criteria, different from the second criteria, the device displays (1230), via the display generation component, an application switching user interface, such as in FIG. 11P (e.g., an upward swipe input from three fingers that meets a third criteria causes display of an application switching user interface).

In some embodiments, the second input is an input received on a touch-sensitive display, a touch-sensitive surface, or any other suitable input device (e.g., the swipe input, if it meets the third criteria, will cause display of the application switching user interface regardless of whether it is detected on a touch-sensitive display on which the user interfaces are displayed, or an external touchpad in communication with the electronic device). In some embodiments, the third criteria include a multitasking display criteria that causes display of a multitasking user interface when satisfied (optionally the same or similar to the multitasking display criteria described above). In some embodiments, the multitasking display criteria is satisfied based on a combination of one or more of the direction, distance, and speed of the swipe input. For example, if the swipe gesture includes an upward movement less than a threshold amount and/or if the swipe gesture includes a lateral (e.g., horizontal) movement greater than a threshold amount, then the third criteria is satisfied and the application switching user interface is displayed. In some embodiments, the application switching user interface includes one or more representations of one or more currently active applications and/or recently displayed applications (e.g., application running as an active process or as a background process) which are selectable to cause display of the respective application.

The above-described manner of displaying the home screen user interface or the application switching user interface (e.g., in response to a swipe input from a plurality of fingers that meets respective criteria, irrespective of where the input was detected) provides consistent manners of accessing these user interfaces using different input devices, which simplifies the interaction between the user and the electronic device and enhances the operability of the electronic device and makes the user-device interface more efficient (e.g., by providing a shortcut gesture to switch applications or display the home screen user interface without requiring the user to perform a specific sequence of inputs on specific input devices), which additionally reduces power usage and improves battery life of the electronic device by enabling the user to use the electronic device more quickly and efficiently.

In some embodiments, the respective user interface includes a cursor (1232), such as in FIG. 11FF. In some embodiments, while displaying the respective user interface, the device receives (1234), via the one or more input devices, a second user input corresponding to a request to move the cursor beyond an edge of a display area of the display generation component, such as in FIGS. 13G-13I (e.g., a cursor movement input that moves the cursor to the edge of the display area of the display generation component and continued movement in a direction beyond the edge of the display area).

Figure 13A:
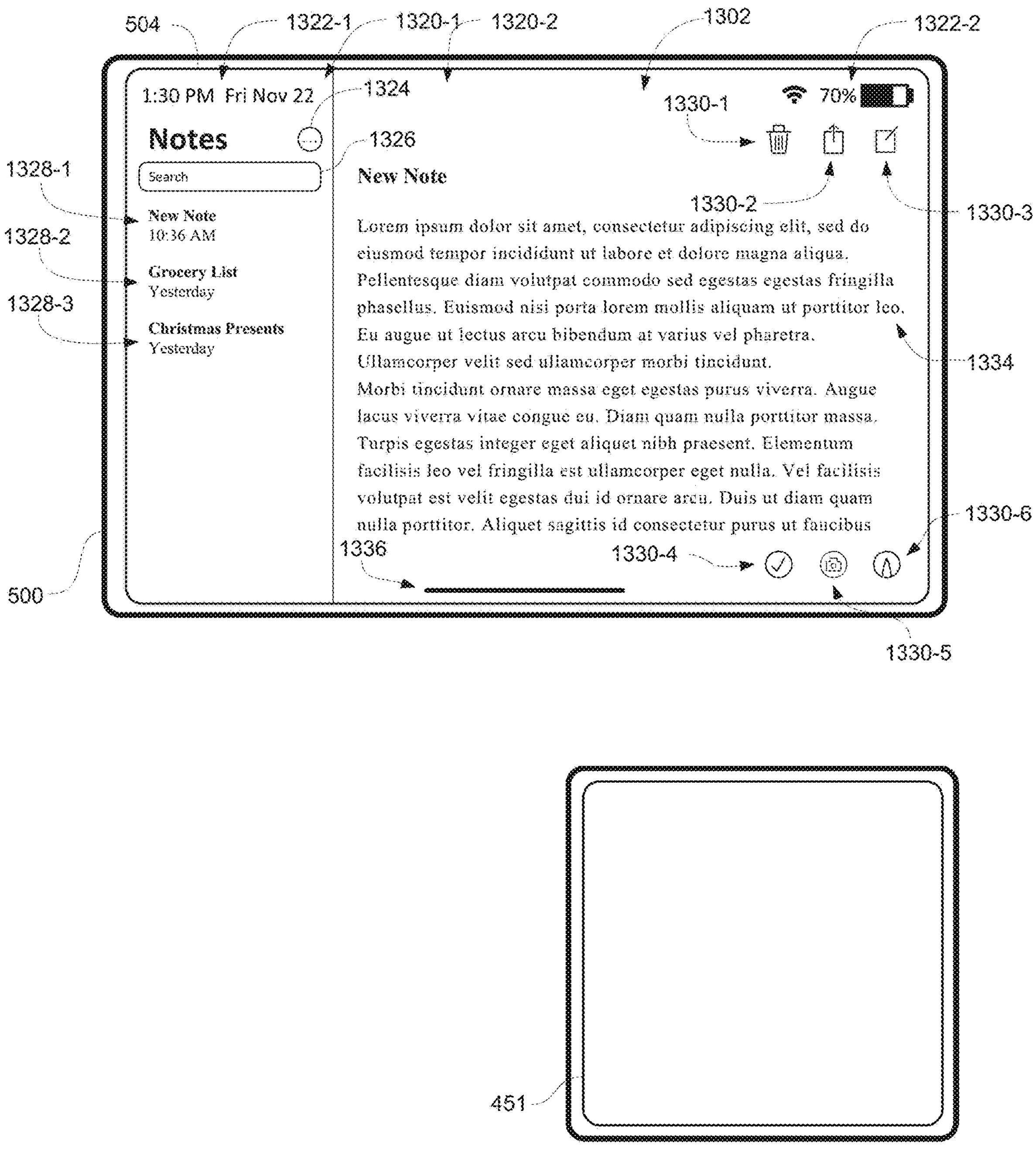
FIGS. 13A-13AAA illustrate exemplary ways of displaying user interface elements in response to user inputs corresponding to requests to move the cursor beyond the edge of a touch screen according to some embodiments of the disclosure.
Figure 13B:
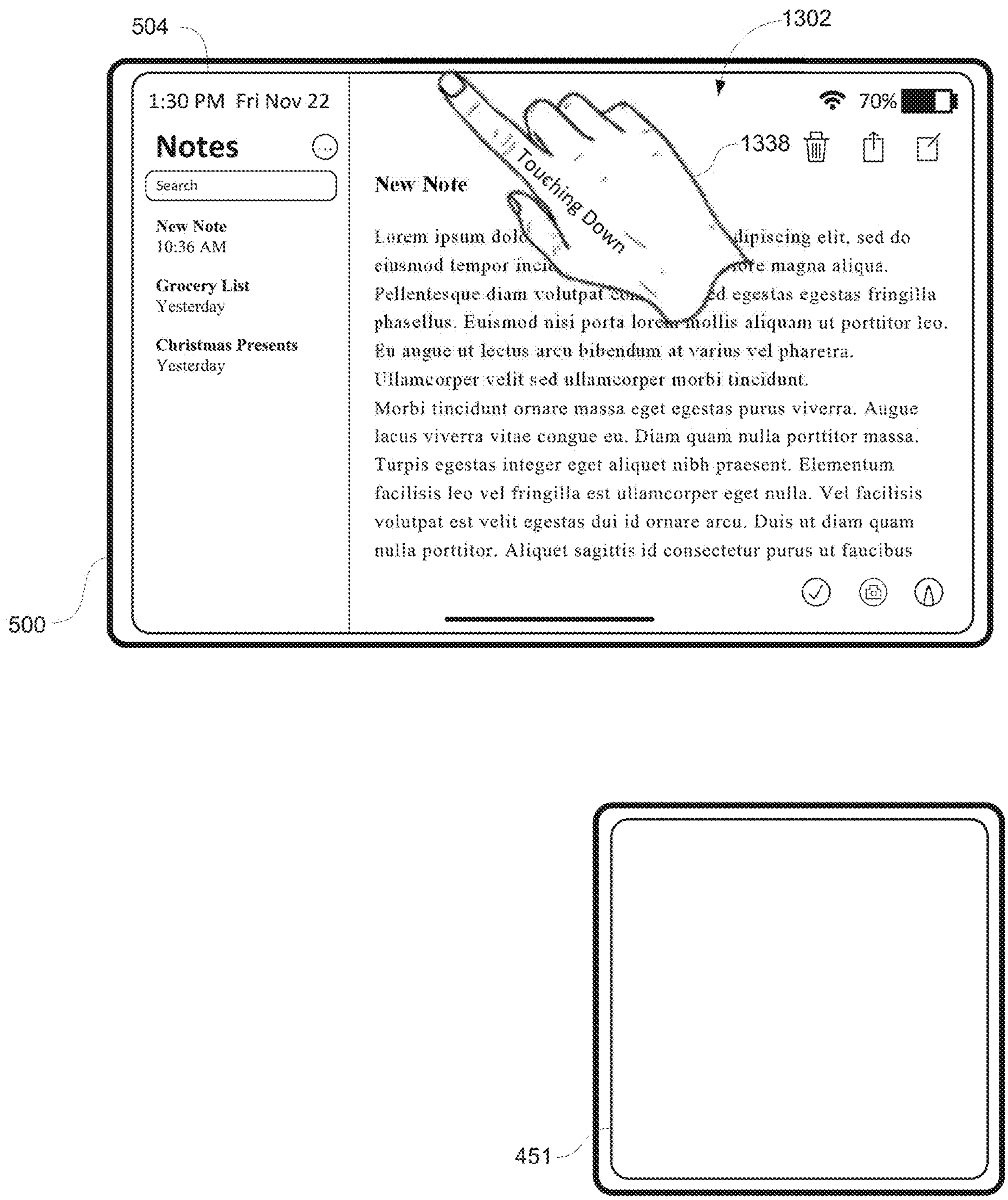
Figure 13C:
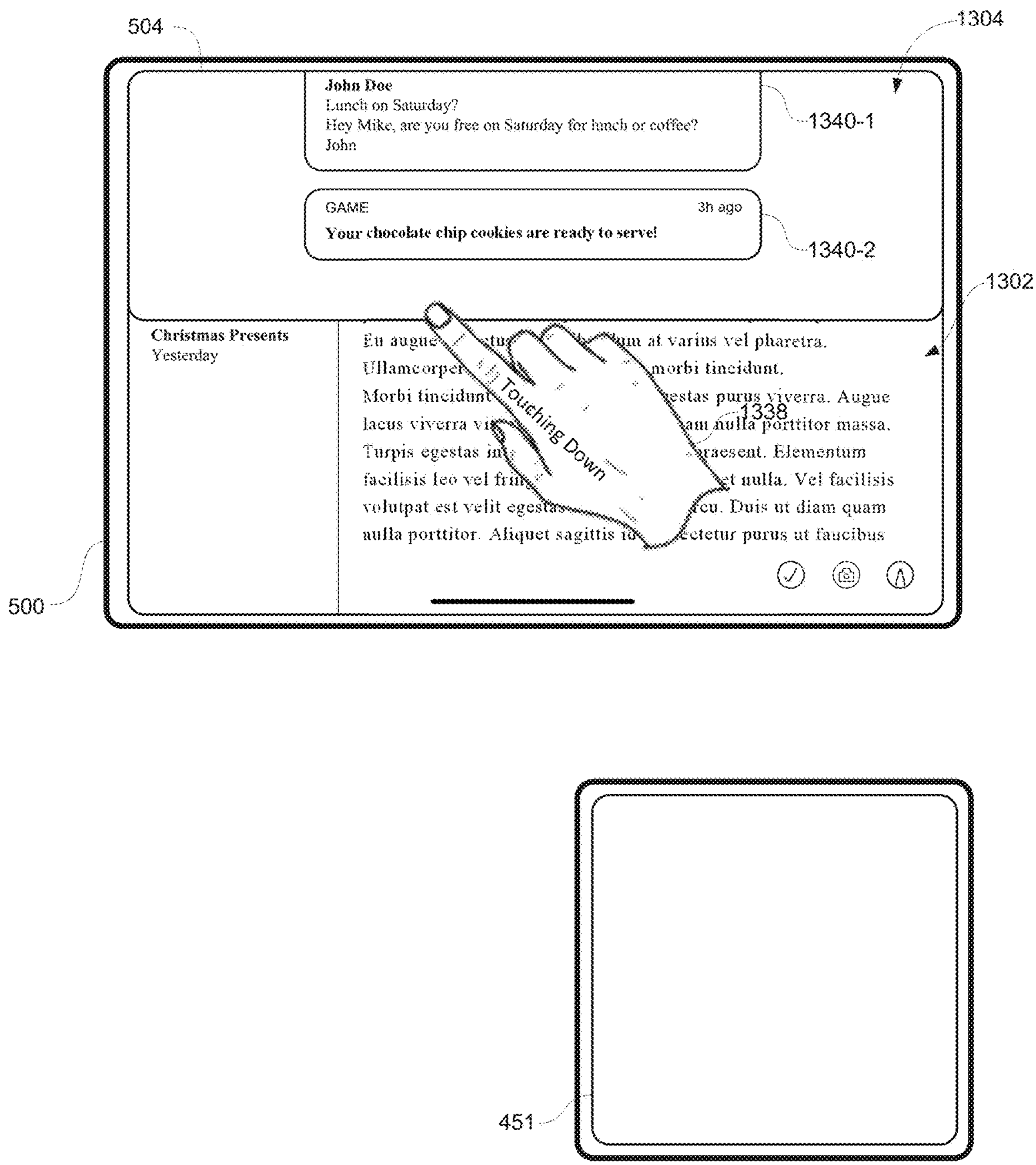
Figure 13D:
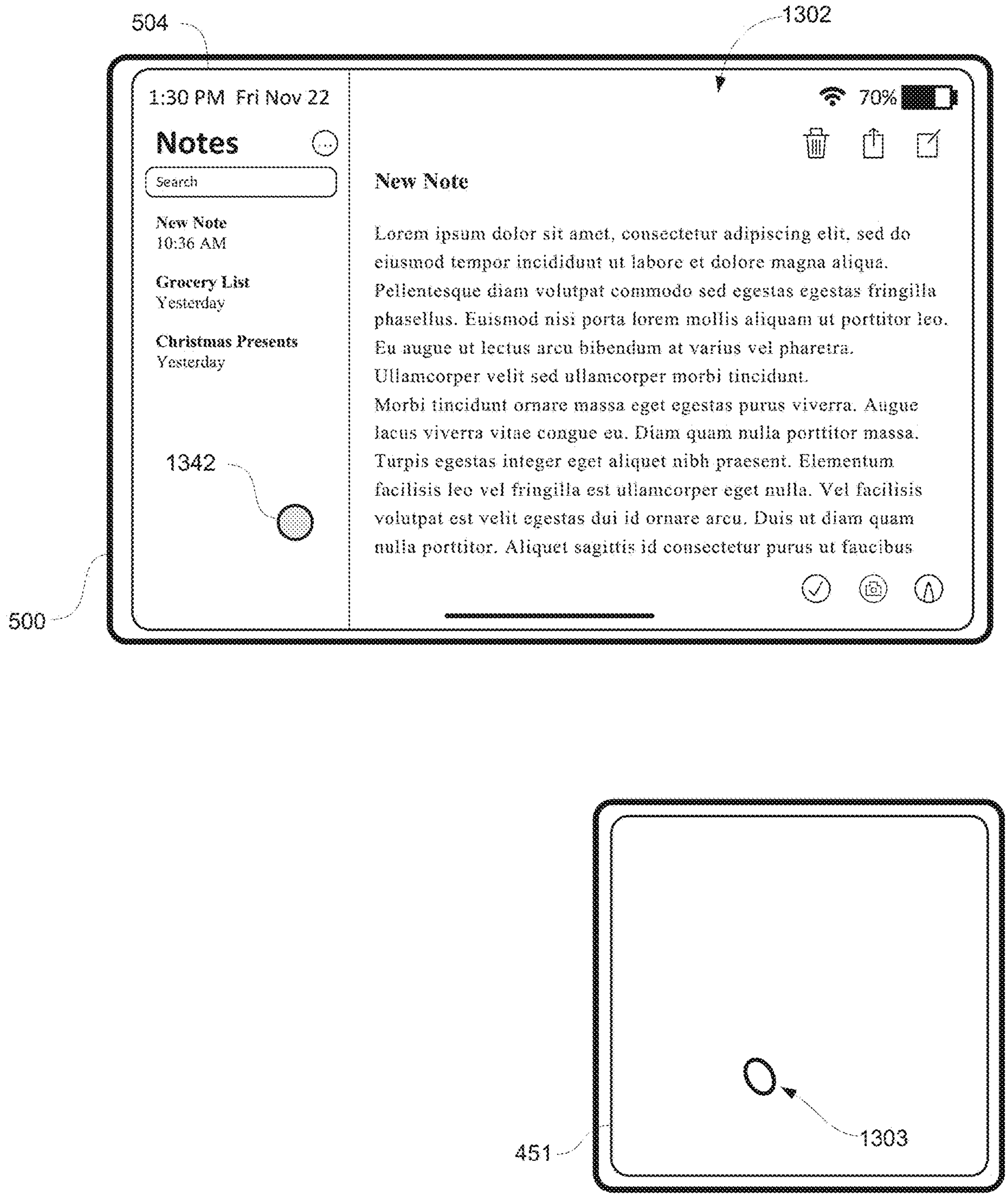
Figure 13E:
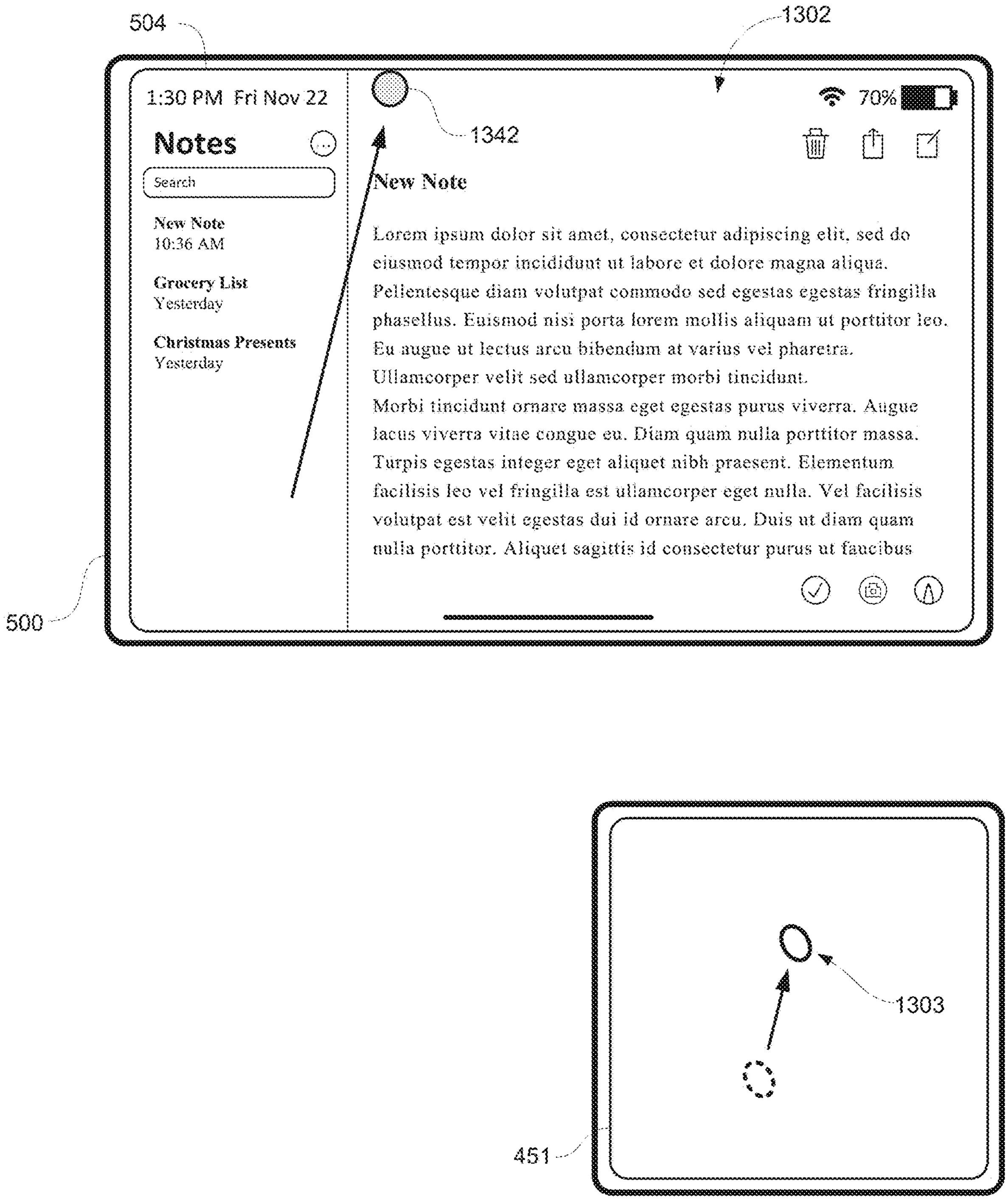
Figure 13F:
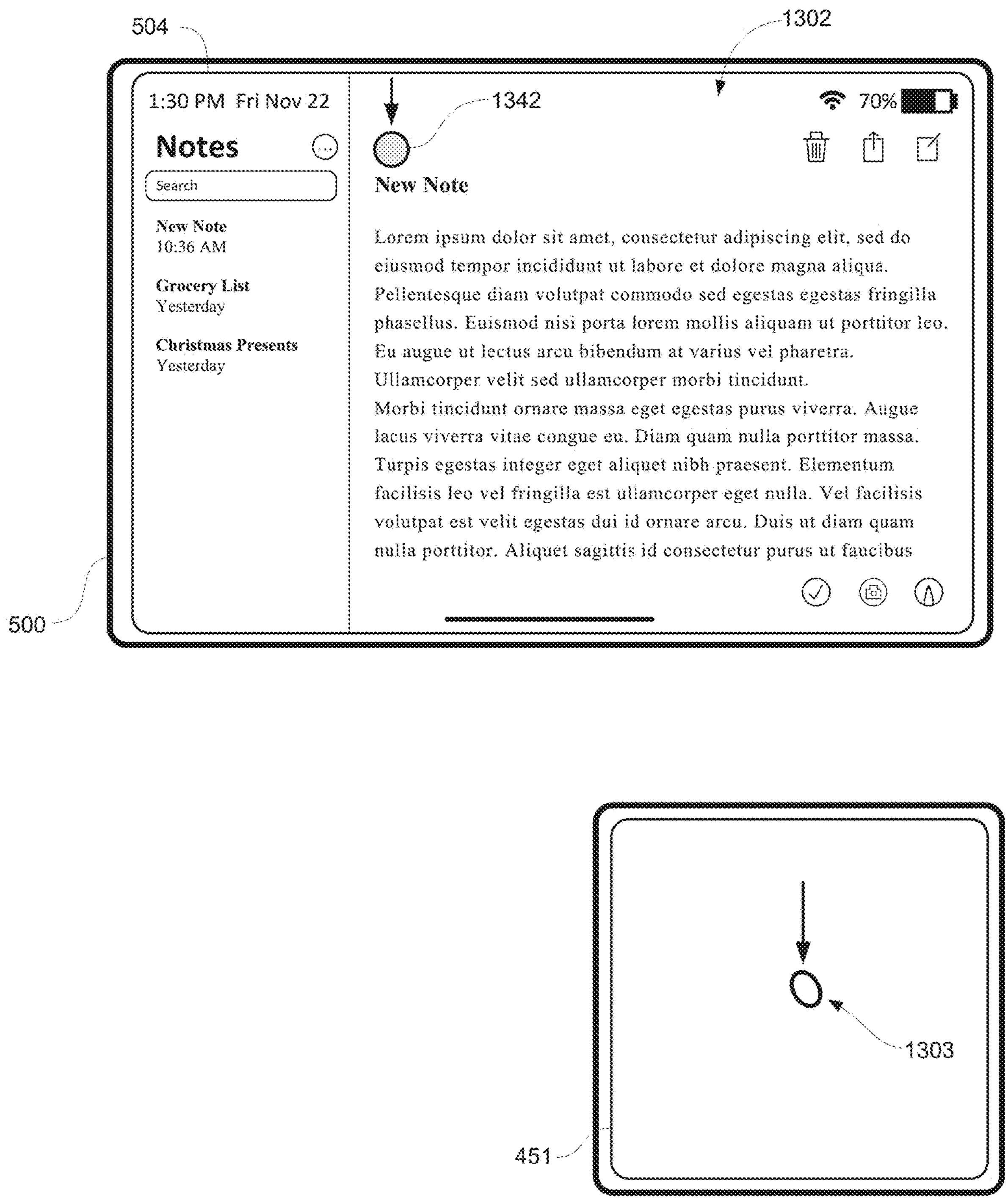
Figure 13G:
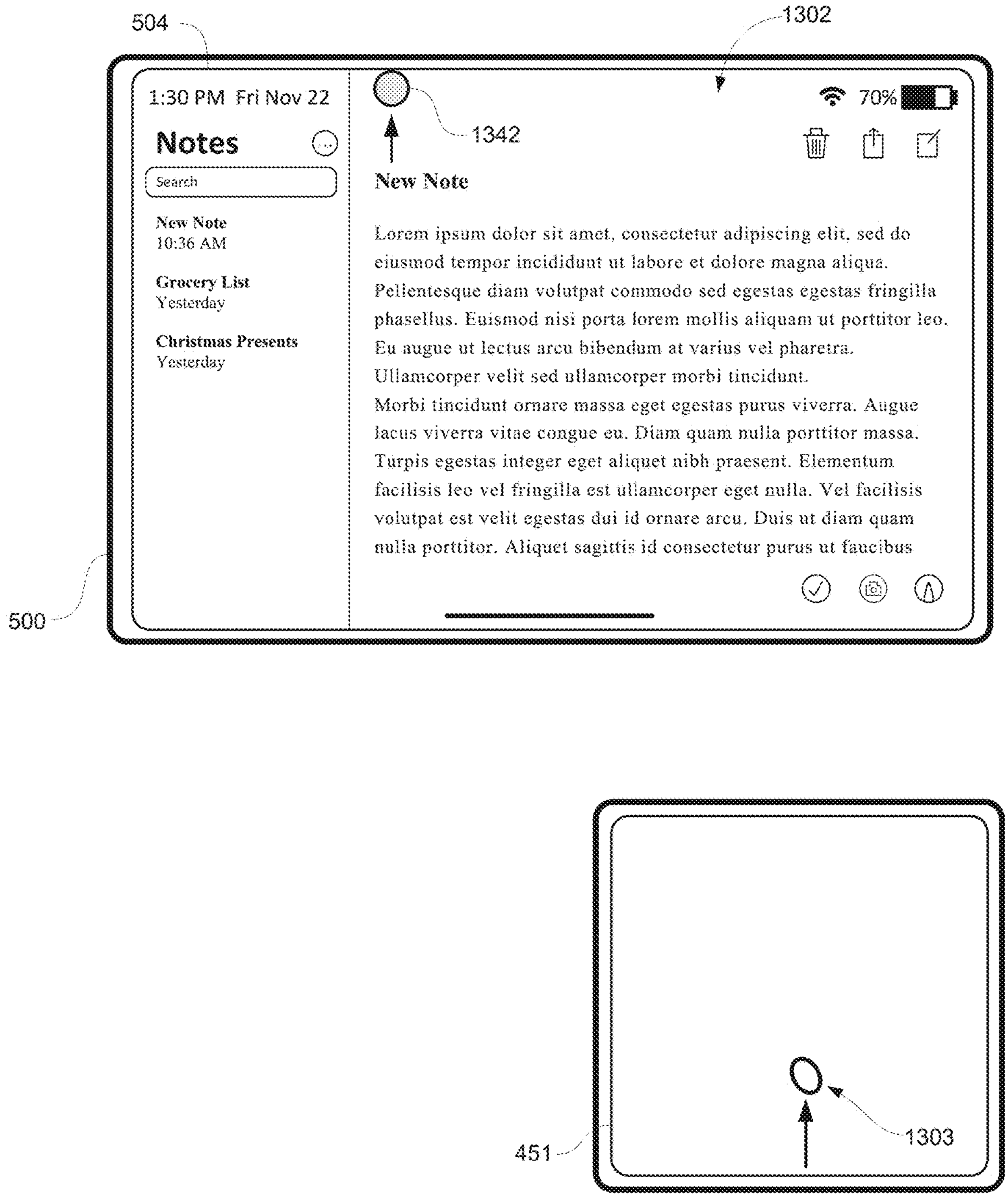
Figure 13H:
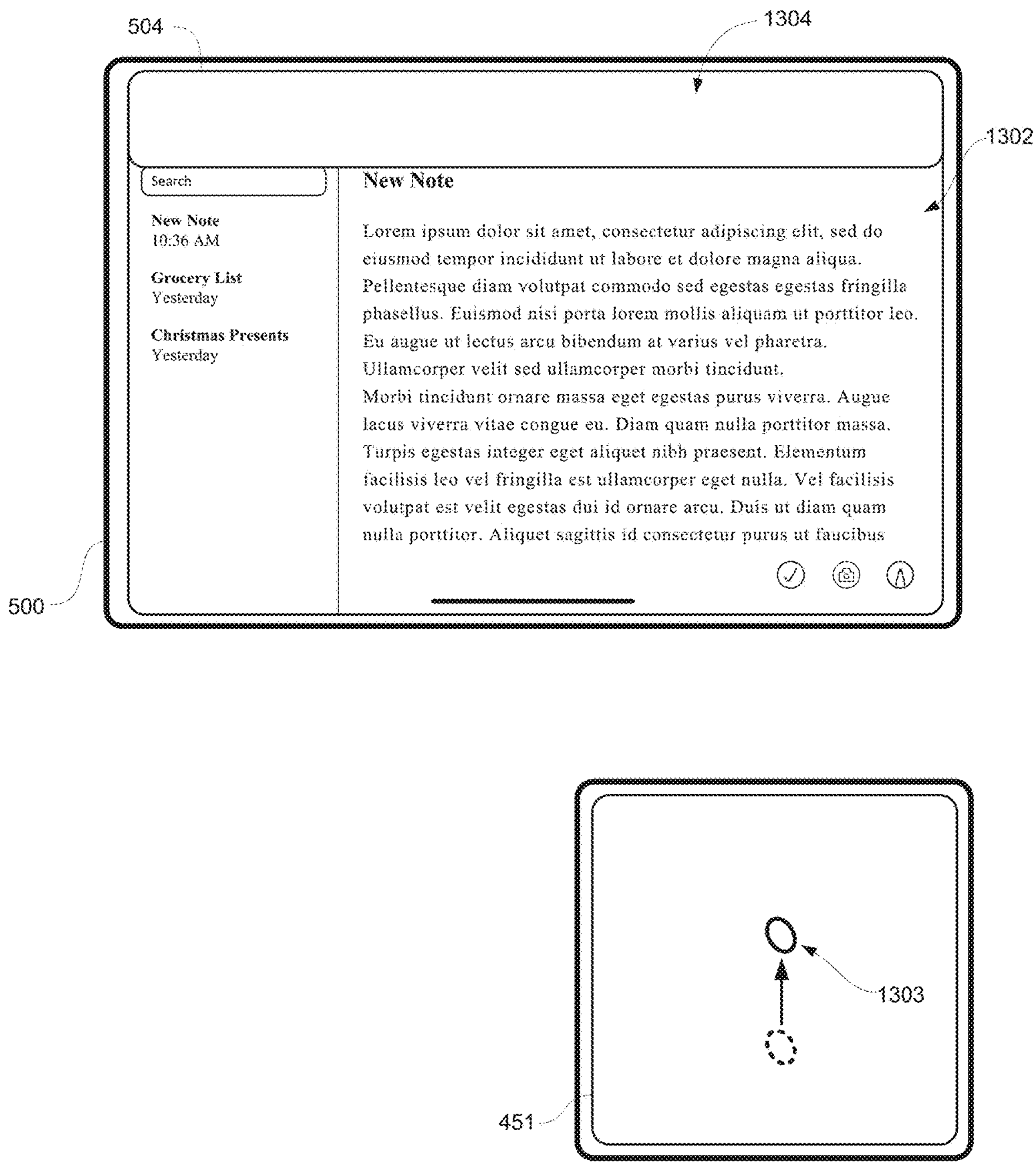
Figure 13I:
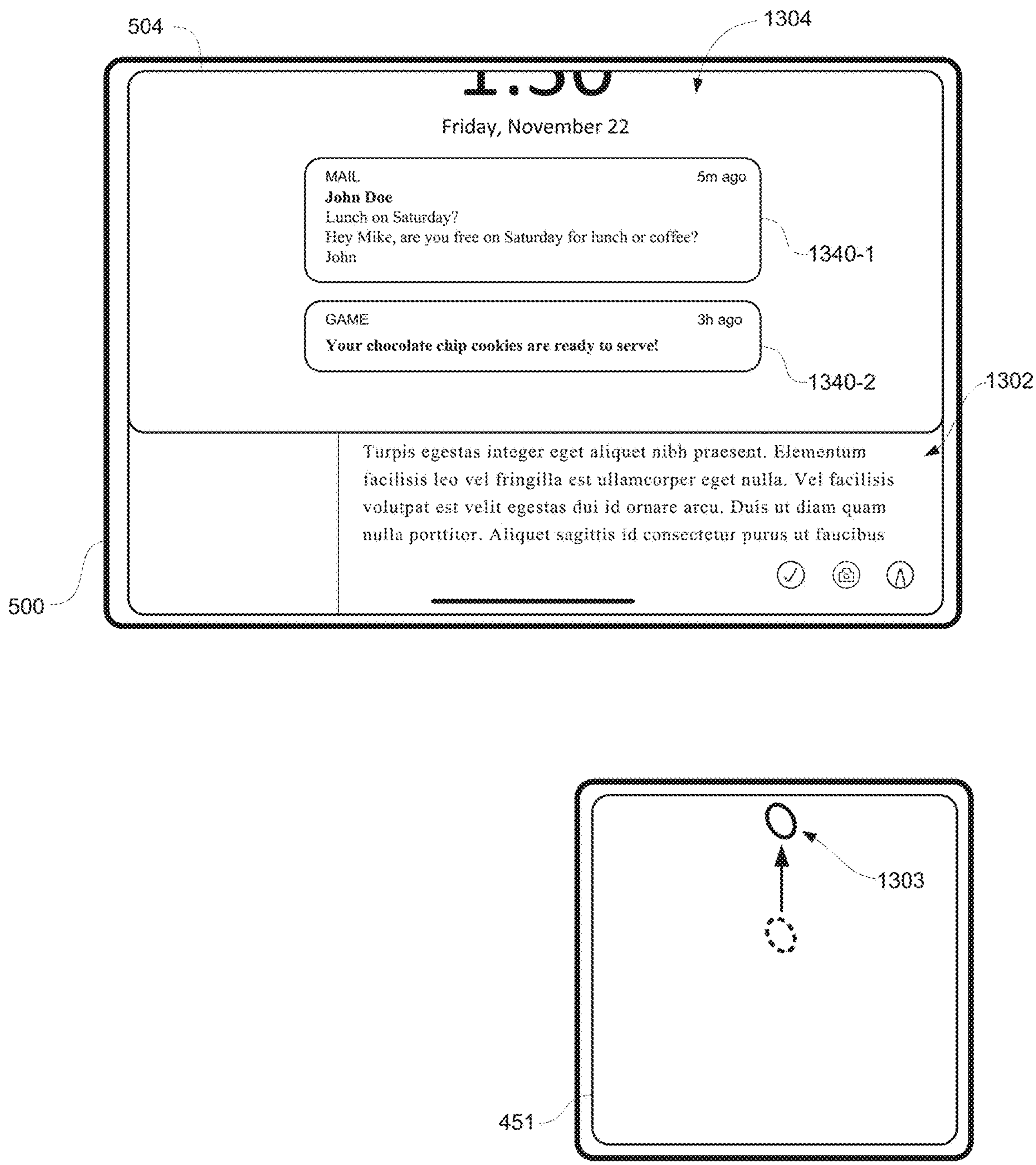

In some embodiments, in response to receiving the second user input (1236), such as in FIGS. 13G-13I: the device moves (1238) the cursor to a first location at the edge of the display area of the display generation component, such as in FIG. 13G (e.g., moving the cursor in accordance with the user input to the respective edge of the display area of the display generation component). In some embodiments, the cursor is not able to move beyond the edge of the display area and remains displayed at the edge of the display area in response to further cursor movement inputs to requesting to move beyond the edge. In some embodiments, the cursor moves beyond the edge of the display in response to further cursor movement input requesting to move beyond the edge and thus ceases to be displayed.

Figure 13J:
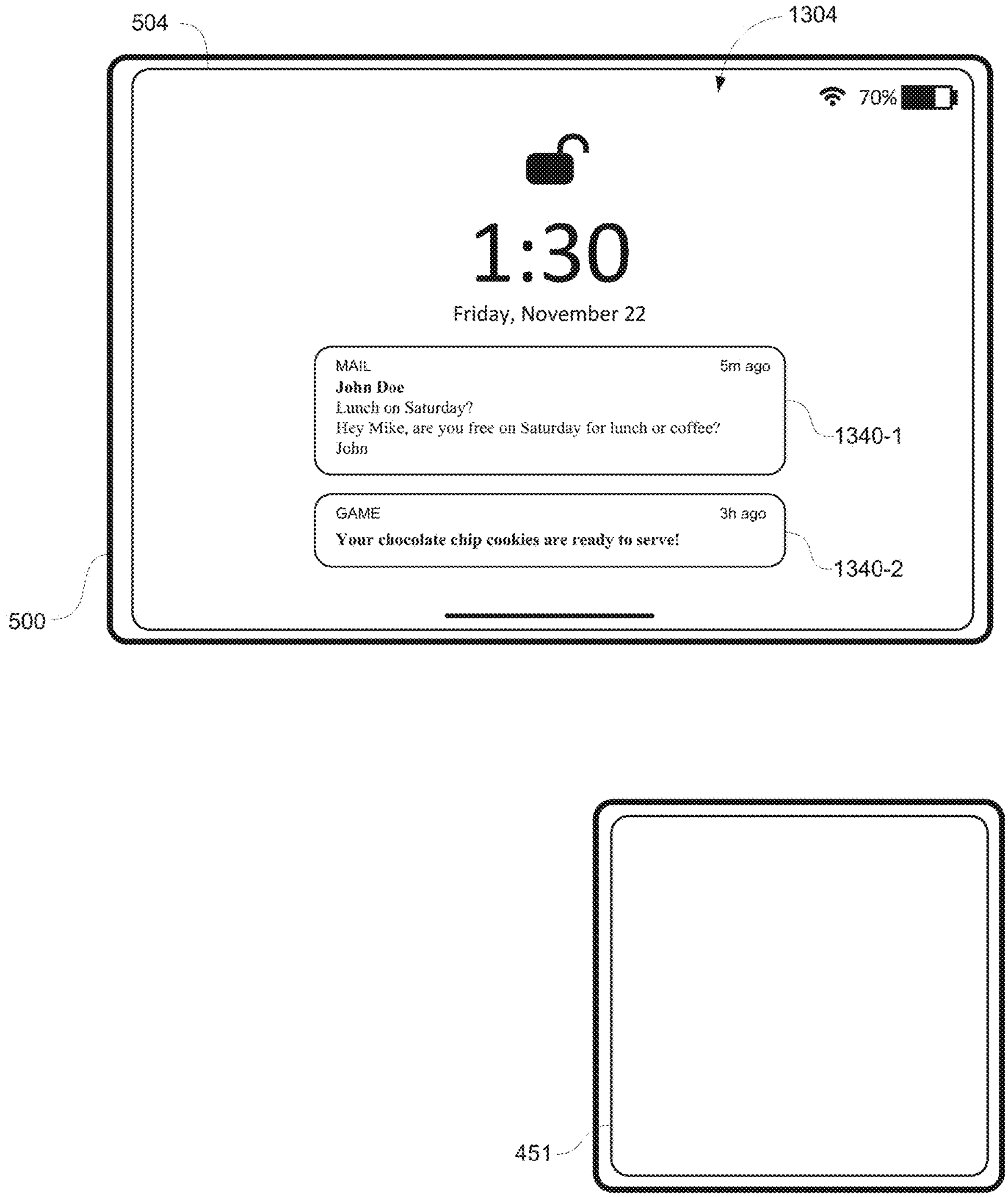

In some embodiments, in accordance with a determination that one or more system user interface display criteria are satisfied, the device displays (1240), via the display generation component, a first system user interface, different from the respective user interface, such as in FIG. 13J (e.g., displaying a system user interface. In some embodiments, the system user interface is associated with the edge at which the cursor is located). In some embodiments, the first system user interface slides in from the edge at which the cursor is located. In some embodiments, the amount that the first system user interface slides in is based on the magnitude of the user input. In some embodiments, if the magnitude of the user input is below a threshold amount when the input terminates, then the first system user interface is ceased to be displayed (e.g., slides away and into the edge). In some embodiments, if the magnitude of the user input is above a threshold amount when the input terminates, then the first system user interface is maintained displayed in the user interface (optionally fully displayed). In some embodiments, the first system user interface is displayed overlaid over the respective user interface. Displaying system user interfaces in response to requests to move a cursor beyond an edge of the display area is described in more detail below with respect to method 1400.

The above-described manner of displaying a system user interface (e.g., in response to request to move the cursor to and beyond the edge of the display) provides a quick and efficient alternative manner of displaying the system user interface (e.g., by using an input device that controls a cursor, which otherwise would be unable to perform an inward swipe gesture from the edge of the display), which simplifies the interaction between the user and the electronic device and enhances the operability of the electronic device and makes the user-device interface more efficient (e.g., without requiring the user to switch to a different input device that accepts inward swipes from an edge of the display as a request other than a cursor movement request, such as a touch-sensitive display), which additionally reduces power usage and improves battery life of the electronic device by enabling the user to use the electronic device more quickly and efficiently.

Figure 13K:
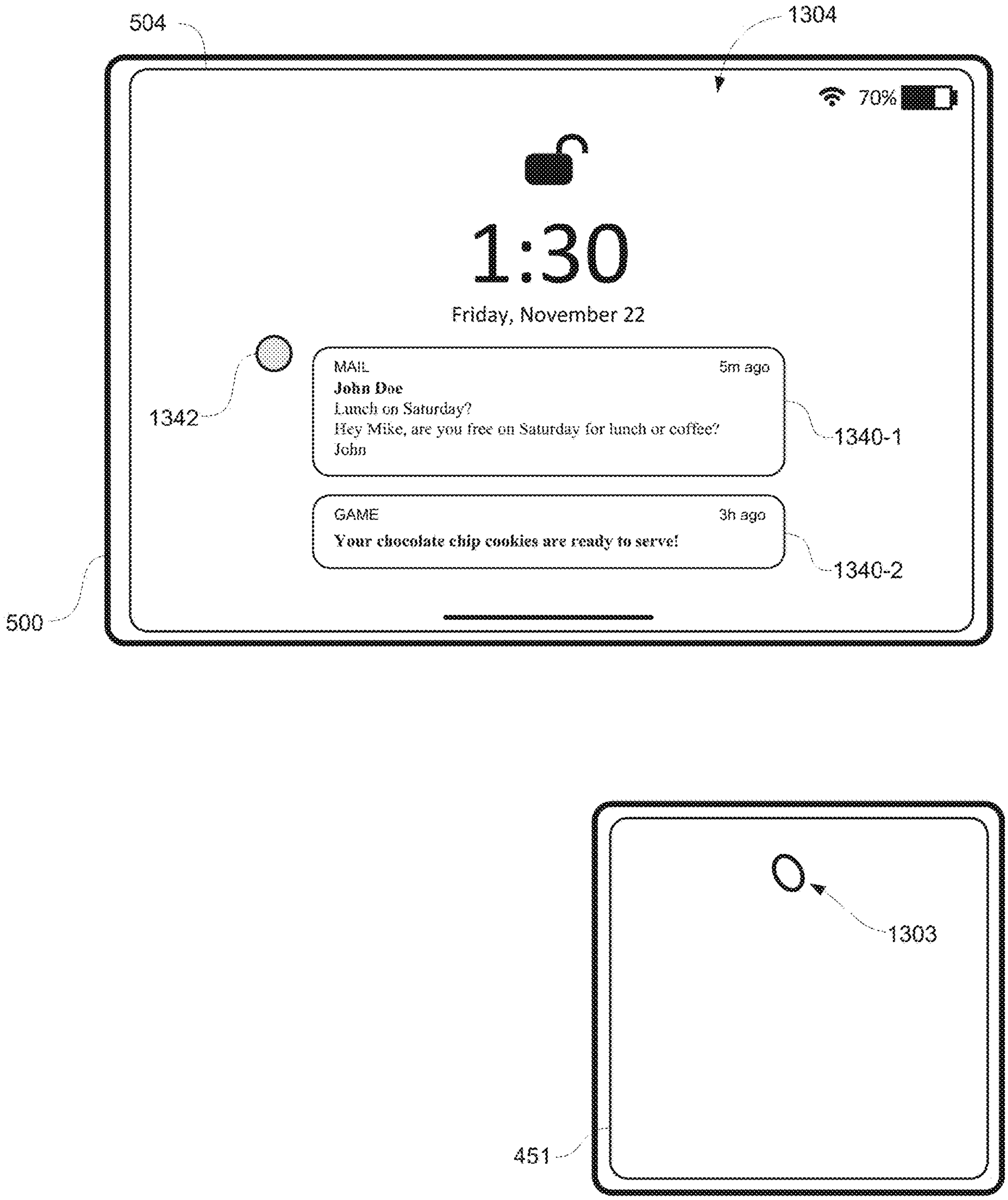
Figure 13L:
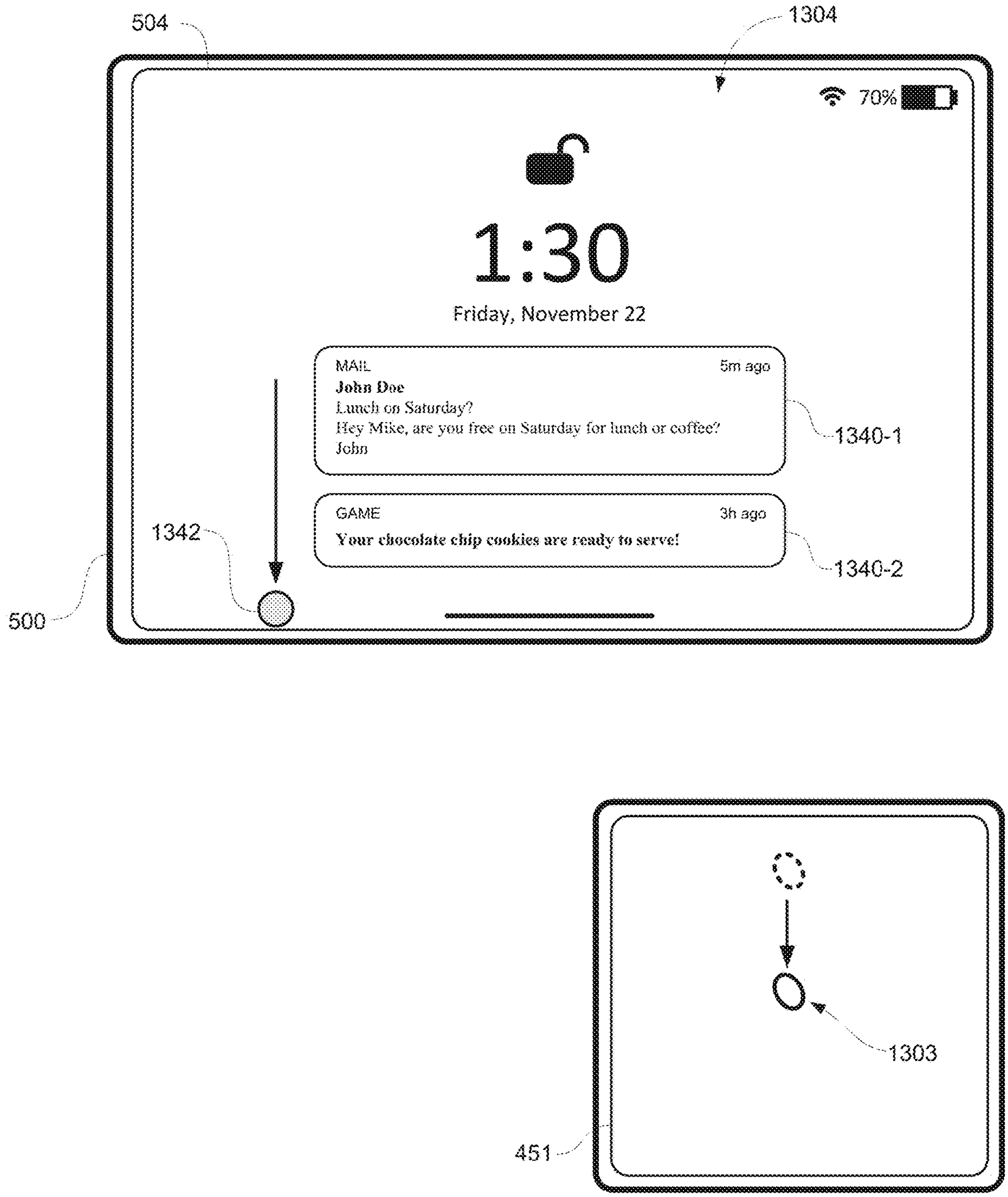
Figure 13M:
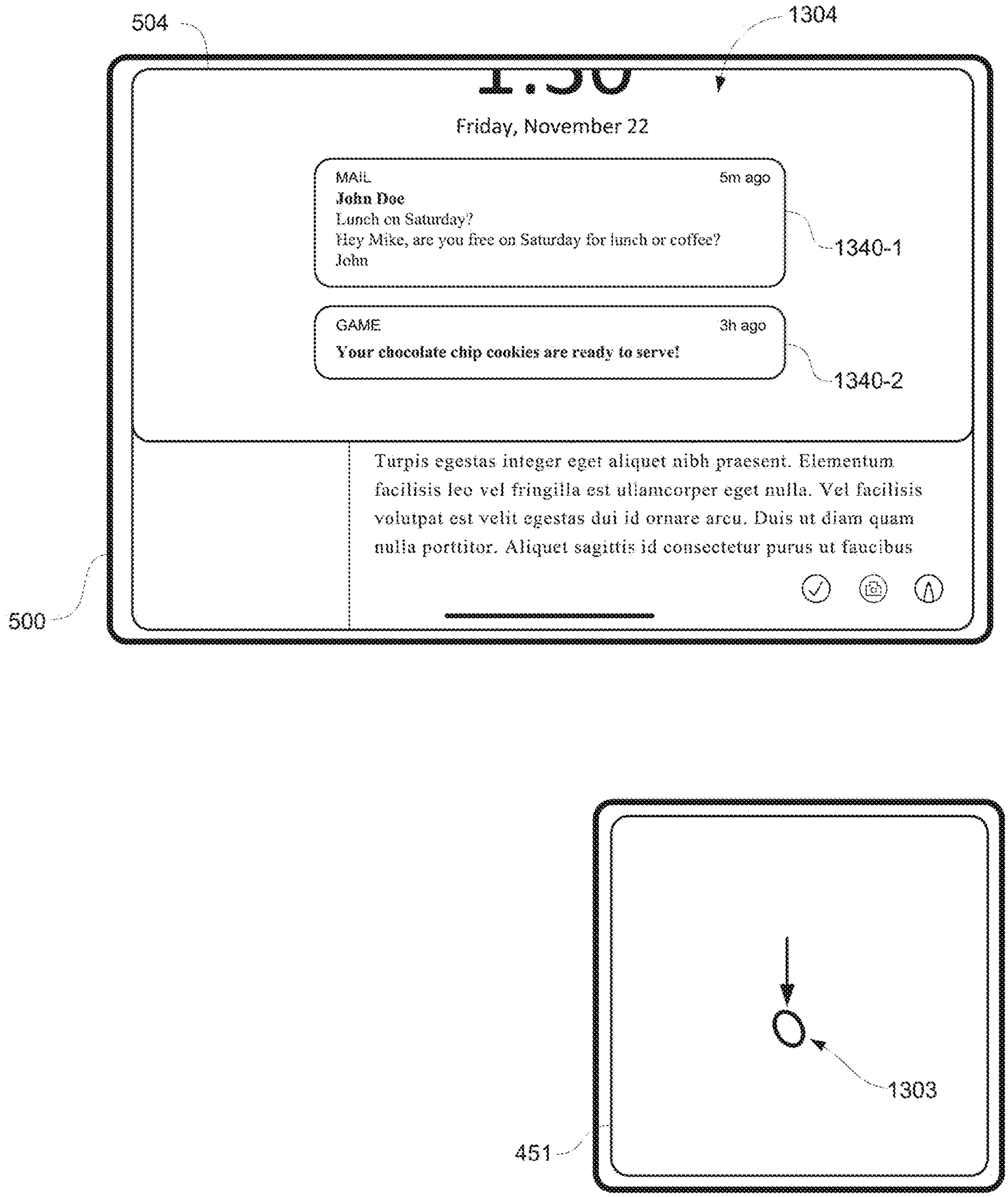
Figure 13N:
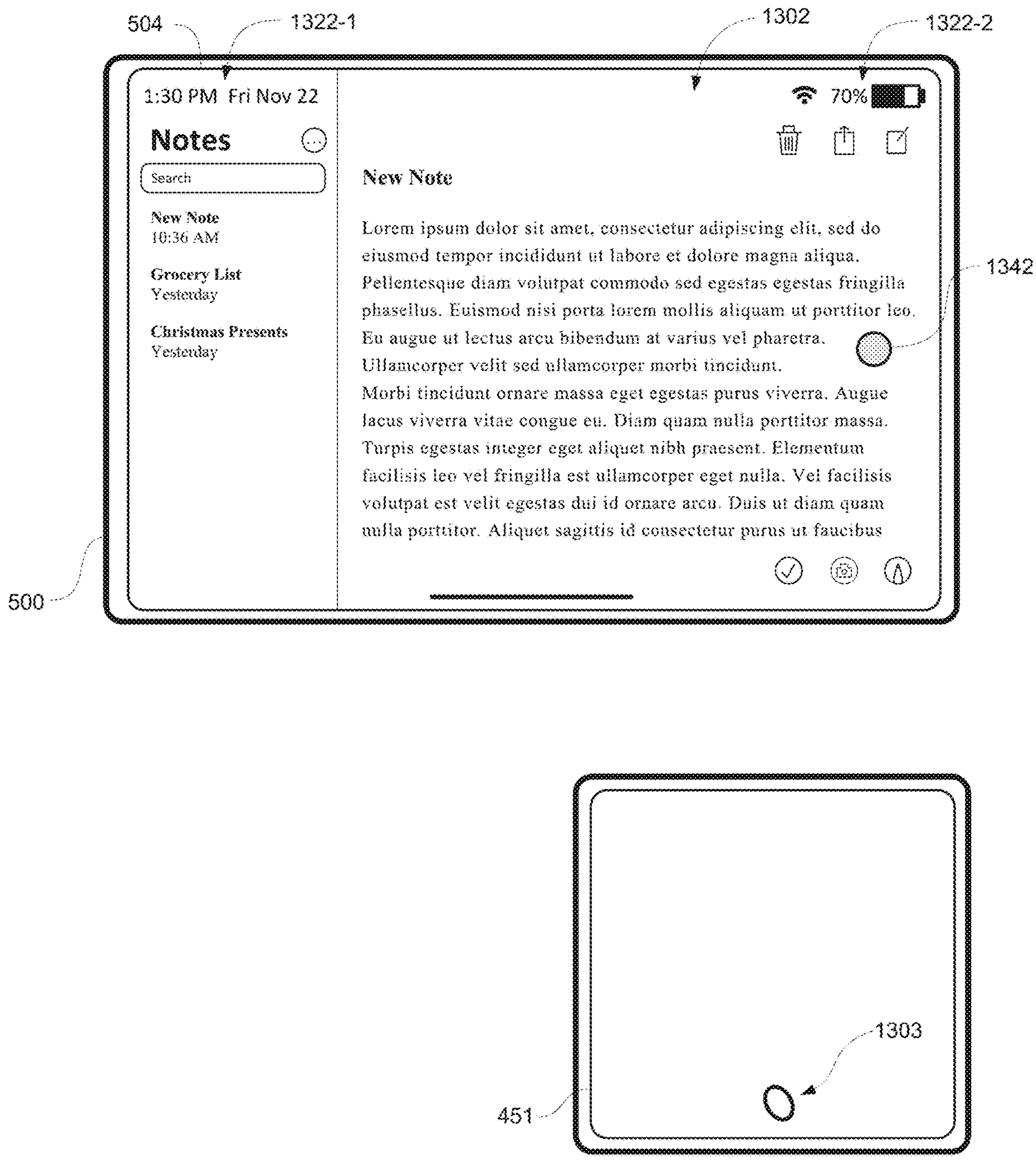
Figure 13O:
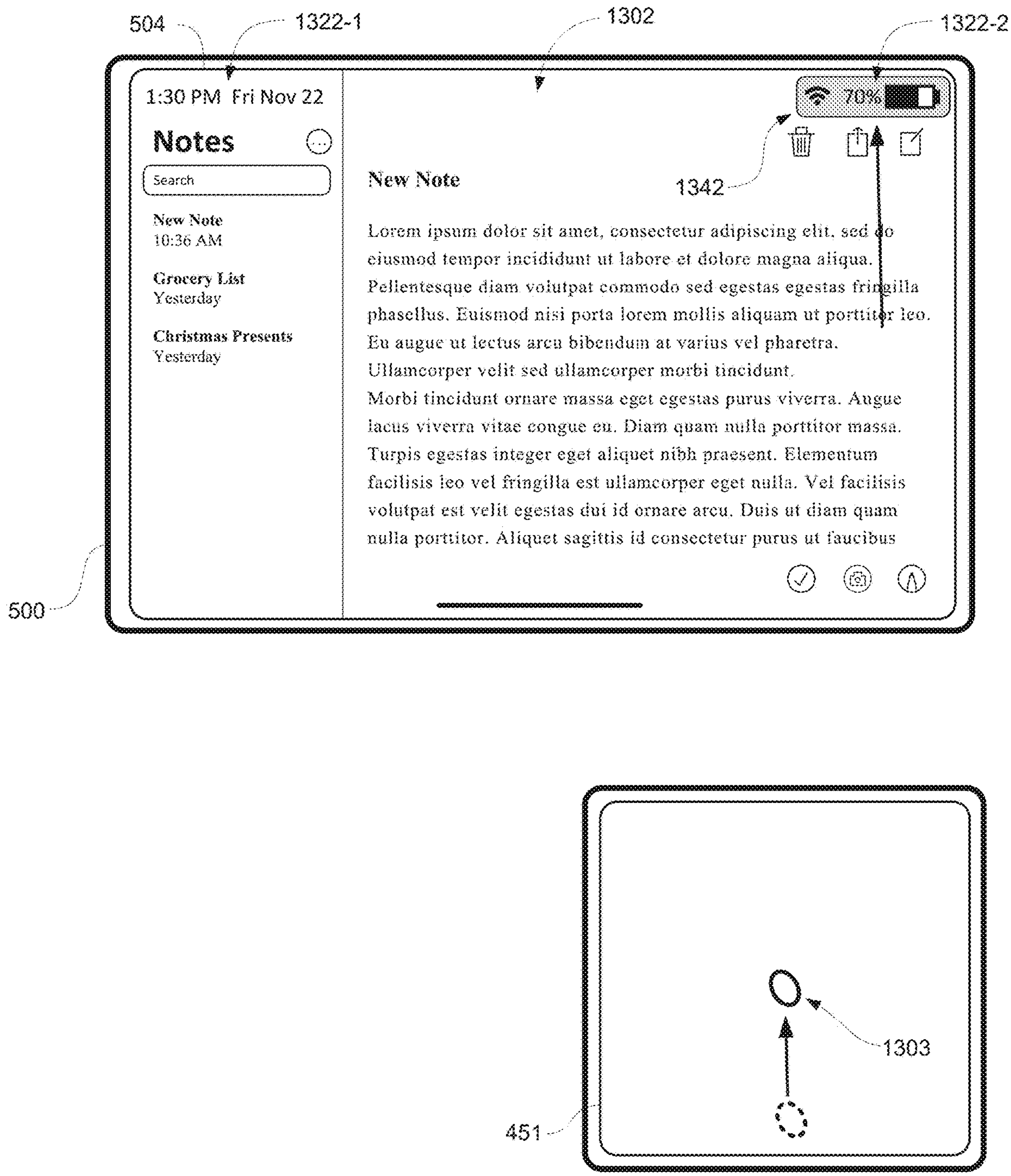
Figure 13P:
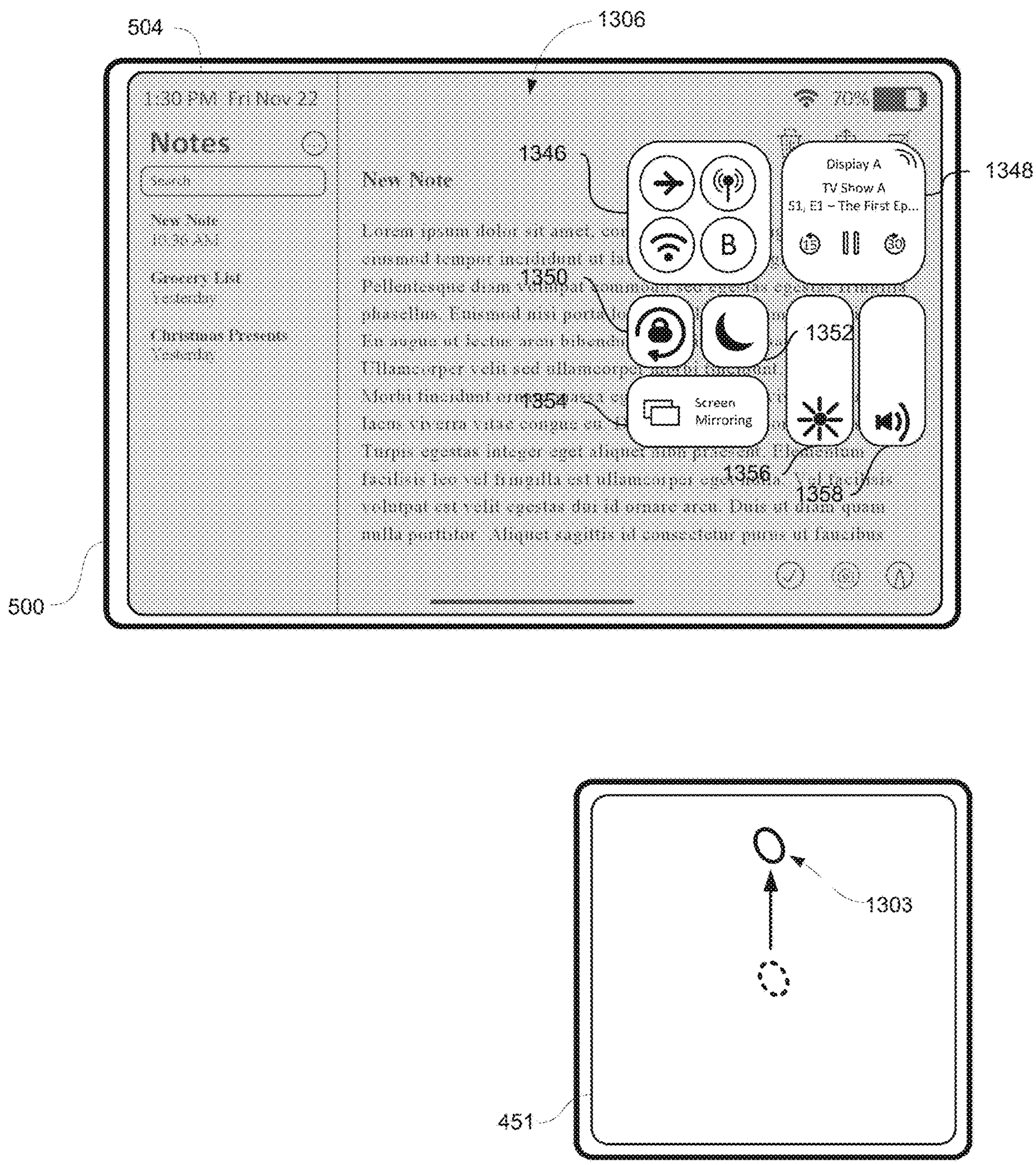
Figure 13Q:
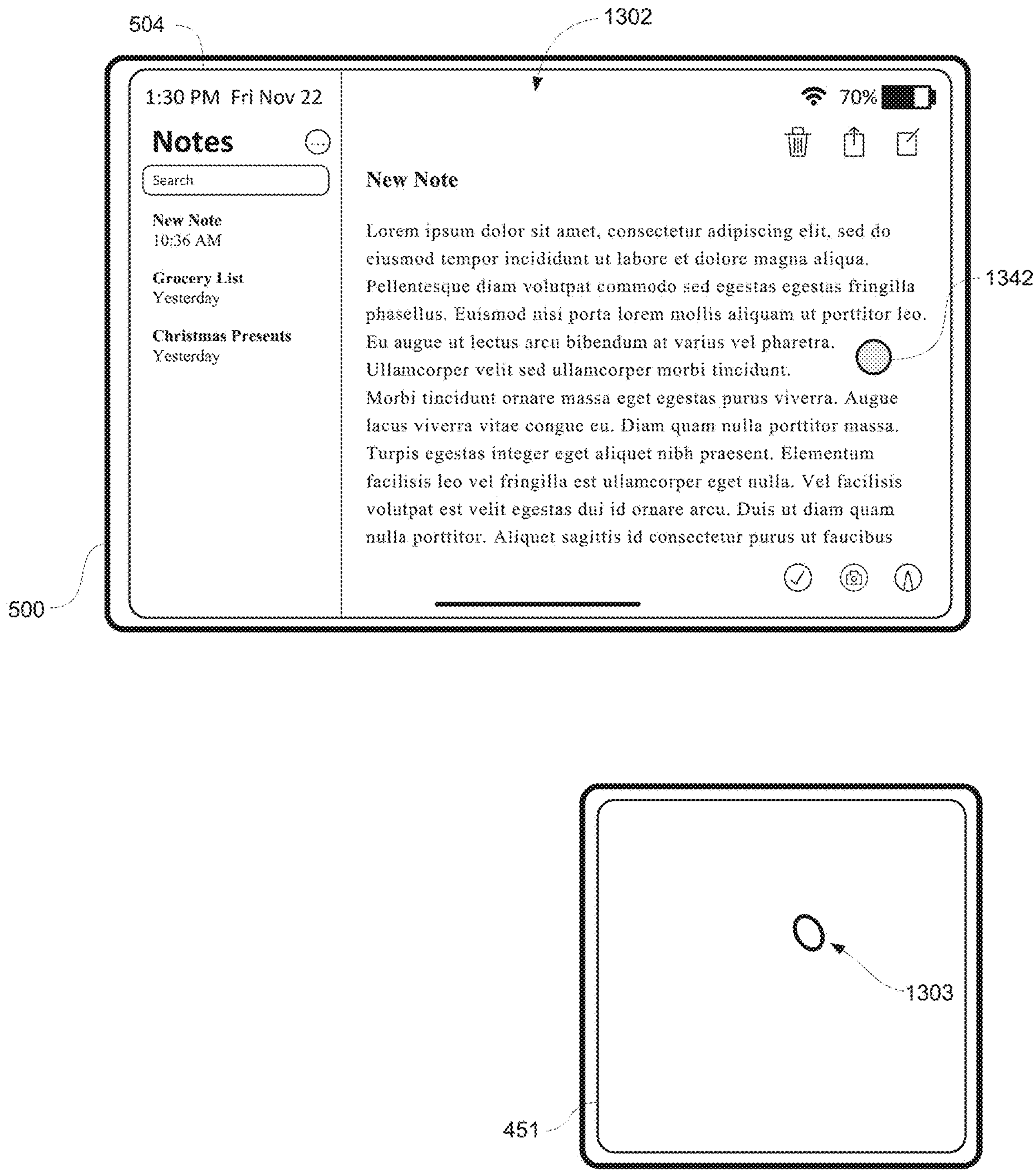
Figure 13R:
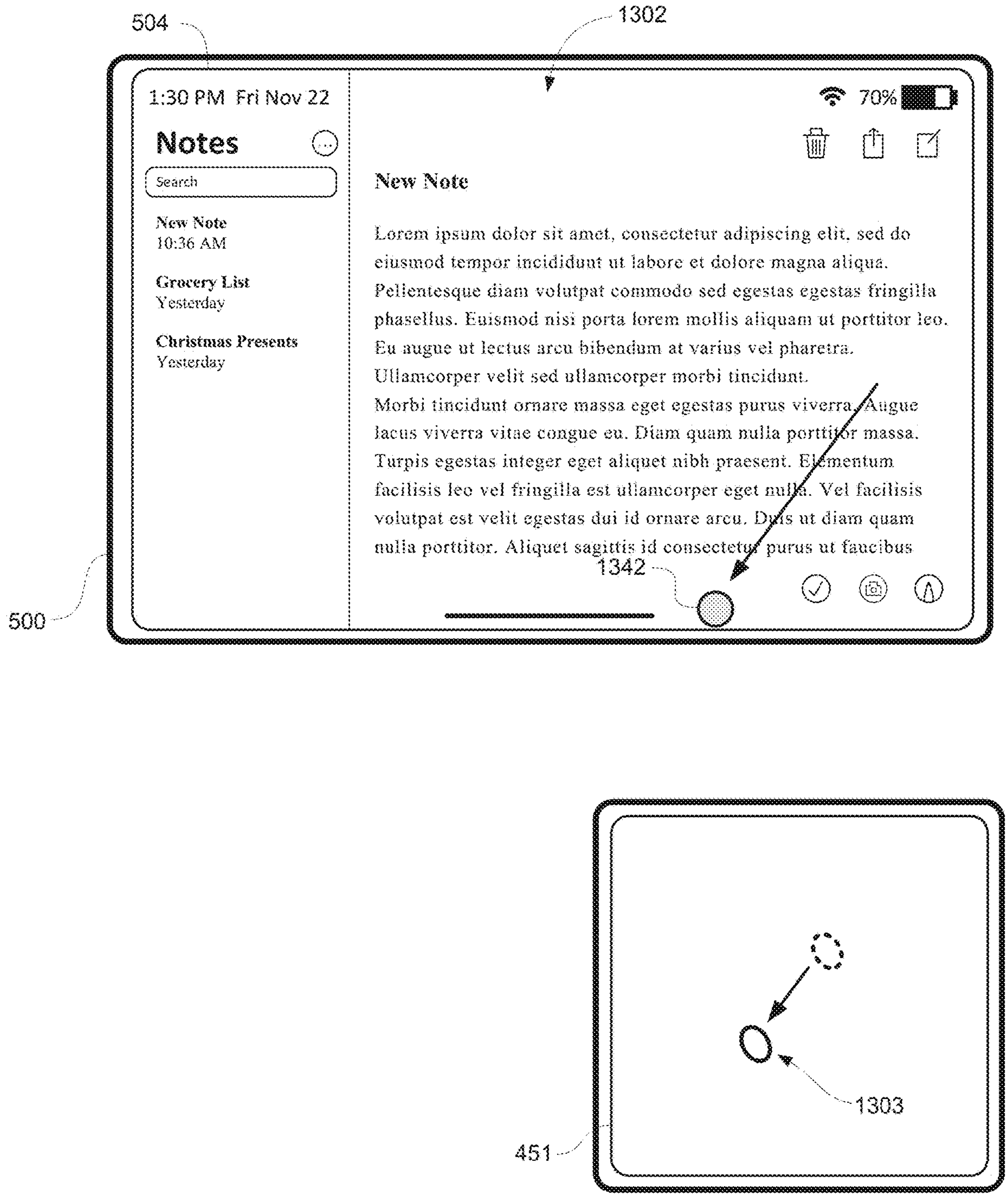
Figure 13S:
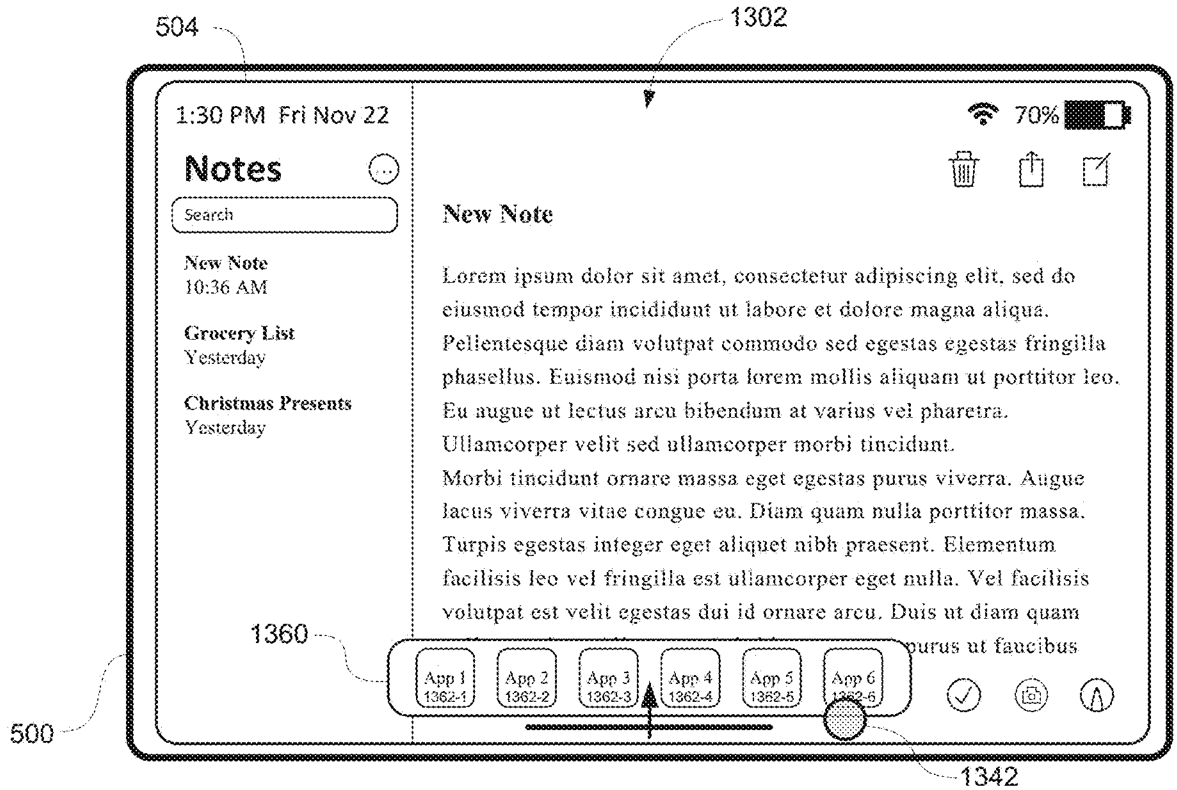
Figure 13S:
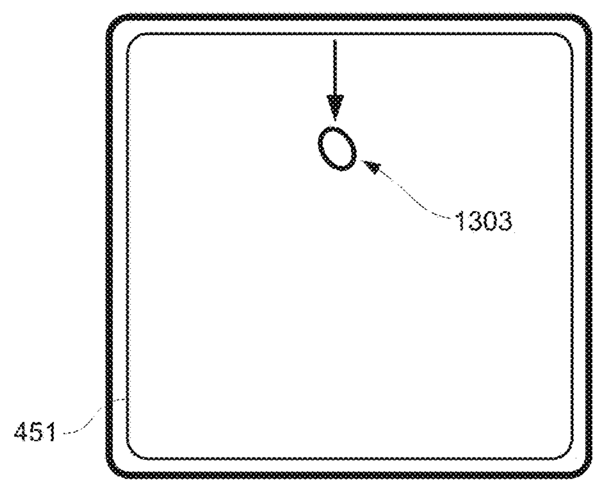

In some embodiments, the first user interface object is displayed at a first edge of the display area of the display generation component (1242), such as in FIG. 13S (e.g., at or near the bottom edge of the display area). In some embodiments, the second user input corresponds to a request to move the cursor beyond the first edge of the display area of the display generation component (1244), such as in FIG. 13S (e.g., the user input is a request to move the cursor to and beyond the bottom edge of the display area). In some embodiments, the first system user interface is the home screen user interface (1246), such as in FIG. 13U (e.g., in response to the request to move the cursor beyond the bottom edge of the display area, display the home screen user interface). In some embodiments, an upward swipe received on a touch-sensitive display starting from the bottom edge of the display causes display of the home screen user interface. Thus, in some embodiments, a movement of the cursor beyond the bottom edge causes the same result as a corresponding inward swipe on the touch-sensitive display from that edge, as will be described below with respect to method 1400.

The above-described manner of displaying the home screen user interface (e.g., in response to request to move the cursor to and beyond the bottom edge of the display) provides a quick and efficient alternative manner of displaying the home screen user interface (e.g., via a downward swipe gesture from a touch-sensitive surface), which simplifies the interaction between the user and the electronic device and enhances the operability of the electronic device and makes the user-device interface more efficient (e.g., without requiring the user to perform a selection input on the first user interface object or without requiring the user to switch to a different input device that accepts inward swipes from an edge of the display as a request other than a cursor movement request, such as a touch-sensitive display), which additionally reduces power usage and improves battery life of the electronic device by enabling the user to use the electronic device more quickly and efficiently.

In some embodiments, while displaying the respective user interface, receiving, via the one or more input devices, a second user input (1248), such as in FIG. 11H. In some embodiments, in response to receiving the second user input (1250), such as in FIG. 11H: in accordance with a determination that the second user input includes a request to move a cursor to a location of the first user interface object, the device selects (1252) the first user interface object for input, such as in FIG. 11H (e.g., the first user interface object is selected for input when and/or in response to the cursor moving to the location of the first user interface object as described above with respect to method 700).

In some embodiments, selecting the first user interface object for input includes visually adapting the cursor to the first user interface object as described above with respect to method 700 and/or method 800. In some embodiments, the cursor visually appears as if it is a single unit with the first user interface object. In some embodiments, the cursor visually appears as if it is highlighting the first user interface object. In some embodiments, the first user interface object is a horizontal bar and when the horizontal bar is selected for input, the horizontal bar appears as a larger and/or thicker horizontal bar (e.g., optionally the combination of the first user interface object and the cursor appears larger and/or thicker). In some embodiments, selecting the first user interface object includes highlighting the first user interface object or otherwise causing the first user interface object to have focus. In some embodiments, while the first user interface object is selected for input, certain inputs, such as selection inputs, are directed to the first user interface object. For example, while the first user interface object is selected for input, an "enter" key input from a keyboard causes the first user interface object to be activated. In some embodiments, when the horizontal bar is actuated (e.g., selected, activated, etc.), then the horizontal bar is compressed such that it is visually smaller and/or thinner (e.g., optionally the combination of the first user interface object and the cursor appears smaller and/or thinner). In some embodiments, the first user input directed to a portion of the respective user interface that includes the first user interface object is received after the second user input causes the first user interface object to be selected for input and while the first user interface object is selected for input.

The above-described manner of selecting the first user interface object for input (e.g., in response to request to move the cursor to the location of the first user interface object) provides a quick and efficient manner of displaying a home screen user interface or application switching user interface (e.g., by supporting selection of the first user interface object with a cursor), which simplifies the interaction between the user and the electronic device and enhances the operability of the electronic device and makes the user-device interface more efficient (e.g., without requiring the user to switch to a different input device to display the home user interface object or application switching user interface), which additionally reduces power usage and improves battery life of the electronic device by enabling the user to use the electronic device more quickly and efficiently.

In some embodiments, in response to receiving the first user input (1254), such as in FIG. 11B: in accordance with a determination that the first user input includes a tap input that is detected on a touch-sensitive display on which the respective user interface is displayed, at a location of the first user interface object, the device forgoes (1256) display of the home screen user interface and maintains display of the respective user interface, such as in FIG. 11C (e.g., the first user interface object is not selectable via a tap input on a touch-sensitive display to display the home screen user interface).

In some embodiments, the respective user interface is not dismissed and display of the respective user interface is maintained. In some embodiments, the first user interface object is not selectable via a tap input on a touch-sensitive display to display the application switching user interface. In some embodiments, the first user interface object is only interactable from the touch-sensitive display via a swipe gesture (e.g., horizontal, vertical, and/or a combination). Thus, in some embodiments, a user input on the touch-sensitive display that includes more than a tap input is required to actuate the home screen user interface to prevent the user from unintentionally dismissing the respective user interface while interacting with the respective user interface.

The above-described manner of preventing actuation of the first user interface object (e.g., by forgoing actuation of the first user interface object in response to a tap input on a touch-sensitive display directed to the first user interface object) provides a quick and efficient manner of preventing unintended actuations of the first user interface object, which simplifies the interaction between the user and the electronic device and enhances the operability of the electronic device and makes the user-device interface more efficient (e.g., by preventing a tap input from unintentionally dismissing the respective user interface and displaying the home screen user interface when the user is likely interacting with the respective user interface), which additionally reduces power usage and improves battery life of the electronic device by enabling the user to use the electronic device more quickly and efficiently.

In some embodiments, the respective user interface is a lock screen user interface (1258), such as in FIG. 11CC (e.g., or a wake screen user interface, such as a user interface displayed by the electronic device in response to waking from a low power or off state, such as in response to being picked up by a user or in response to detecting a button press on a power/sleep button of the electronic device). In some embodiments, the lock screen user interface includes one or more notifications associated with one or more applications or system processes.

Figure 13T:
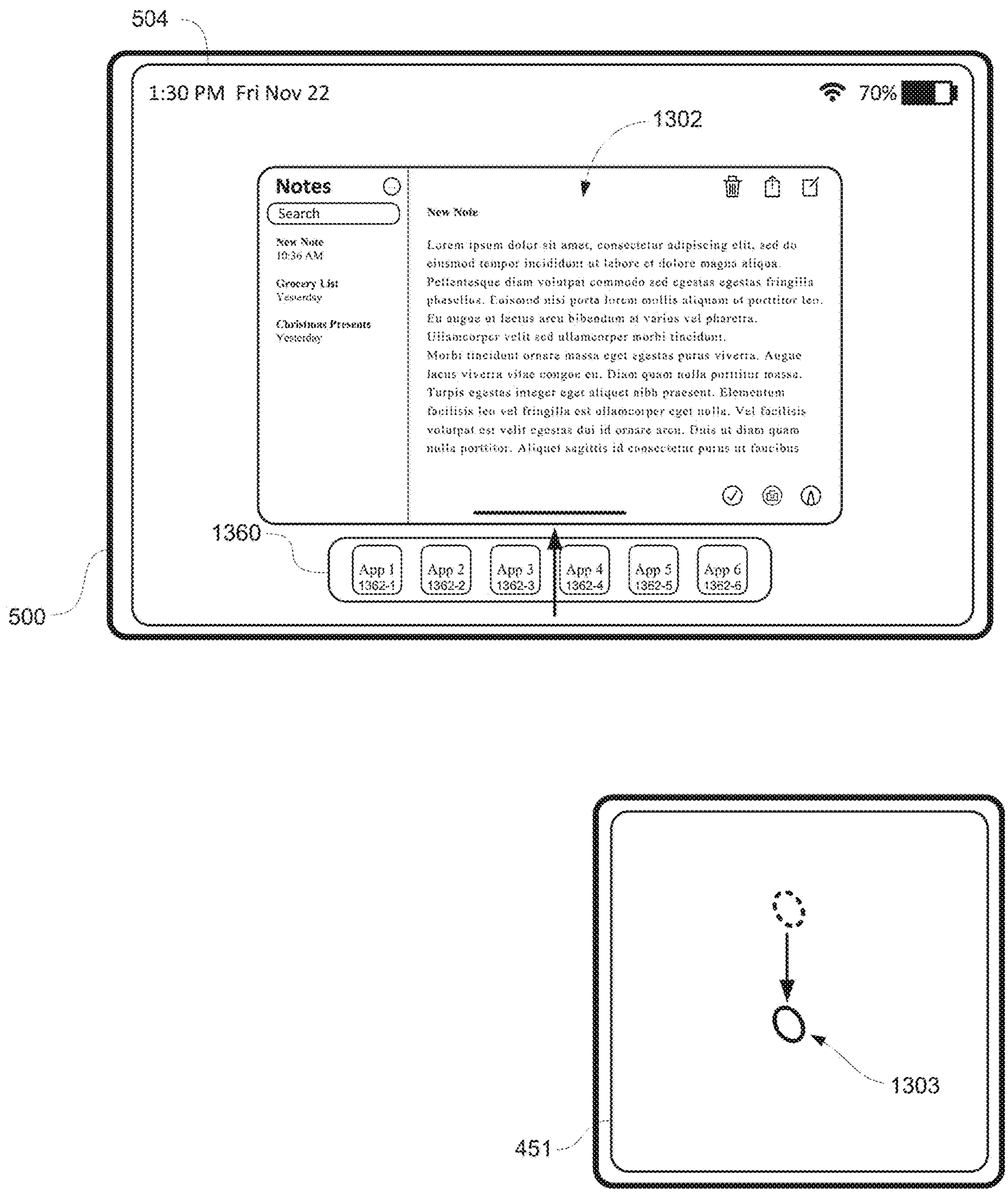
Figure 13U:
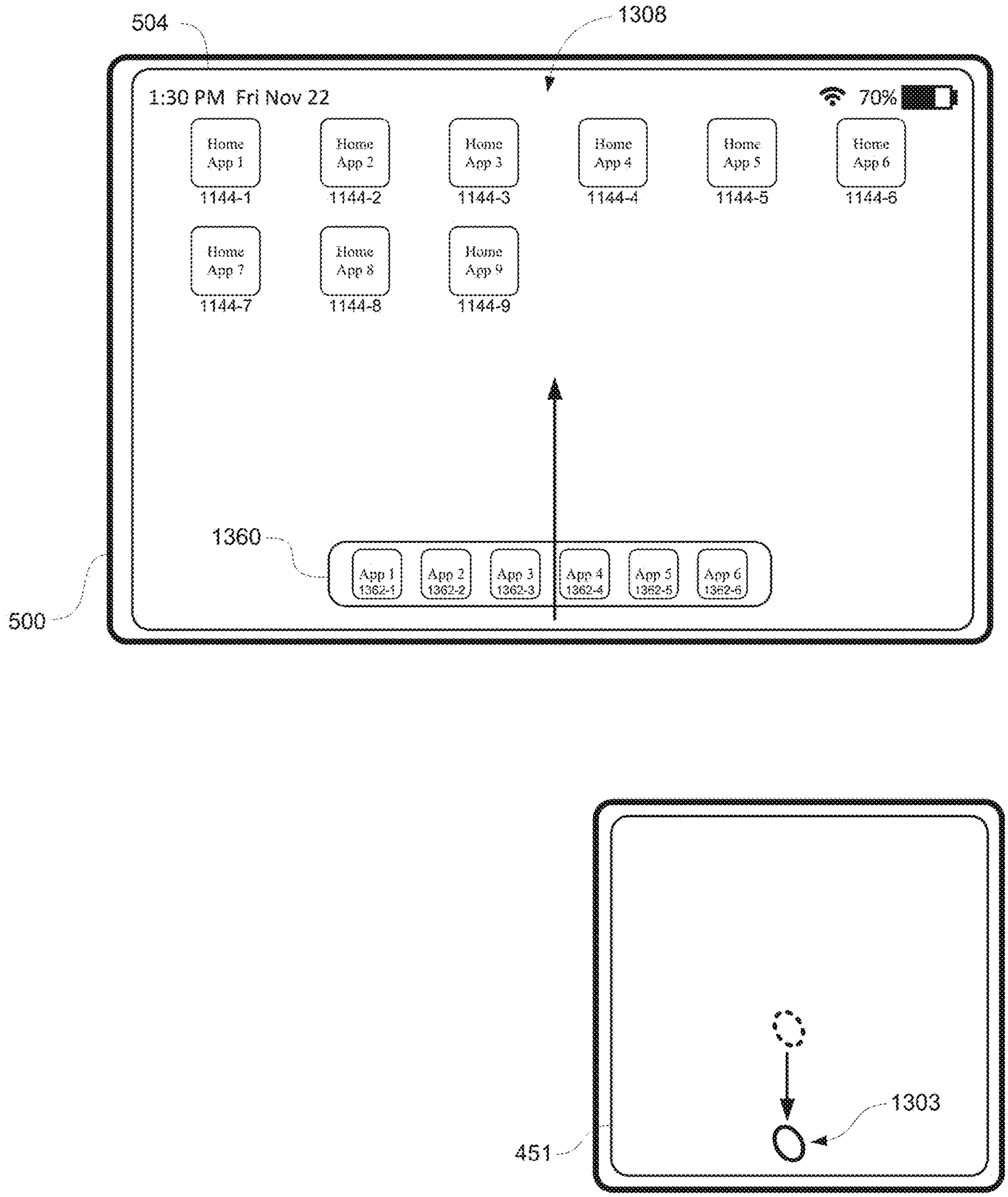

In some embodiments, in accordance with a determination that the first user input includes a swipe input that is detected at the input device that is remote from the first user interface object and meets second criteria, including a requirement that the first user input includes a request to move the cursor beyond a bottom edge of the display area of the display generation component, the device displays (1260), via the display generation component, the home screen user interface, such as in FIGS. 13S-13U (e.g., a swipe input corresponding to a request to move the cursor beyond the bottom edge of the display area received on a touch-sensitive surface other than a touch-sensitive display causes display of either the home screen user interface or the application switching user interface).

In some embodiments, if the input meets a second criteria, then the home screen user interface is displayed. For example, the second criteria include a home display criteria (the same or similar to the home display criteria described above), which, when satisfied, causes display of the home screen user interface. In some embodiments, the home display criteria are satisfied based on a combination of one or more of the direction, distance, and speed of the swipe input. For example, if the swipe gesture includes a downward movement farther than a threshold amount while the cursor is at the bottom edge of the display area, then the second criteria is satisfied and the home screen user interface is displayed. In some embodiments, if the second criteria are not satisfied, the home screen user interface is not displayed in response to a request to move the cursor beyond the bottom edge of the display area.

In some embodiments, in accordance with a determination that the first user input includes a plurality of swipe inputs that is detected at the input device that is remote from the first user interface object and meets third criteria, different from the second criteria, the device displays (1262), via the display generation component, the home screen user interface, such as in FIG. 11DD (e.g., a swipe input from a plurality of fingers (concurrently detected) causes display of the home screen user interface or the application switching user interface).

In some embodiments, if the input meets a third criteria, then the home screen user interface is displayed. For example, the third criteria include a home display criteria (the same or similar to the home display criteria described above), which, when satisfied, causes display of the home screen user interface. In some embodiments, the home display criteria are satisfied based on a combination of one or more of the direction, distance, and speed of the swipe input. For example, if the swipe gesture includes an upward movement farther than a threshold amount, then the third criteria is satisfied and the home screen user interface is displayed. In some embodiments, the third criteria do not require the input to be received at a particular area of the external touch-sensitive surface. For example, a three finger upward swipe received at any location on the touch-sensitive surface causes display of the home screen user interface. In some embodiments, if the third criteria are not satisfied, the home screen user interface is not displayed in response to a multi-finger swipe gesture.

The above-described manner of displaying the home screen user interface (e.g., in response to a downward swipe requesting to move the cursor beyond the bottom edge of the display area or a multi-finger upward swipe, via an input device remote from the first user interface object) provides quick and efficient methods of displaying the home screen user interface (e.g., by providing the user with two different methods of displaying the home screen user interface), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes a second user interface object (e.g., a status bar. In some embodiments, the status bar is at or near the top edge of the display area), separated from the first user interface object (1264), such as in FIG. 11A. In some embodiments, the status bar includes one or more status indicators that indicate the state of one or more processes of the system. For example, the status bar includes one or more of a time, date, network connectivity, volume, battery power, etc.

In some embodiments, while displaying the respective user interface including the second user interface object, the device receives (1266) a second user input, via the one or more input devices, directed to a portion of the respective user interface that includes the second user interface object, such as in FIG. 11BB (e.g., a selection input directed to the second user interface object such as a tap or click input on an external touch-sensitive surface while the second user interface object is selected for input as described above with respect to methods 700 and 800).

In some embodiments, in response to receiving the second user input (1268), such as in FIG. 11JJ: in accordance with a determination that the second user input is directed to a first portion of the second user interface object, the device displays (1270), via the display generation component, a control center user interface, such as in FIG. 11KK (e.g., in response to an input directed to the right portion of the status bar, displaying a control center or control panel (e.g., a controls user interface) on some or part of the display (and optionally not displaying the notification user interface). In some embodiments, the right portion of the status bar includes a battery level indicator, network connectivity indicator, and/or volume indicator. In some embodiments, the right portion of the status bar is selectable as a single selectable option (e.g., to cause display of the control center user interface). In some embodiments, the control panel is displayed overlaid over the content or user interface that was displayed before the control panel was displayed. In some embodiments, the control panel is displayed along one side of the display (e.g., right side, left side, top side, bottom side, etc.). In some embodiments, the control panel includes one or more selectable options for controlling one or more operations of the electronic device, a selectable option for controlling playback of media (e.g., music, videos, etc.) that is currently playing on the electronic device, a selectable option for controlling the audio and/or video output of the electronic device, etc. In some embodiments, the control panel displays the current date and time of the electronic device. In some embodiments, a tap input directed to the first portion of second user interface object received on a touch-sensitive display does not cause display of the control center user interface (optionally does not perform any functions or display any user interface). In some embodiments, an inward swipe, on the touch-sensitive display, from an edge at or near the location of the first portion of the second user interface object causes display of the control center user interface. In some embodiments, a swipe input, via the external touch-sensitive surface, corresponding to a request to move the cursor beyond the edge at or near the location of the first portion of the second user interface object causes display of the control center user interface as described below with respect to method 1200.

The above-described manner of displaying the control panel user interface (e.g., in response to a user input directed to a first portion of the status bar) provides a quick and efficient manner of providing a method of displaying the control panel user interface using a touch-sensitive surface (e.g., by accepting selection inputs from a touch-sensitive surface to display the control panel user interface where an inward swipe input from the first portion of the second user interface object causes movement of the cursor), which simplifies the interaction between the user and the electronic device and enhances the operability of the electronic device and makes the user-device interface more efficient (e.g., without requiring the user to switch to using a touch-sensitive display to perform an inward swipe input to display the control center user interface), which additionally reduces power usage and improves battery life of the electronic device by enabling the user to use the electronic device more quickly and efficiently.

In some embodiments, in response to receiving the second user input (1272), such as in FIG. 11BB: in accordance with a determination that the second user input is directed to a second portion of the second user interface object, different from the first portion, the device displays (1274), via the display generation component, a notification user interface, such as in FIG. 11CC (e.g., in response to an input directed to the left portion of the status bar, displaying a notification user interface (or a wake screen user interface) on some or all of the display area (and optionally not displaying the control center user interface).

In some embodiments, the left portion of the status bar includes a time and/or date indicator. In some embodiments, the left portion of the status bar is selectable as a single selectable option to cause display of the notification user interface or a wake screen user interface, such as a user interface displayed by the electronic device in response to waking from a low power or off state, such as in response to being picked up by a user or in response to detecting a button press on a power/sleep button of the electronic device. In some embodiments, the notification user interface includes one or more notifications associated with one or more applications or system processes. In some embodiments, a tap input directed to the second portion of the second user interface object received on a touch-sensitive display does not cause display of the notification user interface (optionally does not perform any functions or display any user interface). In some embodiments, an inward swipe, on the touch-sensitive display, from an edge at or near the location of the second portion of the second user interface object causes display of the notification user interface. In some embodiments, a swipe input, via the external touch-sensitive surface, corresponding to a request to move the cursor beyond the edge at or near the location of the second portion of the second user interface object causes display of the notification user interface as described below with respect to method 1200.

The above-described manner of displaying the notification user interface (e.g., in response to a user input directed to a second portion of the status bar) provides a quick and efficient manner of providing a method of displaying the notification user interface using a touch-sensitive surface (e.g., by accepting selection inputs from a touch-sensitive surface to display the notification user interface where an inward swipe input from the second portion of the second user interface object causes movement of the cursor), which simplifies the interaction between the user and the electronic device and enhances the operability of the electronic device and makes the user-device interface more efficient (e.g., without requiring the user switch to using a touch-sensitive display to perform an inward swipe input to display the notification user interface), which additionally reduces power usage and improves battery life of the electronic device by enabling the user to use the electronic device more quickly and efficiently.

It should be understood that the particular order in which the operations in FIGS. 12A-12G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 1000, and 1400) are also applicable in an analogous manner to method 1200 described above with respect to FIGS. 12A-12G. For example, the dismissing or switching of applications using a cursor described above with reference to method 1200 optionally has one or more of the characteristics of selectively displaying a cursor in a user interface, the interaction of the cursor with user interface objects, the displaying of a cursor while manipulating objects in the user interface, and ways an electronic device displays user interface elements in response to requests to move a cursor beyond an edge of the display, etc., described herein with reference to other methods described herein (e.g., methods 700, 800, 1000, and 1400). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 12A-12G are, optionally, implemented by components depicted in FIGS. 1A-1B. For example, displaying operations 1202, 1208, 1210, 1216, 1220, 1224, 1228, 1230, 1240, 1260, 1262, 1270, and 1274, and receiving operations 1204, 1234, and 1266 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying User Interfaces in Response to Cursor Movements

Users interact with electronic devices in many different manners, including using edge swipe gestures on a touch screen to cause an electronic device to display various user interface elements. In some embodiments, an electronic device receives inputs from a touch sensitive display (e.g., touch screen) and from input devices other than the touch sensitive display (e.g., external trackpad, mouse, keyboard, etc.). In some embodiments, in response to an edge swipe gesture detected at the touch sensitive display, the electronic device displays a user interface element corresponding to the location at which the edge swipe gesture was detected. The embodiments described below provide ways in which an electronic device displays user interface elements in response to user inputs—received at input devices other than a touch screen—that correspond to a request to move a cursor beyond the edge of the touch screen. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 13A-13AAA illustrate exemplary ways of displaying user interface elements in response to user inputs corresponding to requests to move the cursor beyond the edge of a touch screen according to some embodiments of the disclosure. The embodiments in these figures are used to illustrate the processes described below, including the processes described with reference to FIGS. 14A-14I.

FIG. 13A illustrates an exemplary device that is capable of displaying a user interface. In some embodiments, the user interface is displayed via a display generation component such as a touch screen display, a monitor, a television, a projector, an integrated or external display device, or any other suitable display device. As shown in FIG. 13A, the electronic device 500 presents user interface 1302 on touch screen 504. In some embodiments, user interface 1302 is any user interface with one or more interactable user interface objects. An interactable user interface object is any object or element that a user is able to select, move, click, drag, highlight, insert text into, or otherwise interact with in any way. In FIG. 13A, user interface 1302 is of a note taking application. In some embodiments, the note taking application includes a first section 1320-1 corresponding to a note browsing and selection sidebar and a second section 1320-2 corresponding to a content viewing and entry interface. In some embodiments, first section 1320-1 includes a contextual menu button 1324, a search field 1326, and one or more saved notes 1328-1 to 1328-3. In some embodiments, second section 1320-2 includes content viewing and entry region 1334, one or more buttons 1330-1 to 1330-6 for performing one or more functions associated with the note taking application, such as deleting the note, sharing the note, inserting photos, changing writing modes, etc. In some embodiments, user interface 1302 includes status indicator 1322-1 and 1322-2. Status indicator 1322-1 optionally is located at the top left of the user interface and displays the current time and date. Status indicator 1322-2 optionally is located at the top-right of the user interface and displays the network connectivity status of the device and/or the battery status of the device. It is understood that status indicators 1322-1 and 1322-2 optionally include fewer indicators than those shown or more indicators than those shown. In some embodiments, user interface 1302 includes home affordance 1336 for dismissing the currently displayed application and displaying either a home screen user interface or an application switching user interface as described in more detail above with respect to method 1200.

In FIG. 13A, electronic device 500 is in communication with external keyboard 593 (such as in FIG. 6A) and external touch-sensitive surface 451. In some embodiments, electronic device 500 is in wired or wireless communication with external keyboard 593 and external touch-sensitive surface 451. In some embodiments, electronic device 500 is in communication with more or fewer input devices, either integrated with electronic device 500 or external to the device.

FIGS. 13B-13N illustrate ways in which an electronic device 500 displays a notifications user interface in response to an edge swipe gesture or an input corresponding to a request to move the cursor beyond an edge of the display. As shown in FIG. 13B, the user touches the touch screen 504 at a location at (or beyond) the top edge of the touch screen 504 that is to the left of the center of the touch screen 504 with hand 1338 (e.g., with a finger of hand 1338). In some embodiments, the electronic device 500 detects one or more contacts of the hand 1338 on the touch screen 504, enabling the user to control the electronic device 500 using touch gestures.

As shown in FIG. 13C, the user swipes down while the hand 1338 remains in contact with the touch screen 504. In response to detecting the swipe gesture starting from a location along the top edge of the touch screen 504 (e.g., at or near the edge of the touch screen 504) to the left of the center of the touch screen 504 and moving down, the electronic device 500 begins to display a notification user interface 1304. The electronic device 500 gradually displays the notification user interface 1304 as the user continues the swipe gesture on the touch screen 504 with hand 1338. As shown in FIG. 13C, the bottom of the notification user interface 1304 is displayed at the current position of the contact of the hand 1338 on the touch screen 504. In some embodiments, once the swipe gesture exceeds a distance and/or speed threshold, the notification user interface 1304 is displayed in a full-screen view, such as the view of the notification user interface 1304 illustrated in FIG. 13J. In some embodiments, if the hand 1338 lifts off from the touch screen 504 before the swipe exceeds the distance and/or speed threshold, the electronic device 500 ceases to display the notification user interface 1304.

FIG. 13D illustrates the user interface 1302 of the note taking application again. The note taking application user interface 1302 is optionally displayed after the electronic device 500 ceases displaying the notification user interface 1304 illustrated in FIG. 13C. As shown in FIG. 13D, the user interface 1302 includes a cursor 1342. The position of the cursor is controlled using the external touch-sensitive surface 451 in communication with the electronic device 500. In some embodiments, the cursor 1342 is displayed in response to detecting contact 1303 (e.g., of a user's finger, a stylus, or another object) on the external touch-sensitive surface 451. The user is able to move the cursor 1342 by moving contact 1303 on the external touch-sensitive surface 451 (e.g., movement and interaction of cursor 1342 with the user interface is described above with respect to methods 700 and 800).

As shown in FIG. 13E, in response to movement of contact 1303 on the external touch-sensitive surface 451, the electronic device 500 displays movement of cursor 1342 in accordance with the movement of the contact 1303. In response to the movement of the contact 1303 that is upward and to the right, the cursor 1342 moves upward and to the right on the touch screen 504. As shown in FIG. 13E, in response to the movement of the contact 1303 on the touch screen 504, the electronic device 500 displays the cursor at the top edge of the touch screen 504 at a location that is to the left of the center of the touch screen (e.g., the same region in which hand 1338 was detected in FIG. 13B).

Although the electronic device 500 displays the notification user interface 1304 illustrated in FIG. 13C in response to detecting a downward swipe from the top edge of the touch screen 504 from a location to the left of the center of the touch screen as shown in FIGS. 13B-13C, the electronic device 500 optionally does not display the notification user interface 1304 in response to detecting a downward movement of a contact (e.g., contact 1303) on the external touch-sensitive surface 451 while displaying the cursor 1342 at a location along the top edge of the touch screen 504 that is to the left of the center of the touch screen 504. Rather, as shown in FIG. 13F, in response to detecting movement of contact 1303, which is a downward swipe detected while the cursor 1342 is displayed at the location illustrated in FIG. 13E, the electronic device 500 moves the cursor 1342 away from the edge of the touch screen 504 in accordance with the movement of the contact 1303 without displaying the notifications user interface 1304. In this way, the user is able to move the cursor 1342 away from the edge of the touch screen 504 in a manner similar to the way the user is able to control the location of the cursor 1342 when the cursor is displayed at other locations in the user interface (e.g., see FIG. 13E).

As will be described below with reference to FIGS. 13G-13J, the electronic device 500 optionally displays the notification user interface 1304 in response to detecting an upward movement of contact 1303 while the cursor 1342 is displayed at the top edge of the touch screen 504 at a location to the left of the center of the touch screen 504. In FIG. 13G, the electronic device 500 detects an upward movement of contact 1303 on the external touch-sensitive surface 451. In response to the movement of the contact 1303, the electronic device 500 moves the cursor 1342 upwards. As shown in FIG. 13G, after moving the cursor 1342, the electronic device 500 displays the cursor 1342 at the top edge of the touch screen 504 at a location that is to the left of the center of the touch screen.

While the cursor 1342 is displayed at the location illustrated in FIG. 13G, the electronic device 500 detects the movement of contact 1303 on external touch-sensitive surface 451 illustrated in FIG. 13H. As shown in FIG. 13H, in response to an upward swipe (e.g., with contact 1303) detected on external touch-sensitive surface 451 while the cursor was displayed at the edge of the touch screen 504 as shown in FIG. 13G, the electronic device 500 begins to display the notification user interface 1304. As shown in FIG. 13I, as the user continues to swipe up (e.g., with contact 1303 on external touch-sensitive surface 451), the electronic device 500 displays a larger portion of the notification user interface 1304. Thus, in some embodiments, the size of the portion of the notification user interface 1304 that is displayed is proportionate to the length and/or duration of the swipe input detected by external touch-sensitive surface 451 (e.g., by detecting movement of contact 1303).

After detecting the swipe input illustrated in FIGS. 13G-13I, in response to detecting liftoff of contact 1303 from external touch-sensitive surface 451, the electronic device 500 displays the notification user interface 1304 in a full-screen view, as shown in FIG. 13J. Thus, upward movement of contact 1303 on external touch-sensitive surface 451 is optionally treated analogously to downward movement of a contact from hand 1338 on touch screen 504.

The notification user interface 1304 will now be described. The notification user interface 1304 includes indications 1340-1 and 1340-2 of notifications received or generated at the electronic device 500. One of the indications 1340-1 represents a message received from a user account associated with a user other than the user of the electronic device 500. One of the indications 1340-2 represents an event generated by an application accessible to the electronic device 500. The notification user interface 1304 also includes the indication of the wireless network connection of the electronic device 500 and battery level of the electronic device 500 and an indication of the current date and time. Moreover, the notification user interface 1304 includes a visual indication that the electronic device 500 is "unlocked" (e.g., valid authentication credentials (e.g., a password, passcode, biometric data or an image of a face of the user) have been provided to the electronic device 500), thus enabling the user to access applications on the electronic device 500. In some embodiments, the electronic device 500 displays the notification user interface 1304 when the electronic device 500 is locked. When the electronic device 500 is locked, the notification user interface 1304 optionally includes a visual indication that the electronic device 500 is locked and the electronic device 500 optionally prevents the user from accessing applications with the electronic device 500.

In some embodiments, while displaying the notification user interface 1304 illustrated in FIG. 13J, in response to detecting an edge swipe gesture on the touch screen 504 from the bottom edge of the touch screen 504 towards the center of the touch screen 504, the electronic device 500 ceases displaying the notification user interface 1304. After ceasing to display the notification user interface 1304, the electronic device 500 optionally displays the user interface that was displayed immediately prior to displaying the notification user interface 1304, such as the user interface 1302 of the note taking application illustrated in FIG. 13G. The electronic device 500 is also optionally able to cease displaying the notification user interface 1304 in response to input provided at the external touch-sensitive surface 451, as will be described below with reference to FIGS. 13K-13N.

As shown in FIG. 13K, the user makes contact 1303 with the external touch-sensitive surface 451. In response to detecting contact 1303 on external touch-sensitive surface 451, the electronic device 500 displays cursor 1342 in the user interface 1304. In FIG. 13L, the user swipes down (e.g., with contact 1303 on external touch-sensitive surface 451). In response to the swipe detected at the external touch-sensitive surface 451, the electronic device 500 moves the cursor 1342 to the location illustrated in FIG. 13L.

As shown in FIG. 13L, the cursor 1342 is displayed at the bottom edge of the touch screen 504 (e.g., anywhere at the bottom edge of the touch screen, or optionally within a threshold distance of the center of the bottom edge of the touch screen). In FIG. 13M, the user swipes down (e.g., with contact 1303 on external touch-sensitive surface 451) again while the cursor 1342 is displayed at the location illustrated in FIG. 13L.

As shown in FIG. 13M, in response to detecting the swipe input with external touch-sensitive surface 451, the electronic device 500 begins to cease to display the notification user interface 1304 by animating the notification user interface 1304 sliding off of the top edge of the touch screen 504. In some embodiments, the electronic device 500 gradually animates the notification user interface 1304 sliding off of the display area by an amount proportionate to the movement of contact 1303, in a manner similar to the way in which the electronic device 500 displays the notifications user interface 1304 described above with reference to FIGS. 13H-13I. As shown in FIG. 13N, after ceasing to display the notification user interface 1304, the electronic device 500 resumes displaying the note taking application user interface 1302. Thus, FIGS. 13B-13N illustrate ways in which an electronic device 500 controls the display of a notifications user interface in response to an edge swipe gesture or an input corresponding to a request to move the cursor beyond an edge of the display In some embodiments, the electronic device 500 displays a controls user interface in response to detecting an edge swipe gesture starting from the right side of the top edge of the touch screen 504 and moving downward. The electronic device 500 optionally also displays the controls user interface in response to an input detected at external touch-sensitive surface 451 that corresponds to a request to move the cursor beyond the edge of the touch screen 504 from a location on the right side of the top edge of the touch screen 504. FIGS. 13N-13Q illustrate ways in which an electronic device displays a controls user interface in response to an input corresponding to a request to move the cursor 1342 beyond an edge of the display 504.

In FIG. 13N, in response to detecting contact 1303 on external touch-sensitive surface 451, the electronic device 500 displays cursor 1342. As shown in FIG. 13O, the user swipes (e.g., with contact 1303 on external touch-sensitive surface 451) up. In response to the swipe detected by the external touch-sensitive surface 451, the electronic device 500 displays the cursor 1342 at the location shown in FIG.

13O. Cursor 1342 is located on the right side of the top edge of the touch screen 504 and is displayed with a size and shape that indicates selection of the indications 1322-2 of the current time and the current battery level of electronic device 500 (e.g., such as described above with respect to method 1200).

As shown in FIG. 13P, the user swipes up (e.g., with contact 1303 on external touch-sensitive surface 451) again. In response to detecting the swipe while displaying the cursor 1342 at the location illustrated in FIG. 13O, the electronic device 500 displays the controls user interface 1306 illustrated in FIG. 13P. As shown in FIG. 13P, the controls user interface 1306 is displayed overlaid on the user interface of the note taking application.

The controls user interface 1306 includes a number of selectable options 1346-1358 that, when selected, cause the electronic device 500 to perform various functions. In response to detecting selection of one of the icons of the communication option 1346, the electronic device 500 toggles the connection state of various network connections of the electronic device 500 (e.g., cellular data connection, Wi-Fi connection, Bluetooth connection) and/or displays a settings user interface for changing one or more settings associated with one or more of the network connections. In response to detecting selection of one of the icons of the media option 1348, the electronic device 500 performs a function to control playback of media content playing on electronic device 500 (e.g., skip ahead, skip back, play/pause) and/or display a user interface with additional options for controlling playback of the media content. In response to detecting selection of the screen rotation lock option 1350, the electronic device 500 toggles a setting that enables the electronic device 500 to rotate a user interface displayed on touch screen 504 in response to detecting rotation of display 504. In response to detecting selection of the Do Not Disturb option 1352, the electronic device 500 toggles a Do Not Disturb mode during which notifications are silenced on the electronic device 500. In response to detecting selection of the screen mirroring option 1354, the electronic device initiates a process to mirror the image displayed on display 504 to another display generation component in communication with electronic device 500. In response to detecting selection of the brightness option 1356, the electronic device 500 changes the brightness of display 504 and/or displays a user interface for controlling the brightness of display 504. In response to detecting selection of the sound option 1358, the electronic device 500 optionally changes the volume of audio content currently playing on a speaker in communication with the electronic device 500 and/or displays one or more options for changing audio settings of the electronic device 500.

In some embodiments, the cursor 1342 continues to be displayed when the control center user interface 1306 is displayed. For example, the cursor 1342 is displayed at the top edge of the display 504, the cursor 1342 is not displayed initially, but moves from the top edge of the display 504 in response to further input detected at external touch-sensitive surface 451, or changes size, shape, and location to indicate selection of one of the selectable options 1346-1358 of the controls user interface 1306 (e.g., such as described above with respect to methods 700 and 800).

As shown in FIG. 13P, the user performs a swipe (e.g., with contact 1303) up on external touch-sensitive surface 451. In response to the swipe illustrated in FIG. 13P (or in response to a different input, such as a swipe down detected on touch-sensitive surface 451, or a tap or swipe up detected directly on touch screen 504), the electronic device 500 ceases displaying the controls user interface and resumes displaying the user interface 1302 of the note taking application, as shown in FIG. 13Q.

Thus, FIGS. 13N-13Q illustrate ways in which an electronic device displays a controls user interface in response to an input corresponding to a request to move the cursor 1342 beyond an edge of the display 504.

In some embodiments, in response to detecting an edge swipe gesture starting from the bottom of touch screen 504 and moving up that has a speed and/or distance less than a predetermined threshold, the electronic device 500 displays a dock. The electronic device 500 optionally also displays the dock in response to an input received at the external touch-sensitive surface 451 that corresponds to a request to move the cursor 1342 beyond the bottom edge of display 504. FIGS. 13Q-13Y illustrate ways in which the electronic device 500 displays the dock in response to an input corresponding to a request to move the cursor 1342 beyond the bottom edge of display 504.

In FIG. 13Q, the user makes contact 1303 with the external touch-sensitive surface 451. In response to detecting contact 1303 on the external touch-sensitive surface 451, the electronic device 500 displays cursor 1342 in the user interface 1302. In FIG. 13R, the user performs a swipe (e.g., with contact 1303 on external touch-sensitive surface 451) to move cursor 1342 to a location along the bottom edge of the touch screen 504.

In FIG. 13S, the user performs a downward swipe (e.g., with contact 1303 on external touch-sensitive surface 451) while the cursor 1342 is displayed at the bottom of the touch screen 504, as shown in FIG. 13R. The downward swipe meets one or more speed and/or distance criteria associated with display of dock 1360 (e.g., in some embodiments, also including a criterion that the cursor 1342 is within a threshold distance of the center of the bottom edge of touch screen 504). As shown in FIG. 13S, in response to detecting the swipe (e.g., of contact 1303) on external touch-sensitive surface 451, the electronic device 500 displays a dock 1360 overlaid along the bottom of user interface 1302. The dock 1360 includes a collection of selectable icons associated with applications accessible to the electronic device 500. In response to detecting selection of one of the icons in the dock 1360, the electronic device 500 displays a user interface of the application corresponding to the selected icon. In some embodiments, the electronic device 500 displays the dock 1360 by displaying an animation of the dock 1360 sliding onto the display area of display 504 from the bottom edge of the display 504.

In FIG. 13T, the user continues to swipe down (e.g., with contact 1303 on external touch-sensitive surface 451). The continuation of the downward swipe meets one or more speed and/or or distance criteria associated with display of a home screen user interface. In response to detecting the swipe gesture illustrated in FIG. 13T, the electronic device 500 displays an animation of the user interface 1302 of the note taking application shrinking in accordance with the movement of contact 1303 on the external touch-sensitive surface 451. As the user continues to swipe down, the user interface 1302 is displayed at a smaller size. If, instead of satisfying the criteria for displaying the home screen user interface, the swipe gesture satisfies one or more criteria for displaying an application switching user interface, the electronic device 500 instead displays the application switching user interface described above with reference to FIGS. 11O-11Q.

In FIG. 13U, the user continues to swipe down (e.g., with contact 1303 on external touch-sensitive surface 451). The continuation of the swipe meets one or more speed and/or distance criteria associated with display of a home screen user interface 1308. As shown in FIG. 13U, in response to detecting the continuation of the swipe, the electronic device 500 displays the home screen user interface 1308. The home screen user interface includes a plurality of icons 1144 associated with applications accessible to the electronic device 500 and the dock 1360, which includes a plurality of icons 1362. The icons 1144 and 1362 are selectable to display respective user interfaces of the application associated with the selected icon 1144 or 1362.

Figure 13V:
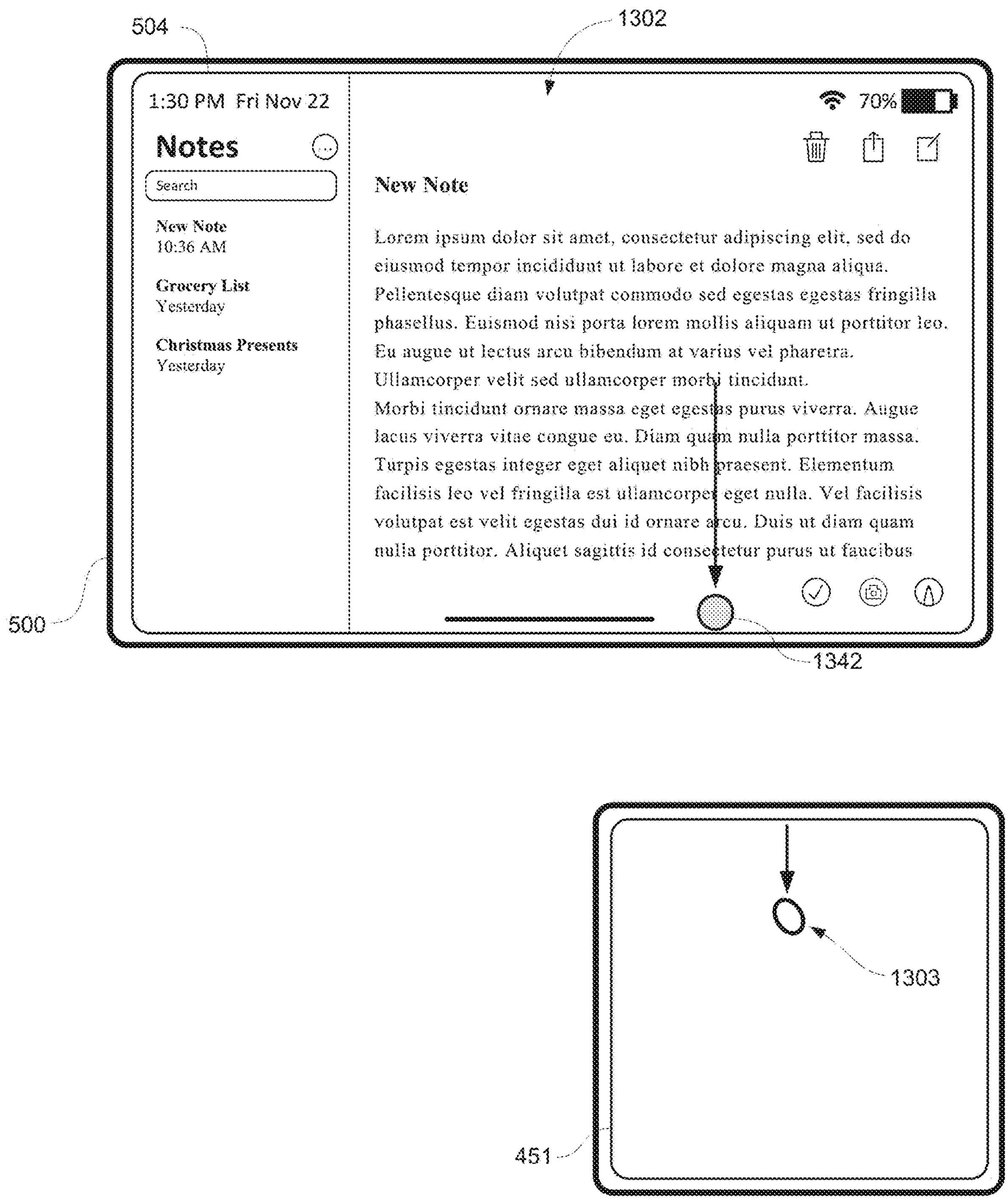
Figure 13W:
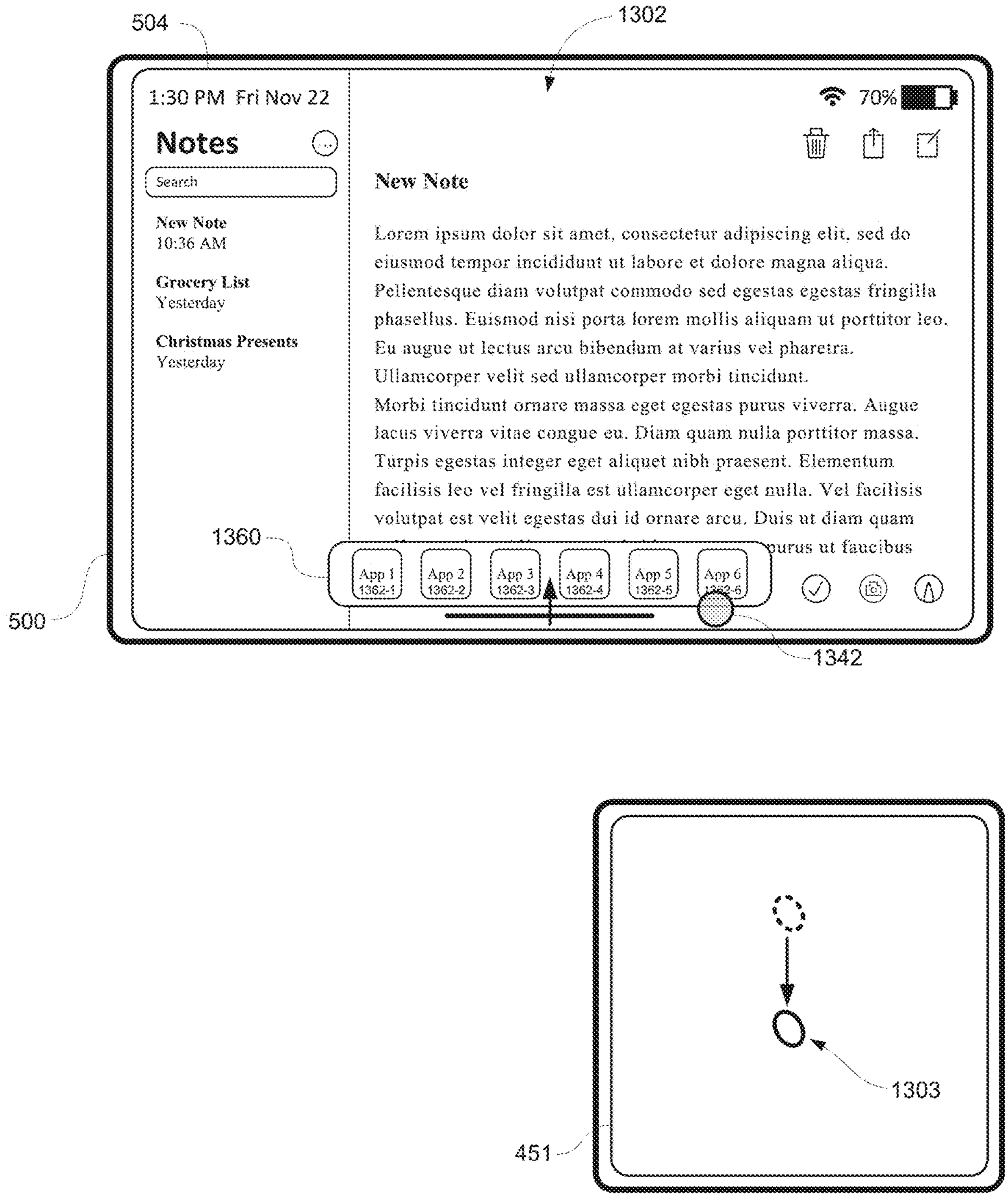

In some embodiments, the electronic device 500 displays the home screen user interface 1308 in response to a mix of inputs detected by the external touch-sensitive surface 451 and the touch screen 504. In FIG. 13V, the user performs a swipe gesture (e.g., with contact 1303) on external touch-sensitive surface 451 and, in response, the electronic device 500 moves the cursor 1342 to the bottom edge of the display 504. In FIG. 13W, the electronic device 500 detects a downward swipe (e.g., of contact 1303 on external touch-sensitive surface 451) while cursor 1342 is located along the bottom edge of touch screen 504 and, in response to the swipe, the electronic device 500 displays the dock 1360 as described above with reference to FIG. 13S.

Figure 13X:
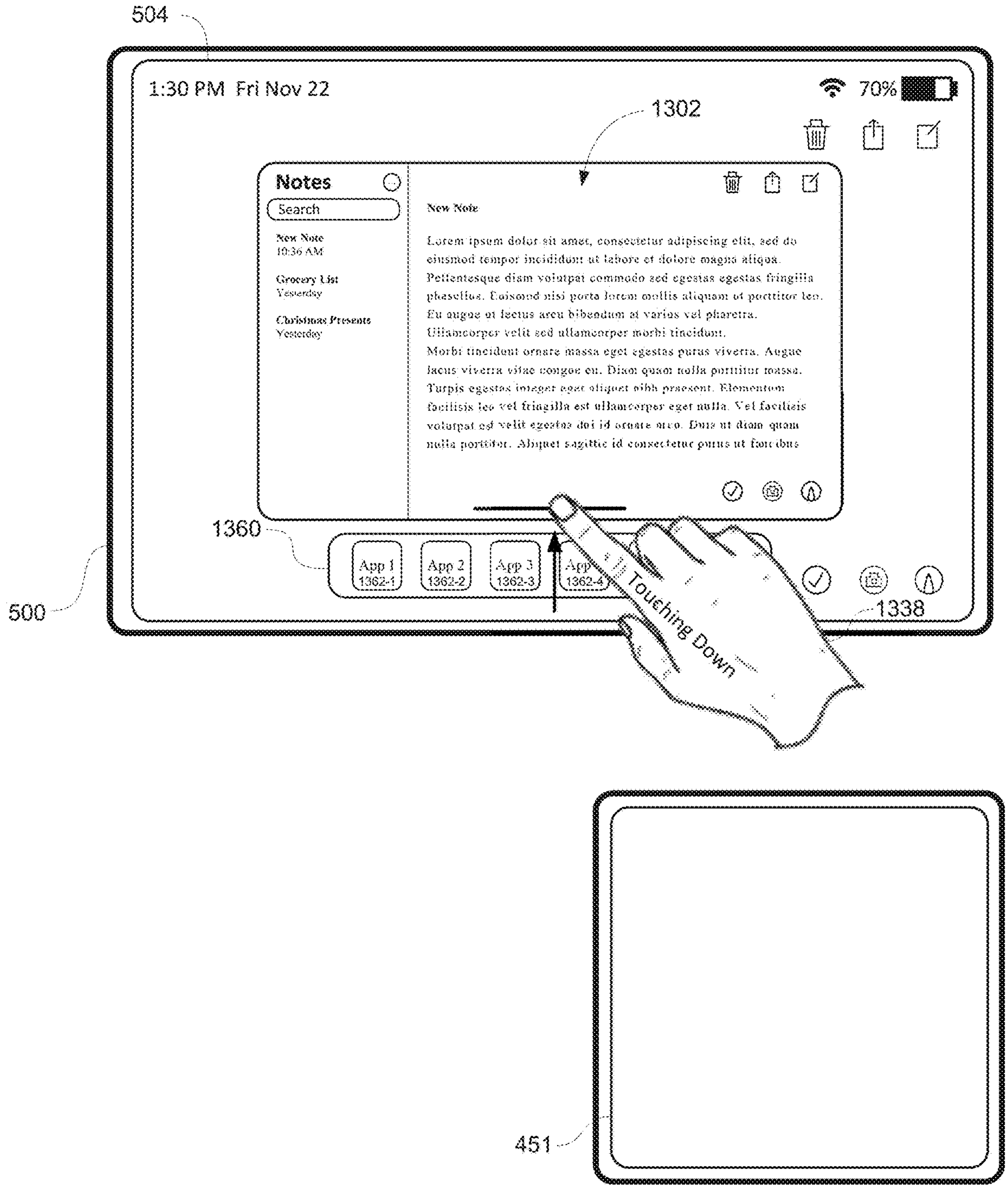

As shown in FIG. 13X, while displaying the dock 1360, the electronic device 500 detects contact of hand 1338 (e.g., a finger from hand 1338) on the touch screen 504, including an edge swipe gesture starting from the bottom edge of the touch screen 504 and moving upwards. The upward swipe optionally meets one or more speed and/or or distance criteria associated with display of a home screen user interface. In response to detecting the swipe gesture illustrated in FIG. 13T, the electronic device 500 displays an animation of the user interface 1302 of the note taking application shrinking in accordance with the movement of hand 1338 on touch screen 504. As the user continues to swipe up, the user interface 1302 is displayed at a smaller size. If, instead of satisfying the criteria for displaying the home screen user interface, the swipe gesture satisfies one or more criteria for displaying an application switching user interface, the electronic device 500 instead displays the application switching user interface described above with reference to FIGS. 11O-11Q.

Figure 13Y:
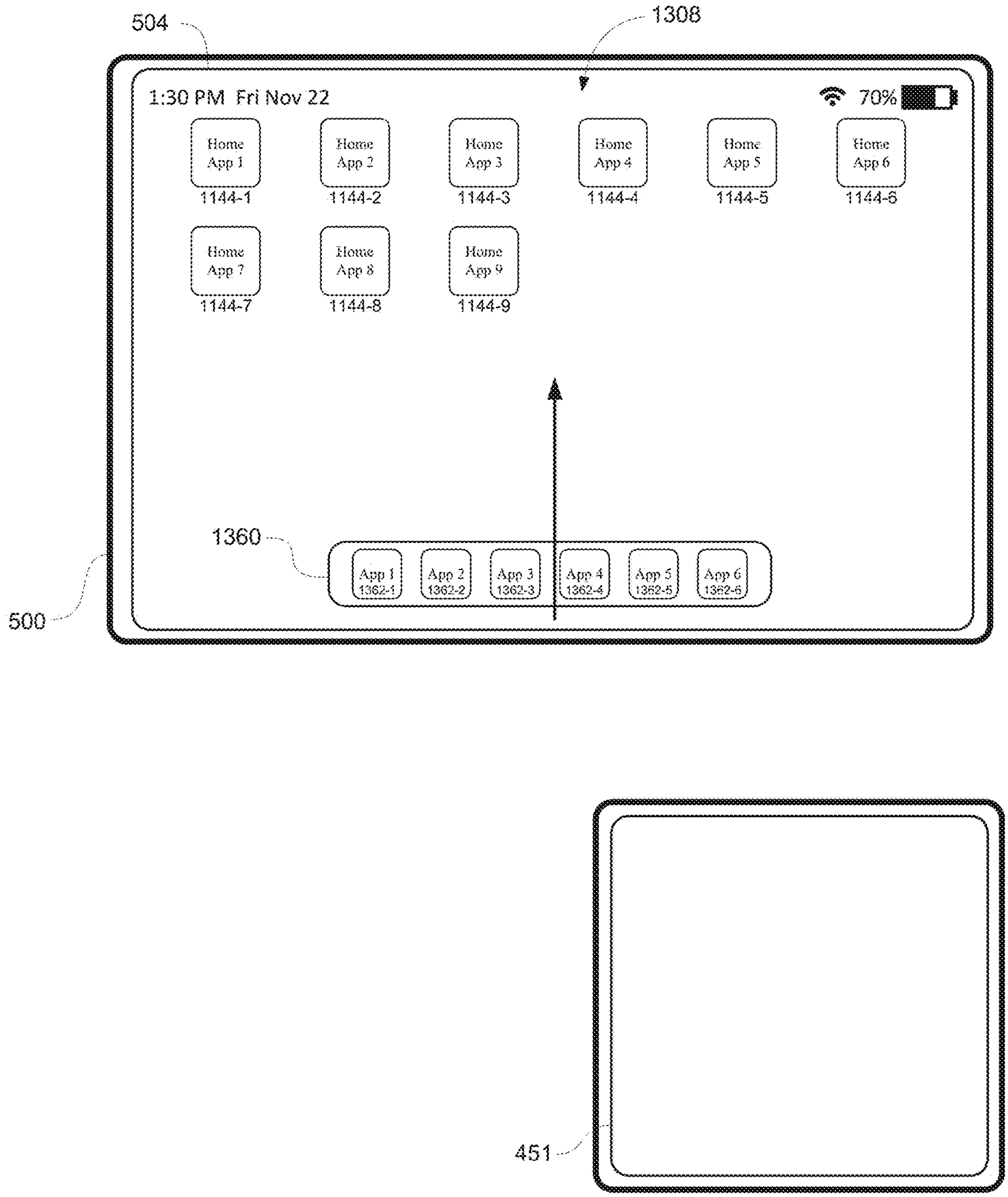

In FIG. 13Y, in response to detecting the input illustrated in FIG. 13X, the electronic device 500 displays the home screen user interface. Thus, the electronic device 500 displays the home screen user interface 1308 in response to a sequence of inputs including the inputs received by the external touch-sensitive surface 451 illustrated in FIG. 13W and the input received by the touch screen 504 illustrated in FIG. 13X.

Thus, FIGS. 13Q-13Y illustrate ways in which the electronic device 500 displays the dock, home screen and/or application switching user interface in response to an input corresponding to a request to move the cursor 1342 beyond the bottom edge of display 504.

Figure 13Z:
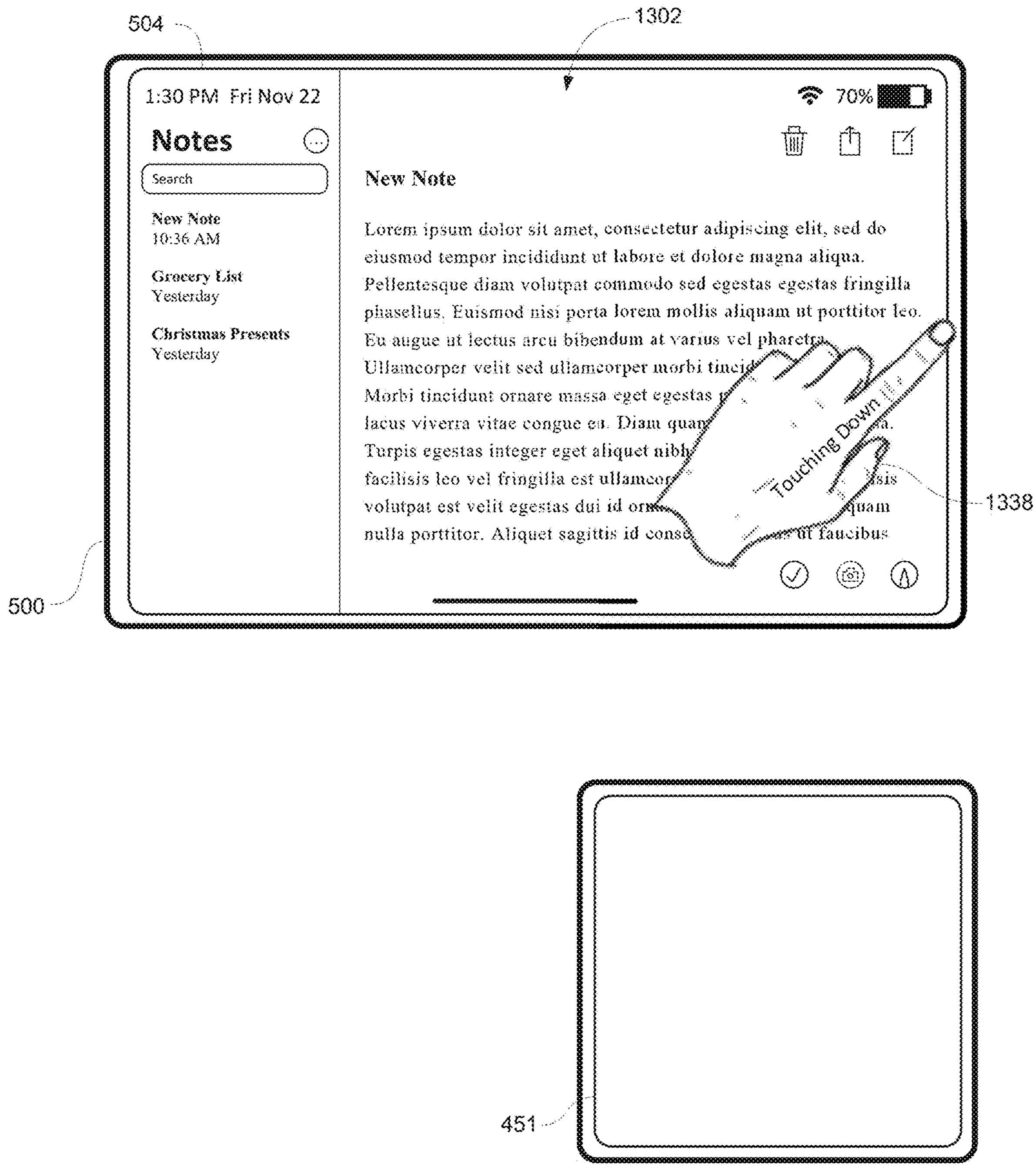
Figure 13A:
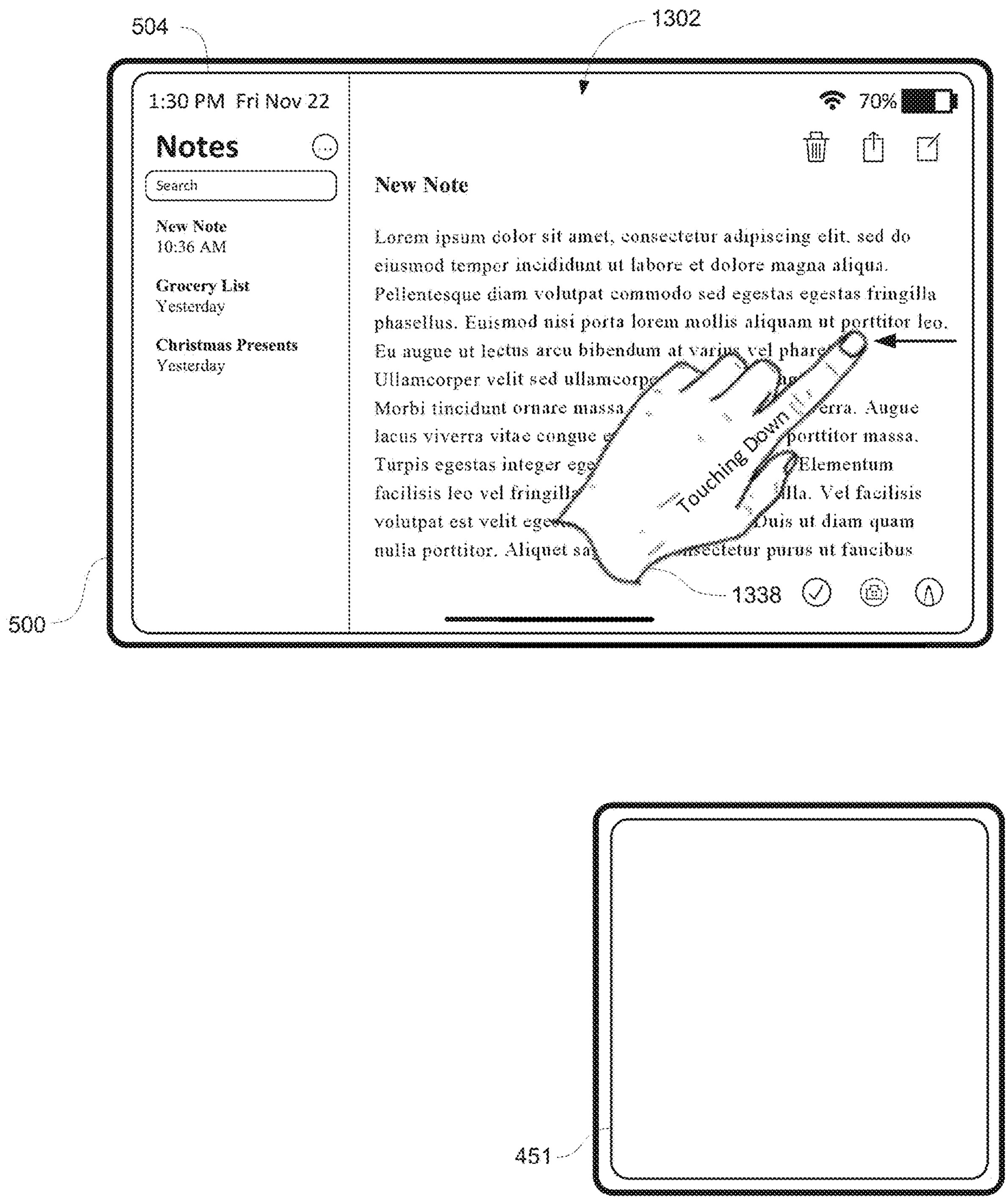
Figure 13B:
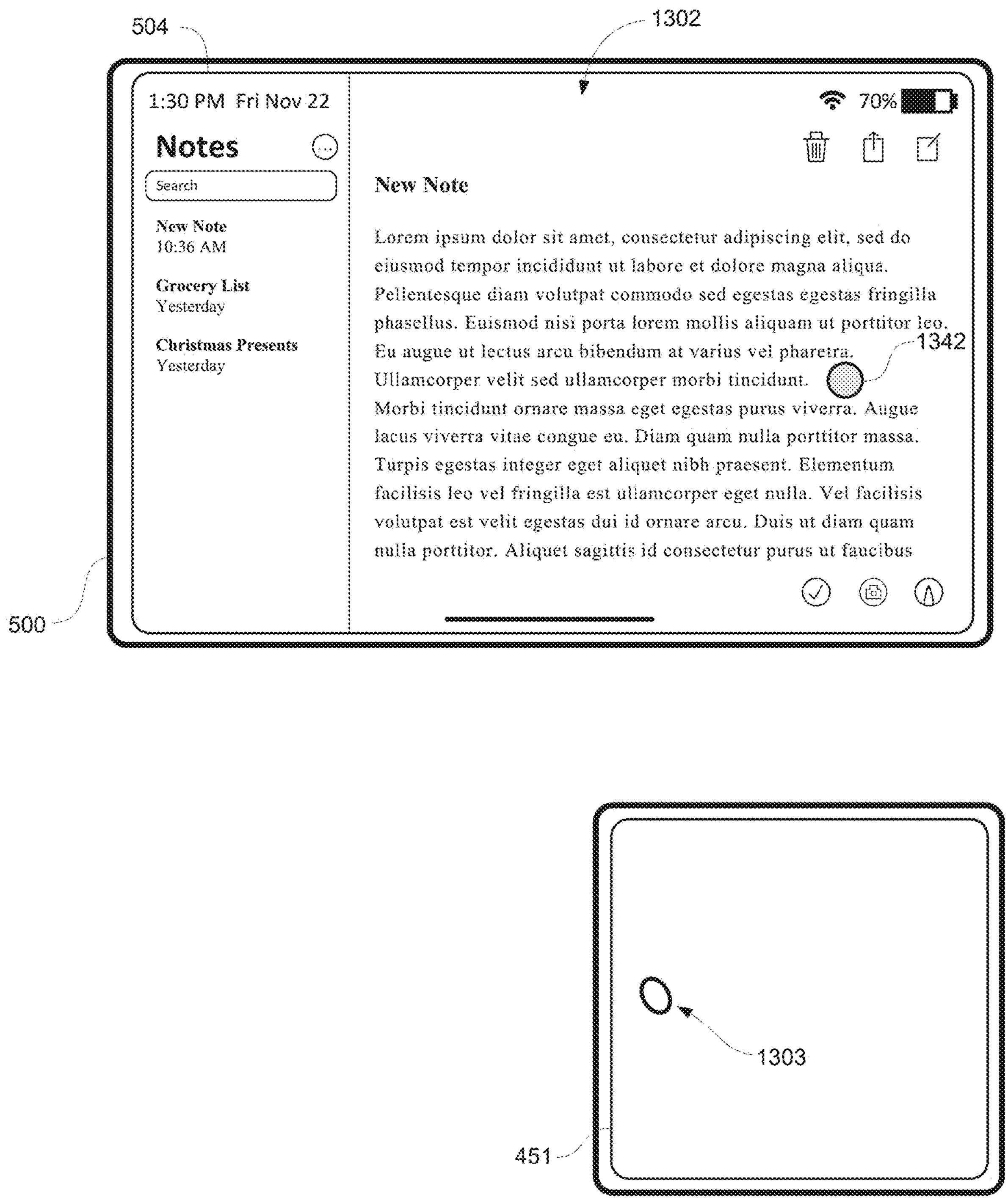
Figure 13C:
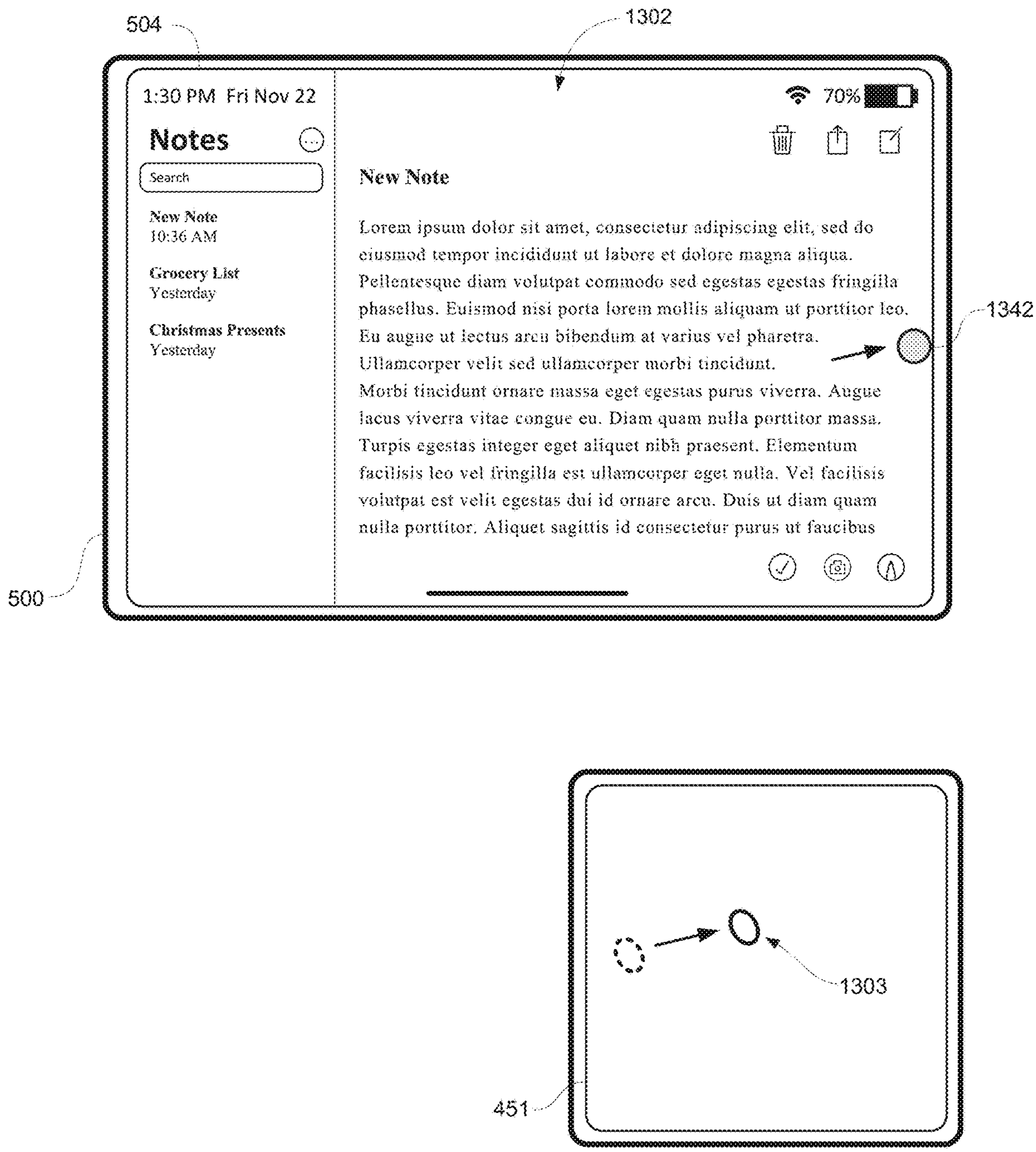
Figure 13D:
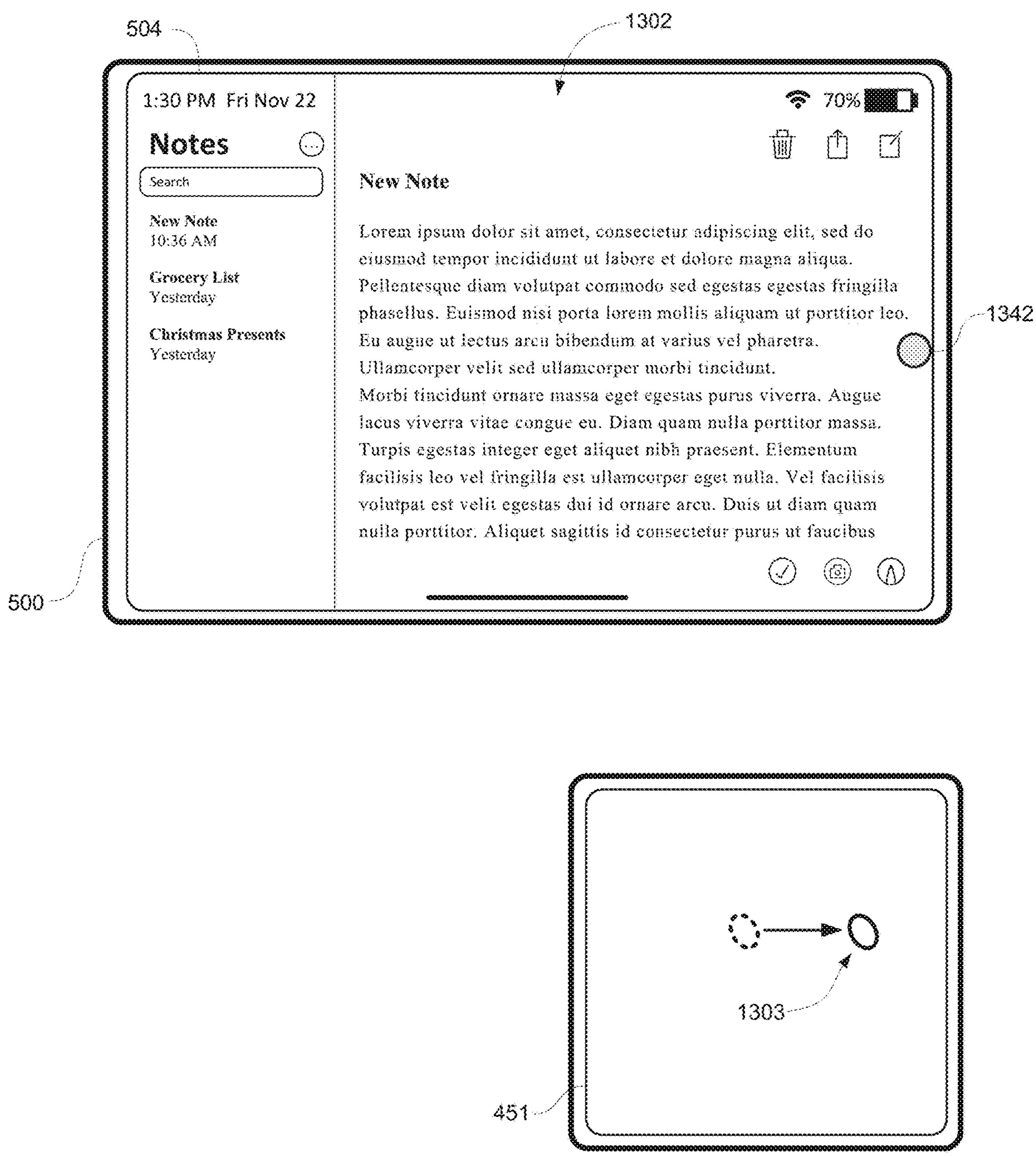
Figure 13E:
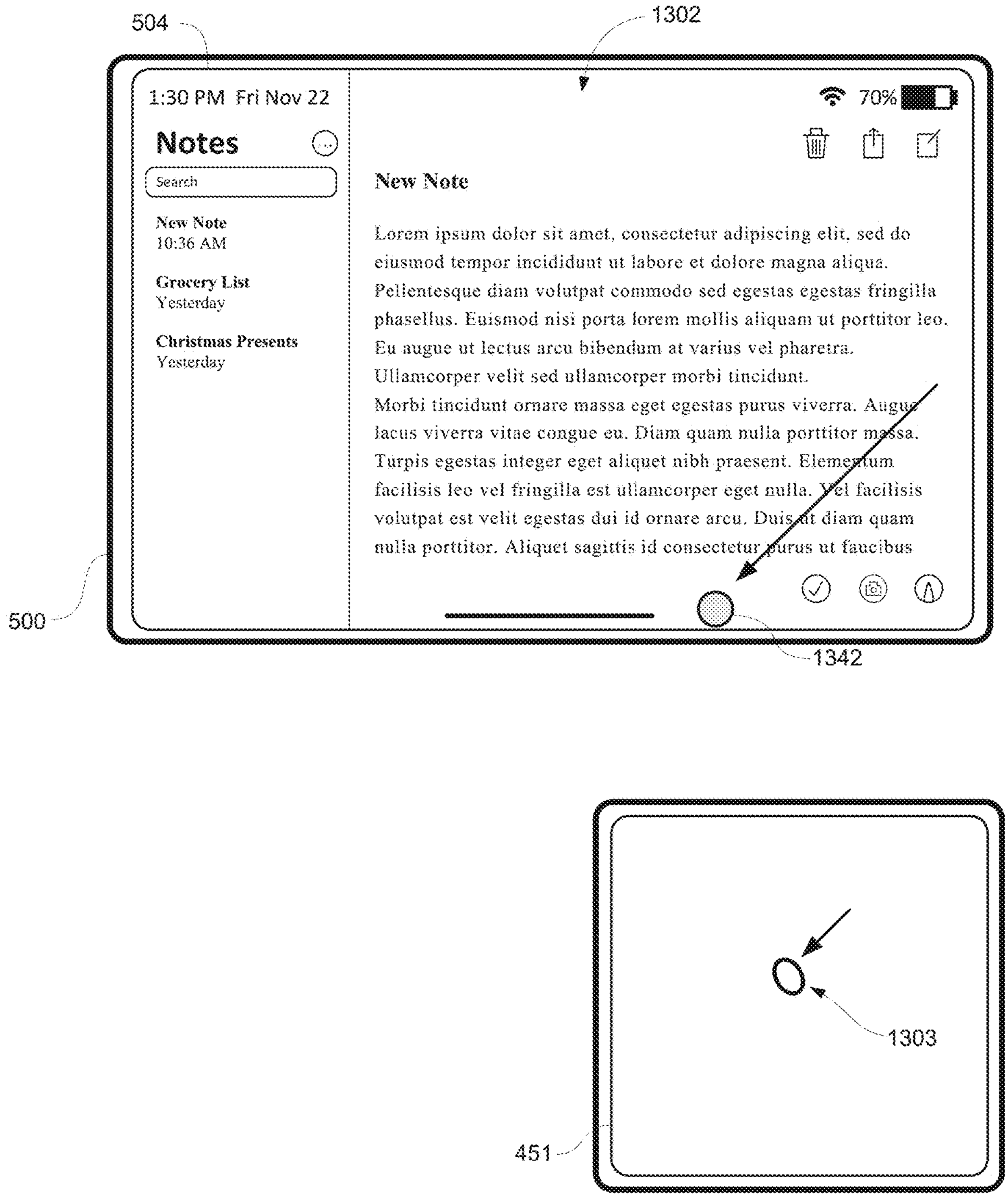
Figure 13F:
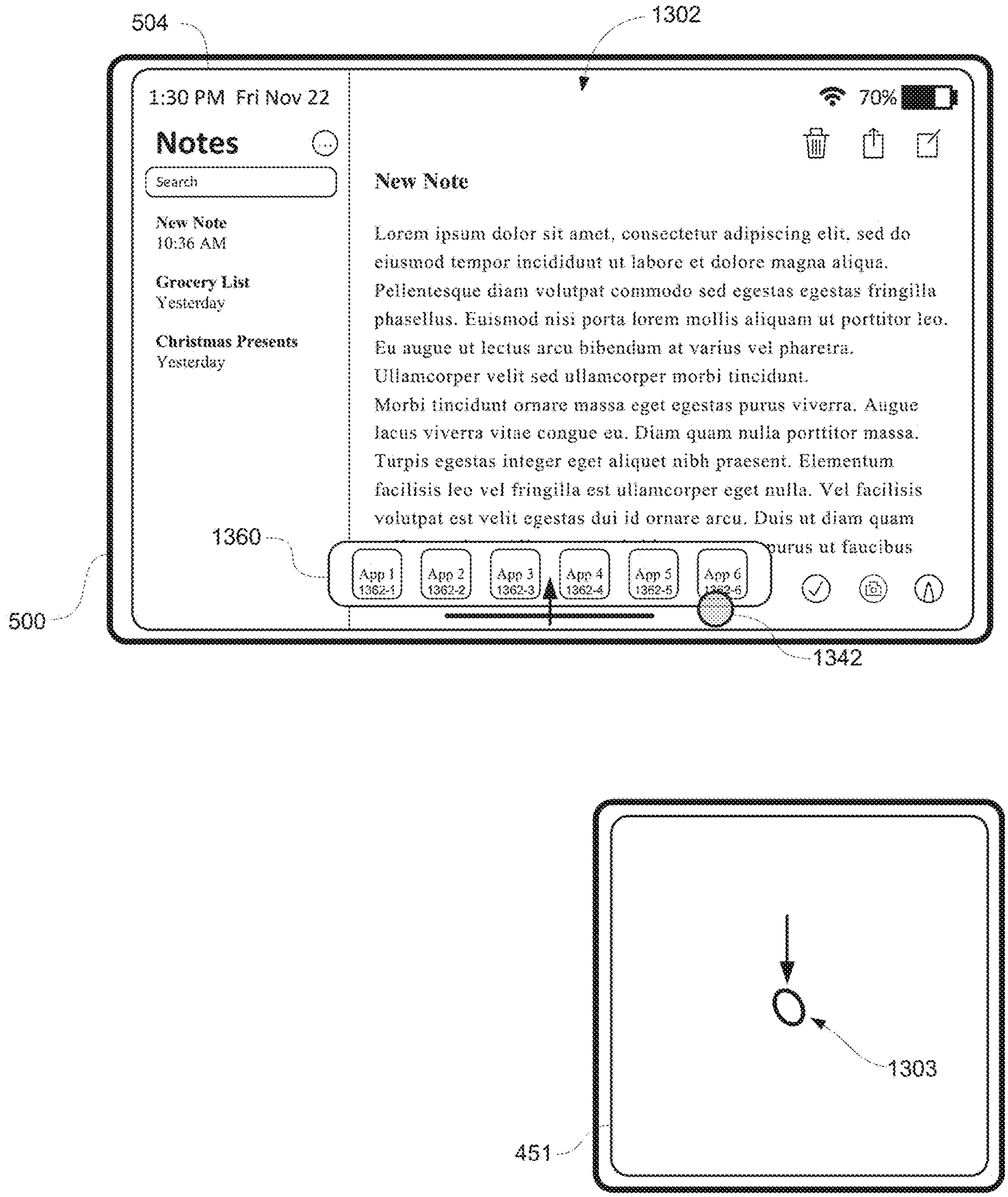
Figure 13G:
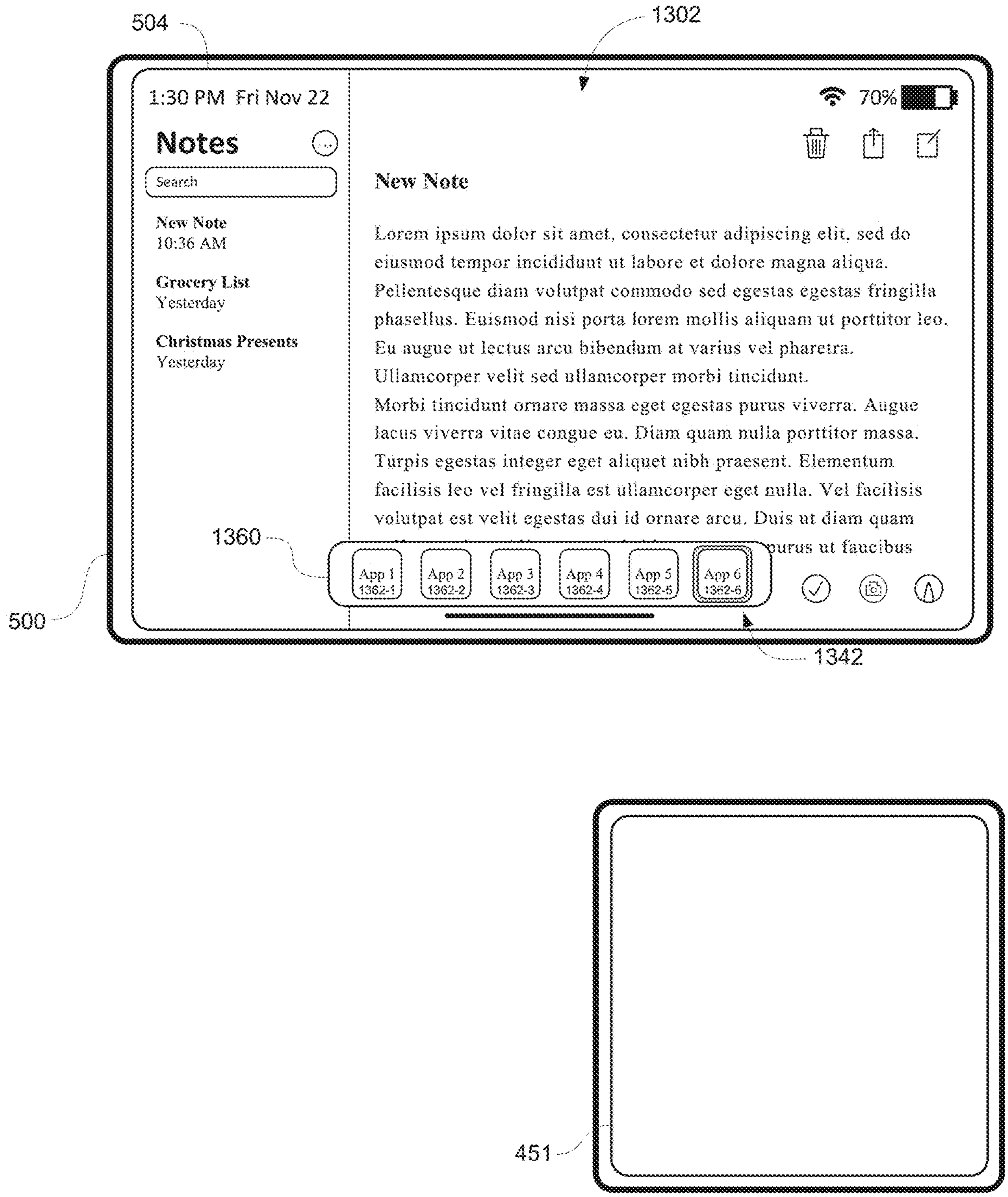
Figure 13H:
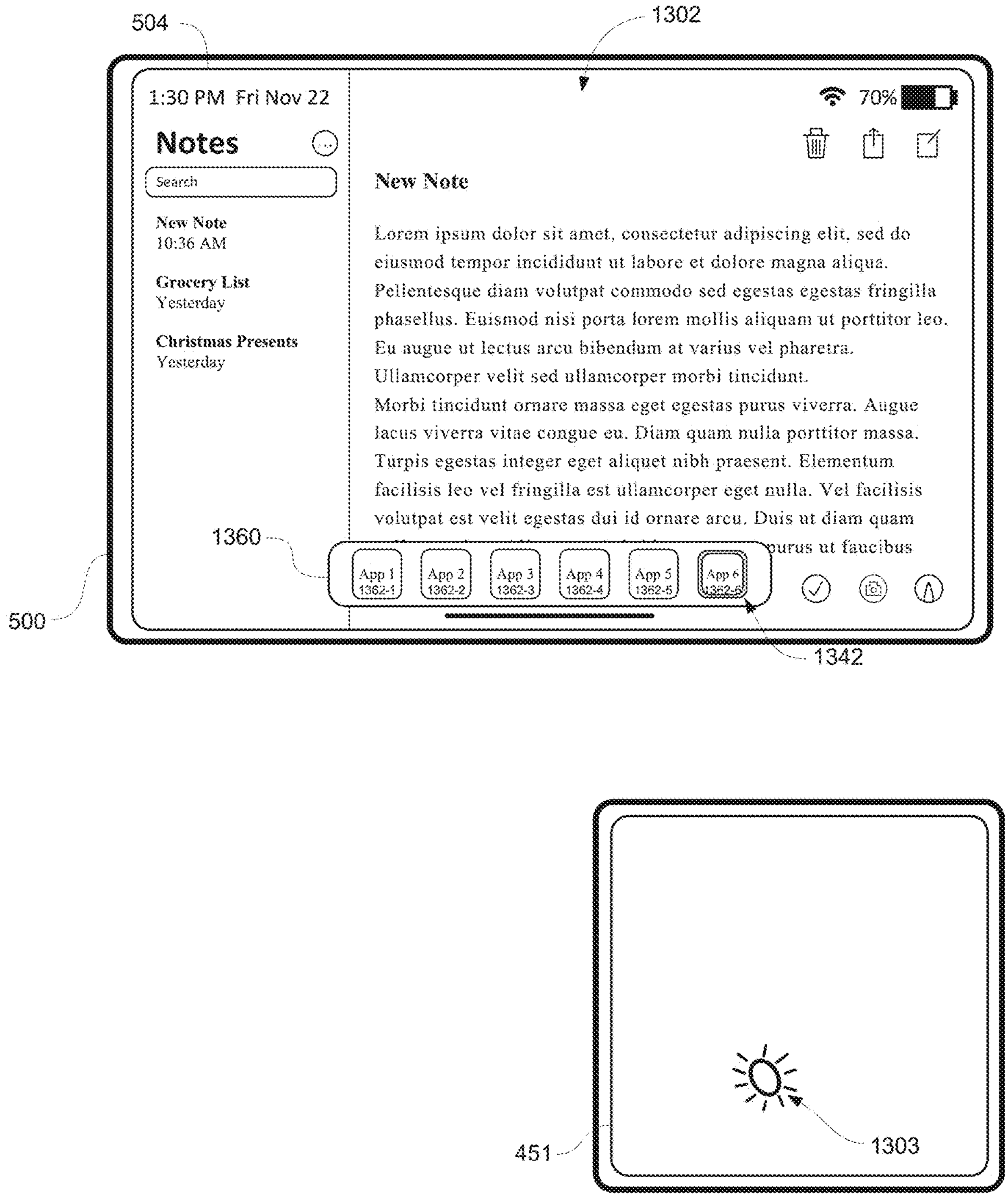
Figure 13I:
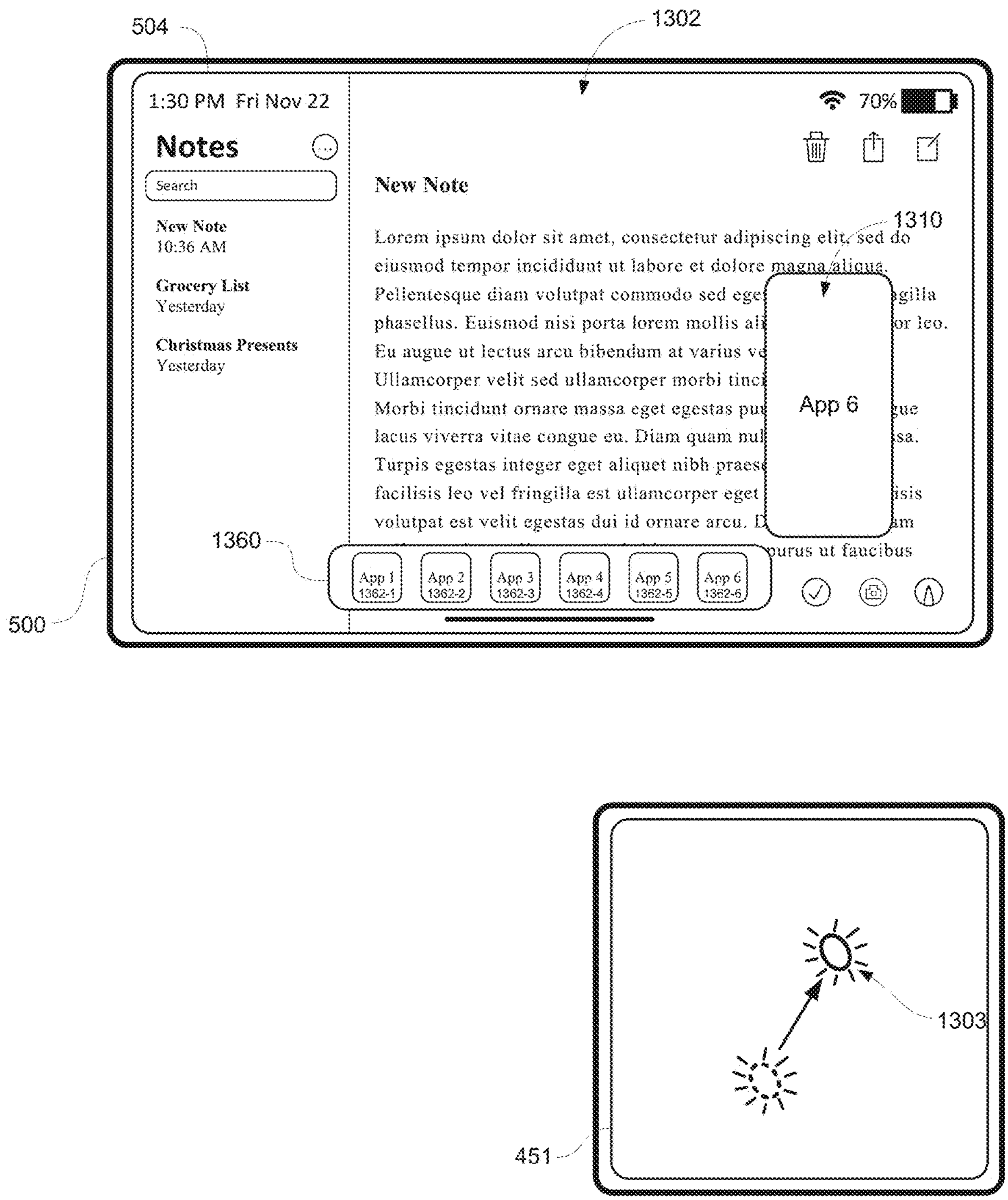
Figure 13J:
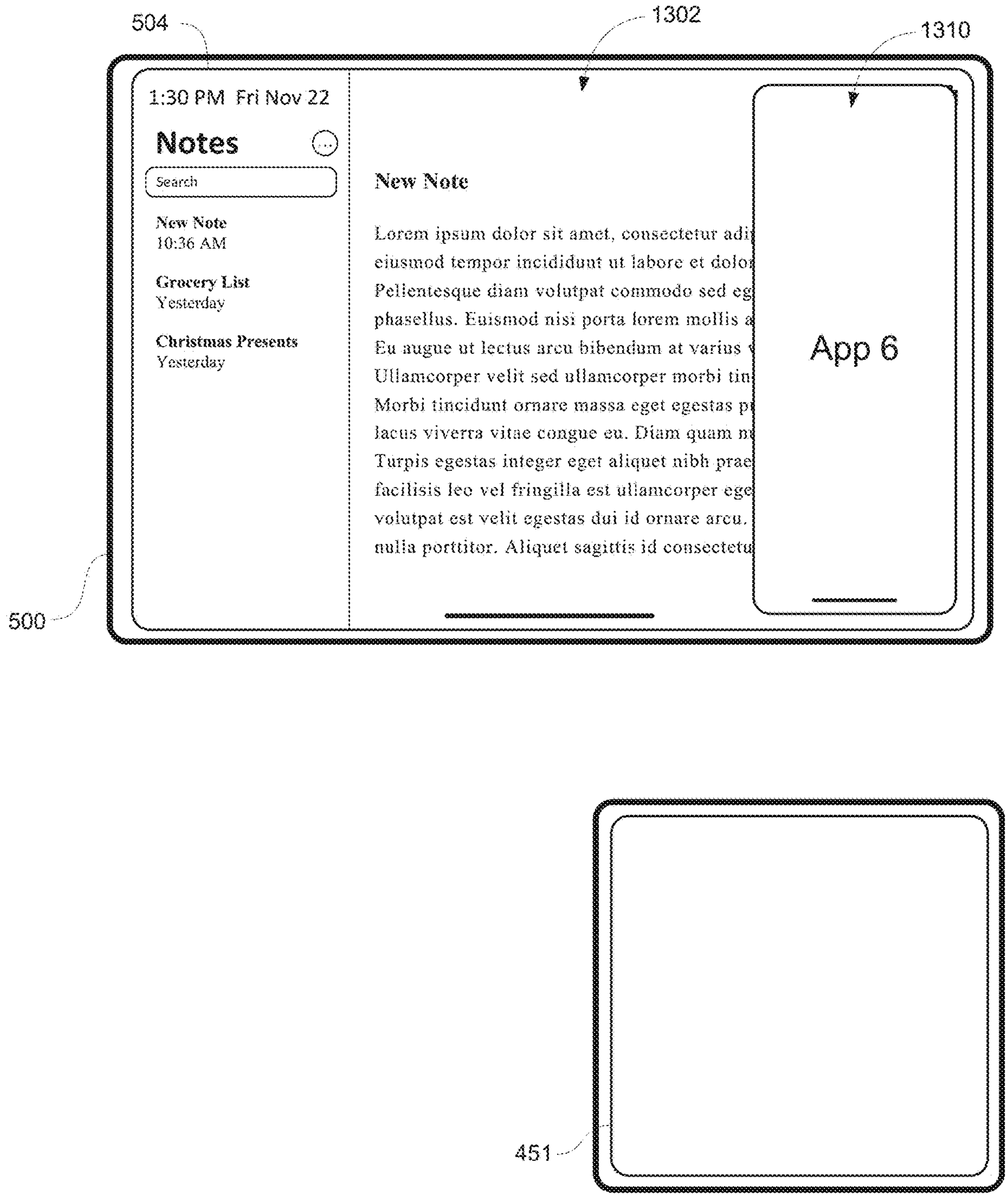
Figure 13K:
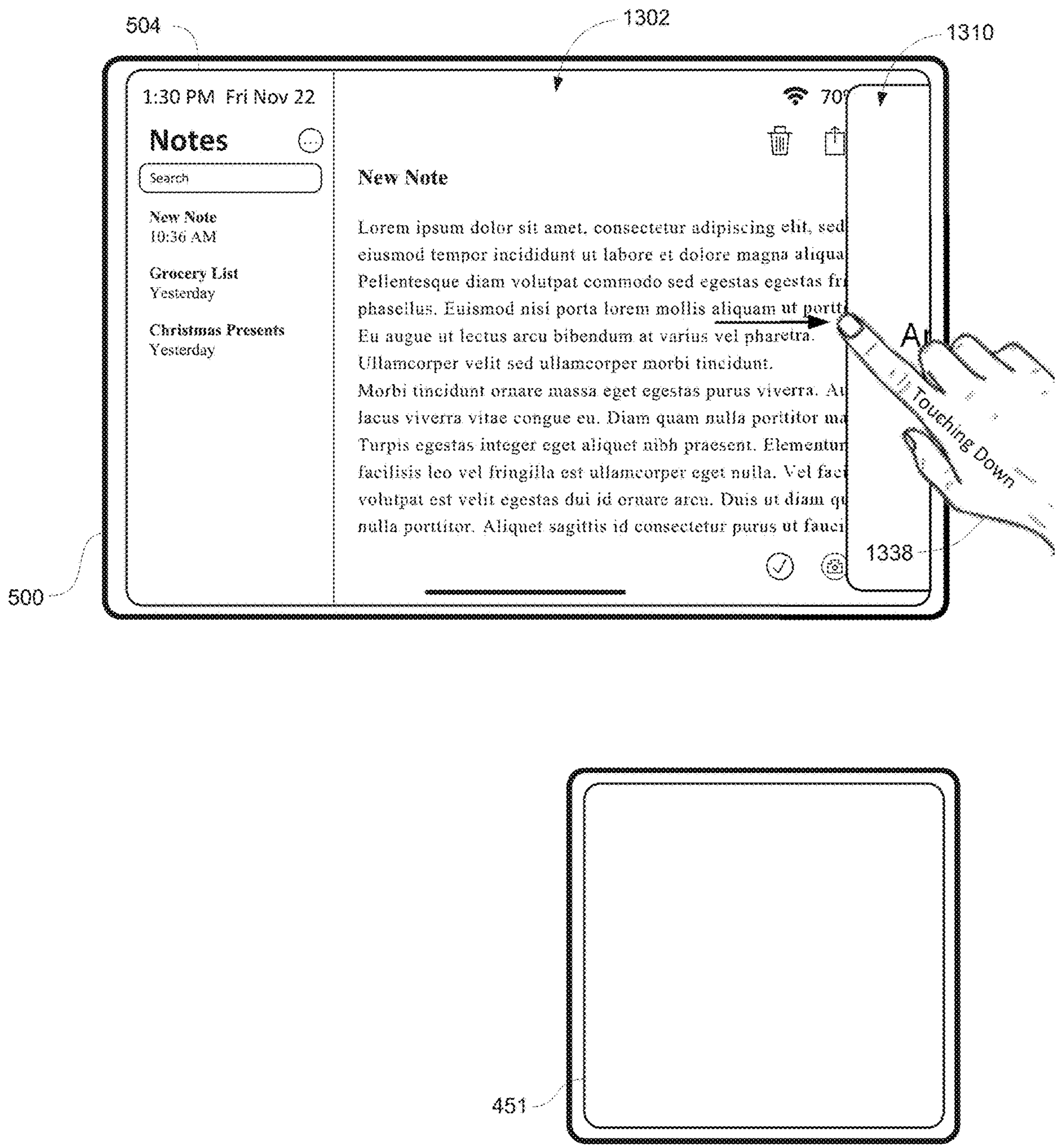
Figure 13L:
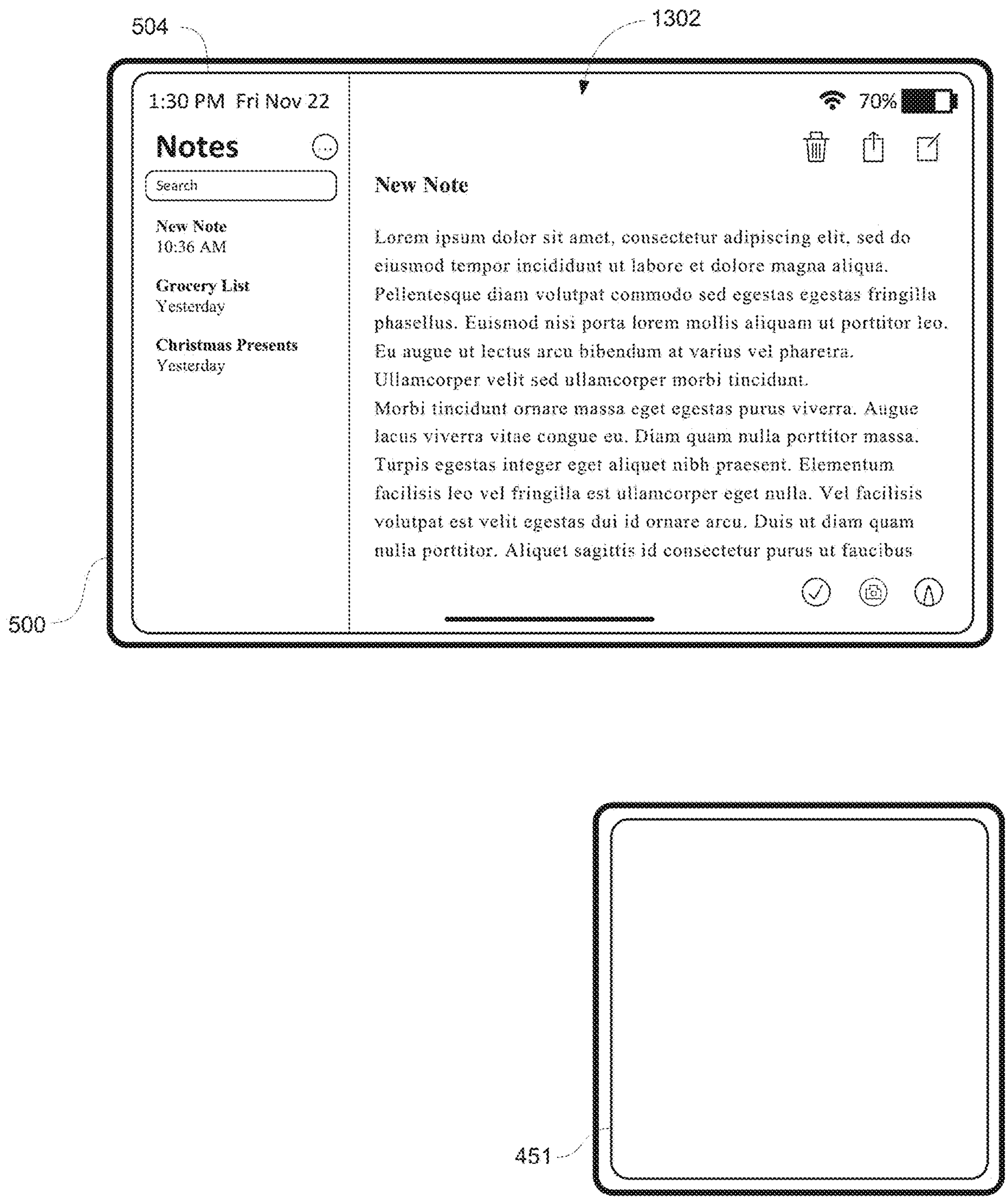
Figure 13M:
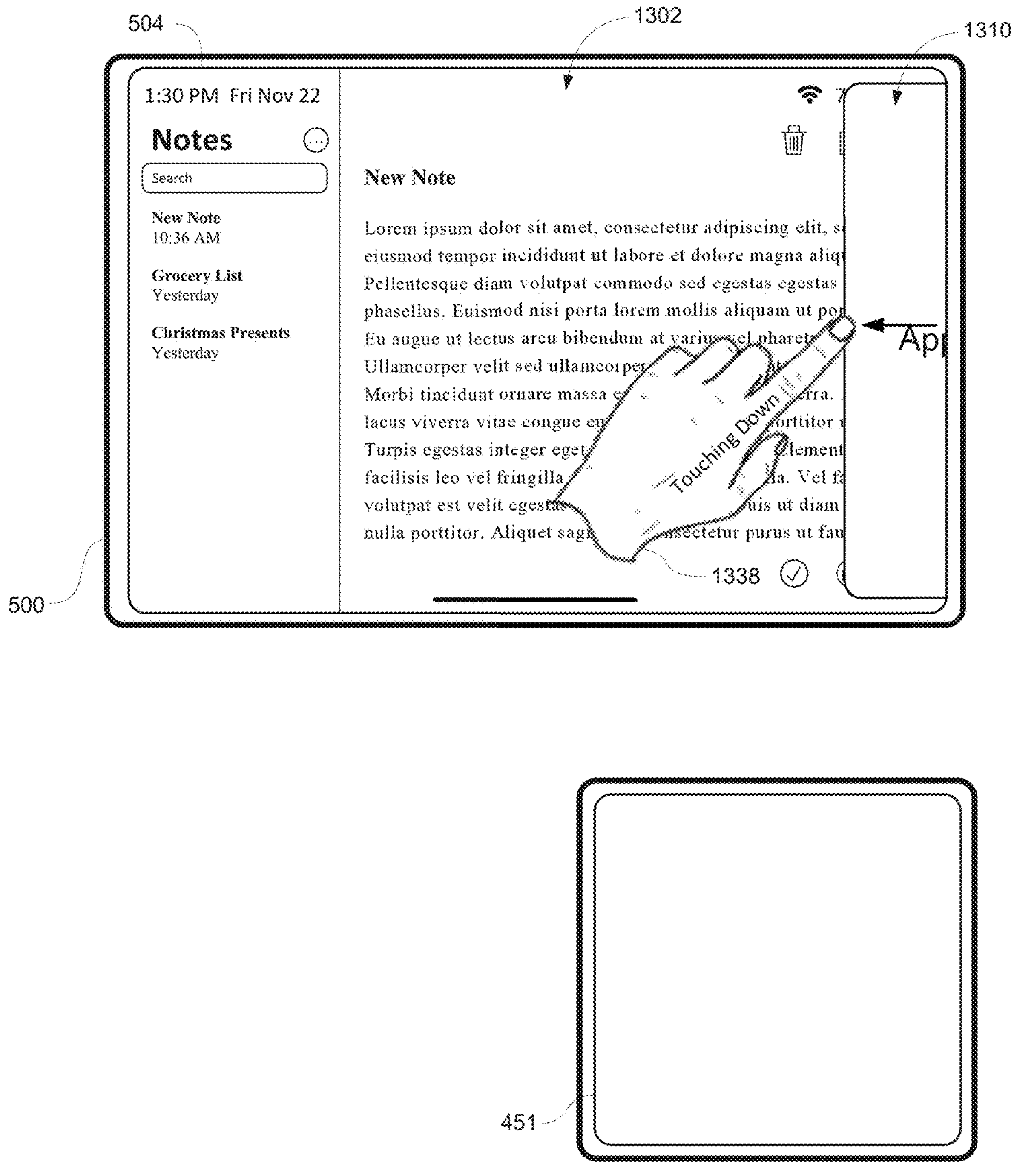
Figure 13N:
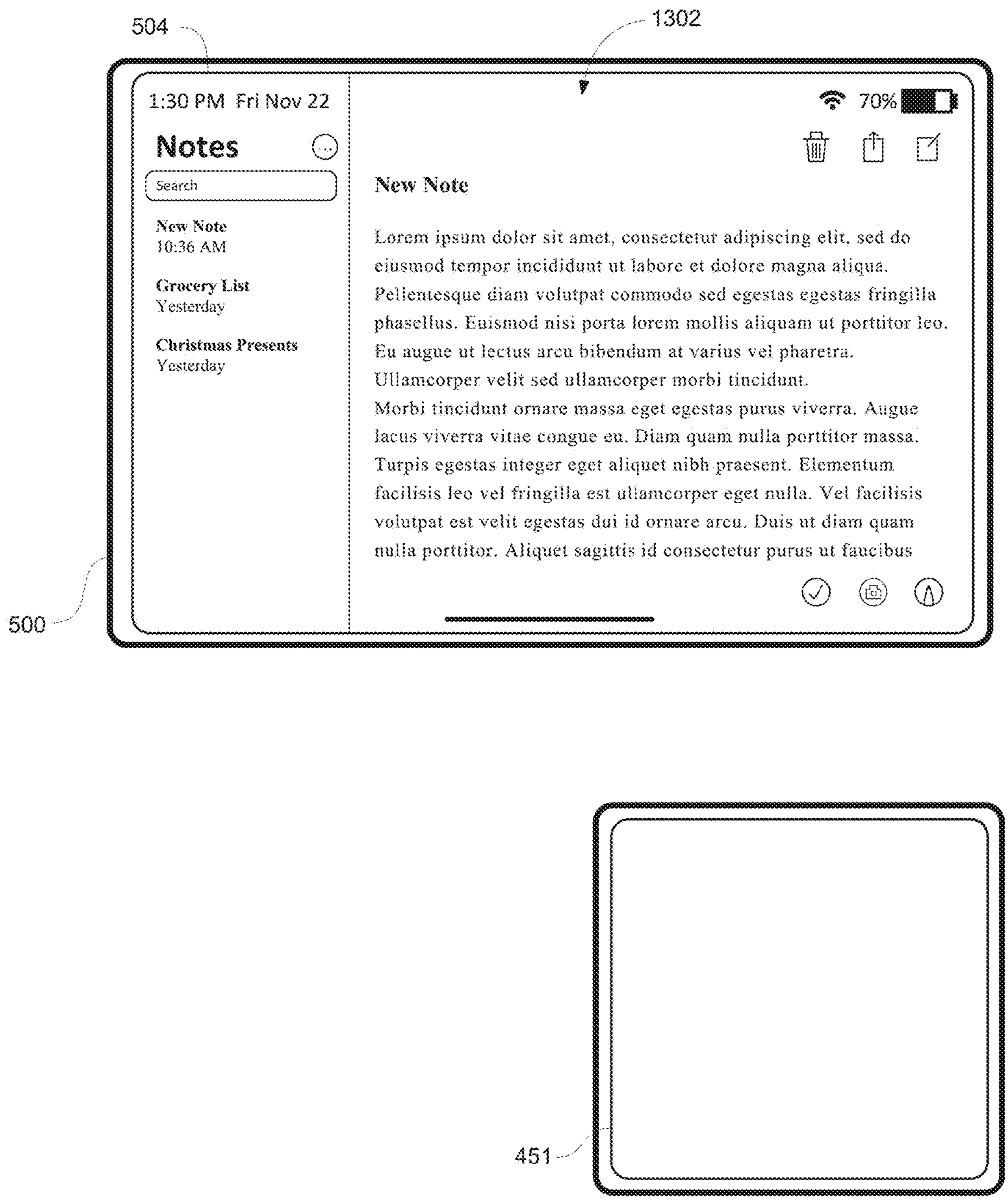
Figure 13O:
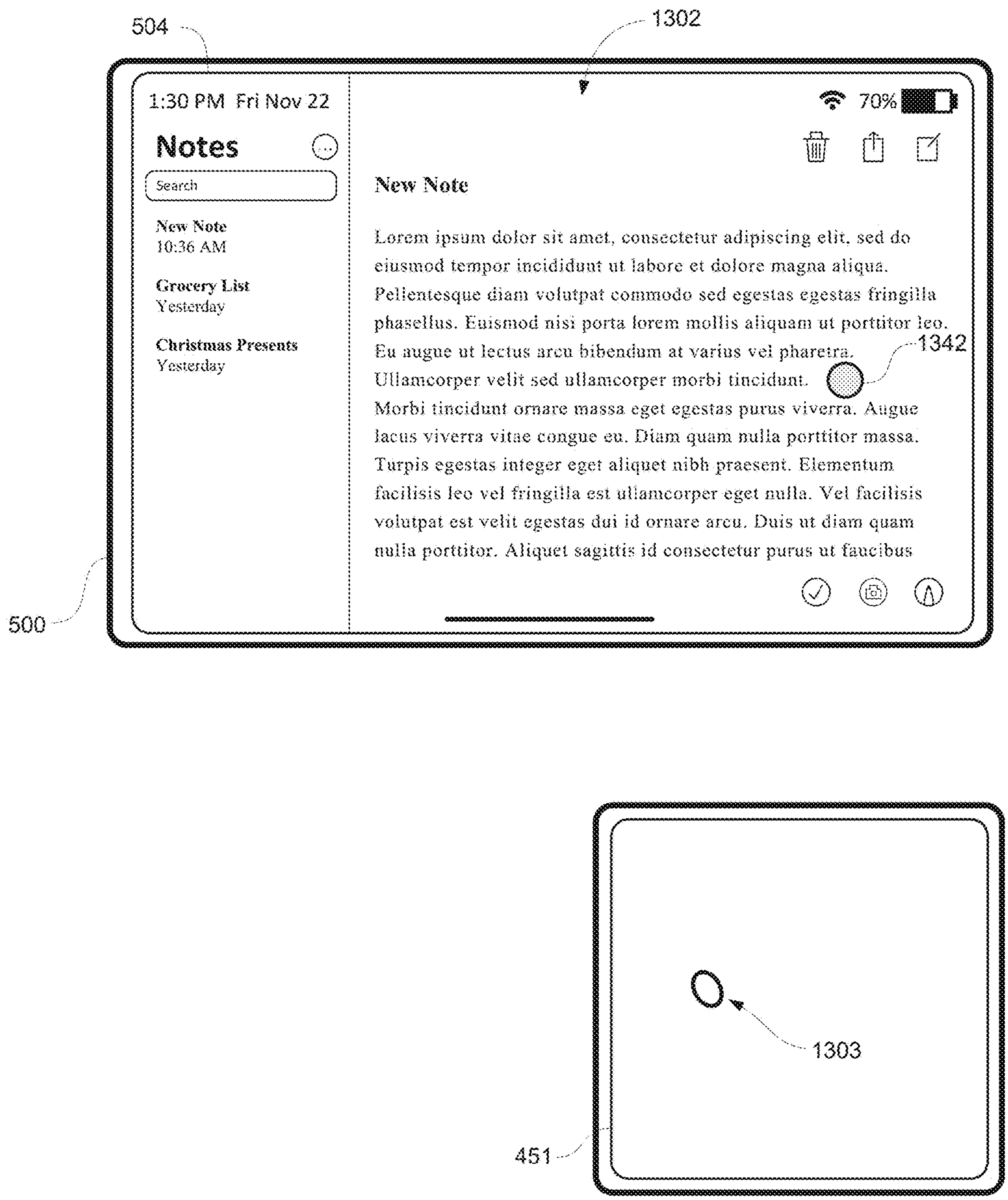
Figure 13P:
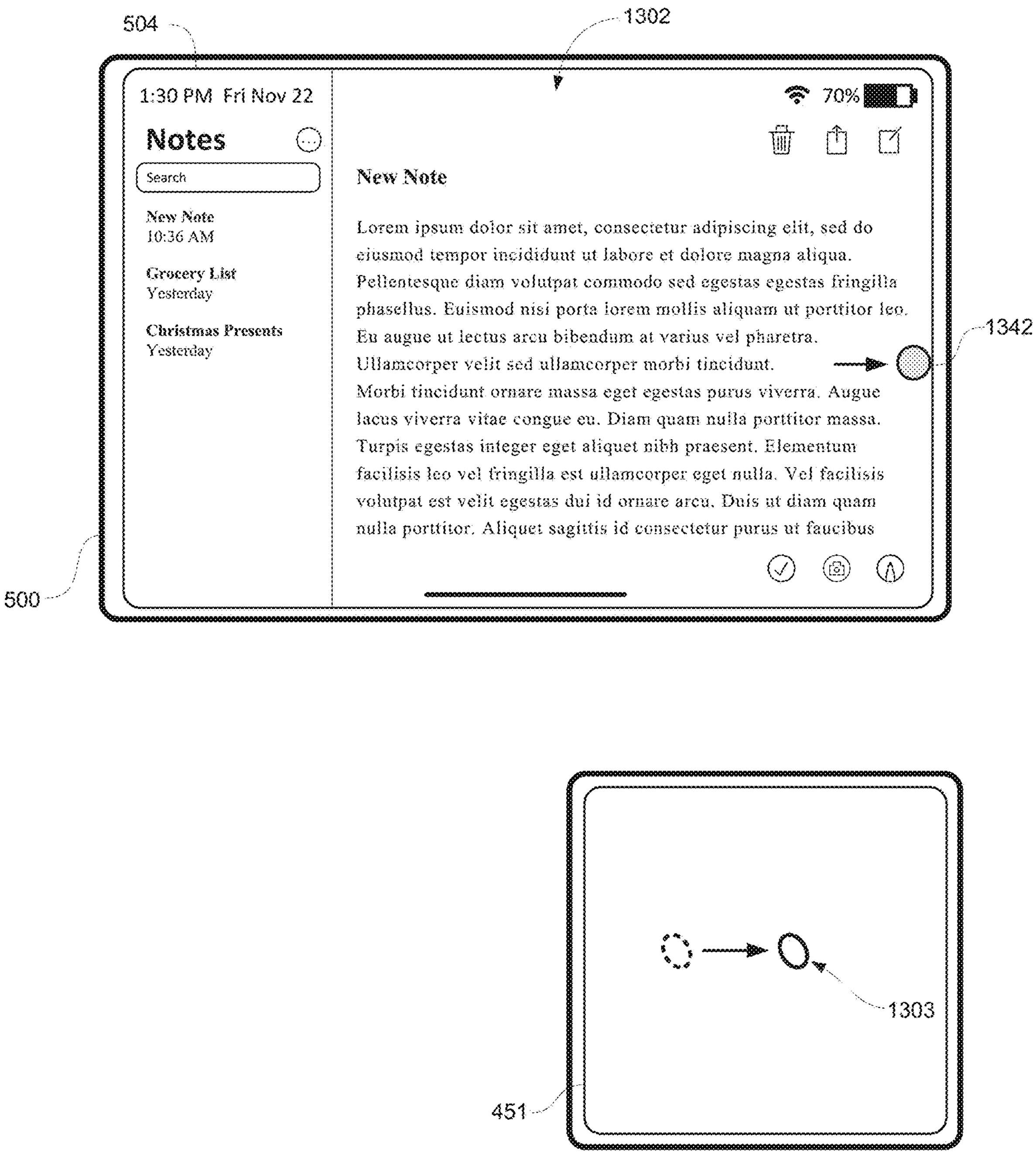
Figure 13Q:
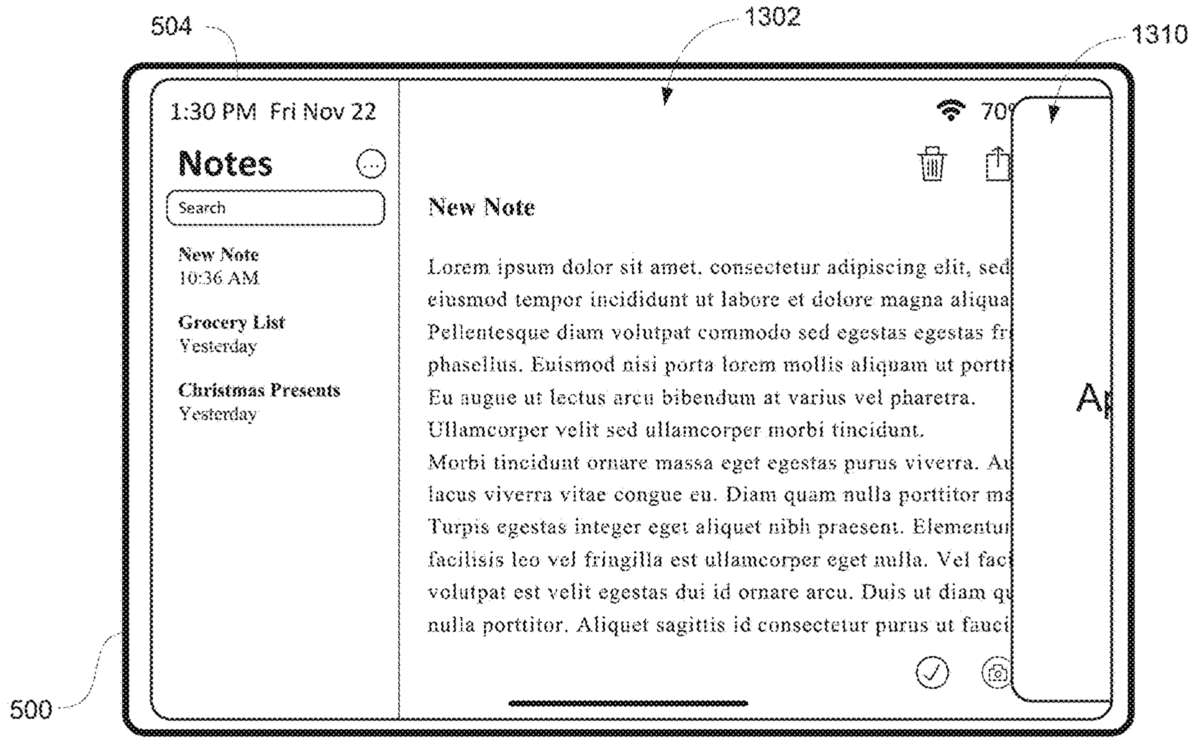
Figure 13Q:
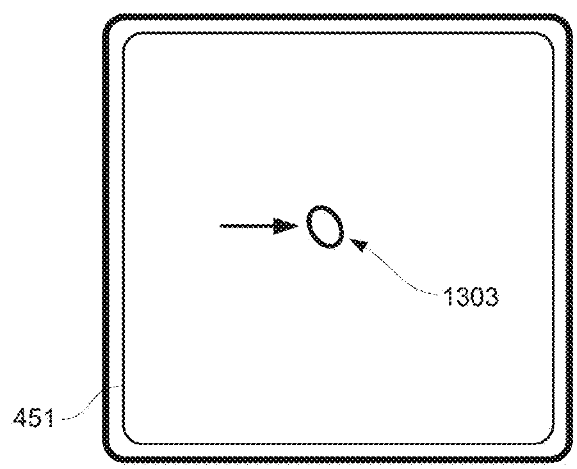
Figure 13R:
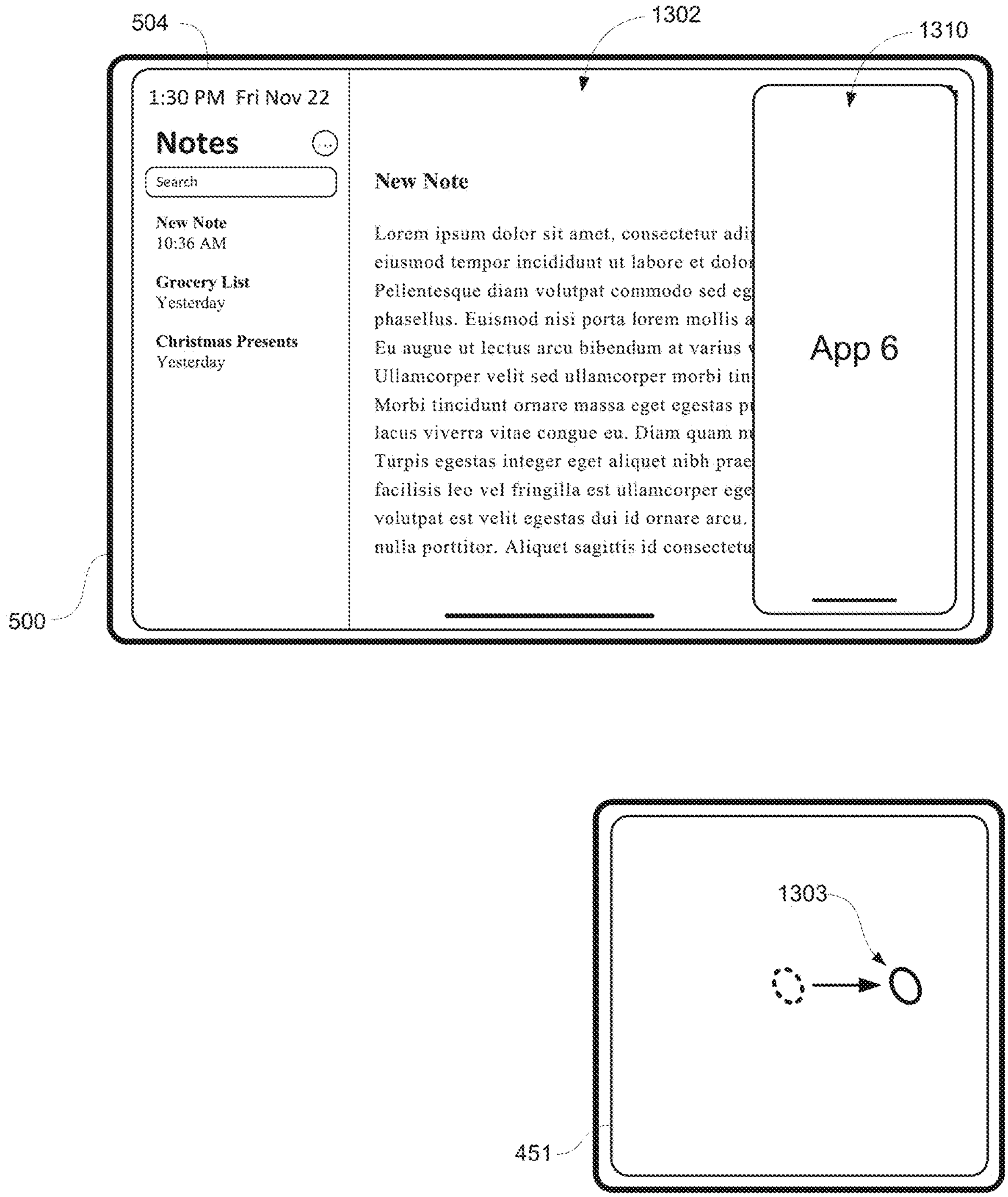
Figure 13S:
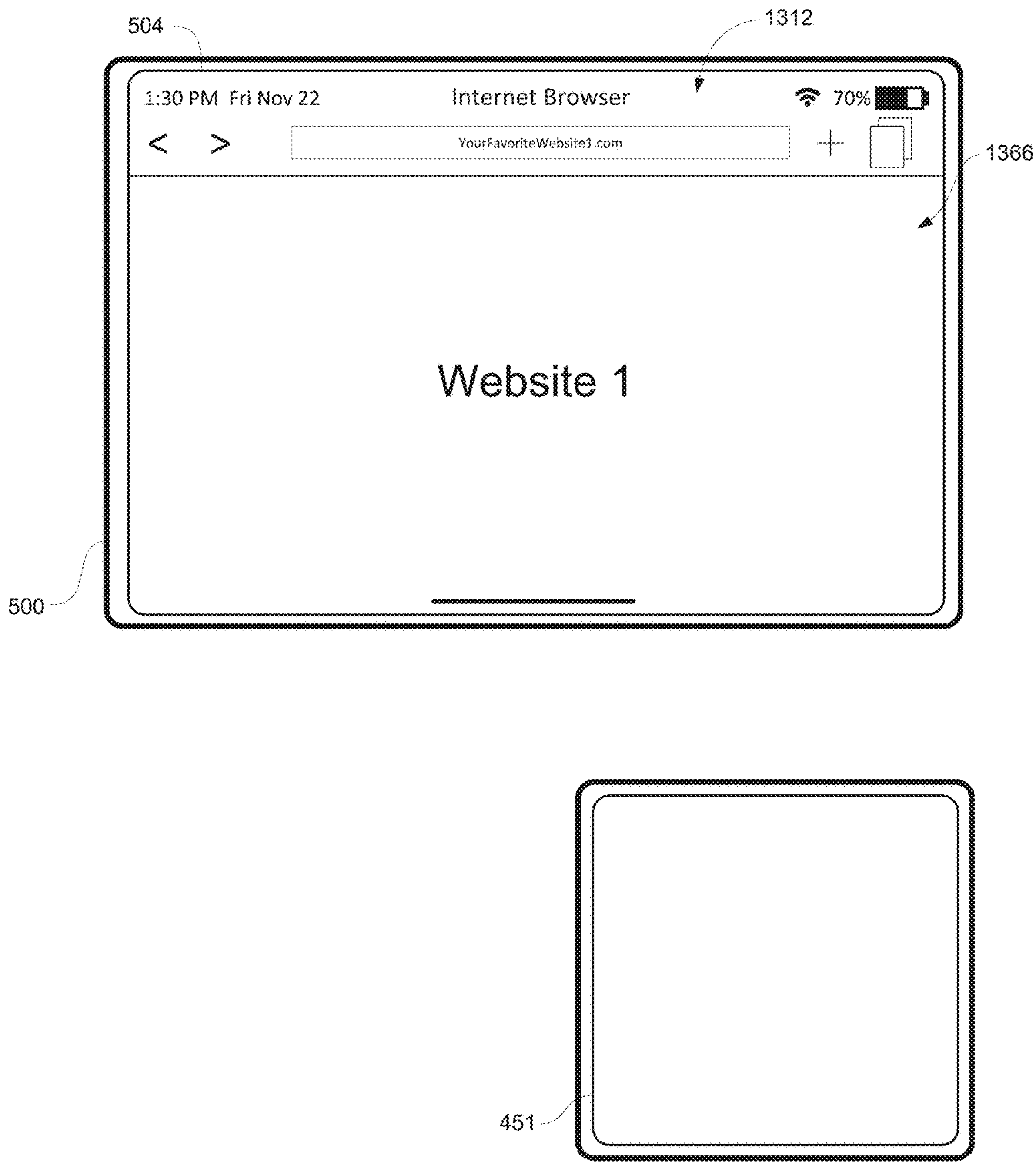
Figure 13T:
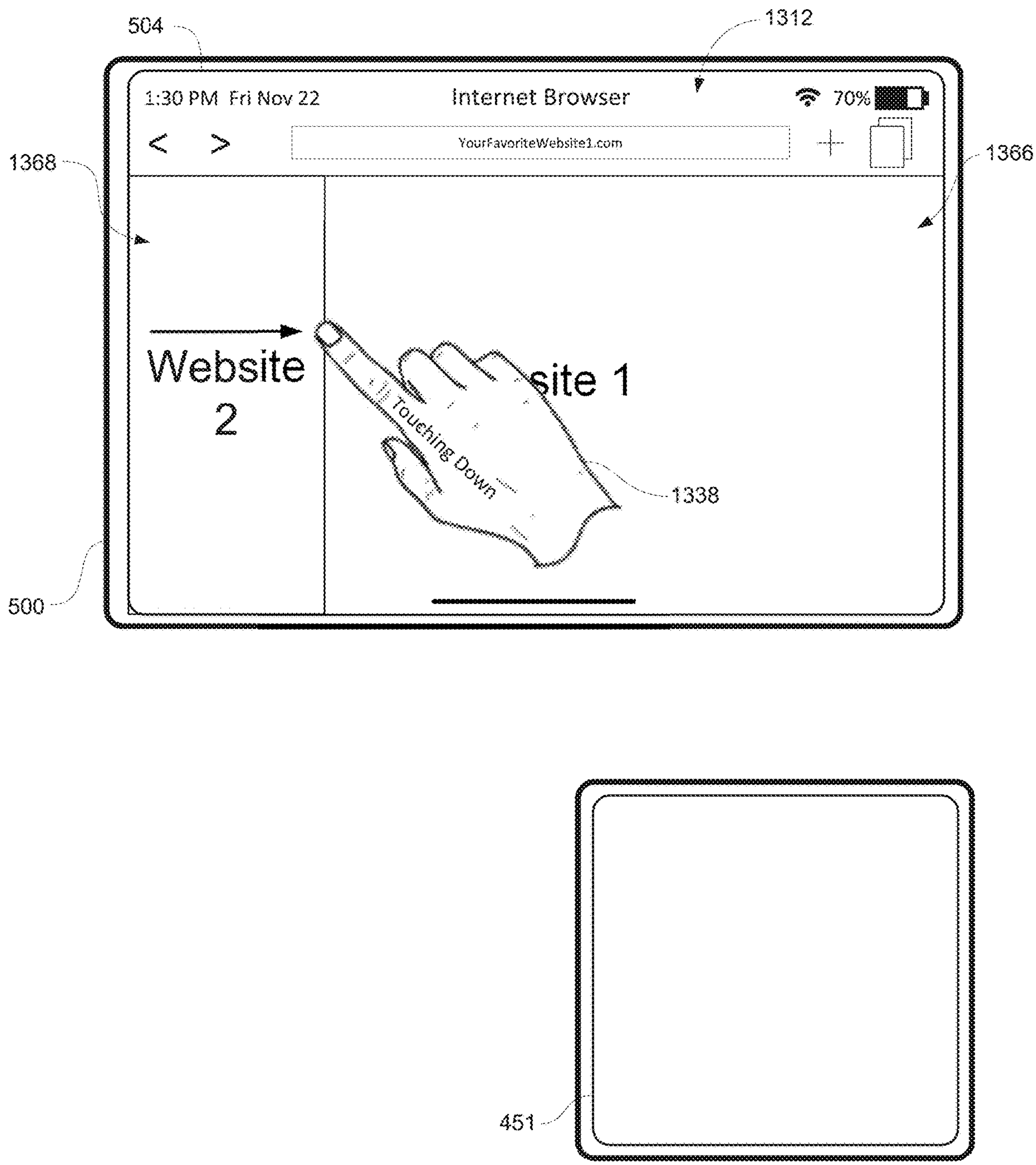
Figure 13U:
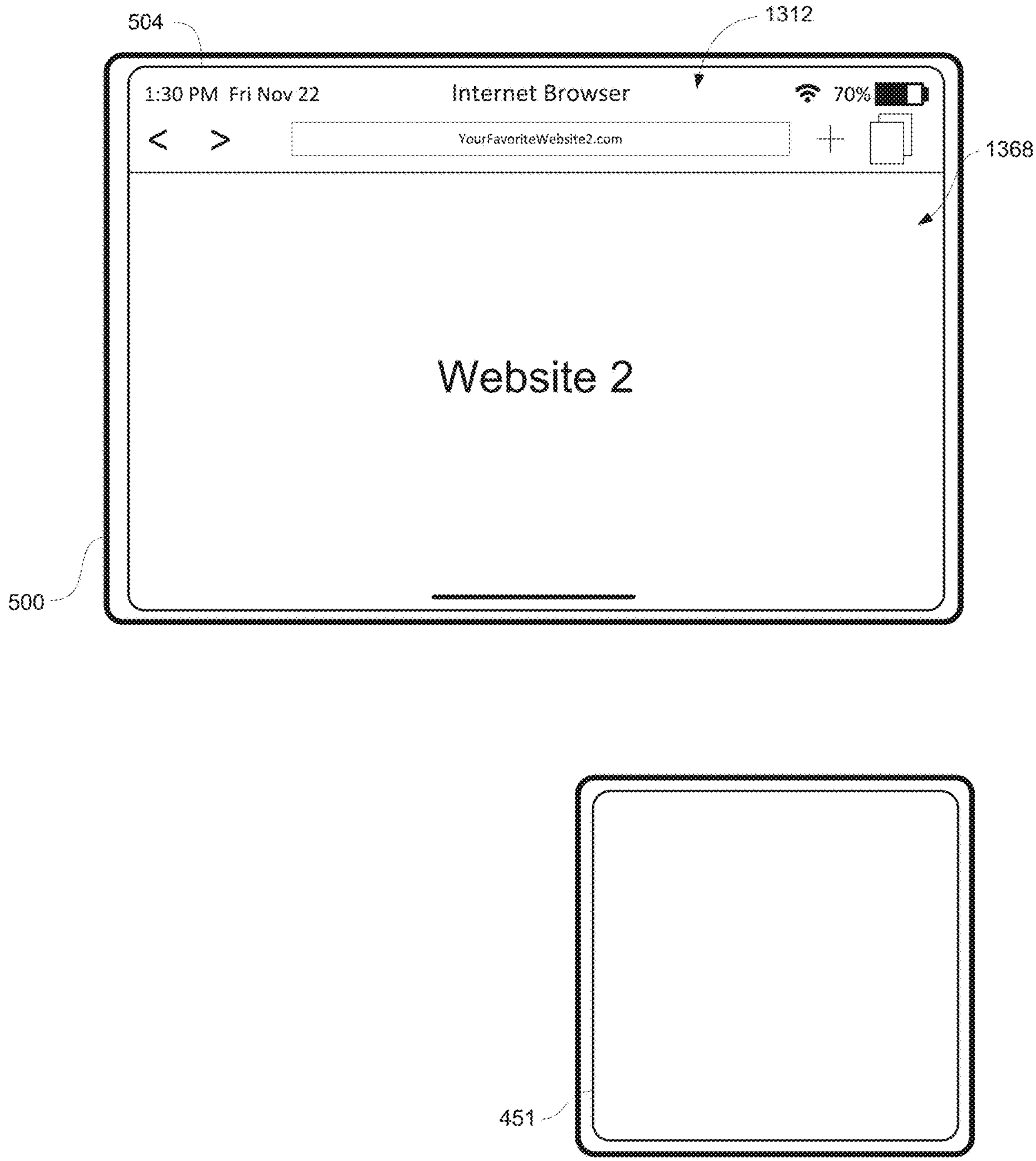
Figure 13V:
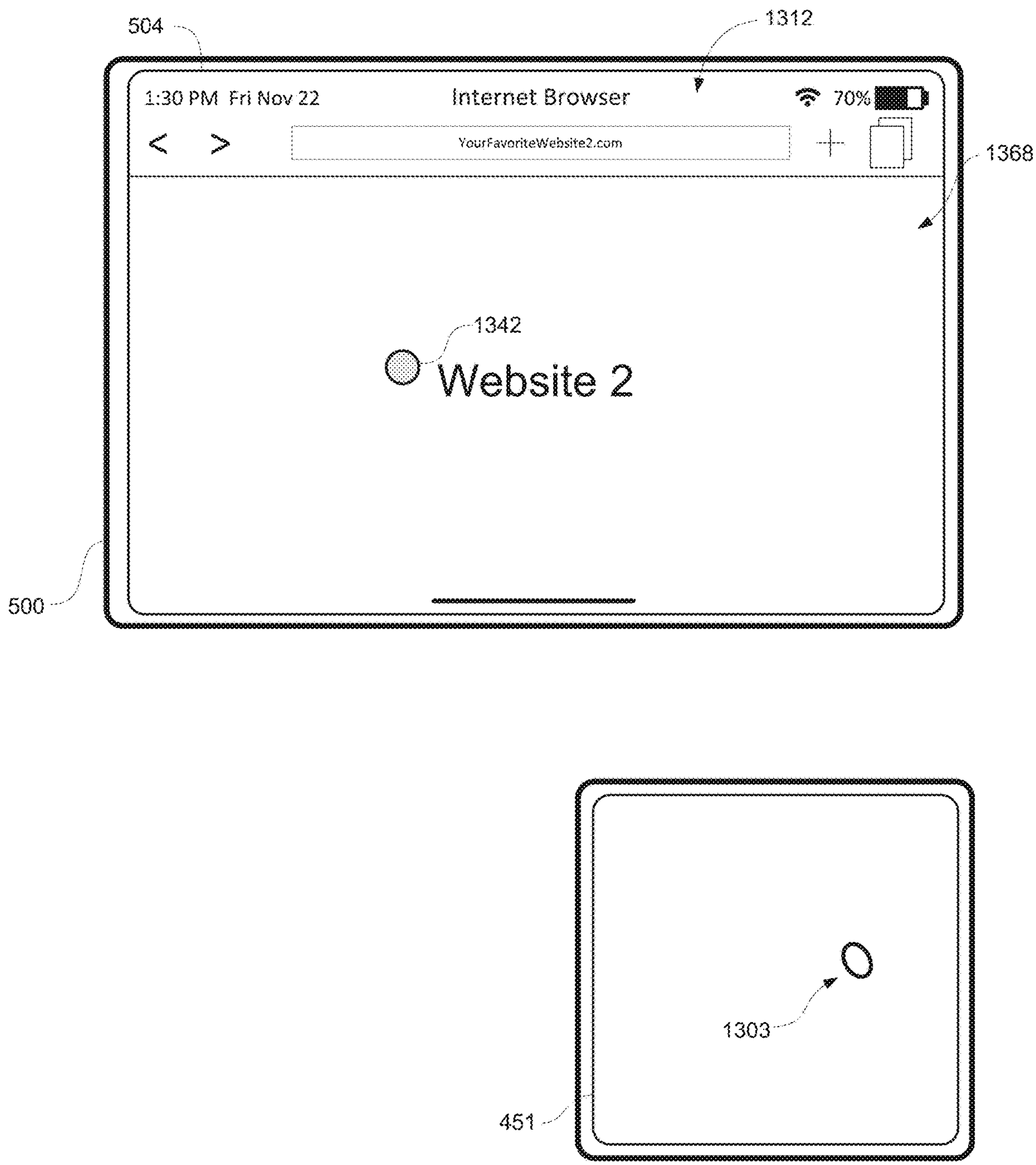
Figure 13W:
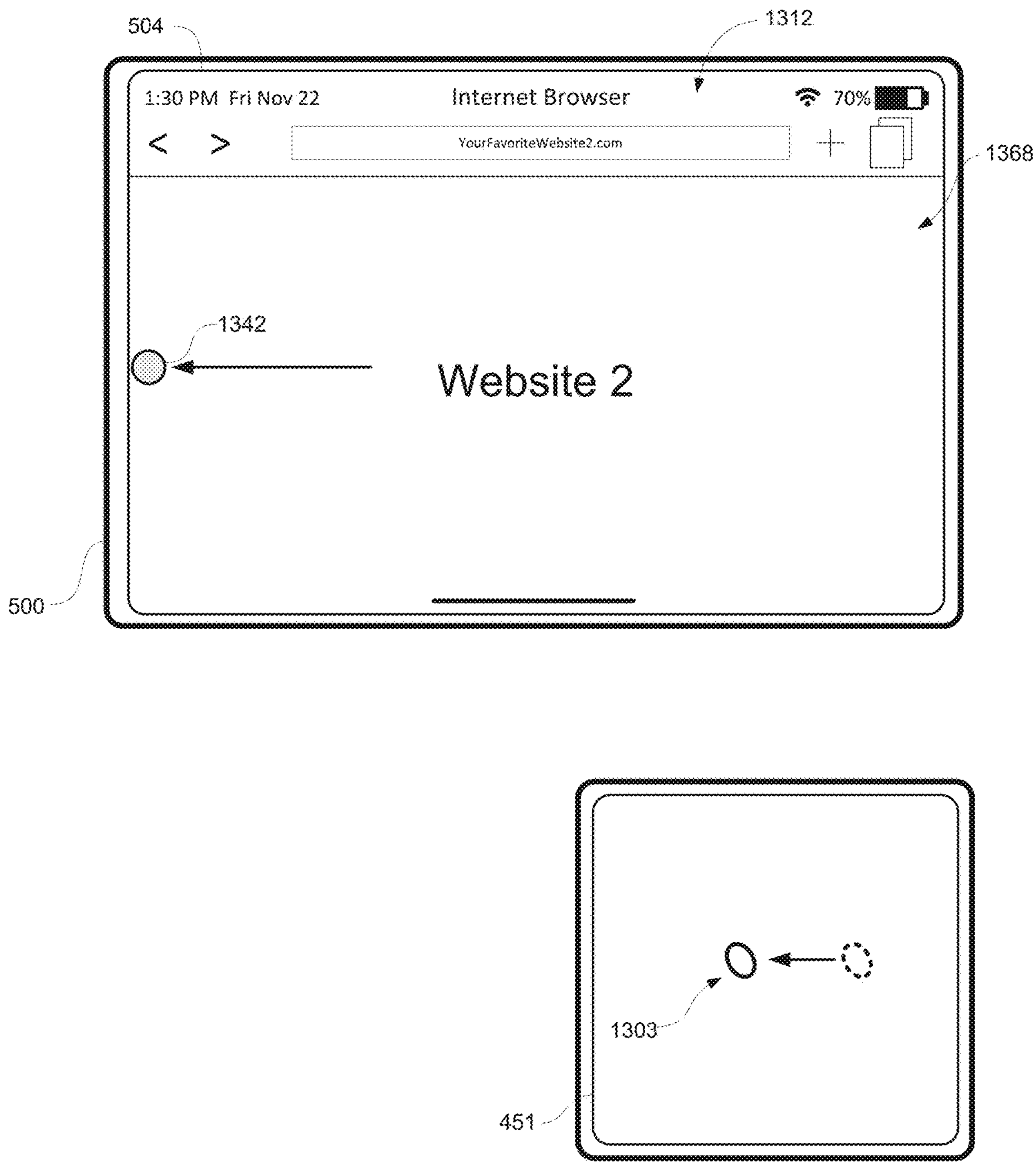
Figure 13X:
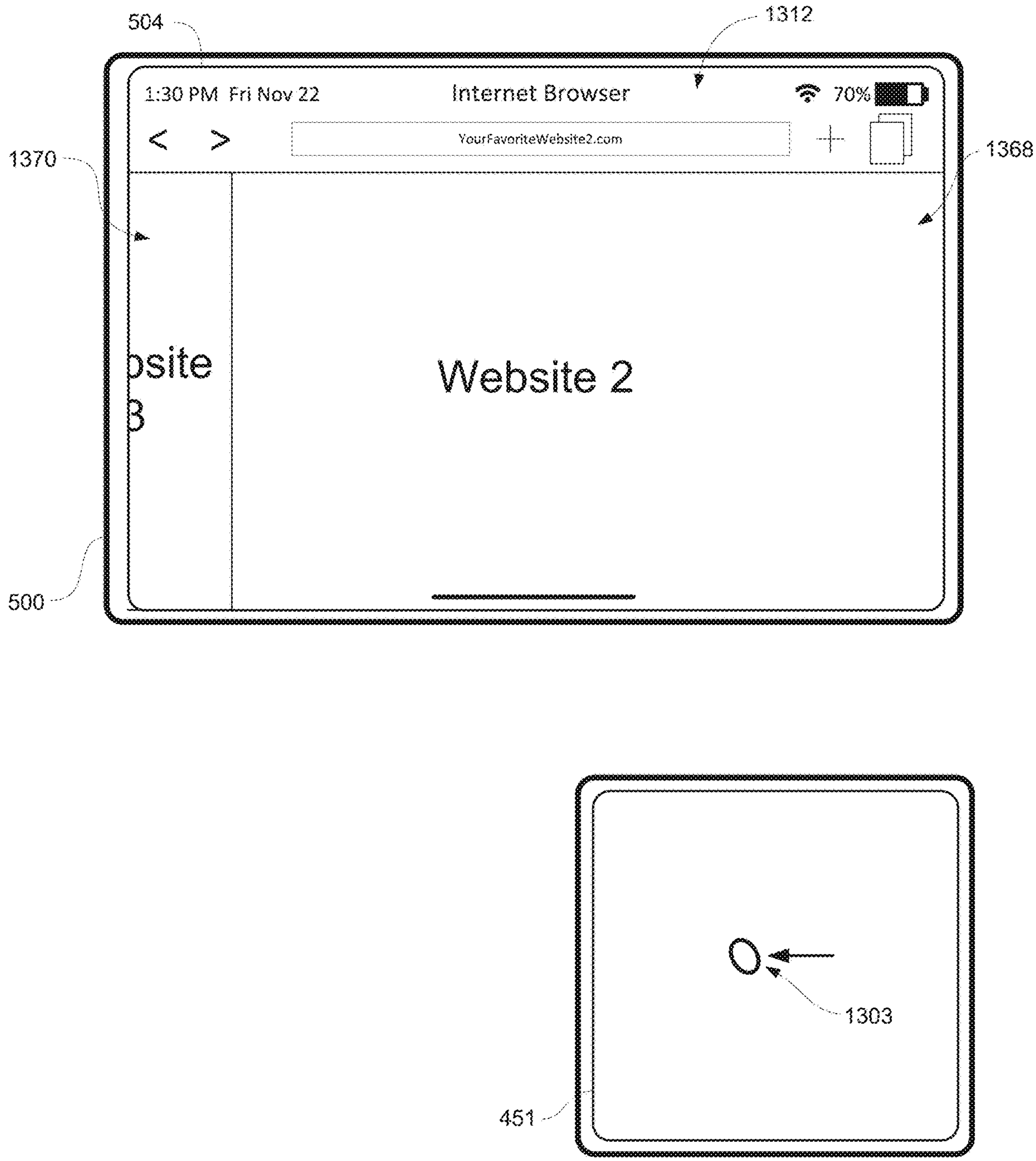
Figure 13Y:
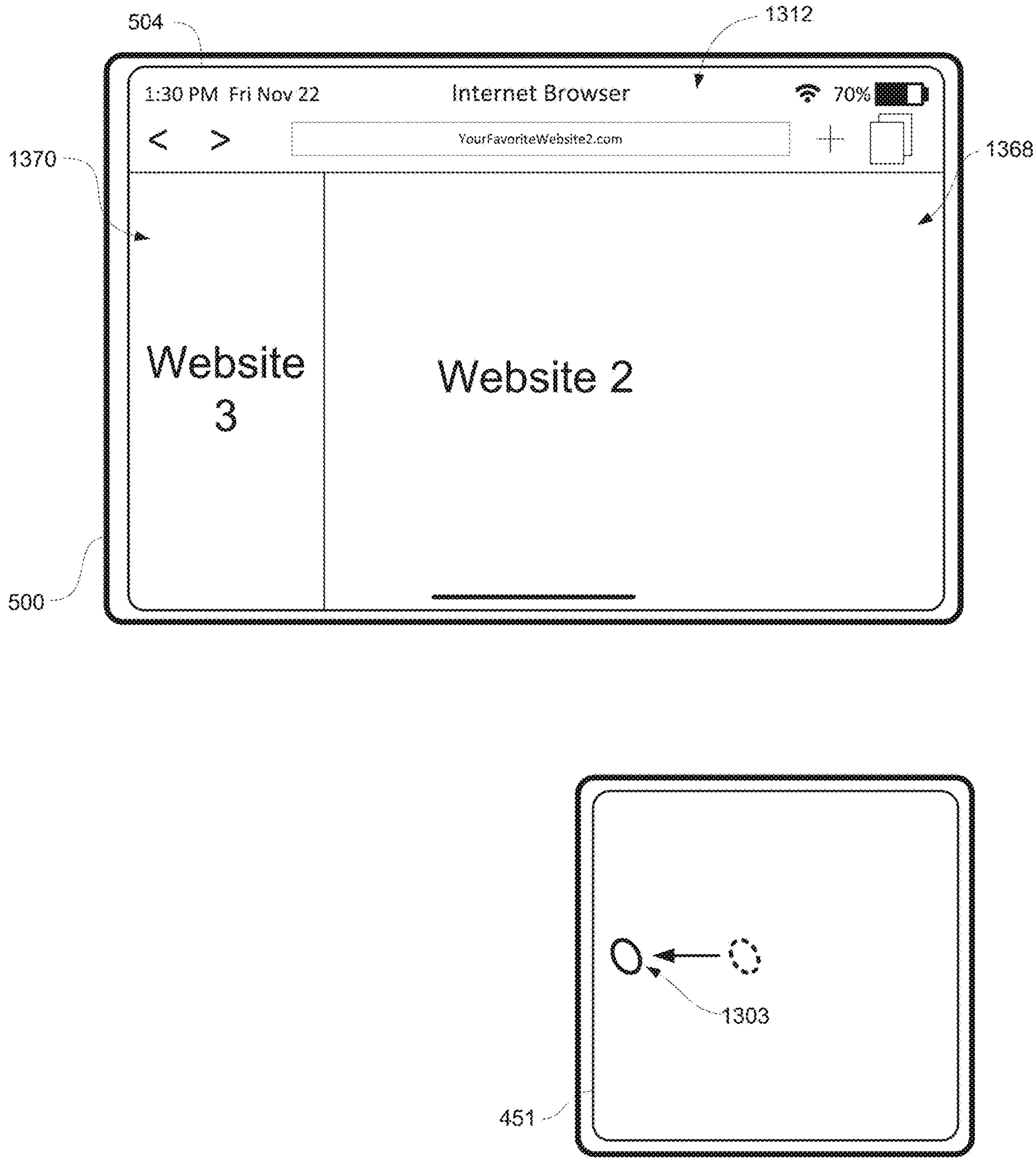
Figure 13Z:
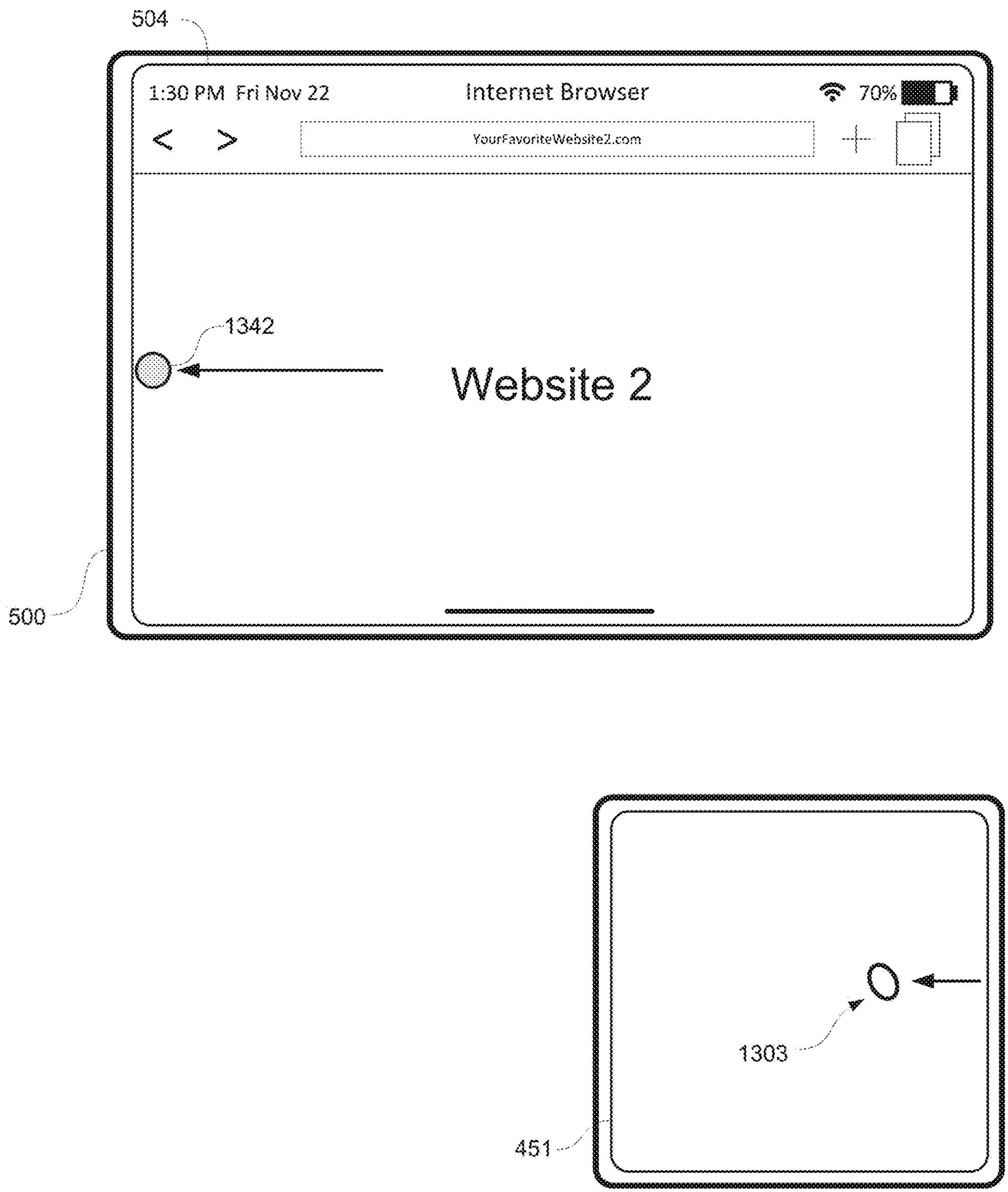
Figure 14A:
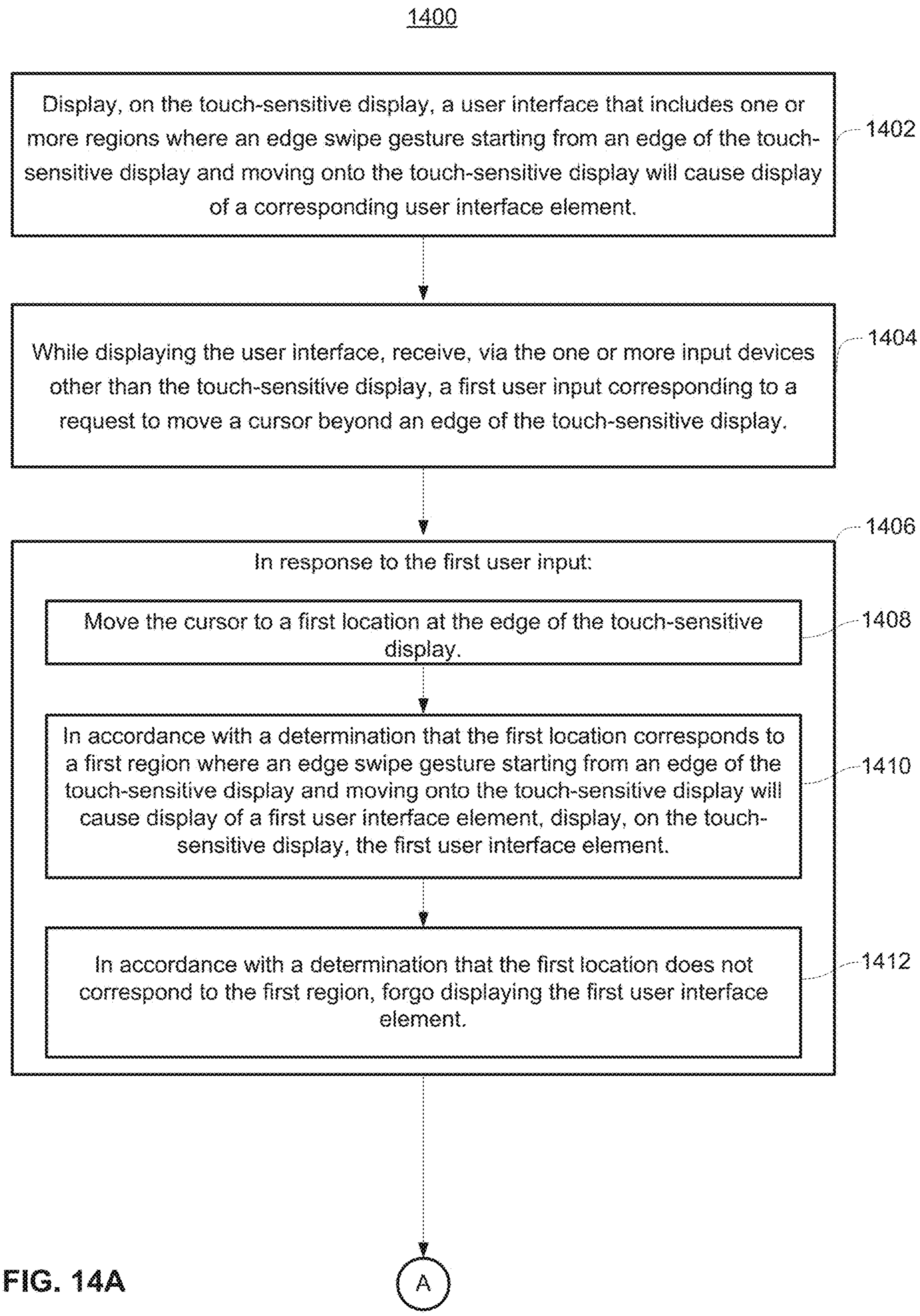
Figure 14B:
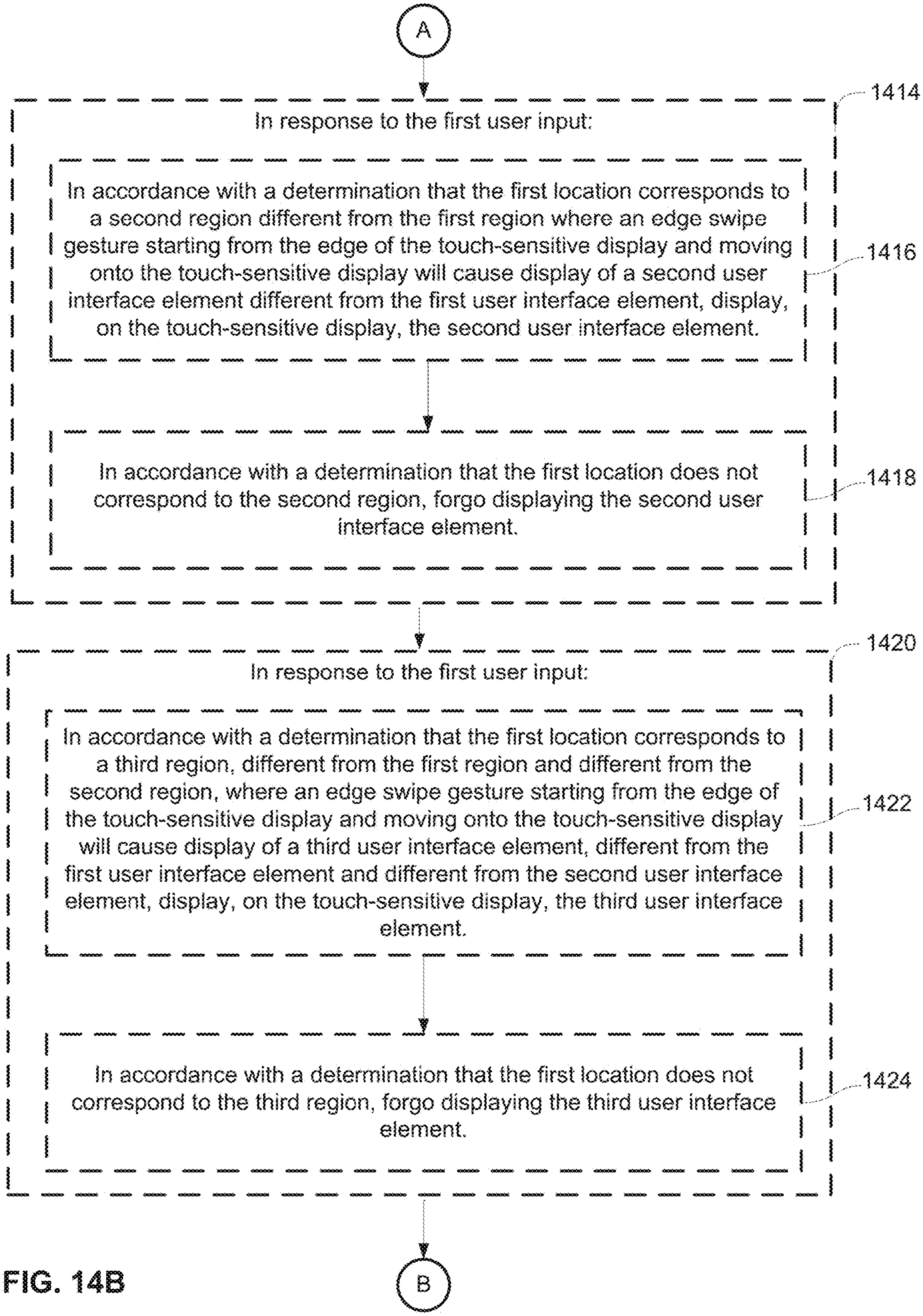
Figure 14C:
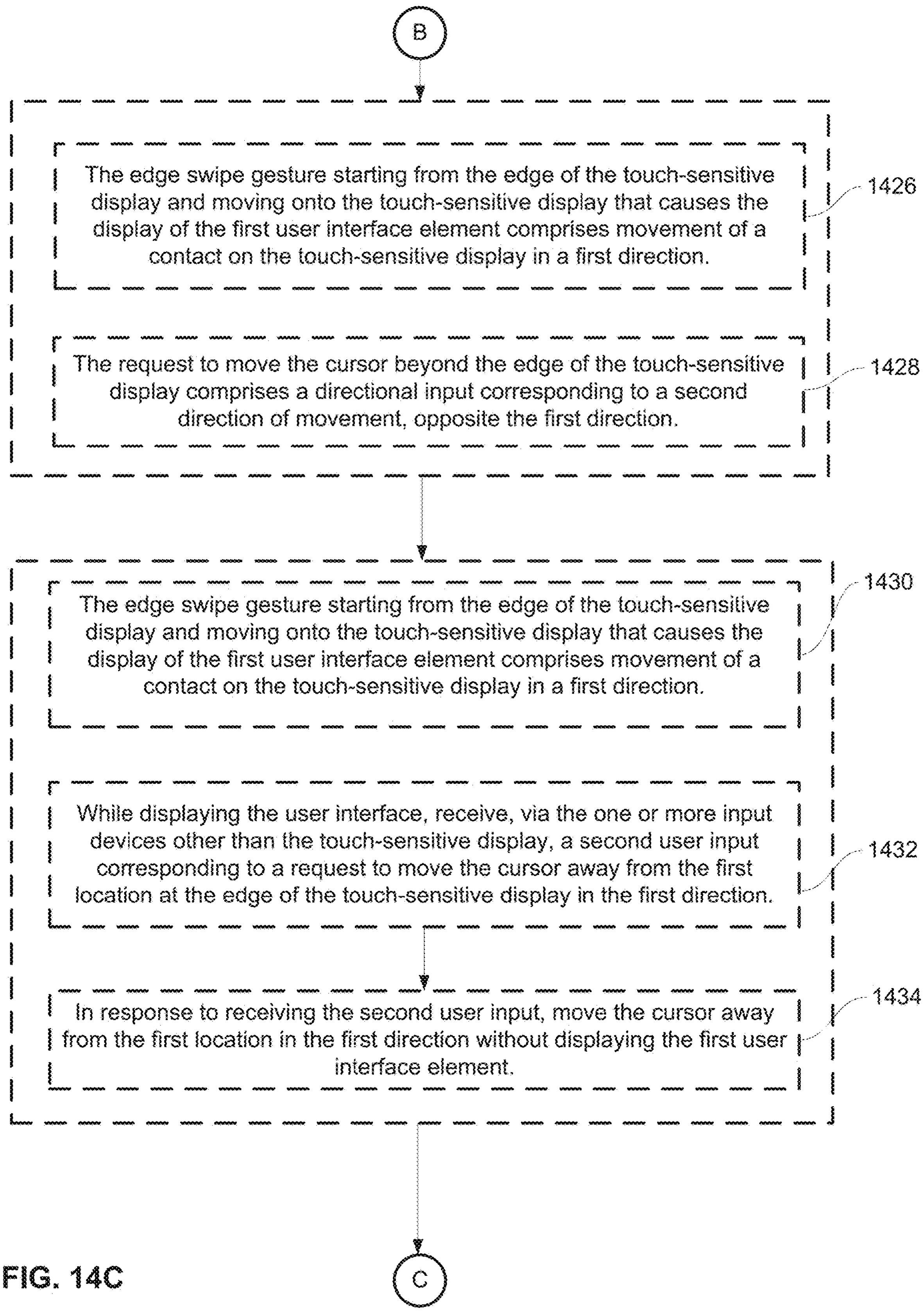
Figure 14E:
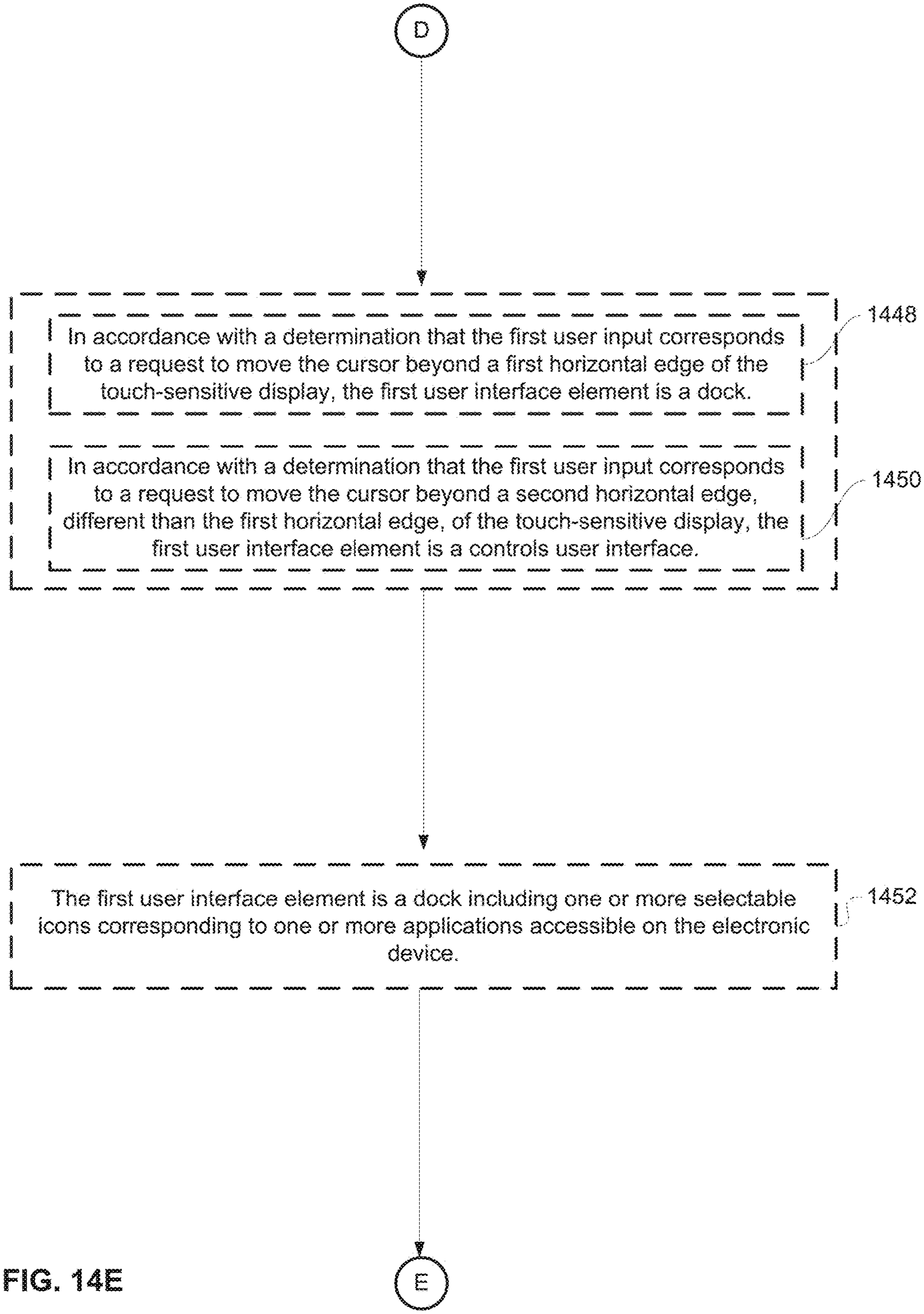
Figure 14G:
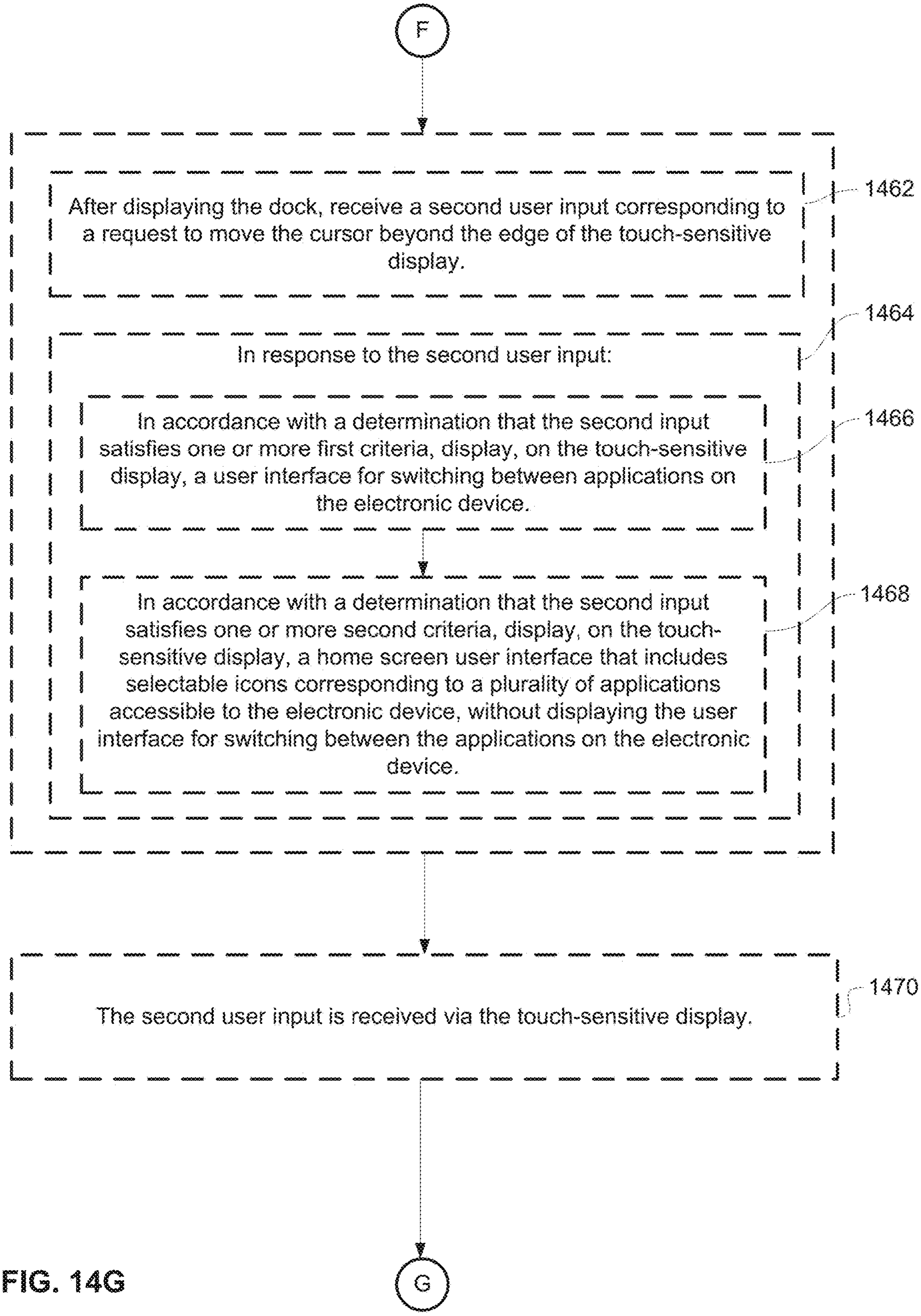
Figure 14H:
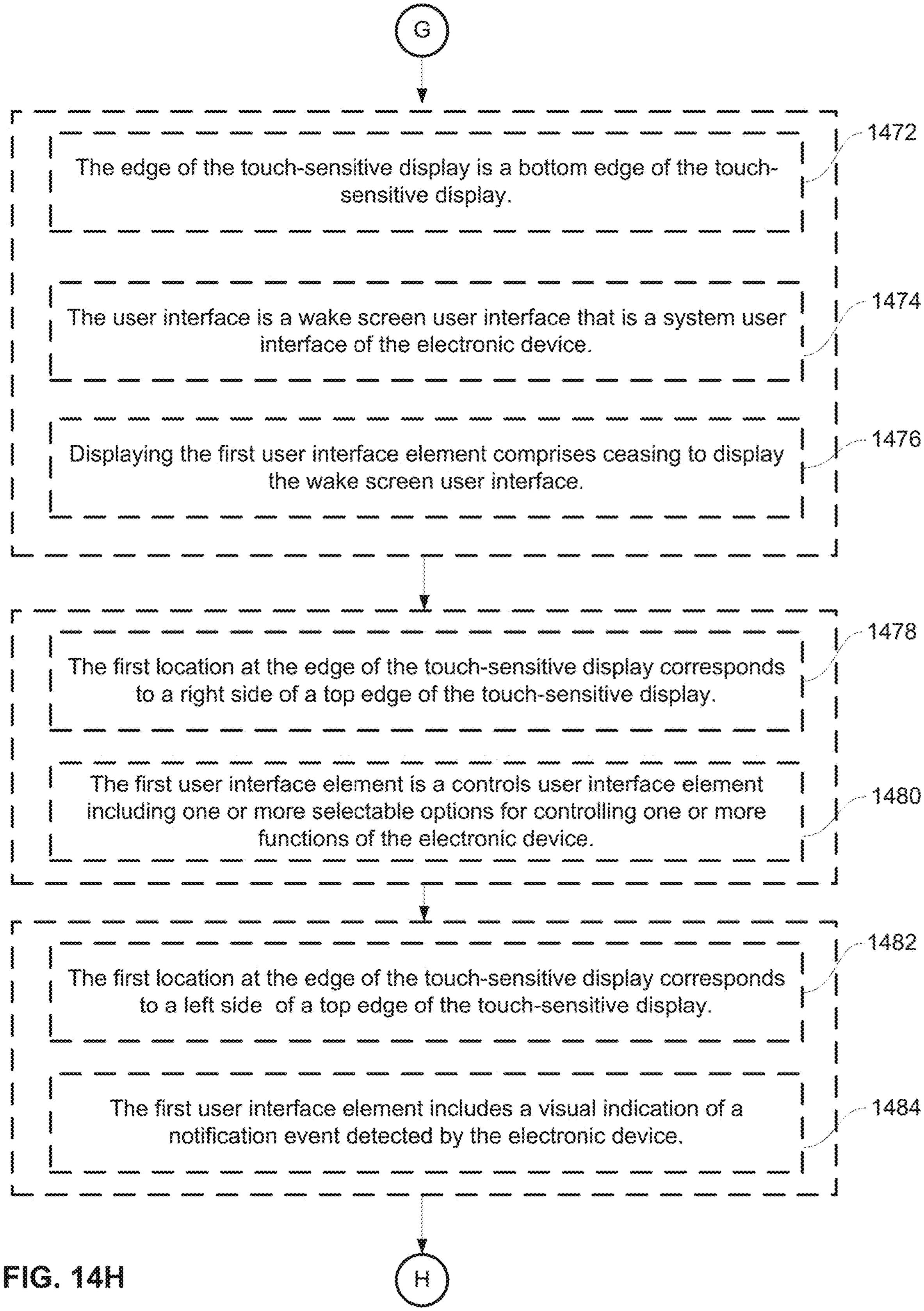

In some embodiments, the electronic device 500 displays user interfaces of various applications overlaid on (or otherwise concurrently with) one another. The electronic device 500 is optionally able to display a user interface of a first application in a display area less than the size of display 504 overlaid on the user interface of a second application that occupies the rest of the area of display 504. The electronic device 500 is optionally able to "hide" the user interface of the first application in response to detecting an input to drag the user interface off of the edge of the display 504. Likewise, the electronic device 500 optionally displays the user interface of the first application overlaid on the user interface of the second application in response to an input to drag the user interface of the first application onto the display 504 from the edge of the display 504. FIGS. 13Z-13RR illustrate ways the electronic device 500 enables manipulation of a user interface of an application that is overlaid on the user interface of a different application in response to inputs received at the touch screen 504 and/or by the external touch-sensitive surface 451.

In FIG. 13Z, while displaying the note taking application user interface 1302, the electronic device 500 detects contact of hand 1338 (e.g., a finger from hand) on the touch screen 504. The user optionally has not previously hidden another user interface past the edges of display 504. Thus, as shown in FIG. 13AA, in response to detecting a swipe gesture (e.g., performed by hand 1338 in contact with touch screen 504) from the right edge of the display 504 towards the center of the display 504, no other user interface is displayed overlaid on the note taking application user interface 1302. Likewise, as described below with reference to FIGS. 13CC-13DD, an input received at the external touch-sensitive surface 451 that corresponds to a request to move the cursor beyond the right edge of the display 504 does not cause the electronic device 500 to display another user interface overlaid on the note taking application user interface 1302.

In FIG. 13BB, the user makes contact 1303 with the external touch-sensitive surface 451. In response to detecting the contact 1303 with the external touch-sensitive surface 451, the electronic device 500 displays the cursor 1342 in the user interface 1302. In FIG. 13CC, the user performs a swipe (e.g., with contact 1303) on external touch-sensitive surface 451. The swipe is towards the right. In response to detecting the swipe, the electronic device 500 moves the cursor 1342 in accordance with the swipe to a location at the right edge of the touch screen 504.

As shown in FIG. 13DD, the user performs a swipe (e.g., with contact 1303) on external touch-sensitive surface 451 to the right while cursor 1342 was displayed along the right edge of touch screen 504. Because there is no user interface "hidden" past the right edge of the display 504, the electronic device 500 does not display a user interface overlaid on the note taking application user interface 1302 in response to detecting the swipe. In response to detecting the swipe input illustrated in FIG. 13DD, the electronic device 500 continues to display the cursor 1342 at the location at the right edge of the display 504.

In FIGS. 13EE-13JJ, the electronic device 500 detects a sequence of inputs for displaying the user interface of another application overlaid on the note taking application user interface 1302. In response to the sequence of inputs, the electronic device 500 displays the user interface of the other application overlaid on the user interface 1302 of the note taking application.

In FIG. 13EE, the user performs a swipe (e.g., with contact 1303) on the external touch-sensitive surface 451 in the down and to the left. In accordance with the detected swipe, the electronic device 500 moves the cursor 1342 to a location at the bottom edge of the display 504. As shown in FIG. 13FF, the user performs a downward swipe (e.g., with contact 1303) on external touch-sensitive surface 451. In response to detecting the downward swipe illustrated in FIG. 13FF while the cursor 1342 is displayed at the location illustrated in FIG. 13EE, the electronic device 500 displays the dock 1360.

As shown in FIG. 13GG, after displaying the dock 1360, the cursor 1342 is displayed with a size, shape, and location indicating selection of icon 1362-6, because icon 1362-6 was optionally the icon in dock 1360 that was closest to cursor 1342 when dock 1360 was displayed (e.g., such as described above with respect to method 1200). Icon 1362-6 is associated with App 6, which is one of the applications accessible to the electronic device.

In FIG. 13HH, the user selects (e.g., with contact 1303 on external touch-sensitive surface 451) the icon 1362-6. While the selection is occurring (e.g., during click-down, or intensity greater than an intensity threshold, on touch-sensitive surface 451), the cursor 1342 is displayed at a smaller size than the size illustrated in FIG. 13GG to indicate to the user that selection is occurring (e.g., such as described above with respect to methods 800 and 1200). In FIG. 1311, the user performs a swipe (e.g., with contact 1303) in a direction up and to the right while continuing the selection input (e.g., click down) on touch-sensitive surface 451. In response to detecting the swipe, the electronic device 500 animates motion of a user interface 1310 of App 6 from the icon 1362-6 to a location overlaid on the note taking application user interface 1302. The user interface 1310 optionally moves in accordance with movement of contact 1303 on the external touch-sensitive surface.

As shown in FIG. 13JJ, in response to liftoff of contact 1303 from the external touch-sensitive surface 451, the electronic device 500 displays the user interface 1310 of App 6 overlaid on the user interface of the note taking application user interface 1302 at a location on the right side of the display 504. As will be described below with reference to FIGS. 13KK-13RR, the electronic device 500 shows and hides the user interface 1310 of App 6 in response to inputs received by the touch screen 504 and/or inputs received by the external touch-sensitive surface 451.

In FIG. 13KK, the electronic device 500 detects contact of hand 1338 (e.g., a finger from hand 1338) on the touch screen 504 at a location at the left edge of the user interface 1310 of App 6. The contact moves towards the right edge of the touch screen 504. In response to detecting the movement of the contact from the left edge of the user interface 1310 of App 6 towards the right edge of the display 504, the electronic device 500 displays an animation of the user interface 1310 sliding off the right edge of the display 504 with the motion of the contact of hand 1338. In response to determining that the swipe gesture displayed in FIG. 13KK meets one or more criteria (e.g., based on speed or size of the swipe), the electronic device 500 ceases displaying the user interface 1310 of App 6, as shown in FIG. 13LL.

As shown in FIG. 13MM, in response to detecting an edge swipe gesture starting from the right edge of the touch screen 504, the electronic device 500 displays an animation of the user interface 1310 sliding onto the touch screen 504 as contact of hand 1338 (e.g., a finger from hand 1338) moves to the left. The electronic device 500 displays the user interface 1310 of App 6 in response to the edge swipe gesture from the right side of the display 504 because the user interface 1310 of App 6 was previously hidden, as shown in FIGS. 13KK-13LL. In accordance with a determination that the swipe gesture illustrated in FIG. 13MM meets one or more criteria (e.g., speed or distance criteria), the electronic device 500 displays the user interface 1310 of App 6 as shown in FIG. 13JJ.

In FIG. 13NN, the electronic device 500 displays the note taking application user interface 1302. The user interface 1310 of App 6 is optionally hidden off of the right edge of the display 504. As shown in FIG. 1300, the user makes contact 1303 with the external touch-sensitive surface 451. In response to detecting contact 1303, the electronic device 500 displays cursor 1342 as shown in FIG. 1300. In FIG. 13PP, the user performs a swipe (e.g., with contact 1303) to the right on the external touch-sensitive surface 451. In response to the swipe illustrated in FIG. 13PP, the electronic device 500 moves the cursor 1342 to the right edge of the display 504.

While the cursor 1342 is displayed at the location illustrated in FIG. 13PP, the user performs a further swipe (e.g., with contact 1303) to the right, as shown in FIG. 13QQ. In response to detecting the swipe, the electronic device 500 begins to display the user interface 1310 of App 6. The size of the portion of user interface 1310 displayed is proportionate to the speed and/or distance of the swipe. As the user continues the swipe with contact 1303 on external touch-sensitive surface 451, the electronic device 500 displays a larger portion of the user interface 1310 of App 6 overlaid on the user interface 1302 of the note taking application.

As shown in FIG. 13RR, as the user continues to swipe (e.g., with contact 1303 on external touch-sensitive surface 451), the electronic device 500 displays the entire user interface 1310 of App 6 overlaid on the user interface 1302 of the note taking application. In some embodiments, the electronic device animates the user interface 1310 sliding onto the display by an amount that corresponds to movement of contact 1303 in a manner similar to the manner in which the notifications user interface is displayed, as described above with reference to FIGS. 13H-13I. Thus, FIGS. 13Z-13RR illustrate ways the electronic device 500 controls display of a user interface of an application that is overlaid on the user interface of a different application in response to inputs received at the touch screen 504 and/or by the external touch-sensitive surface 451.

The display of various user interface elements described above with reference to FIGS. 13A-13RR in response to edge swipe gestures detected on the touch screen 504 or inputs detected at touch-sensitive surface 451 are optionally interactions with and/or of the operating system of electronic device 500. In some embodiments, one or more applications accessible to the electronic device 500 also include features controlled in response to detecting edge swipe gestures with the touch screen 504 and/or beyond-edge cursor movements detected via touch-sensitive surface 451. FIGS. 13SS-13AAA illustrate exemplary interactions with an internet browsing application that includes web page navigation features controlled in response to detecting edge swipe gestures with the touch screen and/or beyond-edge cursor movements detected via touch-sensitive surface 451.

In some embodiments, the internet browsing application includes navigation features that are controlled with swipe gestures detected on the touch screen 504 and with requests to move a cursor 1342 beyond the edge of the display 504 detected by external touch-sensitive surface 451. FIGS. 13SS-13YY illustrate navigating an internet browsing application with the touch screen 504 and with the external touch-sensitive surface 451.

In FIG. 13SS, the electronic device 500 displays the user interface 1312 of an internet browsing application. The user interface 1312 includes a webpage 1366 for Website 1. As shown in FIG. 13TT, the user touches the touch screen 504 with hand 1338 (e.g., a finger of hand 1338) to perform a swipe gesture from the left edge of the touch screen 504 towards the right. In response to detecting the swipe, the electronic device 500 displays the webpage 1368 for Website 2. Website 2 is optionally the webpage that was displayed prior to displaying Website 1 (e.g., the webpage that the user requested immediately prior to requesting Website 1). Thus, the swipe input illustrated in FIG. 13TT causes the internet browsing application to navigate "back."

The electronic device 500 displays an animation of the webpage 1368 moving onto the display 504 from the left in accordance with movement of the contact of hand 1338 on the touch screen. As the user continues to swipe, a larger portion of the webpage 1368 is displayed. In response to determining that the swipe illustrated in FIG. 13TT meets one or more criteria (e.g., based on speed, time, or distance of the swipe), the electronic device 500 displays the entire view of the webpage 1368, as shown in FIG. 13UU.

As shown in FIG. 13VV, the user makes contact 1303 with external touch-sensitive surface 451. In response to detecting the contact 1303 on the external touch-sensitive surface 451, the electronic device 500 displays cursor 1342. In FIG. 13WW, the user performs a swipe (e.g., with contact 1303) to the left on external touch-sensitive surface 451. In response to the swipe, the electronic device 500 moves the cursor 1342 to the left edge of the display 504.

While displaying the cursor 1342 at the location illustrated in FIG. 13VV, the electronic device 500 detects a swipe (e.g., of contact 1303 on external touch-sensitive surface 451) to the left, as shown in FIG. 13XX. In response to detecting the swipe, the electronic device 500 begins to display another webpage 1370 that had been previously displayed before displaying the webpage 1368 of Website 2. The electronic device 500 displays an animation of the webpage 1370 moving onto the display 504 in accordance with the swipe gesture detected by external touch-sensitive surface 451. As shown in FIG. 13YY, as the user continues to swipe, a larger portion of the webpage 1370 proportionate to the swipe (e.g., the time, distance, or speed of the swipe) is displayed. Once the swipe meets one or more criteria (e.g., based on time, distance, or speed of the swipe), the electronic device 500 displays the webpage 1370 in place of webpage 1368 of Website 2. Thus, FIGS. 13SS-13YY illustrate navigating an internet browsing application with the touch screen 504 and with the external touch-sensitive surface 451.

In some embodiments, functions of applications accessible on the electronic device 500 that are controlled with edge swipe gestures are not performed in response to detecting beyond-edge cursor movements detected via external touch-sensitive surface 451. In FIG. 13ZZ, the user performs a swipe (e.g., with contact 1303) on external touch-sensitive surface 451 to the left while displaying a webpage with the internet browsing application. In response to the swipe input illustrated in FIG. 13ZZ, the electronic device 500 moves the cursor 1342 to the left edge of the display 504.

While displaying the cursor 1342 at the location illustrated in FIG. 13ZZ, the electronic device 500 detects the swipe input (e.g., with contact 1303 on external touch-sensitive surface 451) illustrated in FIG. 13AAA. As shown in FIG. 13AAA, the electronic device 500 does not display a different web page in response to the swipe input, and instead continues to display the currently-displayed web page and continues to display the cursor 1342 at the left edge of the display 504. Thus, in some embodiments, only operating system-level functions are performed in response to beyond-edge cursor movements detected via touch-sensitive surface 451, rather than performing both operating system-level and application-level functions in response to beyond-edge cursor movements detected via touch-sensitive surface 451. In some embodiments, even though application-level functions are not performed in response to beyond-edge cursor movements detected via touch-sensitive surface 451, those application-level functions optionally are performed in response to corresponding edge swipe gestures detected via touch screen 504, as previously described.

Thus, FIGS. 13SS-13AAA illustrate exemplary interactions with an internet browsing application that includes web page navigation features controlled in response to detecting edge swipe gestures with the touch screen and/or detecting beyond-edge cursor movements with the external touch-sensitive surface.

FIGS. 14A-14I are flow diagrams illustrating a method 1400 of displaying user interface elements in response to user inputs corresponding to requests to move the cursor beyond the edge of a touch screen according to some embodiments of the disclosure. The method 1400 is optionally performed at an electronic device such as device 100, device 300, device 500, device 501, device 510, and device 591 as described above with reference to FIGS. 1A-1B, 2-3, 4A-4B and 5A-5I. Some operations in method 1400 are, optionally combined and/or order of some operations is, optionally, changed.

As described below, the method 1400 provides ways to display user interface elements in response to detecting inputs for moving a cursor beyond an edge of a display. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1400 is performed at an electronic device in communication with one or more input devices, including a touch-sensitive display (e.g., a mobile device (e.g., a tablet, a smartphone, a media player, or a wearable device) including a touch screen, or a computer including a touch screen, optionally in communication with one or more of a (e.g., external) mouse, (e.g., external) trackpad, and/or (e.g., external) touchpad, etc.). In some embodiments, such as in FIG. 13A, the electronic device 500 displays (1402), on the touch-sensitive display, a user interface 1302 that includes one or more regions where an edge swipe gesture starting from an edge (or near an edge) of the touch-sensitive display and moving onto the touch-sensitive display will cause display of a corresponding user interface element (e.g., an inward swipe from the edge of the touch-sensitive display causes display of a home screen user interface, a lock screen user interface, or a user interface of an application, etc.).

While displaying the user interface, the electronic device 500 optionally receives (1404), via the one or more input devices 451 other than the touch-sensitive display (e.g., via the external touchpad, not via the touch screen), a first user input 1303 corresponding to a request to move a cursor 1342 beyond an edge of the touch-sensitive display 504, such as in FIG. 13G (e.g., receiving an input corresponding to a request to move the cursor, such as the cursor movement inputs described with reference to method 700). In some embodiments, the input moves the cursor to the edge of the display. In some embodiments, while the cursor is at the edge of the display, the input continues moving in the direction beyond the edge of the display (or optionally another user input moving in the direction beyond the edge of the display while the cursor is at the edge of the display). For example, a rightward drag on a touchpad (e.g., an external touchpad) causes the cursor to move rightwards until the cursor reaches the right edge of the display and cannot move further rightwards. After the cursor reaches the right edge of the display, the rightward drag gesture continues to be received or a new rightward drag input is received.

In response to the first user input 1303 (1406), such as in FIG. 13E, the electronic device 500 optionally moves (1408) the cursor 1342 to a first location at the edge of the touch-sensitive display (e.g., moving the cursor to the edge of the display in accordance with the input). In some embodiments, such as in FIG. 13H, in accordance with a determination that the first location corresponds to a first region where an edge swipe gesture starting from an edge of the touch-sensitive display 504 and moving onto the touch-sensitive display 504 will cause display of a first user interface element 1304, the electronic device 500 displays (1410), on the touch-sensitive display 504, the first user interface element 1304 (e.g., if the location of the cursor at the edge or near the edge of the touch-sensitive display is one in which a corresponding inward swipe gesture, received from the touch-sensitive display, from that location causes the display of the first user interface element, then the first user input received from an external touchpad moving beyond the edge of the touch-sensitive display (e.g., a direction opposite the direction detected via the touch-sensitive display) from that location also causes display of the first user interface element).

For example, if a downward swipe from the top of the touch-sensitive display causes the display of a plurality of recently received notifications (or optionally a lock screen user interface), then an upward moving input from an external touchpad (and not from the touch-sensitive display) that moves the cursor up to and beyond the top of the display also causes the display of the plurality of recently received notifications (or optionally the lock screen user interface). Examples of the first user interface element include notification user interfaces, lock screen user interfaces, wake screen user interfaces, control panels, application switching user interfaces, the next or previous applications or workspaces, applications in a picture-in-picture mode, applications in a multi-application display mode (e.g., split screen mode), etc. In some embodiments, the first user interface element slides inwards from the respective edge of the display. In some embodiments, the amount that the first user interface element slides inwards is based on the magnitude of the user input. For example, a short outward input movement (e.g., movement less than a distance threshold) causes display of only a portion of the first user interface element (e.g., peeking from the edge). A long outward input movement (e.g., movement greater than the distance threshold) optionally causes display of the entirety of the first user interface element. Similarly, a slow outward input causes a slow inward slide of the first user interface element, whereas a fast outward input causes a fast inward slide of the first user interface element. In some embodiments, if the first user interface element is not fully displayed (or is less than a threshold amount displayed), then upon termination of the user input (e.g., lift-off of the contact), the first user interface element is hidden (e.g., slides back off the display), but if the first user interface element is fully displayed (or is more than a threshold amount displayed), then upon termination of the user input, display of the first user interface element is maintained (or optionally fully displayed). In some embodiments, as the input is received requesting to move the cursor beyond the edge of the display, the cursor is at least partially maintained at the edge of the display (e.g., the cursor partially moves beyond the edge or does not move beyond the edge or otherwise cease being displayed).

In some embodiments, such as in FIG. 13DD, in accordance with a determination that the first location does not correspond to the first region, the electronic device 500 forgoes (1412) displaying the first user interface element (e.g., if the location of the cursor at the edge or near the edge of the touch-sensitive display is one in which a corresponding inward swipe gesture from that location that is received from the touch-sensitive display does not cause the display of the first user interface element, then the user input received from an external touchpad moving beyond the edge of the touch-sensitive display from that location does not cause display of the first user interface element (optionally does not cause display of any user interface element)). In some embodiments, at least a portion of the cursor is maintained at the edge of the display (e.g., 10%, 25%, 33%, 50%, 66% of the cursor moves beyond the edge of the display before the cursor stops moving).

The above-described manner of displaying a user interface via a swipe input beyond the edge of the touch-sensitive display (e.g., in response to an input moving the cursor to and beyond the edge of the touch-sensitive display) provides a quick and efficient method of displaying the first user interface element using an external input device (e.g., by displaying the first user interface element if the location beyond which the user is moving the cursor is a location in which a corresponding inward swipe via the touch-sensitive display causes the first user interface element to be displayed), which simplifies the interaction between the user and the electronic device and enhances the operability of the electronic device and makes the user-device interface more efficient (e.g., by providing the user with another method of causing display of the first user interface element using a device other than the touch-sensitive display in which swipe inputs cause the cursor to be moved in accordance with the swipe input), which additionally reduces power usage and improves battery life of the electronic device by enabling the user to use the electronic device more quickly and efficiently.

In some embodiments, such as in FIGS. 13O-13P, in response to the first user input 1303 (1414) (e.g., a request to move the cursor beyond an edge of the touch-sensitive display received at an input device other than the touch-sensitive display), in accordance with a determination that the first location corresponds to a second region different from the first region where an edge swipe gesture starting from the edge of the touch-sensitive display and moving onto the touch-sensitive display will cause display of a second user interface element 1306 different from the first user interface element, the electronic device 500 displays (1416), on the touch-sensitive display 504, the second user interface element 1306.

In some embodiments, the electronic device displays different user interface elements in response to detecting the first input while the location of the cursor is at different locations along the edges of the touch-sensitive display. For example, in response to detecting a request to move the cursor beyond the bottom edge of the display, the electronic device displays a dock and in response to detecting a request to move the cursor beyond a portion of the upper edge of the display on the right side of the upper edge, the electronic device displays a controls user interface as described above with respect to method 1200. In some embodiments, the dock includes a plurality of icons corresponding to applications accessible to the electronic device (e.g., in response to detecting selection of a respective icon, the electronic device displays a user interface of the respective application). The controls user interface optionally includes one or more selectable options that, when selected, cause the electronic device to perform a respective action that corresponds to a respective application or a system function of the electronic device.

In some embodiments, such as in FIG. 13DD, in response to the first user input (e.g., a request to move the cursor beyond an edge of the touch-sensitive display received at an input device other than the touch-sensitive display), in accordance with a determination that the first location does not correspond to the second region, the electronic device 500 forgoes (1418) displaying the second user interface element. Optionally, if the location of the cursor at the edge or near the edge of the touch-sensitive display is one in which a corresponding inward swipe gesture from that location that is received from the touch-sensitive display does not cause the display of the second user interface element, then the user input received from an external touchpad moving beyond the edge of the touch-sensitive display from that location does not cause display of the second user interface element (optionally does not cause display of any user interface element). In some embodiments, at least a portion of the cursor is maintained at the edge of the display.

The above-described manner of displaying the second user interface element in response to the input including a request to move the cursor beyond the edge of the touch-sensitive display at the second region provides a quick and efficient manner of causing display of the second user interface element using a similar mechanism as for display of the first user interface element, which simplifies the interaction between the user and the electronic device and enhances the operability of the electronic device and makes the user-device interface more efficient (e.g., by enabling the user to access various user interface elements based on the region of the edge of the touch-sensitive display corresponding to the first input), which additionally reduces power usage and improves battery life of the electronic device by enabling the user to use the electronic device more quickly and efficiently.

In some embodiments, such as in FIG. 13FF in response to the first user input (1420) (e.g., a request to move the cursor beyond an edge of the touch-sensitive display received at an input device other than the touch-sensitive display), in accordance with a determination that the first location corresponds to a third region, different from the first region and different from the second region, where an edge swipe gesture starting from the edge of the touch-sensitive display and moving onto the touch-sensitive display will cause display of a third user interface element 1360, different from the first user interface element and different from the second user interface element, the electronic device 500 displays (1422), on the touch-sensitive display 504, the third user interface element 1360.

In some embodiments, the electronic device displays different user interface elements in response to detecting the first input while the location of the cursor is at different locations along the edges of the touch-sensitive display. For example, in response to detecting a request to move the cursor beyond the bottom edge of the display, the electronic device displays a dock; in response to detecting a request to move the cursor beyond a portion of the upper edge of the display on the right side of the upper edge of the display, the electronic device displays a controls user interface; and in response to detecting a request to move the cursor beyond a portion of the upper edge of the display not on the right side of the upper edge of the display, the electronic device displays a notifications user interface. In some embodiments, the dock includes a plurality of icons corresponding to applications accessible to the electronic device (e.g., in response to detecting selection of a respective icon, the electronic device displays a user interface of the respective application). The controls user interface optionally includes one or more selectable options that, when selected, causes the electronic device to perform a respective action that corresponds to a respective application or a system function of the electronic device. The notifications user interface optionally includes a plurality of visual indications of notifications previously received at (or generated at) the electronic device.

In some embodiments, such as in FIG. 13DD, in response to the first user input (1420) (e.g., a request to move the cursor beyond an edge of the touch-sensitive display received at an input device other than the touch-sensitive display), in accordance with a determination that the first location does not correspond to the third region, the electronic device 500 forgoes (1424) displaying the third user interface element. Optionally, if the location of the cursor at the edge or near the edge of the touch-sensitive display is one in which a corresponding inward swipe gesture from that location that is received from the touch-sensitive display does not cause the display of the third user interface element, then the user input received from an external touchpad moving beyond the edge of the touch-sensitive display from that location does not cause display of the third user interface element (optionally does not cause display of any user interface element). In some embodiments, at least a portion of the cursor is maintained at the edge of the display.

The above-described manner of displaying the third user interface element in response to the input including a request to move the cursor beyond the edge of the touch-sensitive display at the third region provides a quick and efficient manner of causing display of the third user interface element using a similar mechanism as for display of the first and second user interface elements, which simplifies the interaction between the user and the electronic device and enhances the operability of the electronic device and makes the user-device interface more efficient (e.g., by enabling the user to access various user interface elements based on the region of the edge of the touch-sensitive display corresponding to the first input), which additionally reduces power usage and improves battery life of the electronic device by enabling the user to use the electronic device more quickly and efficiently.

In some embodiments, such as in FIGS. 13B-13C, the edge swipe gesture starting from the edge (or near an edge) of the touch-sensitive display 504 and moving onto the touch-sensitive display 504 that causes the display of the first user interface element 1304 comprises movement of a contact (e.g., of hand 1338) on the touch-sensitive display 504 in a first direction (1426) (e.g., a direction from the edge or near-edge of the touch-sensitive display towards the middle of the touch sensitive display). In some embodiments, such as in FIGS. 13G-13H, the request to move the cursor 1342 beyond the edge of the touch-sensitive display 504 comprises a directional input corresponding to a second direction of movement, opposite the first direction (1428) (e.g., a direction away from the middle of the touch-sensitive display). In some embodiments, the directional input is an input to move the cursor in a respective direction. For example, swipes on an external touch-sensitive surface (e.g., a trackpad), movement of a mouse, movement of a joystick, or activation of a directional button are directional inputs.

The above-described manner of displaying the user interface element in response to an edge swipe gesture towards the center of the touch-sensitive display or a request to move the cursor beyond the edge of the touch-sensitive display in an opposite direction from the direction of the edge swipe gesture provides an efficient way of accessing the functionality of the edge swipe gesture when using an input device other than the touch-sensitive display, which simplifies the interaction between the user and the electronic device and enhances the operability of the electronic device and makes the user-device interface more efficient (e.g., by providing a way of using the input device other than the touch-sensitive display to access functions performed in response to inputs received by the touch-sensitive display, thus reducing the time needed to switch between input devices), which additionally reduces power usage and improves battery life of the electronic device by enabling the user to use the electronic device more quickly and efficiently.

In some embodiments, such as in FIGS. 13B-13C, the edge swipe gesture starting from the edge (or near the edge) of the touch-sensitive display 504 and moving onto the touch-sensitive display 504 that causes the display of the first user interface element comprises movement of a contact (e.g., of hand 1338) on the touch-sensitive display 504 in a first direction (1430) (e.g., a direction from the edge or near-edge of the touch-sensitive display towards the middle of the touch sensitive display). For example, a swipe input from the right edge of the touch-sensitive display towards the left is in a direction from an edge or near-edge of the touch-sensitive display towards the middle of the touch-sensitive display.

In some embodiments, such as in FIG. 13F, while displaying the user interface 1302, the electronic device 500 receives (1432), via the one or more input devices 451 other than the touch-sensitive display 504, a second user input corresponding to a request to move the cursor 1342 away from the first location at the edge (or near the edge) of the touch-sensitive display 504 in the first direction (e.g., while the cursor is displayed at the edge of the touch-sensitive display, the electronic device detects an input corresponding to a request to move the cursor in the direction from the edge of the touch-sensitive display to the center of the touch-sensitive display). For example, the electronic device detects an input to move the cursor from the right edge of the touch-sensitive display to the left. In some embodiments, such as in FIG. 13F, in response to receiving the second user input, the electronic device 500 moves (1434) the cursor 1342 away from the first location in the first direction without displaying the first user interface element.

In some embodiments, a swipe input detected by the touch-sensitive display from the edge of the touch-sensitive display towards the middle of the touch-sensitive display causes the electronic device to display the first user interface element, but an input received via another input device (e.g., external touchpad) that corresponds to movement of the cursor from the edge of the touch-sensitive display towards the center of the touch-sensitive display causes the electronic device to move the cursor away from the edge of the touch-sensitive display in the direction of the input, but does not cause the electronic device to display the first user interface element. For example, a swipe input detected by the touch-sensitive display from the bottom edge of the display and in an upward direction causes the electronic device to display a dock, but an input received by a different input device that corresponds to a request to move the cursor from the bottom edge of the touch-sensitive display in an upward direction causes the electronic device to move the cursor away from the bottom edge of the touch-sensitive display and in an upward direction without displaying the dock. In some embodiments, however, a request to move the cursor beyond the bottom edge of the display (e.g., while the cursor is at the bottom edge of the display, receiving a downward input) received at an input device other than the touch-sensitive display causes the electronic device to display the dock.

The above-described manner of moving the cursor away from the edge of the touch-sensitive display in response to directional input from the edge of the display towards the center of the display detected at the input device other than the touch-sensitive display and displaying the first user interface element in response to a request to move the cursor beyond the edge of the touch-sensitive display provides a way of accessing the functionality of the edge swipe gesture using the input device other than the touch-sensitive display while preserving the ability to move the cursor away from the edge of the touch-sensitive display, which simplifies the interaction between the user and the electronic device and enhances the operability of the electronic device and makes the user-device interface more efficient (e.g., by reducing the number of inputs needed to access to first user interface element and reducing the number of inputs needed to move the cursor away from the edge of the touch-sensitive display), which additionally reduces power usage and improves battery life of the electronic device by enabling the user to use the electronic device more quickly and efficiently.

In some embodiments, such as in FIG. 13H, displaying the first user interface element 1304 in accordance with the determination that the first location corresponds to the first region includes (1436), in accordance with a determination that the request to move the cursor beyond the edge of the touch-sensitive display 504 is a request to move the cursor a first distance beyond the edge of the touch-sensitive display 504, the electronic device 500 animates (1438) a first portion of the first user interface element 1304 onto the touch-sensitive display 504 from beyond the edge of the touch-sensitive display (e.g., the first portion is a portion that occupies the space from the edge of the touch-sensitive display to the first distance from the edge of the touch-sensitive display). In some embodiments, the electronic device displays the first user interface element by displaying an animation of moving the first user interface element from off the edge of the touch-sensitive display to onto the touch-sensitive display. For example, in response to an input for moving the cursor beyond the top edge of the touch-sensitive display from a respective region along the top edge of the touch-sensitive display, the electronic device displays an animation of a notifications user interface moving from beyond the touch-sensitive display onto the touch-sensitive display.

In some embodiments, such as in FIG. 13I, displaying the first user interface element 1304 in accordance with the determination that the first location corresponds to the first region includes (1436), in accordance with a determination that the request to move the cursor beyond the edge of the touch-sensitive display 504 is a request to move the cursor a second distance, more than the first distance, beyond the edge of the touch-sensitive display, the electronic device 500 animates (1440) a second portion, more than the first portion, of the first user interface element 1304 onto the touch-sensitive display 504 from beyond the edge of the touch-sensitive display. In some embodiments, the second portion is a portion that occupies the space from the edge of the touch-sensitive display to the second distance from the edge of the touch-sensitive display and includes the first portion. For example, in response to detecting further input corresponding to a request to move the cursor further past the edge of the touch-sensitive display, the electronic device displays a larger portion of the first user interface element by animating further movement of the first user interface element onto the touch-sensitive display.

The above-described manner of displaying an animation of a portion of the first user interface element corresponding to the distance of the request to move the cursor in response to the request to move the cursor beyond the edge of the display provides visual confirmation that that the electronic device is displaying the first user interface element in response to the request to move the cursor beyond the edge of the touch-sensitive display, which simplifies the interaction between the user and the electronic device and enhances the operability of the electronic device and makes the user-device interface more efficient (e.g., by enabling the user to quickly identify that the first user interface element is being displayed in response to the request to move the cursor beyond the edge of the touch-sensitive display), which additionally reduces power usage and improves battery life of the electronic device by enabling the user to use the electronic device more quickly and efficiently.

In some embodiments, such as in FIG. 13PP, the edge of the touch-sensitive display 504 is a vertical edge of the touch-sensitive display (1442) (e.g., a left or right edge of the touch-sensitive display). In some embodiments, such as in FIG. 13QQ, the first user interface element 1310 is a user interface of a respective application (1444) (e.g., in response to receiving the first input, the electronic device displays the user interface of the respective application). In some embodiments, such as in FIG. 13QQ, the user interface 1310 displayed when the first user input is received is not a user interface 1302 of the respective application (1446).

The electronic device optionally displays a user interface of a different application other than the respective application or a system user interface when the first input is received. For example, while displaying the user interface of a first application, the electronic device detects the first input and, in response to receiving the first user input, the electronic device displays a user interface of a second application. In some embodiments, the respective application is an application running in the background on the electronic device. In some embodiments, the user interface of the other application is overlaid over the user interface of the first application. In some embodiments, both the user interface of the other application and the user interface of the first application are interactable. In some embodiments, the user interface of the other application occupies a smaller area of the display than the user interface of the first application.

The above-described manner of displaying the user interface of a respective application in response to the first input provides a quick and efficient way of displaying user interfaces of different applications with the input device other than the touch-sensitive display, which simplifies the interaction between the user and the electronic device and enhances the operability of the electronic device and makes the user-device interface more efficient (e.g., by reducing the number of inputs needed to display user interfaces of different applications), which additionally reduces power usage and improves battery life of the electronic device by enabling the user to use the electronic device more quickly and efficiently.

In some embodiments, such as in FIG. 13S, in accordance with a determination that the first user input corresponds to a request to move the cursor 1342 beyond a first horizontal edge of the touch-sensitive display (e.g., the bottom edge of the touch-sensitive display), the first user interface element is a dock (1448) (e.g., a collection of one or more selectable options corresponding to one or more applications accessible to the electronic device). In some embodiments, the icons in the dock include icons selected by the user to be displayed in the dock and/or icons associated with applications recently accessed on the electronic device. In response to detecting selection of one of the respective icons in the dock, the electronic device optionally accesses (e.g., displays and/or launches) the respective application associated with the respective icon, which optionally includes displaying a user interface of the respective application. For example, in response to detecting an input that corresponds to a request to move the cursor beyond the bottom edge of the display, the electronic device optionally displays the dock. In some embodiments, the dock is displayed adjacent to (e.g., at) the bottom edge of the display.

In some embodiments, such as in FIG. 13O, in accordance with a determination that the first user input corresponds to a request to move the cursor 1342 beyond a second horizontal edge, different than the first horizontal edge (e.g., a top edge of the touch-sensitive display), of the touch-sensitive display 504, the first user interface element is a controls user interface 1306 (1450), such as in FIG. 13P. The controls user interface optionally includes one or more selectable options corresponding to respective functions of the electronic device. In some embodiments, the functions are associated with applications (e.g., calculator application, clock application, media playback application, camera application) accessible to the electronic device or system functions (e.g., changing a setting of the electronic device, illuminating a light in communication with the electronic device) of the electronic device. For example, in response to detecting an input that corresponds to a request to move the cursor beyond the top edge of the touch-sensitive display, the electronic device displays the controls user interface.

The above-described manner of displaying the dock or the controls user interface depending on the edge at which the first input is received provides analogous ways of causing the electronic device to display either the dock or the controls user interface, which simplifies the interaction between the user and the electronic device and enhances the operability of the electronic device and makes the user-device interface more efficient (e.g., by reducing the number of types of inputs the user must learn to access the functionality of the electronic device, which reduces the number of inputs the user enters in an attempt to access respective device functionality), which additionally reduces power usage and improves battery life of the electronic device by enabling the user to use the electronic device more quickly and efficiently.

In some embodiments, such as in FIG. 13S, the first user interface element is a dock 1360 including one or more selectable icons 1362 corresponding to one or more applications accessible on the electronic device 500 (1452). In some embodiments, the electronic device displays the dock in response to detecting a request to move the cursor beyond the bottom edge of the touch-sensitive display. The icons in the dock are optionally selectable to display a user interface of a respective application accessible to the electronic device. For example, in response to detecting selection of an icon associated with an e-mail application, the electronic device displays a user interface of the e-mail application.

The above-described manner of displaying the dock in response to the first user input provides a quick and efficient way of accessing the dock with an input device other than the touch-sensitive display which simplifies the interaction between the user and the electronic device and enhances the operability of the electronic device and makes the user-device interface more efficient (e.g., by enabling the user to access the dock without switching from the input device other than the touch-sensitive display to the touch-sensitive display), which additionally reduces power usage and improves battery life of the electronic device by enabling the user to use the electronic device more quickly and efficiently.

In some embodiments, such as in FIG. 13FF, the dock 1360 includes a first respective selectable icon 1362-6 corresponding to a first application and a second respective selectable icon 1362-5 corresponding to a second application (1454) (e.g., the first icon is selectable to display a user interface of a first application and the second icon is selectable to display a user interface of a second application). The first icon and the second icon are optionally displayed next to each other, or anywhere in the dock, along the bottom edge of the touch-sensitive display. In some embodiments, such as in FIG. 13GG, after displaying the dock 1360 (1456), in accordance with a determination that the cursor 1342 is closest to the first respective selectable icon 1362-6 in the dock, the electronic device 500 displays (1458) an animation of the cursor 1342 changing appearance based on an appearance of the first respective selectable icon 1362-6, and selecting the first respective selectable icon for input with the cursor 1360.

In some embodiments, displaying the animation of the cursor changing appearance to be based on the first respective selectable icon includes changing the size of the cursor and the location of the cursor such that the cursor extends beyond the edges of the first respective selectable icon and changing the location of the cursor so the center of the cursor and the center of the first respective selectable icon are at the same location, such as described above with respect to method 700 and 800. For example, the cursor's appearance optionally changes to a shape behind the icon, around the icon, or partially transparent and overlaid on the icon to create the appearance of a glow or highlight around the icon. In some embodiments, after selecting the first respective selectable icon for input with the cursor, further input corresponding to selection of a user interface element coincident with the cursor (e.g., primary click, left click, one-finger click from an external touchpad) or input corresponding to a request to display a contextual menu of the user interface element coincident with the cursor (e.g., secondary click, right click, two-finger click from an external touchpad) is directed towards the first respective selectable icon.

In some embodiments, after displaying the dock (1456), in accordance with a determination that the cursor is closest to the second respective selectable icon 1362-5 in the dock, the electronic device 500 displays (1460) an animation of the cursor 1342 changing appearance based on an appearance of the second respective selectable icon 1362-5, and selecting the second respective selectable icon 1362-5 for input with the cursor 1342, such as displaying cursor 1342 around icon 1362-5 instead of icon 1362-6 in FIG. 13GG.

In some embodiments, displaying the animation of the cursor changing appearance based on the appearance of the second respective selectable icon includes changing the size of the cursor and the location of the cursor such that the cursor extends beyond the edges of the second respective selectable icon and changing the location of the cursor so the center of the cursor and the center of the second respective selectable icon are at the same location, such as described above with respect to method 700 and 800. For example, the cursor's appearance optionally changes to a shape behind the icon, around the icon, or partially transparent and overlaid on the icon to create the appearance of a glow or highlight around the icon. In some embodiments, after selecting the second respective selectable icon for input with the cursor, further input corresponding to selection of a user interface element coincident with the cursor (e.g., primary click, left click, one-finger click from an external touchpad) or input corresponding to a request to display a contextual menu of the user interface element coincident with the cursor (e.g., secondary click, right click, two-finger click from an external touchpad) is directed towards the second respective selectable icon. Thus, in some embodiments, once the dock is displayed, without further cursor movement input, the cursor selects for input the icon in the dock that is closest to the cursor when the dock was displayed (e.g., because the cursor was already located along the bottom edge of the display at which the dock is displayed).

The above-described manner of displaying an animation of the cursor changing appearance based on an icon in the dock closest to the location of the cursor once the dock is displayed provides a quick and efficient way of moving the cursor to a location coincident with the dock in response to displaying the dock, which simplifies the interaction between the user and the electronic device and enhances the operability of the electronic device and makes the user-device interface more efficient (e.g., by reducing the number of inputs needed to interact with the dock after causing the electronic device to display the dock), which additionally reduces power usage and improves battery life of the electronic device by enabling the user to use the electronic device more quickly and efficiently.

In some embodiments, such as in FIG. 13T, after displaying the dock 1360, the electronic device 500 receives a second user input corresponding to a request to move the cursor beyond the edge of the touch-sensitive display 504 (1462) (e.g., a further movement of the cursor beyond the bottom edge of the touch-sensitive display). In some embodiments, in response to the second user input (1464), in accordance with a determination that the second input satisfies one or more first criteria (e.g., includes a pause in movement having a duration above a predetermined threshold duration (e.g., 0.01, 0.5, or 1 second) following the request to move the cursor beyond the edge of the touch-sensitive display), the electronic device 500 displays (1466), on the touch-sensitive display 504, a user interface 1106 for switching between applications on the electronic device 500, such as in FIG. 11Q. In some embodiments, the user interface for switching between applications on the electronic device includes representations of user interfaces of one or more applications running in the background on the electronic device. For example, the representations of the user interfaces are images of scaled-down versions of the user interfaces of the applications and each representation is selectable to cause the electronic device to display the respective user interface of the respective application (e.g., full screen) on the electronic device.

In some embodiments, such as in FIG. 13U, in response to the second user input (1464), in accordance with a determination that the second input satisfies one or more second criteria (e.g., does not include the pause having the duration above the predetermined threshold duration (e.g., 0.1, 0.5, or 1 second) following the request to move the cursor beyond the edge of the touch-sensitive display), the electronic device 500 displays (1468) on the touch-sensitive display 504, a home screen user interface 1308 that includes selectable icons 1144 corresponding to a plurality of applications accessible to the electronic device 500, without displaying the user interface for switching between the applications on the electronic device 500. In some embodiments, the home screen user interface further includes one or more widgets (e.g., user interface elements that display information or perform functions related to an application of the electronic device or a system function of the electronic device but do not include a corresponding full user interface of the respective application or system function) and a dock. In some embodiments, the selectable icons are selectable to display a user interface of the application corresponding to the selected icon. The selectable icons are optionally different from the representations of applications displayed in the user interface for switching between applications on the electronic device.

The above-described manner of displaying the user interface for switching between applications or the home screen user interface depending on whether the one or more first criteria or the one or more second criteria are met provides a quick and efficient way of accessing various groups of representations of applications accessible to the electronic device (e.g., icons in the dock, representations in the application switching user interface, and icons in the home screen), which simplifies the interaction between the user and the electronic device and enhances the operability of the electronic device and makes the user-device interface more efficient (e.g., by reducing the number of inputs needed to access a representation of a respective application accessible to the electronic device), which additionally reduces power usage and improves battery life of the electronic device by enabling the user to use the electronic device more quickly and efficiently.

In some embodiments, such as in FIG. 13X, the second user input is received via the touch-sensitive display 504 (1470). For example, in response to the input that corresponds to the request to move the cursor beyond the bottom edge of the touch-sensitive display, the electronic device displays the dock and then while the dock is displayed, in response to a swipe input from the bottom edge of the touch-sensitive display towards the center of the touch-sensitive display, the electronic device displays one of the application switching user interface and the home screen user interface. As another example, in response to a swipe input from the bottom edge of the touch-sensitive display towards the center of the touch-sensitive display, the electronic device displays the dock and then while the dock is displayed, in response to an input that corresponds to the request to move the cursor beyond the bottom edge of the touch-sensitive display, the electronic device displays one of the application switching user interface and the home screen user interface.

The above-described manner of displaying the dock in response to the request to move the cursor beyond the bottom edge of the display received at the input device other than the touch-sensitive display and displaying the user interface for switching between applications or the home screen user interface in response to a input received at the touch-sensitive display provides multiple ways for the user to access the dock, the user interface for switching between applications, and the home screen user interface, which simplifies the interaction between the user and the electronic device and enhances the operability of the electronic device and makes the user-device interface more efficient (e.g., by allowing the user to switch between input devices, thus reducing time needed to switch back to the input device other than the touch-sensitive display after attempting to request display of the user interface for switching between applications or the dock using the touch-sensitive display), which additionally reduces power usage and improves battery life of the electronic device by enabling the user to use the electronic device more quickly and efficiently.

In some embodiments, such as in FIG. 13L, the edge of the touch-sensitive display 504 is a bottom edge of the touch-sensitive display (1472). In some embodiments, such as in FIG. 13L, the user interface is a wake screen user interface 1304 that is a system user interface of the electronic device (1474).

In some embodiments, the wake screen user interface includes an indication of the current date and time, an indication of one or more notifications received at the electronic device, and one or more icons indicating network connections of the electronic device (e.g., Wi-Fi indicator, cellular data indicator). The indications of the one or more notifications received at the electronic device optionally include text and/or images corresponding to the received notification. For example, the wake screen user interface includes an indication of an e-mail or text message received at the electronic device, an indication of a notification from an application accessible to the electronic device, and the like. In some embodiments, the wake screen user interface is displayed by the electronic device immediately after the electronic device exits a standby or power off mode and optionally prior to receiving authentication of a user account associated with the electronic device. For example, while in the standby mode, the display of the electronic device is inactive and one or more processors of the electronic device operate in a low-power mode and/or are inactive. In some embodiments, authentication of a user account associated with the electronic device is required to cause the electronic device to cease displaying the wake screen user interface and display a home screen user interface, a different system user interface, or an application user interface on the electronic device. Authentication of the user account associated with the electronic device optionally includes one or more of entry of a password or passcode, biometric authentication (e.g., fingerprint), or an image of the user's face (e.g., captured by an infrared camera in communication with the electronic device). In some embodiments, prior to authentication, the indications of notifications include limited information and after authentication, the indications of notifications include additional information. For example, prior to receiving the authentication, the electronic device displays an indication of a text message that includes an indication that a text message was received and an indication of a contact that sent the text message and after receiving the authentication, the indication of the text message includes at least a portion of the text included in the text message.

In some embodiments, such as in FIGS. 13M-13N, displaying the first user interface element comprises ceasing to display the wake screen user interface 1304 (1476) (e.g., and displaying a home screen user interface of the electronic device, or a user interface of the last application displayed on the electronic device when the device was locked). For example, while displaying the wake screen user interface, the electronic device receives an input corresponding to a request to move the cursor beyond the bottom edge of the touch-sensitive display and, in response to the input, the electronic device displays a user interface that had previously been displayed prior to entering the sleep mode. In some embodiments, authentication (e.g., password, passcode, biometric, image of the user's face) is required to cause the electronic device to cease displaying the wake screen user interface and display the first user interface.

The above-described manner of ceasing to display the wake screen user interface in response to the first input received at the bottom edge of the touch-sensitive display provides a quick and efficient way of dismissing the wake screen when using an input device other than the touch-sensitive display, which simplifies the interaction between the user and the electronic device and enhances the operability of the electronic device and makes the user-device interface more efficient (e.g., by reducing the time it takes to switch between the input device other than the touch-sensitive display and the touch-sensitive display by allowing the user to dismiss the wake screen with the input device other than the touch-sensitive display), which additionally reduces power usage and improves battery life of the electronic device by enabling the user to use the electronic device more quickly and efficiently.

In some embodiments, such as in FIG. 13O, the first location at the edge of the touch-sensitive display 504 corresponds to a right side of a top edge of the touch-sensitive display 504 (1478). In some embodiments, such as in FIG. 13P, the first user interface element is a controls user interface element 1306 including one or more selectable options 1346-1358 for controlling one or more functions of the electronic device 500 (1480) (e.g., functions of the application of which the user interface is a user interface, functions of an application other than the application of which the user interface is a user interface, functions of an operating system of the electronic device, etc.).

In some embodiments, the controls user interface element includes a first selectable option that, when selected, causes the electronic device to perform a first action associated with a first application, the controls user interface element further including a second selectable option that, when selected, causes the electronic device to perform a second action associated with a second application. For example, the controls user interface includes one or more selectable options for controlling one or more network connections of the electronic device (e.g., Wi-Fi, cellular), one or more operation modes of the electronic device (e.g., airplane mode, do not disturb mode), one or more functions of the electronic device (e.g., flashlight), and/or one or more applications of the electronic device (e.g., media playback applications such as a music application or a podcast application, a camera application, a timer or alarm application, a calculator application, such as described above with respect to method 1200).

The above-described manner of displaying the user interface element for controlling one or more functions of the electronic device in response to the first input provides a quick and easy way for accessing the selectable options for controlling the one or more functions of the electronic device when using the input device other than the touch-sensitive display which simplifies the interaction between the user and the electronic device and enhances the operability of the electronic device and makes the user-device interface more efficient (e.g., by reducing the time it takes to switch between the input device other than the touch-sensitive display and the touch-sensitive display by allowing the user to request display of the user interface element for controlling the one or more functions of the electronic device), which additionally reduces power usage and improves battery life of the electronic device by enabling the user to use the electronic device more quickly and efficiently.

In some embodiments, such as in FIG. 13G, the first location at the edge of the touch-sensitive display 504 corresponds to a left side (or center) of a top edge of the touch-sensitive display 504 (1482). In some embodiments, in response to detecting an input corresponding to a request to move the cursor beyond the top edge of the touch-sensitive display in a region of the top edge of the touch-sensitive display on the right of the touch-sensitive display, the electronic device displays a controls user interface element and a request to move the cursor beyond the top edge of the touch-sensitive display in a region other than the region on the right causes the electronic device to display a notifications user interface that includes one or more visual indications of notification events, described above with respect to method 1200 and in more detail below.

The first user interface element 1304 optionally includes a visual indication 1340 of a notification event detected by the electronic device 500 (1484), such as in FIG. 13J. In some embodiments, the first user interface element is a wake screen user interface that includes one or more indications of notification events received at the electronic device, such as indications of messages received from other users (e.g., of other electronic devices) and notifications from applications accessible to the electronic device. For example, in response to detecting an input corresponding to a request to move the cursor beyond the top edge of the touch-sensitive display in a region of the touch-sensitive display in the center or on the left side of the top edge of the touch-sensitive display, the electronic device displays the wake screen (or notifications) user interface including the indication of the notification event.

The above-described manner of displaying the visual indication of the notification event in response to the first input provides a quick and efficient way of accessing the visual indication of the notification when using the input device other than the touch-sensitive display, which simplifies the interaction between the user and the electronic device and enhances the operability of the electronic device and makes the user-device interface more efficient (e.g., by reducing the time it takes to switch between the input device other than the touch-sensitive display and the touch-sensitive display by allowing the user to access the visual indication of the notification while using the input device other than the touch-sensitive display), which additionally reduces power usage and improves battery life of the electronic device by enabling the user to use the electronic device more quickly and efficiently.

In some embodiments, such as in FIG. 13DD, in response to the first user input (1486), in accordance with the determination that the first location does not correspond to the first region (e.g., the first location does not correspond to a location corresponding to display of a user interface element in response to detecting a swipe input from the location along the edge of the touch-sensitive display), the electronic device 500 continues (1488) to display the cursor 1342 at the first location at the edge of the touch-sensitive display 504. In some embodiments, the cursor remains displayed at the edge of the touch-sensitive display until the electronic device detects further input corresponding to a request to move the cursor away from the edge of the touch-sensitive display. For example, if the cursor is displayed at the left edge of the display, a request to move the cursor away from the edge of the display includes a request to move the cursor to the right.

The above-described manner of continuing to display the cursor in response to receiving the first input and determining that the first location does not correspond to the first region provides visual feedback to the user of the location of the cursor and that no additional user interface element is going to be displayed, which simplifies the interaction between the user and the electronic device and enhances the operability of the electronic device and makes the user-device interface more efficient (e.g., by reducing the time and user inputs needed to resume using the input device other than the touch-sensitive display to control the cursor after entering the first input), which additionally reduces power usage and improves battery life of the electronic device by enabling the user to use the electronic device more quickly and efficiently.

In some embodiments, such as in FIG. 13W, the user interface 1302 is a user interface of a respective application, the first user interface element 1360 is a system user interface element and not a user interface element of the respective application (1490). In some embodiments, while displaying the user interface of the respective application, in response to detecting the first input, the electronic device displays the system user interface element. In some embodiments, such as in FIG. 13AAA, in accordance with a determination that the first location corresponds to the first region where an edge swipe gesture starting from an edge of the touch-sensitive display and moving onto the touch-sensitive display will cause display of a second user interface element that is a user interface element of the respective application, the electronic device 500 forgoes (1492) displaying, on the touch-sensitive display 504, the second user interface element.

In some embodiments, in response to detecting an edge swipe gesture starting from the first region and moving towards the center of the touch-sensitive display, the electronic device displays the second user interface element, but in response to detecting an input at an input device other than the touch-sensitive display corresponding to a request to move the cursor beyond the touch-sensitive display at the first region, the electronic device does not display the second user interface element. For example, while displaying an internet browser application, in response to detecting an edge swipe gesture starting from the left edge of the touch-sensitive display, the web browser application displays the previously-displayed webpage and in response to a request to move the cursor beyond the left edge of the touch-sensitive display, the electronic device does not display the previously-displayed webpage.

The above-described manner of displaying a system user interface element in response to the first input and forgoing displaying the second user interface element in accordance with the determination that the first location corresponding to display of the second user interface element that is a user interface element of the respective application provides a quick and efficient way of accessing system user interface elements when using the input device other than the touch-sensitive display while avoiding accidentally displaying application user interfaces in the same manner, which simplifies the interaction between the user and the electronic device and enhances the operability of the electronic device and makes the user-device interface more efficient (e.g., by avoiding conflicts between displaying system user interfaces in response to off-display cursor movements and displaying application user interfaces in response to off-display cursor movements), which additionally reduces power usage and improves battery life of the electronic device by enabling the user to use the electronic device more quickly and efficiently.

In some embodiments, such as in FIG. 13W, the user interface 1302 is a user interface of a respective application, the first user interface element 1360 is a system user interface element and not a user interface element of the respective application (1494). In some embodiments, while displaying the user interface of the respective application, in response to detecting the first input, the electronic device displays the system user interface element. In some embodiments, such as in FIG. 13XX, in accordance with a determination that the first location corresponds to the first region where an edge swipe gesture starting from an edge of the touch-sensitive display 504 and moving onto the touch-sensitive display will cause display of a second user interface element 1370 that is a user interface element of the respective application, the electronic device 500 displays (1496), on the touch-sensitive display 504, the second user interface element 1370. In some embodiments, in response to detecting an edge swipe gesture starting from the first region and moving towards the center of the touch-sensitive display, the electronic device displays the second user interface element, and in response to detecting an input at an input device other than the touch-sensitive display corresponding to a request to move the cursor beyond the touch-sensitive display at the first region, the electronic device also displays the second user interface element. For example, while displaying an internet browser application, in response to detecting an edge swipe gesture starting from the left edge of the touch-sensitive display, the web browser application displays the previously-displayed webpage and in response to a request to move the cursor beyond the left edge of the touch-sensitive display, the electronic device displays the previously-displayed webpage.

The above-described manner of displaying a system user interface elements and application user interfaces in response to off-display cursor movements provides a quick and efficient way of accessing system user interface elements and application user interface elements when using the input device other than the touch-sensitive display, which simplifies the interaction between the user and the electronic device and enhances the operability of the electronic device and makes the user-device interface more efficient (e.g., by providing consistent system response to off-display cursor movement inputs), which additionally reduces power usage and improves battery life of the electronic device by enabling the user to use the electronic device more quickly and efficiently.

It should be understood that the particular order in which the operations in FIGS. 14A-14I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 1000, and 1200) are also applicable in an analogous manner to method 1400 described above with respect to FIGS. 14A-14I. For example, the ways an electronic device displays user interface elements in response to requests to move a cursor beyond an edge of the display described above with reference to method 1400 optionally has one or more of the characteristics of selectively displaying a cursor in a user interface, the interaction of the cursor with user interface objects, the displaying of a cursor while manipulating objects in the user interface, dismissing or switching of applications using a cursor, etc., described herein with reference to other methods described herein (e.g., methods 700, 800, 1000, and 1200). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 14A-14I are, optionally, implemented by components depicted in FIGS. 1A-1B. For example, displaying operations 1402, 1410, and 1436, and receiving operations 1404, 1432, and 1462 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:

at an electronic device in communication with a display generation component and one or more input devices, including a touch-sensitive surface:

concurrently displaying, via the display generation component:

a cursor located at a first location in a user interface; and a first user interface object located at a second location in the user interface;

while displaying the user interface with the first user interface object located at the second location and the cursor located at the first location, receiving, via the one or more input devices, a first input corresponding to a request to move the cursor away from the first location in the user interface to a location of the first user interface object;

in response to receiving the first input, moving the cursor in accordance with the first input from the first location toward the second location in the user interface and selecting the first user interface object for input, including:

in accordance with a determination that a size of the first user interface object is above a threshold size, causing the first user interface object to have a current focus without changing an appearance of the cursor based on the first user interface object; and in accordance with a determination that the size of the first user interface object is below the threshold size, causing the first user interface object to have the current focus, and changing the appearance of the cursor based on the first user interface object;

while the first user interface object is selected for input, receiving, via the one or more input devices, a second input;

in response to receiving the second input, in accordance with a determination that the second input corresponds to a request to move the cursor, moving the cursor in accordance with the second input starting from the second location.

2. The method of claim 1, wherein selecting a respective user interface object for input includes:

in accordance with a determination that the cursor is within a threshold distance of the respective user interface object:

changing an appearance of the cursor based on the respective user interface object; and causing the respective user interface object to have a current focus.

3. The method of claim 1, wherein selecting a respective user interface object for input includes modifying one or more of a size or a location of the respective user interface object.

4. The method of claim 1, further comprising:

while a respective user interface object is selected for input, receiving a third input, via the one or more input devices, corresponding to a request to move the cursor; and in response to receiving the third input and while receiving the third input, in accordance with a determination that a movement of the third input is below a threshold movement, changing an appearance of the respective user interface object in accordance with the movement of the third input while maintaining the respective user interface object as being selected for input.

5. The method of claim 4, further comprising:

while the respective user interface object is selected for input and after changing the appearance of the respective user interface object in accordance with the movement of the third input, detecting a termination of the third input; and in response to detecting the termination of the third input, reverting the appearance of the respective user interface object to a predefined selected appearance.

6. The method of claim 1, further comprising:

while the cursor is located at a third location in the user interface, receiving, via the one or more input devices, a sequence of inputs including a third input corresponding to a request to insert text at a fourth location in the user interface followed by a fourth input corresponding to a request to move the cursor, wherein the sequence of inputs does not include an input for moving the cursor to the fourth location based on a magnitude and/or direction of the input; and in response to receiving the sequence of inputs:

inserting the text at the fourth location in the user interface; and moving the cursor in accordance with the fourth input starting from the fourth location.

7. The method of claim 1, further comprising:

while a respective user interface object is selected for input, receiving a third input, via an external keyboard device; and in response to receiving the third input, in accordance with a determination that the third input includes a selection of a respective key, performing a function associated with the respective user interface object.

8. The method of claim 1, wherein:

the first user interface object is a user interface object of a first application; and the user interface displays a second user interface object that is a user interface object of a second application, wherein the second application and the first application are concurrently displayed in the user interface.

9. The method of claim 1, wherein the user interface is a calendar user interface, the method further comprising:

receiving, via the one or more input devices, a third input corresponding to a request to move the cursor; and in response to receiving the third input:

in accordance with a determination that the third input corresponds to a request to move the cursor across one or more predetermined times in the calendar user interface, moving the cursor across the one or more predetermined times, wherein moving the cursor across the one or more predetermined times includes aligning the cursor with, and selecting for input, respective predetermined times of the one or more predetermined times as the cursor moves across the respective predetermined times.

10. The method of claim 9, further comprising:

while the cursor is aligned with a respective predetermined time and the respective predetermined time is selected for input, receiving, via the one or more input devices, a fourth input corresponding to a request to move the cursor to a representation of an event in the calendar user interface; and in response to receiving the fourth input, aligning the cursor with the representation of the event, and selecting the representation of the event for input.

11. The method of claim 1, further comprising:

while displaying a text entry region in the user interface, including a first row of text and a second row of text, and while the cursor is located at the first row of text, receiving a third input corresponding to a request to move the cursor; and in response to receiving the third input:

in accordance with a determination that the third input corresponds to a request to move the cursor within the first row of text, moving the cursor within the first row of text in accordance with the third input; and in accordance with a determination that the third input corresponds to a request to move the cursor from the first row of text to the second row of text, aligning the cursor with the second row of text.

12. The method of claim 1, further comprising:

while the cursor is displayed at a given location in the user interface, receiving, via the one or more input devices, a third input corresponding to a request to scroll a content of the user interface; and in response to receiving the third input:

scrolling the content of the user interface in accordance with the third input, while maintaining the cursor at the given location in the user interface.

13. The method of claim 12, wherein a first respective user interface object was selected for input by the cursor when the third input was received, and the method further comprises:

in response to receiving the third input:

in accordance with a determination that the scrolling of the content of the user interface causes the first respective user interface object to move away from the cursor, ceasing selection of the first respective user interface object for input; and in accordance with a determination that the scrolling of the content of the user interface causes a second respective user interface object to move to the cursor, selecting the second respective user interface object for input.

14. The method of claim 1, further comprising:

while the first user interface object is selected for input, receiving, via the one or more input devices, a third input corresponding to a request to move the cursor away from the second location in the user interface to a location of a second user interface object; and in response to receiving the third input:

in accordance with a determination that a distance between the first user interface object and the second user interface object is less than a threshold distance:

moving the cursor from the second location to the location of the second user interface object; and changing an appearance of the cursor from having a first size and a first shape based on the first user interface object to having a second size and a second shape based on the second user interface object, without displaying the cursor as having a default size and default shape while moving the cursor from the second location to the location of the second user interface object; and in accordance with a determination that the distance between the first user interface object and the second user interface object is greater than the threshold distance, moving the cursor from the second location to the location of the second user interface object, including:

displaying the cursor as having the default size and default shape while moving the cursor from the second location to the location of the second user interface object; and when the cursor is at the location of the second user interface object, displaying the cursor as having the second size and the second shape based on the second user interface object.

15. The method of claim 1, further comprising:

while displaying, in the user interface, a scroll bar user interface element for scrolling a content of the user interface at a third location, receiving, via the one or more input devices, a third input corresponding to a request to move the cursor to the third location; and in response to receiving the third input:

moving the cursor to the third location; and selecting the scroll bar user interface element for input, including changing an appearance of the cursor based on the scroll bar user interface element.

16. The method of claim 15, further comprising:

while the scroll bar user interface element is selected for input, receiving, via the one or more input devices, a fourth input; and in response to receiving the fourth input:

in accordance with a determination that the fourth input is a gesture for scrolling the content of the user interface that does not include a selection of the scroll bar user interface element while the scroll bar user interface element is selected for input:

scrolling the content of the user interface, while maintaining the cursor at the third location in the user interface, wherein subsequent input for moving the cursor causes the cursor to move starting from the third location.

17. An electronic device, comprising:

one or more processors;

memory; and one or more programs, wherein the one or more programs are stored in the memory and configured to be executed by the one or more processors, the one or more programs including instructions for:

concurrently displaying, via a display generation component:

a cursor located at a first location in a user interface; and a first user interface object located at a second location in the user interface;

while displaying the user interface with the first user interface object located at the second location and the cursor located at the first location, receiving, via one or more input devices, a first input corresponding to a request to move the cursor away from the first location in the user interface to a location of the first user interface object;

in response to receiving the first input, moving the cursor in accordance with the first input from the first location toward the second location in the user interface and selecting the first user interface object for input, including:

in accordance with a determination that a size of the first user interface object is above a threshold size, causing the first user interface object to have a current focus without changing an appearance of the cursor based on the first user interface object; and in accordance with a determination that the size of the first user interface object is below the threshold size, causing the first user interface object to have the current focus, and changing the appearance of the cursor based on the first user interface object;

while the first user interface object is selected for input, receiving, via the one or more input devices, a second input;

and in response to receiving the second input, in accordance with a determination that the second input corresponds to a request to move the cursor, moving the cursor in accordance with the second input starting from the second location.

18. The electronic device of claim 17, wherein selecting a respective user interface object for input includes:

in accordance with a determination that the cursor is within a threshold distance of the respective user interface object:

changing an appearance of the cursor based on the respective user interface object; and causing the respective user interface object to have a current focus.

19. The electronic device of claim 17, wherein selecting a respective user interface object for input includes modifying one or more of a size or a location of the respective user interface object.

20. The electronic device of claim 17, wherein the one or more programs include instructions for:

while a respective user interface object is selected for input, receiving a third input, via the one or more input devices, corresponding to a request to move the cursor; and in response to receiving the third input and while receiving the third input, in accordance with a determination that a movement of the third input is below a threshold movement, changing an appearance of the respective user interface object in accordance with the movement of the third input while maintaining the respective user interface object as being selected for input.

21. The electronic device of claim 20, wherein the one or more programs include instructions for:

while the respective user interface object is selected for input and after changing the appearance of the respective user interface object in accordance with the movement of the third input, detecting a termination of the third input; and in response to detecting the termination of the third input, reverting the appearance of the respective user interface object to a predefined selected appearance.

22. The electronic device of claim 17, wherein the one or more programs include instructions for:

while the cursor is located at a third location in the user interface, receiving, via the one or more input devices, a sequence of inputs including a third input corresponding to a request to insert text at a fourth location in the user interface followed by a fourth input corresponding to a request to move the cursor, wherein the sequence of inputs does not include an input for moving the cursor to the fourth location based on a magnitude and/or direction of the input; and in response to receiving the sequence of inputs:

inserting the text at the fourth location in the user interface; and moving the cursor in accordance with the fourth input starting from the fourth location.

23. The electronic device of claim 17, wherein the one or more programs include instructions for:

while a respective user interface object is selected for input, receiving a third input, via an external keyboard device; and in response to receiving the third input, in accordance with a determination that the third input includes a selection of a respective key, performing a function associated with the respective user interface object.

24. The electronic device of claim 17, wherein:

the first user interface object is a user interface object of a first application; and the user interface displays a second user interface object that is a user interface object of a second application, wherein the second application and the first application are concurrently displayed in the user interface.

25. The electronic device of claim 17, wherein the user interface is a calendar user interface, and wherein the one or more programs include instructions for:

receiving, via the one or more input devices, a third input corresponding to a request to move the cursor; and in response to receiving the third input:

in accordance with a determination that the third input corresponds to a request to move the cursor across one or more predetermined times in the calendar user interface, moving the cursor across the one or more predetermined times, wherein moving the cursor across the one or more predetermined times includes aligning the cursor with, and selecting for input, respective predetermined times of the one or more predetermined times as the cursor moves across the respective predetermined times.

26. The electronic device of claim 25, wherein the one or more programs include instructions for:

while the cursor is aligned with a respective predetermined time and the respective predetermined time is selected for input, receiving, via the one or more input devices, a fourth input corresponding to a request to move the cursor to a representation of an event in the calendar user interface; and in response to receiving the fourth input, aligning the cursor with the representation of the event, and selecting the representation of the event for input.

27. The electronic device of claim 17, wherein the one or more programs include instructions for:

while displaying a text entry region in the user interface, including a first row of text and a second row of text, and while the cursor is located at the first row of text, receiving a third input corresponding to a request to move the cursor; and in response to receiving the third input:

in accordance with a determination that the third input corresponds to a request to move the cursor within the first row of text, moving the cursor within the first row of text in accordance with the third input; and in accordance with a determination that the third input corresponds to a request to move the cursor from the first row of text to the second row of text, aligning the cursor with the second row of text.

28. The electronic device of claim 17, wherein the one or more programs include instructions for:

while the cursor is displayed at a given location in the user interface, receiving, via the one or more input devices, a third input corresponding to a request to scroll a content of the user interface; and in response to receiving the third input:

scrolling the content of the user interface in accordance with the third input, while maintaining the cursor at the given location in the user interface.

29. The electronic device of claim 28, wherein a first respective user interface object was selected for input by the cursor when the third input was received, and wherein the one or more programs include instructions for:

in response to receiving the third input:

in accordance with a determination that the scrolling of the content of the user interface causes the first respective user interface object to move away from the cursor, ceasing selection of the first respective user interface object for input; and in accordance with a determination that the scrolling of the content of the user interface causes a second respective user interface object to move to the cursor, selecting the second respective user interface object for input.

30. The electronic device of claim 17, wherein the one or more programs include instructions for:

while the first user interface object is selected for input, receiving, via the one or more input devices, a third input corresponding to a request to move the cursor away from the second location in the user interface to a location of a second user interface object; and in response to receiving the third input:

in accordance with a determination that a distance between the first user interface object and the second user interface object is less than a threshold distance:

moving the cursor from the second location to the location of the second user interface object; and changing an appearance of the cursor from having a first size and a first shape based on the first user interface object to having a second size and a second shape based on the second user interface object, without displaying the cursor as having a default size and default shape while moving the cursor from the second location to the location of the second user interface object; and in accordance with a determination that the distance between the first user interface object and the second user interface object is greater than the threshold distance, moving the cursor from the second location to the location of the second user interface object, including:

displaying the cursor as having the default size and default shape while moving the cursor from the second location to the location of the second user interface object; and when the cursor is at the location of the second user interface object, displaying the cursor as having the second size and the second shape based on the second user interface object.

31. The electronic device of claim 17, wherein the one or more programs include instructions for:

while displaying, in the user interface, a scroll bar user interface element for scrolling a content of the user interface at a third location, receiving, via the one or more input devices, a third input corresponding to a request to move the cursor to the third location; and in response to receiving the third input:

moving the cursor to the third location; and selecting the scroll bar user interface element for input, including changing an appearance of the cursor based on the scroll bar user interface element.

32. The electronic device of claim 31, wherein the one or more programs include instructions for:

while the scroll bar user interface element is selected for input, receiving, via the one or more input devices, a fourth input; and in response to receiving the fourth input:

in accordance with a determination that the fourth input is a gesture for scrolling the content of the user interface that does not include a selection of the scroll bar user interface element while the scroll bar user interface element is selected for input:

scrolling the content of the user interface, while maintaining the cursor at the third location in the user interface, wherein subsequent input for moving the cursor causes the cursor to move starting from the third location.

33. A non-transitory computer readable storage medium storing one or more programs, the one or more programs comprising instructions, which when executed by one or more processors of an electronic device, cause the electronic device to perform a method comprising:

concurrently displaying, via a display generation component:

a cursor located at a first location in a user interface; and a first user interface object located at a second location in the user interface;

while displaying the user interface with the first user interface object located at the second location and the cursor located at the first location, receiving, via one or more input devices, a first input corresponding to a request to move the cursor away from the first location in the user interface to a location of the first user interface object;

in response to receiving the first input, moving the cursor in accordance with the first input from the first location toward the second location in the user interface and selecting the first user interface object for input, including:

in accordance with a determination that a size of the first user interface object is above a threshold size, causing the first user interface object to have a current focus without changing an appearance of the cursor based on the first user interface object; and in accordance with a determination that the size of the first user interface object is below the threshold size, causing the first user interface object to have the current focus, and changing the appearance of the cursor based on the first user interface object;

while the first user interface object is selected for input, receiving, via the one or more input devices, a second input;

and in response to receiving the second input, in accordance with a determination that the second input corresponds to a request to move the cursor, moving the cursor in accordance with the second input starting from the second location.

34. The non-transitory computer readable storage medium of claim 33, wherein selecting a respective user interface object for input includes:

in accordance with a determination that the cursor is within a threshold distance of the respective user interface object:

changing an appearance of the cursor based on the respective user interface object; and causing the respective user interface object to have a current focus.

35. The non-transitory computer readable storage medium of claim 33, wherein selecting a respective user interface object for input includes modifying one or more of a size or a location of the respective user interface object.

36. The non-transitory computer readable storage medium of claim 33, wherein the method comprises:

while a respective user interface object is selected for input, receiving a third input, via the one or more input devices, corresponding to a request to move the cursor; and in response to receiving the third input and while receiving the third input, in accordance with a determination that a movement of the third input is below a threshold movement, changing an appearance of the respective user interface object in accordance with the movement of the third input while maintaining the respective user interface object as being selected for input.

37. The non-transitory computer readable storage medium of claim 36, wherein the method comprises:

while the respective user interface object is selected for input and after changing the appearance of the respective user interface object in accordance with the movement of the third input, detecting a termination of the third input; and in response to detecting the termination of the third input, reverting the appearance of the respective user interface object to a predefined selected appearance.

38. The non-transitory computer readable storage medium of claim 33, wherein the method comprises:

while the cursor is located at a third location in the user interface, receiving, via the one or more input devices, a sequence of inputs including a third input corresponding to a request to insert text at a fourth location in the user interface followed by a fourth input corresponding to a request to move the cursor, wherein the sequence of inputs does not include an input for moving the cursor to the fourth location based on a magnitude and/or direction of the input; and in response to receiving the sequence of inputs:

inserting the text at the fourth location in the user interface; and moving the cursor in accordance with the fourth input starting from the fourth location.

39. The non-transitory computer readable storage medium of claim 33, wherein the method comprises:

while a respective user interface object is selected for input, receiving a third input, via an external keyboard device; and in response to receiving the third input, in accordance with a determination that the third input includes a selection of a respective key, performing a function associated with the respective user interface object.

40. The non-transitory computer readable storage medium of claim 33, wherein:

the first user interface object is a user interface object of a first application; and the user interface displays a second user interface object that is a user interface object of a second application, wherein the second application and the first application are concurrently displayed in the user interface.

41. The non-transitory computer readable storage medium of claim 33, wherein the user interface is a calendar user interface, and wherein the method comprises:

receiving, via the one or more input devices, a third input corresponding to a request to move the cursor; and in response to receiving the third input:

in accordance with a determination that the third input corresponds to a request to move the cursor across one or more predetermined times in the calendar user interface, moving the cursor across the one or more predetermined times, wherein moving the cursor across the one or more predetermined times includes aligning the cursor with, and selecting for input, respective predetermined times of the one or more predetermined times as the cursor moves across the respective predetermined times.

42. The non-transitory computer readable storage medium of claim 41, wherein the method comprises:

while the cursor is aligned with a respective predetermined time and the respective predetermined time is selected for input, receiving, via the one or more input devices, a fourth input corresponding to a request to move the cursor to a representation of an event in the calendar user interface; and in response to receiving the fourth input, aligning the cursor with the representation of the event, and selecting the representation of the event for input.

43. The non-transitory computer readable storage medium of claim 33, wherein the method comprises:

while displaying a text entry region in the user interface, including a first row of text and a second row of text, and while the cursor is located at the first row of text, receiving a third input corresponding to a request to move the cursor; and in response to receiving the third input:

in accordance with a determination that the third input corresponds to a request to move the cursor within the first row of text, moving the cursor within the first row of text in accordance with the third input; and in accordance with a determination that the third input corresponds to a request to move the cursor from the first row of text to the second row of text, aligning the cursor with the second row of text.

44. The non-transitory computer readable storage medium of claim 33, wherein the method comprises:
while the cursor is displayed at a given location in the user interface, receiving, via the one or more input devices, a third input corresponding to a request to scroll a content of the user interface; and
in response to receiving the third input:
scrolling the content of the user interface in accordance with the third input, while maintaining the cursor at the given location in the user interface.

45. The electronic device of claim 44, wherein a first respective user interface object was selected for input by the cursor when the third input was received, and wherein the method comprises:
in response to receiving the third input:
in accordance with a determination that the scrolling of the content of the user interface causes the first respective user interface object to move away from the cursor, ceasing selection of the first respective user interface object for input; and
in accordance with a determination that the scrolling of the content of the user interface causes a second respective user interface object to move to the cursor, selecting the second respective user interface object for input.

46. The non-transitory computer readable storage medium of claim 33, wherein the method comprises:
while the first user interface object is selected for input, receiving, via the one or more input devices, a third input corresponding to a request to move the cursor away from the second location in the user interface to a location of a second user interface object; and
in response to receiving the third input:
in accordance with a determination that a distance between the first user interface object and the second user interface object is less than a threshold distance:
moving the cursor from the second location to the location of the second user interface object; and
changing an appearance of the cursor from having a first size and a first shape based on the first user interface object to having a second size and a second shape based on the second user interface object, without displaying the cursor as having a default size and default shape while moving the cursor from the second location to the location of the second user interface object; and
in accordance with a determination that the distance between the first user interface object and the second user interface object is greater than the threshold distance, moving the cursor from the second location to the location of the second user interface object, including:
displaying the cursor as having the default size and default shape while moving the cursor from the second location to the location of the second user interface object; and
when the cursor is at the location of the second user interface object, displaying the cursor as having the second size and the second shape based on the second user interface object.

47. The non-transitory computer readable storage medium of claim 33, wherein the method comprises:
while displaying, in the user interface, a scroll bar user interface element for scrolling a content of the user interface at a third location, receiving, via the one or more input devices, a third input corresponding to a request to move the cursor to the third location; and
in response to receiving the third input:
moving the cursor to the third location; and
selecting the scroll bar user interface element for input, including changing an appearance of the cursor based on the scroll bar user interface element.

48. The non-transitory computer readable storage medium of claim 47, wherein the method comprises:
while the scroll bar user interface element is selected for input, receiving, via the one or more input devices, a fourth input; and
in response to receiving the fourth input:
in accordance with a determination that the fourth input is a gesture for scrolling the content of the user interface that does not include a selection of the scroll bar user interface element while the scroll bar user interface element is selected for input:
scrolling the content of the user interface,
while maintaining the cursor at the third location in the user interface, wherein subsequent input for moving the cursor causes the cursor to move starting from the third location.

* * * * *